US00RE40958E

(19) United States
(12) Reissued Patent
Oshima

(10) Patent Number: US RE40,958 E
(45) **Date of Reissued Patent: *Nov. 10, 2009**

(54) MEDIUM, APPARATUS, AND METHOD RELATED TO ENCRYPTION RESULTANT INFORMATION

(75) Inventor: Mitsuaki Oshima, Kyoto (JP)

(73) Assignee: Panasonic Corporation, Osaka (JP)

( * ) Notice: This patent is subject to a terminal disclaimer.

(21) Appl. No.: 11/304,674

(22) Filed: Dec. 16, 2005

Related U.S. Patent Documents

Reissue of:
(64) Patent No.: 6,859,427
Issued: Feb. 22, 2005
Appl. No.: 10/611,926
Filed: Jul. 3, 2003

U.S. Applications:
(60) Division of application No. 11/272,484, filed on Nov. 14, 2005, which is a continuation of application No. 09/796,534, filed on Mar. 2, 2001, now Pat. No. 6,674,703, which is a division of application No. 09/305,318, filed on May 5, 1999, now Pat. No. 6,243,330, which is a division of application No. 08/970,162, filed on Nov. 13, 1997, now Pat. No. 5,959,948, which is a continuation of application No. 08/534,771, filed on Sep. 27, 1995, now Pat. No. 5,699,331, which is a division of application No. 08/281,337, filed on Jul. 27, 1994, now Pat. No. 5,473,584, which is a continuation-in-part of application No. 08/184,117, filed on Jan. 21, 1994, now Pat. No. 5,526,328, which is a continuation-in-part of application No. 08/009,709, filed on Jan. 27, 1993, now Pat. No. 5,682,360.

(30) Foreign Application Priority Data

| | | |
|---|---|---|
| Jan. 29, 1992 | (JP) | 4-13809 |
| Feb. 28, 1992 | (JP) | 4-42558 |
| Mar. 9, 1992 | (JP) | 4-50328 |
| Mar. 26, 1992 | (JP) | 4-68031 |
| Apr. 30, 1992 | (JP) | 4-111176 |
| Jul. 22, 1992 | (JP) | 4-194450 |
| Sep. 25, 1992 | (JP) | 4-280874 |
| Jan. 21, 1993 | (JP) | 5-8596 |
| Mar. 25, 1993 | (JP) | 5-92219 |
| Apr. 9, 1993 | (JP) | 5-107423 |
| Jul. 27, 1993 | (JP) | 5-205682 |
| Nov. 2, 1993 | (JP) | 5-297504 |
| Nov. 19, 1993 | (JP) | 5-314114 |
| Apr. 18, 1994 | (JP) | 6-104879 |
| Jul. 7, 1994 | (JP) | 6-156089 |

(51) Int. Cl.
*G11B 7/00* (2006.01)

(52) U.S. Cl. ..... 369/53.11; 369/47.12; 369/53.21; 380/228; 705/57

(58) Field of Classification Search ..... 369/53.11, 369/47.12, 53.21, 47.19, 47.11, 13.17, 13.05, 369/83, 84, 30.07, 275.3; 380/228; 705/57
See application file for complete search history.

(56) References Cited

U.S. PATENT DOCUMENTS

| | | | |
|---|---|---|---|
| 4,590,470 | A | 5/1986 | Koenig |
| 4,750,159 | A | 6/1988 | Yoda |
| 4,785,361 | A | 11/1988 | Brotby |
| 5,153,861 | A | 10/1992 | Maeda |
| 5,168,482 | A | 12/1992 | Aratari et al. |
| 5,285,440 | A | 2/1994 | Matsuda |
| 5,400,403 | A | 3/1995 | Fahn et al. |
| 5,473,584 | A | 12/1995 | Oshima |
| 5,497,419 | A | 3/1996 | Hill |
| 5,699,331 | A | 12/1997 | Oshima |
| 5,761,301 | A | 6/1998 | Oshima et al. |
| 5,805,551 | A | 9/1998 | Oshima et al. |
| 5,881,038 | A | 3/1999 | Oshima et al. |
| 5,953,424 | A | 9/1999 | Volgelesang et al. |
| 6,081,785 | A | 6/2000 | Oshima et al. |
| 6,301,569 | B1 | 10/2001 | Oshima et al. |
| 6,408,285 | B1 | 6/2002 | Oshima et al. |
| 6,633,853 | B2 | 10/2003 | Oshima et al. |

FOREIGN PATENT DOCUMENTS

| | | |
|---|---|---|
| DE | 4308680 | 10/1993 |
| EP | 0138245 | 4/1985 |
| EP | 0532346 | 3/1993 |
| EP | 0 637 016 | 3/2001 |
| EP | 0 706 174 | 1/2003 |
| GB | 2260634 | 4/1993 |
| JP | 56-163536 | 12/1981 |

| | | |
|---|---|---|
| JP | 57-6446 | 1/1982 |
| JP | 57-212642 | 12/1982 |
| JP | 60-70543 | 4/1985 |
| JP | 62205580 | 9/1987 |
| JP | 2-179951 | 7/1990 |
| JP | 3063936 | 3/1991 |
| JP | 3232139 | 10/1991 |
| NL | 9101358 | 8/1991 |
| WO | 8502933 | 7/1985 |

OTHER PUBLICATIONS

J. Omura, "Novel Applications of Cryptography in Digital Communications", IEEE Communications Magazine, May 1990, pp. 21–29.

*Primary Examiner*—Ali Neyzari
(74) *Attorney, Agent, or Firm*—Clark & Brody

(57) ABSTRACT

A disk-shaped recording medium includes a transparent substrate, and an optical recording layer formed on the transparent substrate. A light source emits light. An optical head is operative for applying the light to the optical recording layer from the light source via the transparent substrate, for focusing the light on the optical recording layer, and for reproducing information from the optical recording layer. A position detecting device is operative for detecting at least one of a pit depth and a physical position of information which has a first given relation with a specified address and which is recorded on the recording medium, and for generating first positional information representing at least one of the pit depth and the physical position. A previously-recorded secret code is reproduced from the recording medium. The secret code represents second positional information. The secret code is decoded into the second positional information. The second positional information represents at least one of a predetermined reference pit depth and a predetermined reference physical position. The first positional information and the second positional information are collated, and a check is made as to whether or not the first positional information and the second positional information are in a second given relation. When the first positional information and the second positional information are not in the second given relation, one of outputting of a reproduced signal of the recording medium, operation of a program stored in the recording medium, and decoding of the secret code is stopped.

1 Claim, 281 Drawing Sheets

FIG. 92(b)S 345
345a
345b
345c
345d
349a
349b
349c
349d
349e
Tpo
350a
350b
350c
350d
350e
351
351a
351b
A1
A2
A3
A4
B1
B2
B3
B4
T1
T2
T3
T4
T5
0
5

P = 1

P = 2

P = 3

P = 4

P = 5

P = 6

P = 1

P = 2

P = 3

P = 4

P = 5

P = 6

P = 1

P = 2

P = 3

P = 4

P = 5

45
2
398
387a
TOMORROW
387b
204312001
DATA "204312001"

2
398
387a
387b
204312001
DATA "204312001"

2
398
387a
387b
204312001
204312001
DATA "204312001"

446

| DATA IN MAG FILE | | | |
|---|---|---|---|
| MAG ADRS | CORRECTION CONTENTS | OPT ADRS | CORRECTION DATA |
| 001 | 111 | 0000 | |
| 002 | 000 | 01204 | GO TO 01256 |
| 003 | 000 | 01424 | GO TO 01457 |
| 004 | 001 | 01567 | |
| 005 | 001 | 01568 | |
| 006 | 010 | 02727 | GO TO 02756 |
| 007 | 010 | 02737 | GO TO 02618 |
| 008 | 011 | 03527 | |
| 009 | 011 | 05627 | |

$M_4$

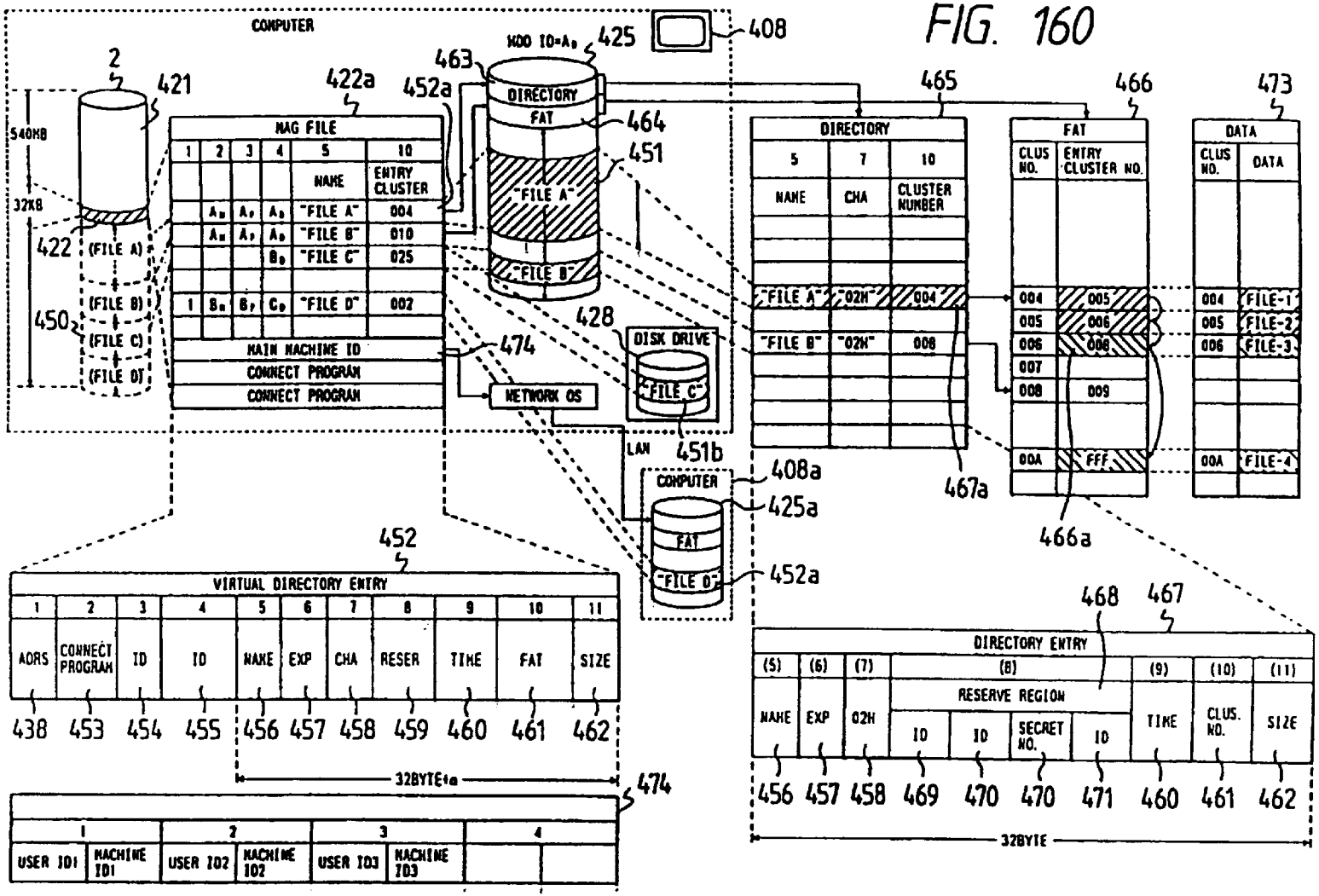
FIG. 160
COMPUTER
HDD ID=A0
DIRECTORY
FAT
"FILE A"
"FILE B"
MAG FILE
ENTRY CLUSTER
NAME
MAIN MACHINE ID
CONNECT PROGRAM
NETWORK OS
DISK DRIVE
"FILE C"
LAN
COMPUTER
"FILE D"
VIRTUAL DIRECTORY ENTRY
ADRS
CONNECT PROGRAM
ID
NAME
EXP
CHA
RESER
TIME
FAT
SIZE
USER ID1
MACHINE ID1
USER ID2
MACHINE ID2
USER ID3
MACHINE ID3
(FILE A)
(FILE B)
(FILE C)
(FILE D)
540KB
32KB
32BYTE
DATA
CLUS NO.
FILE-1
FILE-2
FILE-3
FILE-4
CLUSTER NUMBER
"02H"
DIRECTORY ENTRY
RESERVE REGION
SECRET NO.
CLUS. NO.
408
425
464
451
463
452a
422a
421
2
422
450
428
474
451b
408a
425a
452a
452
438
453
454
455
456
457
458
459
460
461
462
466
465
467a
466a
473
467
468
469
470
471
32BYTE

FIG. 165

495

```
A:>Dir
   CDROM1                <DIR> 89-01-01  3:00
   CDROM2                <DIR> 89-01-01  3:00
   CDROM     ZZZ 500,000,000 90-01-01  3:00
                1 FILE
                0 BYTE USABLE
A:> B:
B:¥>CD VD1
B:¥VD1>Dir
   X.V       VSW 10,000,000 91-08-01  1:01
   PICTURE.V VXX 10,000,000 92-01-13  6:13
   MOVIE.V   VYY 10,000,000 92-01-01  2:10
   TEST                <DIR> 92-01-10  2:15
                3 FILES
                8,980,000,000 BYTE USABLE
```

496h

496i

496j

FIG. 167(a)

495a

```
D:>Dir
   XXXXA     XXX     100,000 89-02-01  1:01
   XXXXB     XXX     100,000 89-03-01  1:01
   XXXXC     XXX     200,000 89-04-01  1:01

        3 FILES
        2,000,000,000 BYTE USABLE
```

FIG. 167(b)

```
D:>Dir
   XXXXA     XXX     100,000 89-02-01  1:01
   XXXXB     XXX     100,000 89-03-01  1:01
   XXXXC     XXX     200,000 89-04-01  1:01
       VD <Dir >  1,000,000 89-05-01  1:01

        3 FILES
        2,000,000,000 BYTE USABLE
```

FIG. 169

```
A:>save file X
Please input your ID?
A:>TOM
MAIN MACHINE ID, SUB DISK ID, DEFAULT VALUES OK?
A:>Yes
Please insert disk XX
A:>
```

FIG. 170

```
A:> Start Program No.11
Please input Password of Program No.N
A:> 123456
OK
```

CLOSE

OPEN

A B t = 0
503a
509
DELAY
503
65a
8
67a
MOTOR t = t1
503a
509
DELAY
503
8
67a
MOTOR t = t2
DELAY
503
8
MOTOR

DELAY
503
MOTOR
51d

503a
DELAY
65a
51e
23a
6
MOTOR
17 t = t5
51g
509
DELAY
503a
6
MOTOR
51f
17

FIG. 189(a)
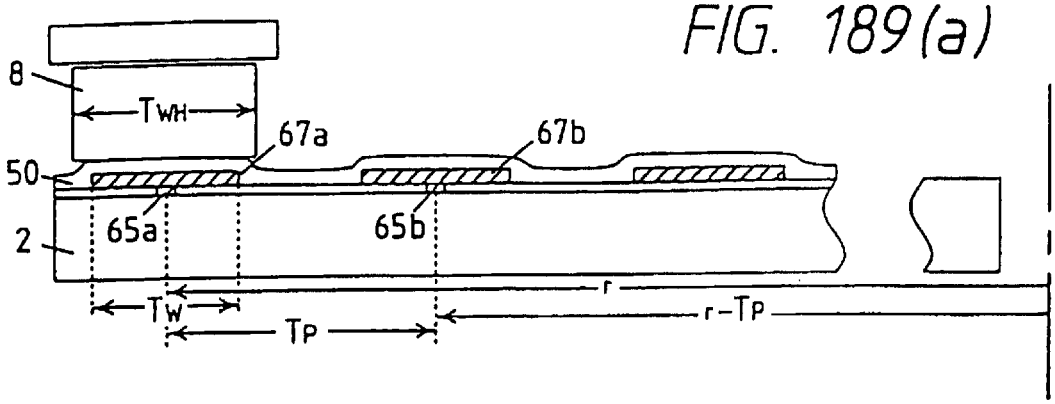
FIG. 189(b)
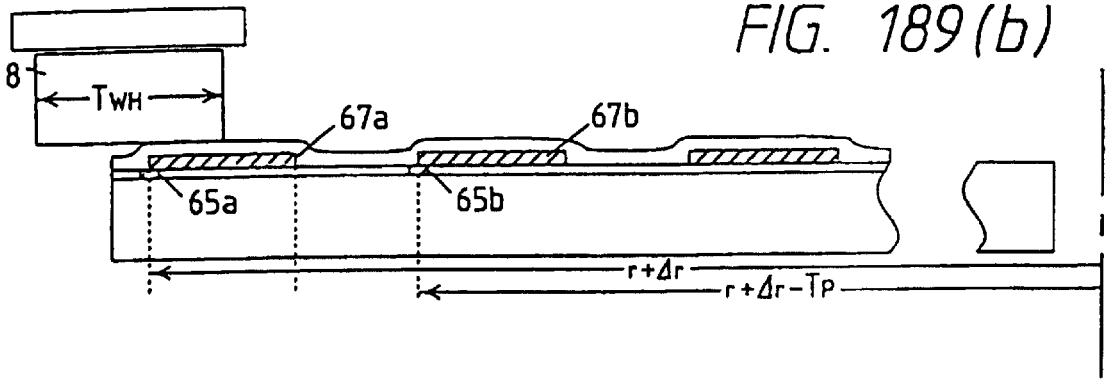
FIG. 189(c)
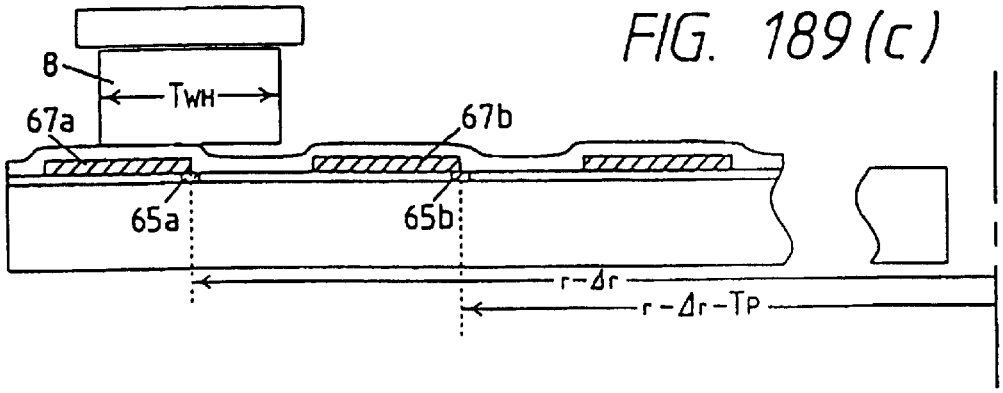
FIG. 189(d)
$r-\Delta r-T_{WH}/2 > r+\Delta r+T_{WH}/2-T_P$
$T_P > 2\Delta r+T_{WH}$
$(CD: \Delta r = 0.2\,mm)$
$T_P > 0.4\,mm$

CLOSE

OPEN

PRESENCE OF MAGNETIC HEAD
ABSENCE OF MAGNETIC HEAD
MAGNETIC FIELD INTENSITY (GAUSS)
1000
900
800
700
600
500
400
300
200
100
50
0
-10mm
-5
0
+5
+10mm
DISTANCE : L
L
8
6
2

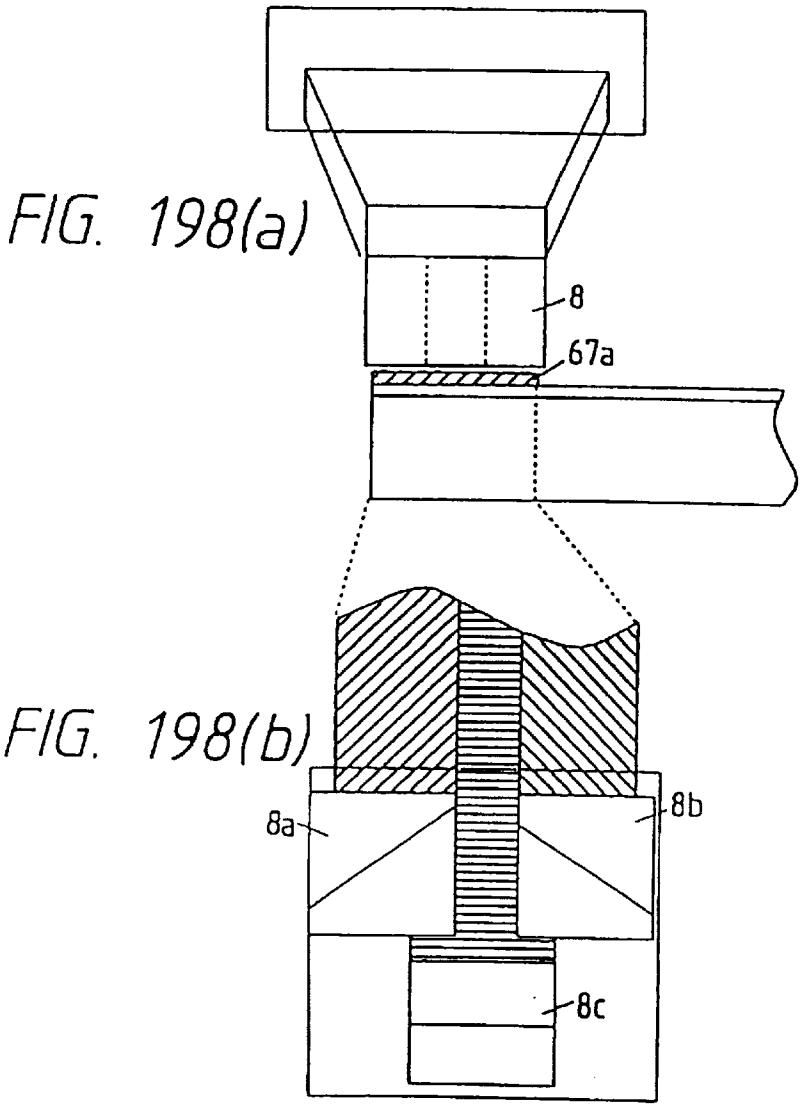
FIG. 198(a)
FIG. 198(b)
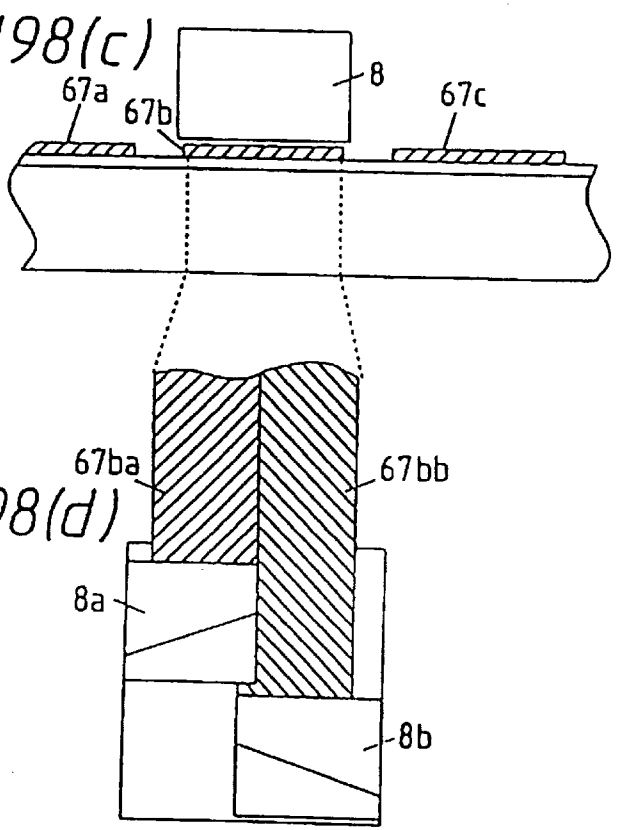
FIG. 198(c)
FIG. 198(d)

FIG. 214

| | OPT RECORD PORTION | | | | | | | | | MAG RECORD PORTION | | | | | | |
|---|---|---|---|---|---|---|---|---|---|---|---|---|---|---|---|---|
| MAG TRACK NO. | INDEX | | | | FORMAT INFORMATION | | | | | OPT FRAME INFORMATION | | | NEW INDEX | | | |
| | SUBCODE | | | PHYSICAL FRAME | SECTOR NUMBER | DENSITY | CAPACITY BYTE | Hc(Oe) | RECORD INHIBIT | BLOCK NUMBER | PHYSICAL FRAME | RATIO | SUBCODE | | | PHYSICAL FRAME |
| | MIN | SEC | FRAME | | | | | | | | | | MIN | SEC | FRAME | |
| 0 | | | | | 1 | DD | 1024 | 2900 | 1 | | | | | | | |
| 1 | 3 | 15 | 55 | 21 | 1 | DD | 1024 | 1900 | 0 | 10 | 15 | 1/100 | 3 | 15 | 56 | 21 |
| 2 | 6 | 20 | 25 | | | | | 1900 | 0 | | | | | | | |
| 3 | | | | | | | | 1900 | 0 | | | | | | | |
| 4 | | | | | | | | 1900 | 0 | | | | | | | |
| 5 | | | | | | | | 1900 | 0 | | | | | | | |
| 6 | | | | | | | | 1900 | 0 | | | | | | | |
| 7 | | | | | | | | 1900 | 0 | | | | | | | |
| 8 | | | | | | | | 1900 | 0 | | | | | | | |
| 9 | | | | | | | | 1900 | 0 | | | | | | | |
| 10 | | | | | | | 2048 | 1900 | 0 | | | | | | | |

FIG. 219
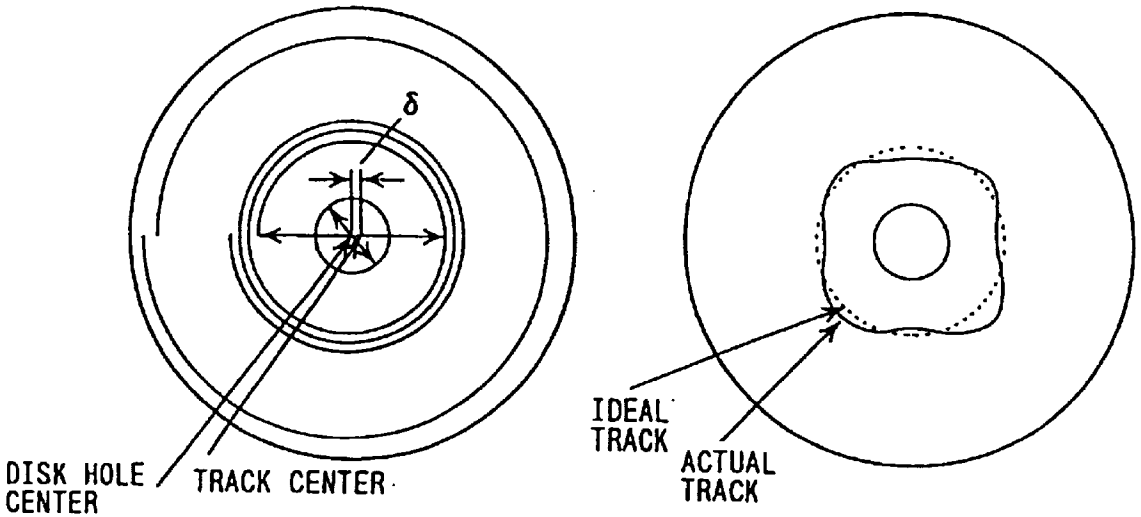
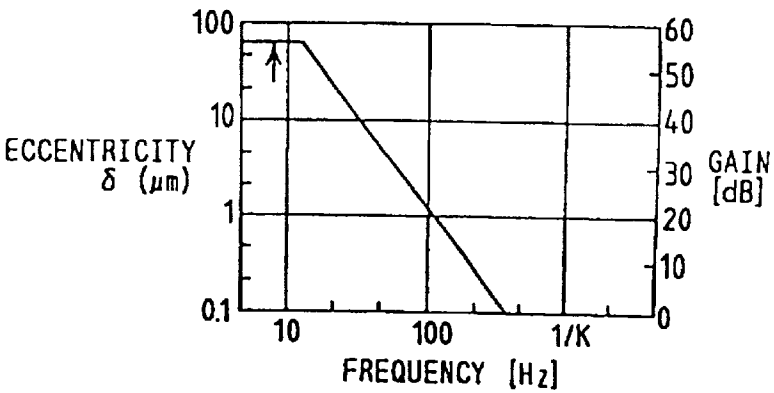
DISK SPECIFICATION
| ITEM | SPEC |
|---|---|
| MAX ECCENTRICITY [μm] | ±50 |
| MAX ECCENTRIC ACCEL [m/s²] | 0.4 |

FIG. 230

Menu Screen No. - Select No. Table

522

| Menu Screen No. | Operator 1 | Operator 2 | Operator 3 | Operator 4 |
|---|---|---|---|---|
| | Name 1 | Name 2 | Name 3 | Name 4 |
| Menu Screen No.1 | Select No.1-1 | Select No.1-2 | Select No.1-3 | Select No.1-4 |
| Menu Screen No.2 | Select No.2-1 | Select No.2-2 | Select No.2-3 | Select No.2-4 |
| Menu Screen No.3 | Select No.3-1 | Select No.3-2 | Select No.3-3 | Select No.3-4 |
| | | | | |
| Menu Still Screen No. N | Select No.N-1 | Select No.N-2 | Select No.N-3 | Select No.N-4 |
| | | | | |

522n

FIG. 242 (a) Top View

FIG. 242 (b) Side View

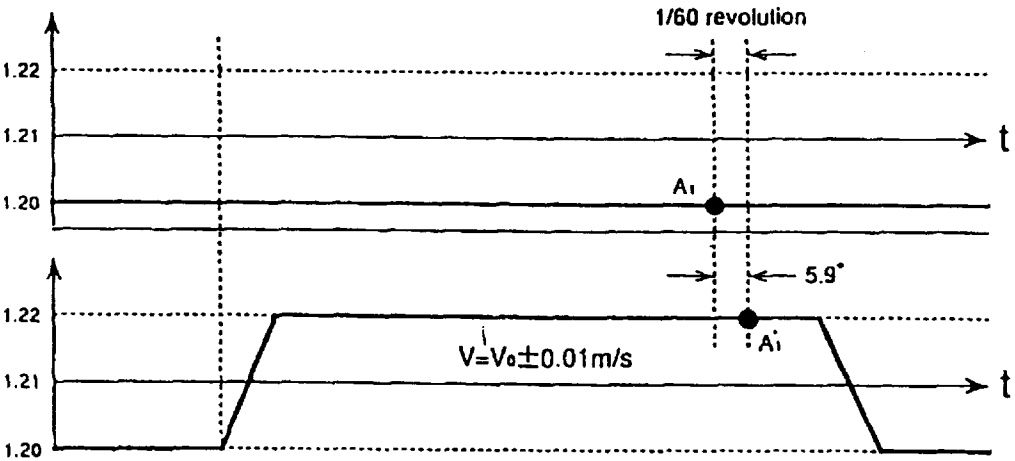
FIG. 244 (a)
FIG. 244 (b)
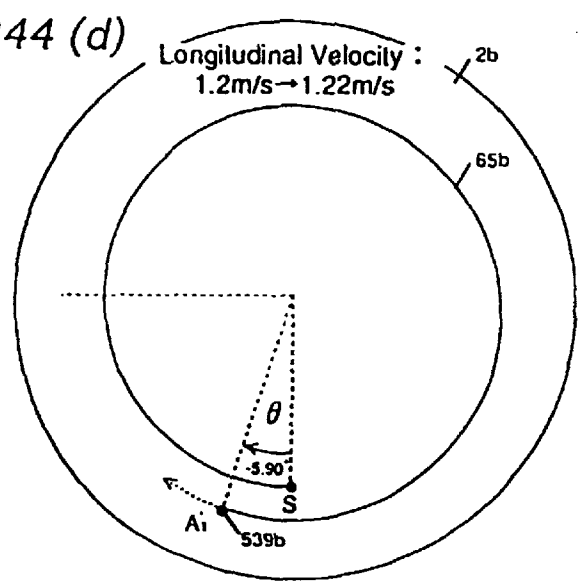
FIG. 244 (c)
FIG. 244 (d)

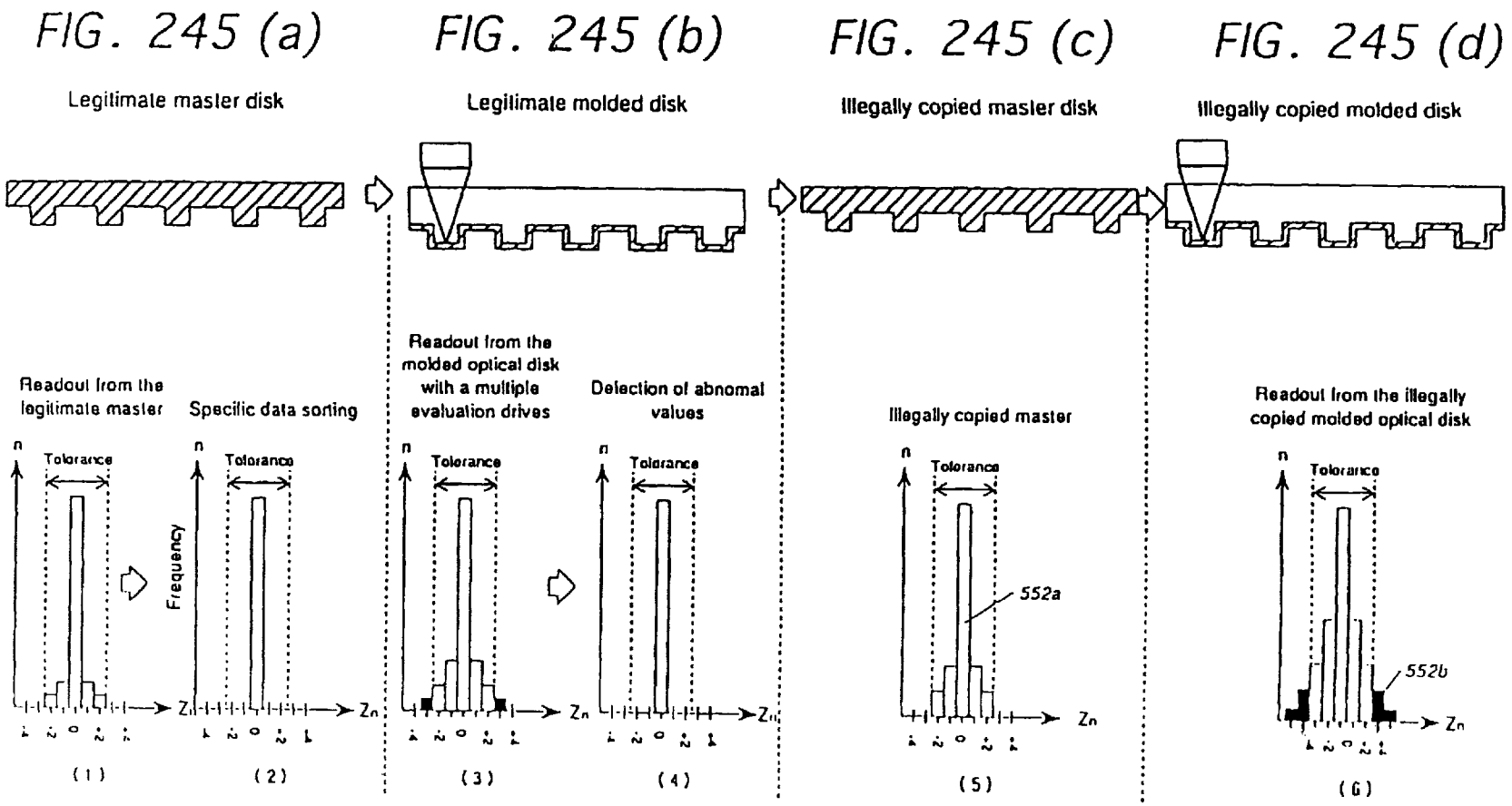
FIG. 245 (a)
Legitimate master disk
FIG. 245 (b)
Legitimate molded disk
FIG. 245 (c)
Illegally copied master disk
FIG. 245 (d)
Illegally copied molded disk
Readout from the legitimate master
Specific data sorting
Readout from the molded optical disk with a multiple evaluation drives
Detection of abnormal values
Illegally copied master
Readout from the illegally copied molded optical disk
Tolerance
Frequency
552a
552b
(1)
(2)
(3)
(4)
(5)
(6)

FIG. 250 (a) illegally copied disk

FIG. 250 (b) Legitimate disk

FIG. 250 (c) Detection voltage of optical reproduction signal and 2-level slicer FIG. 250 (d) Digital Repro. signal (Detection slice level $S_1$)

FIG. 250 (e) Envelope waveform

FIG. 250 (f) Digital Repro. signal (Reference slice level $S_0$)

FIG. 250 (g) Multiple Protect signal $S_0 \times \overline{S_1}$

No decentering

Decentering
Example of decentering amount operation by three points

Calculation example : $L'a = f(\theta a, \theta b, \theta c) = \frac{L}{2}\left(\tan\frac{\pi}{6} - \tan\left(\frac{\pi}{2} - \theta a\right)\right)$ FIG. 253 (a) Legitimate disk FIG. 253 (b) illegally copied disk 532
An Zn Tn Dn
A0 Z0 +1 π/6
A1 Z1 +1 π/4
A2 Z2 -1 π/6
Address 2
Address 1
Reference address
A0
A1
A2
Relative angle
0 deg
Z1
Z2
539a
539b
539c
T0=+1
T1=+1
T2=-1
D0=π/6
D1=π/4
D2=π/6
Dn=π/6

Address An

Angle Zn

Tracking displacement Tn

Pit depth Dn

FIG. 256

Effect of Original Copy Protect given to Master disk production equipment

| Master disk production equipment | | Copy Protect Method | | | | | | |
|---|---|---|---|---|---|---|---|---|
| | | A only | B only | C only | A+B | B+C | A+C | A+B+C |
| | | Angular direction | Tracking direction | Depth direction | Angle×Address Angle×Tracking | Tracking×Address Depth×Address | Angle×Address Angle×Depth | |
| ROM Original Disk production equipment: Existing CD manufacturing equipment | Standard | ○ | ○ | ○ | ○ | ○ | ○ | ○ |
| | Minor remodeling | △ | ○ | ○ | ○ | ○ | ○ | ○ |
| Existing MD/CD manufacturing equipment | Standard | ○ | △ | ○ | ○ | ○ | ○ | ○ |
| | Minor remodeling | △ | ○ | ○ | △ | ○ | ○ | ○ |
| LD/CD manufacturing equipment | Standard | ○ | ○ | ○ | ○ | ○ | ○ | ○ |
| | Minor remodeling | △ | ○ | ○ | ○ | ○ | ○ | ○ |
| LD/CD/MD manufacturing equipment | Standard | ○ | △ | ○ | ○ | ○ | ○ | ○ |
| | Minor remodeling | △ | ○ | ○ | △ | ○ | ○ | ○ |
| Record Enabling type optical disk manufacturing equipment | Standard | △ | △ | △ Yield NG | △ | △ Yield NG | △ Yield NG | △ Yield NG |
| | Minor remodeling | × | × | △ Yield NG | × | △ Yield NG | △ Yield NG | △ Yield NG |

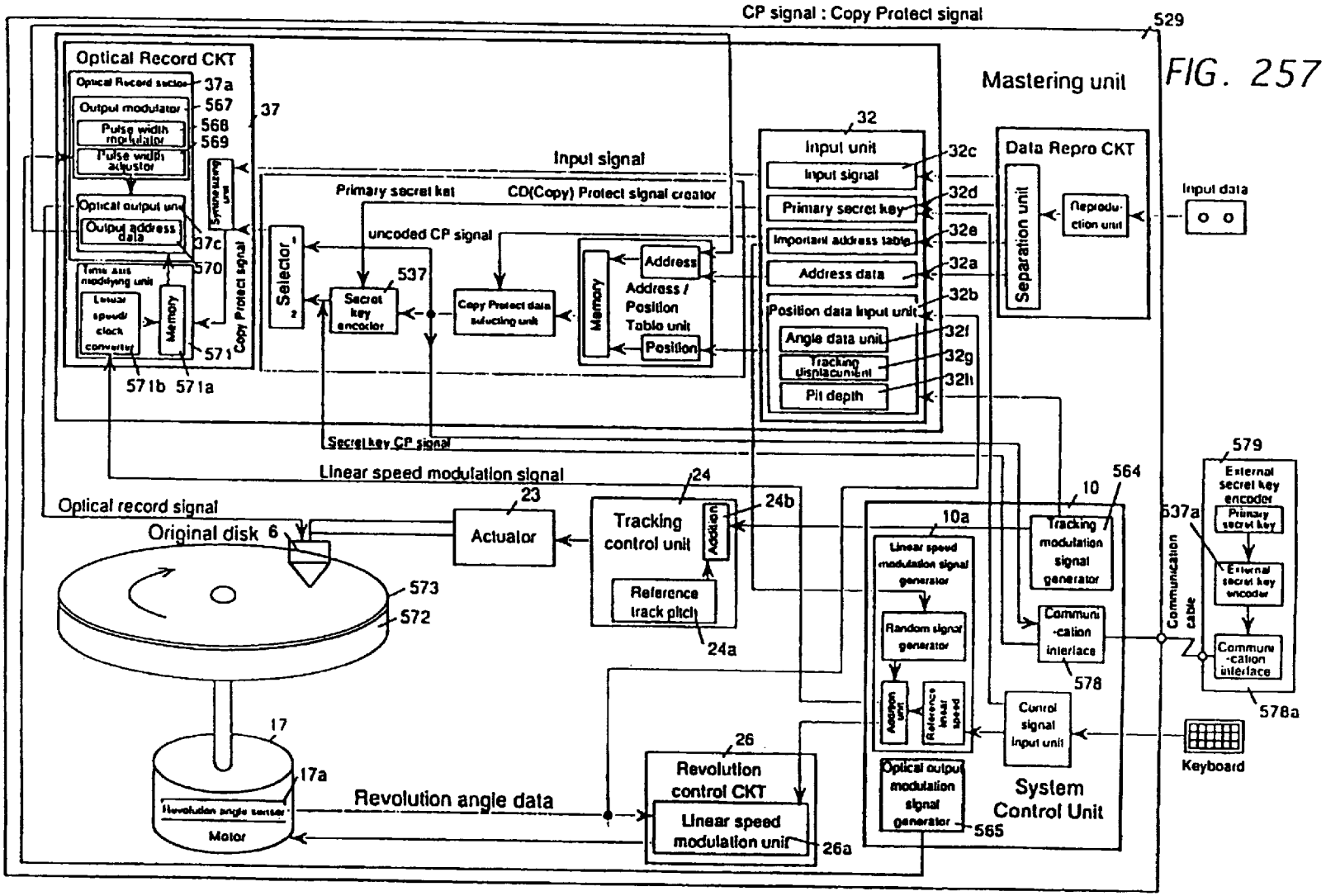
FIG. 257
CP signal : Copy Protect signal
529
Mastering unit
Input data
Data Repro CKT
Separation unit
Reproduction unit
Input unit
Input signal
Primary secret key
Important address table
Address data
Position data input unit
Angle data unit
Tracking displacement
Pit depth
32
32c
32d
32e
32a
32b
32f
32g
32h
Input signal
CD(Copy) Protect signal creator
Address
Address / Position Table unit
Position
Memory
Copy Protect data selecting unit
uncoded CP signal
Primary secret key
537
Secret key encoder
Selector
Secret key CP signal
Linear speed modulation signal
Optical Record CKT
Optical Record section
Output modulator
Pulse width modulator
Pulse width adjustor
Optical output unit
Output address data
Synchronizing unit
Copy Protect signal
Memory
Time axis modifying unit
Linear speed clock generator
37
37a
567
568
569
37c
570
571
571a
571b
Optical record signal
Original disk 6
573
572
Actuator
23
Tracking control unit
24
Addition
24b
Reference track pitch
24a
Revolution control CKT
26
Linear speed modulation unit
26a
Revolution angle data
17
17a
Revolution angle sensor
Motor
Tracking modulation signal generator
564
10
Communication interface
578
Control signal input unit
System Control Unit
565
10a
Linear speed modulation signal generator
Random signal generator
Reference linear speed
Addition unit
Optical output modulation signal generator
Communication cable
537a
External secret key encoder
Primary secret key
External secret key encoder
Communication interface
579
578a
Keyboard

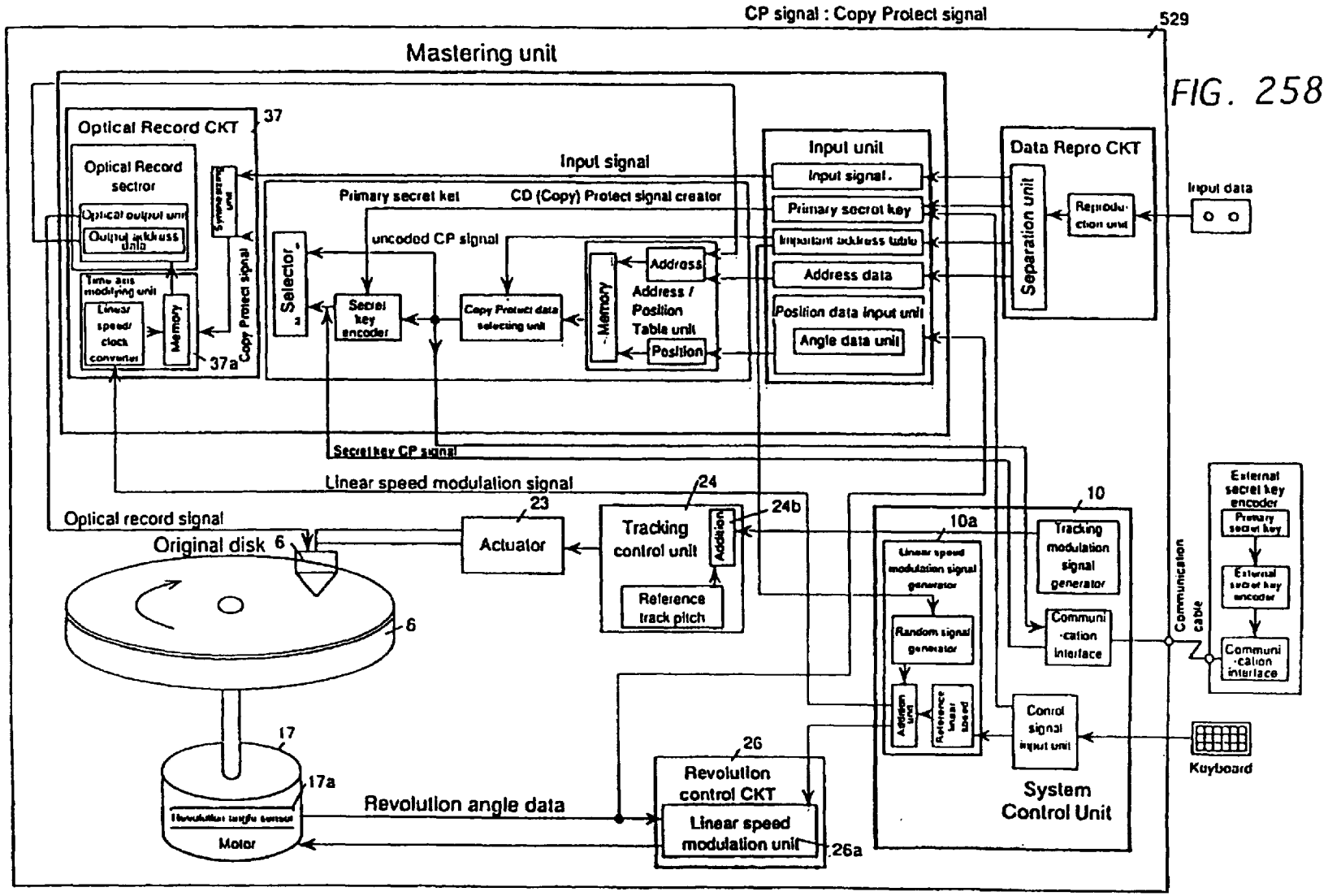
FIG. 258
529
CP signal : Copy Protect signal
Mastering unit
Input data
Data Repro CKT
Reproduction unit
Separation unit
Input unit
Input signal
Primary secret key
Address data
Position data input unit
Angle data unit
Input signal
CD (Copy) Protect signal creator
Address
Address / Position Table unit
Position
Memory
Copy Protect data selecting unit
uncoded CP signal
Secret key encoder
Selector
Primary secret key
Secret key CP signal
Linear speed modulation signal
Copy Protect signal
Synchronizing signal
Optical Record CKT
Optical Record sector
Optical output unit
Output unit
Memory
Time Axis modulating unit
Linear speed clock converter
37
37a
External secret key encoder
Primary secret key
External secret key encoder
Communication interface
Communication cable
Keyboard
10
Tracking modulation signal generator
Communication interface
Control signal input unit
System Control Unit
10a
Linear speed modulation signal generator
Random signal generator
Addition unit
Reference linear speed
24b
Addition
24
Tracking control unit
Reference track pitch
23
Actuator
26
Revolution control CKT
Linear speed modulation unit
26a
Revolution angle data
Optical record signal
Original disk 6
6
17
17a
Revolution angle sensor
Motor

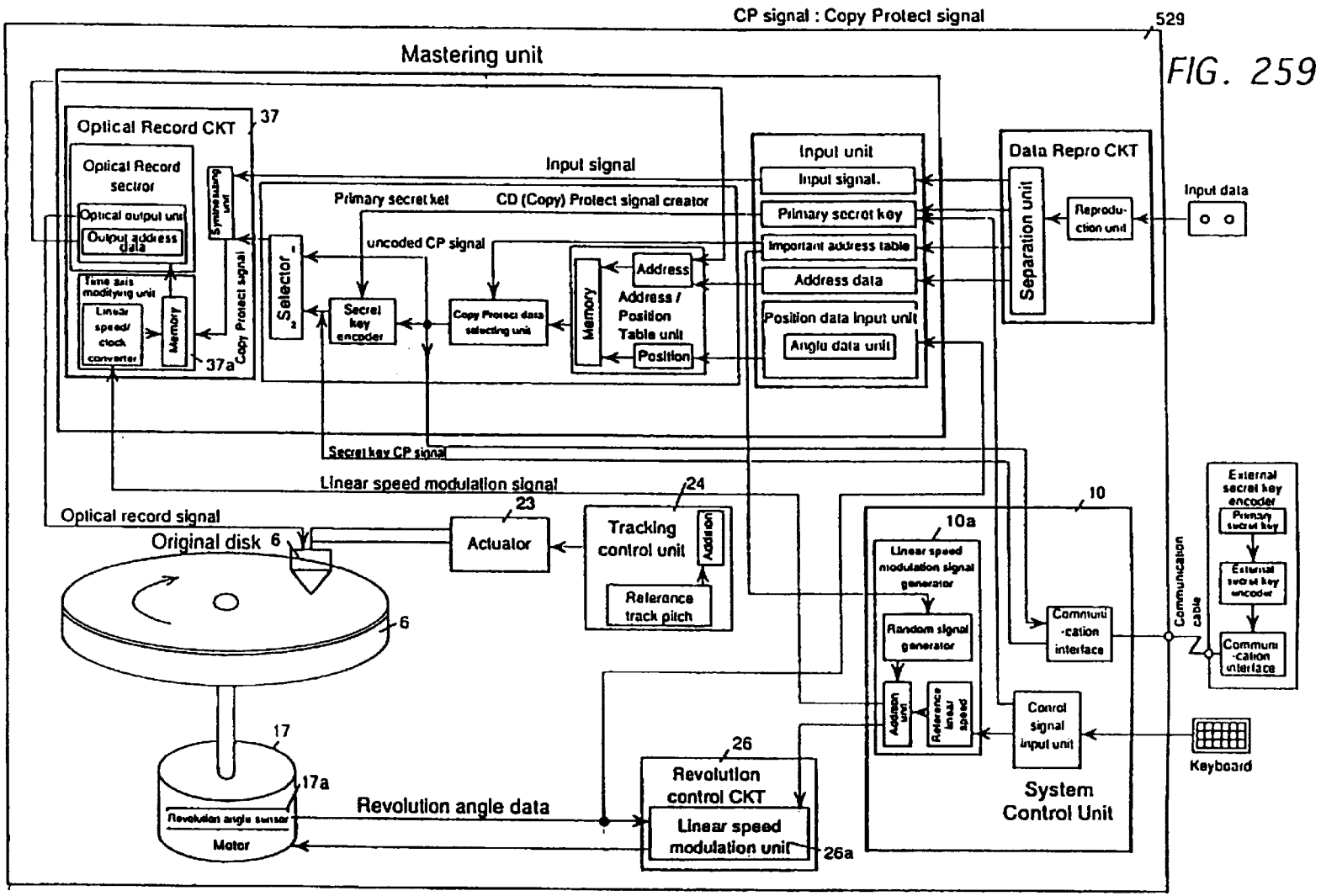
FIG. 259
529
CP signal : Copy Protect signal
Mastering unit
Input data
Data Repro CKT
Reproduction unit
Separation unit
Input unit
Input signal
Primary secret key
Important address table
Address data
Position data input unit
Angle data unit
Input signal
CD (Copy) Protect signal creator
Primary secret key
uncoded CP signal
Address
Address / Position Table unit
Position
Memory
Copy Protect data selecting unit
Secret key encoder
Selector
Secret key CP signal
Linear speed modulation signal
Optical Record CKT
37
Optical Record sector
Optical output unit
Output address data
Synchronizing unit
Copy Protect signal
37a
Memory
Time axis modifying unit
Linear speed clock converter
Optical record signal
Original disk
6
Actuator
23
Tracking control unit
24
Addition
Reference track pitch
Revolution angle data
17
17a
Revolution angle sensor
Motor
Revolution control CKT
26
Linear speed modulation unit
26a
10
System Control Unit
Communication interface
Control signal input unit
10a
Linear speed modulation signal generator
Random signal generator
Addition unit
Reference linear speed
External secret key encoder
Primary secret key
External secret key encoder
Communication interface
Communication cable
Keyboard

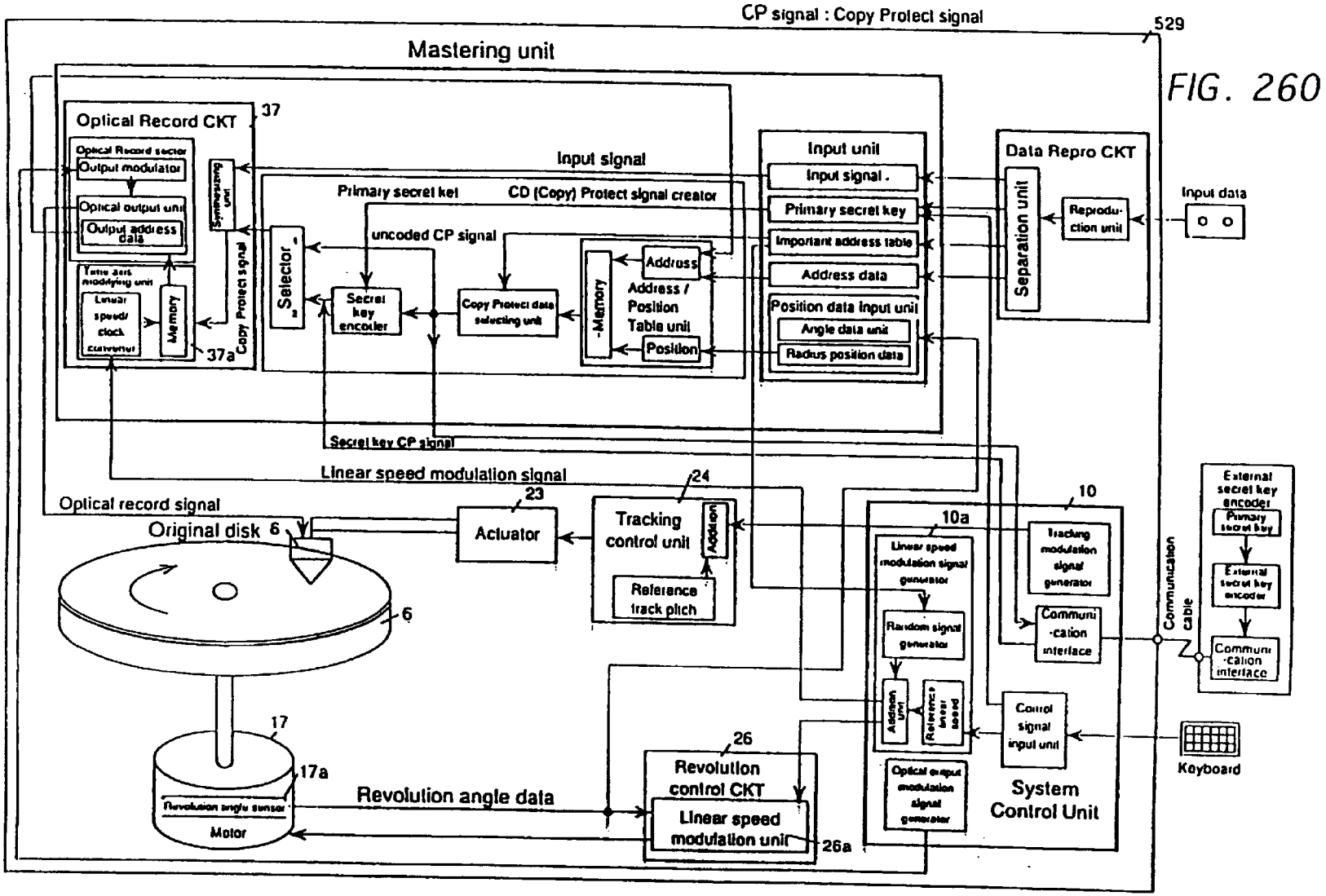
FIG. 260
CP signal : Copy Protect signal
529
Mastering unit
Input data
Data Repro CKT
Reproduction unit
Separation unit
Input unit
Input signal
Primary secret key
Important address table
Address data
Position data input unit
Angle data unit
Radius position data
Input signal
CD (Copy) Protect signal creator
Primary secret key
uncoded CP signal
Address
Address / Position Table unit
Position
Memory
Copy Protect data selecting unit
Secret key encoder
Selector
Secret key CP signal
Optical Record CKT
37
Optical Record sector
Output modulator
Optical output unit
Output address data
Synchronizing unit
Copy Protect signal
Memory
37a
Linear speed clock generator
Linear speed modulation signal
Optical record signal
Original disk 6
6
Actuator
23
Tracking control unit
24
Reference track pitch
Revolution angle data
Revolution control CKT
26
Linear speed modulation unit
26a
17
17a
Motor
Revolution angle sensor
Communication cable
External secret key encoder
Primary secret key
External secret key encoder
Communication interface
Keyboard
10
System Control Unit
Tracking modulation signal generator
Communication interface
Control signal input unit
10a
Linear speed modulation signal generator
Random signal generator
Reference linear speed
Addition unit
Optical output modulation signal generator Original signal
562a
t Record timing signal after correction
562b
T
T+ΔT
T
t Laser output
t t
560a
560b
Pit shape
T
T+ΔT 581a 581b
Slice level
Reproduced waveform
581c
t
562c Digital reproduced signal after correction
T
T
t 562d
Digital reproduced signal without correction
T
T-ΔT'
t

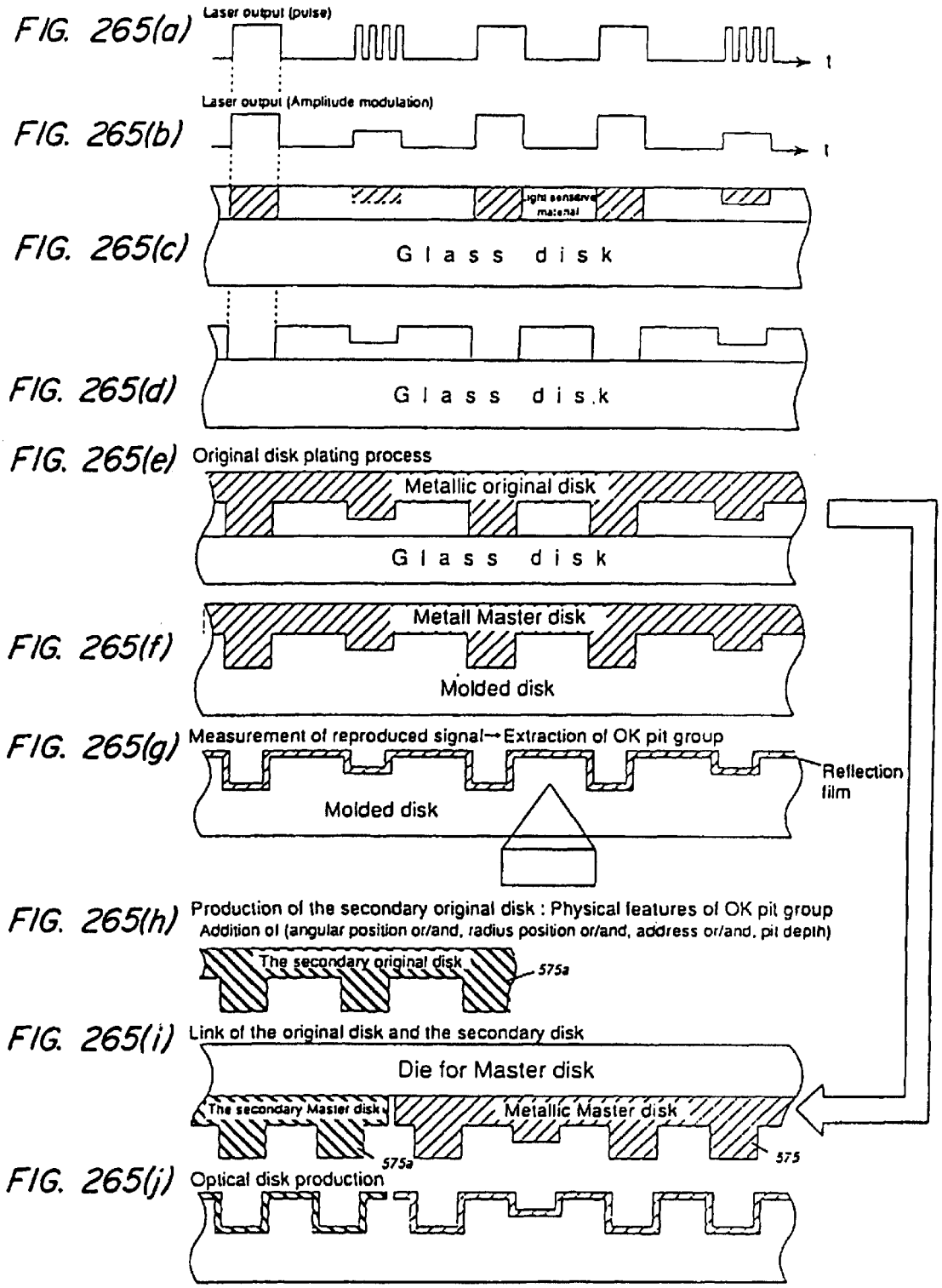
FIG. 265(a)
Laser output (pulse)
t
FIG. 265(b)
Laser output (Amplitude modulation)
t
FIG. 265(c)
Glass disk
FIG. 265(d)
Glass disk
FIG. 265(e)
Original disk plating process
Metallic original disk
Glass disk
FIG. 265(f)
Metall Master disk
Molded disk
FIG. 265(g)
Measurement of reproduced signal→Extraction of OK pit group
Reflection film
Molded disk
FIG. 265(h)
Production of the secondary original disk : Physical features of OK pit group
Addition of (angular position or/and, radius position or/and, address or/and, pit depth)
The secondary original disk
575a
FIG. 265(i)
Link of the original disk and the secondary disk
Die for Master disk
The secondary Master disk
Metallic Master disk
575a
575
FIG. 265(j)
Optical disk production

MEDIUM, APPARATUS, AND METHOD RELATED TO ENCRYPTION RESULTANT INFORMATION

Matter enclosed in heavy brackets [ ] appears in the original patent but forms no part of this reissue specification; matter printed in italics indicates the additions made by reissue.

CROSS-REFERENCES TO RELATED APPLICATIONS

This application is a Continuation of application Ser. No. 09/796,534 filed Mar. 2, 2001, now U.S. Pat. No. 6,674,703 which is a Division of application Ser. No. 09/305,318 filed May 5, 1999, now U.S. Pat. No. 6,243,330, which is a Division of application Ser. No. 08/970,162 filed Nov. 13, 1997, now U.S. Pat. No. 5,959,948, which is a Continuation of application Ser. No. 08/534,771 filed Sep. 27, 1995, now U.S. Pat. No. 5,699,331, which is a Division of application Ser. No. 08/281,337 filed Jul. 27, 1994, now U.S. Pat. No. 5,473,584, which is a Continuation-In-Part of application Ser. No. 08/184,117 filed Jan. 21, 1994, now U.S. Pat. No. 5,526,328, which is a Continuation-In-Part of application Ser. No. 08/009,709 filed Jan. 27, 1993, now U.S. Pat. No. 5,682,360.

*Notice: more than one reissue application has been filed for the reissue of U.S. Pat. No. 6,859,427. The reissue applications are the present divisional reissue application Ser. No. 11/304,674 filed on Dec. 16, 2005, and the parent reissue application Ser. No. 11/272,484 filed Nov. 14, 2005.*

BACKGROUND OF THE INVENTION

1. Field of the Invention

This invention relates to an apparatus for recording and reproducing information on and from a recording medium.

2. Description of the Prior Art

Japanese published unexamined patent applications 56-163536, 57-6446, 57-212642, and 60-70543 disclose a recording medium having both a magnetic recording portion and an optical recording portion.

Japanese published unexamined patent application 2-179951 discloses a recording medium which has an optical recording portion and a magnetic recording portion at opposite sides thereof respectively. Japanese patent application 2-179951 also discloses an apparatus which includes an optical head facing the optical recording portion of the recording medium for reading out information from the optical recording portion a magnetic head facing the magnetic recording portion of the recording medium for recording and reproducing information into and from the magnetic recording portion, and a mechanism for moving at least one of the optical head and the magnetic head in according with rotation of the recording medium. In the apparatus of Japanese patent application 2-179951, during the processing of the information read out from the magnetic recording portion, a decision is made as to whether or not the information recorded on the optical recording portion is necessary, and a step of reading out the information from the optical recording portion is executed when the information on the optical recording portion is decided to be necessary.

SUMMARY OF THE INVENTION

It is an object of this invention to provide an improved recording and reproducing apparatus.

A first aspect of this invention provides a recording and reproducing apparatus for use with a disk-shaped recording medium which includes a transparent substrate and an optical recording layer formed on the transparent substrate, the apparatus comprising a light source for emitting light; an optical head for applying the light to the optical recording layer from the light source via the transparent substrate, for focusing the light on the optical recording layer, and for reproducing information from the optical recording layer; a position detecting means for detecting at least one of a pit depth and a physical position of information which has a first given relation with a specified address and which is recorded on the recording medium, and for generating first positional information representing at least said one of the pit depth and the physical position; a reproducing means for reproducing a previously-recorded secret code from the recording medium, the secret code representing second positional information, and for decoding the secret code into the second positional information, the second positional information representing at least one of a predetermined reference pit depth and a predetermined reference physical position; a collating means for collating the first positional information and the second positional information, and for checking whether or not the first positional information and the second positional information are in a second given relation; and a stopping means for, in cases where the first positional information and the second positional information are not in the second given relation, stopping at least one of outputting of a reproduced signal of the recording medium, operation of a program stored in the recording medium, and decoding of the secret code.

A second aspect of this invention provides a recording and reproducing apparatus for use with a disk-shaped recording medium which includes a transparent substrate, and an optical recording layer and a magnetic recording layer formed on the transparent substrate, the apparatus comprising a light source for emitting light; an optical head for applying the light to the optical recording layer from the light source via the transparent substrate, for focusing the light on the optical recording layer, and for reproducing information from the optical recording layer; a magnetic head for recording a signal on the magnetic recording layer or reproducing a signal from the magnetic recording layer; a position detecting means for detecting a position of an address information recorded on the recording medium, and for generating first positional information representing said detected position of the address information; a reproducing means for reproducing a previously-recorded secret code from the recording medium, the secret code representing second positional information, and for decoding the secret code into the second positional information, the second positional information representing a predetermined reference position; a collating means for collating the first positional information and the second positional information, and for checking whether or not the first positional information and the second positional information are in a given relation; and a stopping means for, in cases where the first positional information and the second positional information are not in the given relation, stopping at least one of outputting of a reproduced signal of the recording medium, operation, and decoding of the secret code.

BRIEF DESCRIPTION THE DRAWINGS

FIGS. 6(a)–6(g) are a timing chart of magnetic recording in the first embodiment.

Figure 7:
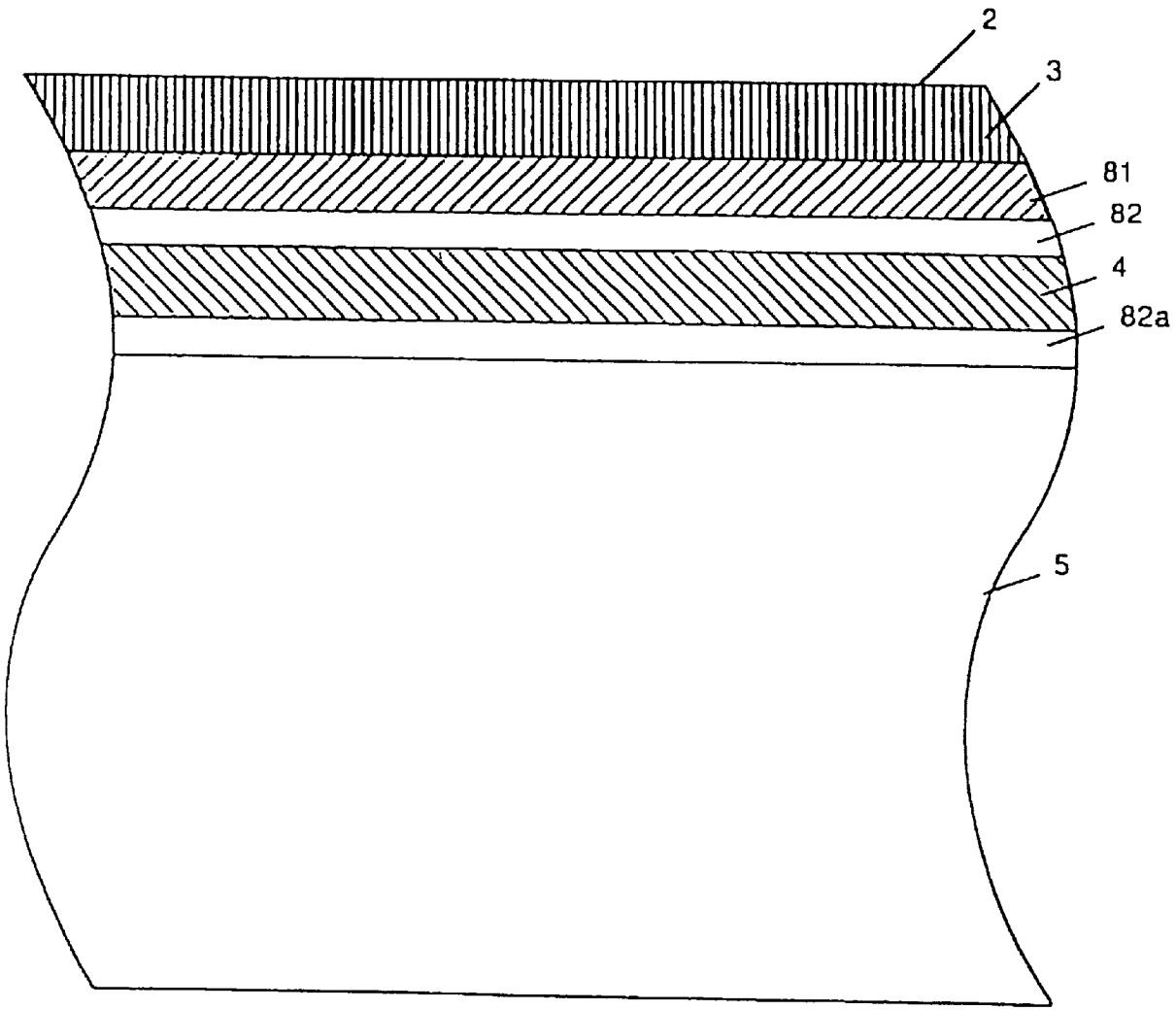

FIG. 7 is a sectional view of a recording medium in the first embodiment.

Figure 8:
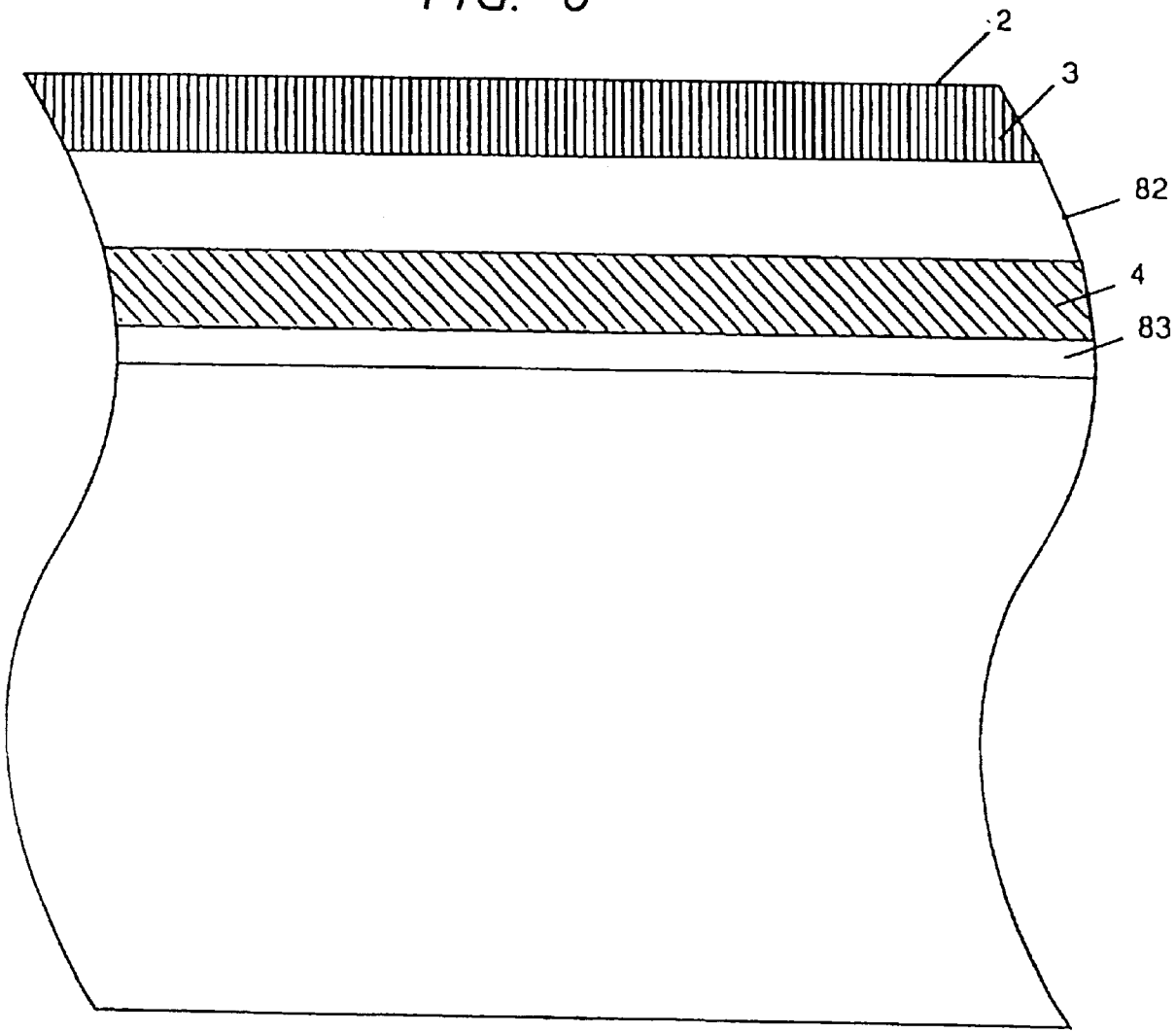

FIG. 8 is a sectional view of a recording medium in the first embodiment.

Figure 9:
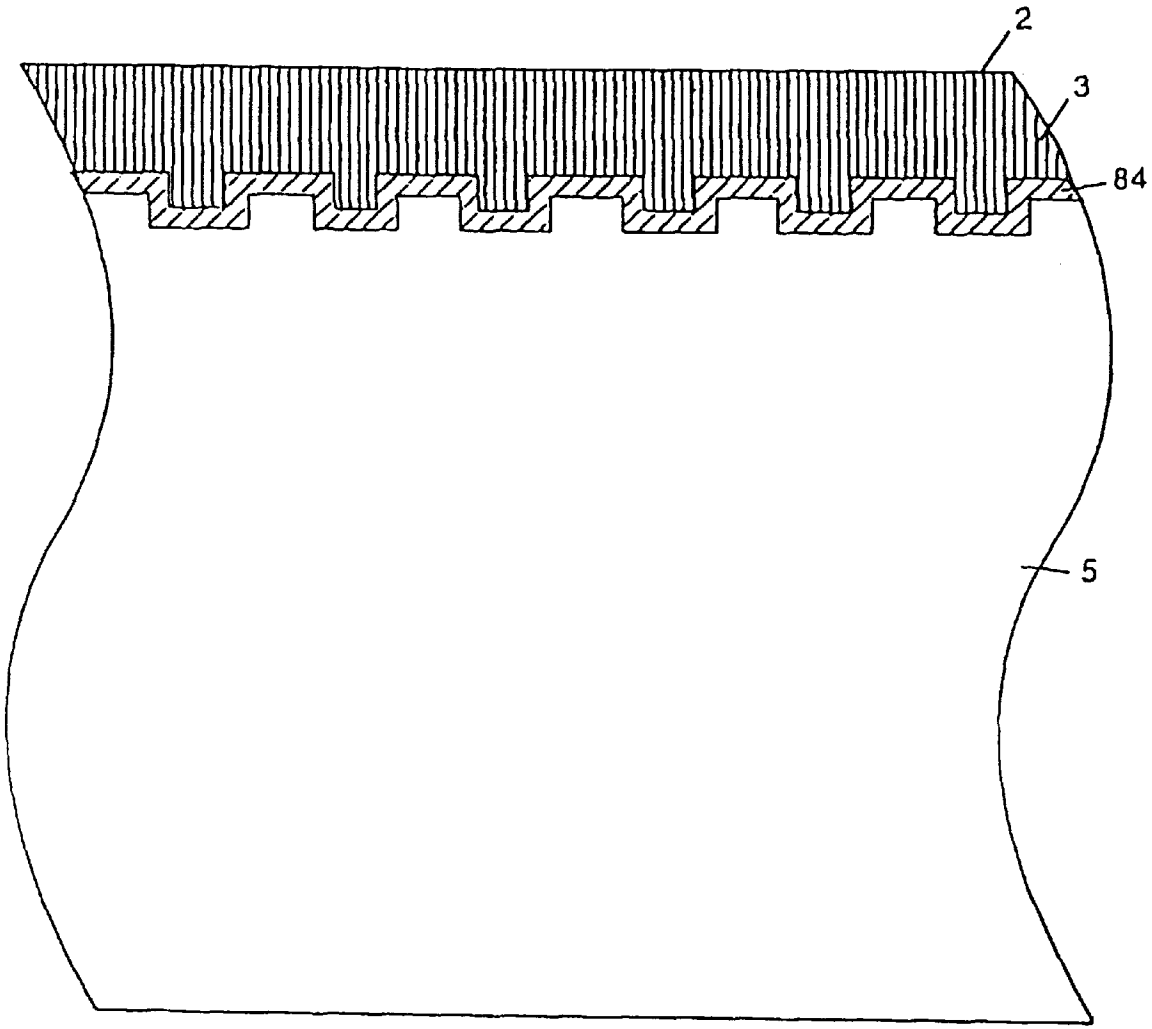

FIG. 9 is a sectional view of a recording medium in the first embodiment.

Figure 10:
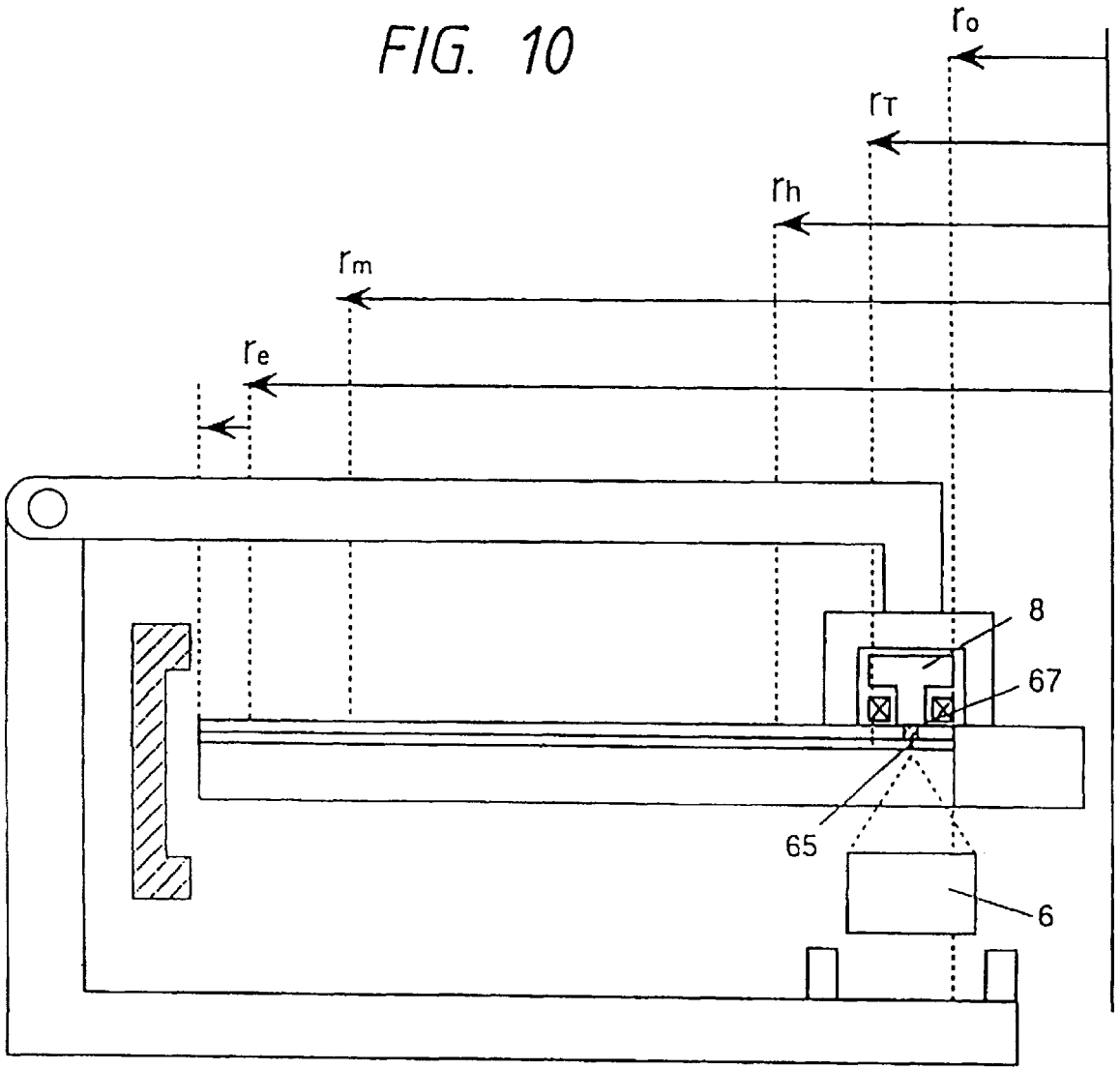

FIG. 10 is a sectional view of a recording portion in the first embodiment.

Figure 11:
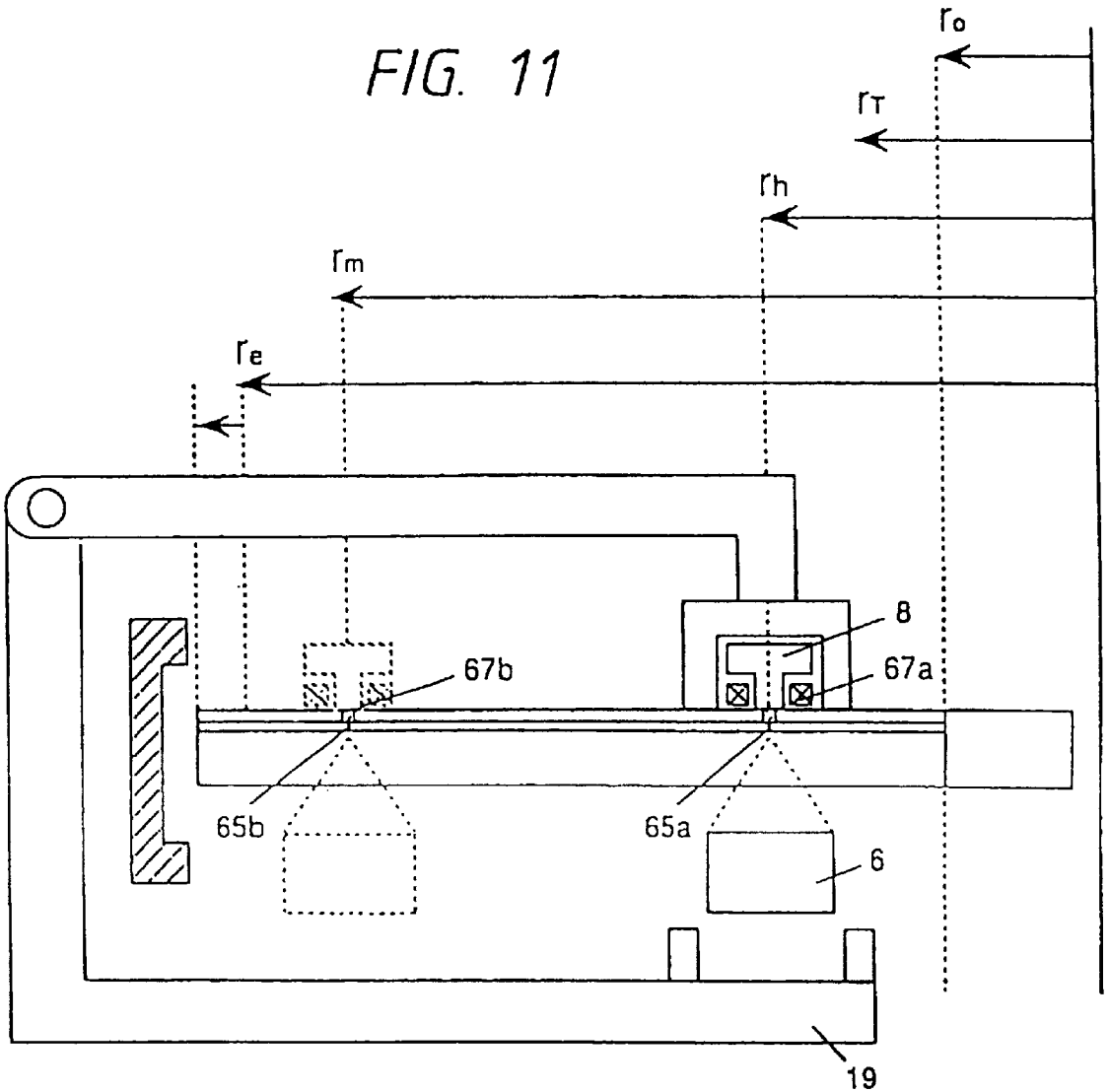

FIG. 11 is a sectional view of a recording portion in the first embodiment.

Figure 12:
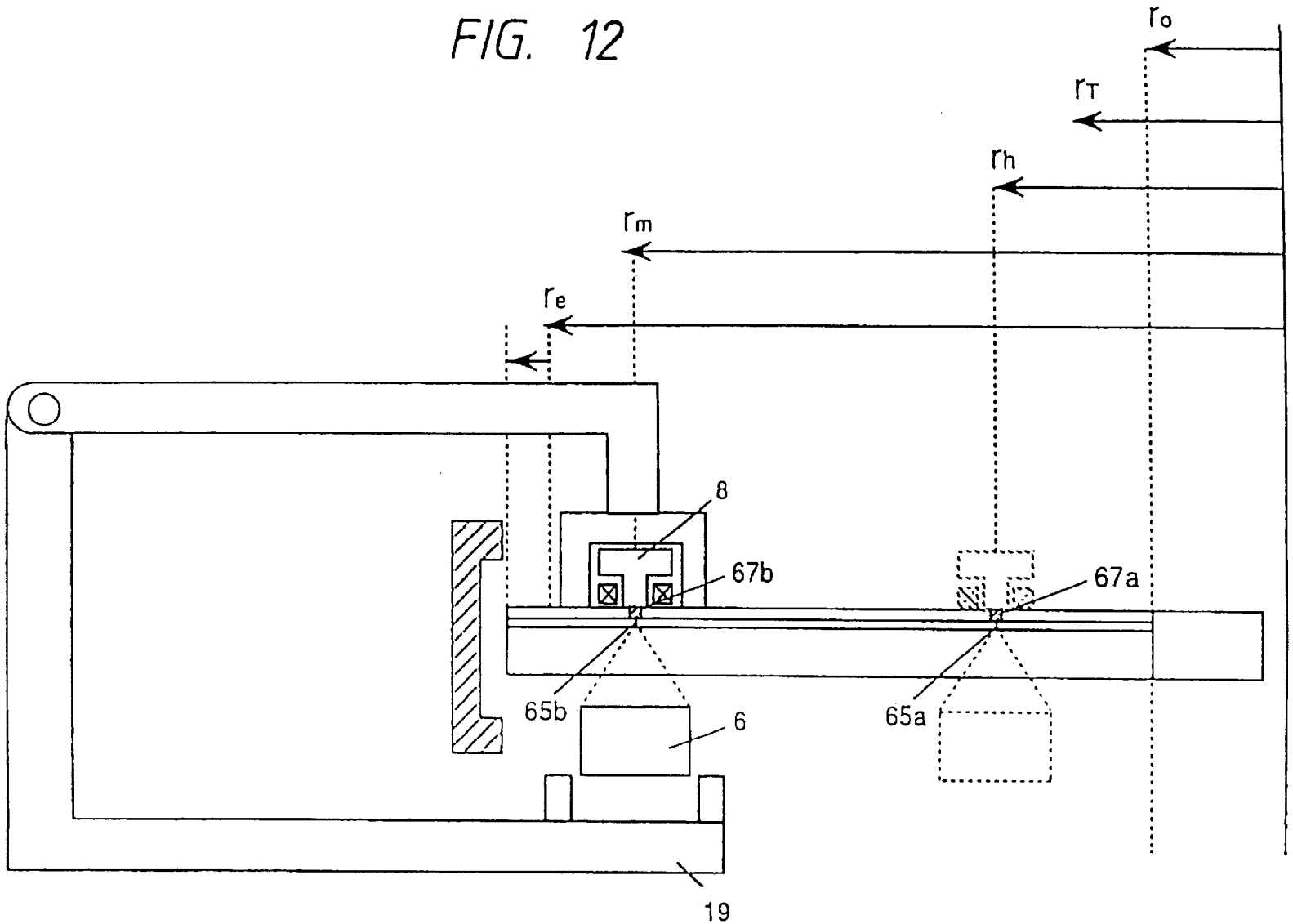

FIG. 12 is a sectional view of a recording portion in the first embodiment.

Figure 13:
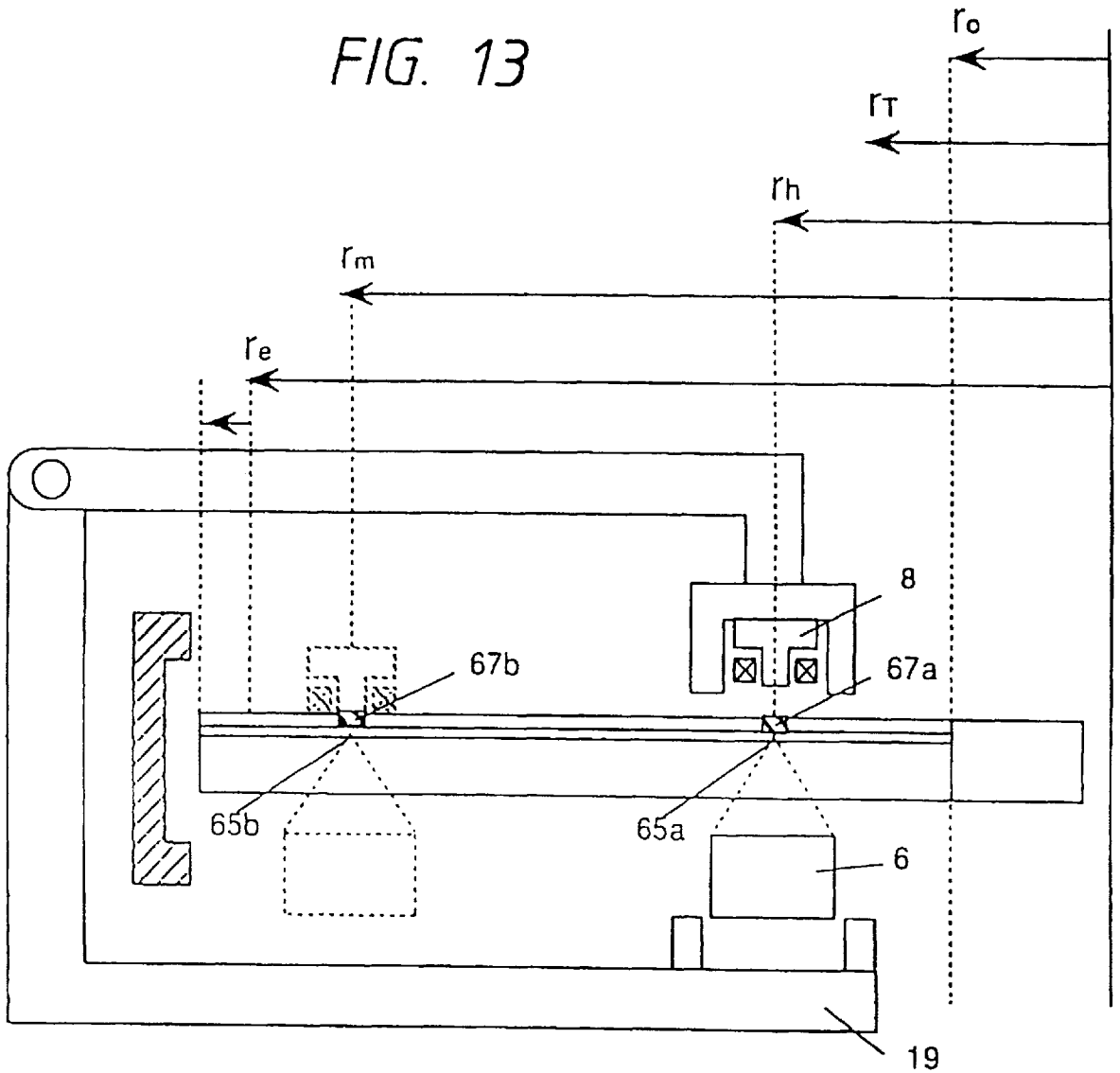

FIG. 13 is a sectional view of a recording portion in the first embodiment.

Figure 14:
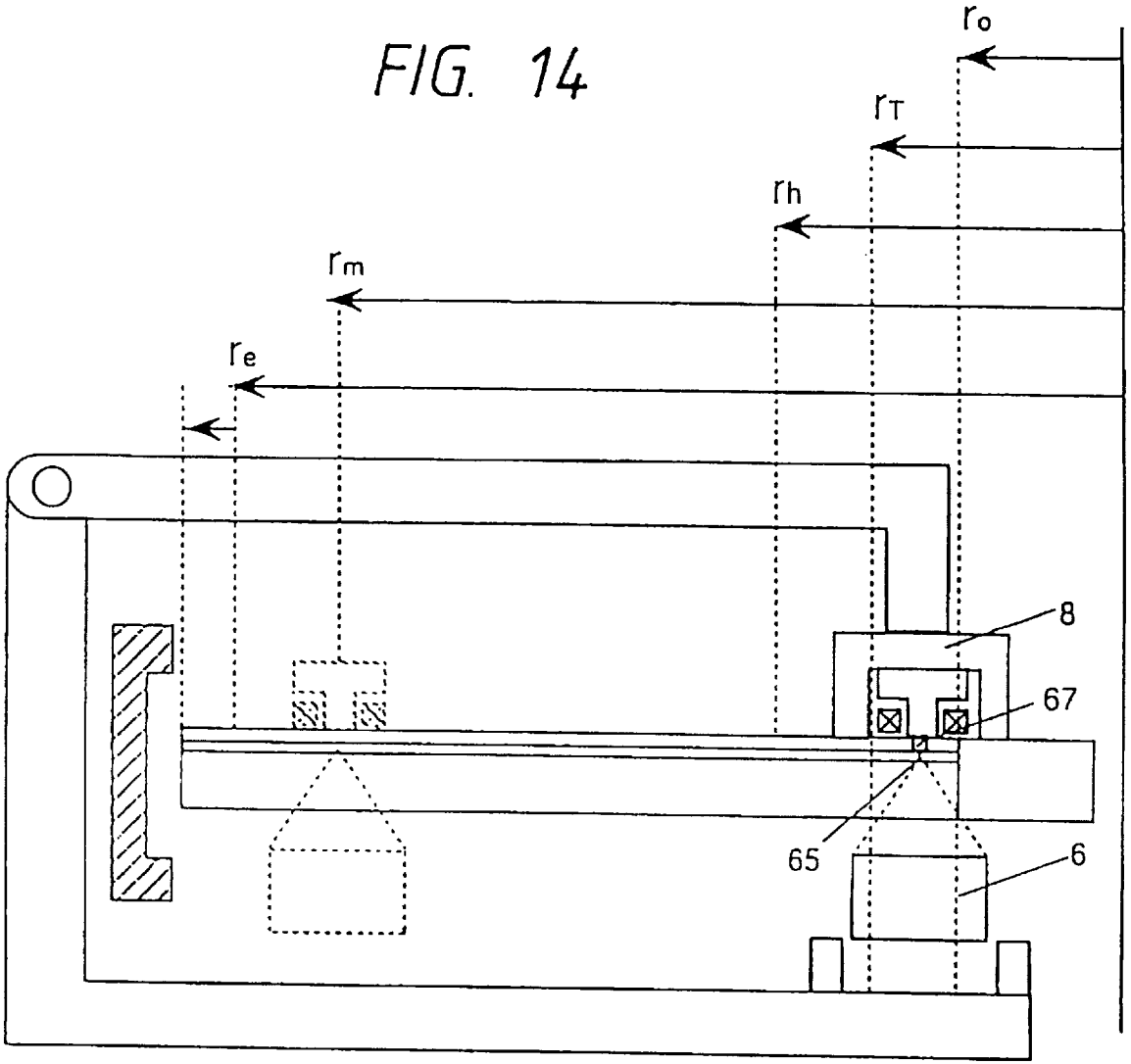

FIG. 14 is a sectional view of a recording portion in the first embodiment.

Figure 15:
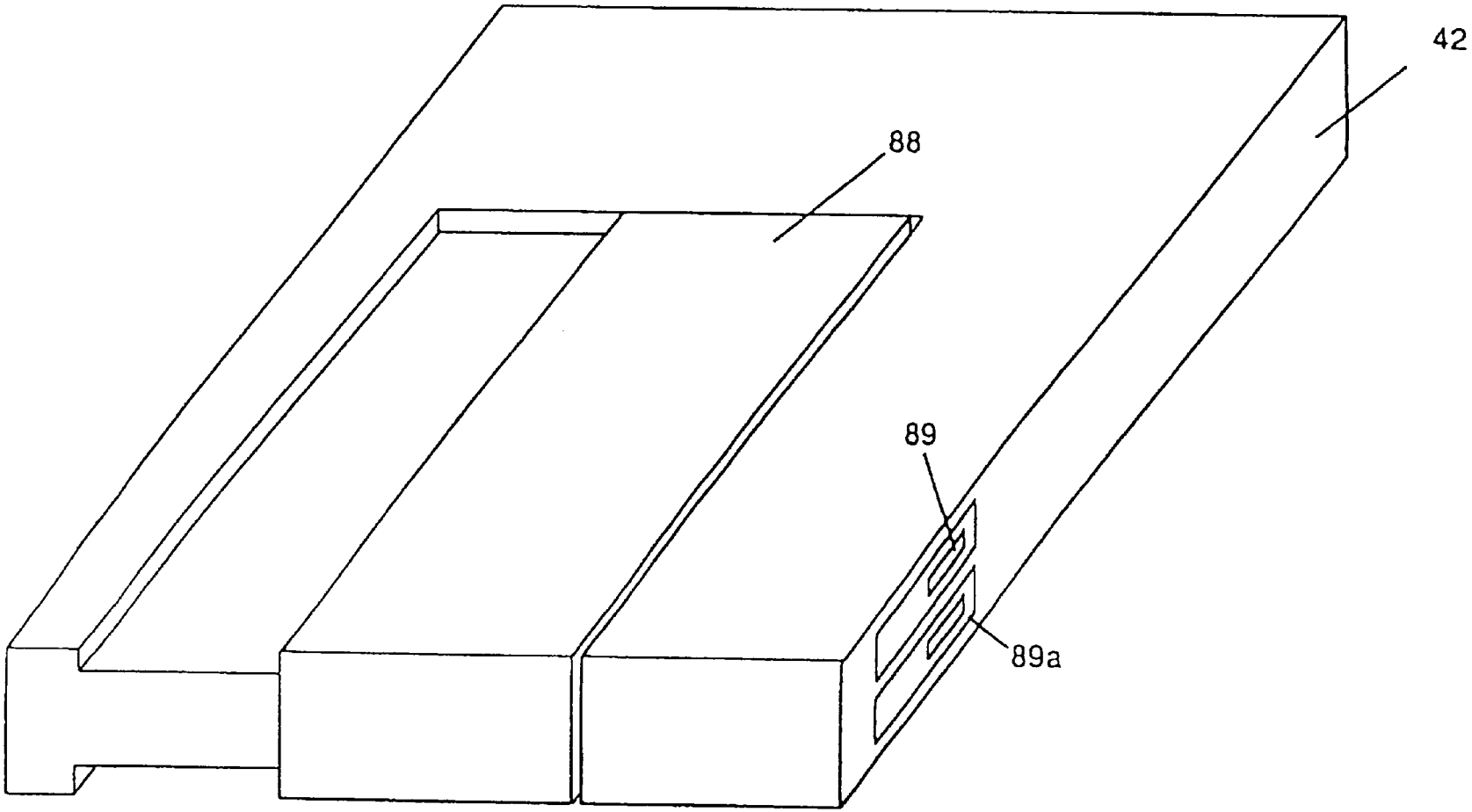

FIG. 15 is a perspective view of a cassette in the first embodiment.

Figure 16:
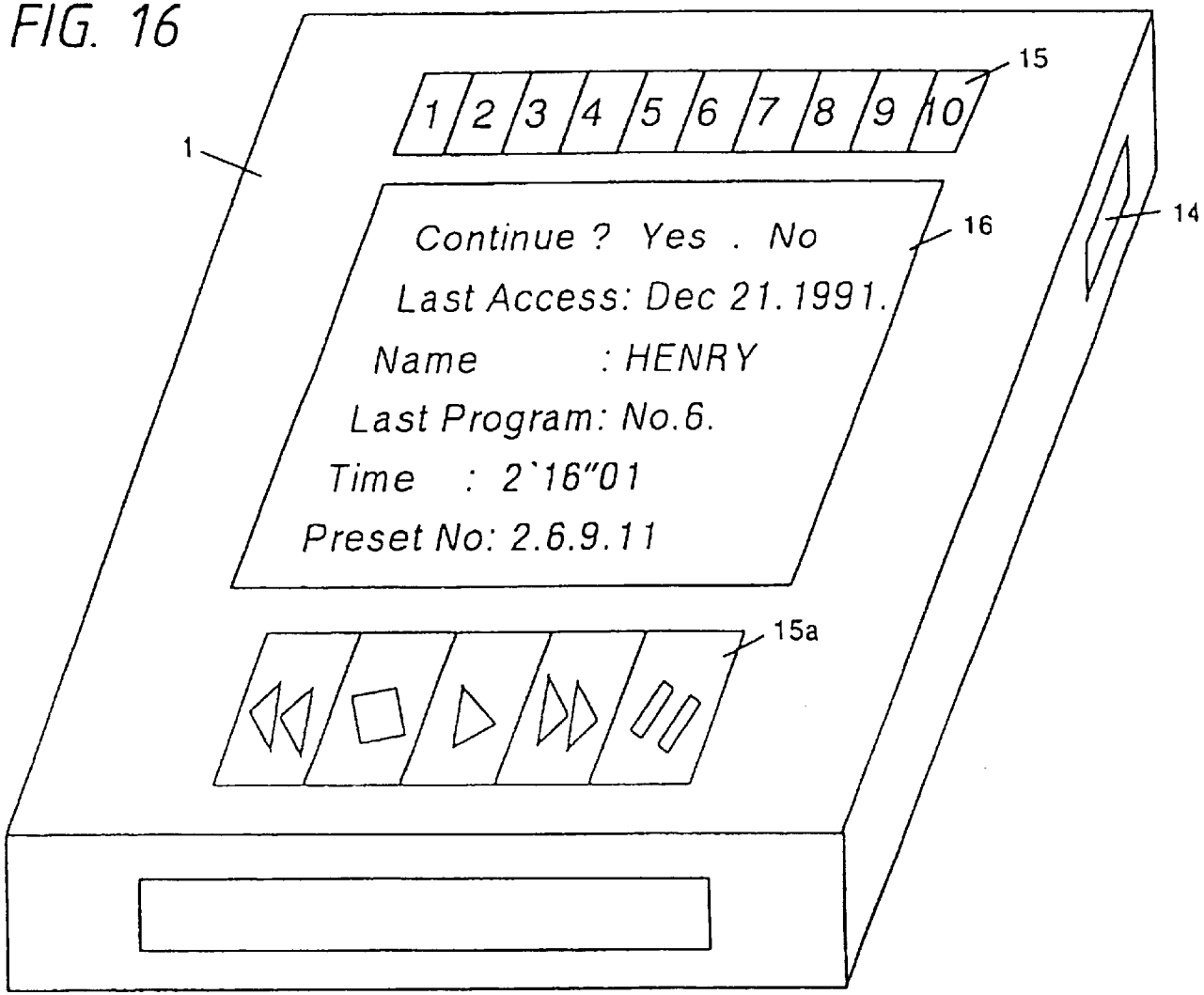

FIG. 16 is a perspective view of a recording and reproducing apparatus in the first embodiment.

Figure 17:
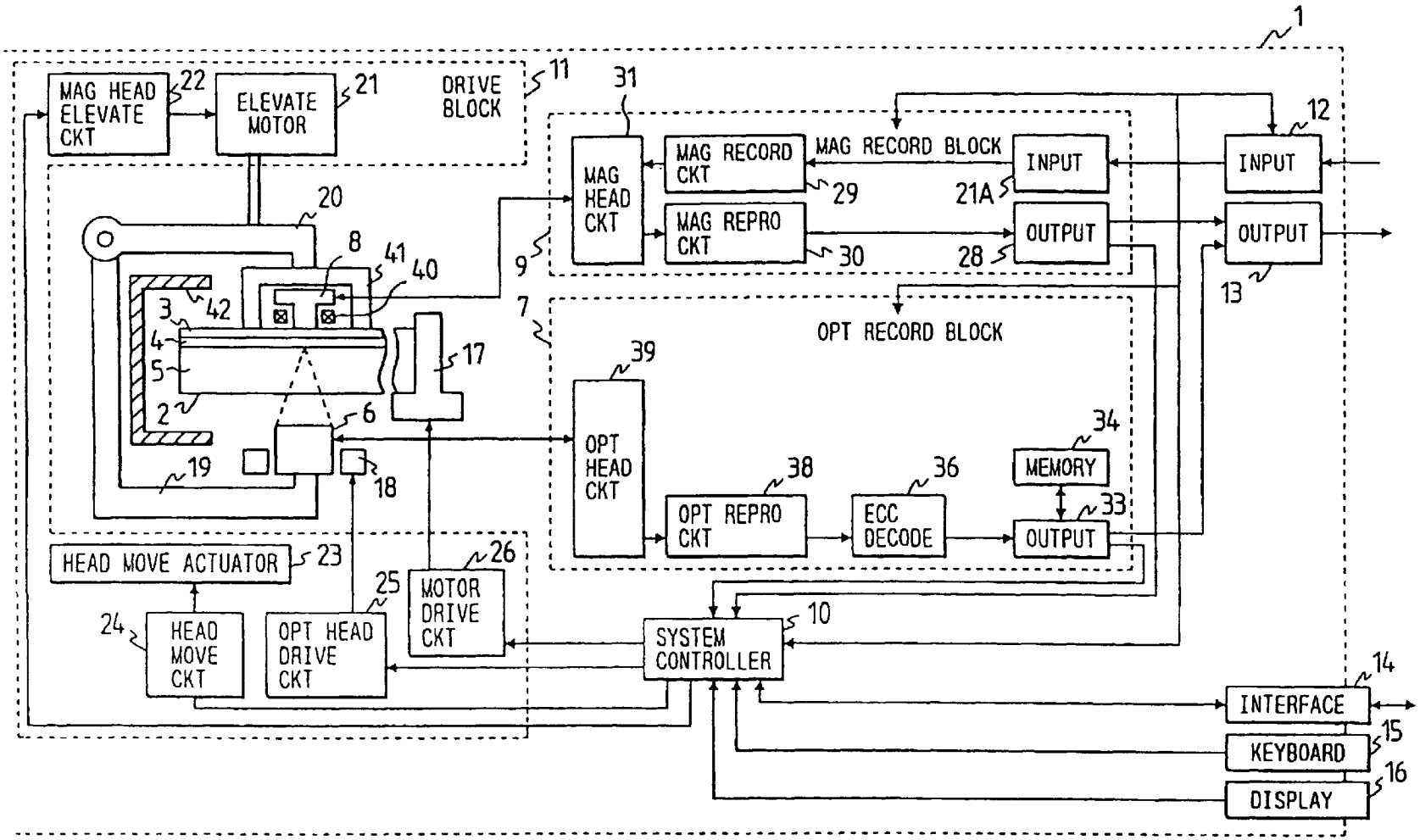

FIG. 17 is a block diagram of a recording and reproducing apparatus according to the first embodiment.

Figure 18:
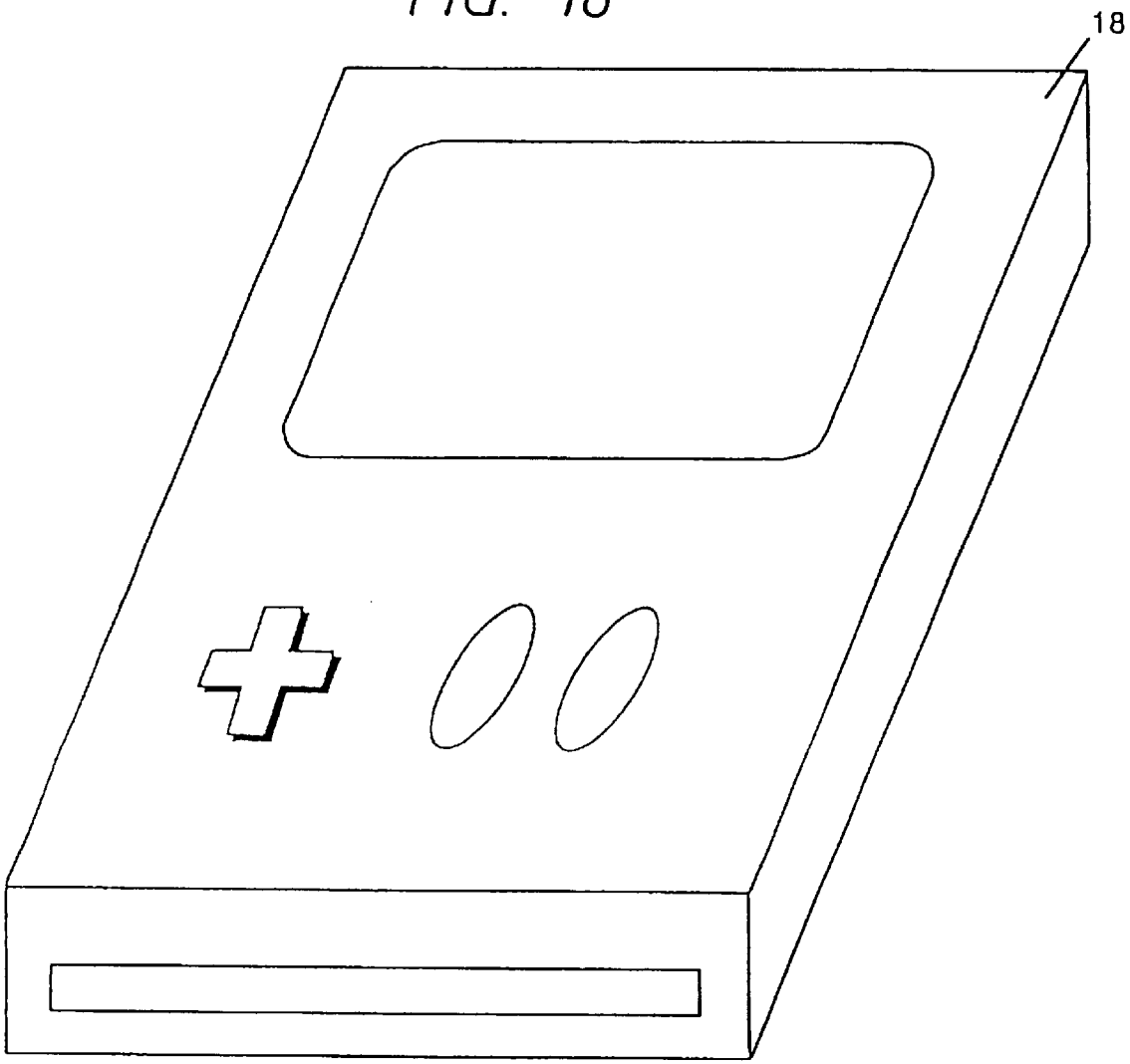

FIG. 18 is a perspective view of a game machine in the first embodiment.

Figure 19:
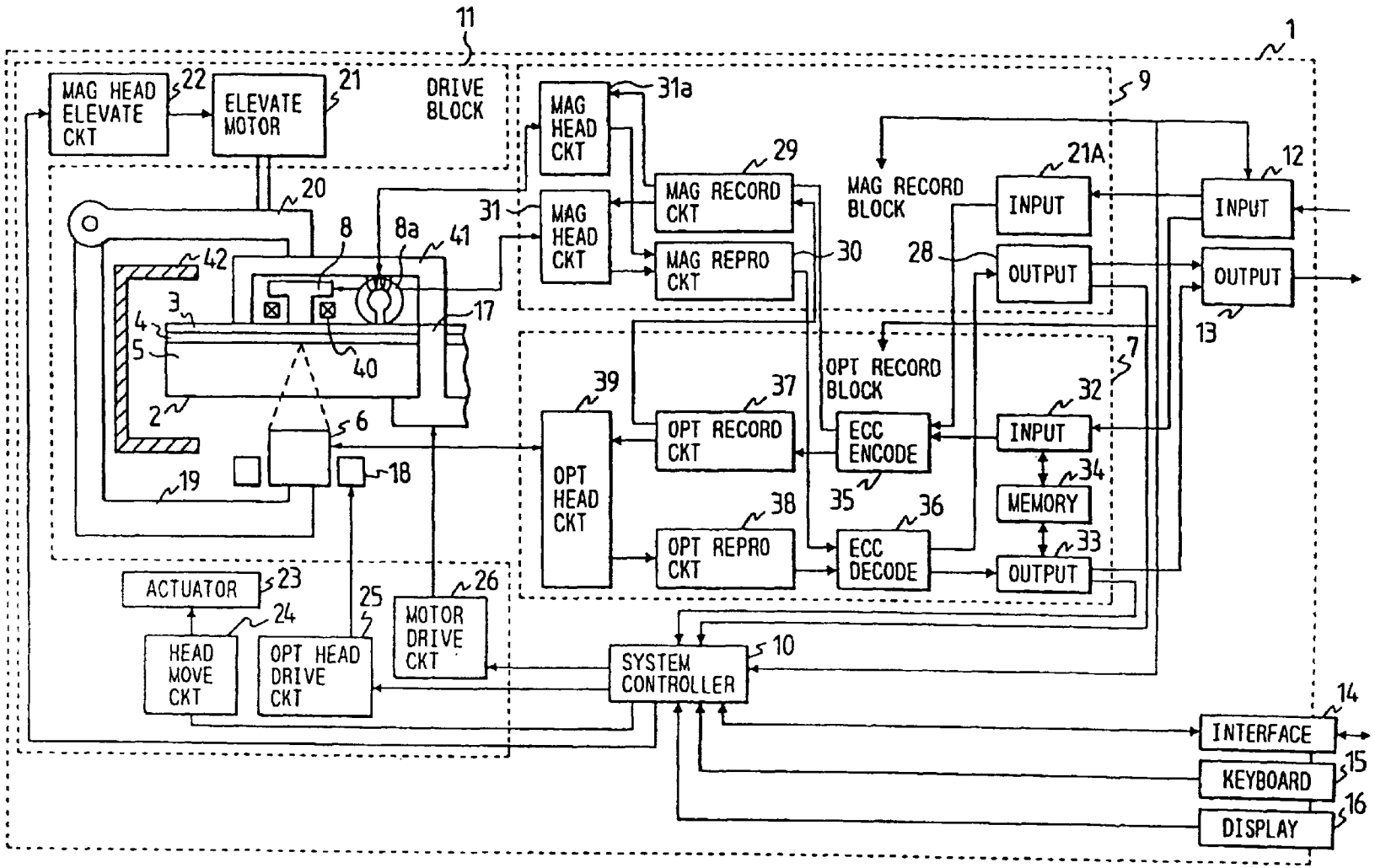

FIG. 19 is a block diagram of a recording and reproducing apparatus according to a second embodiment of this invention.

Figure 20:
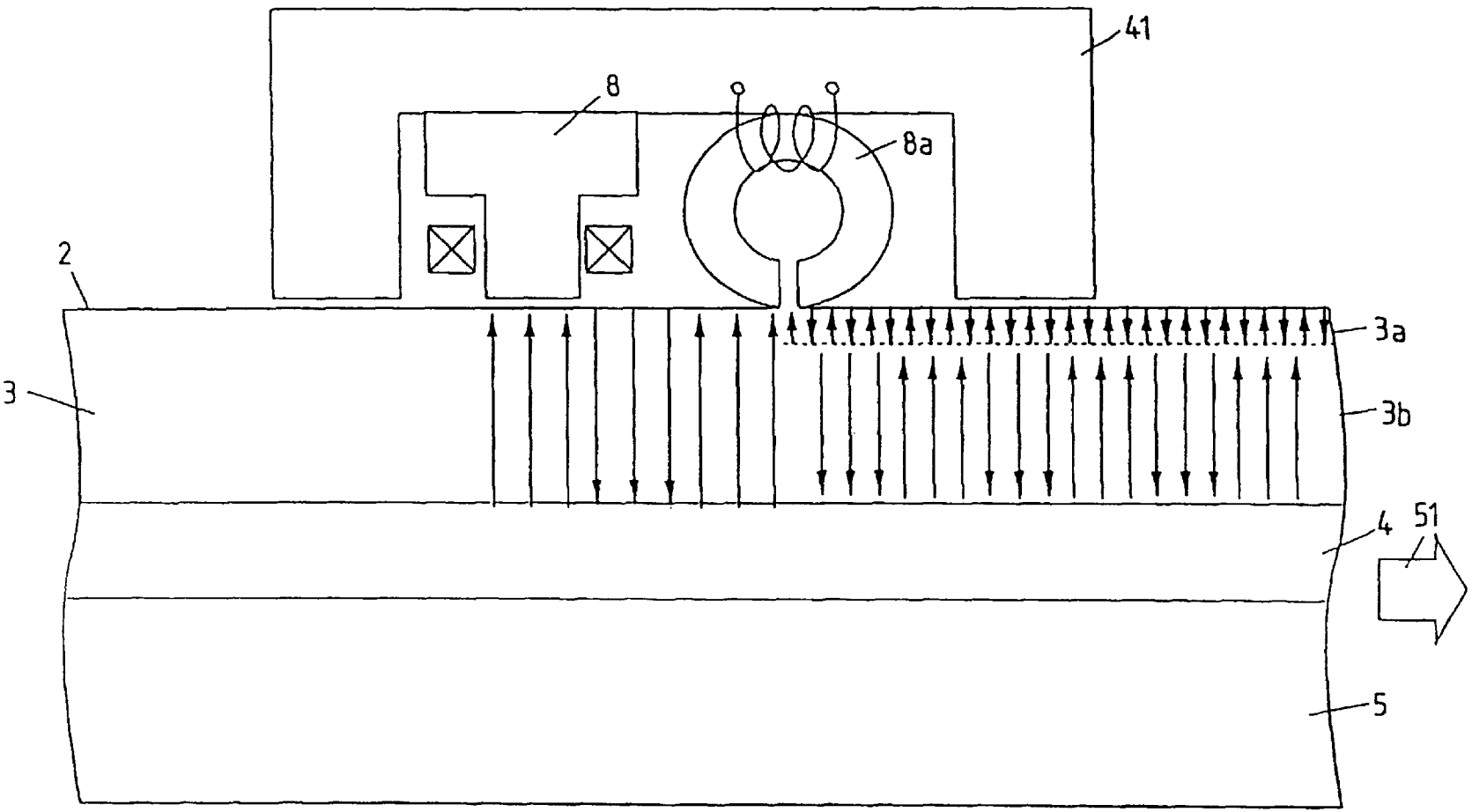

FIG. 20 is an enlarged view of a magnetic head portion in the second embodiment.

Figure 21:
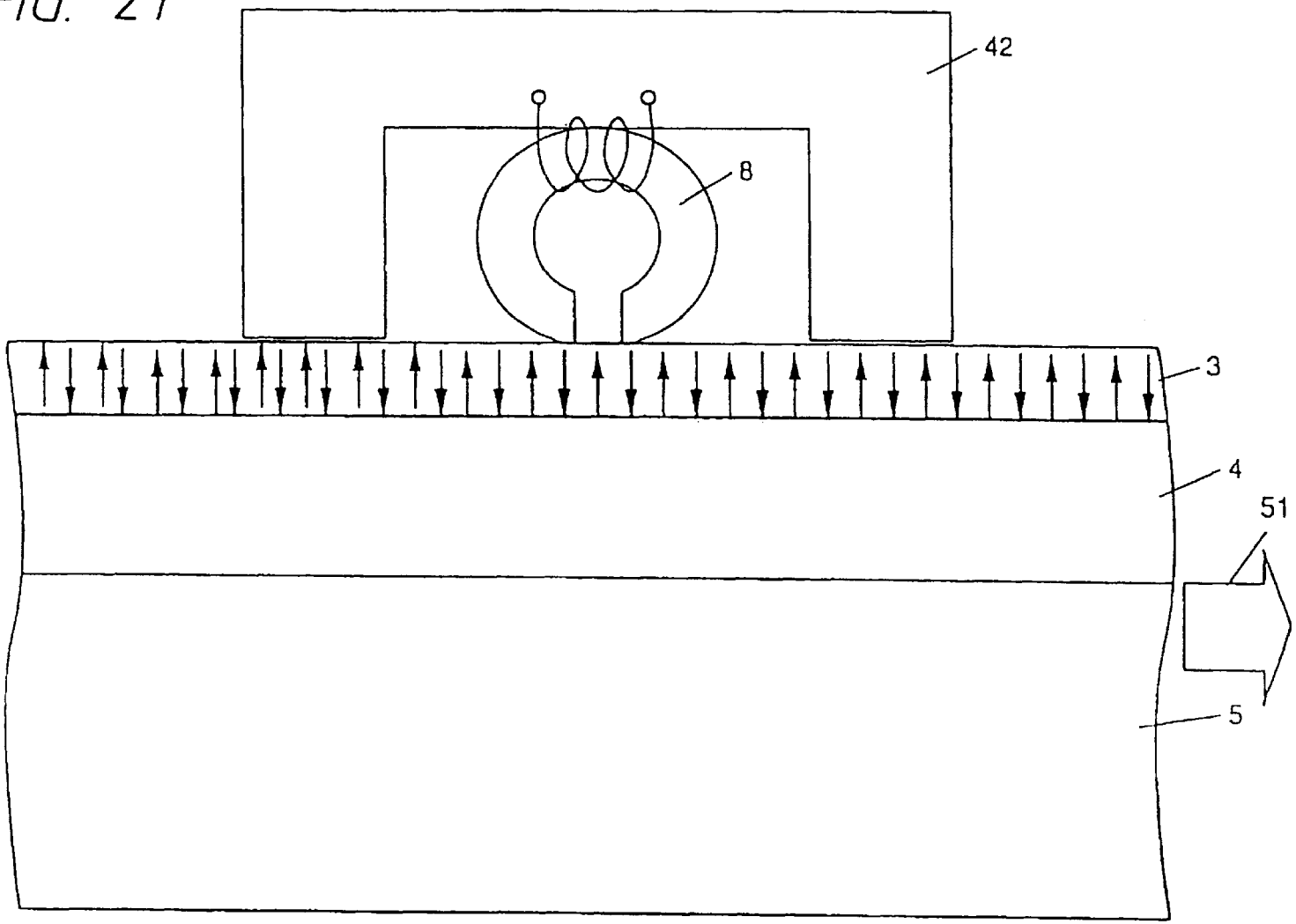

FIG. 21 is an enlarged view of a magnetic head portion in the second embodiment.

Figure 22:
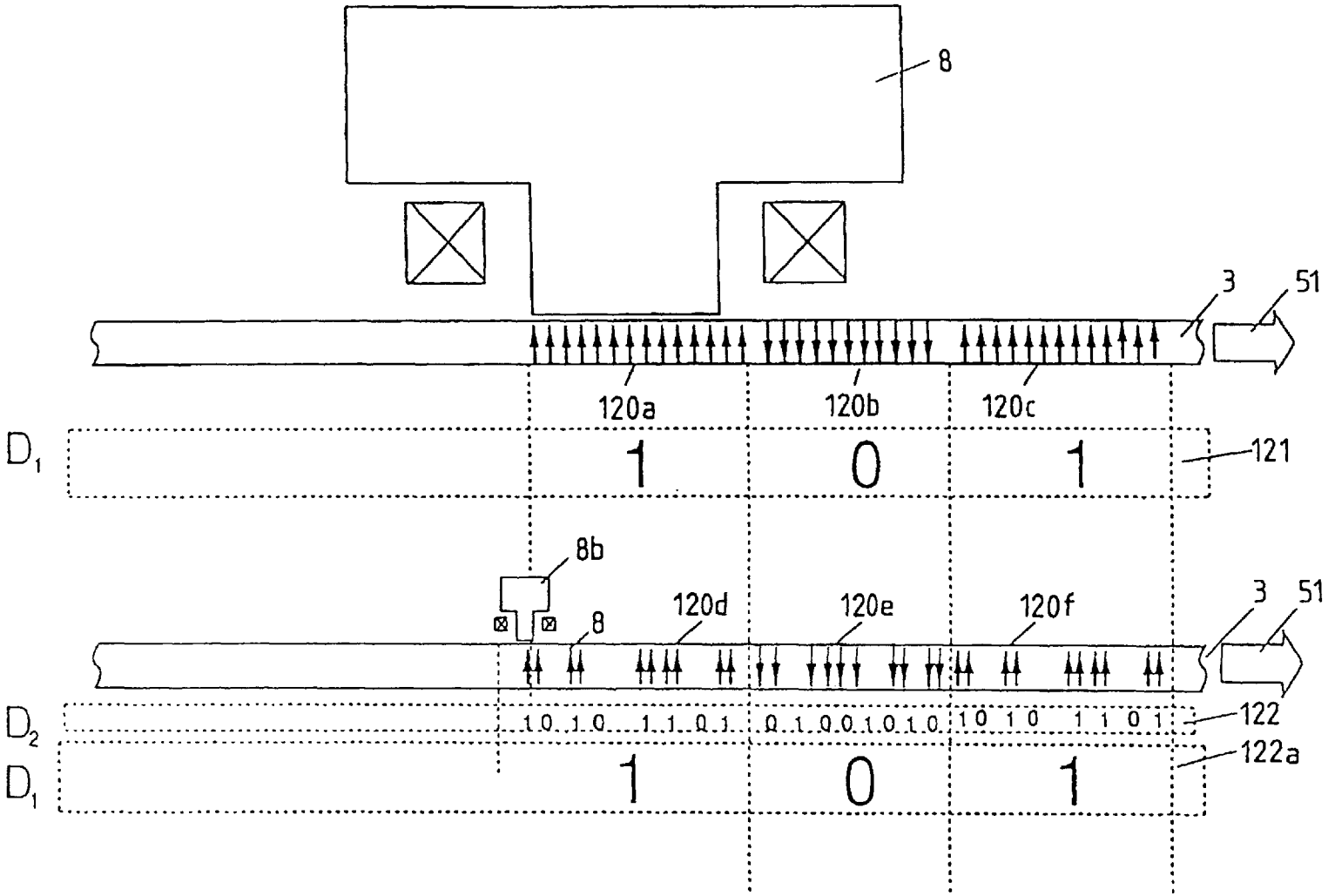

FIG. 22 is an enlarged view of a magnetic head portion in the second embodiment.

Figure 23:
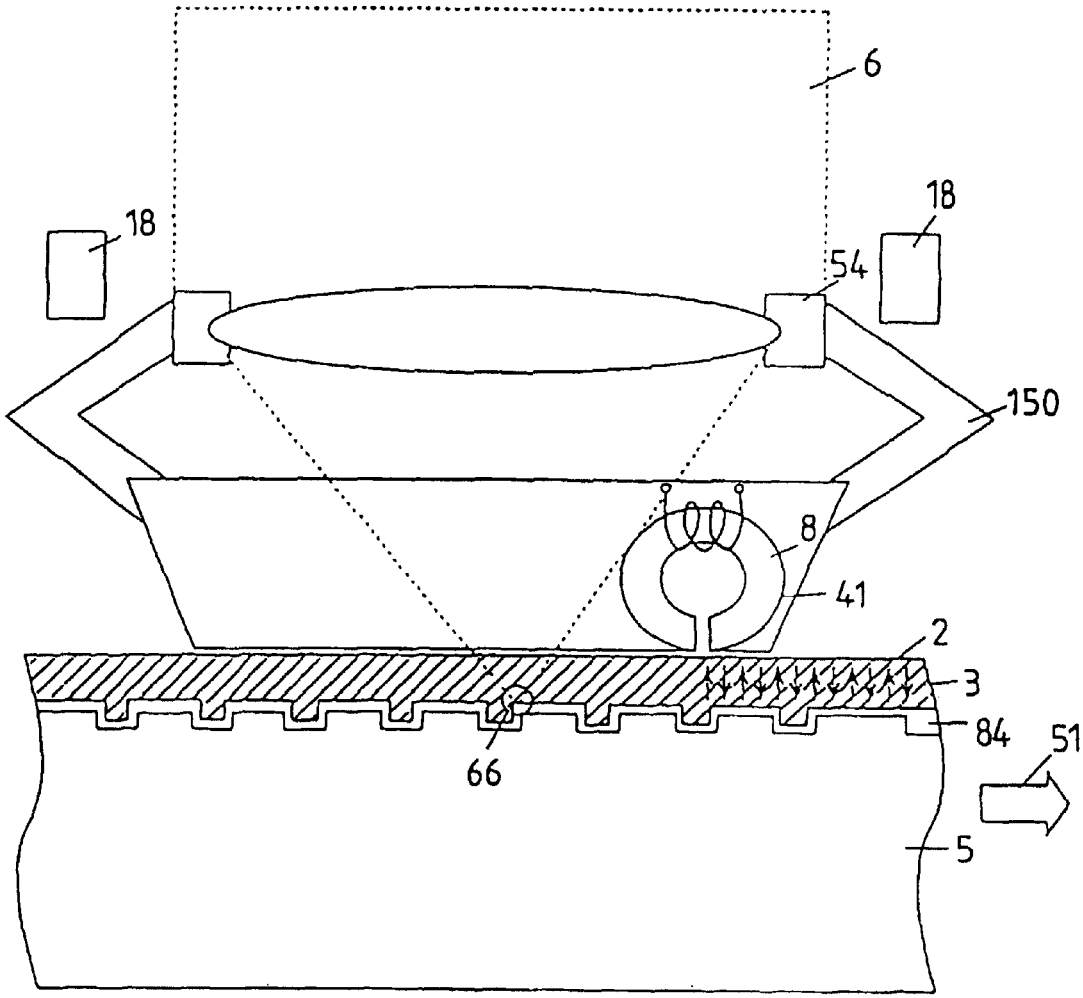

FIG. 23 is an enlarged view of a recording portion in a third embodiment of this invention.

Figure 24:
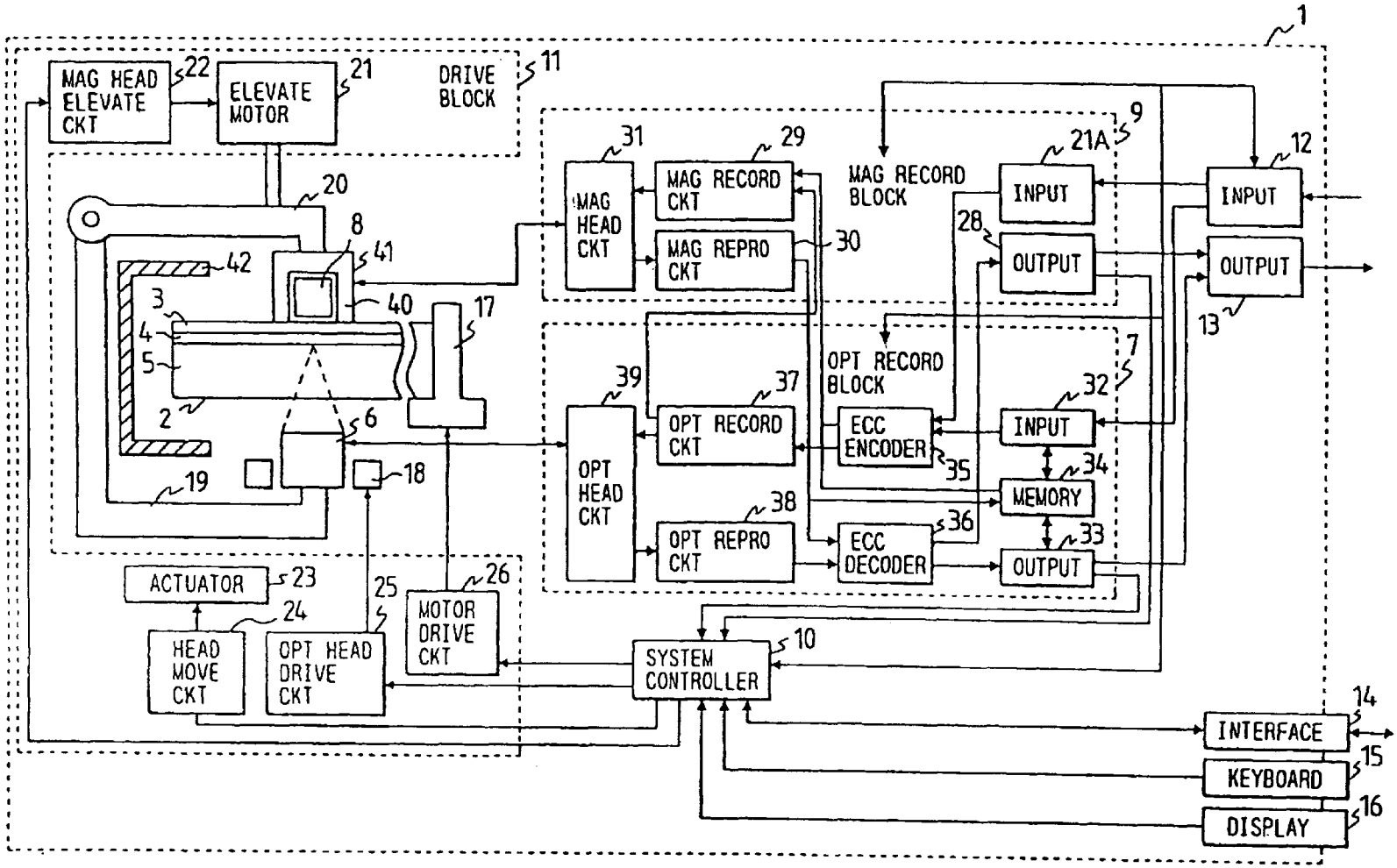

FIG. 24 is a block diagram of a recording and reproducing apparatus according to a fourth embodiment of this invention.

Figure 25:
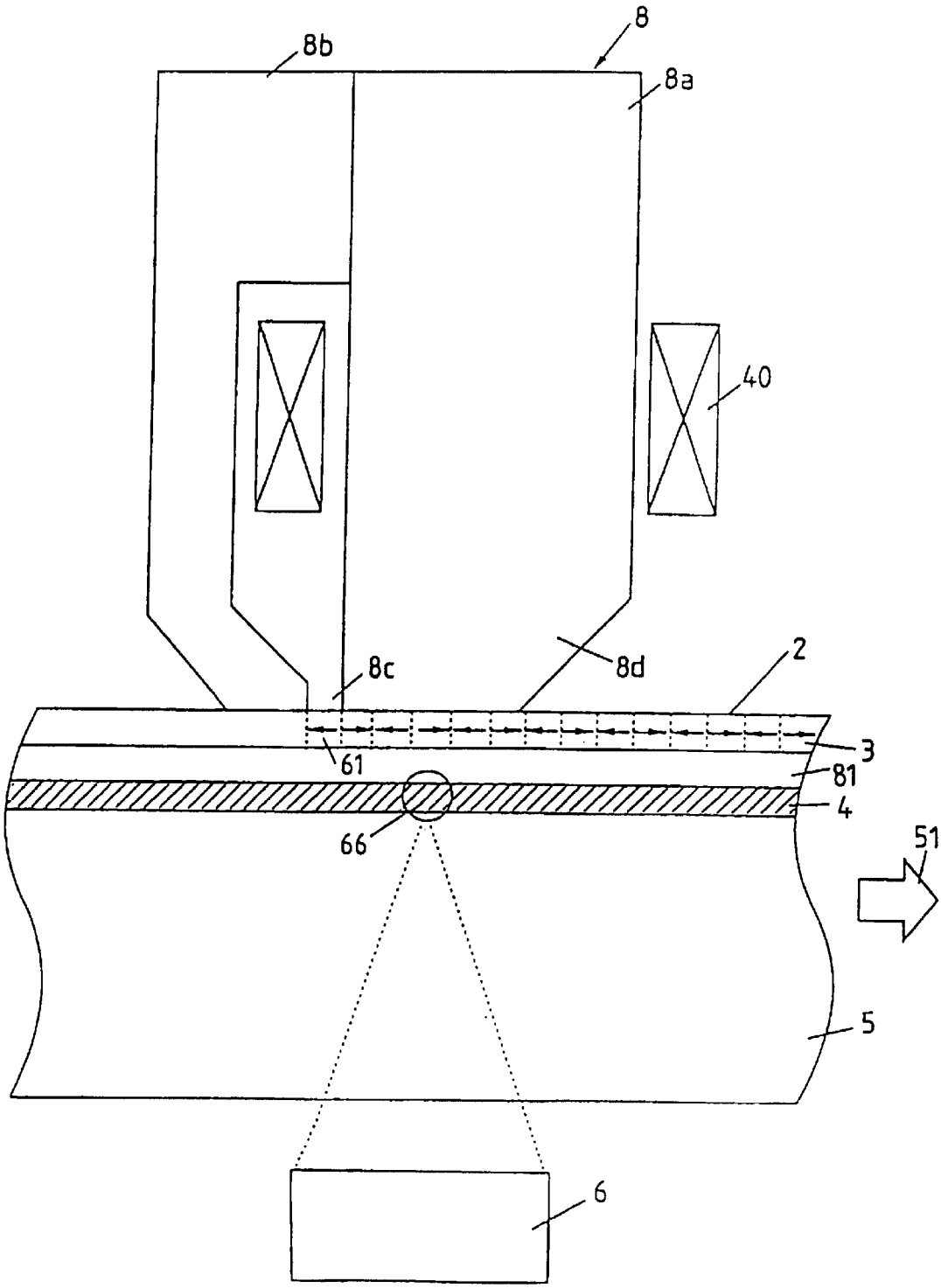

FIG. 25 is an enlarged view of a magnetic recording portion in the fourth embodiment.

Figure 26:
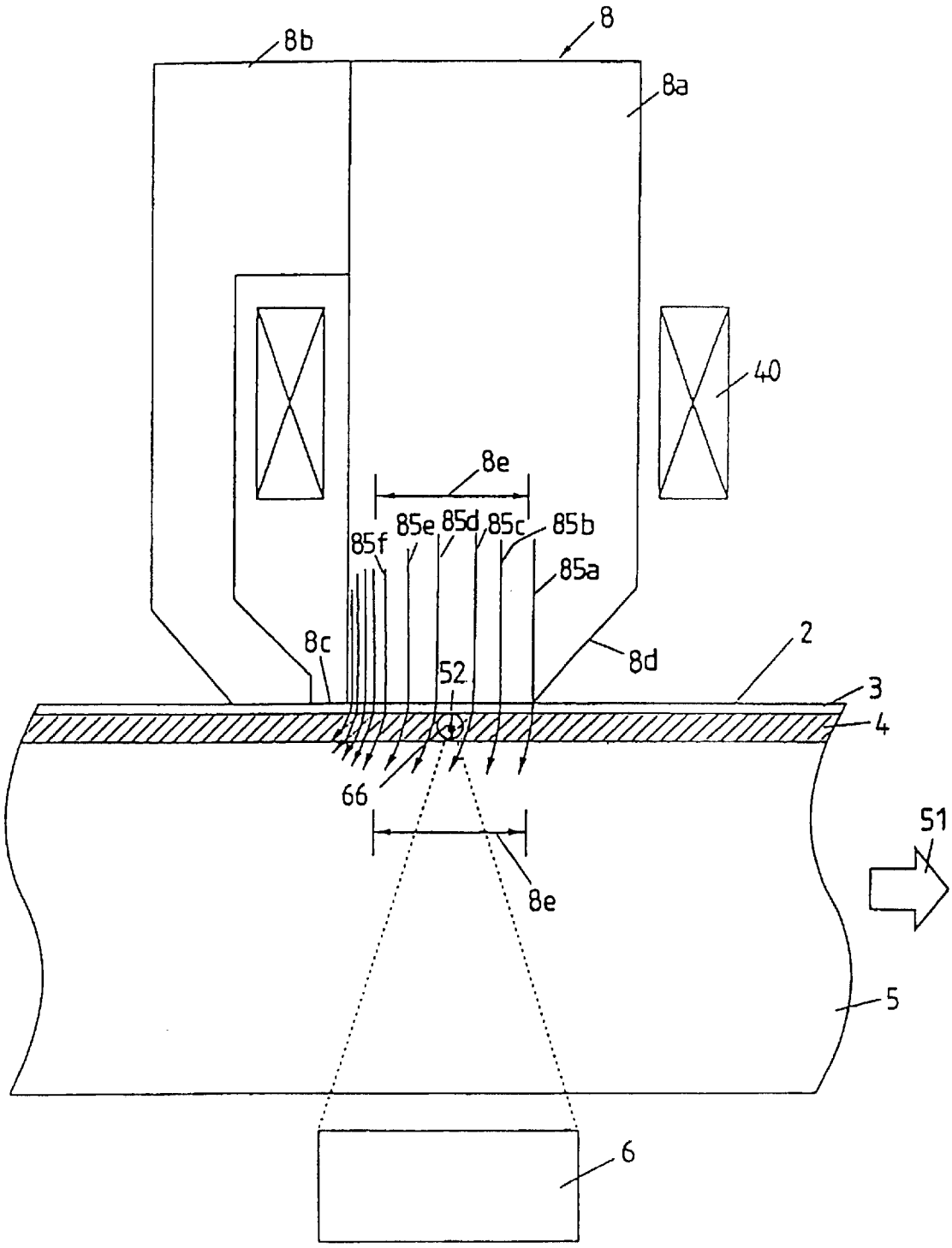

FIG. 26 is an enlarged view of a magneto-optical recording portion in the fourth embodiment.

Figure 27:
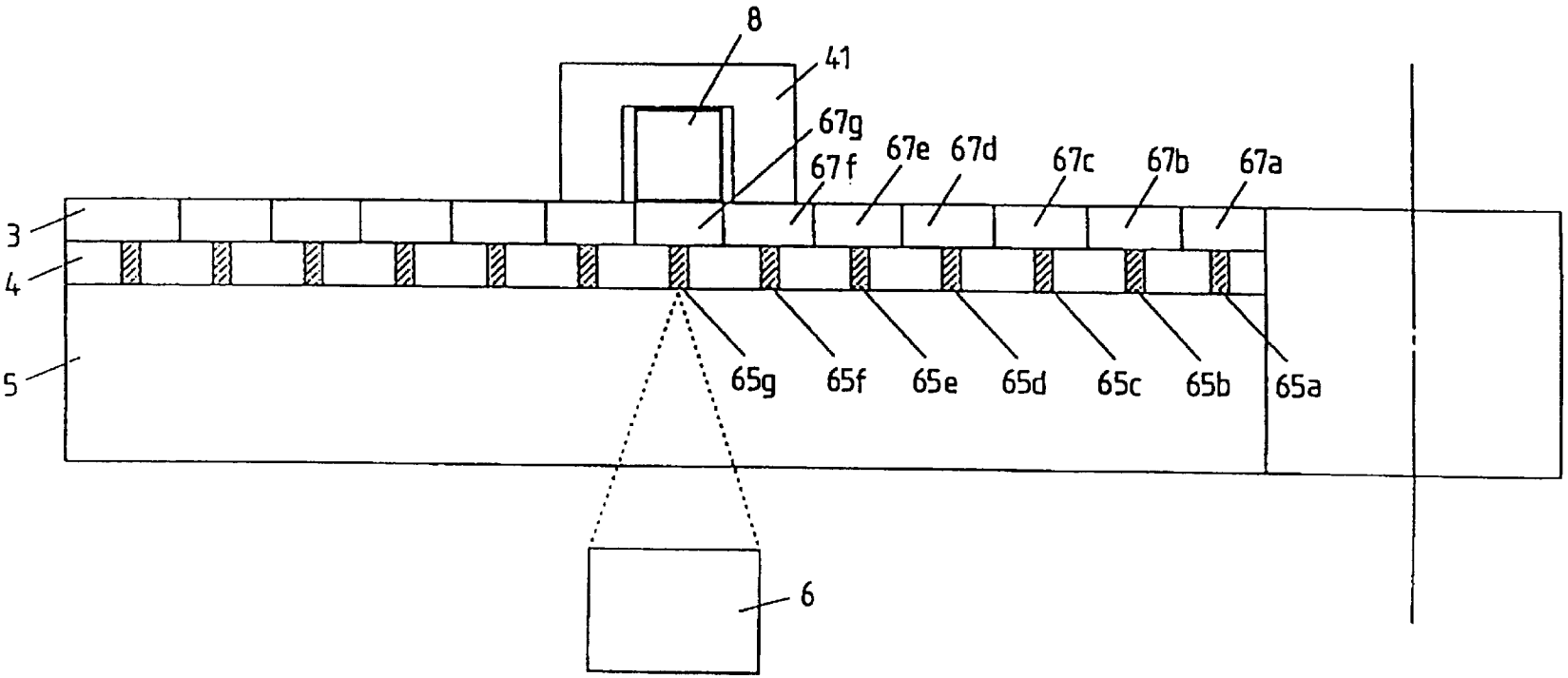

FIG. 27 is a sectional view of a recording portion in the fourth embodiment.

Figure 28:
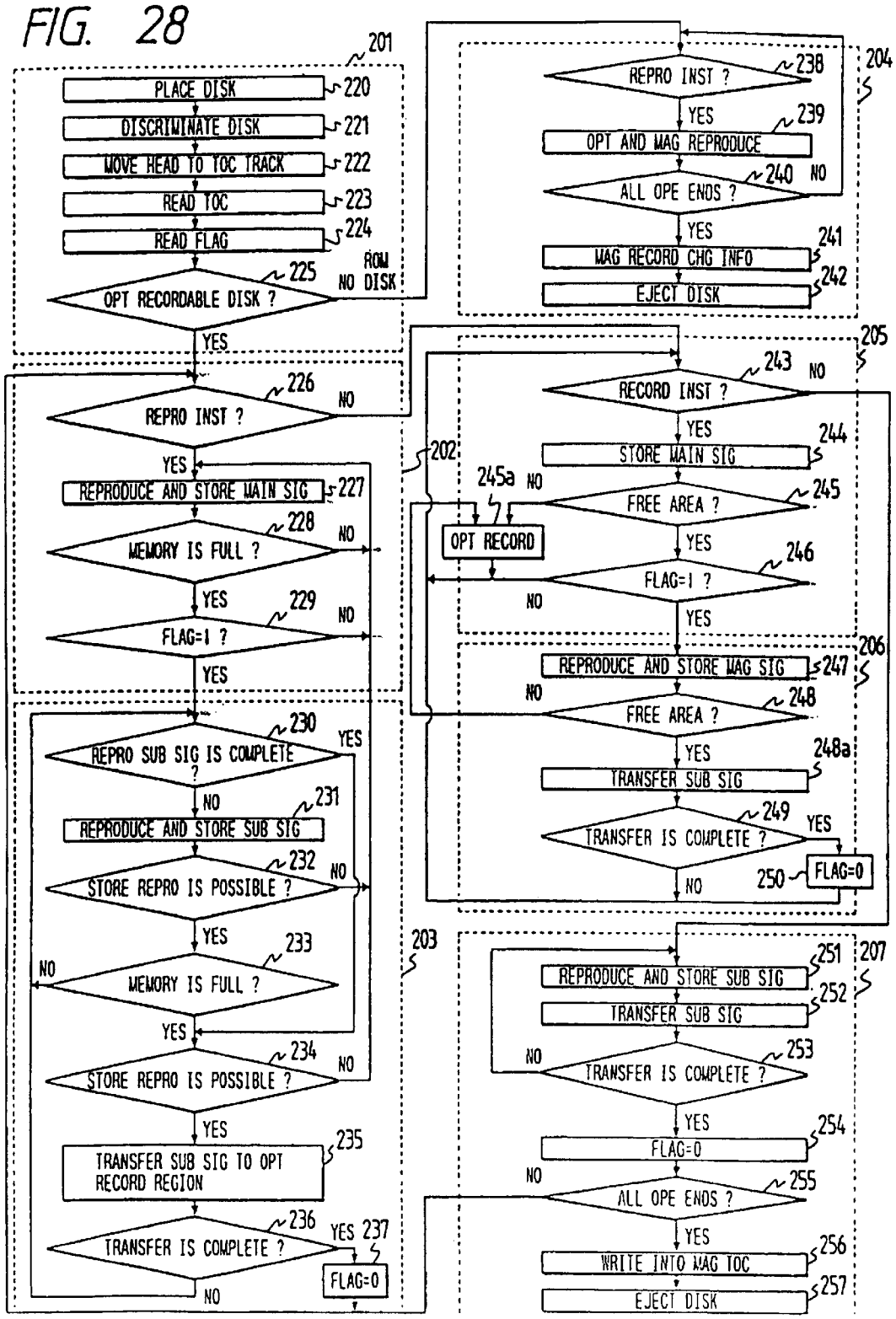

FIG. 28 is a flowchart of a program in the fourth embodiment.

Figure 29:
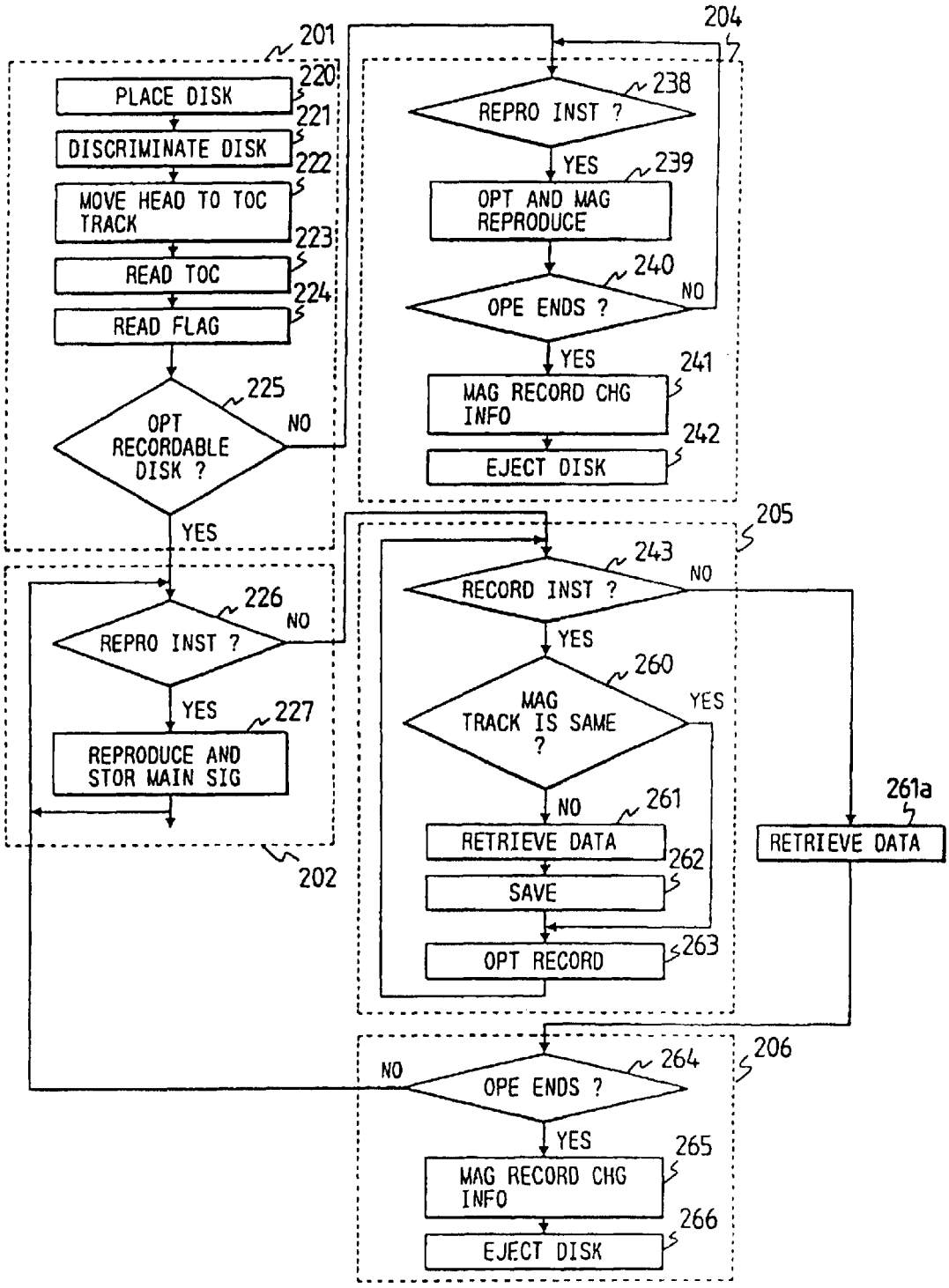

FIG. 29 is a flowchart of a program in the fourth embodiment.

Figure 30A:
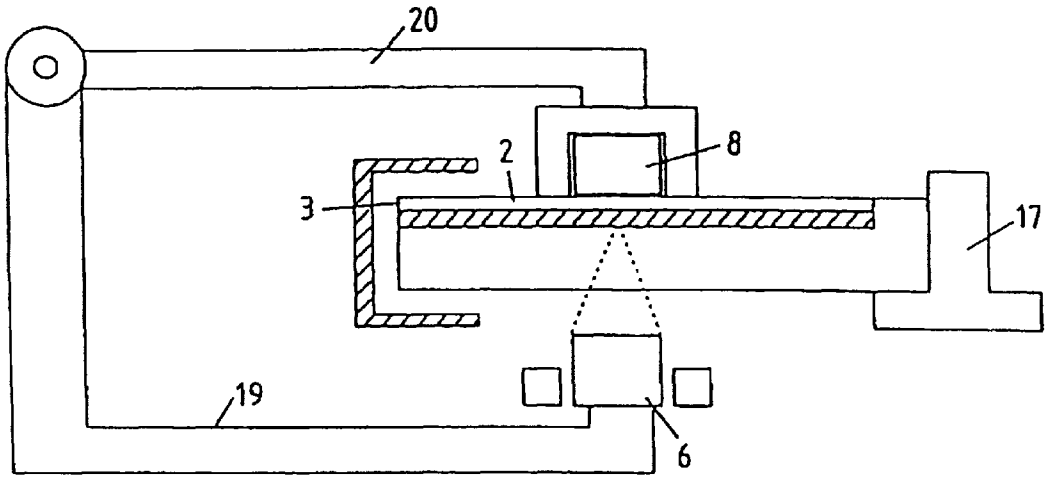

FIG. 30(a) is a sectional view of conditions where a magneto-optical disk is placed in an operable position in the fourth embodiment.

Figure 30B:
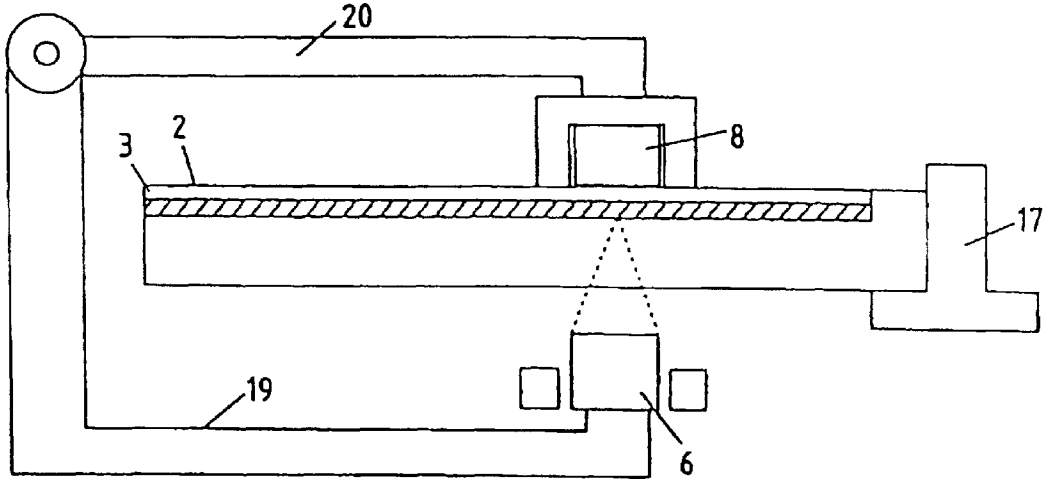

FIG. 30(b) is a sectional view of conditions where a CD is placed in an operable position in the fourth embodiment.

Figure 31:
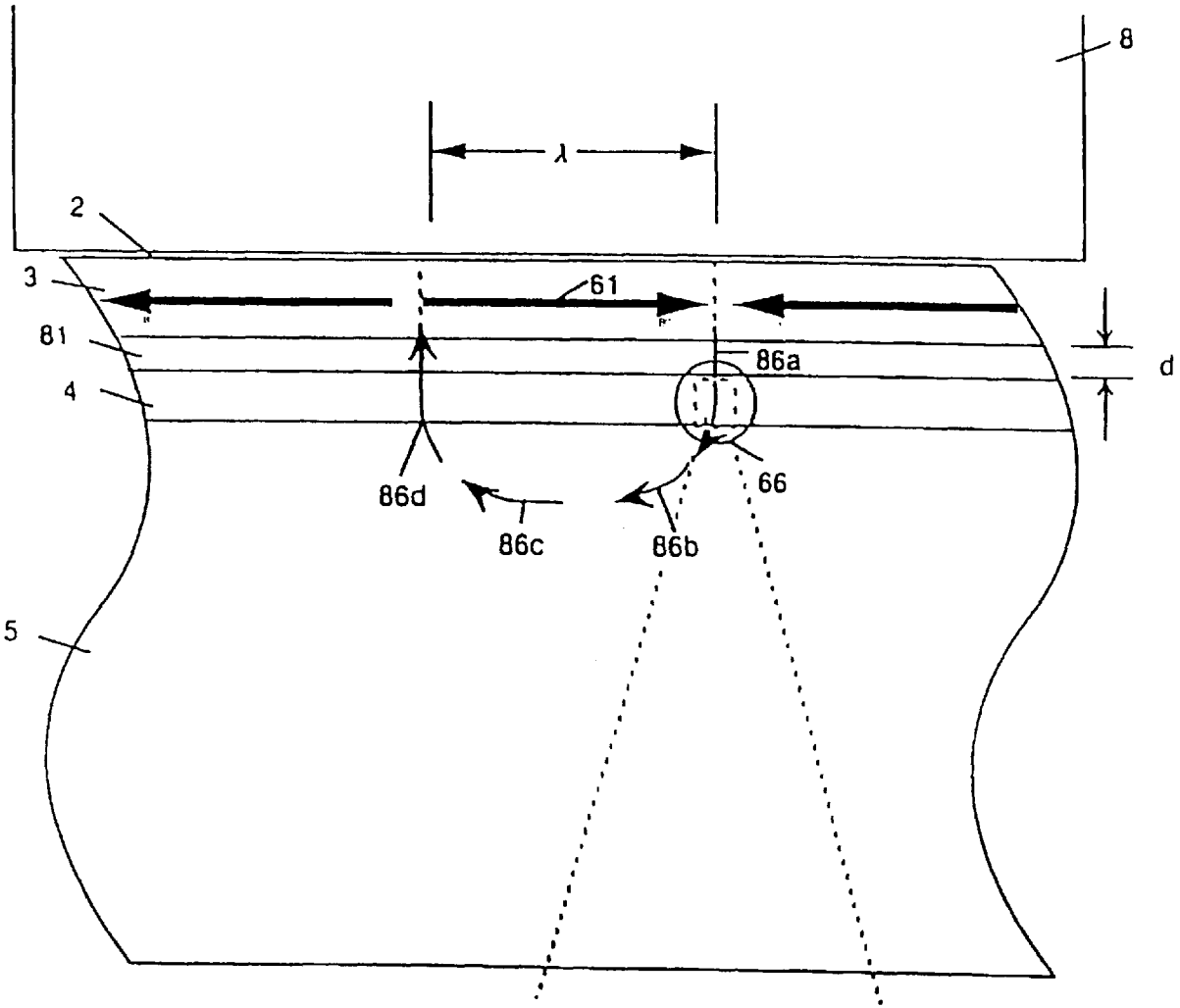

FIG. 31 is an enlarged view of a magneto-optical recording portion in the fourth embodiment.

Figure 32:
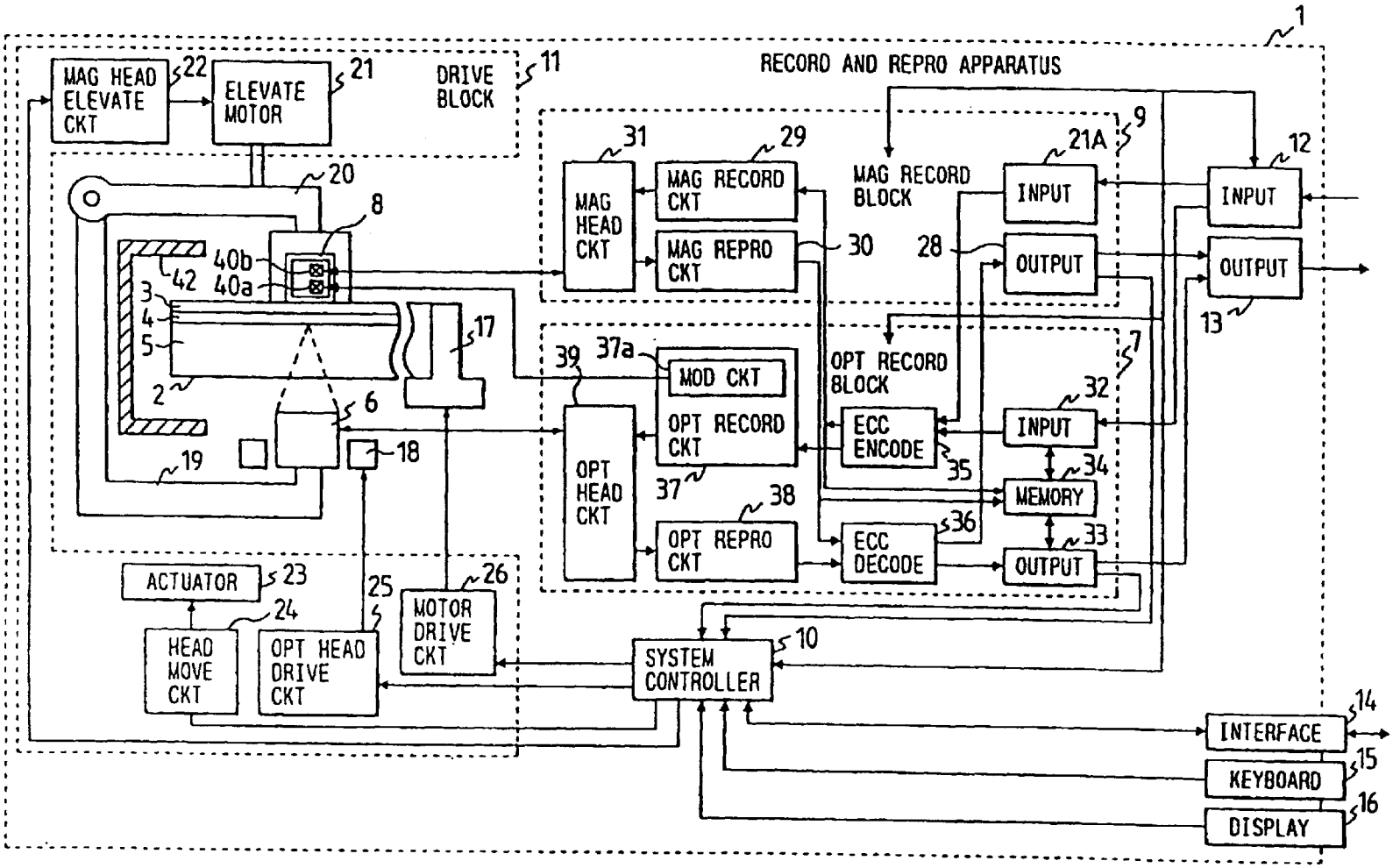

FIG. 32 is a block diagram of a recording and reproducing apparatus according to a fifth embodiment of this invention.

Figure 33:
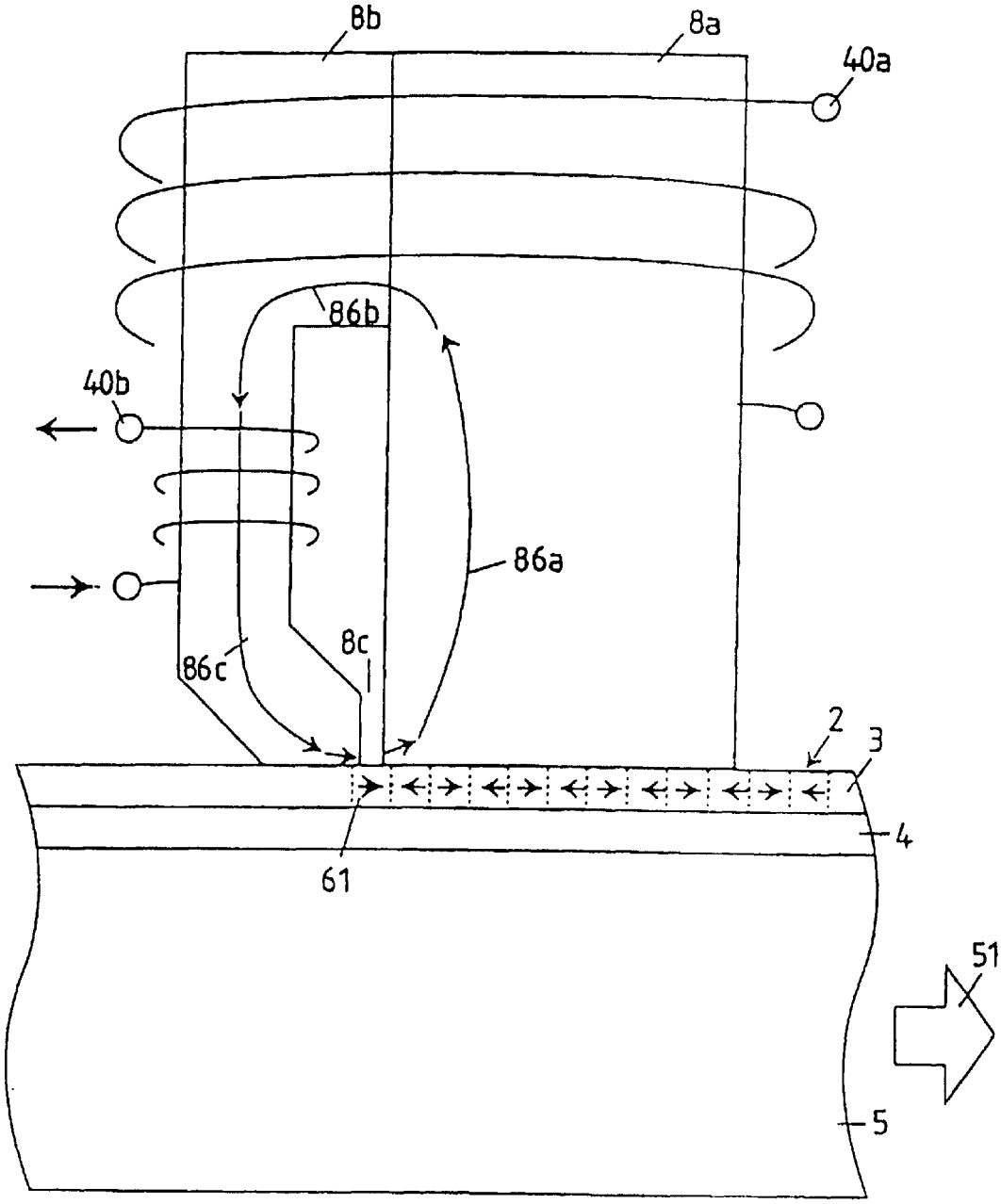

FIG. 33 is an enlarged view of a magnetic recording portion in the fifth embodiment.

Figure 34:
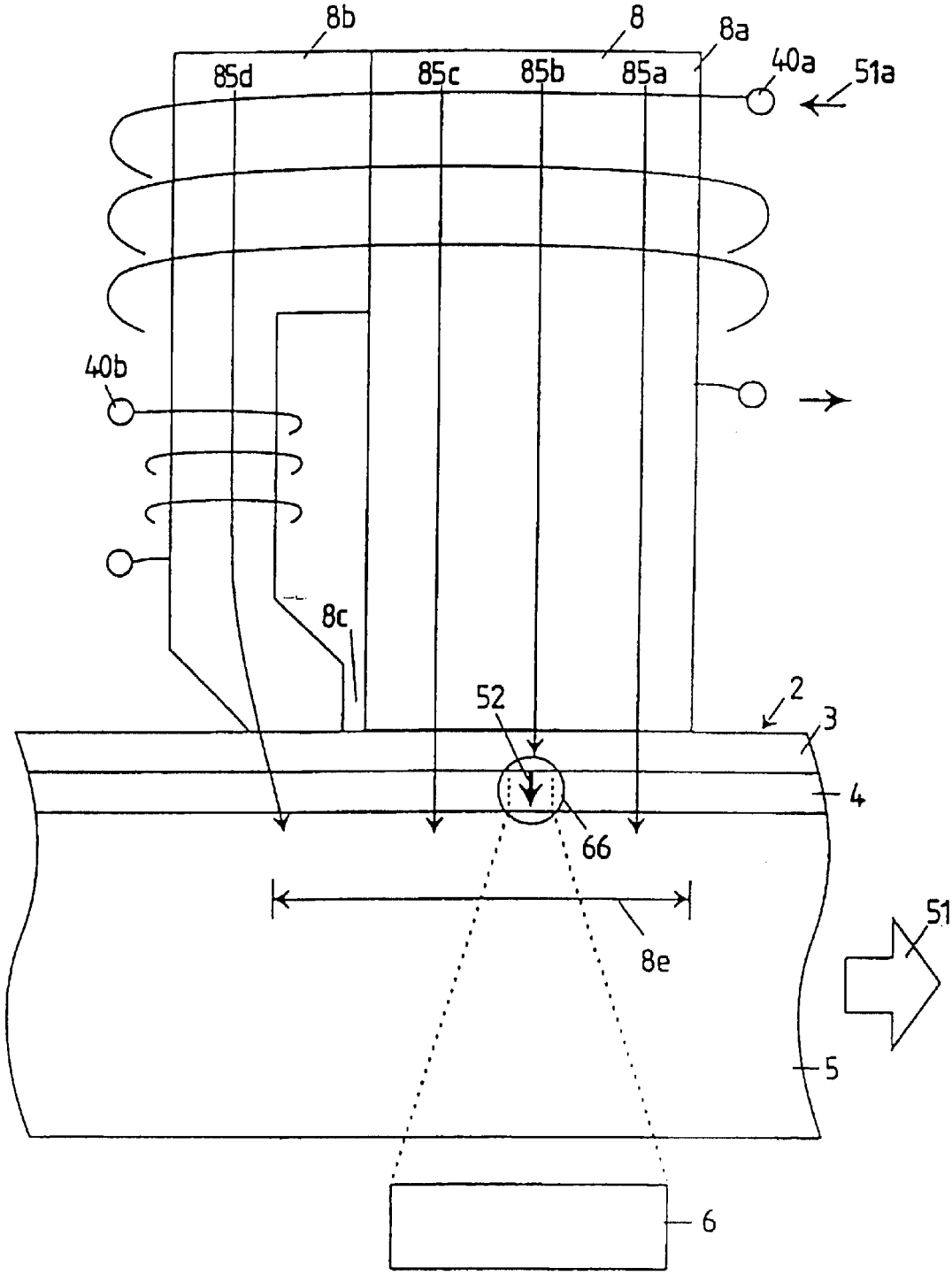

FIG. 34 is an enlarged view of a magneto-optical recording portion in the fifth embodiment.

Figure 35:
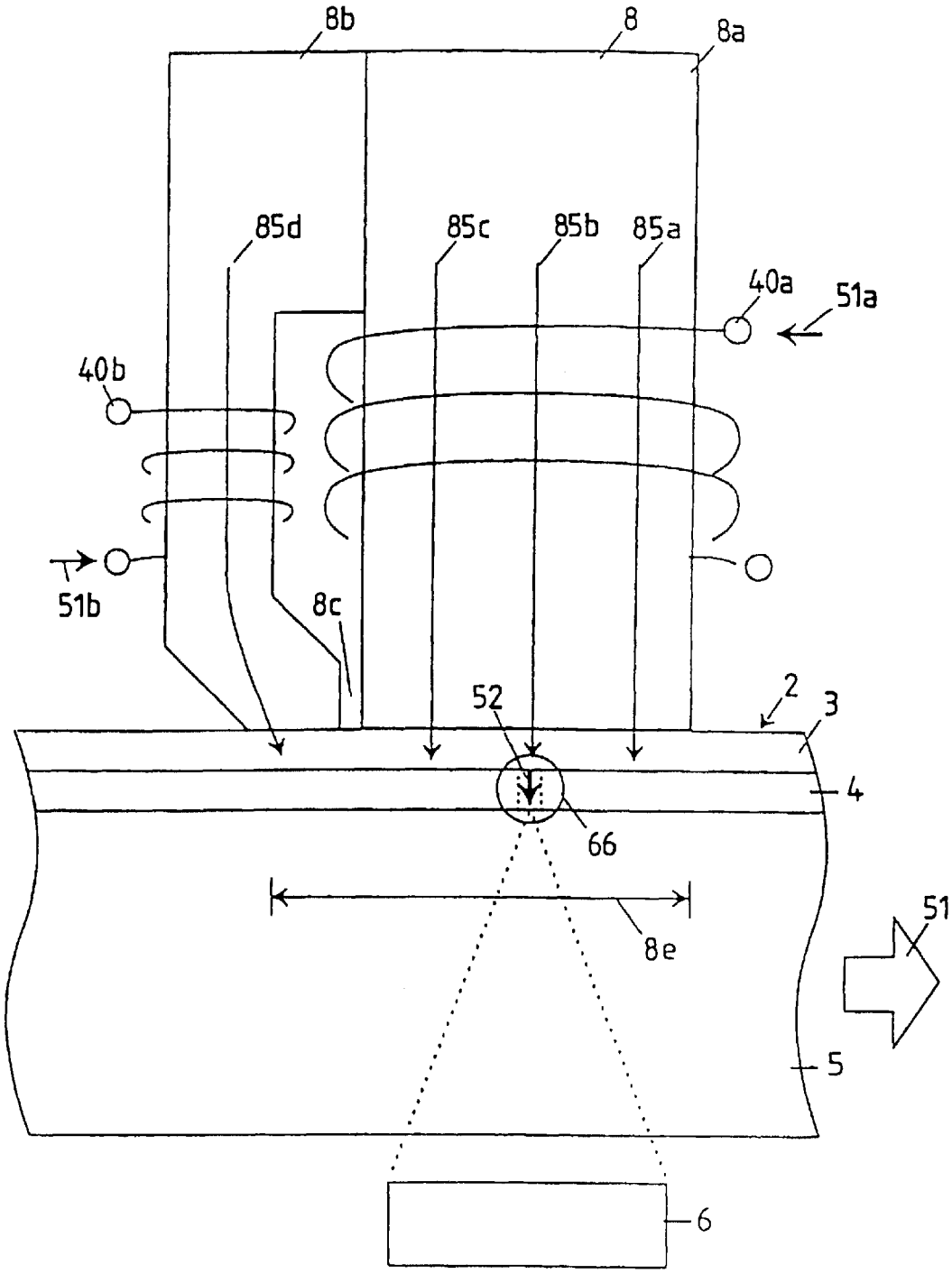

FIG. 35 is an enlarged view of a magneto-optical recording portion in the fifth embodiment.

Figure 36:
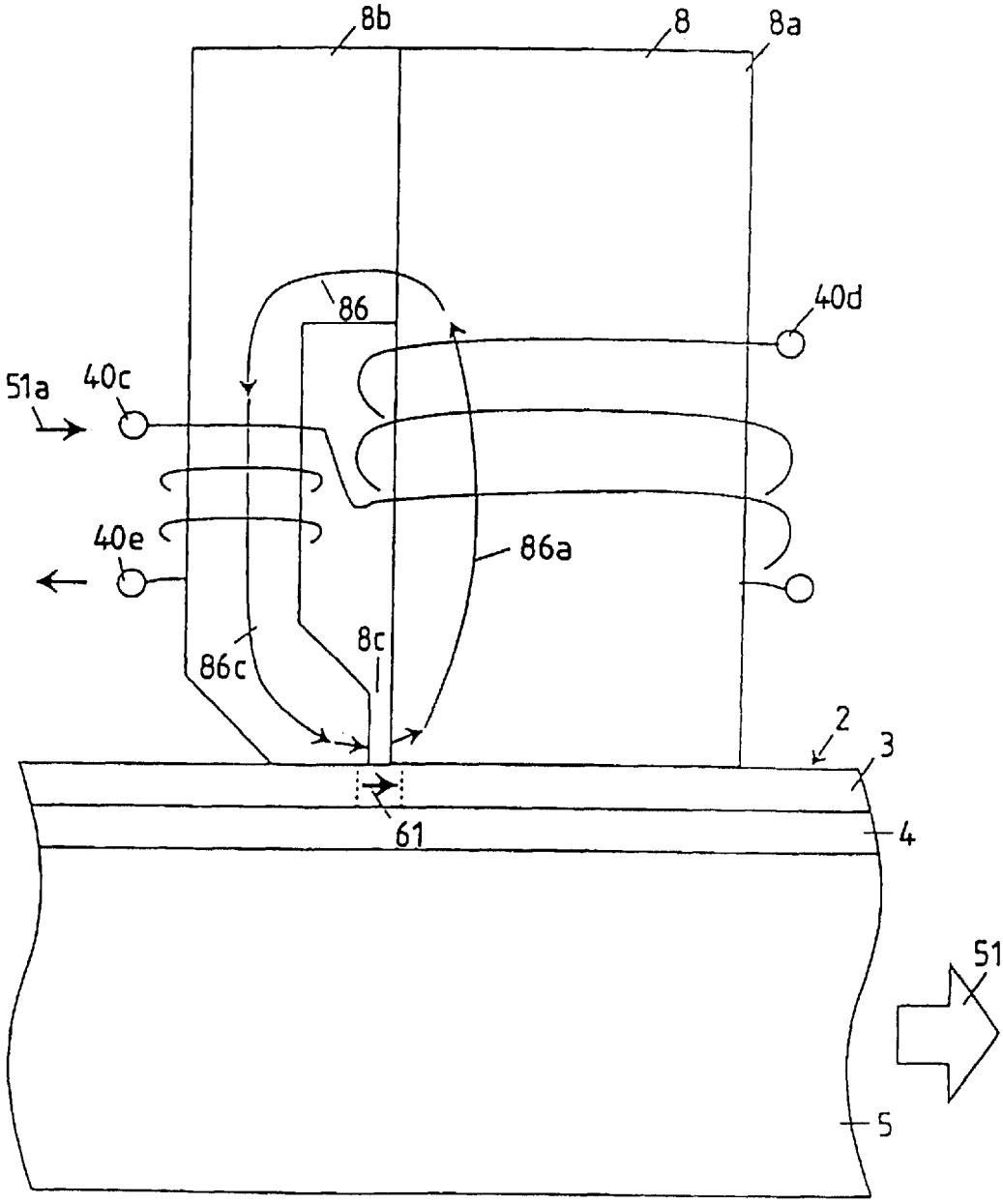

FIG. 36 is an enlarged view of a magnetic recording portion in the fifth embodiment.

Figure 37:
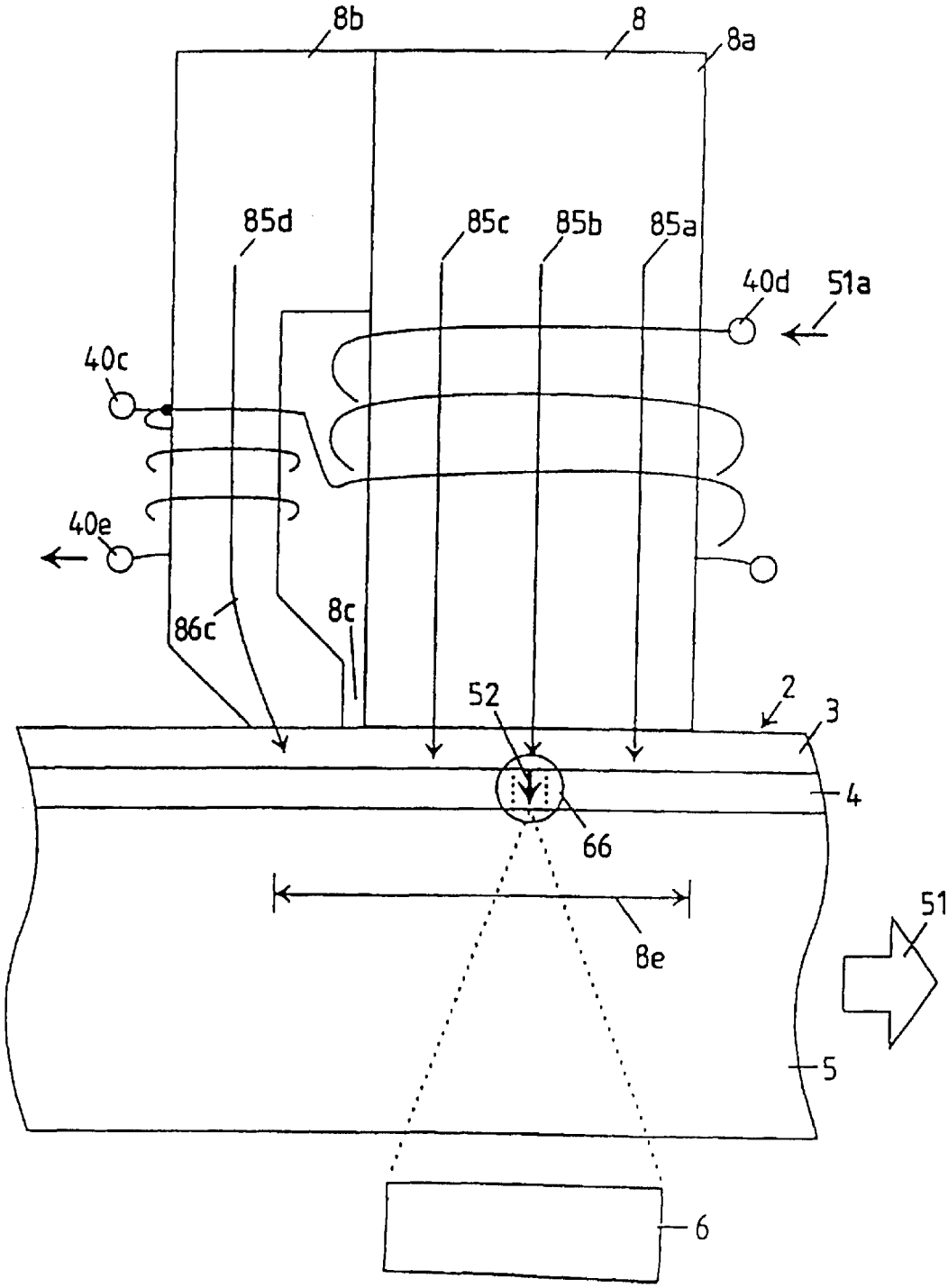

FIG. 37 is an enlarged view of a magneto-optical recording portion in the fifth embodiment.

Figure 38:
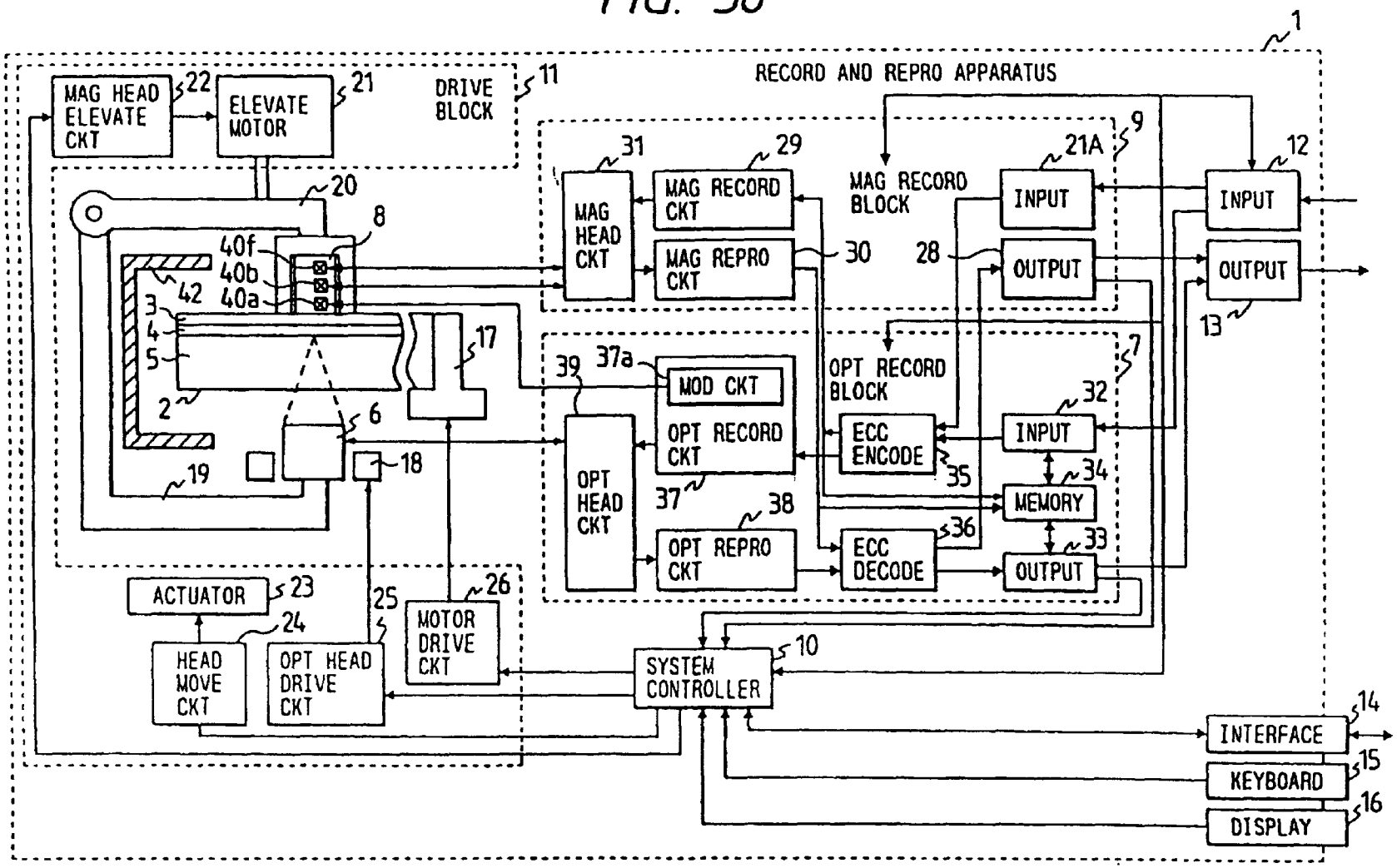

FIG. 38 is a block diagram of a recording and reproducing apparatus according to a sixth embodiment of this invention.

Figure 39:
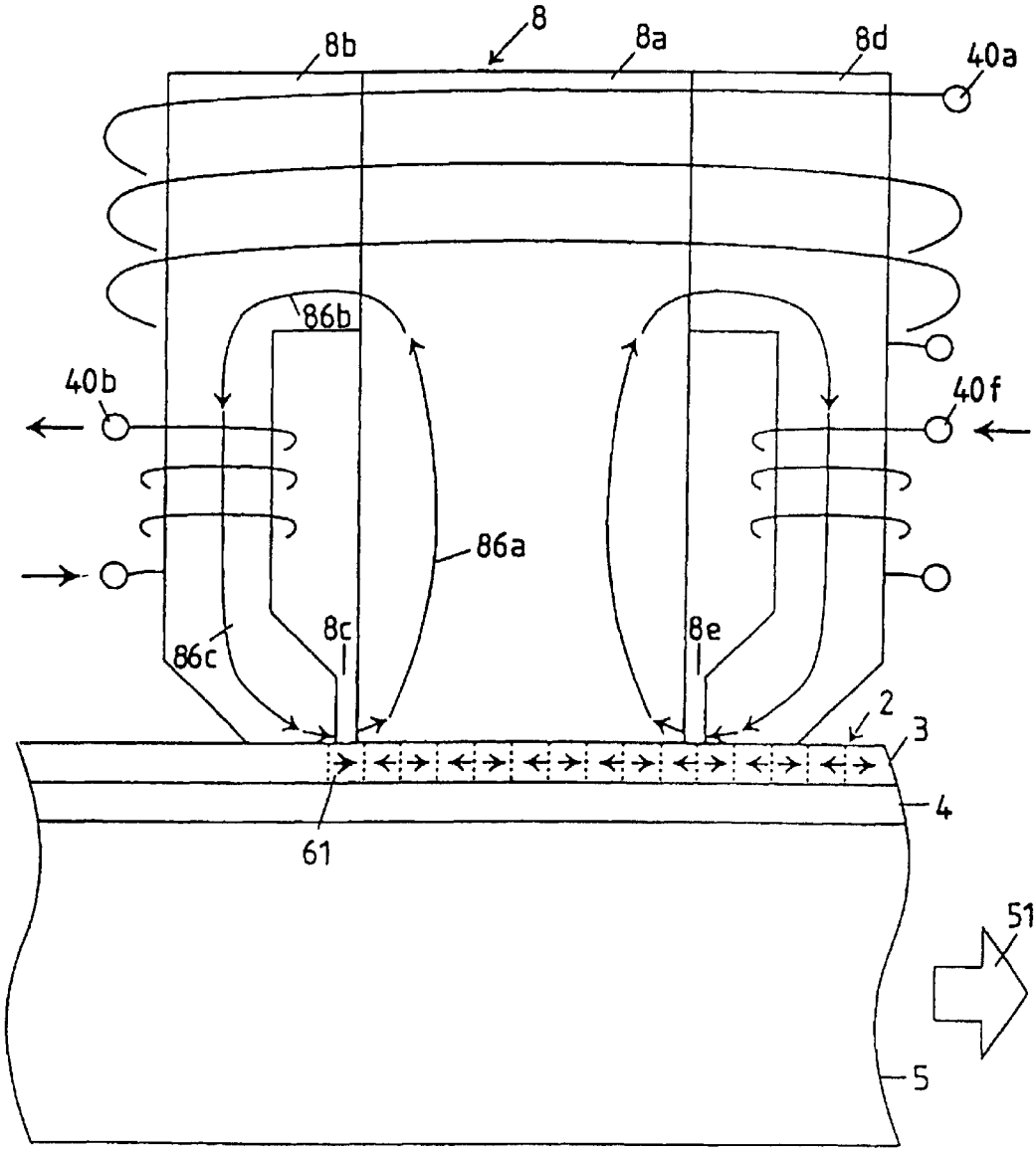

FIG. 39 is a block diagram of a magnetic recording portion in the sixth embodiment.

Figure 40:
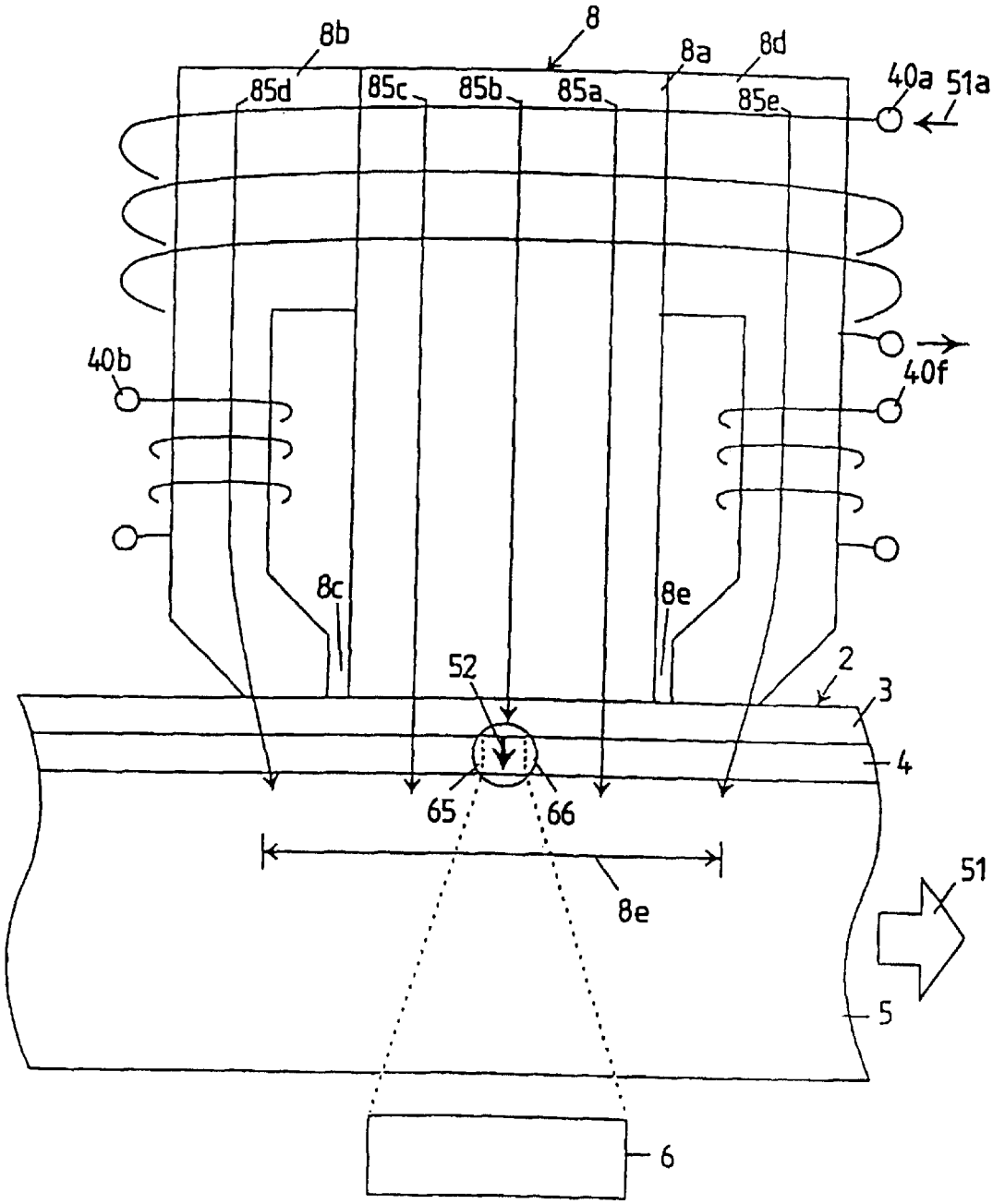

FIG. 40 is an enlarged view of a magnetic field modulating portion in the sixth embodiment.

Figure 41:
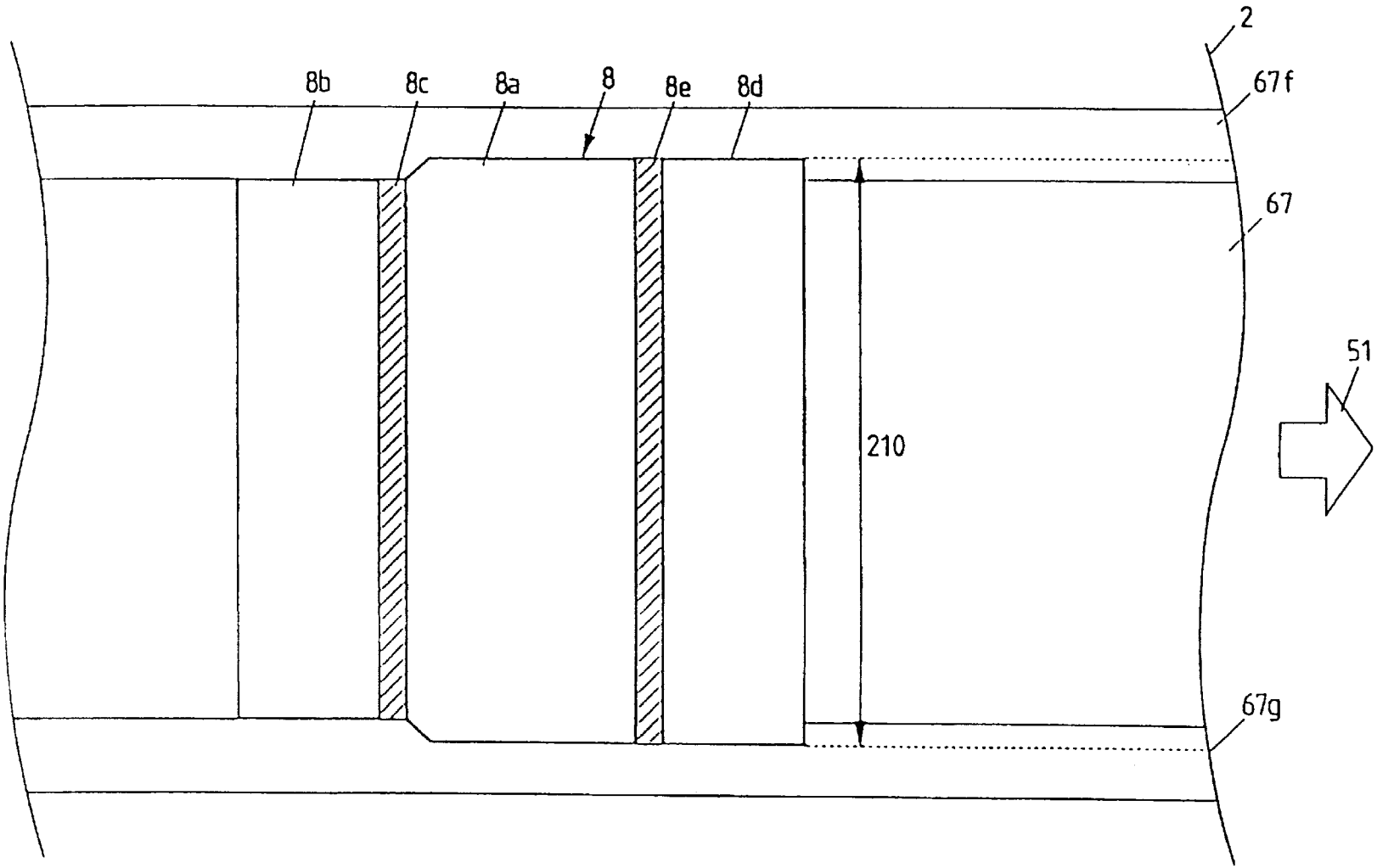

FIG. 41 is a top view of a magnetic recording portion in the sixth embodiment.

Figure 42:
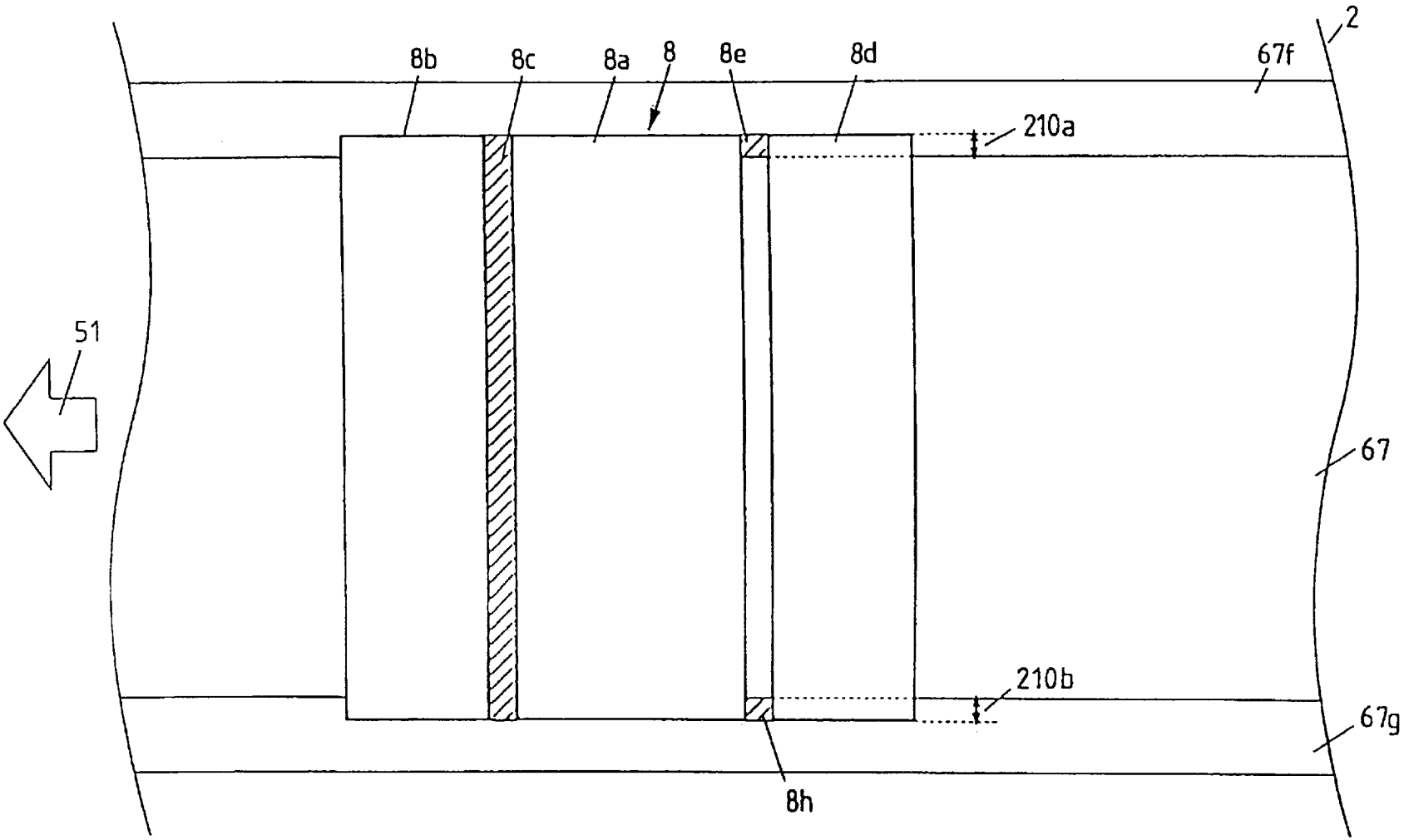

FIG. 42 is a top view of a magnetic recording portion in the sixth embodiment.

Figure 43:
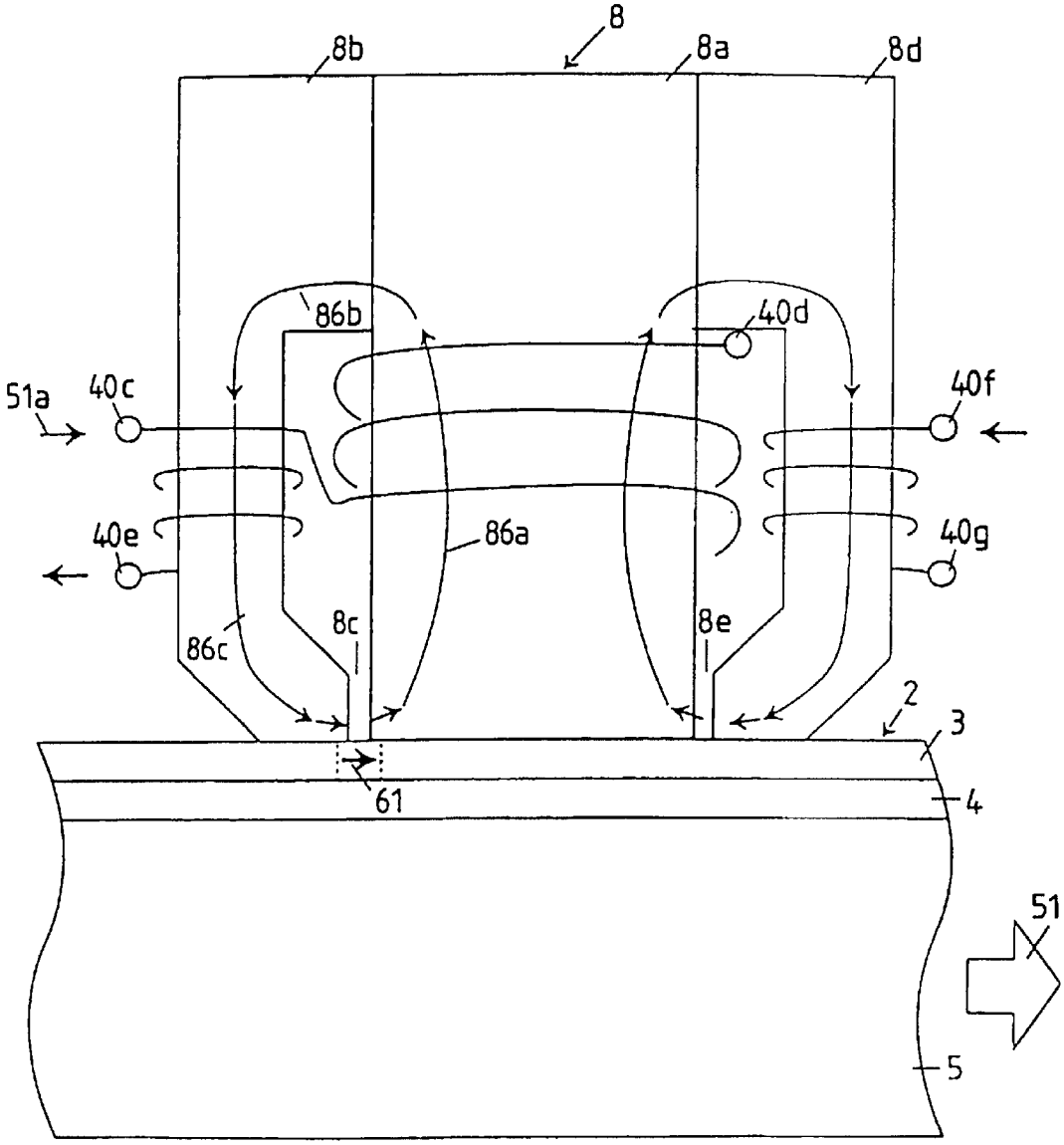

FIG. 43 is an enlarged view of a magnetic recording portion in the sixth embodiment.

Figure 44:
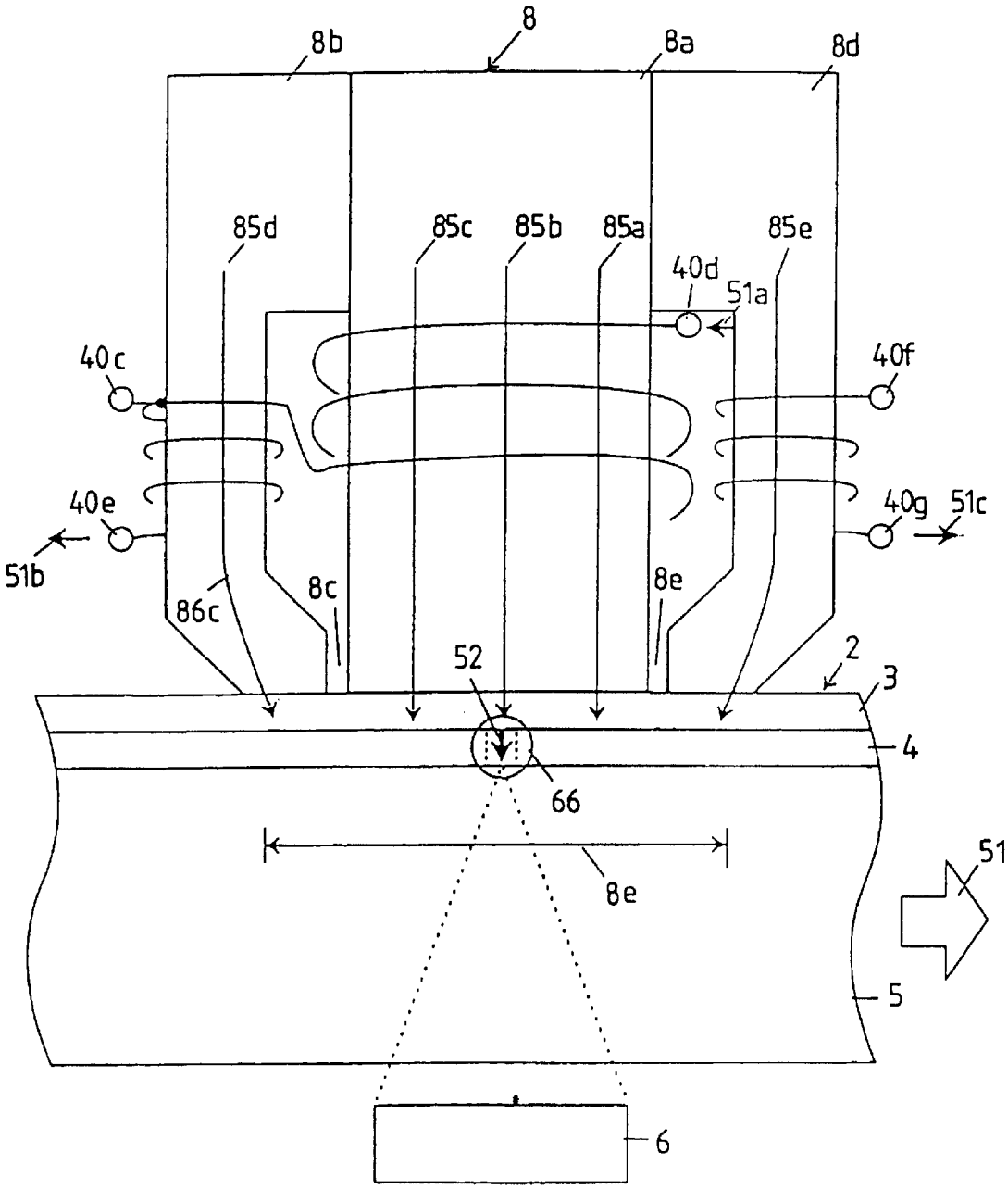

FIG. 44 is an enlarged view of a magnetic field modulating portion in the sixth embodiment.

Figure 45A:
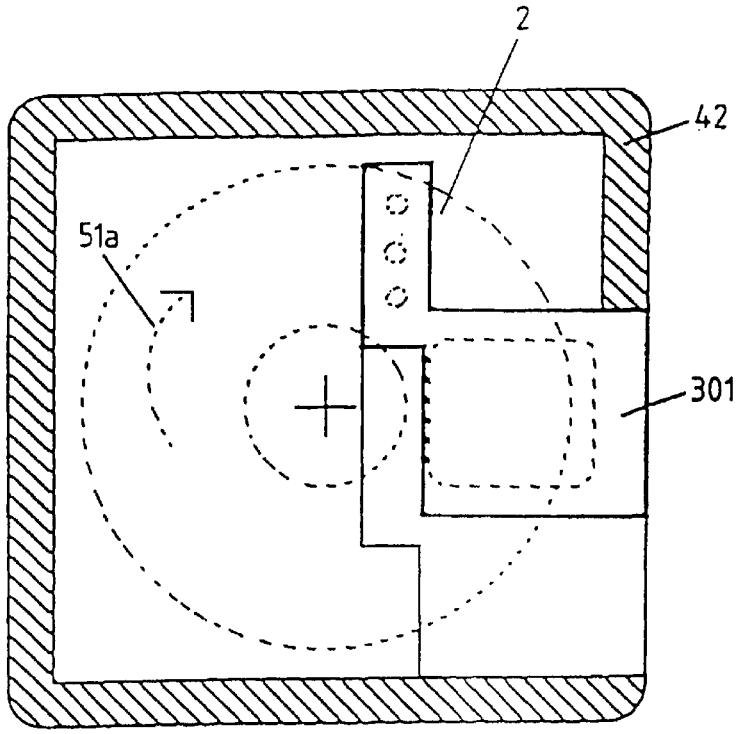

FIG. 45(a) is a top view of a disk cassette in a seventh embodiment of this invention.

Figure 45B:
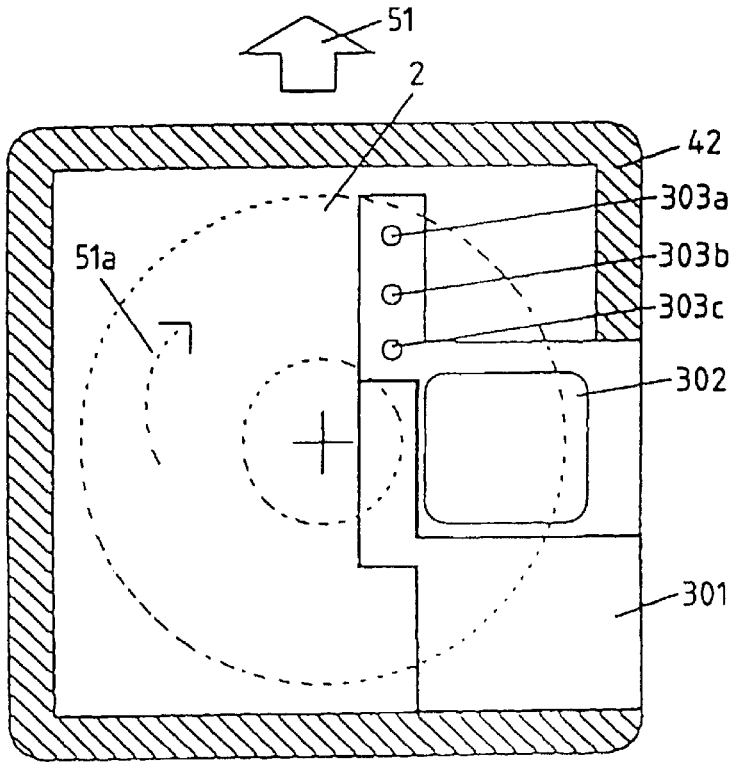

FIG. 45(b) is a top view of a disk cassette in the seventh embodiment.

Figure 46A:
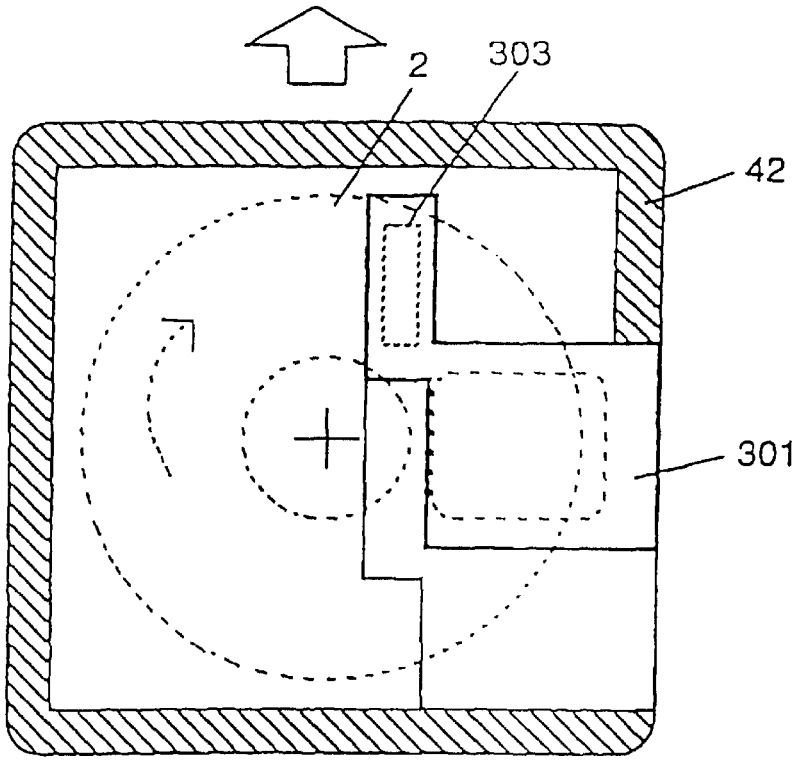

FIG. 46(a) is a top view of a disk cassette in the seventh embodiment.

Figure 46B:
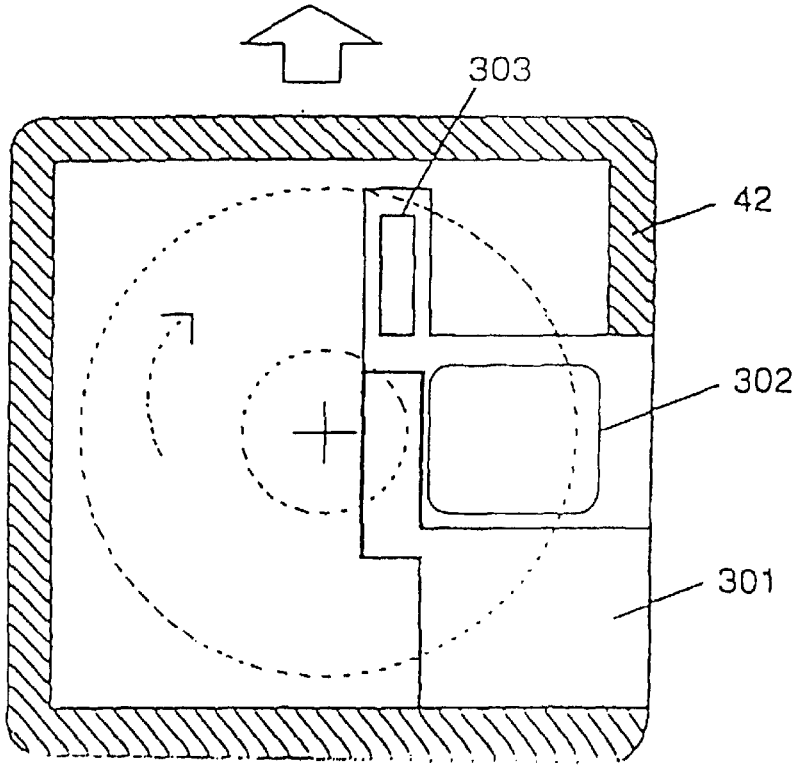

FIG. 46(b) is a top view of a disk cassette in the seventh embodiment.

Figure 47A:
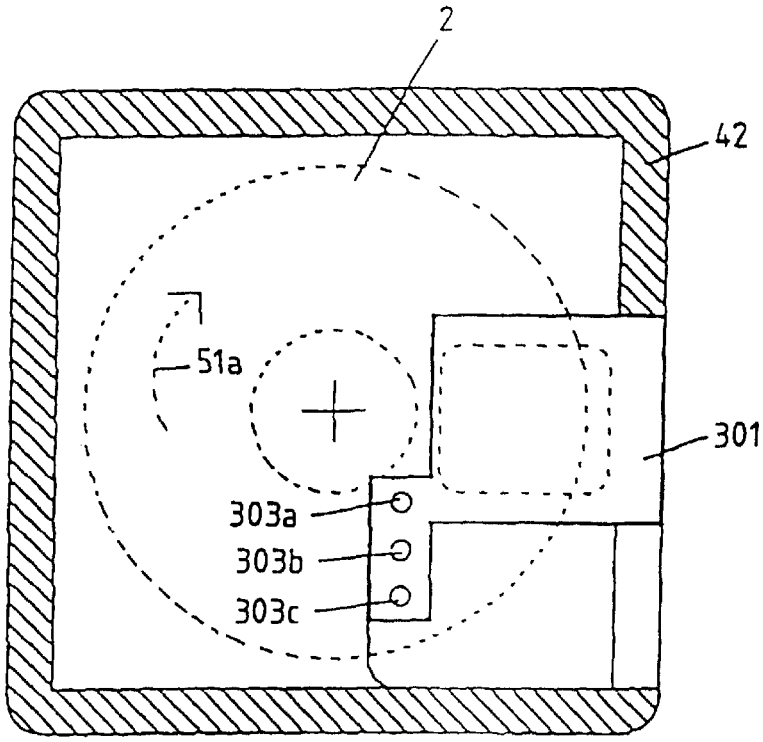

FIG. 47(a) is a top view of a disk cassette in the seventh embodiment.

Figure 47B:
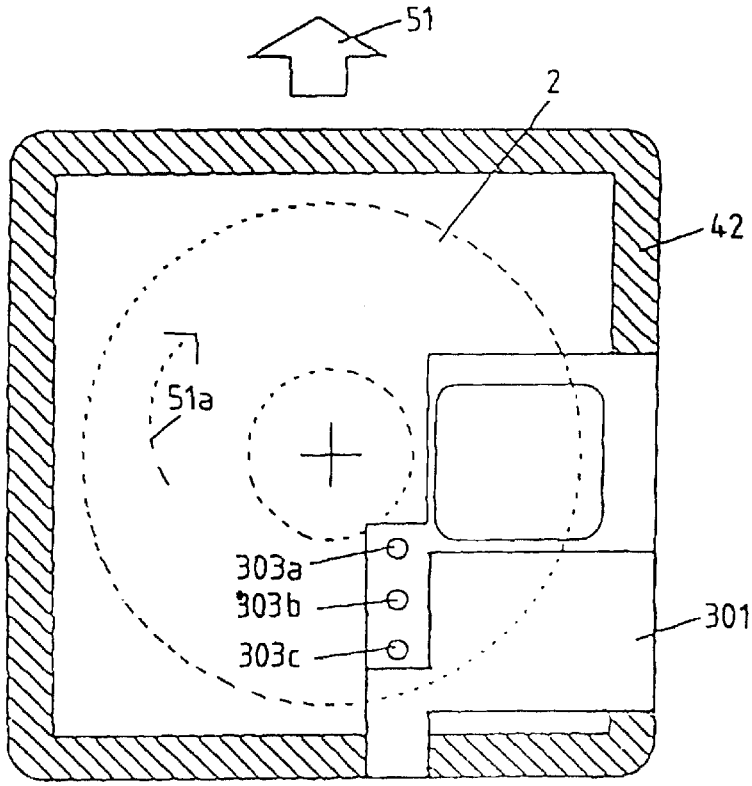

FIG. 47(b) is a top view of a disk cassette in the seventh embodiment.

Figure 48A:
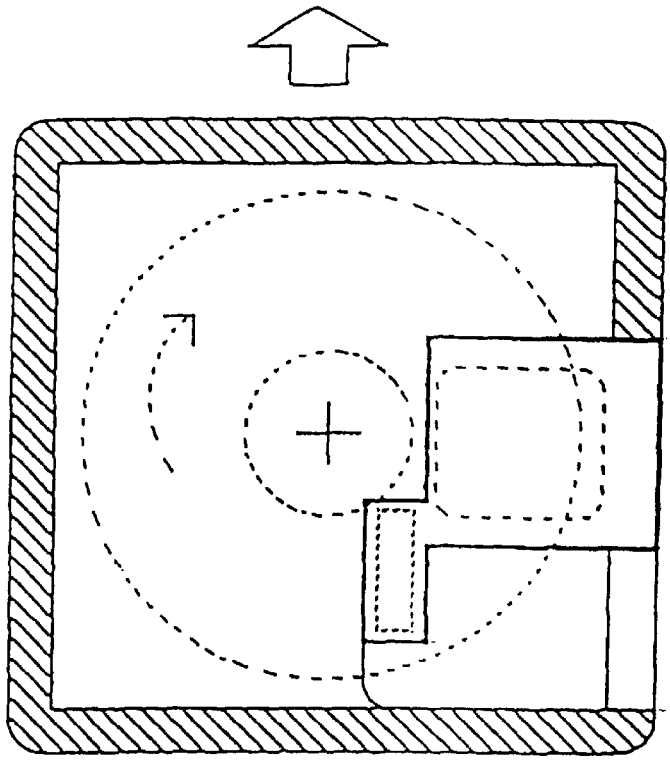

FIG. 48(a) is a top view of a disk cassette in the seventh embodiment.

Figure 48B:
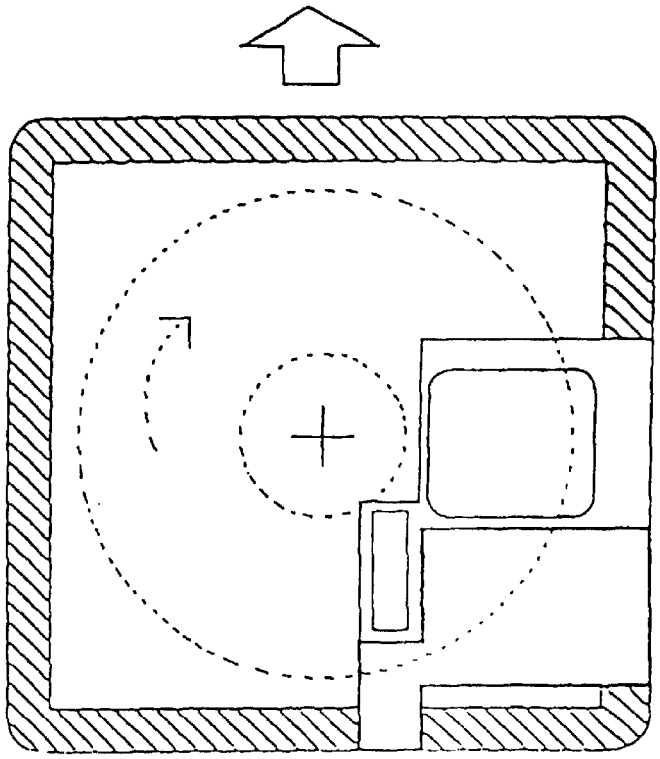

FIG. 48(b) is a top view of a disk cassette in the seventh embodiment.

Figure 49A:
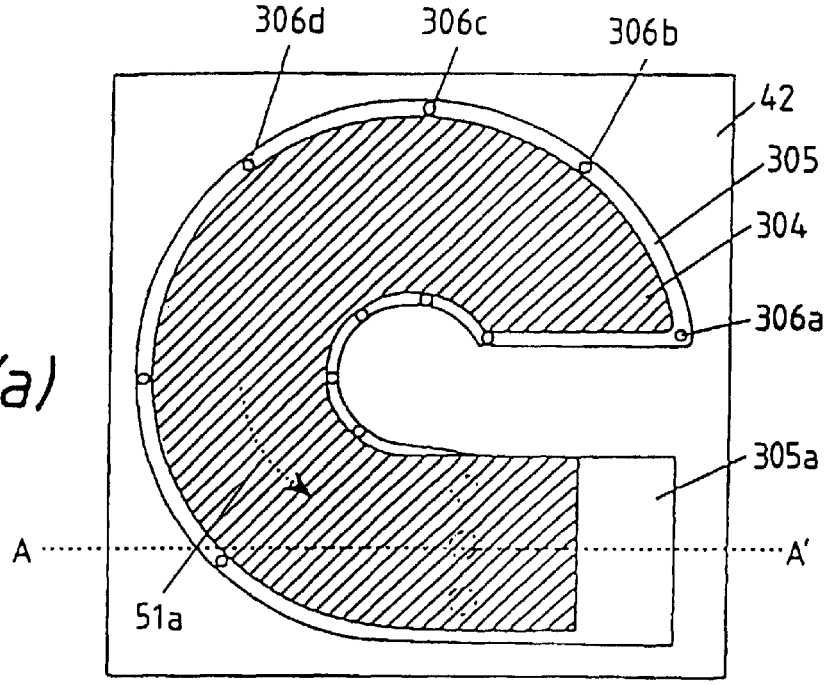

FIG. 49(a) is a top view of a liner and a portion around the liner in the seventh embodiment.

Figure 49B:
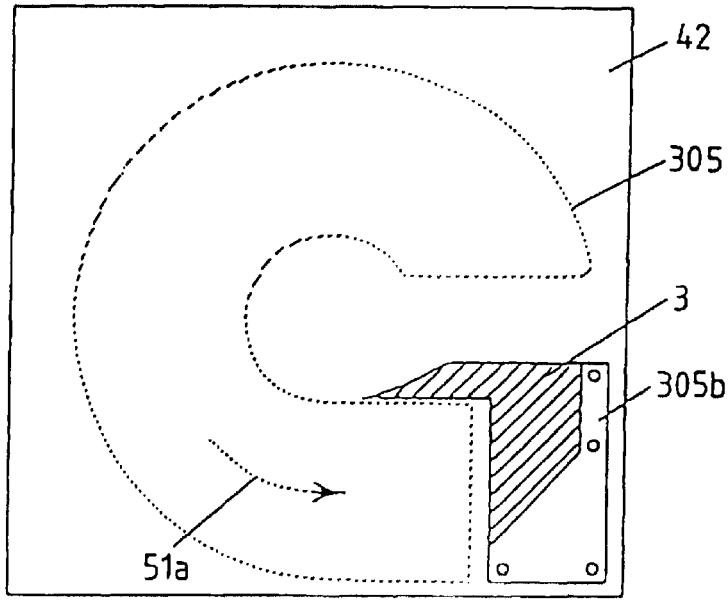

FIG. 49(b) is a top view of a liner and a portion around the liner in the seventh embodiment.

Figure 49C:
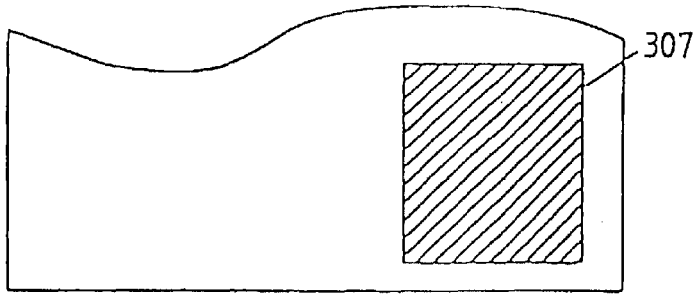

FIG. 49(c) is a top view of a liner and a portion around the liner in the seventh embodiment.

Figure 50A:
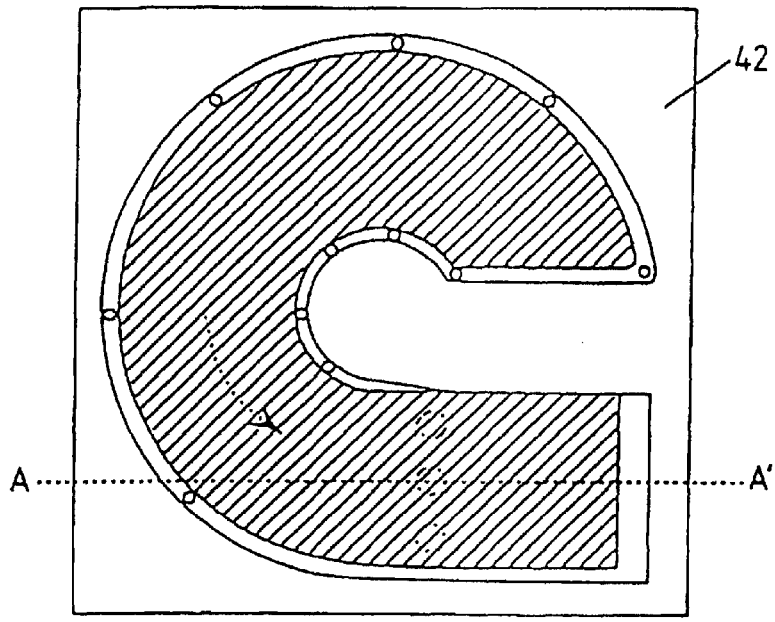

FIG. 50(a) is a top view of a liner and a portion around the liner in the seventh embodiment.

Figure 50B:
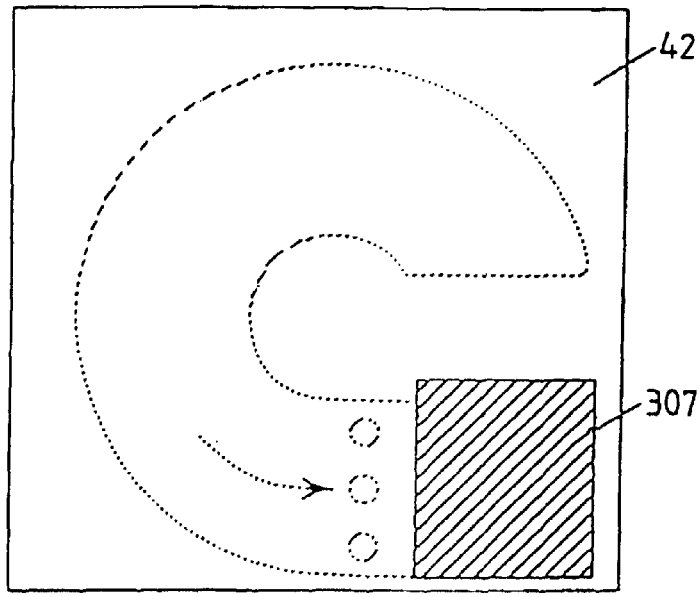

FIG. 50(b) is a top view of a liner and a portion around the liner in the seventh embodiment.

Figure 50C:
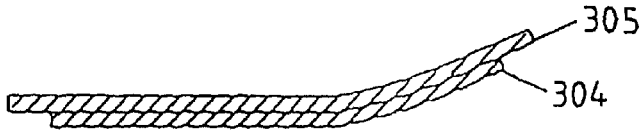

FIG. 50(c) is a transversely sectional view of a liner portion in the seventh embodiment.

Figure 50D:
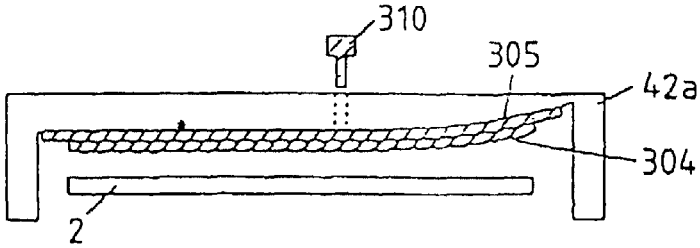

FIG. 50(d) is a transversely sectional view of a disk cassette in the seventh embodiment.

Figure 51:
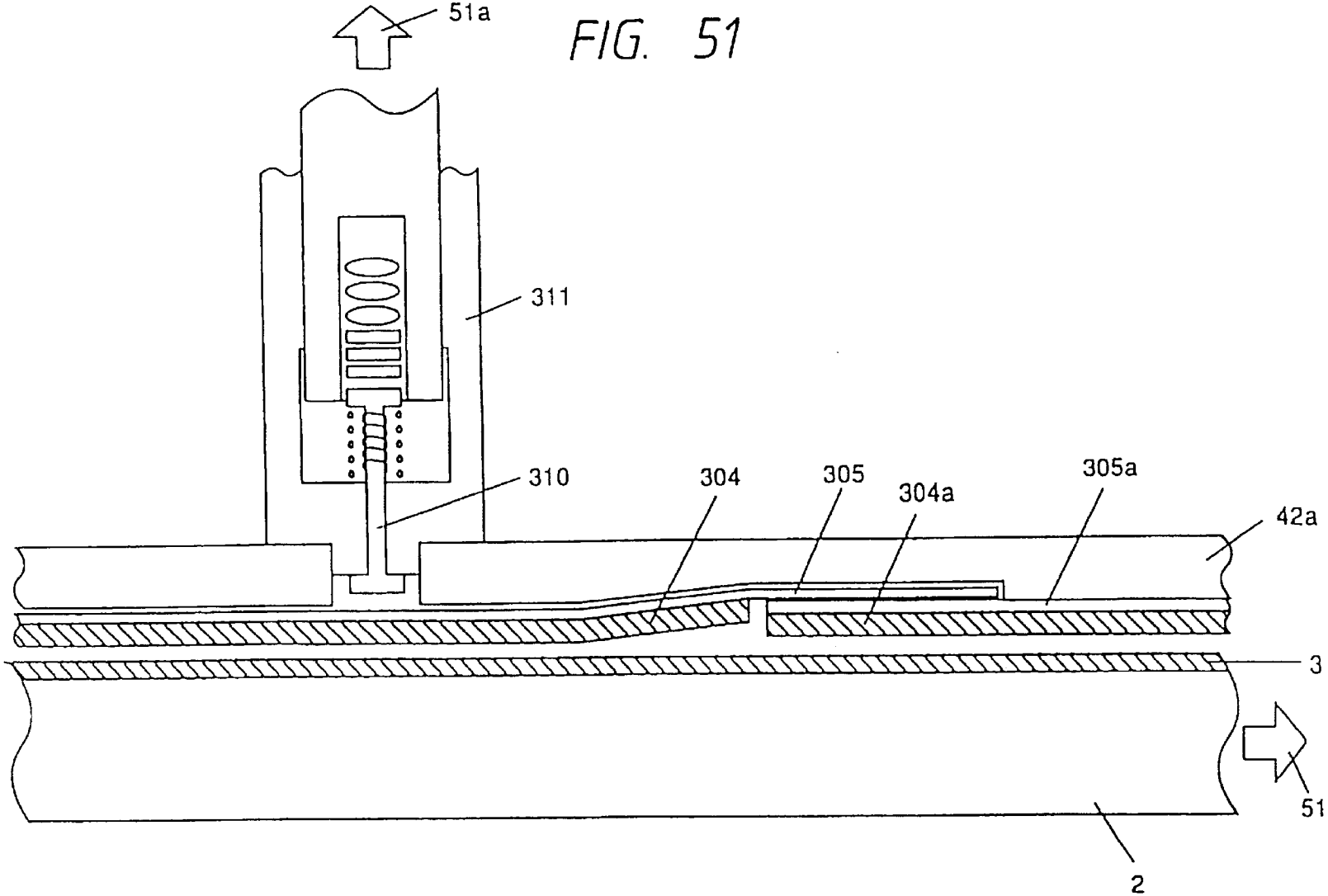

FIG. 51 is a transversely sectional view of conditions where liner pin insertion is off in the seventh embodiment.

Figure 52:
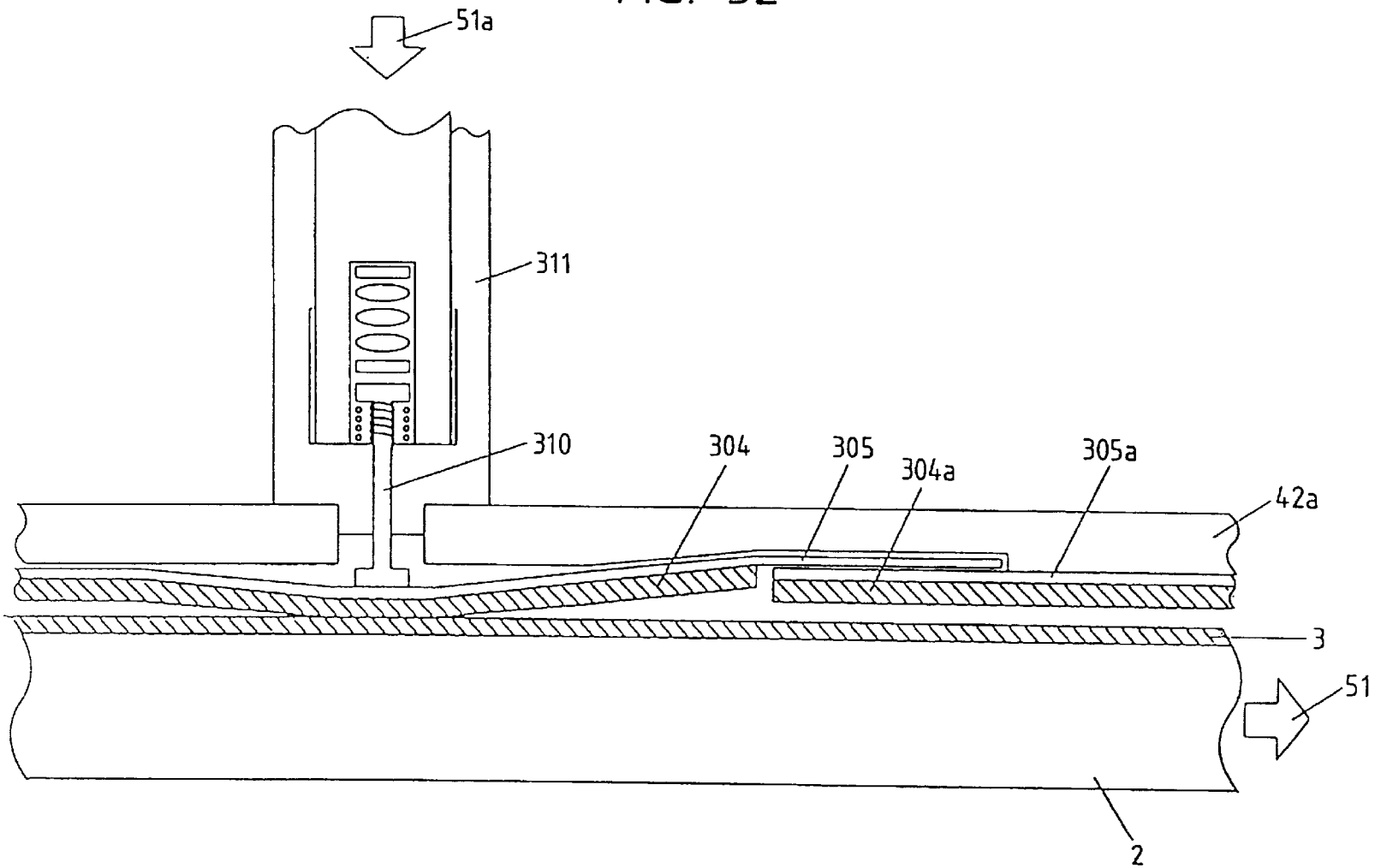

FIG. 52 is a transversely sectional view of conditions where liner pin insertion is on in the seventh embodiment.

Figure 53A:
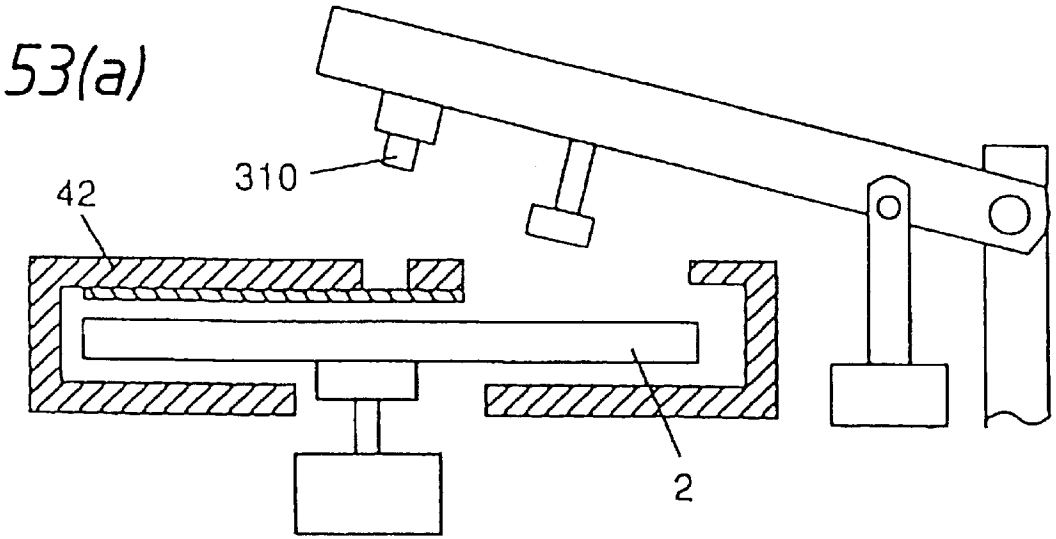

FIG. 53(a) is a transversely sectional view of conditions where liner pin insertion is off in the seventh embodiment.

Figure 53B:
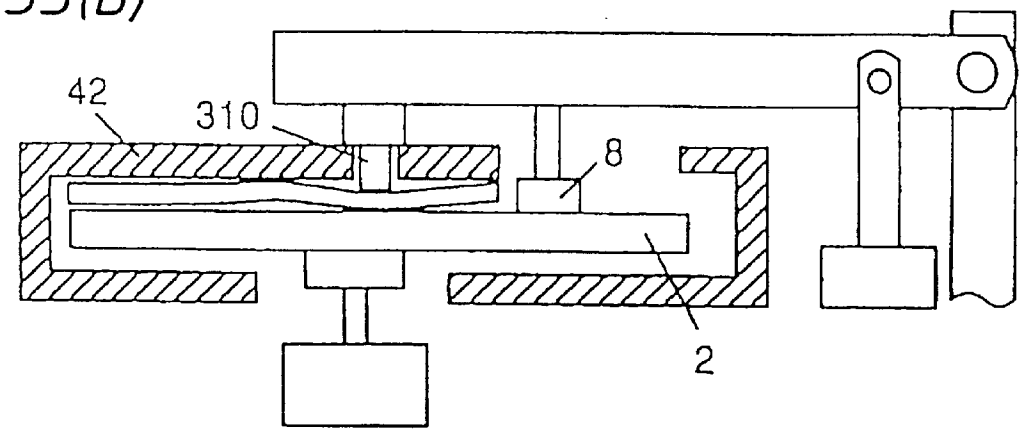

FIG. 53(b) is a transversely sectional view of conditions where liner pin insertion is on in the seventh embodiment.

Figure 54A:
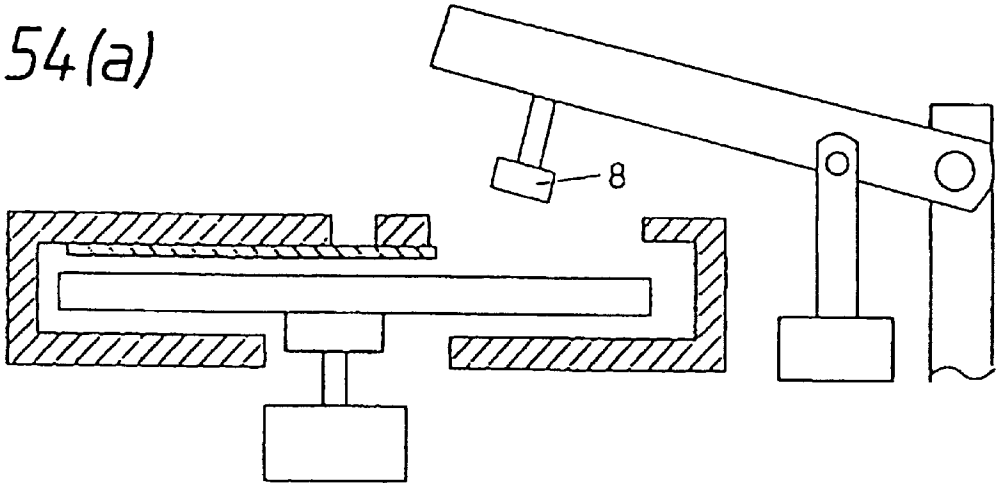

FIG. 54(a) is a transversely sectional view of conditions where magnetic head mounting is off in the seventh embodiment.

Figure 54B:
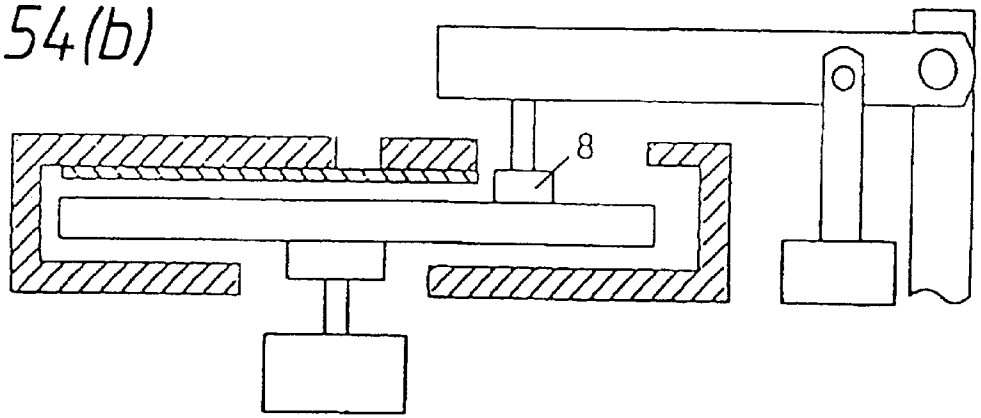

FIG. 54(b) is a transversely sectional view of conditions where magnetic head mounting is on in the seventh embodiment.

Figure 55A:
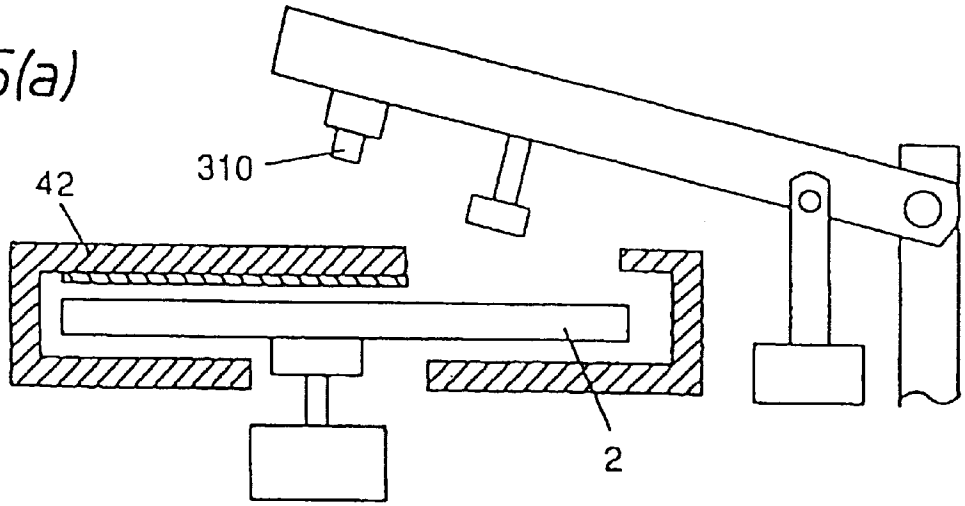

FIG. 55(a) is a transversely sectional view of conditions where magnetic head mounting is off in the seventh embodiment.

Figure 55B:
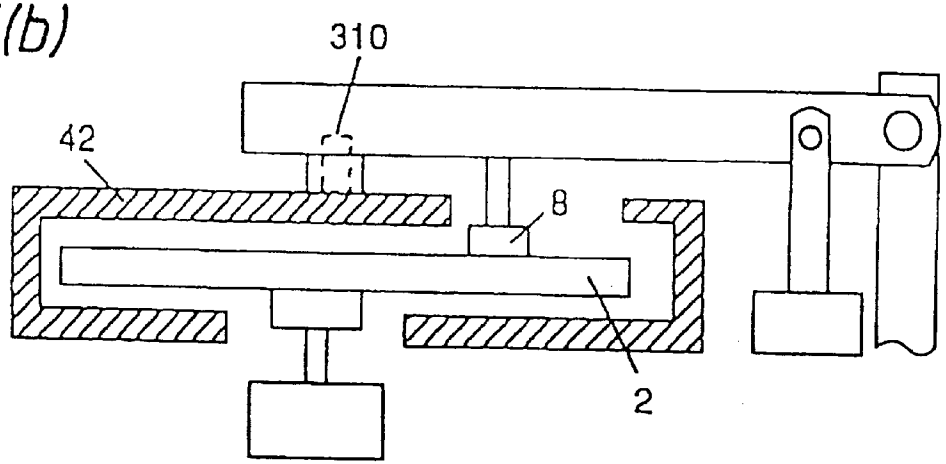

FIG. 55(b) is a transversely sectional view of conditions where magnetic head mounting in on the seventh embodiment.

Figure 56:
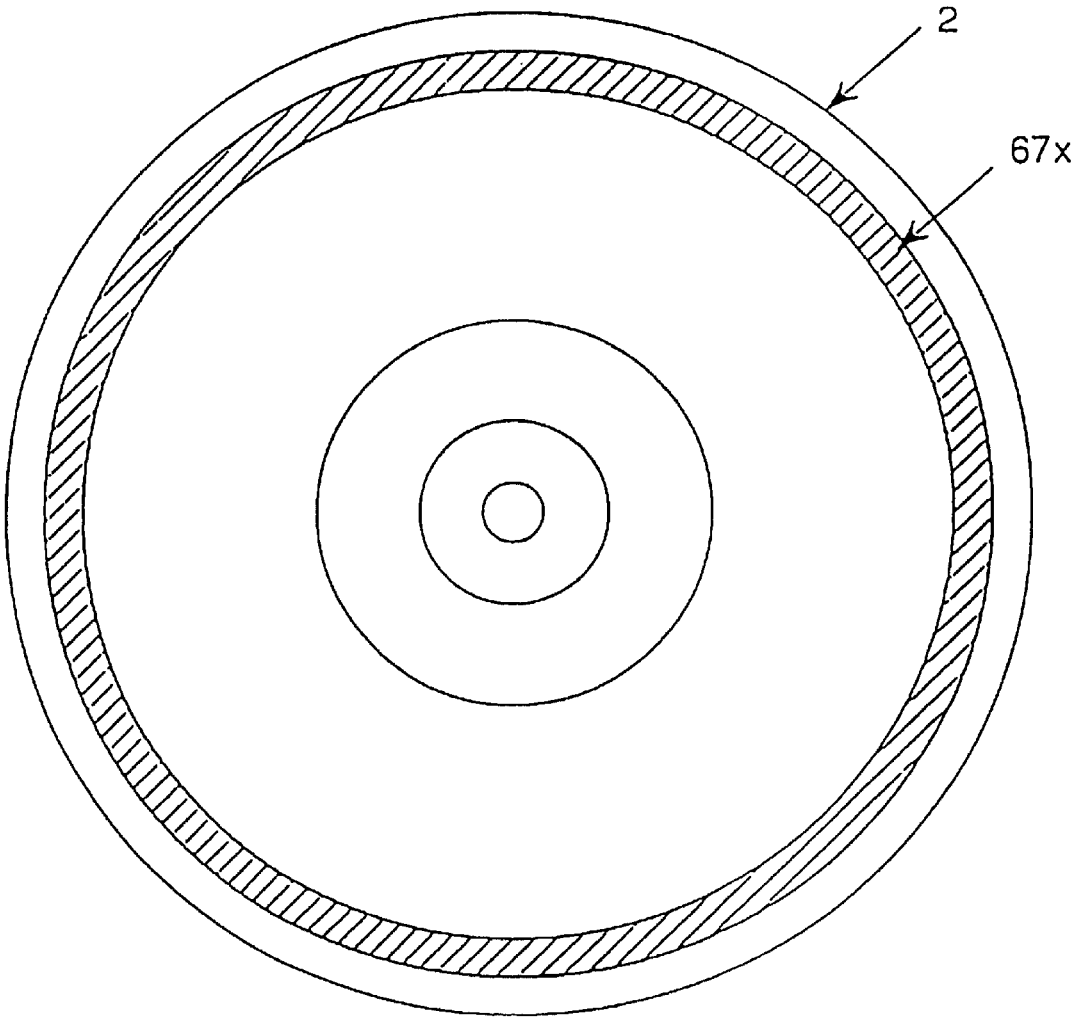

FIG. 56 is a top view of a recording medium in the seventh embodiment.

Figure 57A:
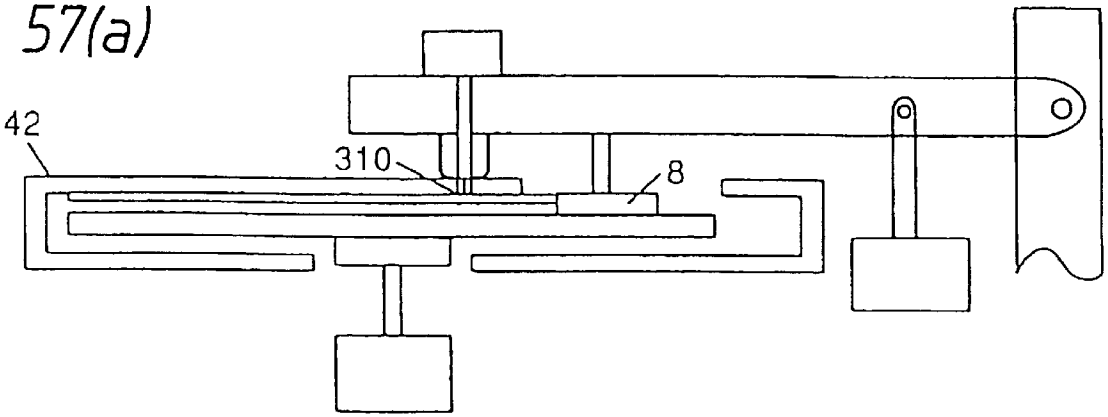

FIG. 57(a) is a transversely sectional view of conditions where liner pin insertion is off in the seventh embodiment.

Figure 57B:
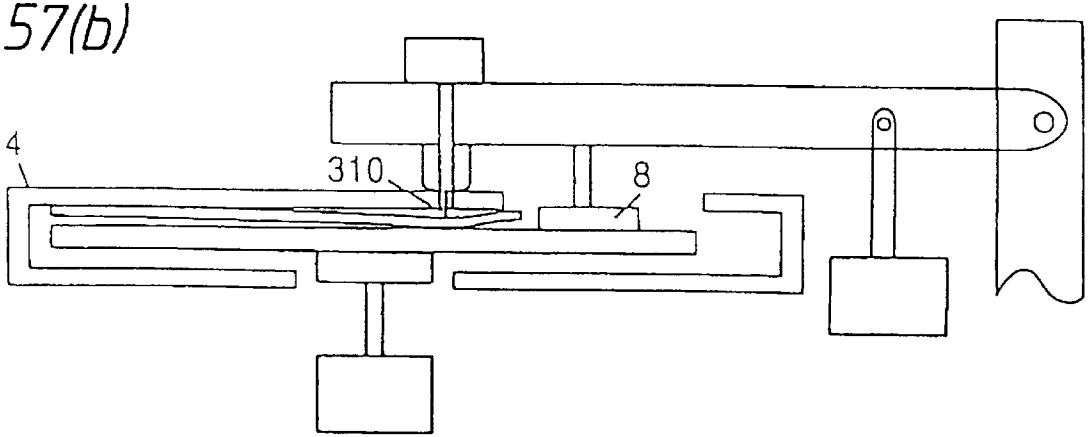

FIG. 57(b) in a transversely sectional view of conditions where liner pin insertion is on in the seventh embodiment.

Figure 58:
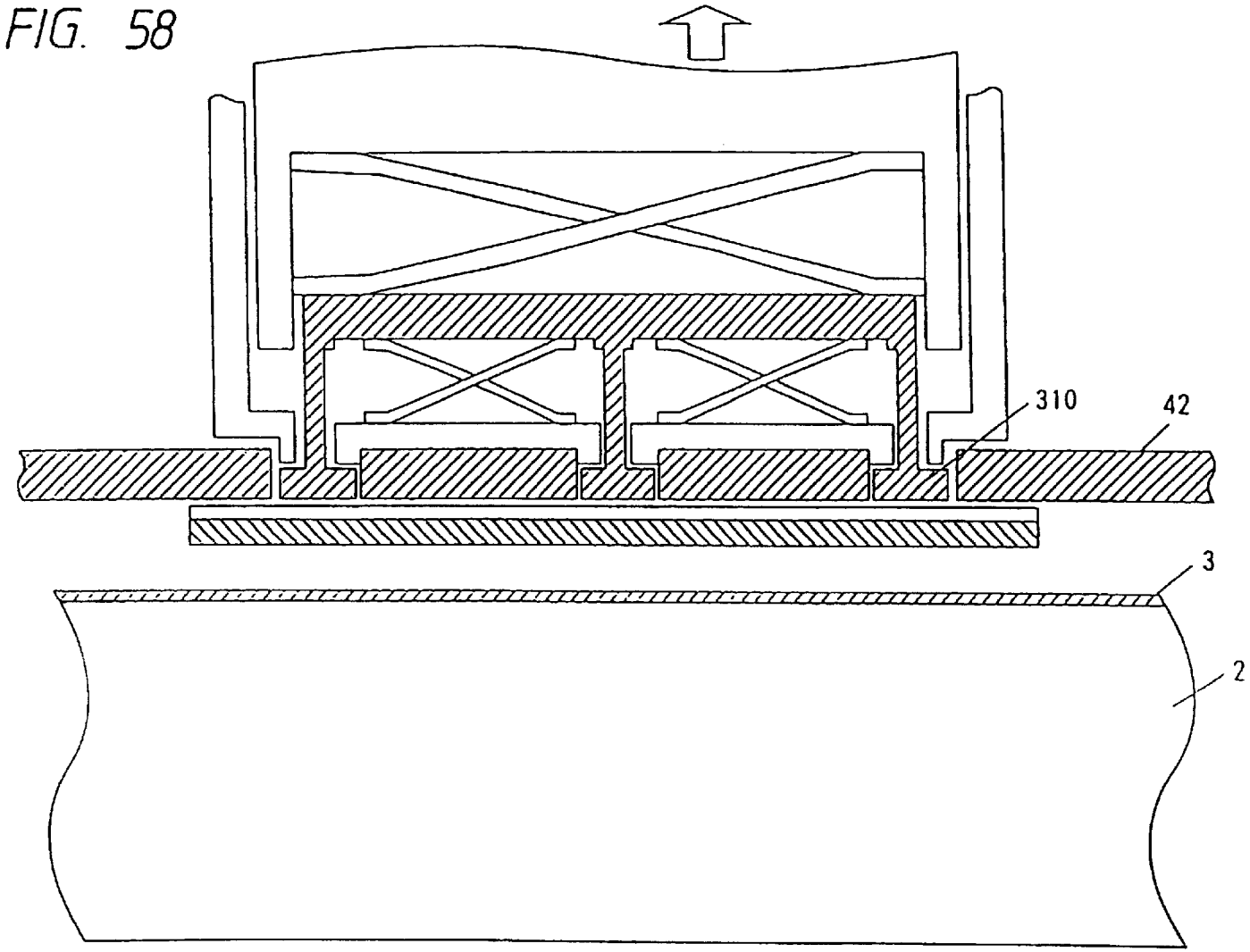

FIG. 58 is a sectional view of a liner pin front portion which assumes an off state in the seventh embodiment.

Figure 59:
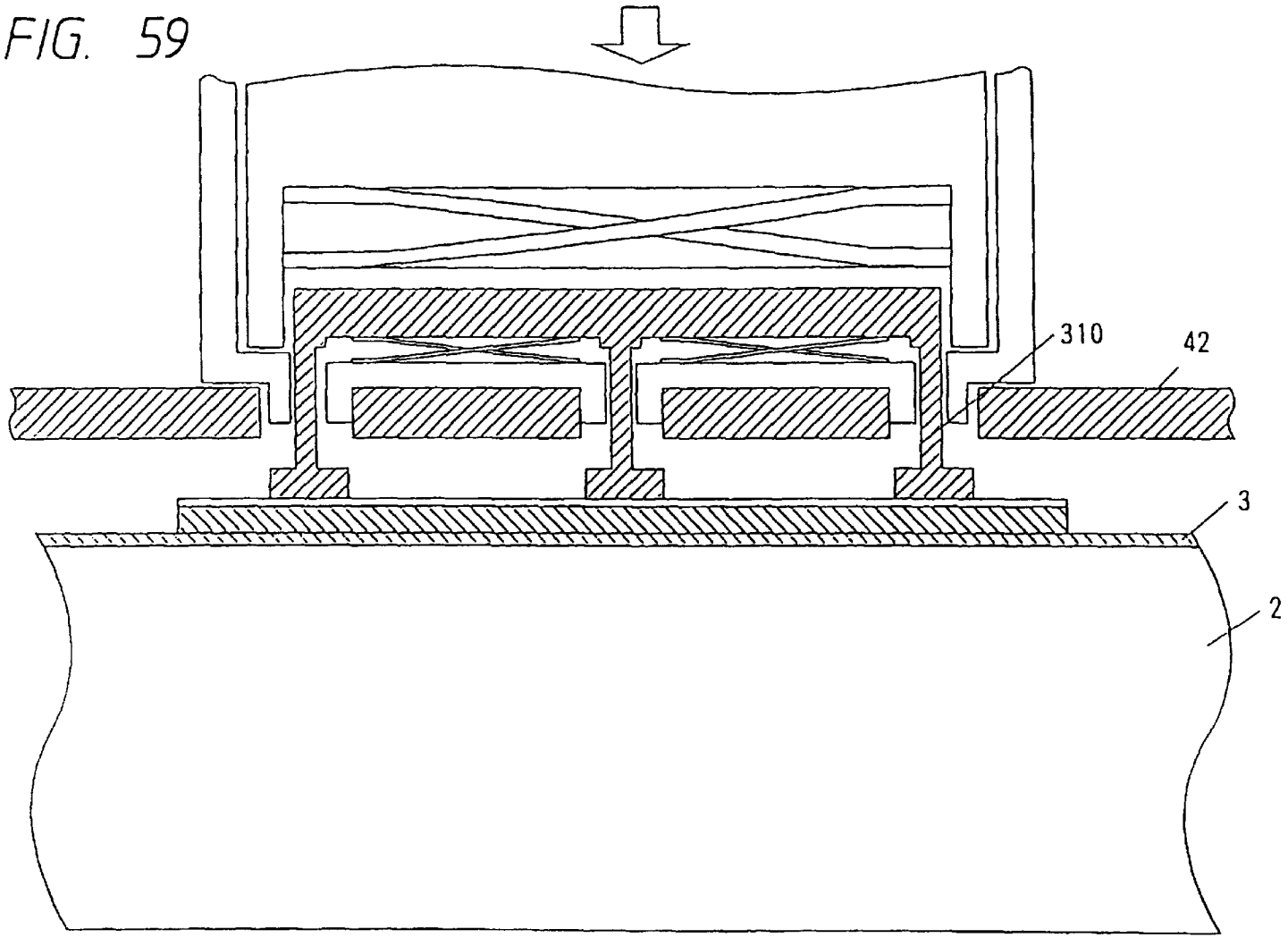

FIG. 59 is a sectional view of a liner pin front portion which assumes an on state in the seventh embodiment.

Figure 60:
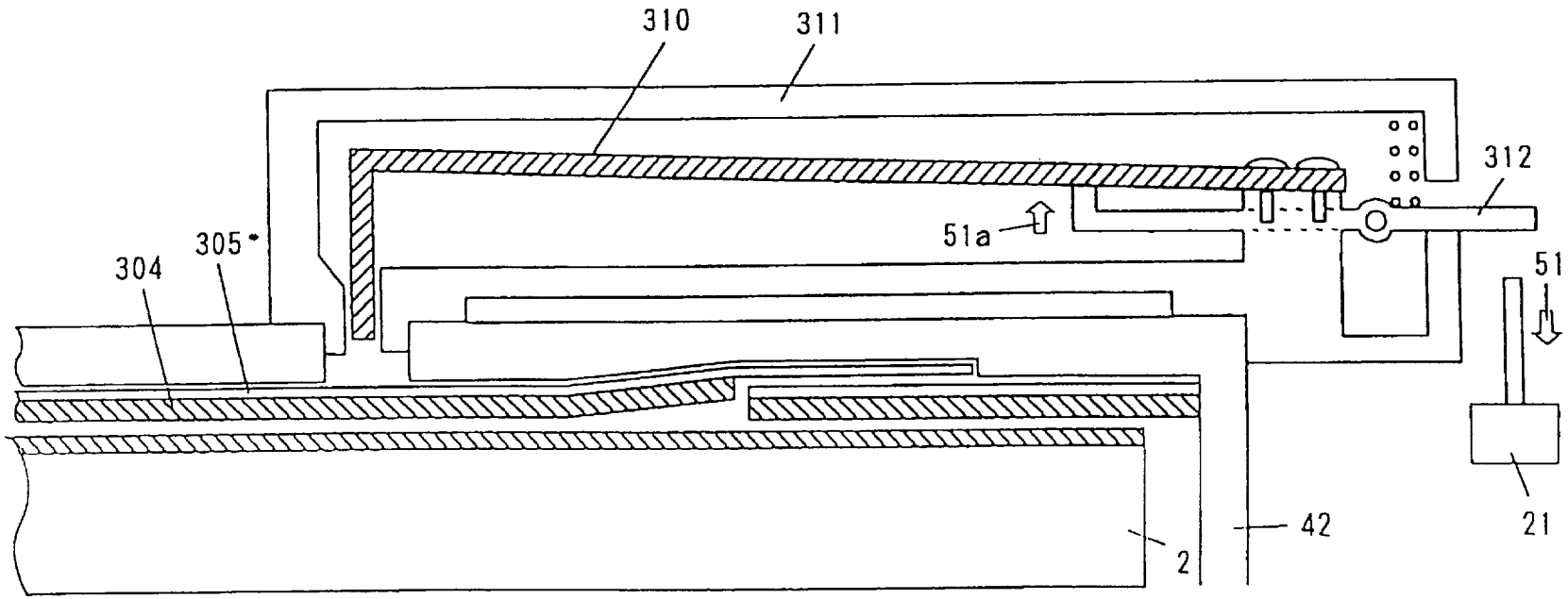

FIG. 60 is a transversely sectional view of a liner pin which assumes an off state in the seventh embodiment.

Figure 61:
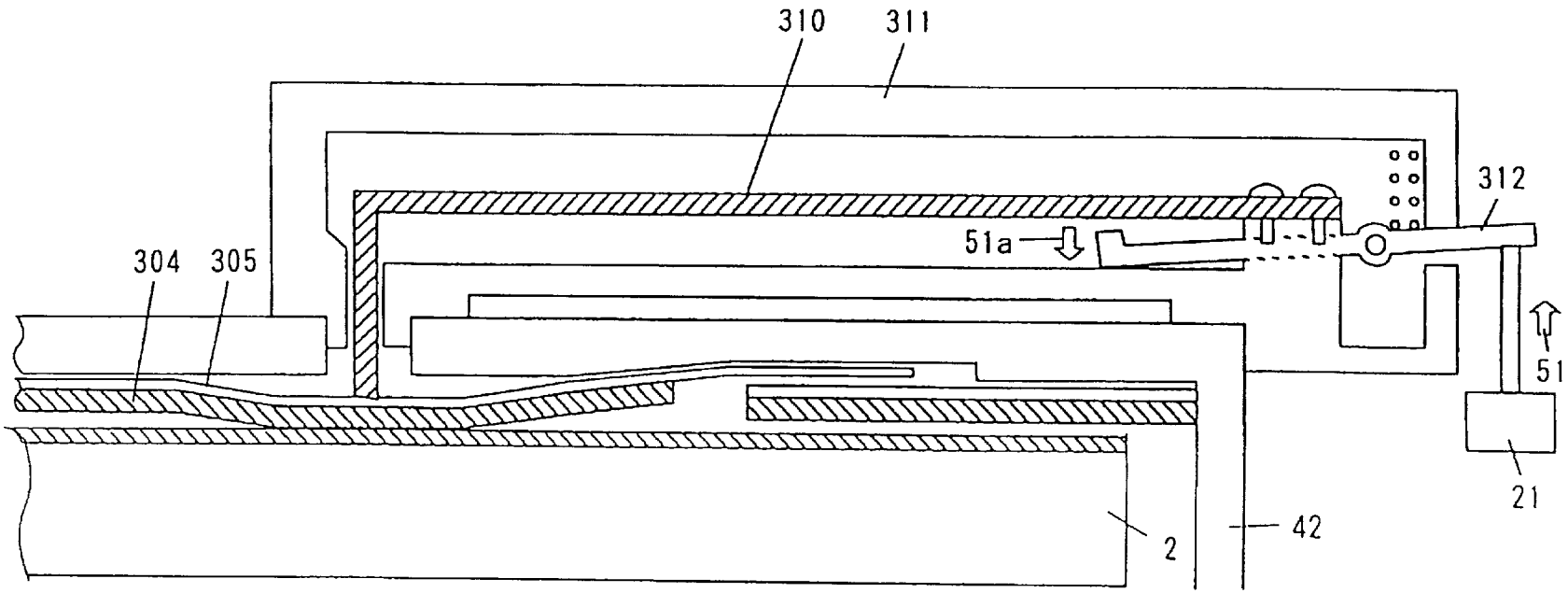

FIG. 61 is a transversely sectional view of a liner pin which assumes an on state in the seventh embodiment.

Figure 62:
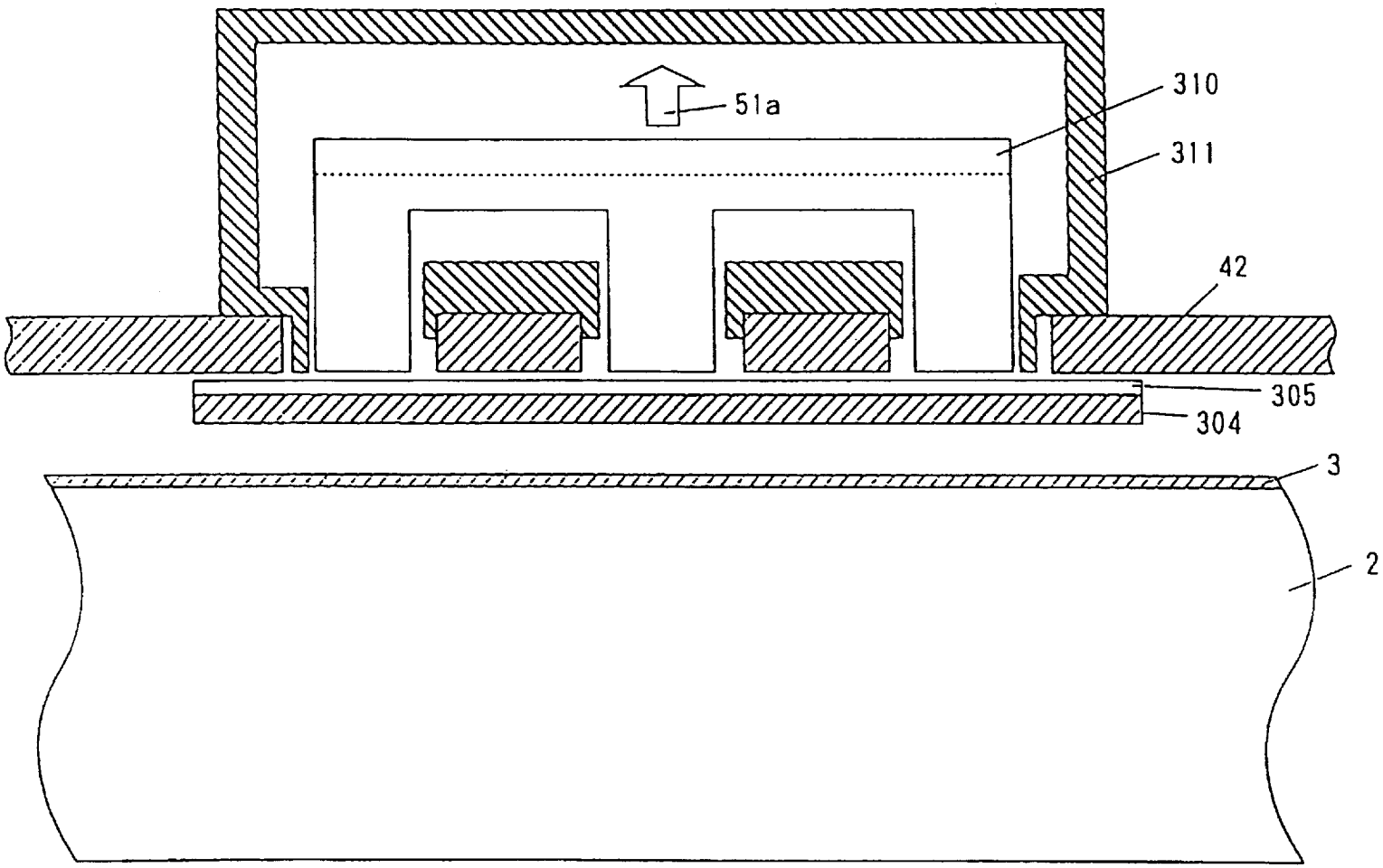

FIG. 62 is a sectional view of a front portion in the case where a liner pin is off in the seventh embodiment.

Figure 63:
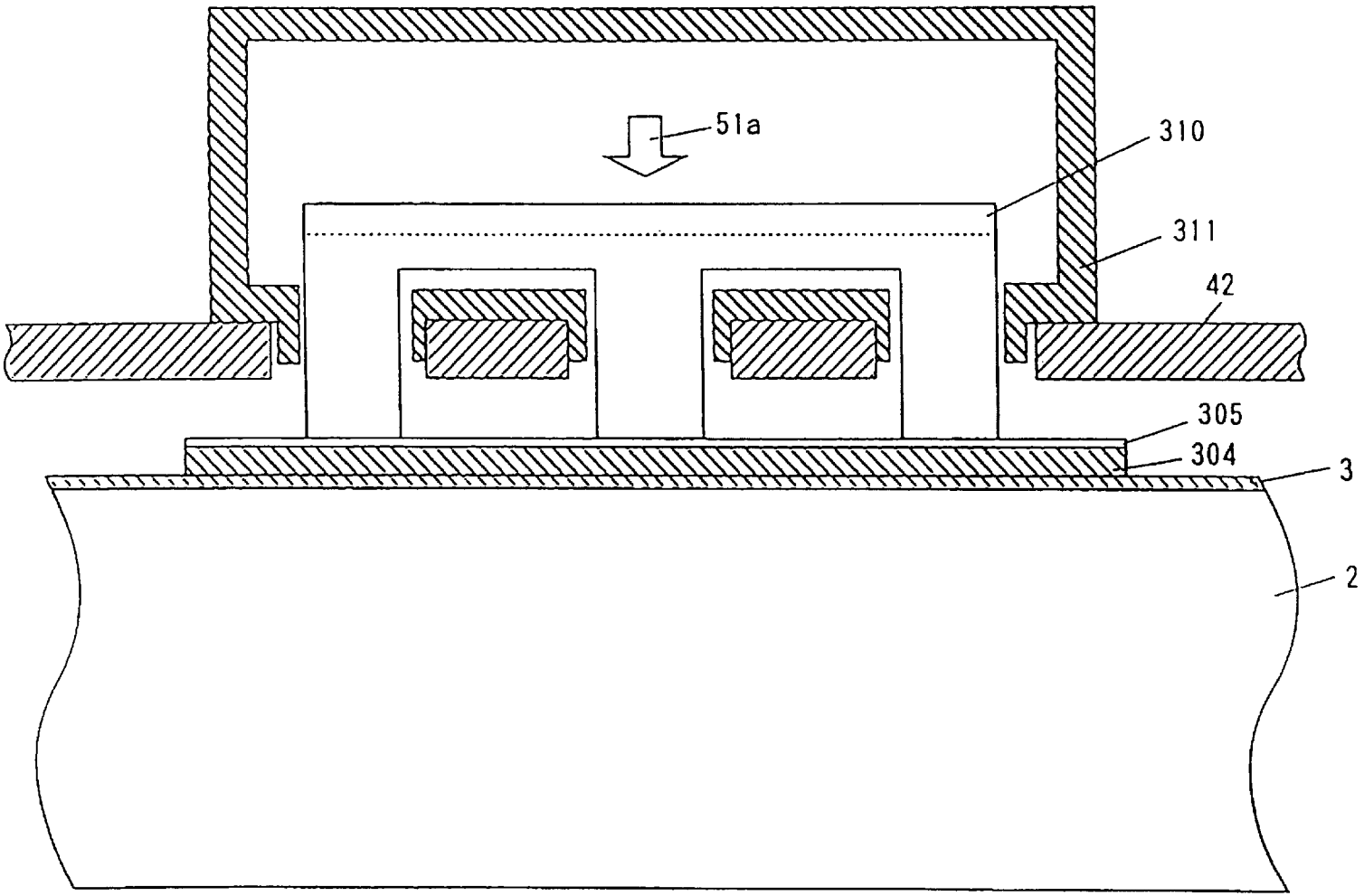

FIG. 63 is a sectional view of a front portion in the case where a liner pin is on in the seventh embodiment.

Figure 64:
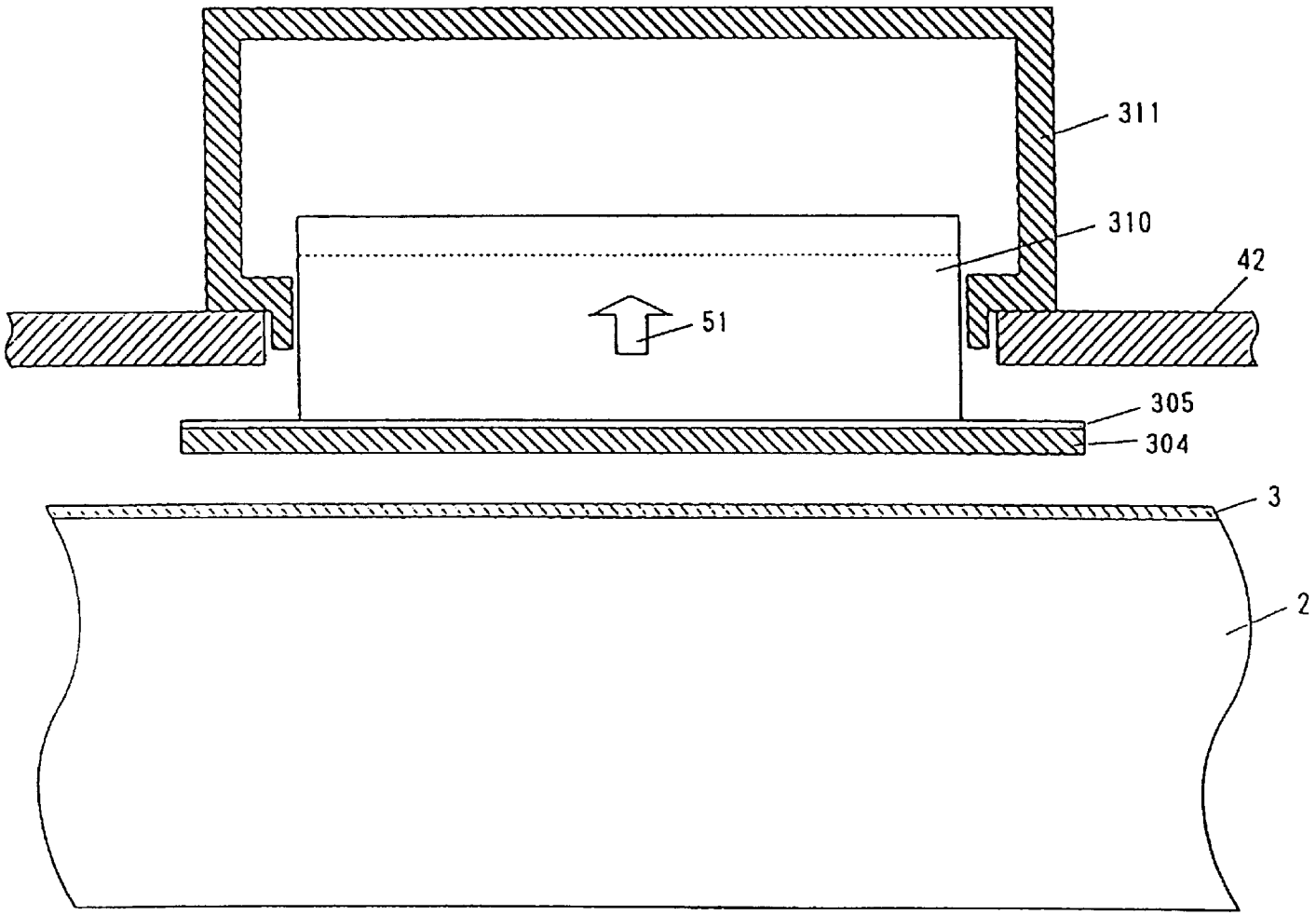

FIG. 64 is a sectional view of a front portion in the case where a liner pin is off in the seventh embodiment.

Figure 65:
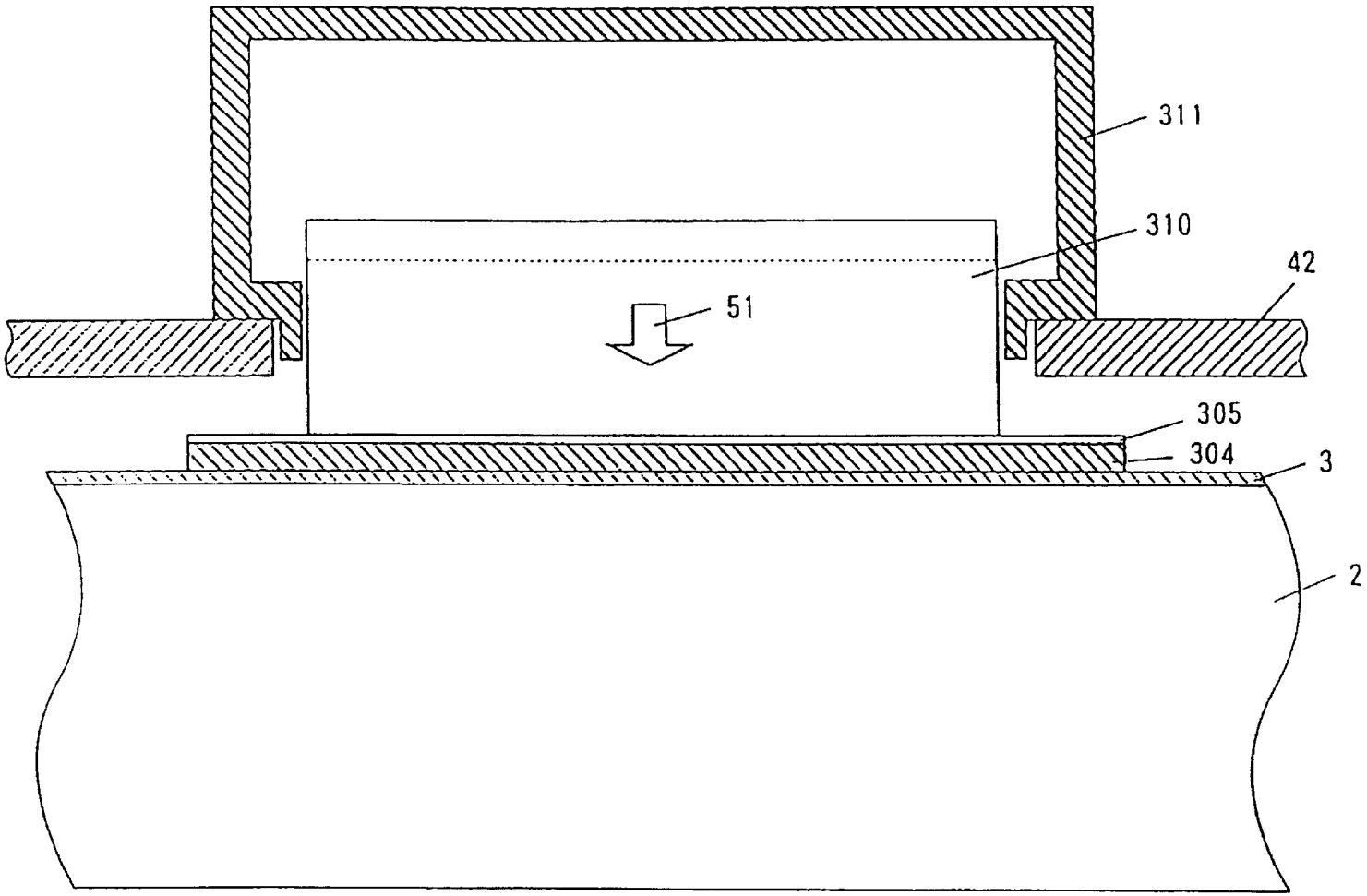

FIG. 65 is a sectional view of a front portion in the case where a liner pin is on in the seventh embodiment.

Figure 66:
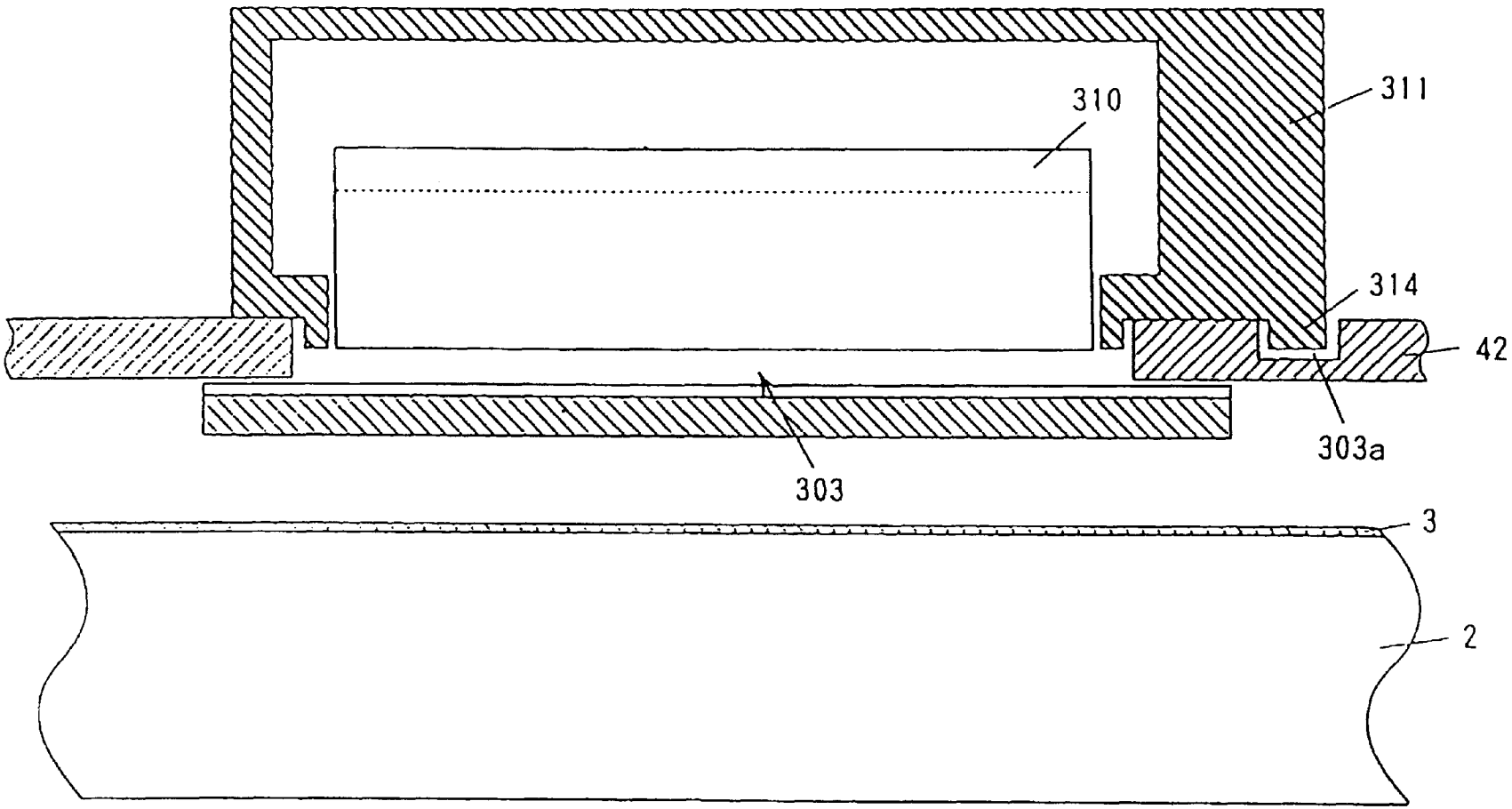

FIG. 66 is a sectional view of a front portion in the case where a liner pin is off in the seventh embodiment.

Figure 67:
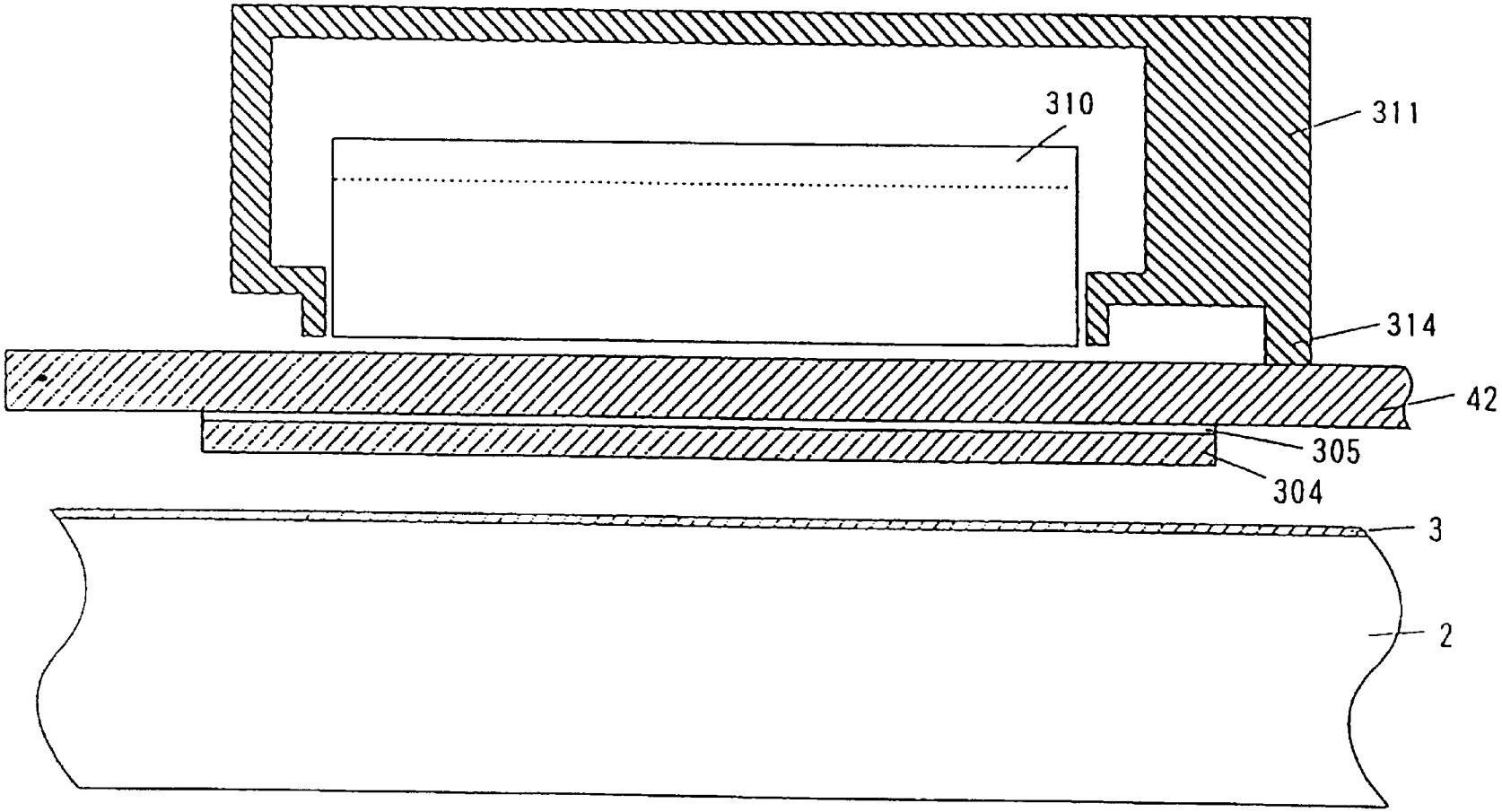

FIG. 67 is a sectional view of a front portion in the case where a liner pin is off and is inactive in the seventh embodiment.

Figure 68A:
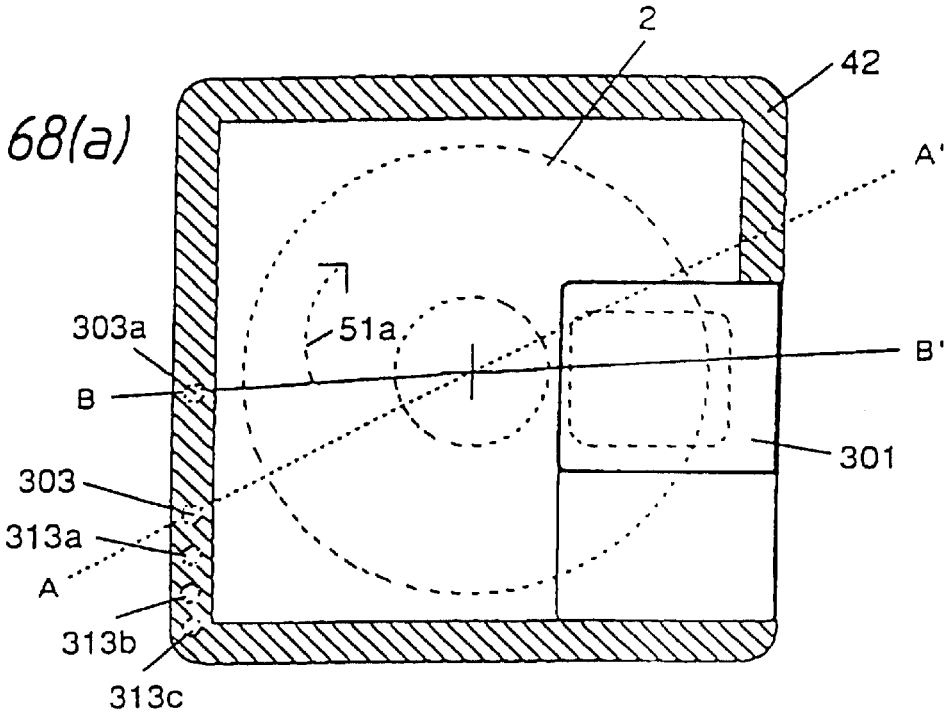

FIG. 68(a) is a top view of a disk cassette in an eighth embodiment of this invention.

Figure 68B:
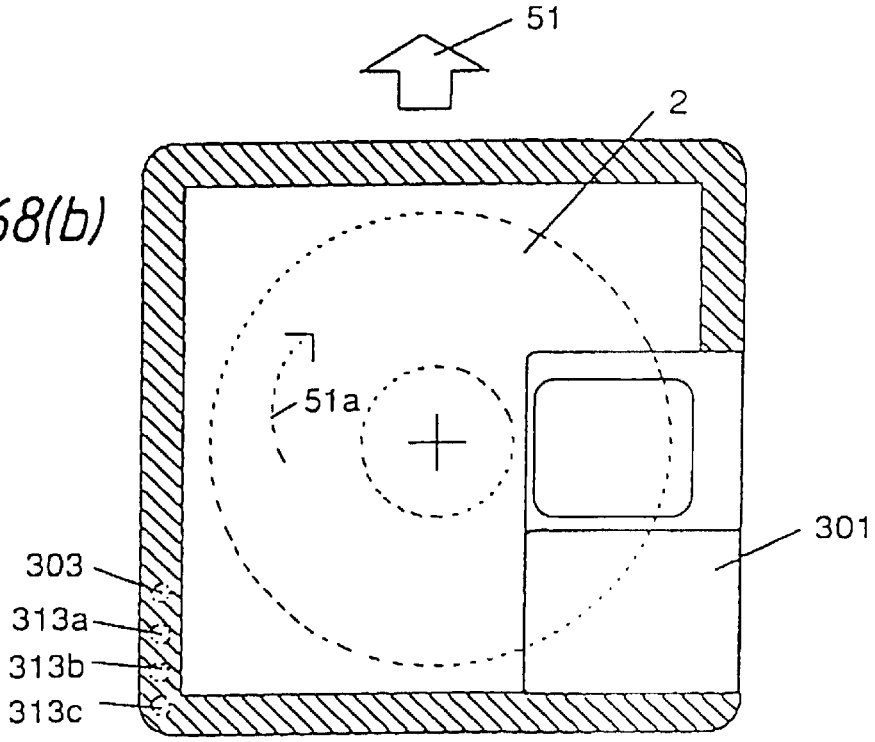

FIG. 68(b) is a top view of a disk cassette in the eighth embodiment.

Figure 69A:
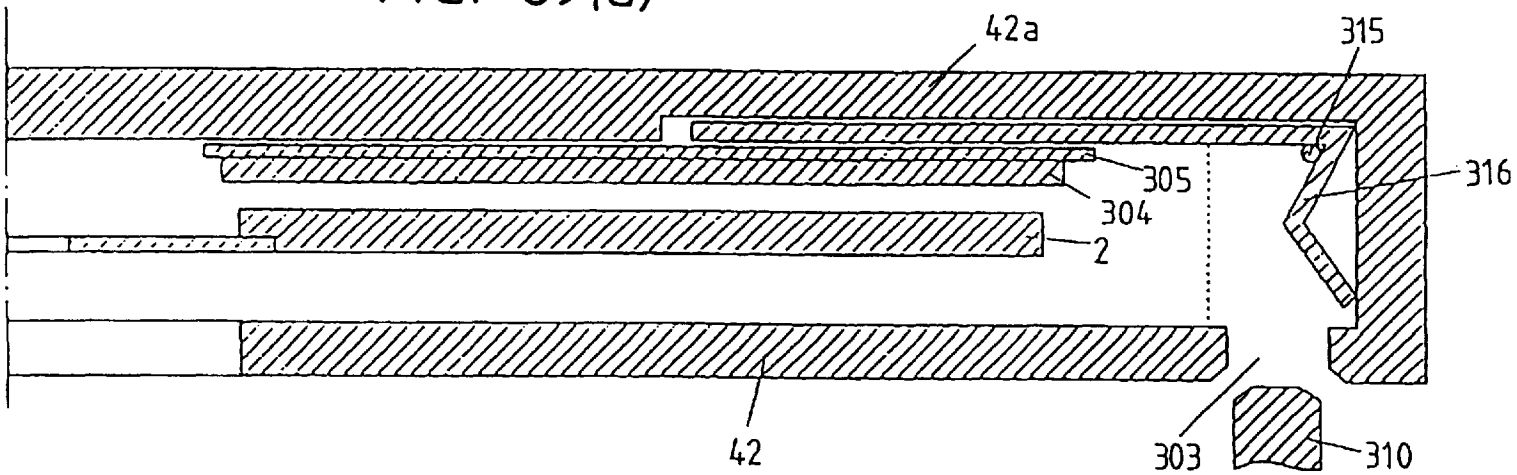

FIG. 69(a) is a transversely sectional view of a portion around a liner pin in the case where liner pin insertion is off in the eighth embodiment.

Figure 69B:
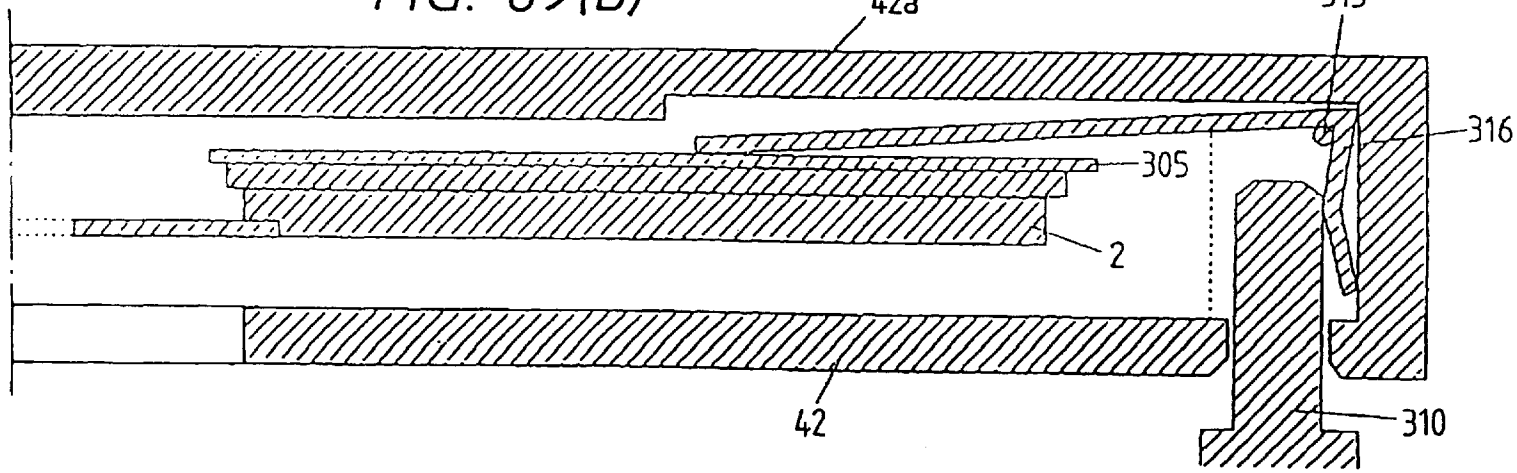

FIG. 69(b) is a transversely sectional view of a portion around a liner pin in the case where liner pin insertion is on in the eighth embodiment.

Figure 70A:
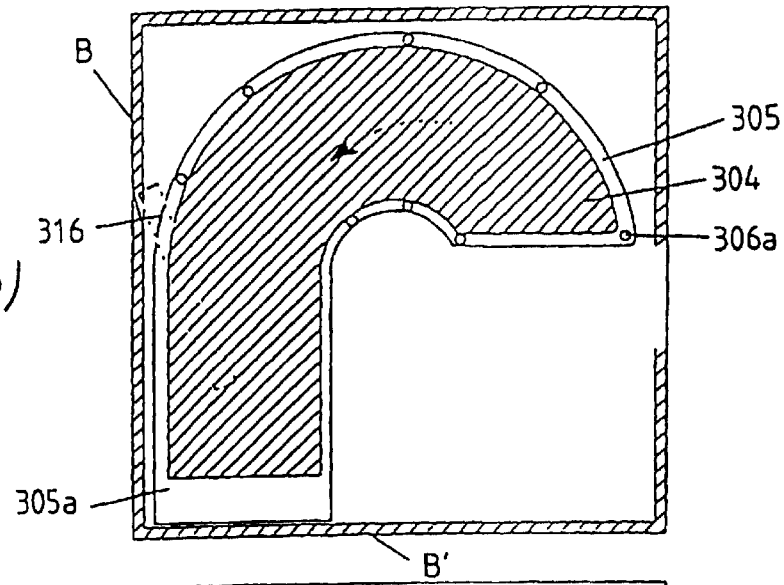

FIG. 70(a) is a top view of a disk cassette in the eighth embodiment.

Figure 70B:
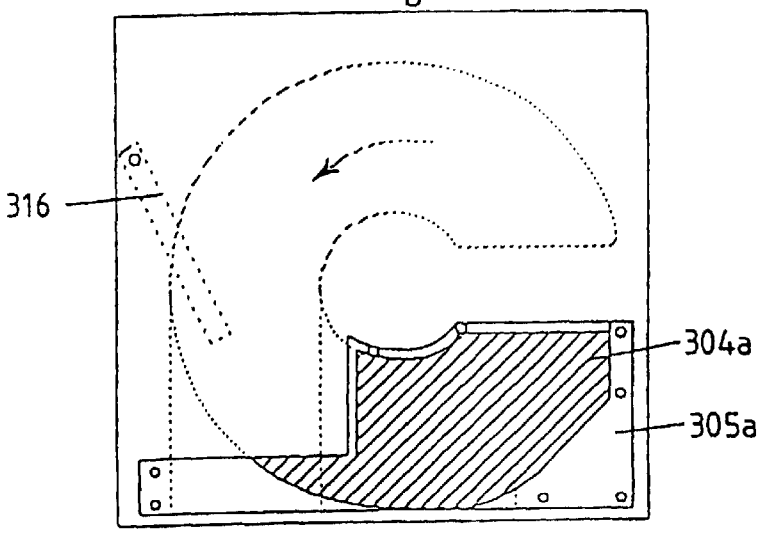

FIG. 70(b) in a top view of a disk cassette in the eighth embodiment.

Figure 70C:
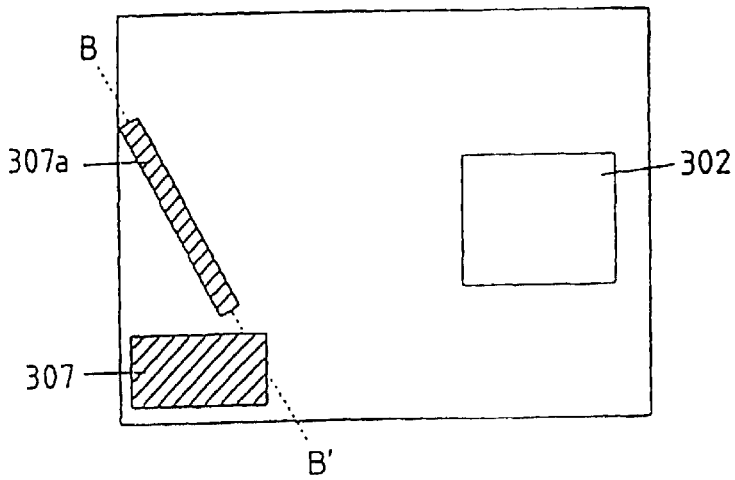

FIG. 70(c) is a top view of a disk cassette in the eighth embodiment.

Figure 71:
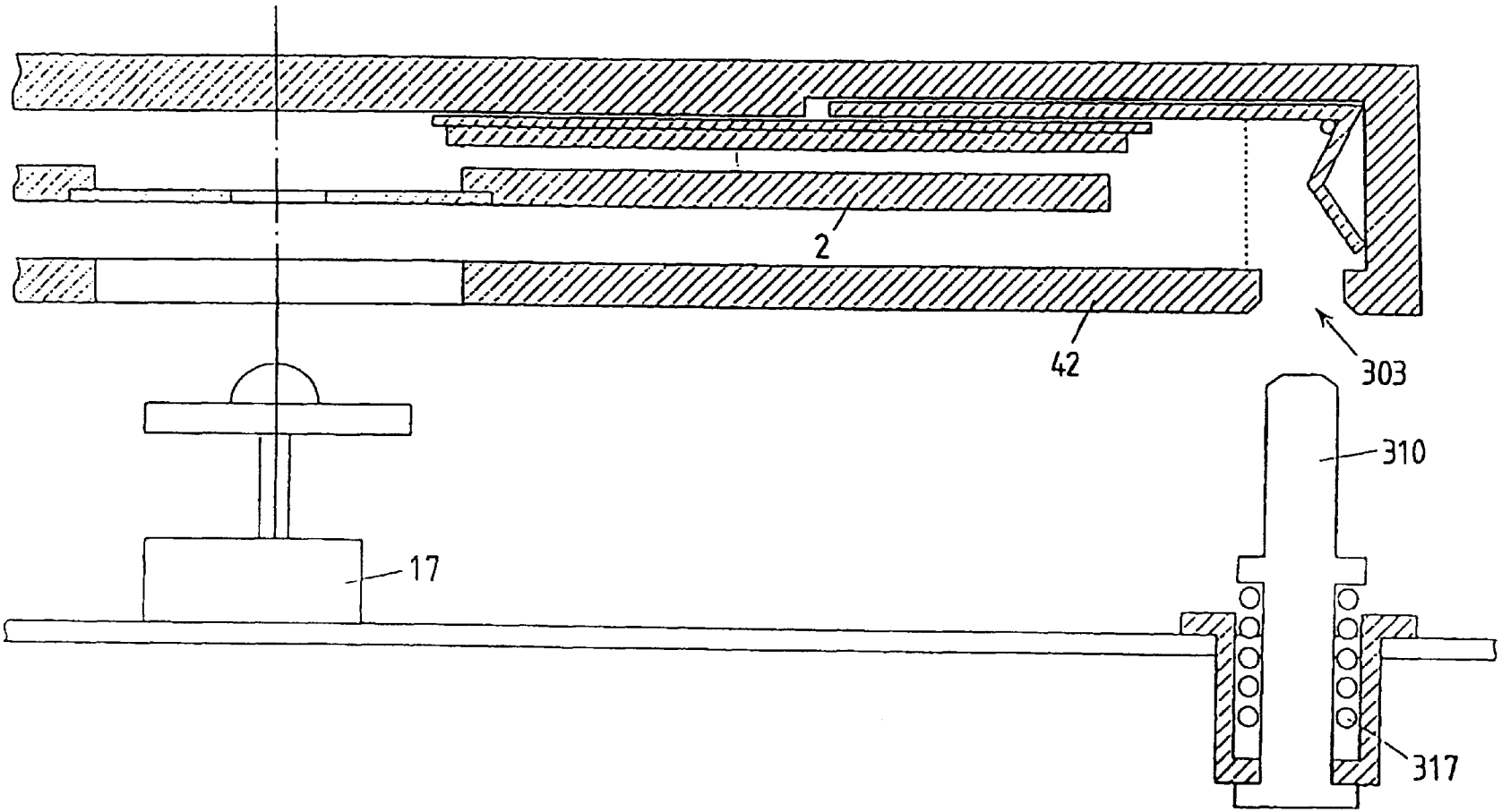

FIG. 71 is a transversely sectional view of a liner pin and a disk cassette in the eighth embodiment.

Figure 72A:
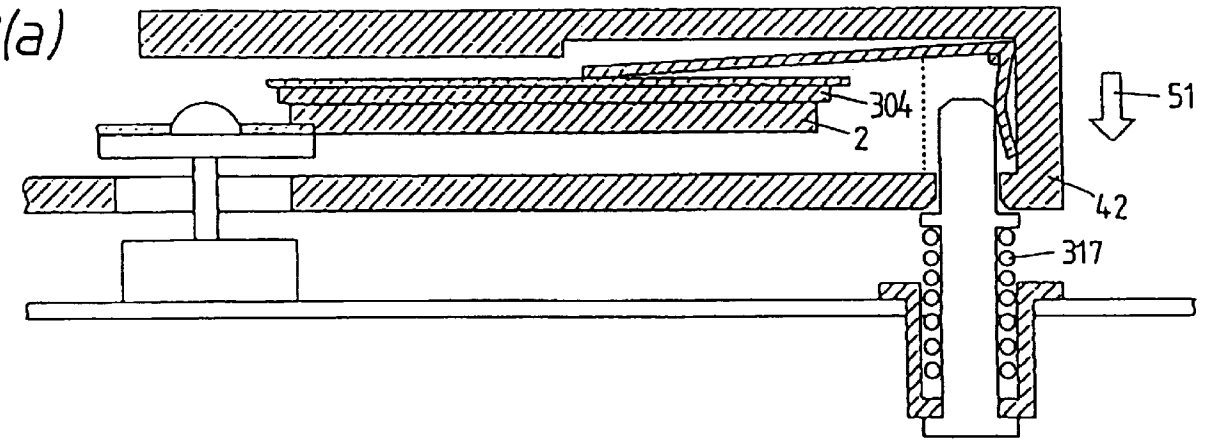

FIG. 72(a) is a transversely sectional view of a portion around a liner pin in the eighth embodiment.

Figure 72B:
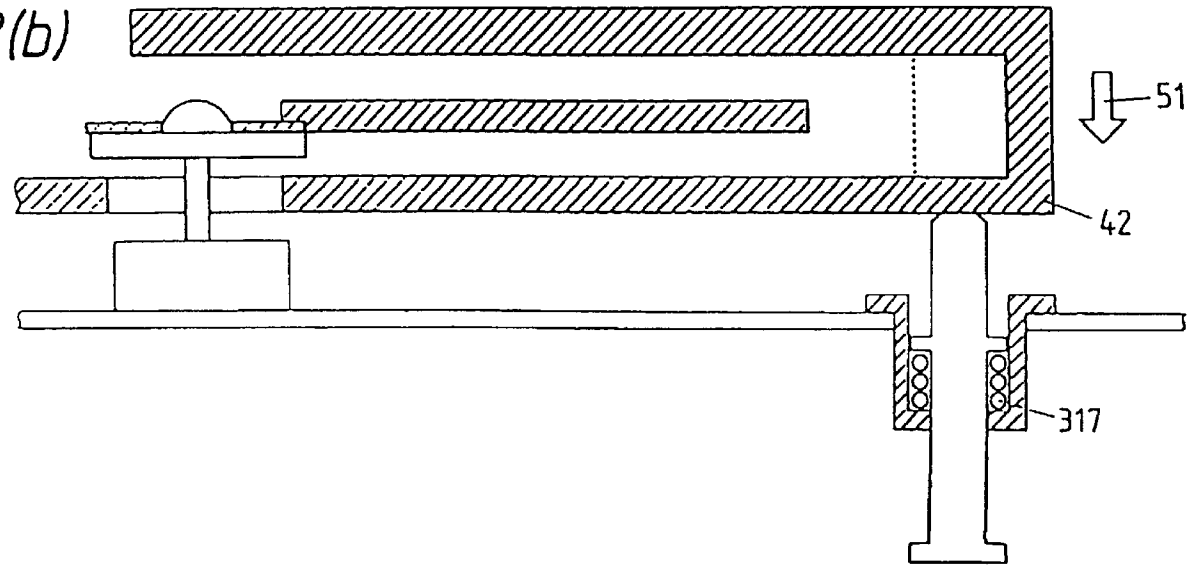

FIG. 72(b) is a transversely sectional view of a portion around a liner pin in the case where a conventional cassette is placed in an operable position in the eighth embodiment.

Figure 73A:
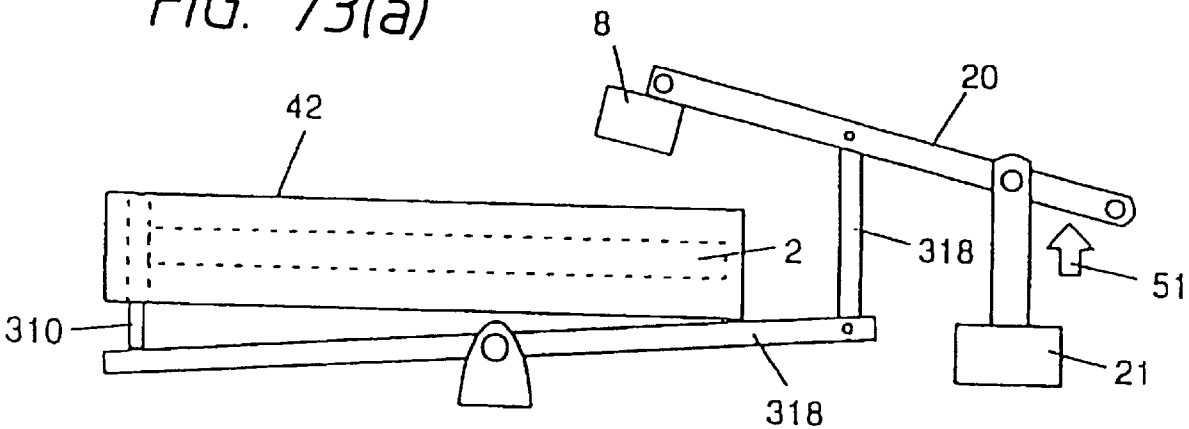

FIG. 73(a) is a transversely sectional view of a portion around a liner pin in the case where liner pin insertion is off in the eighth embodiment.

Figure 73B:
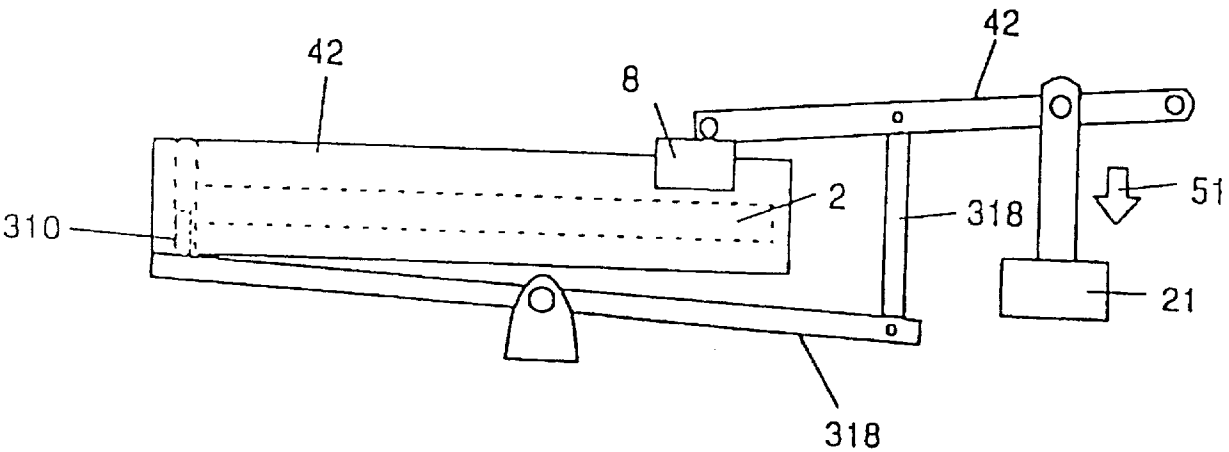

FIG. 73(b) is a transversely sectional view of a portion around a liner pin in the case where liner pin insertion is on in the eighth embodiment.

Figure 74A:
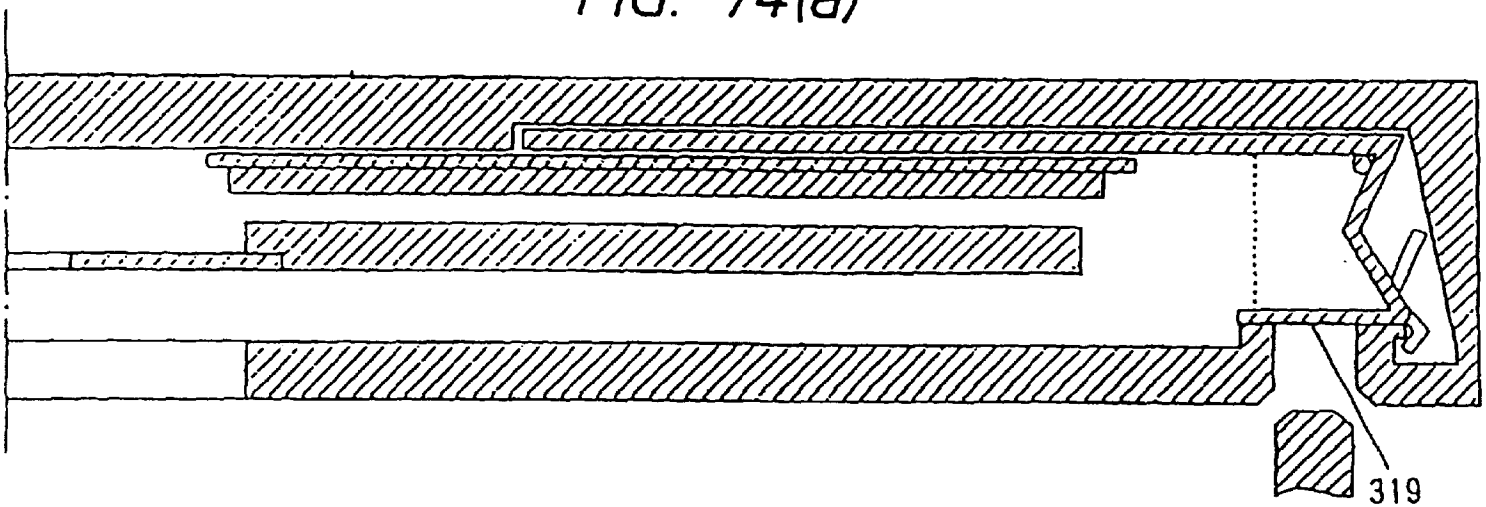

FIG. 74(a) is a transversely sectional view of a portion around a liner pin in the case where liner pin insertion is off in the eighth embodiment.

Figure 74B:
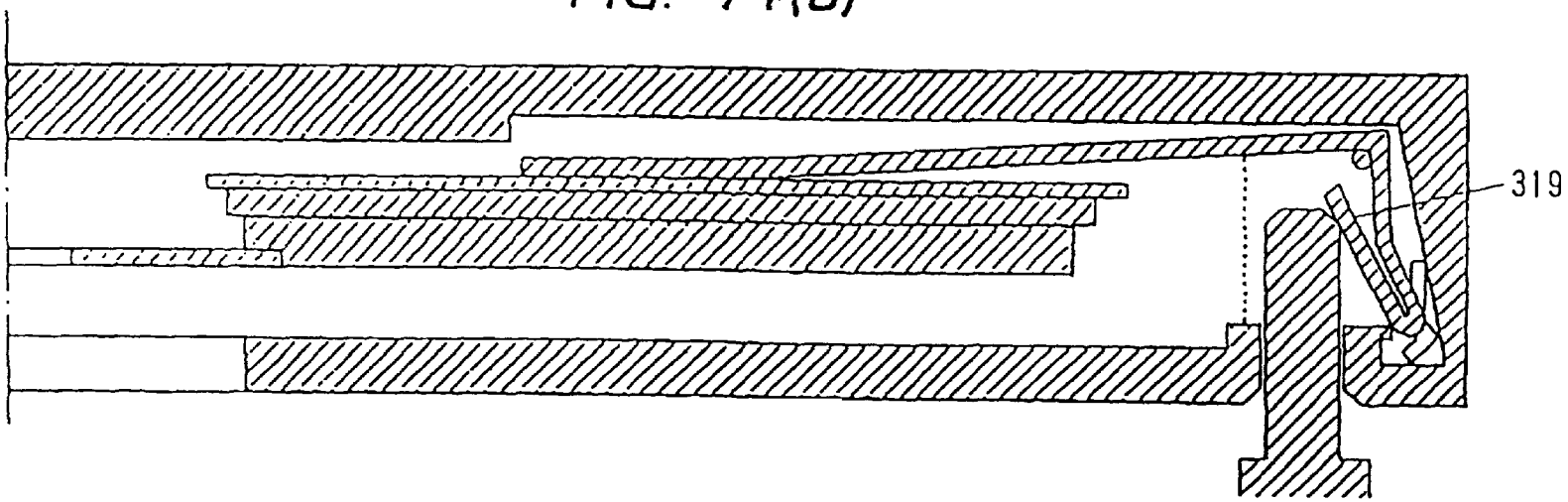

FIG. 74(b) is a transversely sectional view of a portion around a liner pin in the case where liner pin insertion is on in the eighth embodiment.

Figure 75:
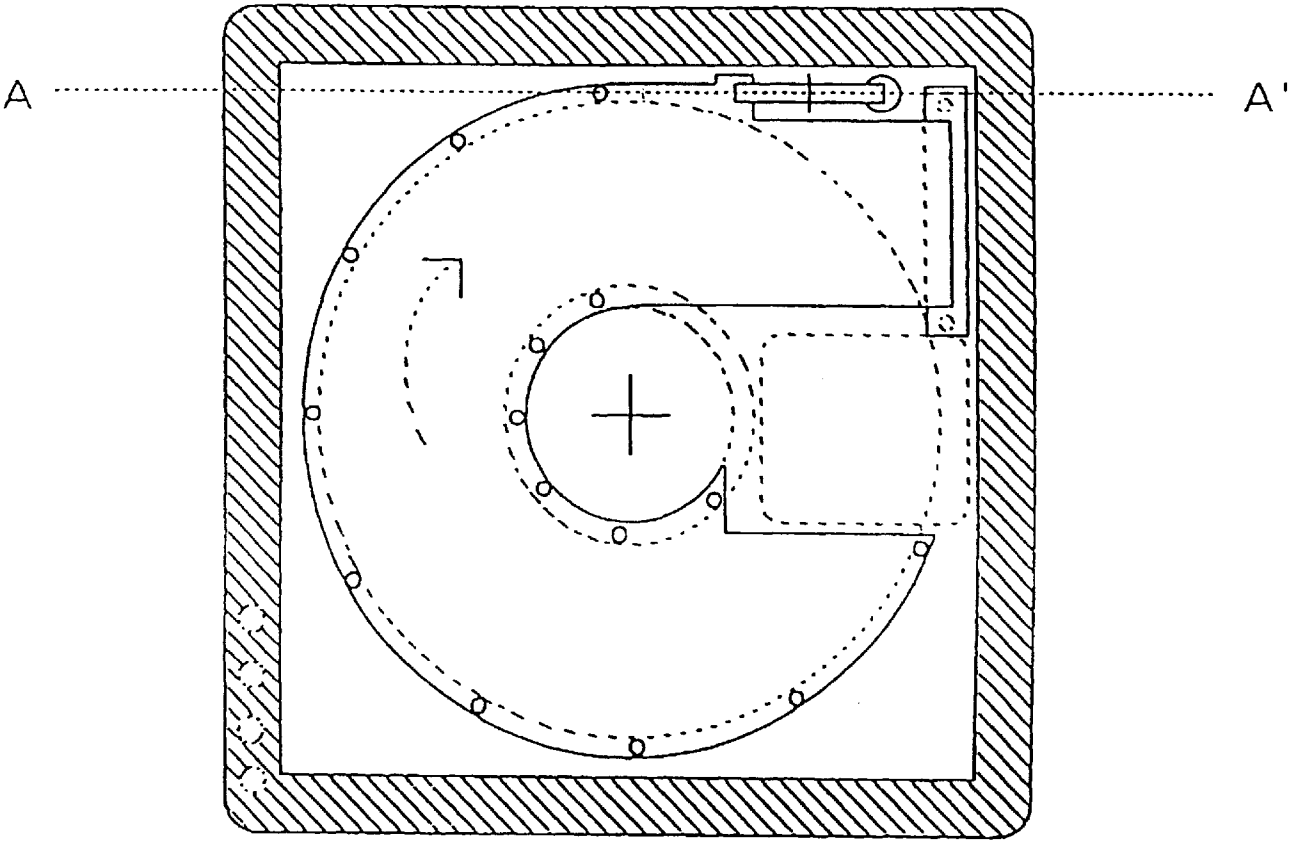

FIG. 75 is a top view of a disk cassette in a ninth embodiment of this invention.

Figure 76:
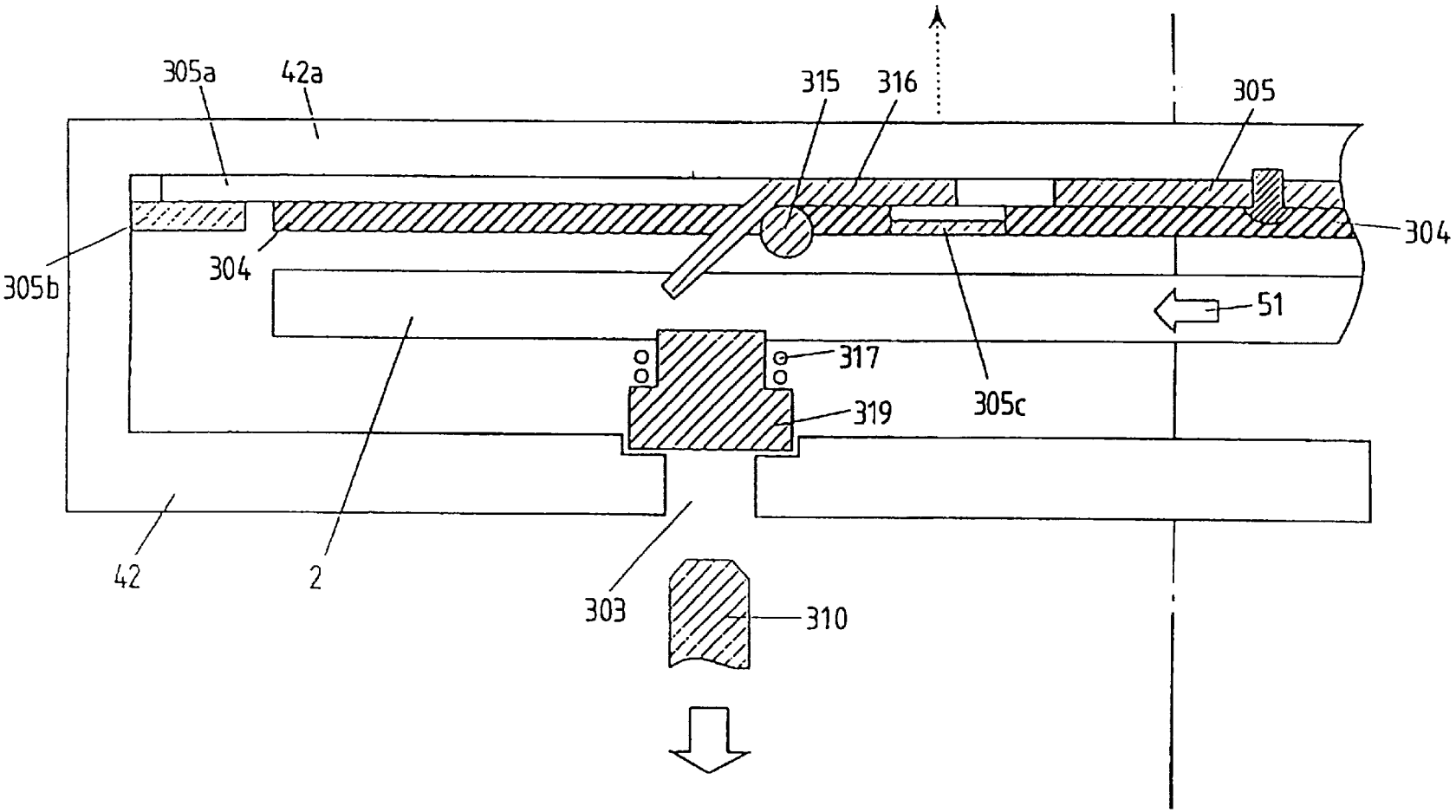

FIG. 76 Is a transversely sectional view of a portion around a liner pin in the case where liner pin insertion is off in the ninth embodiment.

Figure 77:
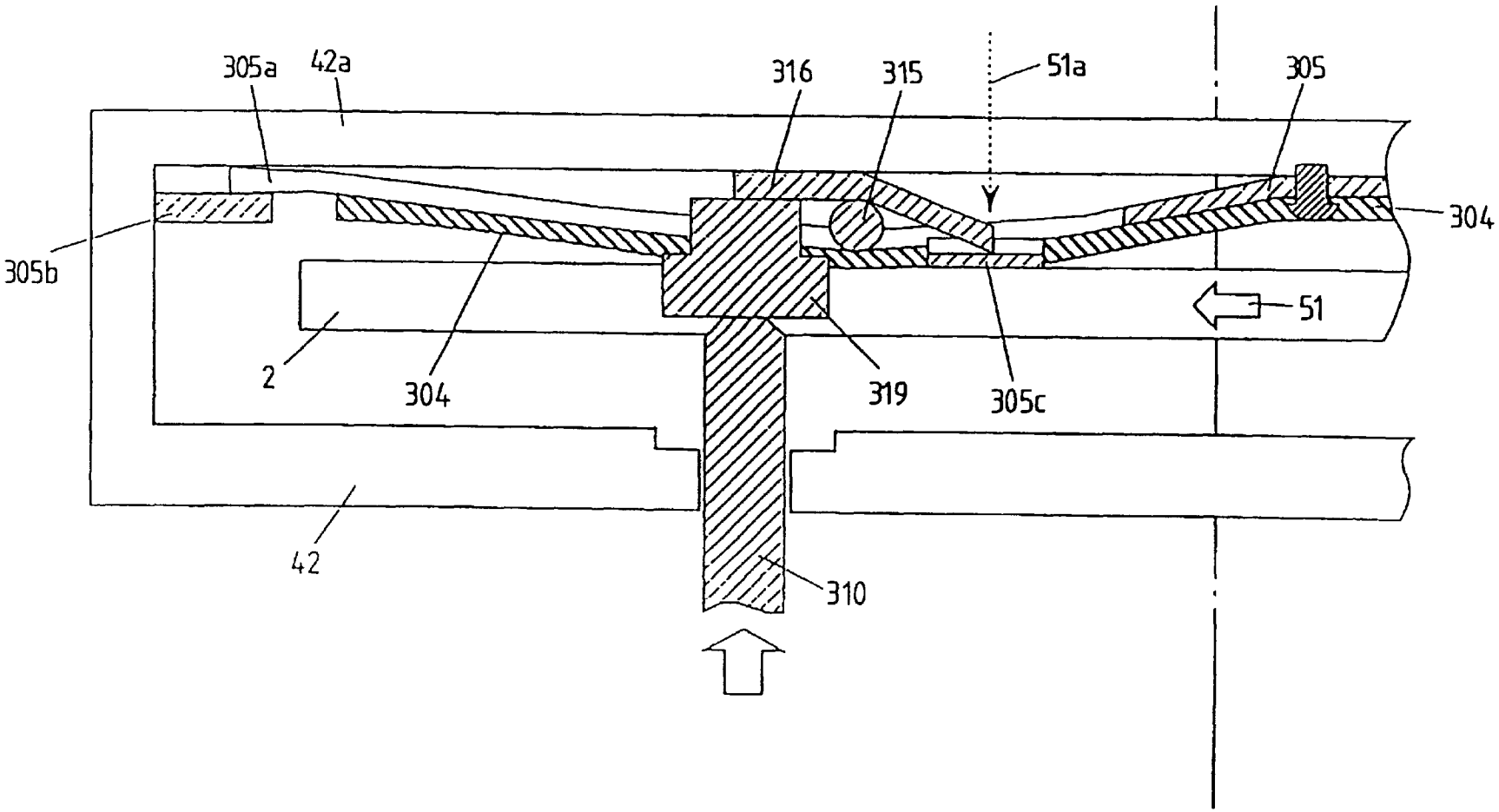

FIG. 77 is a transversely sectional view of a portion around a liner pin in the case where liner pin insertion is on in the ninth embodiment.

Figure 78A:
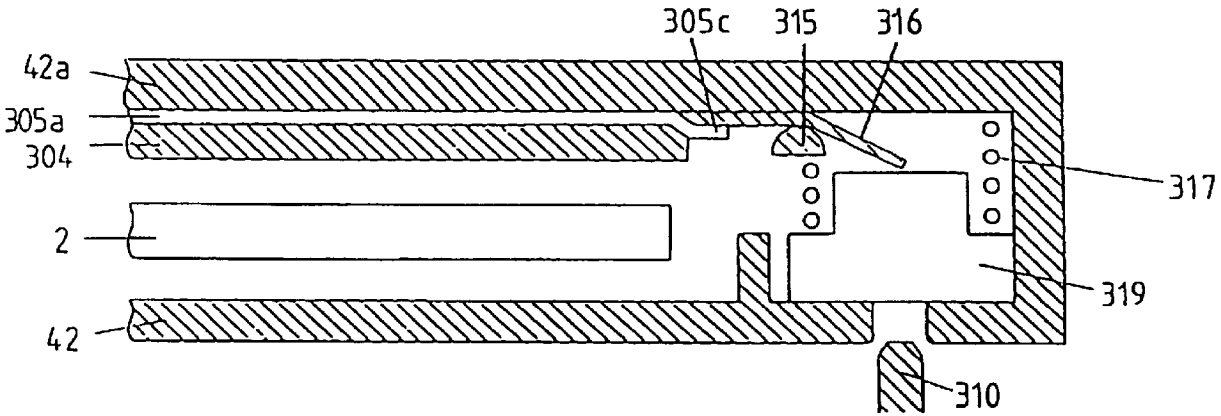

FIG. 78(a) is a transversely sectional view of a portion around a liner pin in the case where liner pin insertion is off in the ninth embodiment.

Figure 78B:
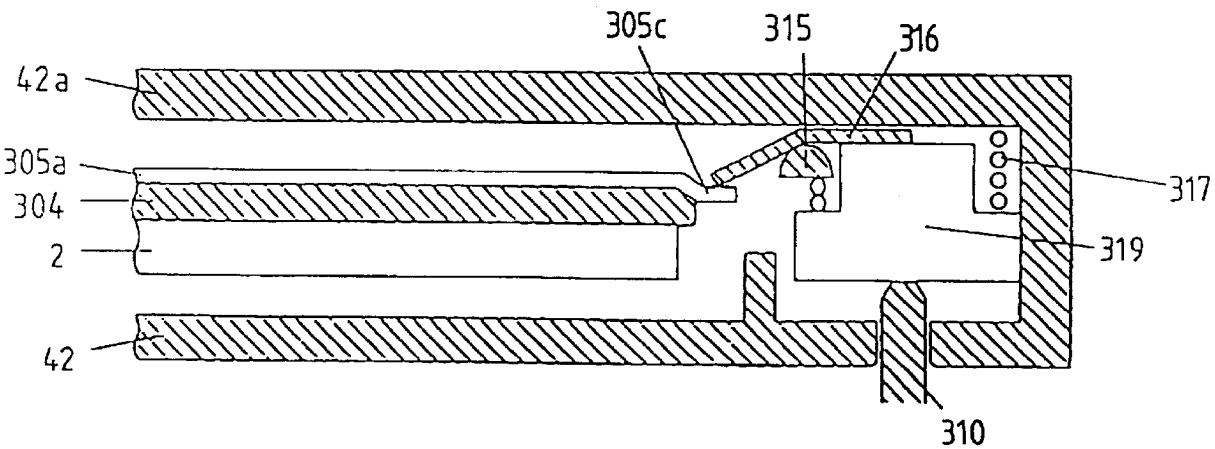

FIG. 78(b) is a transversely sectional view of a portion around a liner pin in the case where liner pin insertion is on in the ninth embodiment.

Figure 79A:
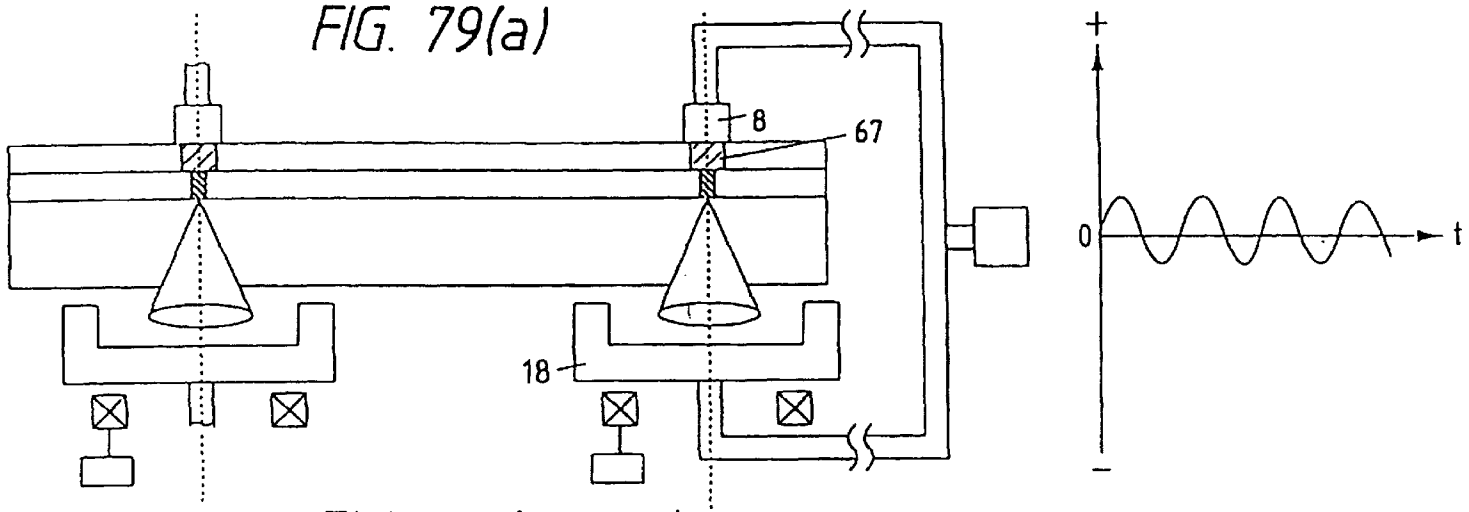

FIG. 79(a) is an illustration of a tracking principle which occurs in the absence of correction in a tenth embodiment of this invention.

Figure 79B:
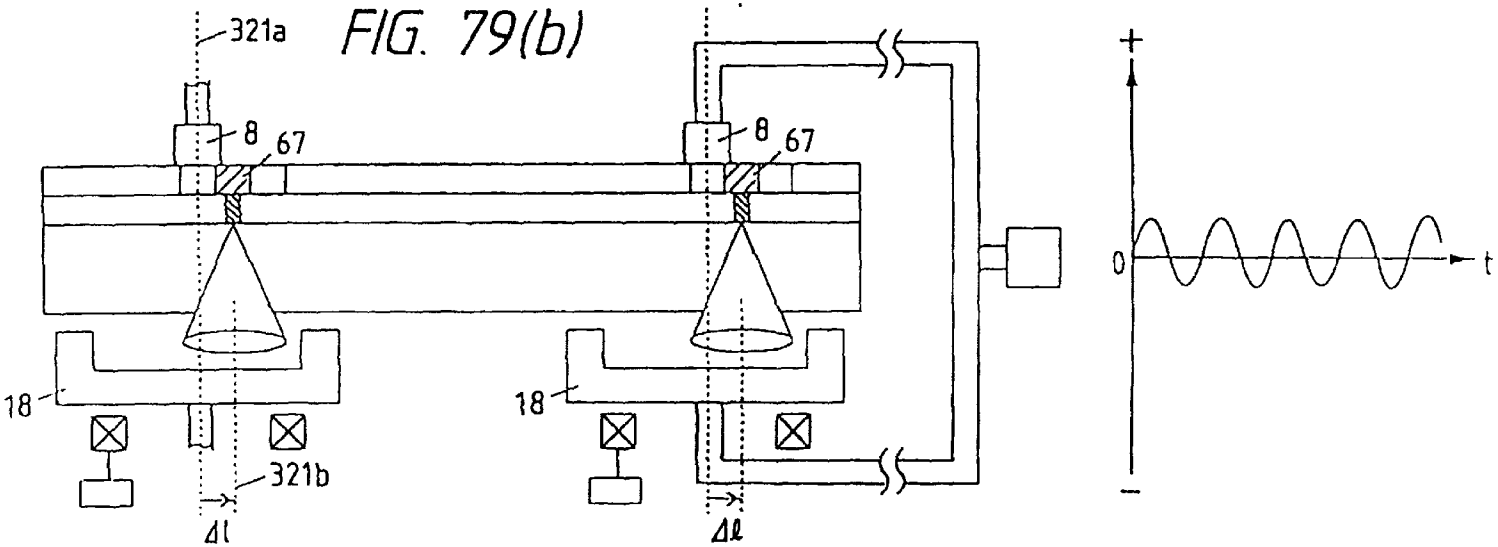

FIG. 79(b) is an illustration of a tracking principle which occurs in the absence of correction in the tenth embodiment.

Figure 80A:
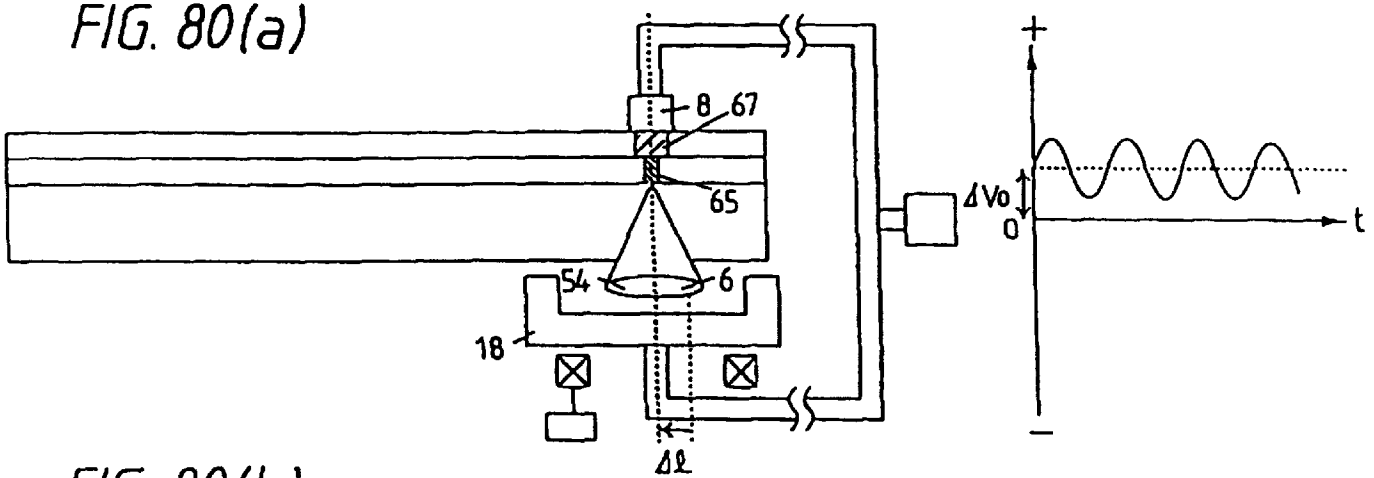

FIG. 80(a) is a view of tracking conditions of an optical head in the tenth embodiment.

Figure 80B:
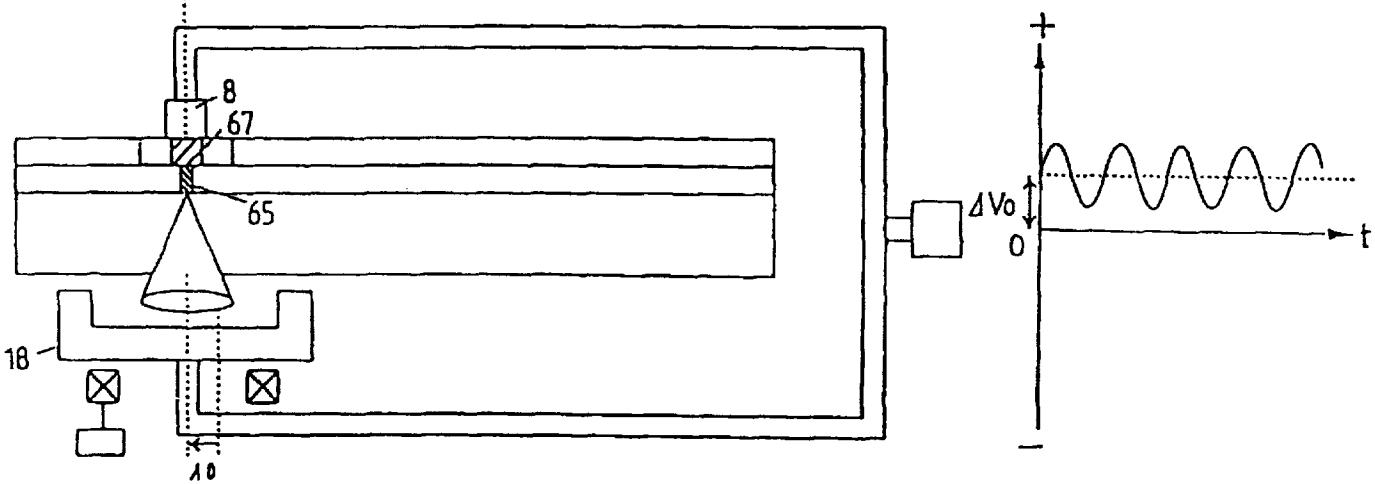

FIG. 80(b) is a view of tracking conditions of an optical head in the tenth embodiment.

Figure 81A:
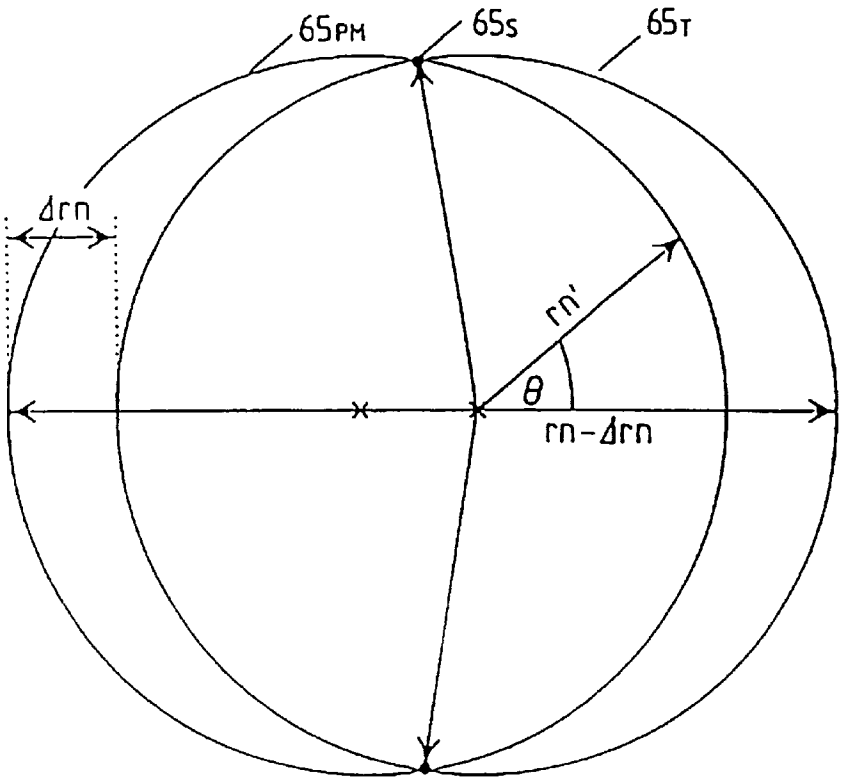

FIG. 81(a) is an illustration of an offset amount of an optical track on a disk in the tenth embodiment.

Figure 81B:
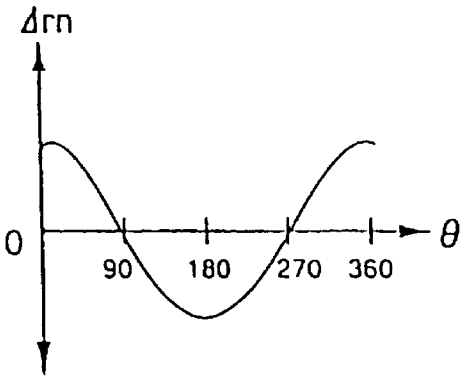

FIG. 81(b) is an illustration of an offset amount of an optical track on a disk in the tenth embodiment.

Figure 81C:
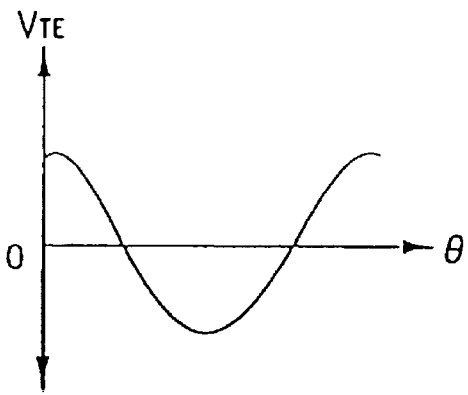

FIG. 81(c) is an illustration of a tracking error signal in the tenth embodiment.

Figure 82A:
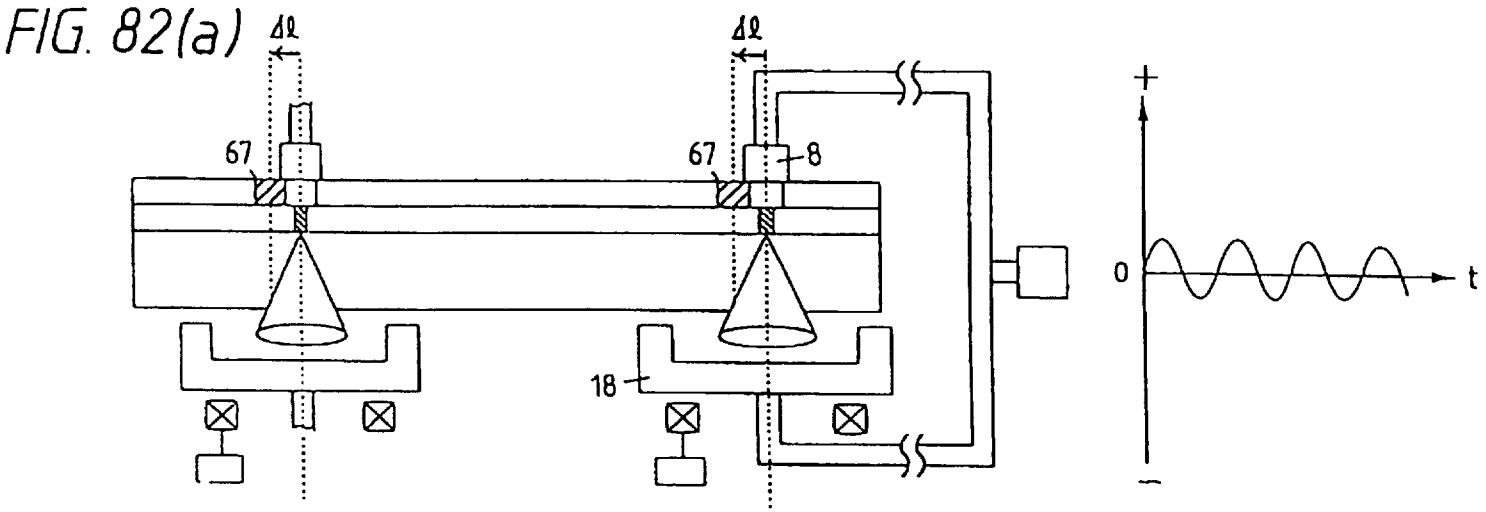

FIG. 82(a) is a view of tracking conditions of an optical head which occur in the absence of correction in the tenth embodiment.

Figure 82B:
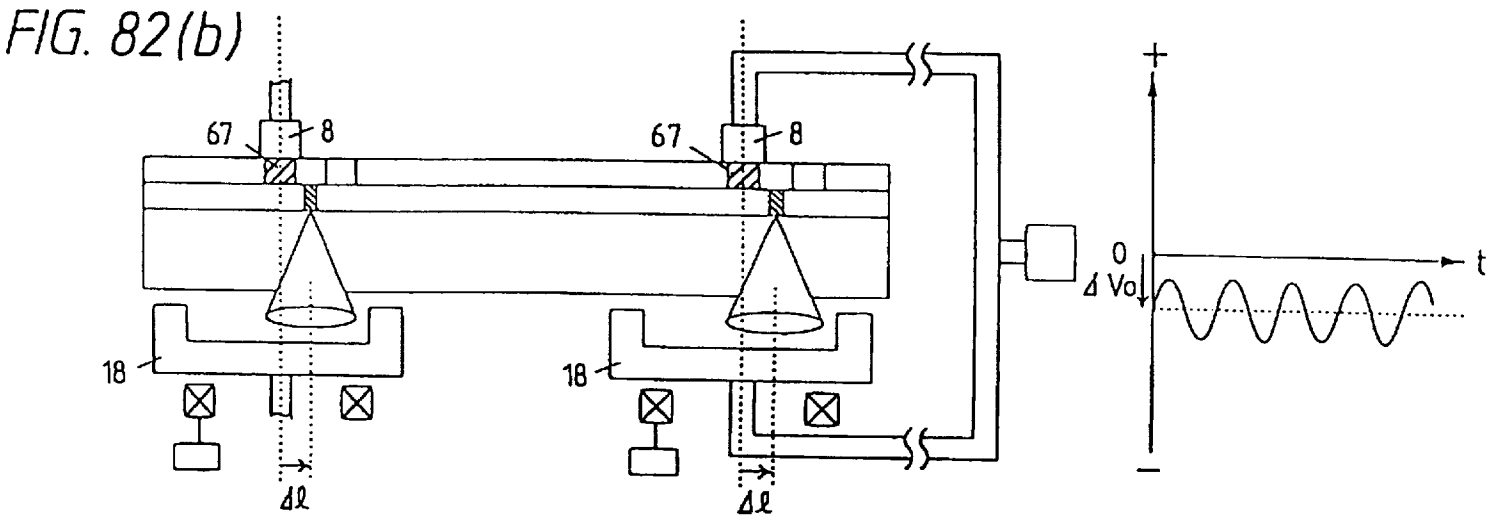

FIG. 82(b) is a view of tracking conditions of an optical head which occur in the presence of correction in the tenth embodiment.

Figure 83:
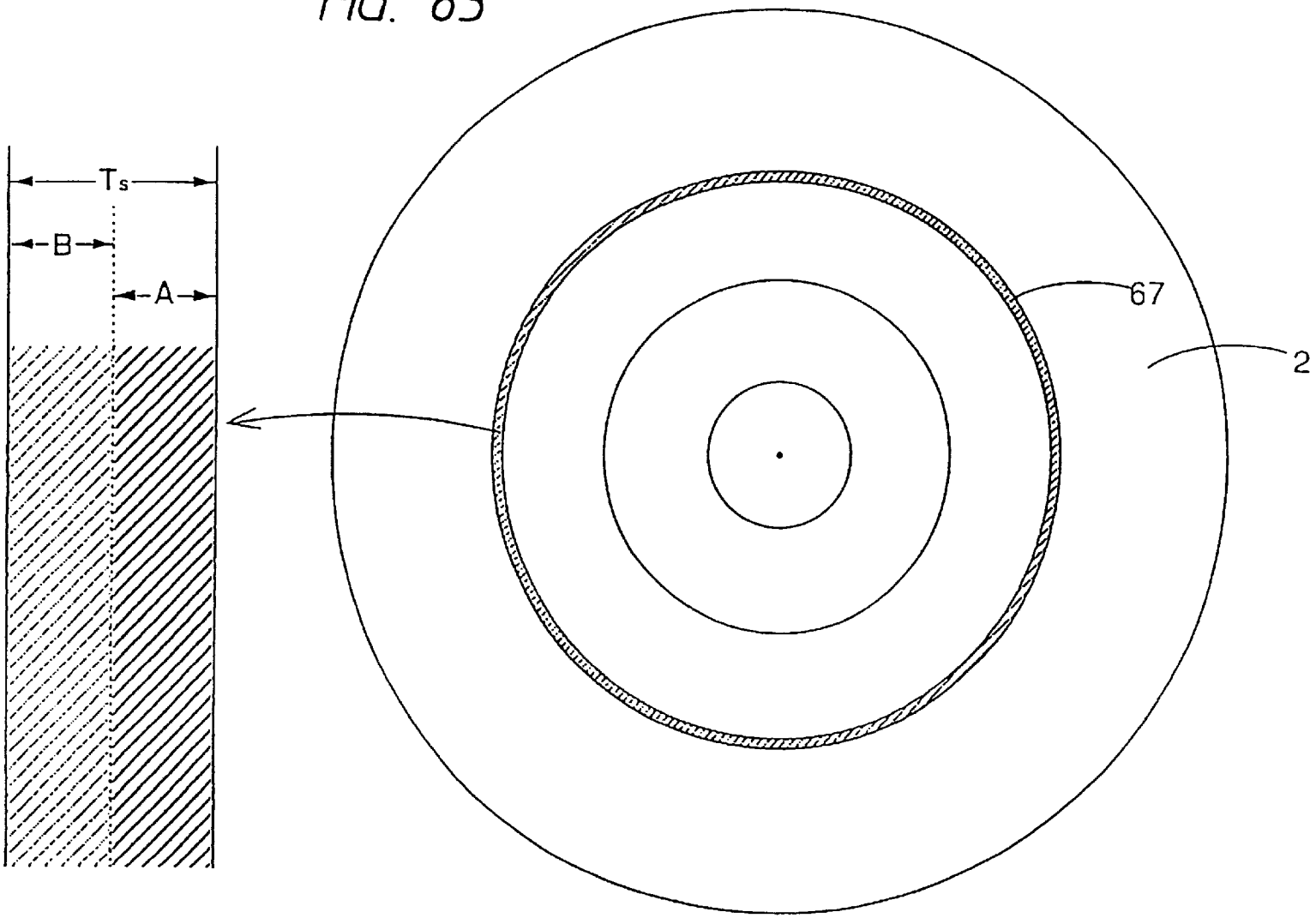

FIG. 83 is an illustration of a reference track in the tenth embodiment.

Figure 84A:
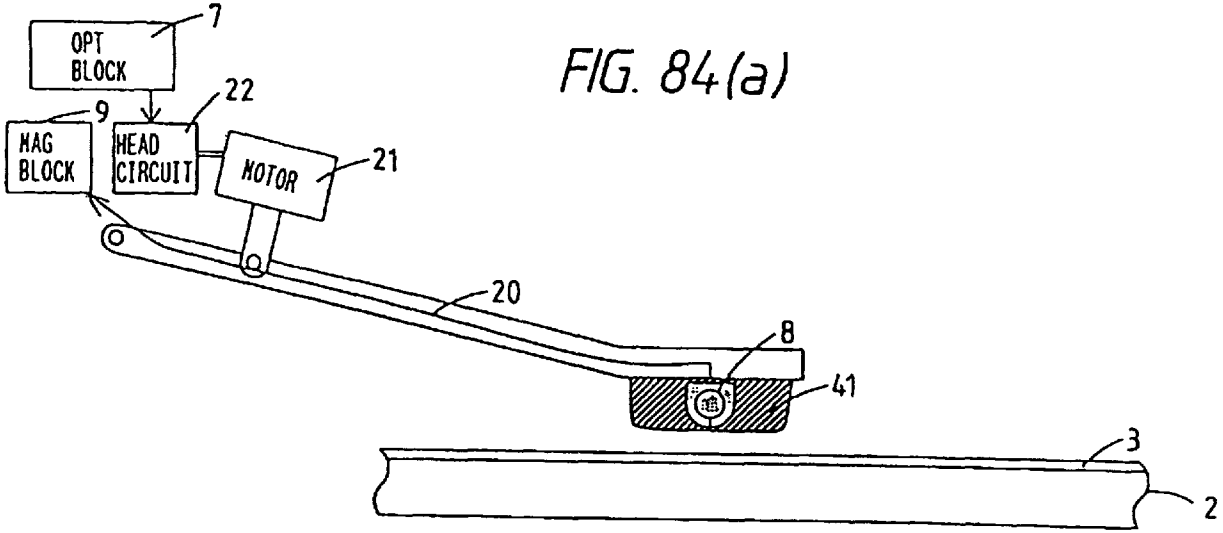

FIG. 84(a) is a side view of a slider in the case of an ON state in the tenth embodiment.

Figure 84B:
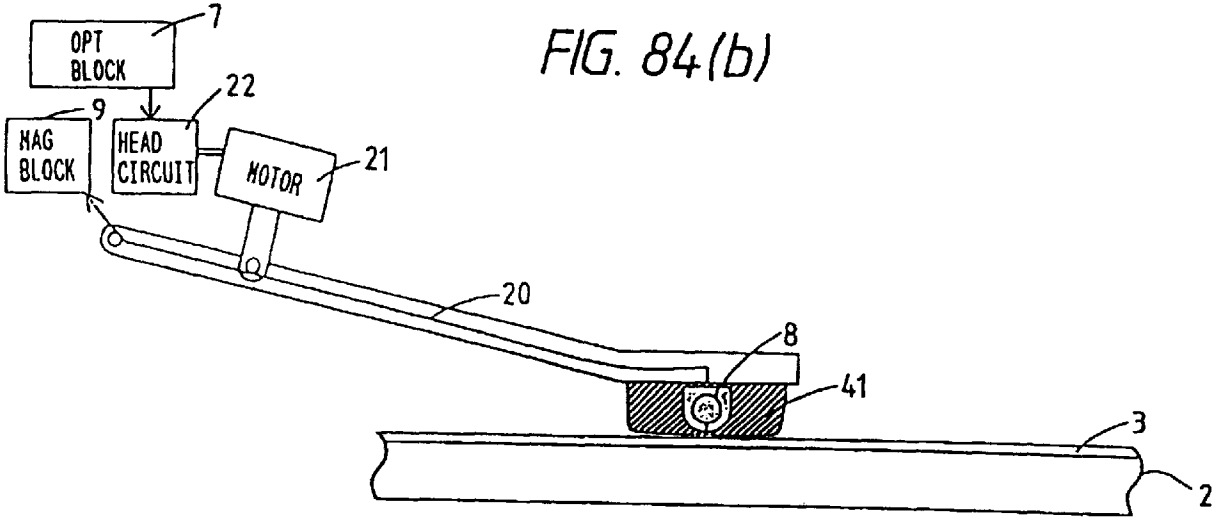

FIG. 84(b) is a side view of a slider in the case of an OFF state in the tenth embodiment.

Figure 85A:
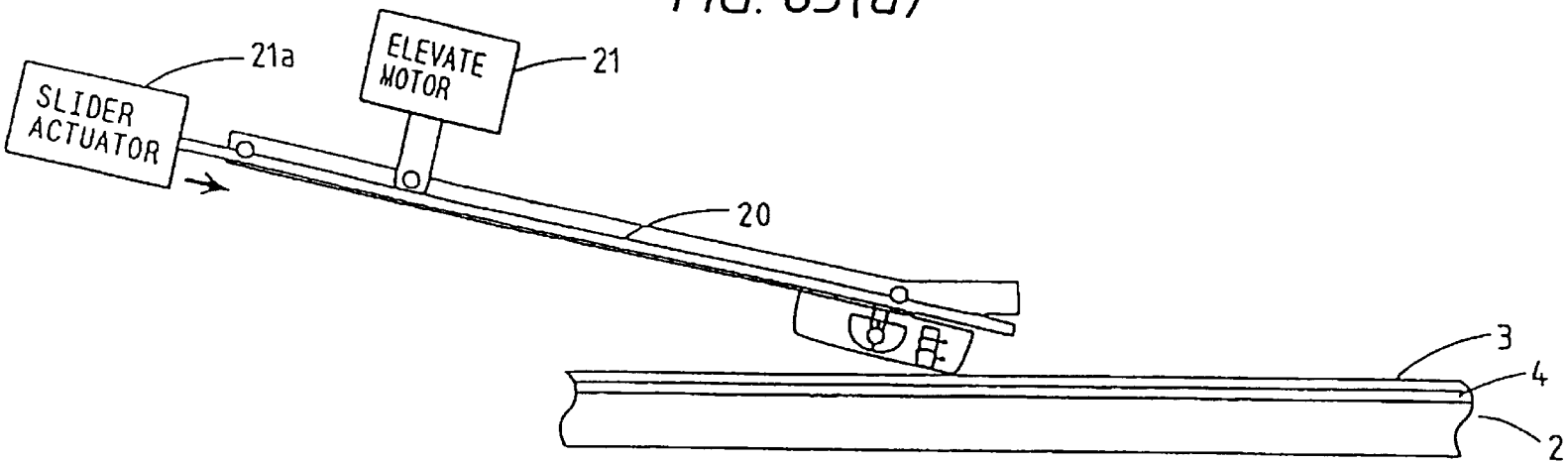

FIG. 85(a) is a side view of a slider portion in the case where magnetic recording is OFF in the tenth embodiment.

Figure 85B:
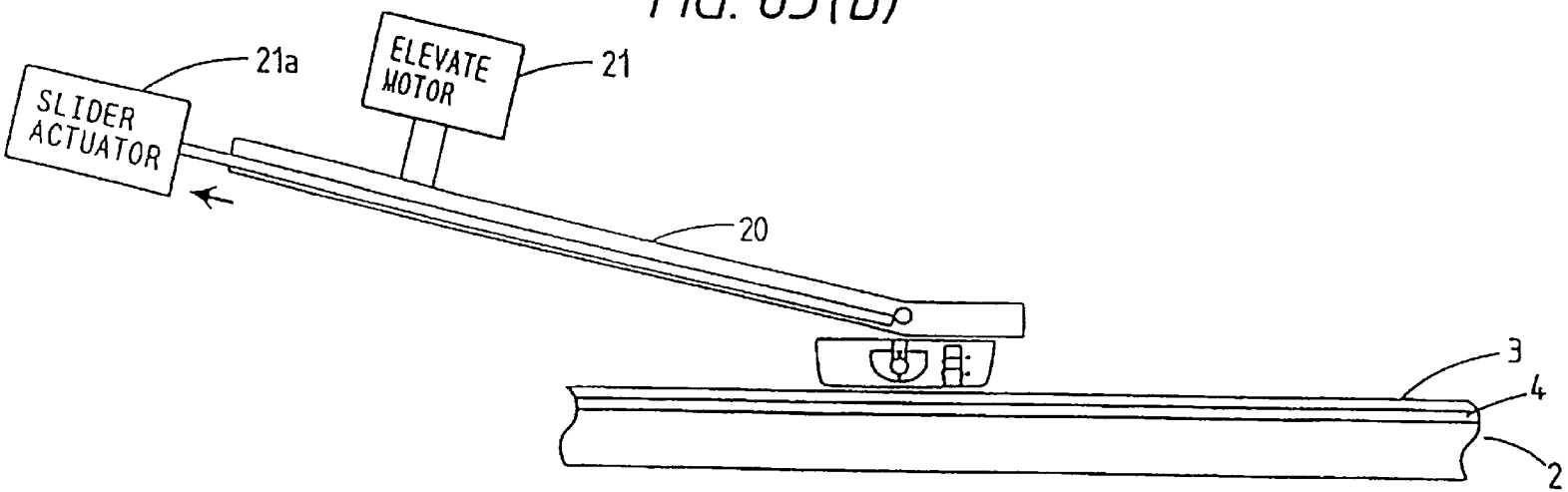

FIG. 85(b) is a side view of a slider portion in the case where magnetic recording is ON in the tenth embodiment.

Figure 86:
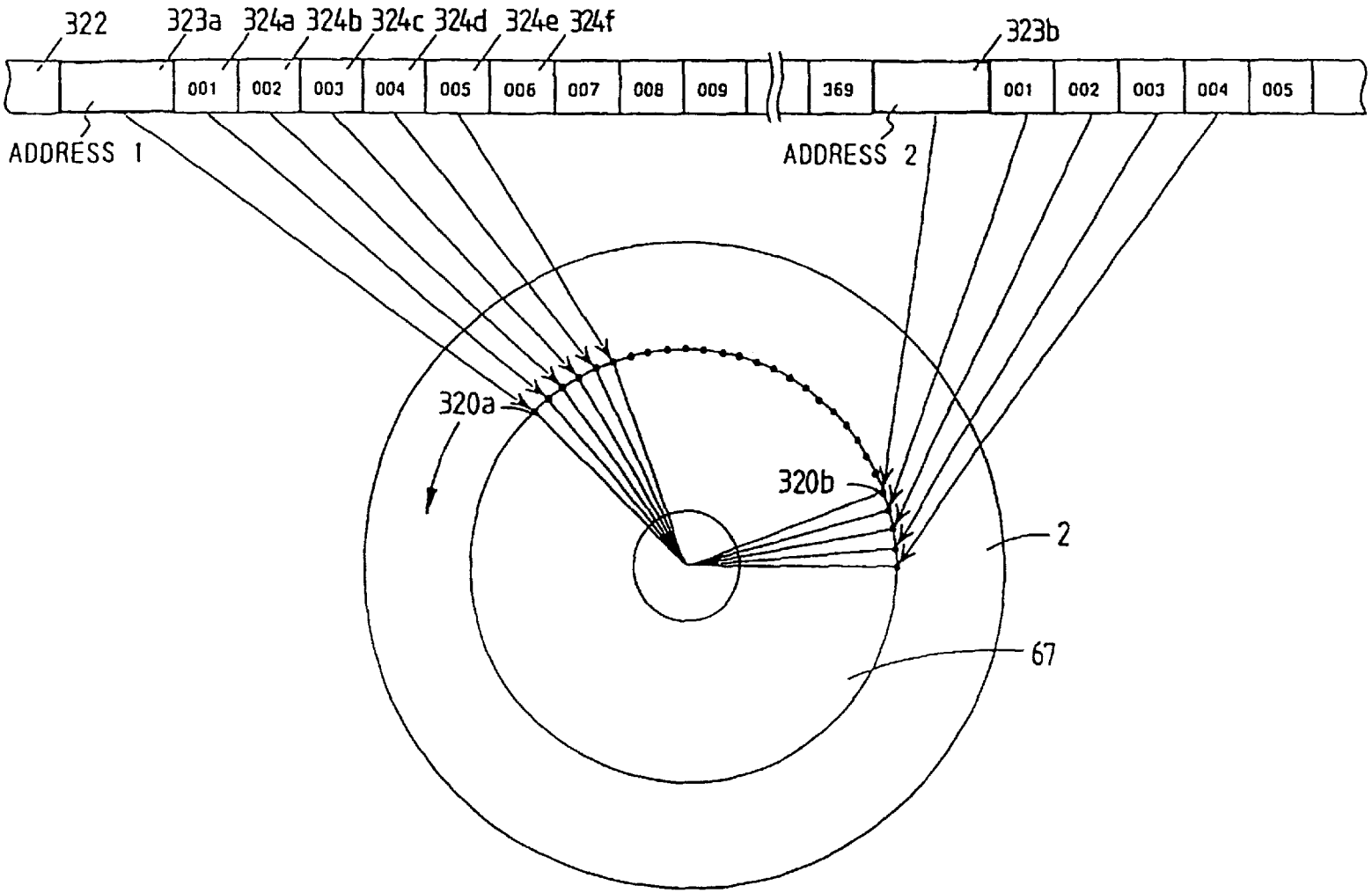

FIG. 86 is an illustration of the correspondence relation between an address and a position on a disk in the tenth embodiment.

Figure 87:
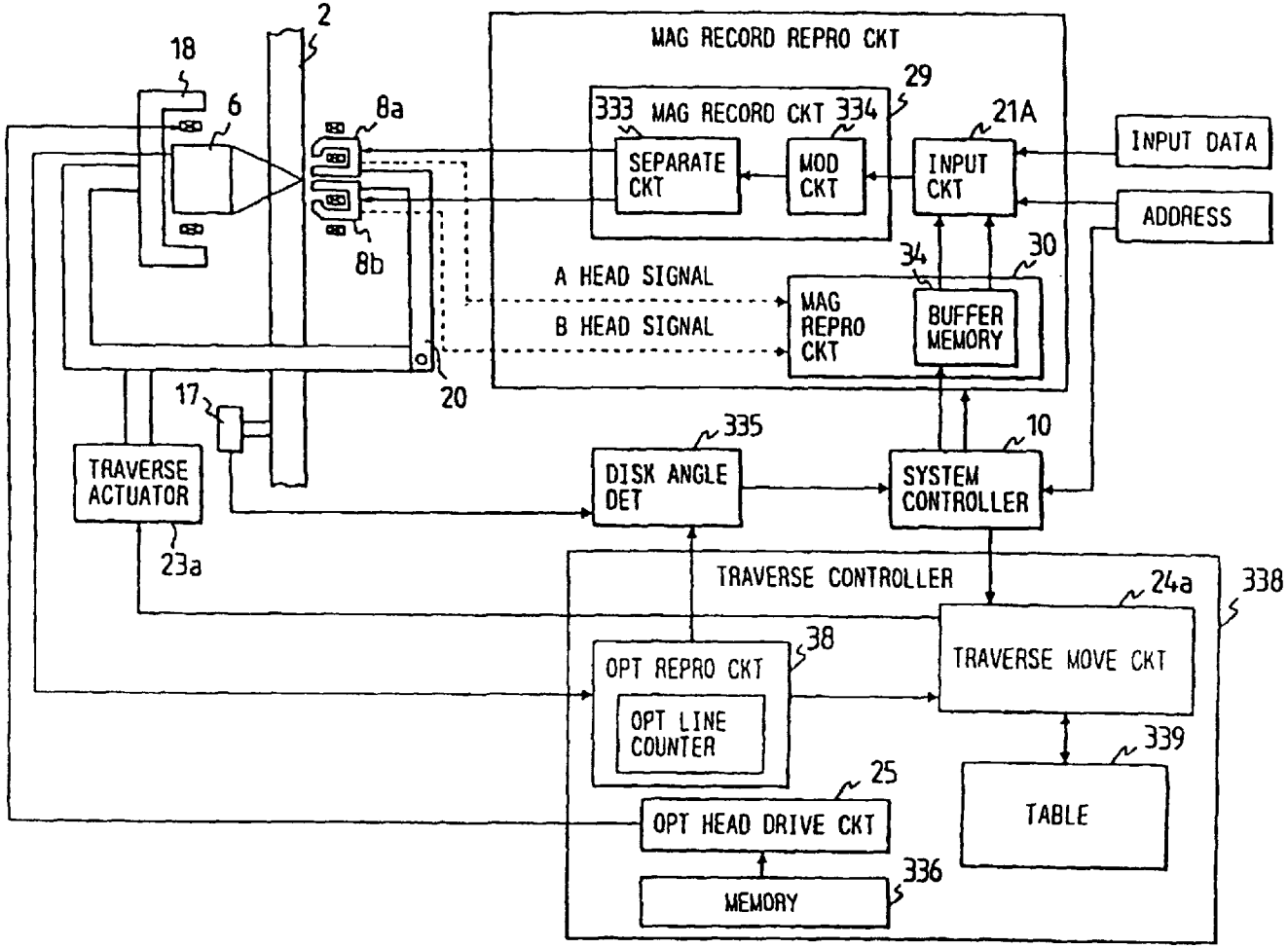

FIG. 87 is a block diagram of a magnetic recording portion in an eleventh embodiment of this invention.

Figure 88A:
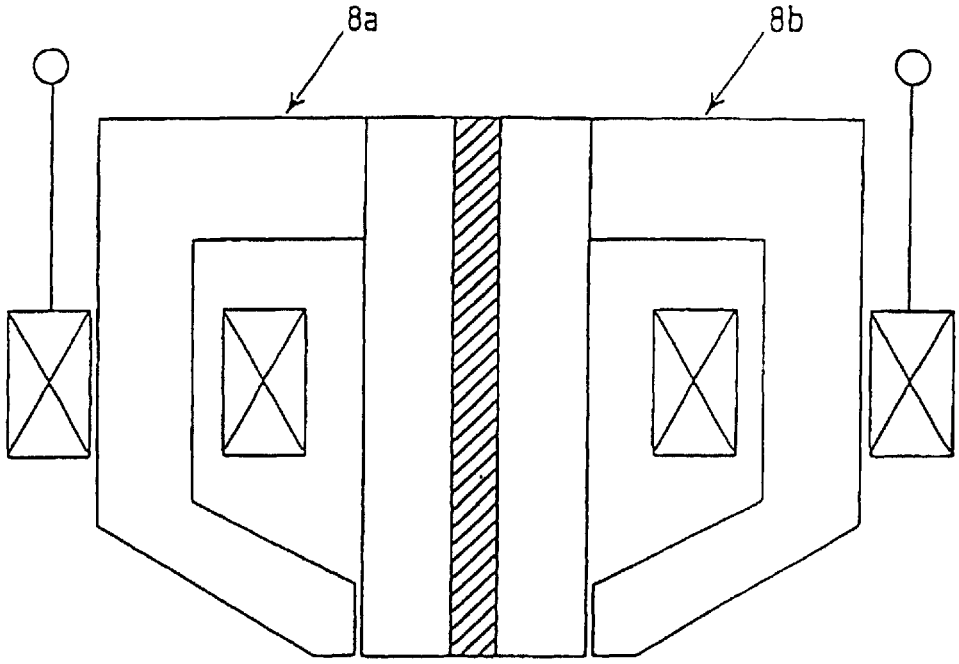

FIG. 88(a) is a transversely sectional view of a magnetic head in the eleventh embodiment.

Figure 88B:
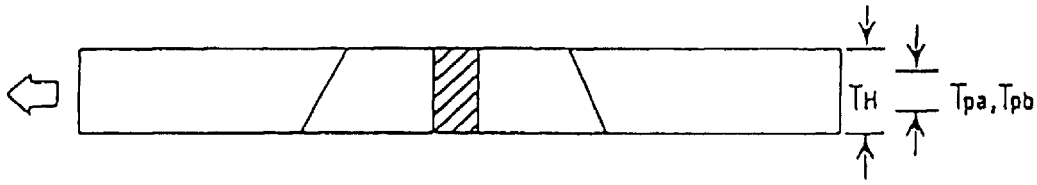

FIG. 88(b) is a bottom view of a magnetic head in the eleventh embodiment.

Figure 88C:
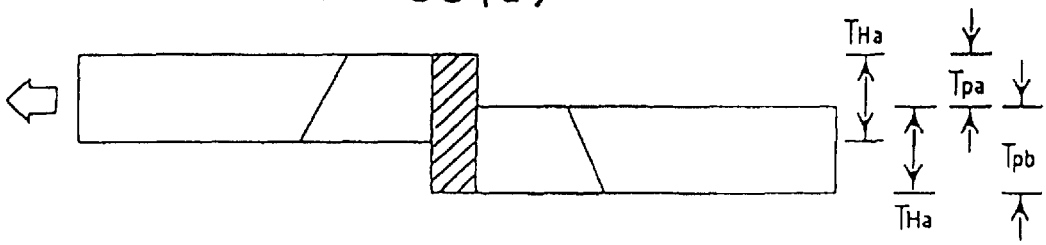

FIG. 88(c) is a bottom view of another magnetic head in the eleventh embodiment.

Figure 89:
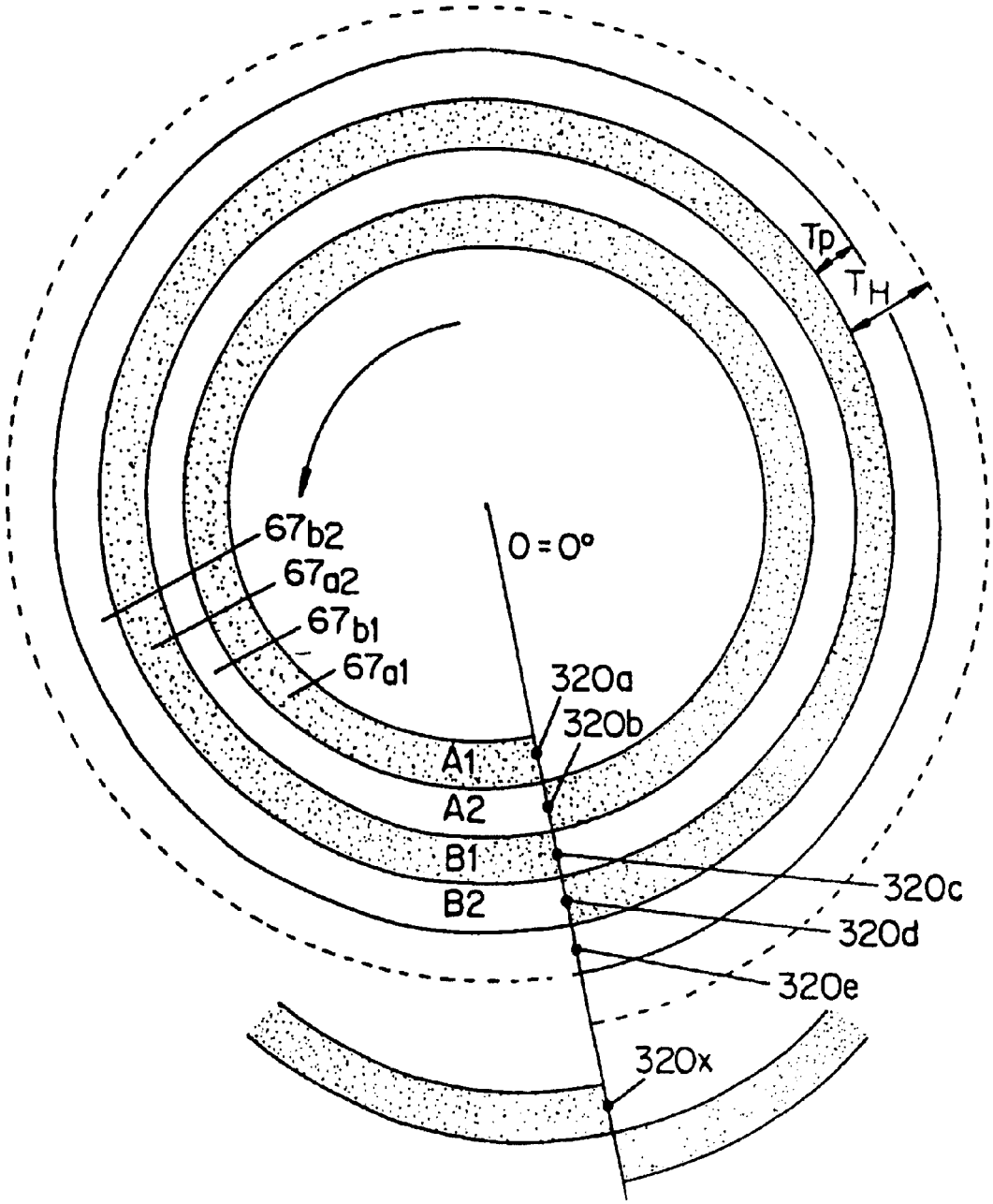

FIG. 89 is an illustration of a spiral-shaped recording format in the eleventh embodiment.

Figure 90:
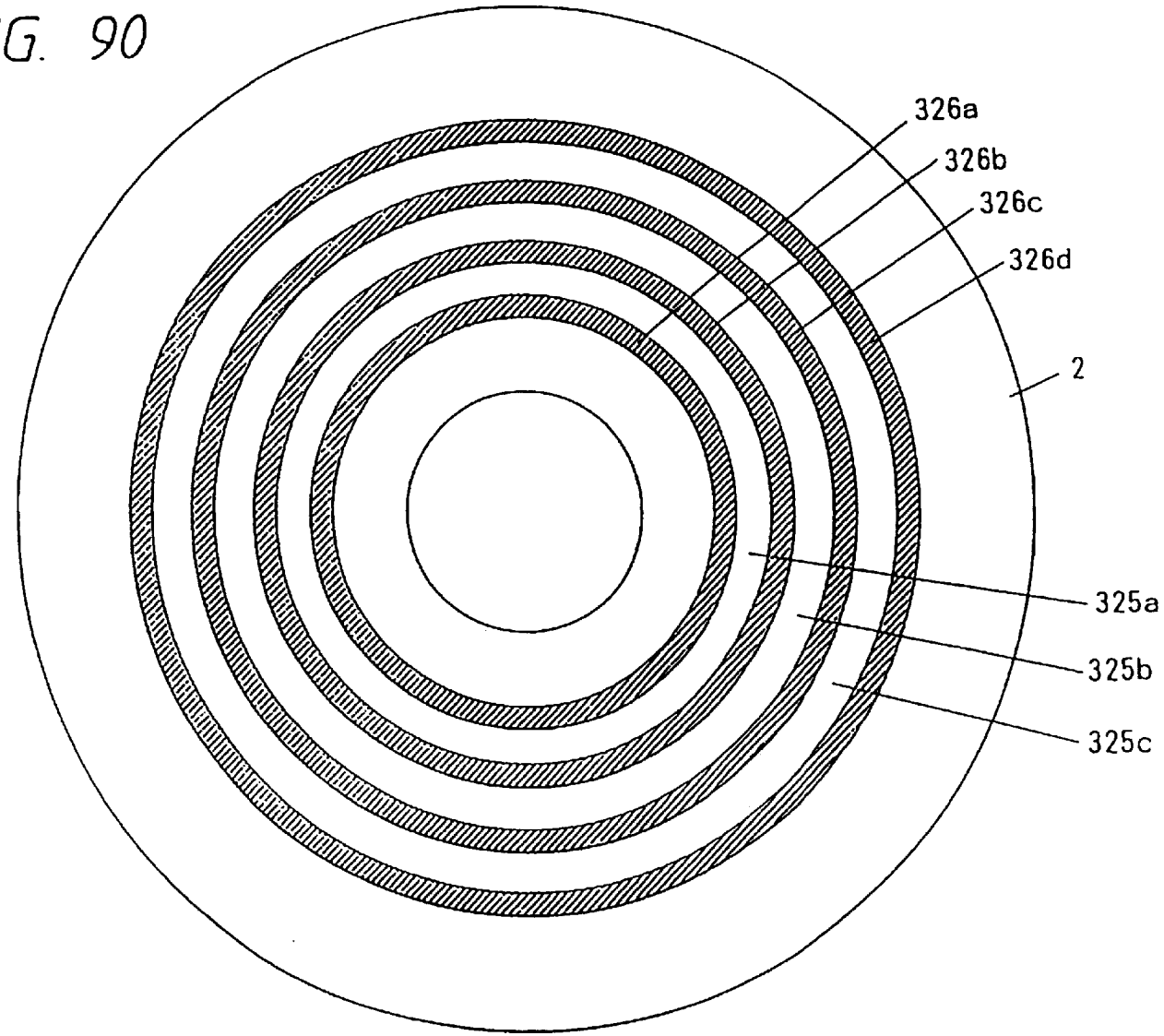

FIG. 90 is an illustration of a recording format of a guard band in the eleventh embodiment.

Figure 91:
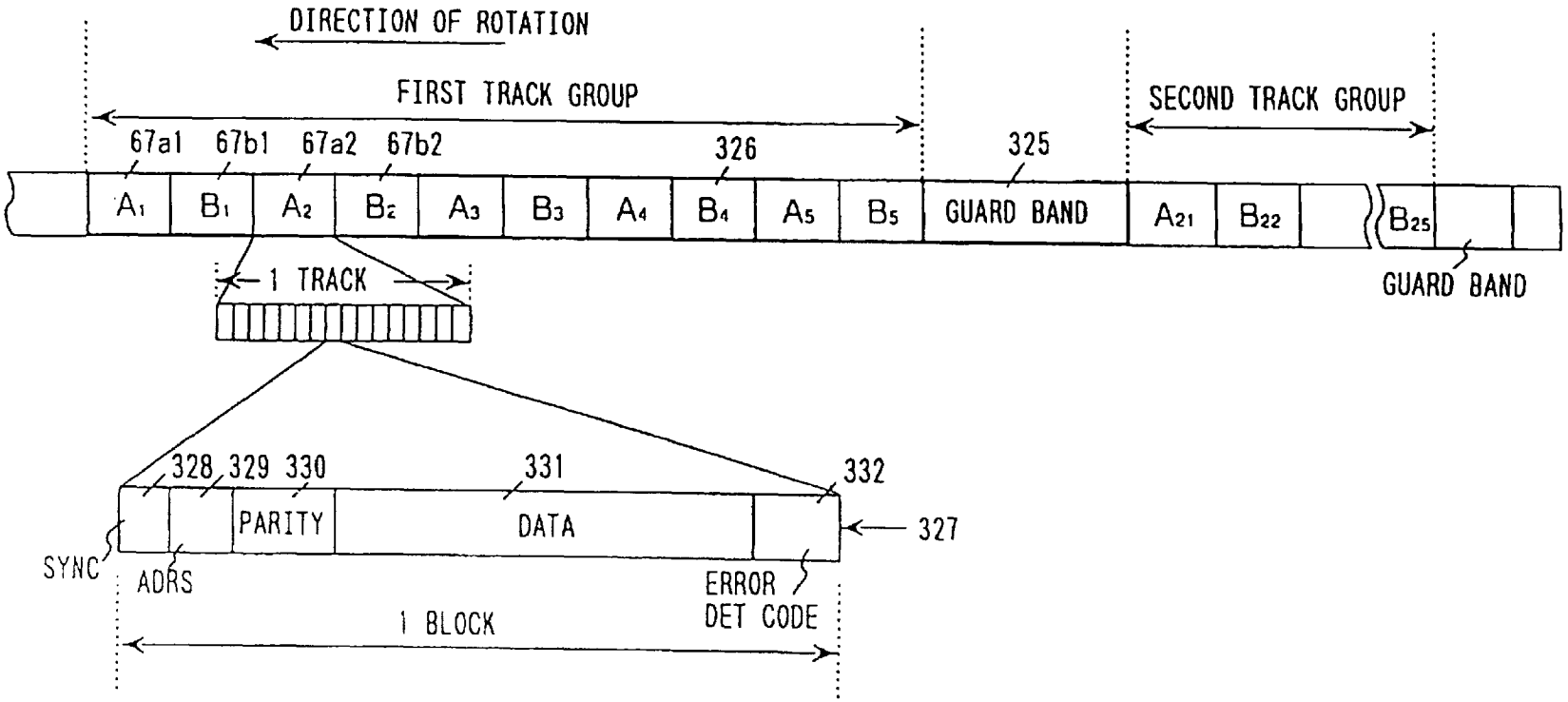

FIG. 91 is an illustration of a data structure in the eleventh embodiment.

Figure 92:
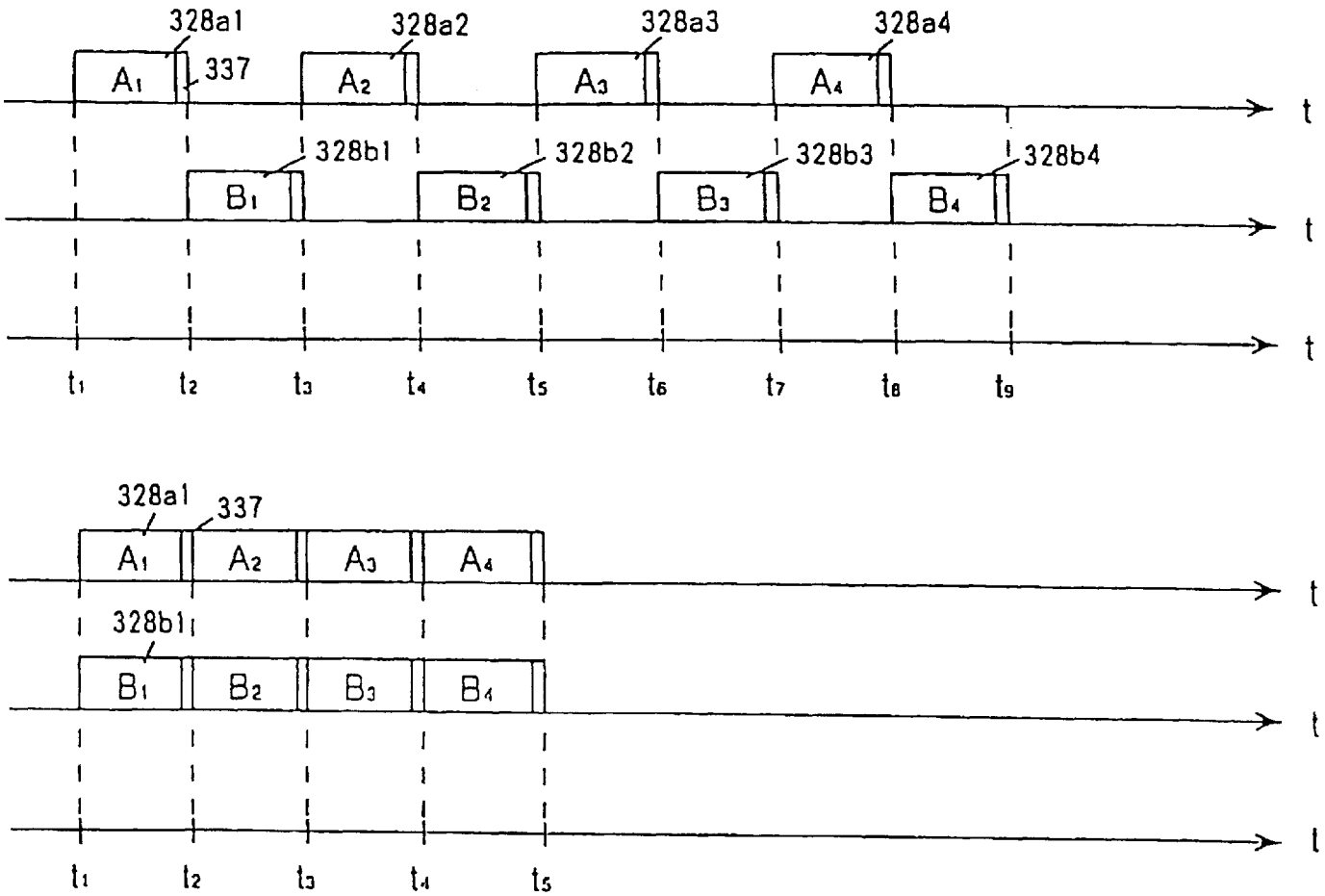

FIGS. 92(a)A–92(a)(S) are a timing chart of recording in the eleventh embodiment.

FIGS. 92(b)A–92(b)(S) are a timing chart of simultaneous recording by two heads in the eleventh embodiment.

Figure 93:
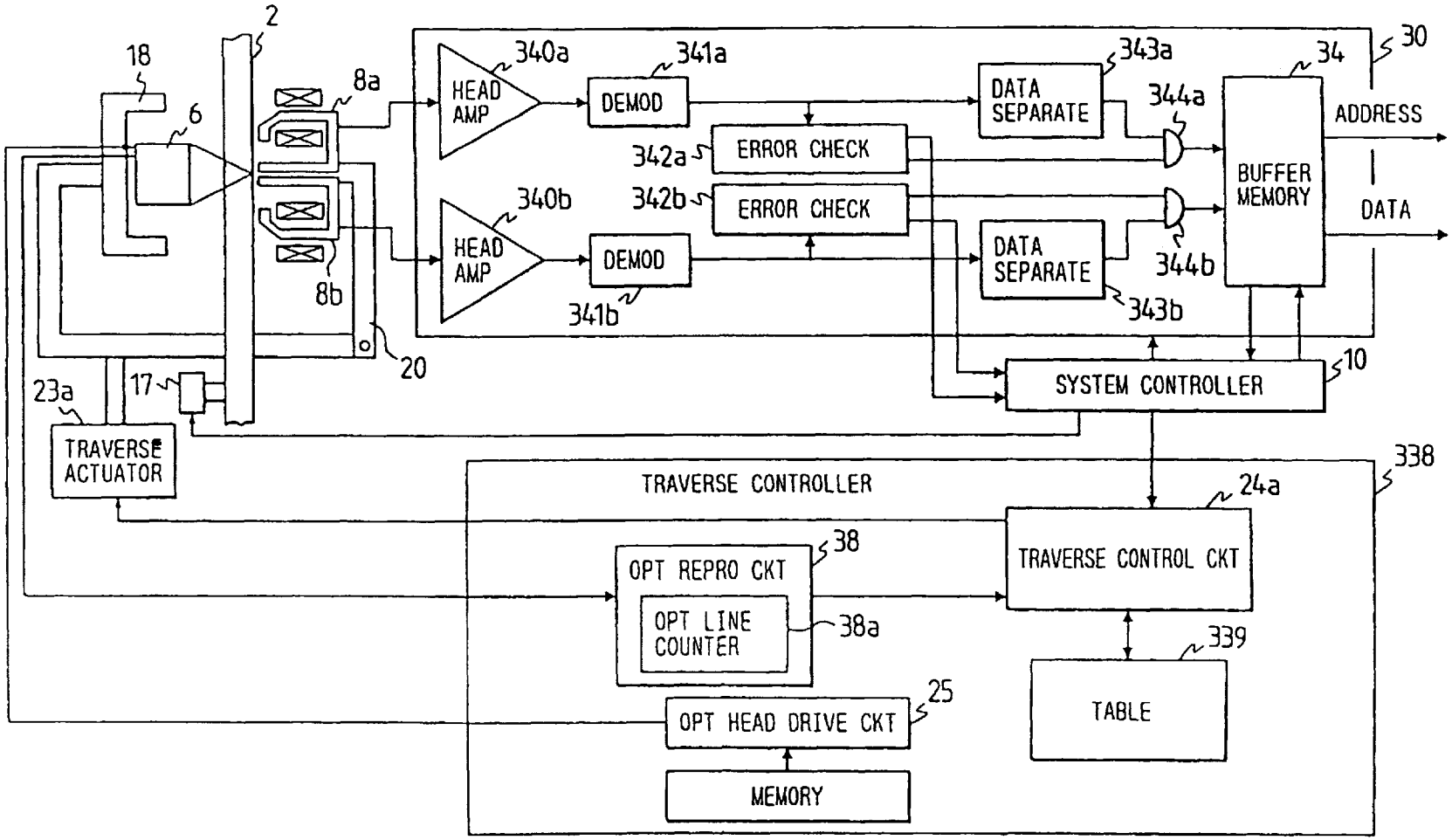

FIG. 93 is a block diagram of a reproducing portion in the eleventh embodiment.

Figures 94A, 94B, 94C:
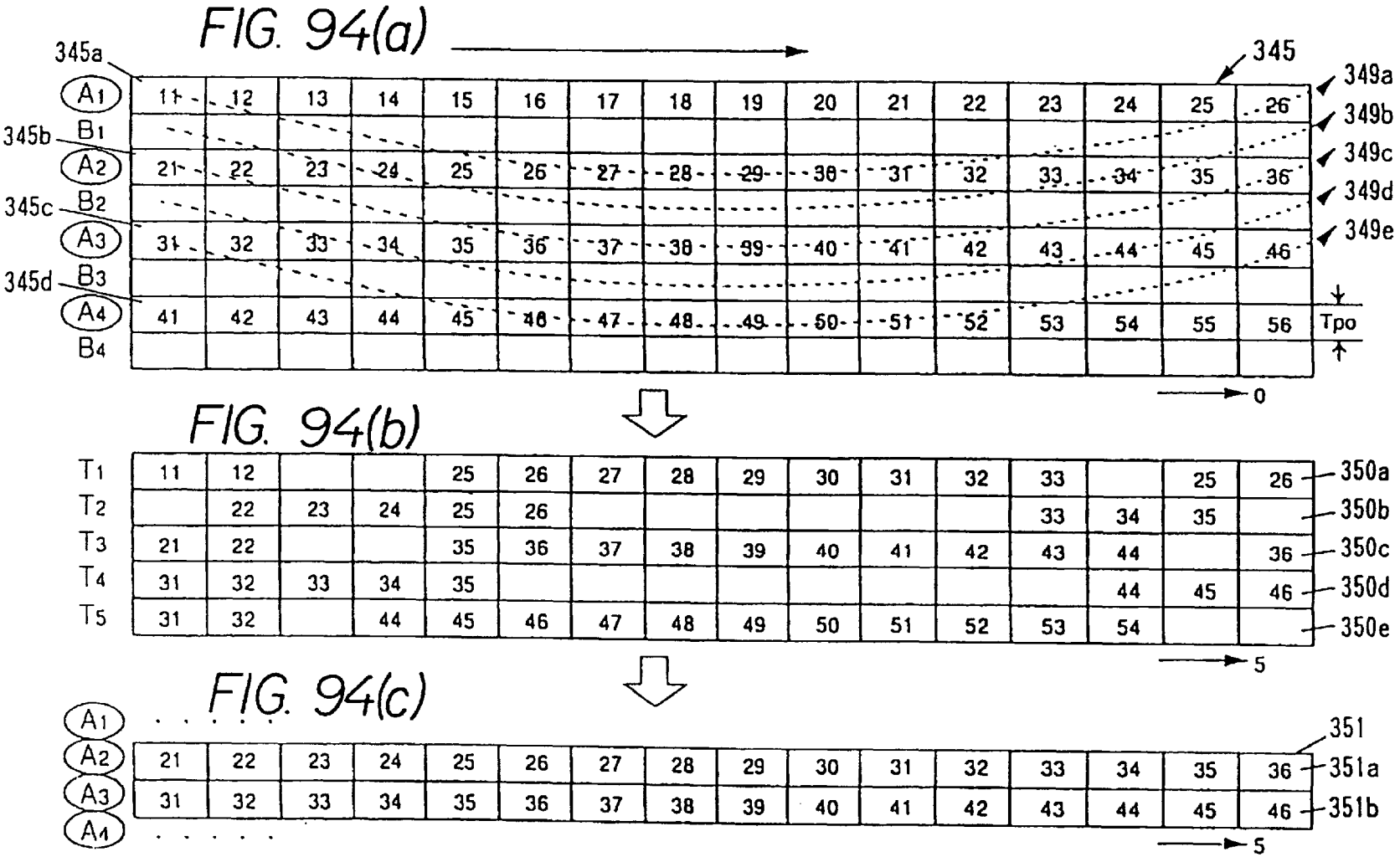

FIGS. 94(a)–94(c) are an illustration of a data arrangement in the eleventh embodiment.

Figure 95:
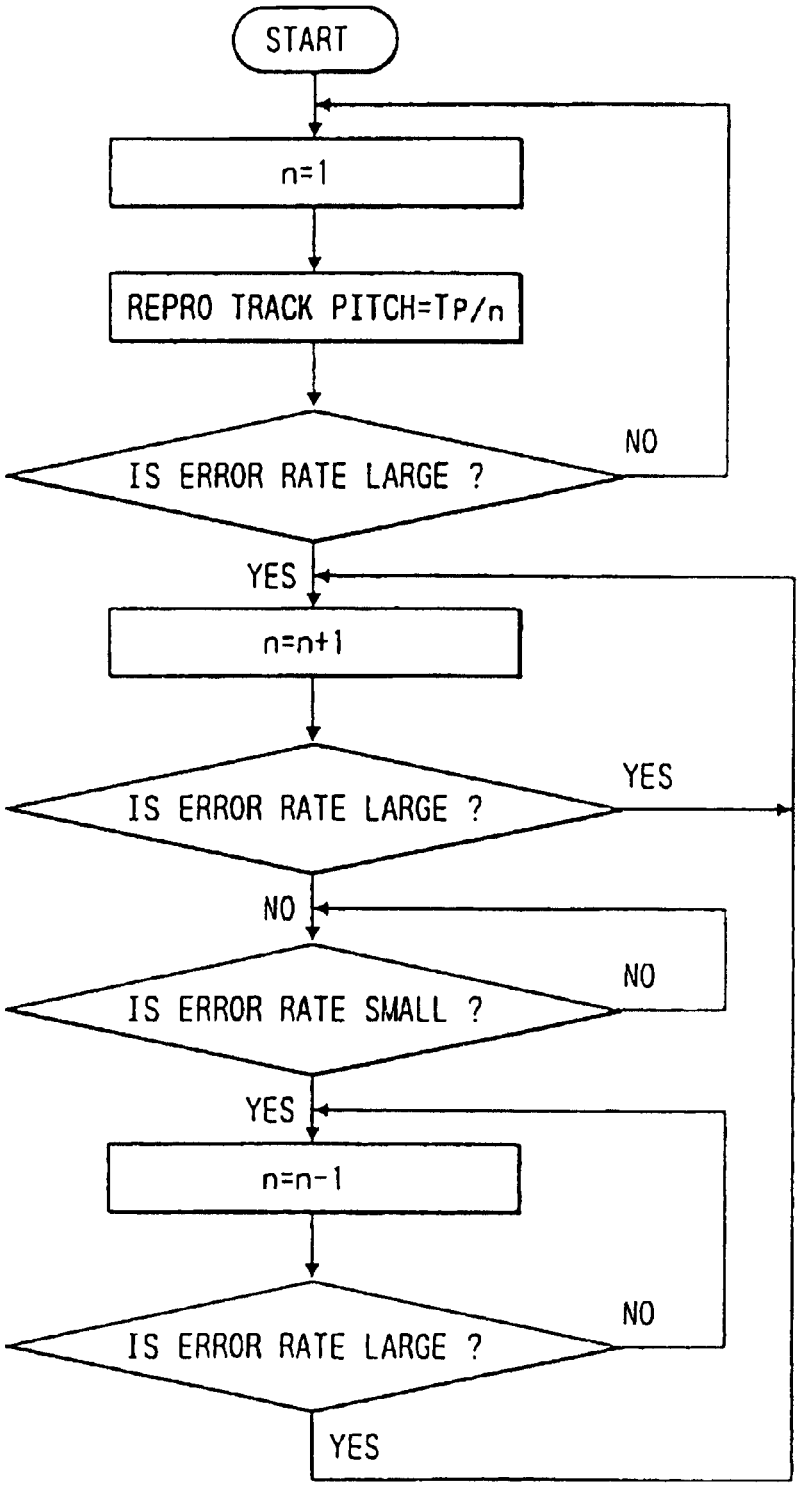

FIG. 95 is a flowchart of traverse control in the eleventh embodiment.

Figure 96:
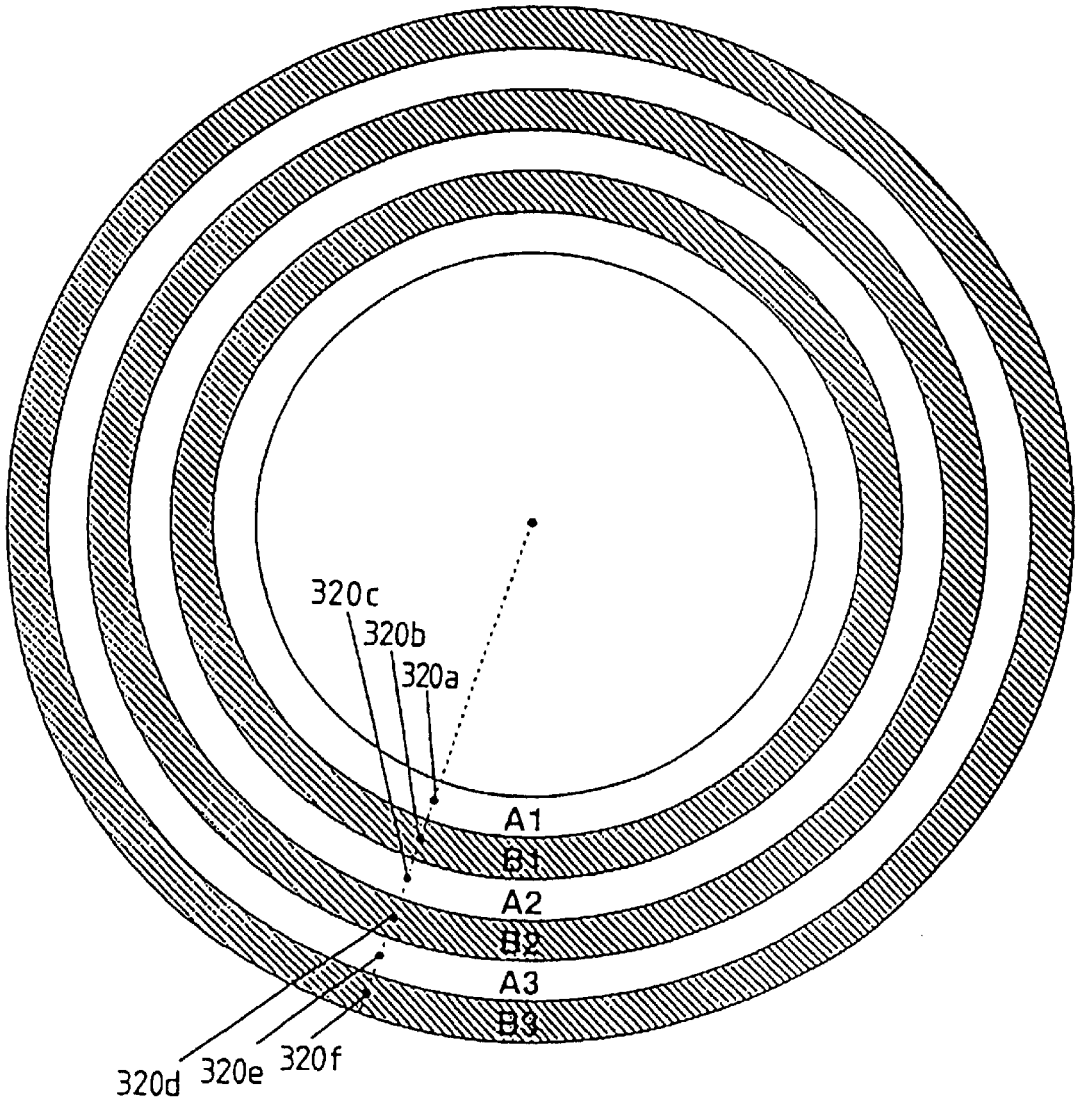

FIG. 96 is an illustration of a cylindrical recording format in the eleventh embodiment.

Figure 97:
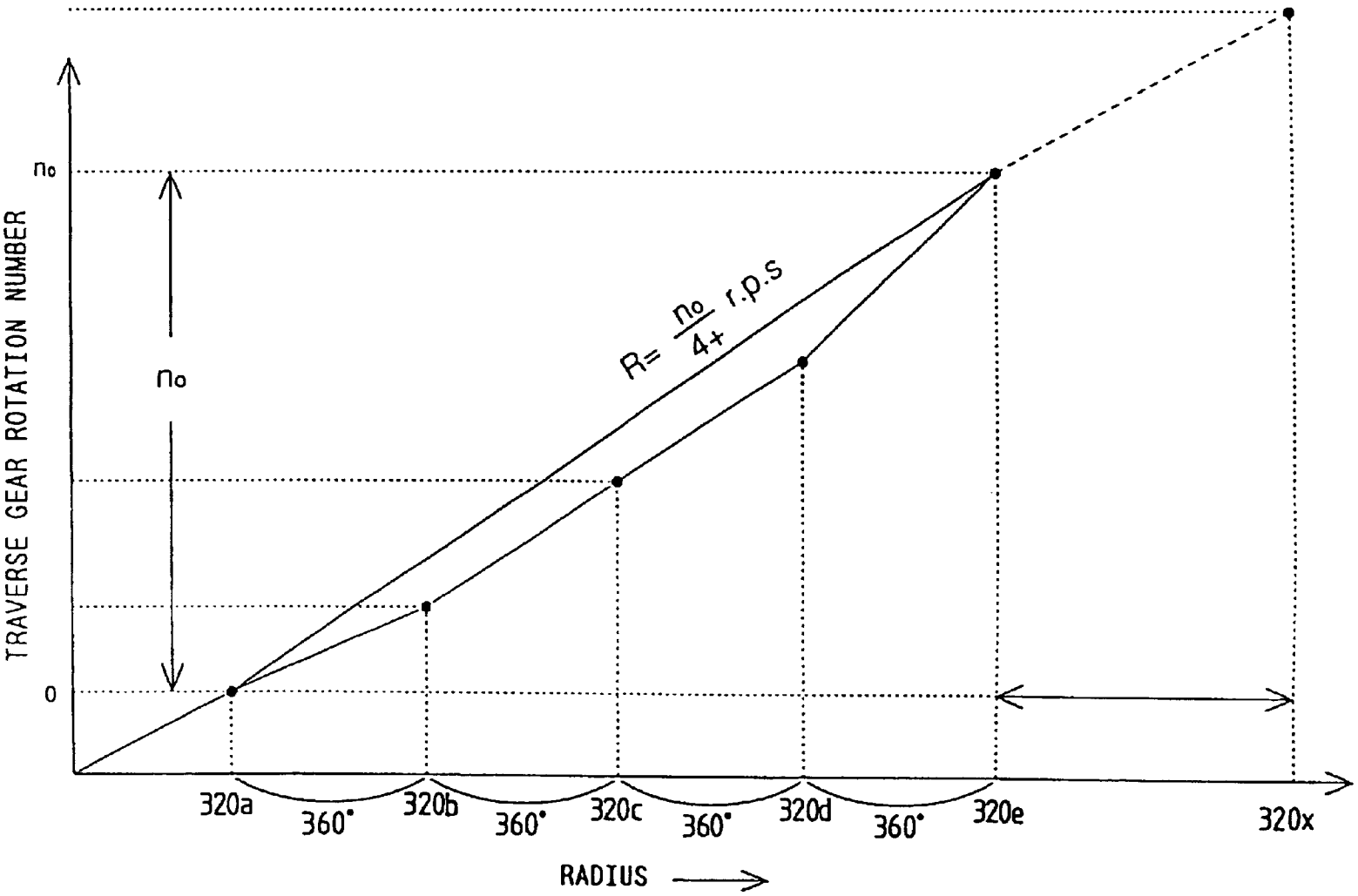

FIG. 97 is an illustration of the relation between a traverse gear rotation number and a radius in the eleventh embodiment.

Figure 98:
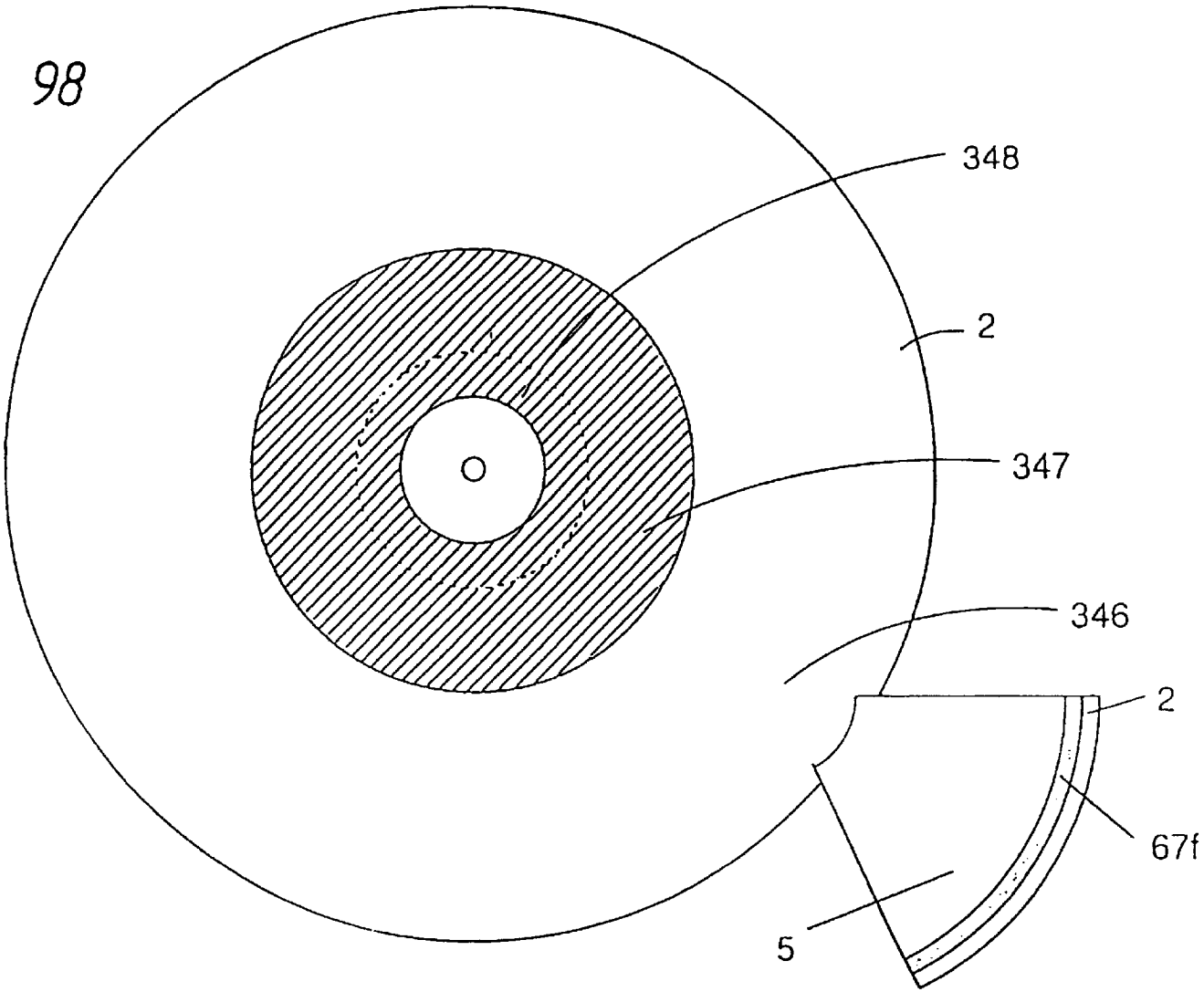

FIG. 98 is an illustration of an optical recording surface format in the eleventh embodiment.

Figure 99:
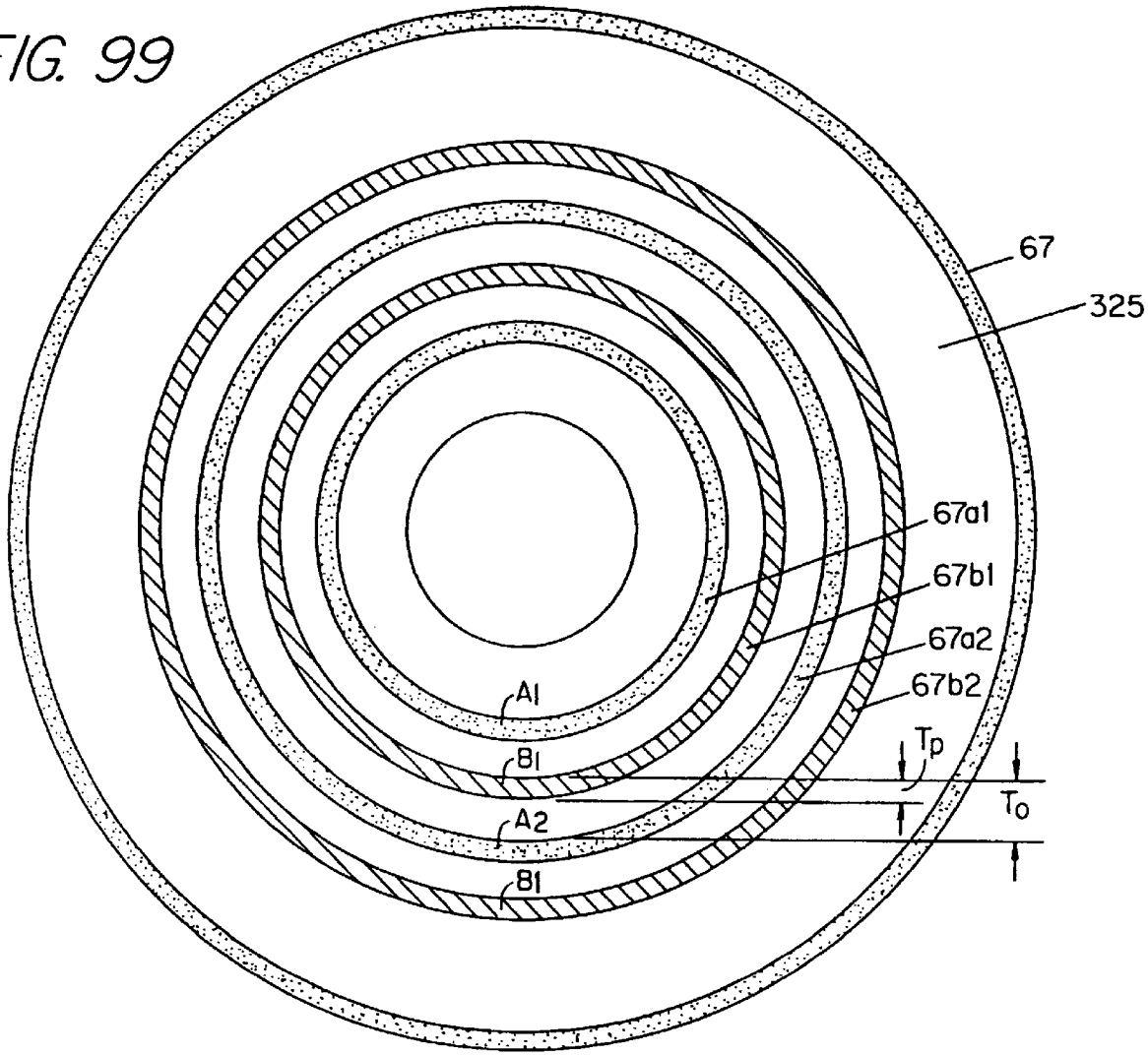

FIG. 99 is an illustration of a recording format in the presence of compatibility with a lower level apparatus in the eleventh embodiment.

Figure 100:
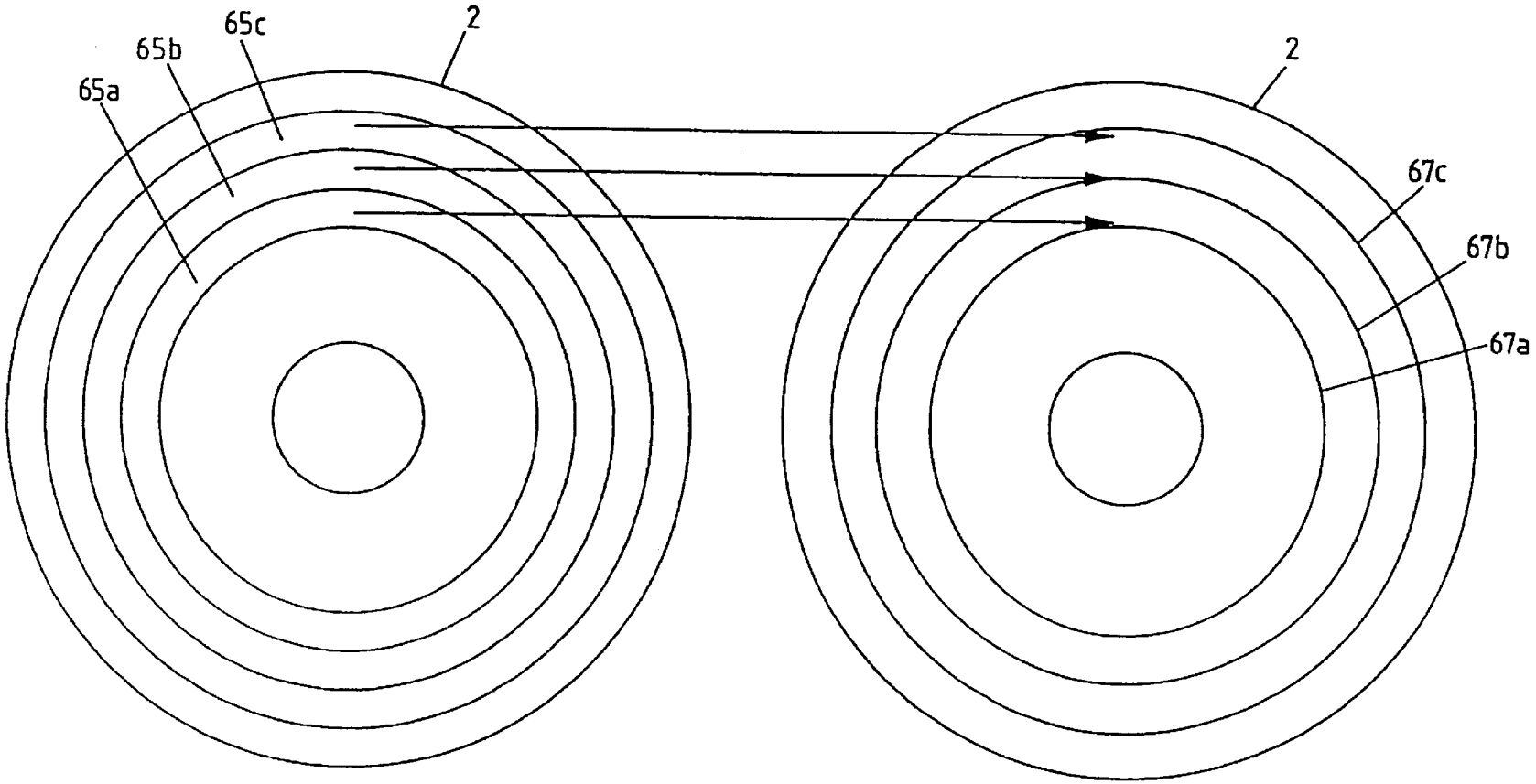

FIG. 100 is an illustration of the correspondence relation between an optical recording surface and a magnetic recording surface in the eleventh embodiment.

Figures 101A, 101B:
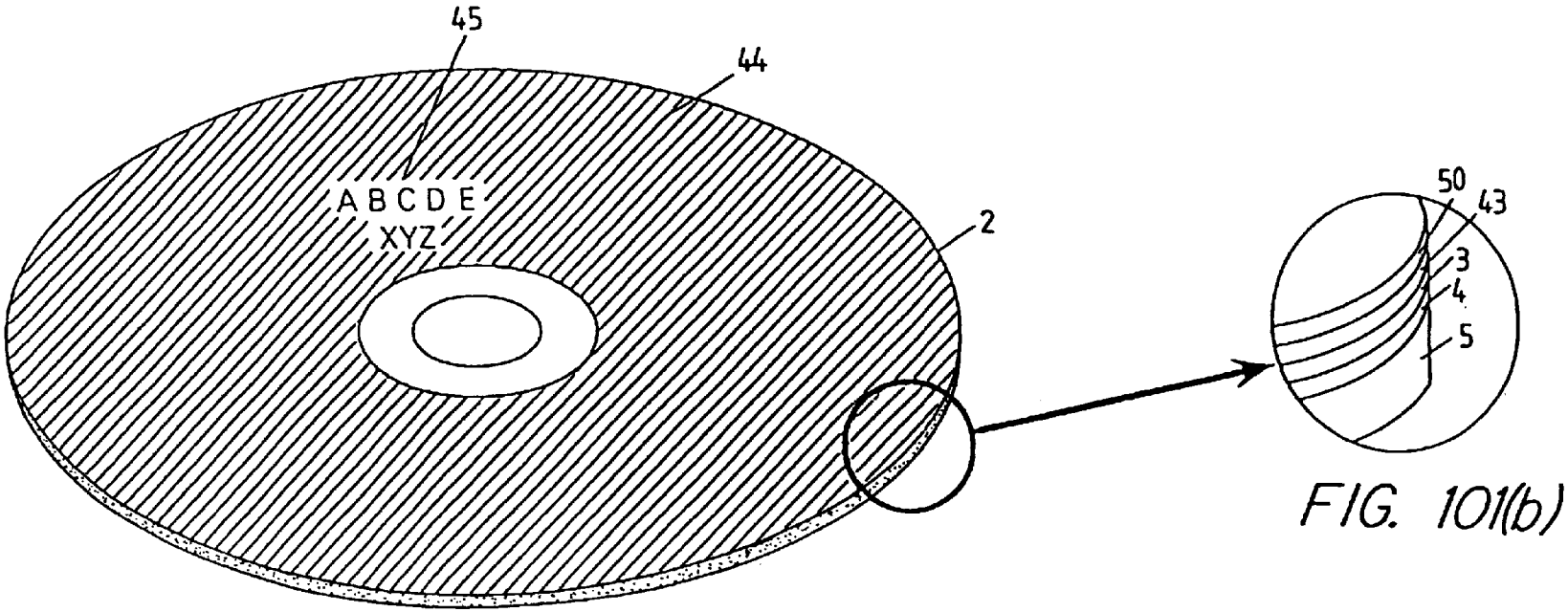

FIGS. 101(a) and 101(b) are a perspective view of a recording medium in a twelfth embodiment of this invention.

Figure 102:
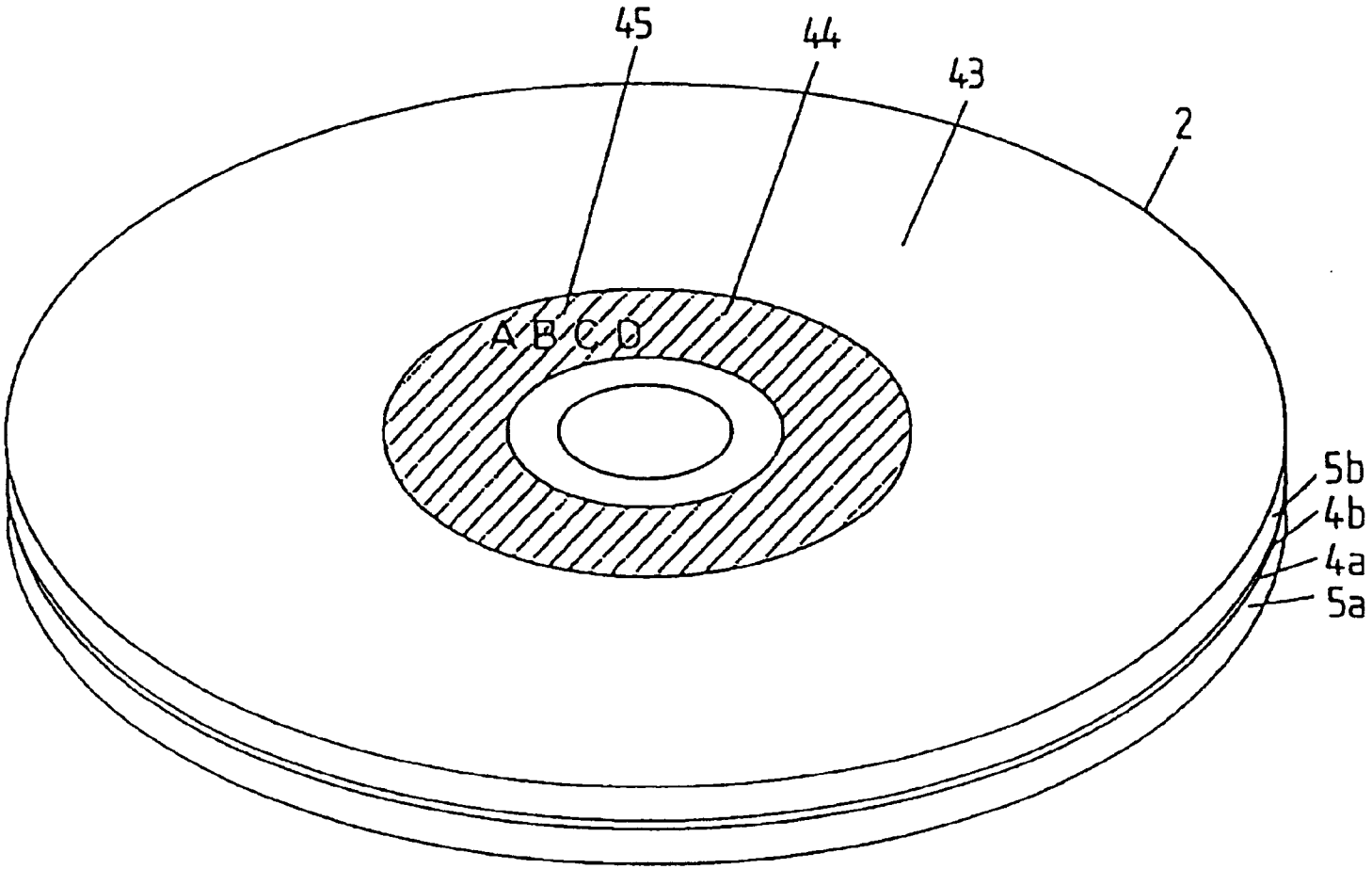
Figure 103A:
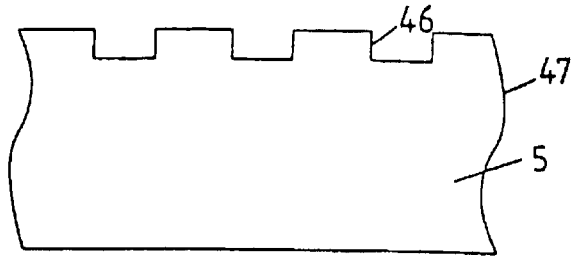
Figure 103B:
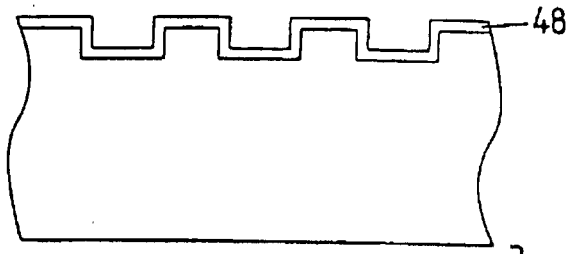
Figure 103C:
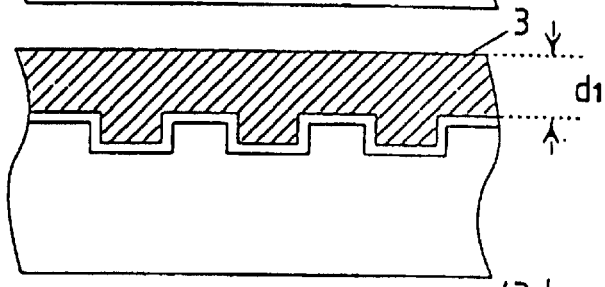
Figure 103D:
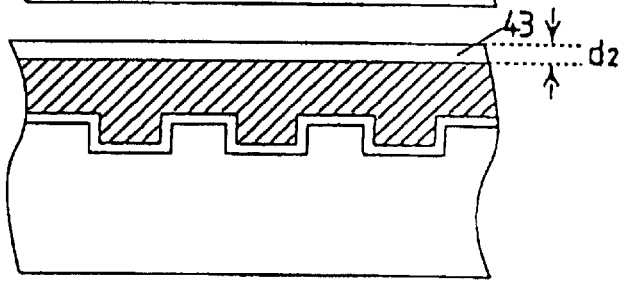
Figure 103E:
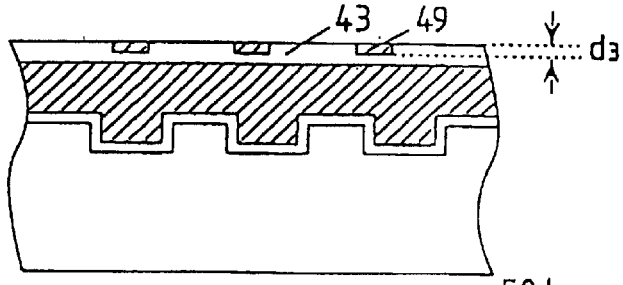
Figure 103F:
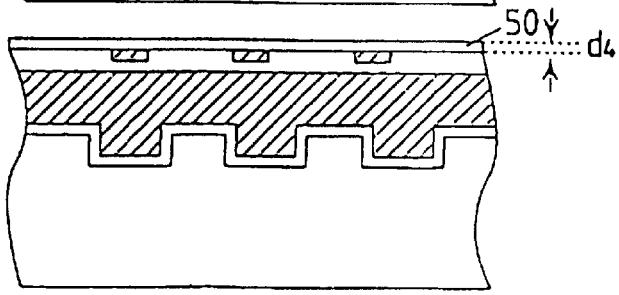
Figure 104A:
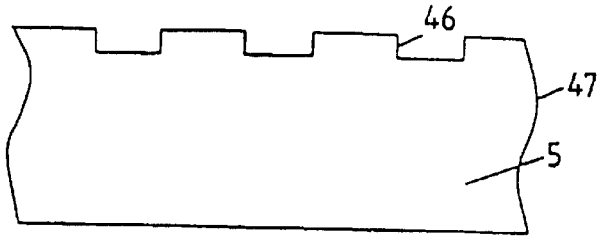
Figure 104B:
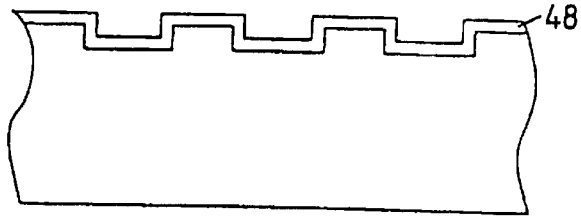
Figure 104C:
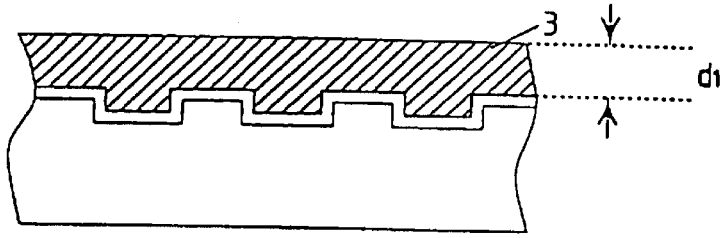
Figure 104D:
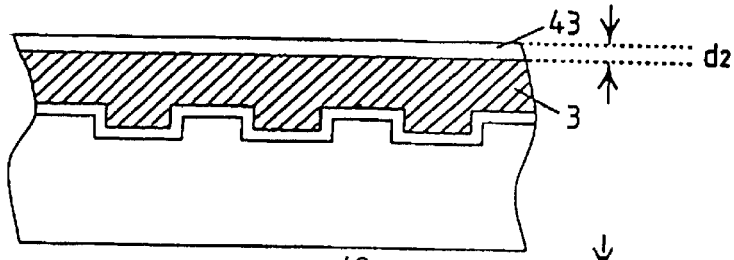
Figure 104E:
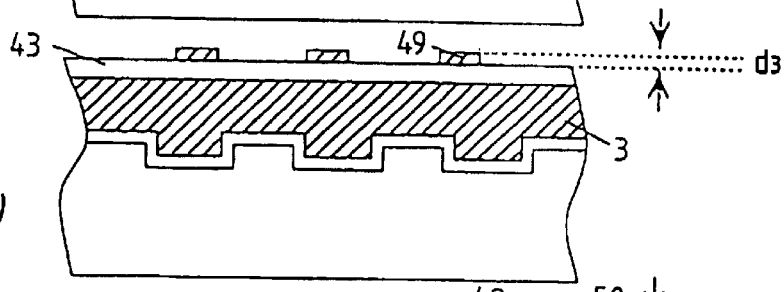
Figure 104F:
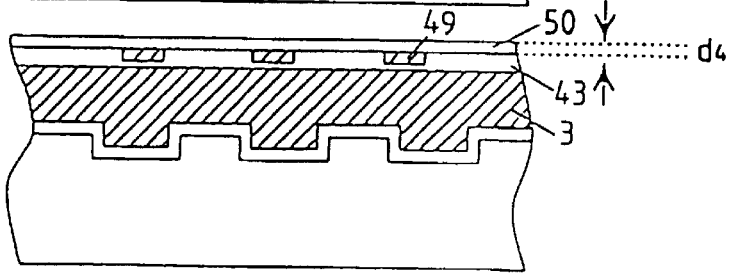

FIG. 102 is a perspective view of a recording medium in the twelfth embodiment.

FIGS. 103(a)–103(f) are a transversely sectional view of a recording medium which occurs at film forming and printing steps in the twelfth embodiment.

FIGS. 104(a)–104(f) are a transversely sectional view of a recording medium which occurs at film forming and printing steps in the twelfth embodiment.

Figure 105:
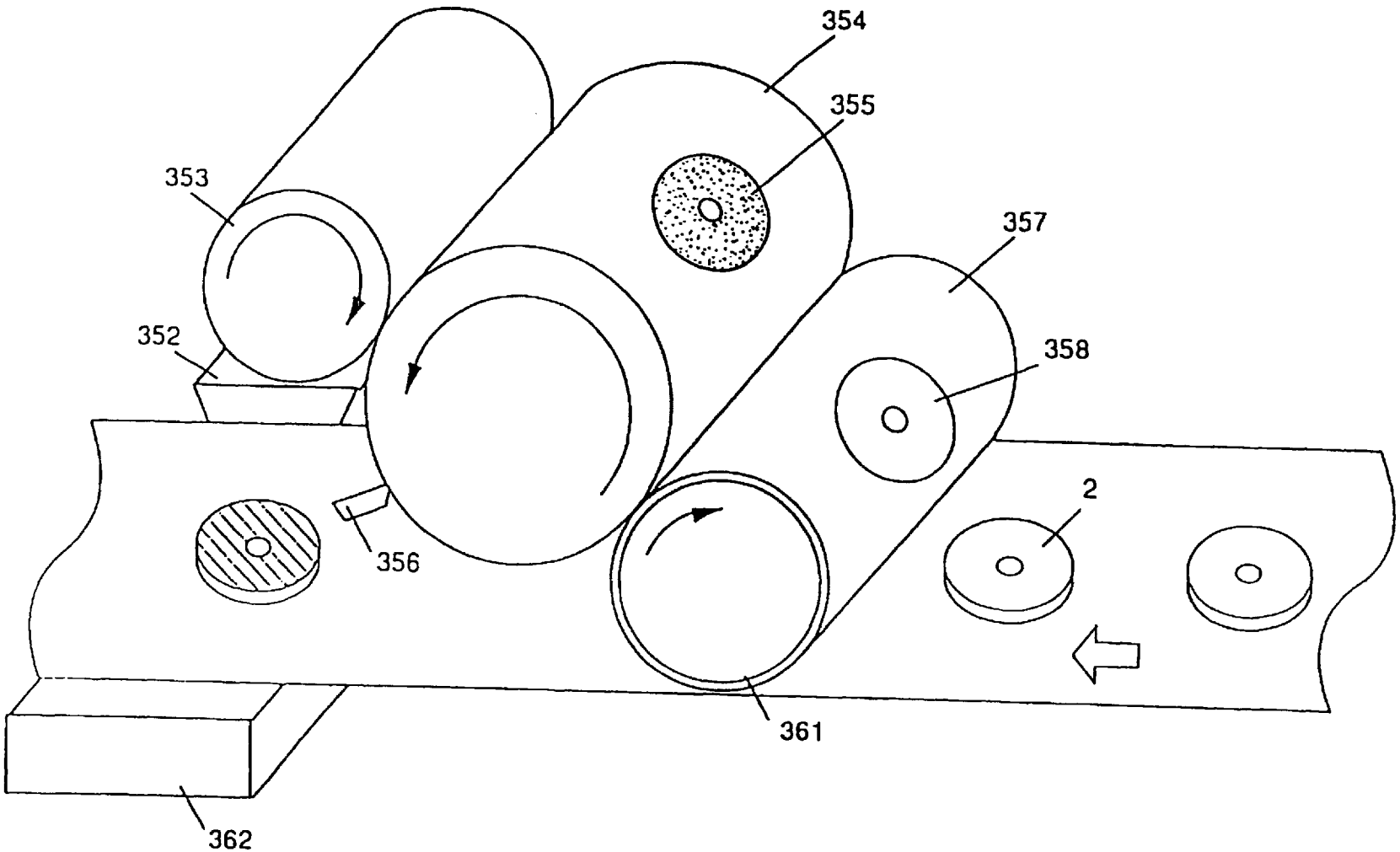

FIG. 105 is a perspective view of a manufacturing system in a state corresponding to an application step in the twelfth embodiment.

Figures 106A, 106B, 106C:
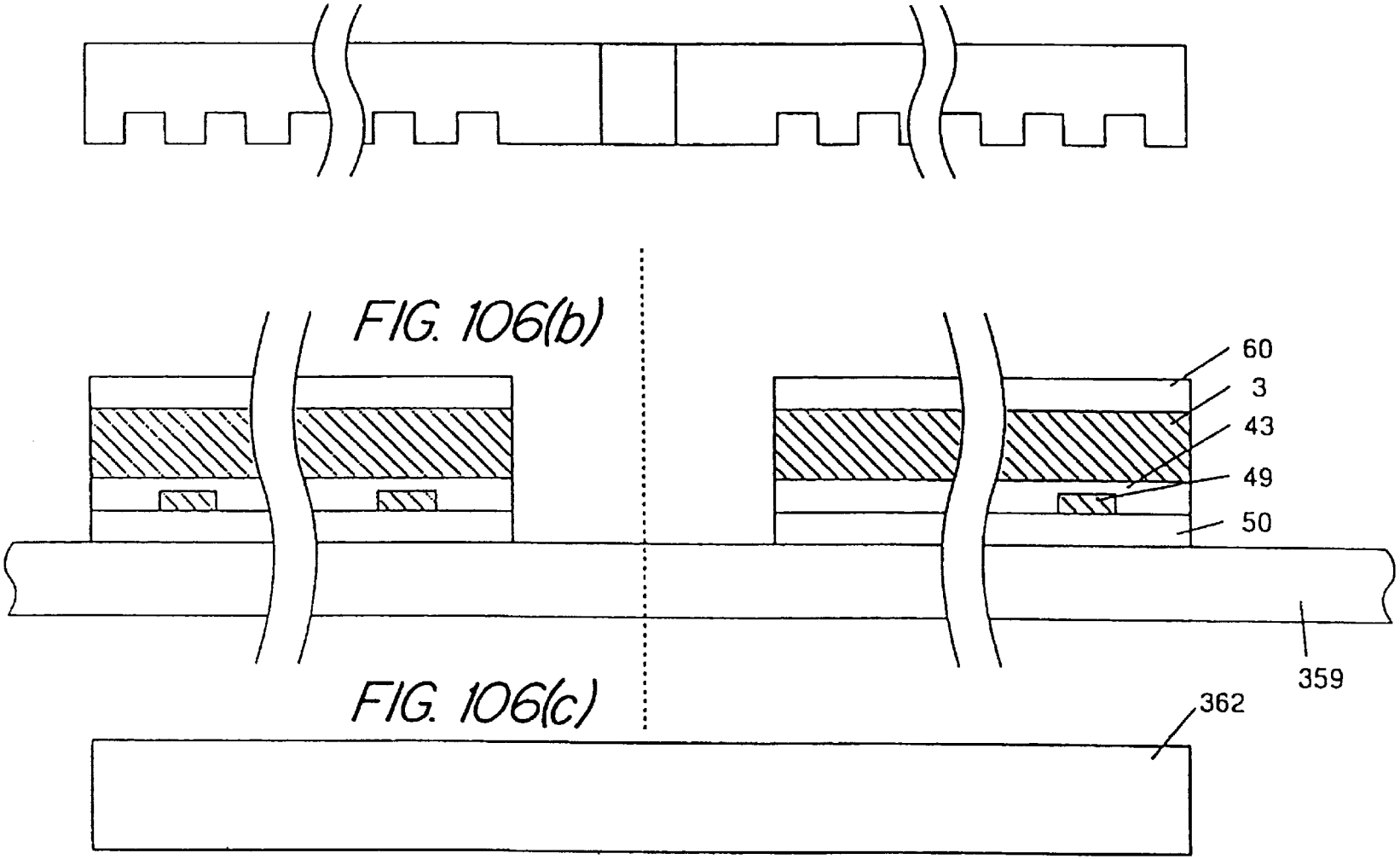
Figure 107A:
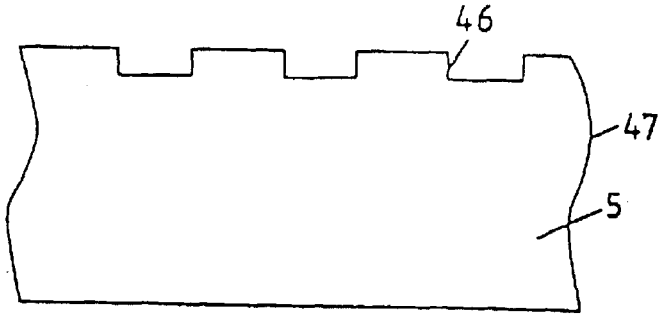
Figure 107B:
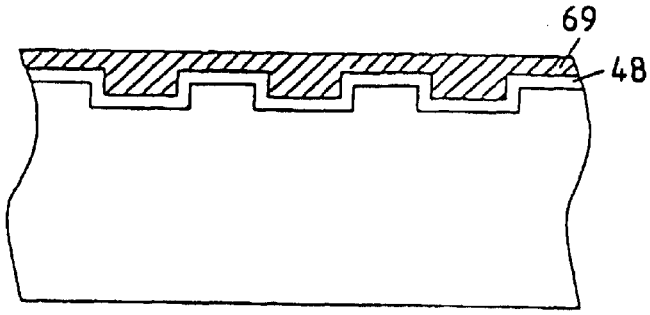
Figure 107C:
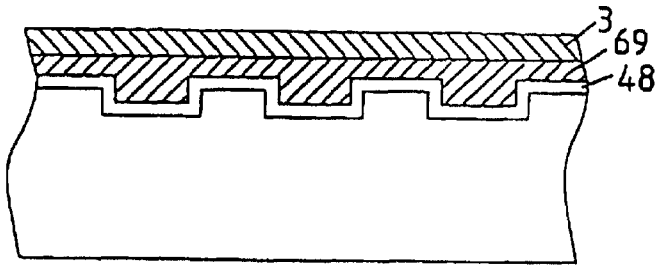
Figure 107B:
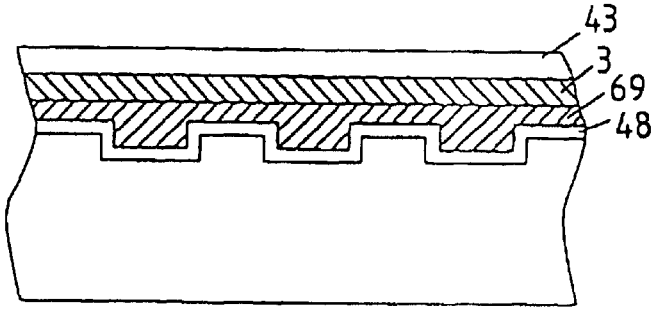
Figure 107E:
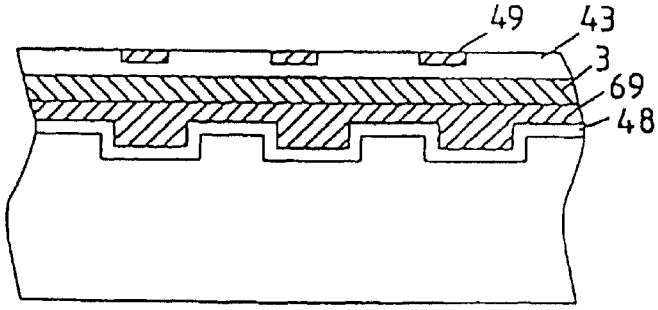

FIGS. 106(a)–106(c) are is a transversely sectional view of a recording medium at application and transfer steps in the twelfth embodiment.

FIGS. 107(a)–107(e) are an illustration of steps of manufacturing a recording medium in the twelfth embodiment.

Figure 108A:
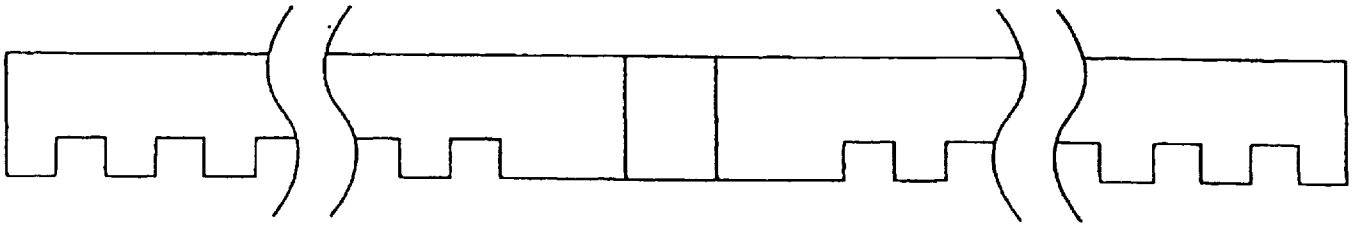
Figure 108B:
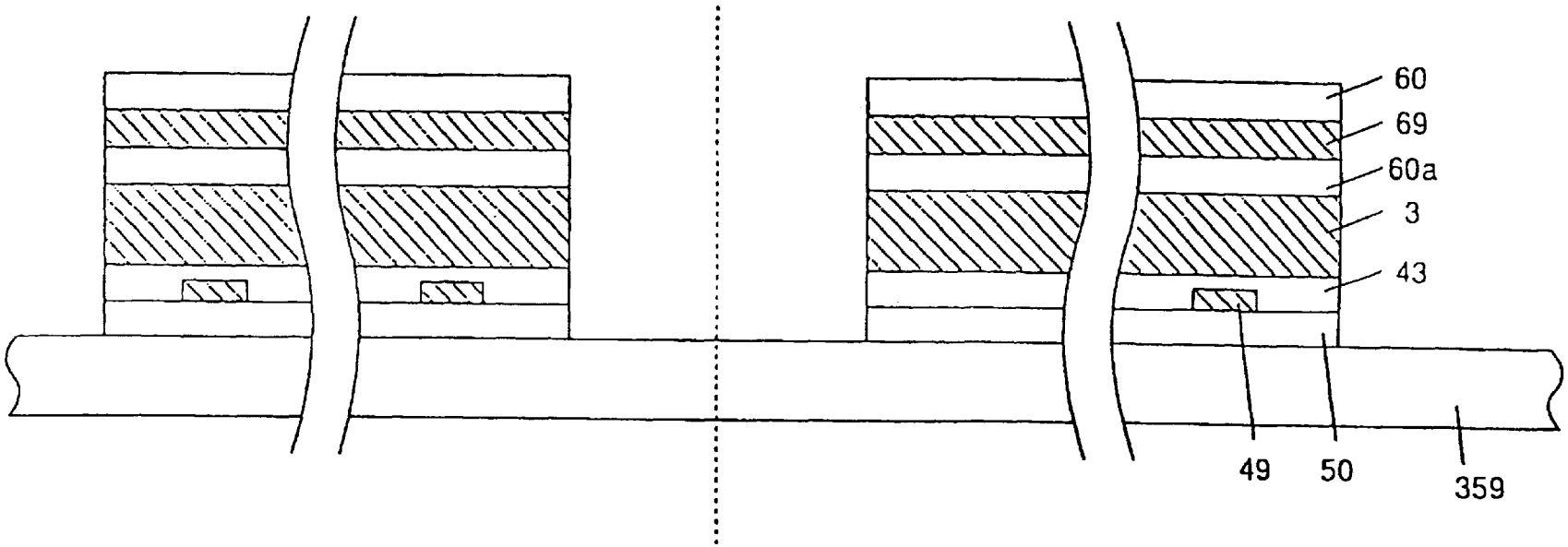

FIGS. 108(a) and 108(b) are a transversely sectional view of a recording medium at application and transfer steps in the twelfth embodiment.

Figure 109:
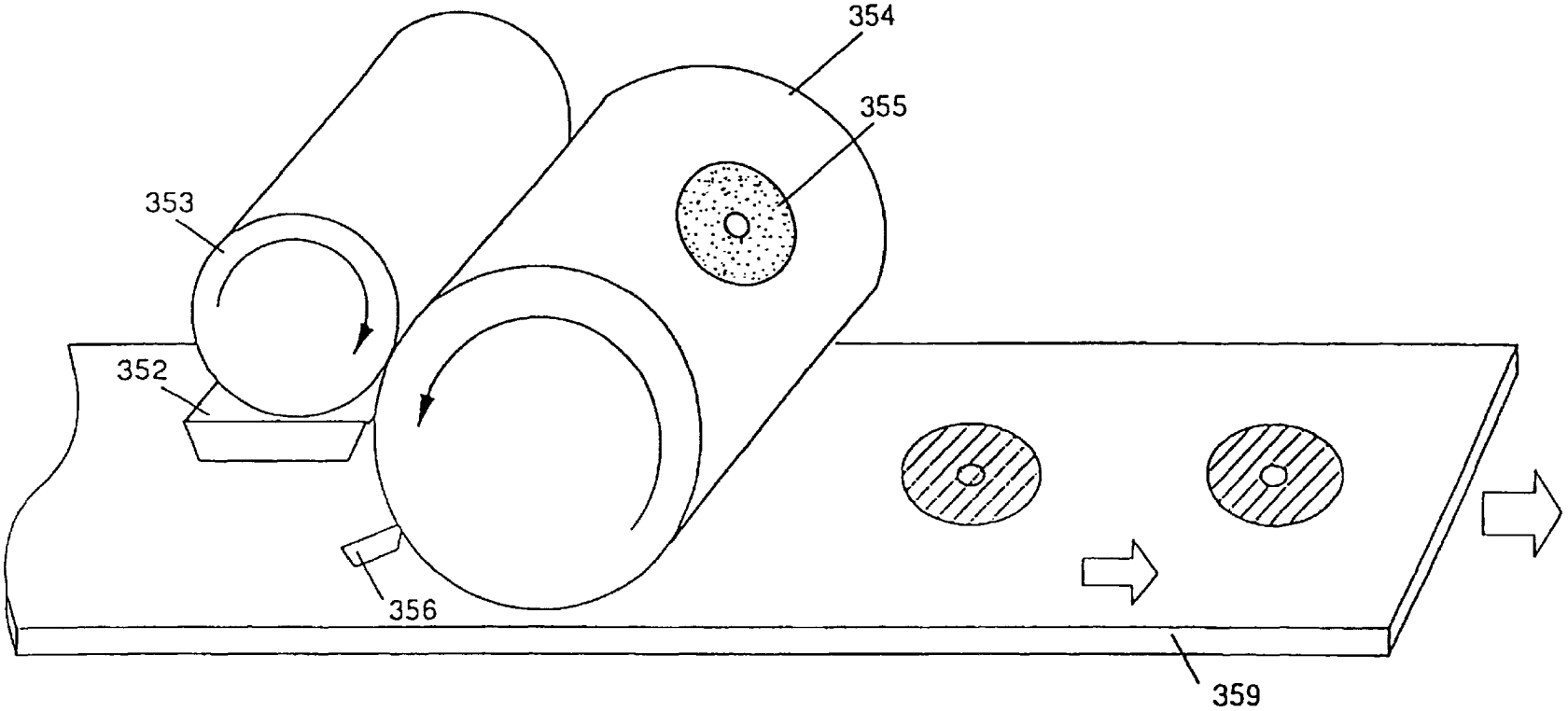

FIG. 109 is a perspective view of a manufacturing system in a state corresponding to an application step in the twelfth embodiment.

Figure 110:
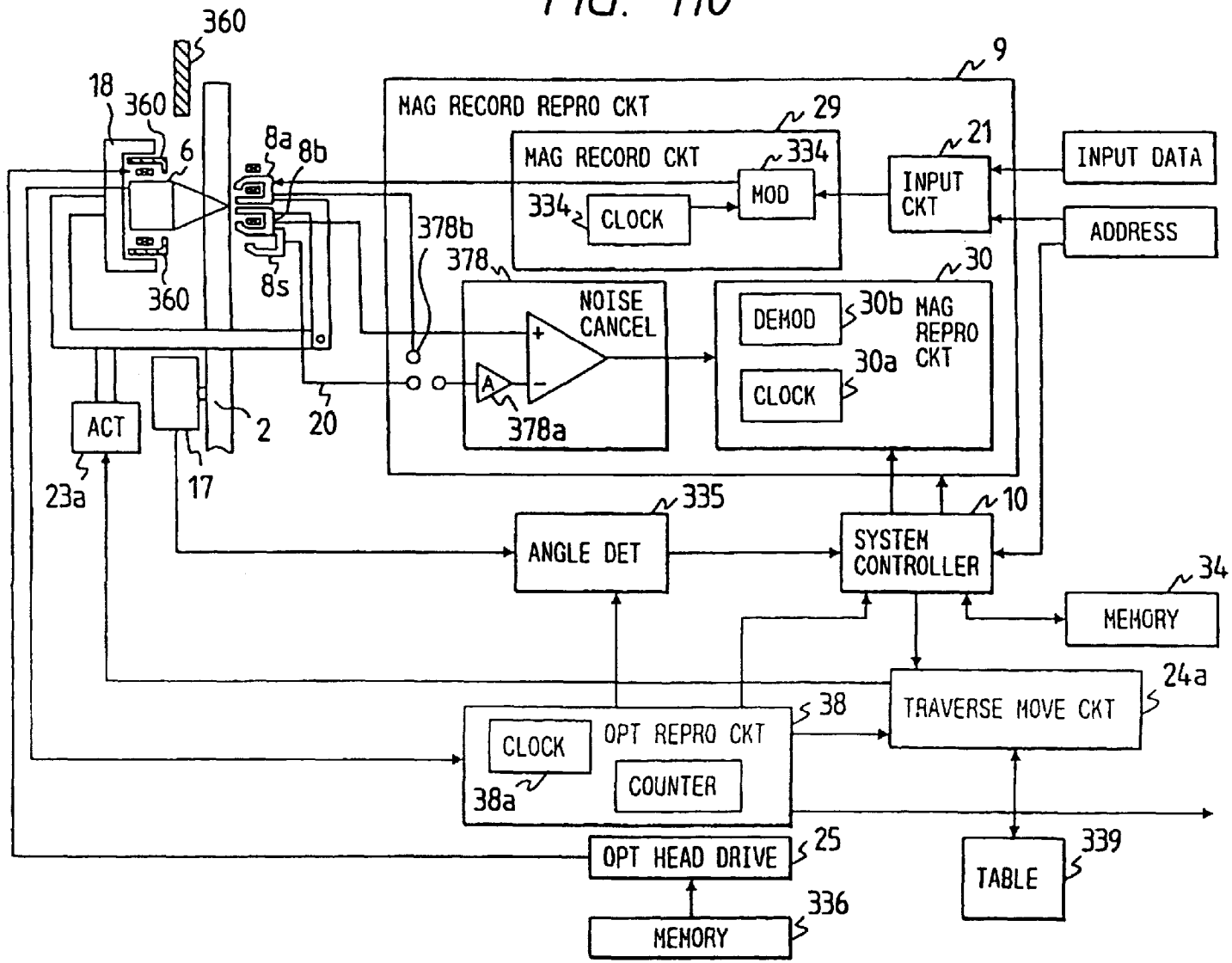

FIG. 110 is a block diagram of a recording and reproducing apparatus according to a thirteenth embodiment of this invention.

Figure 111:
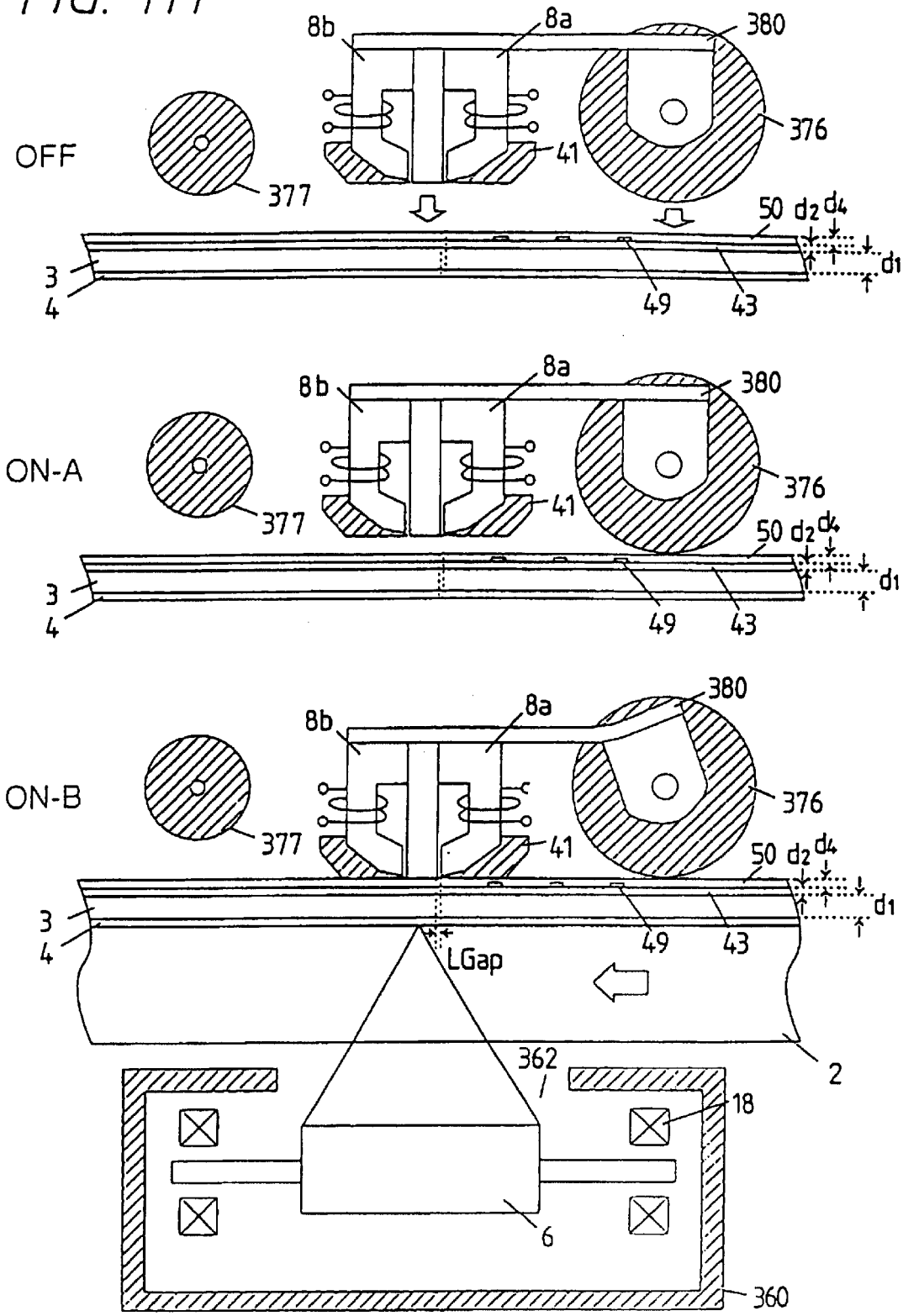

FIG. 111 is a transversely sectional view of a portion around a magnetic head in the thirteenth embodiment.

Figure 112:
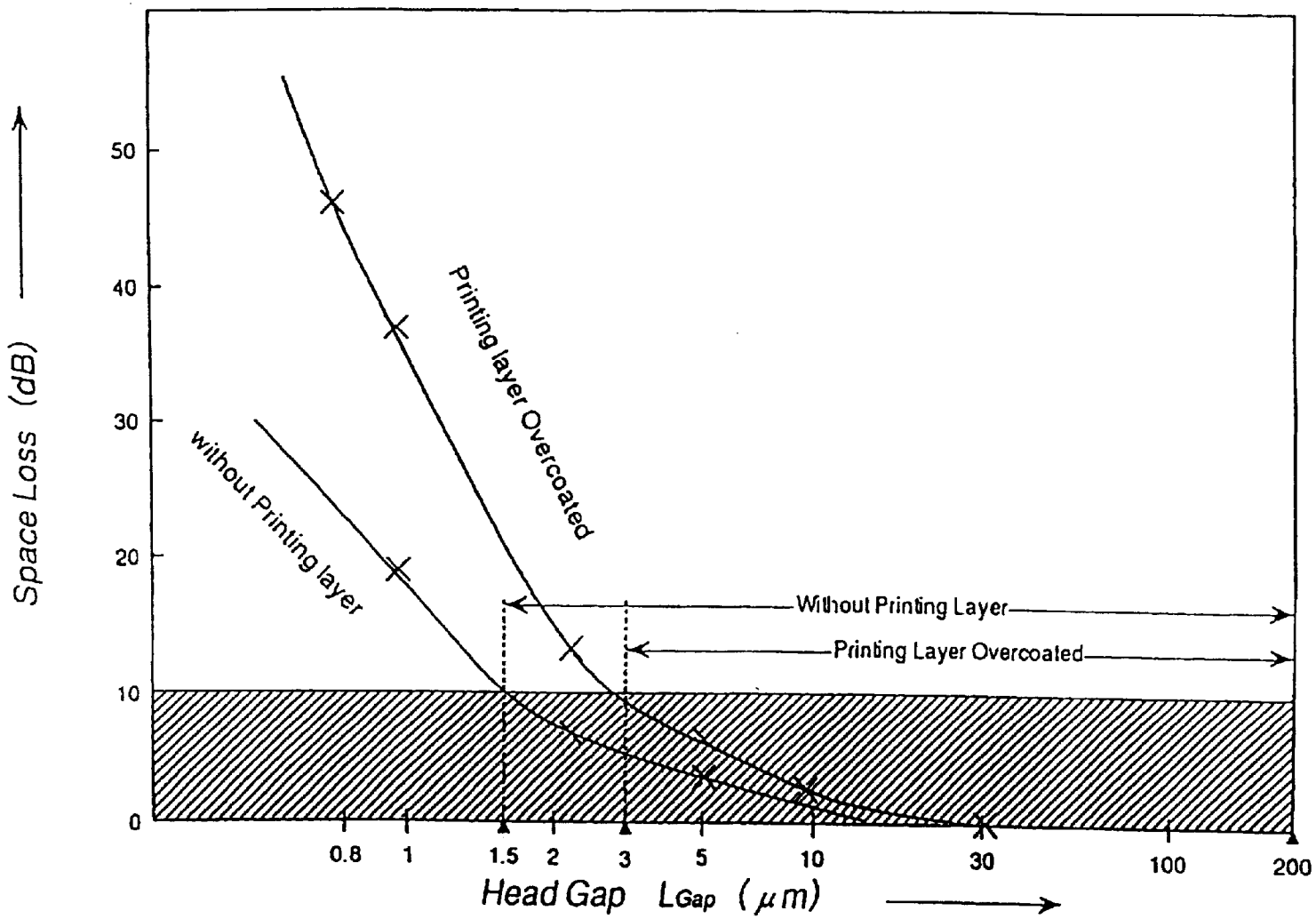

FIG. 112 is an illustration of the relation between a head gap length and an attenuation amount (dB) in the thirteenth embodiment.

Figure 113:
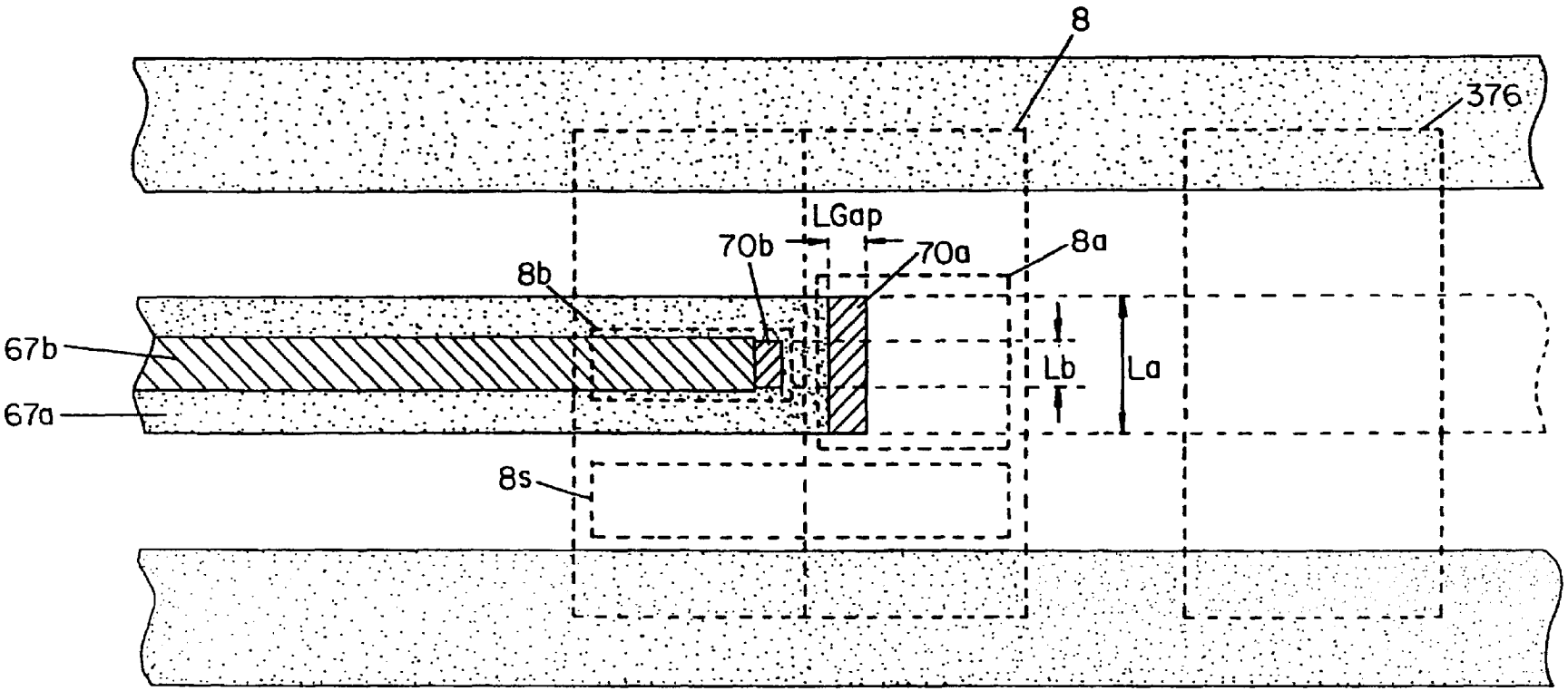

FIG. 113 is a top view of a magnetic track in the thirteenth embodiment.

Figure 114:
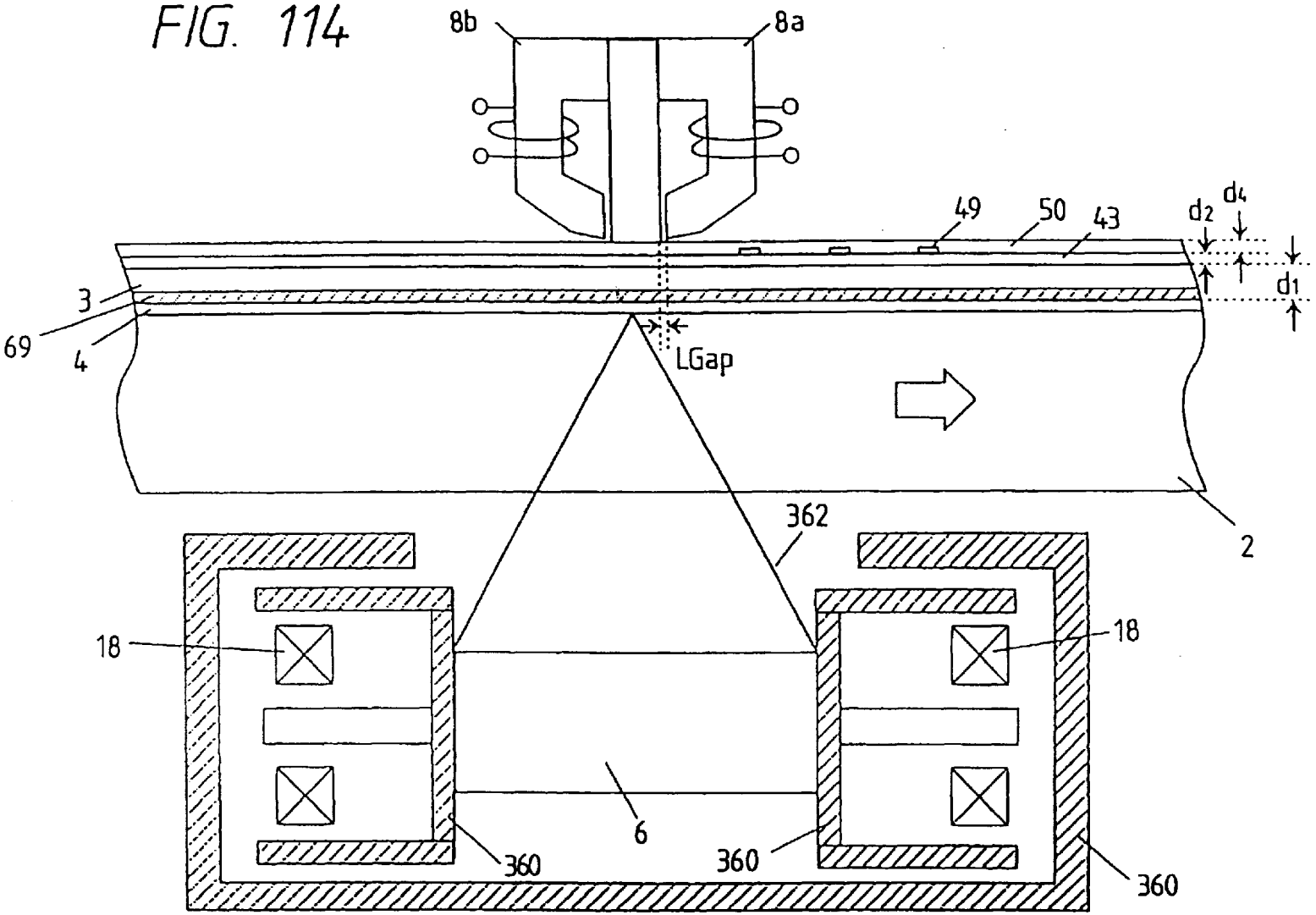

FIG. 114 is a transversely sectional view of a portion around a magnetic head in the thirteenth embodiment.

Figure 115A:
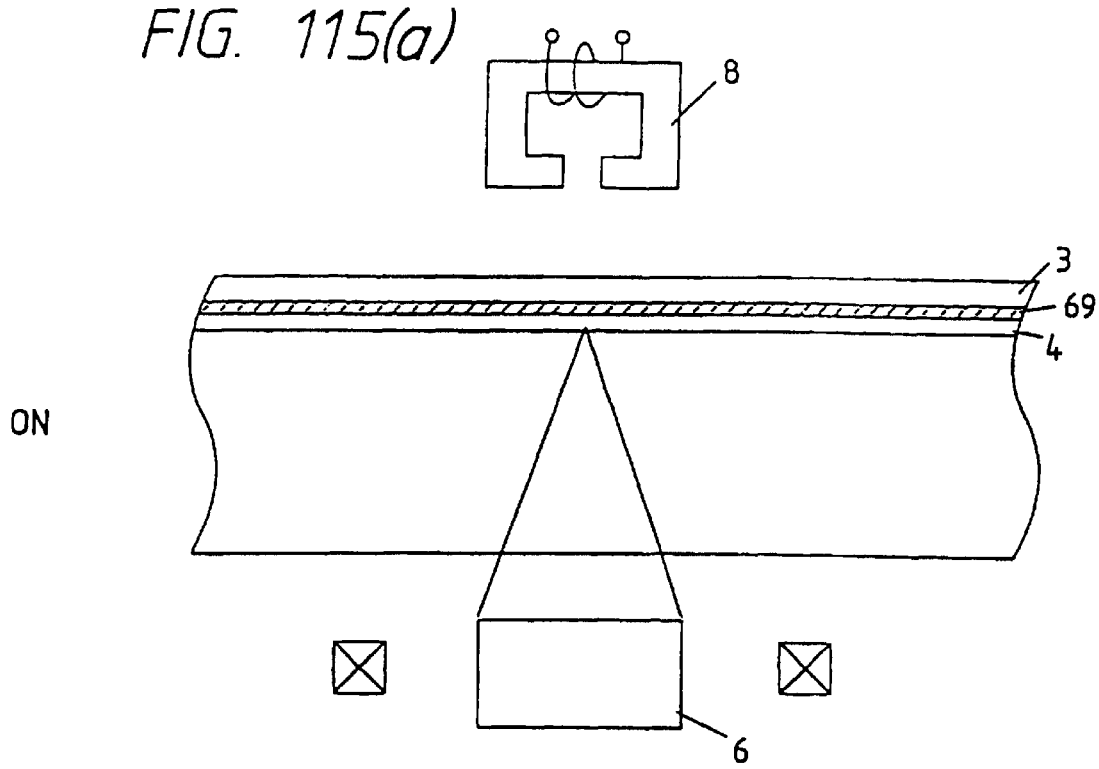
Figure 115B:
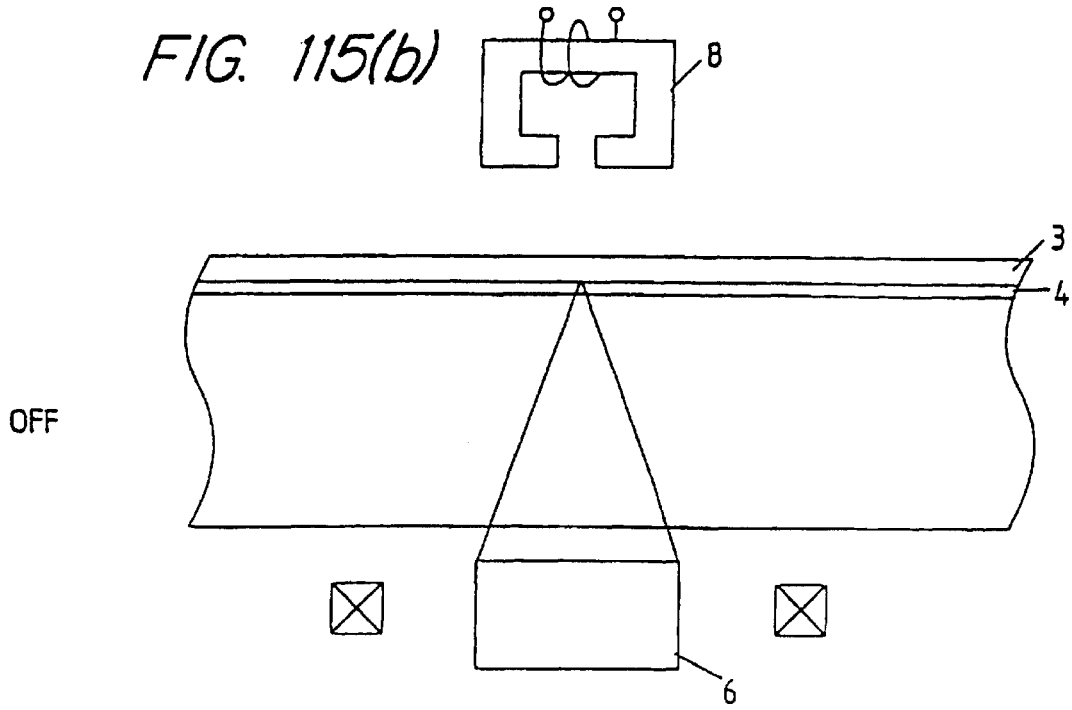

FIGS. 115(a) and 115(b) are a transversely sectional view of conditions where a recording medium is placed in an operable position.

Figure 116:
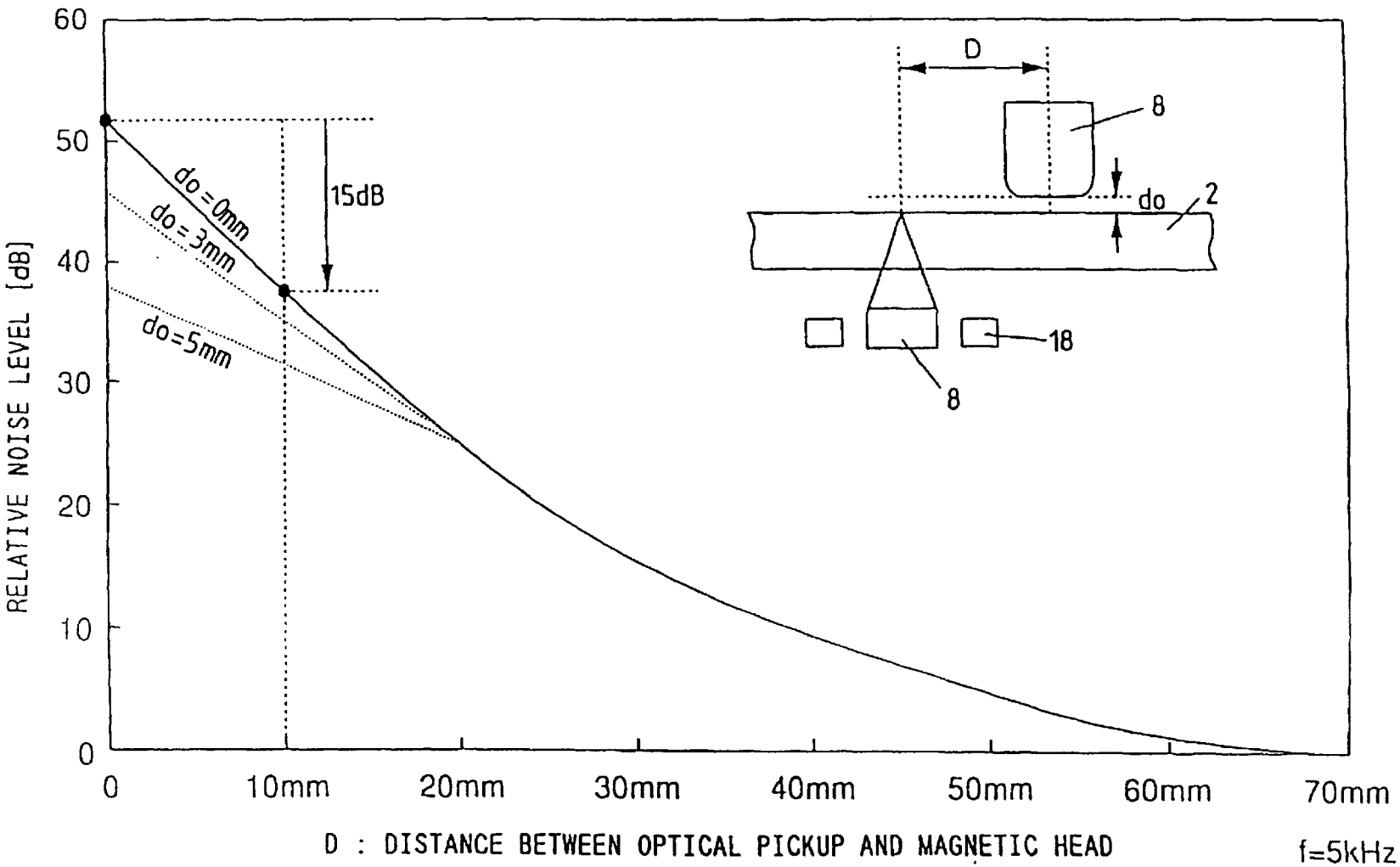

FIG. 116 is an illustration of the relation between a relative noise amount and a distance between an optical head and a magnetic head in the twelfth and thirteenth embodiments.

Figure 117:
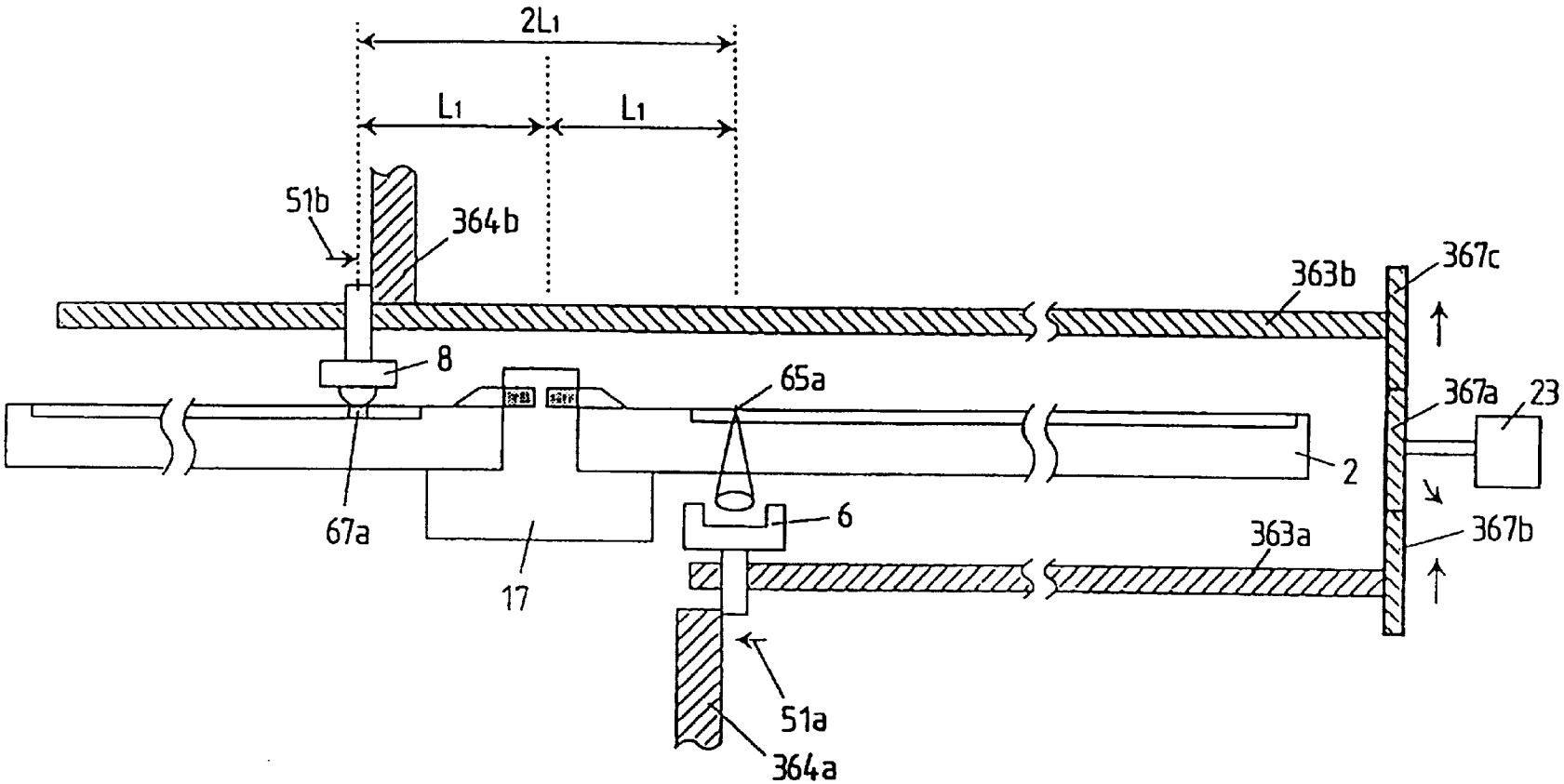

FIG. 117 is a transverse sectional view of a head traverse portion in the thirteenth embodiment.

Figure 118:
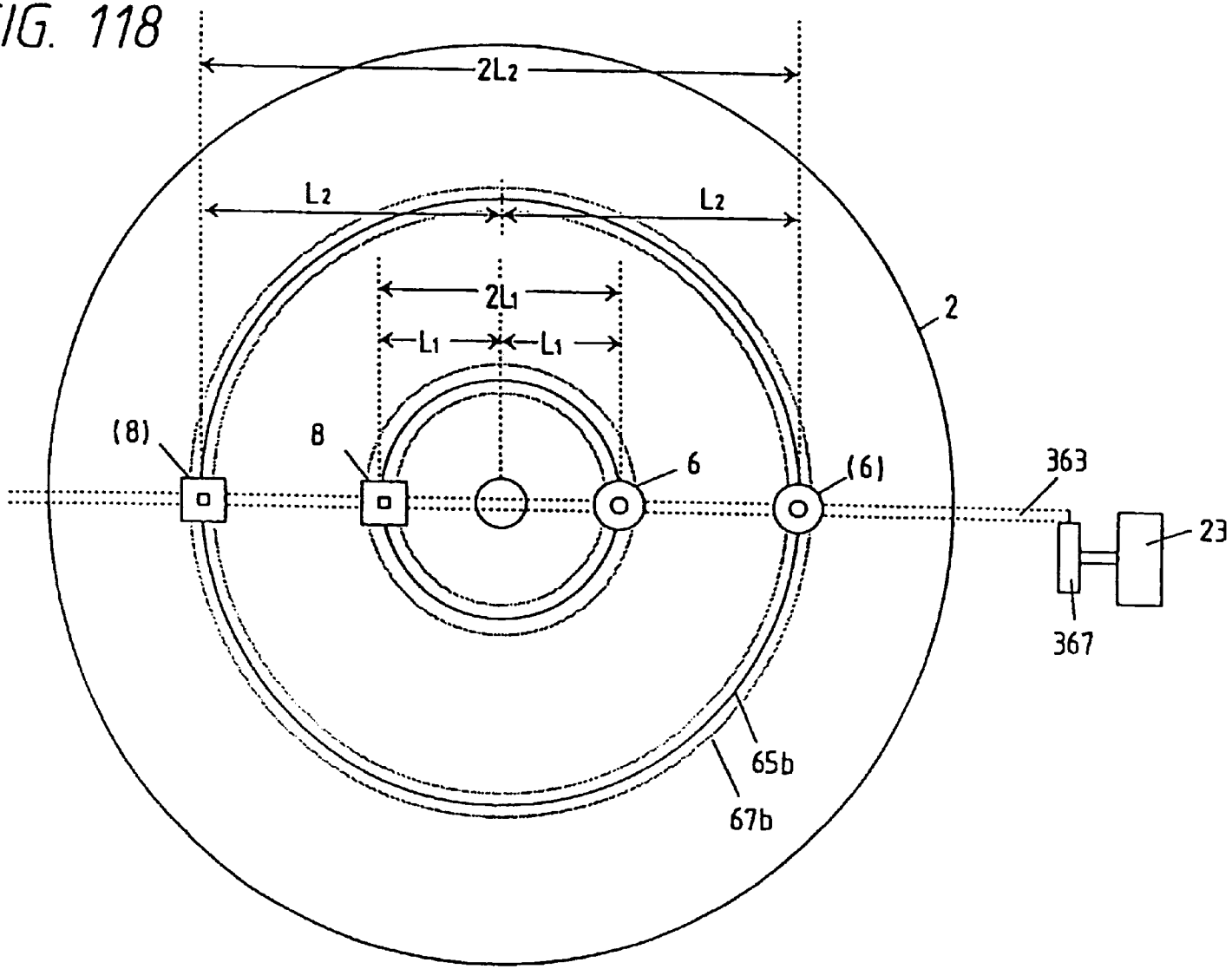

FIG. 118 is a top view of a head traverse portion in the thirteenth embodiment.

Figure 119:
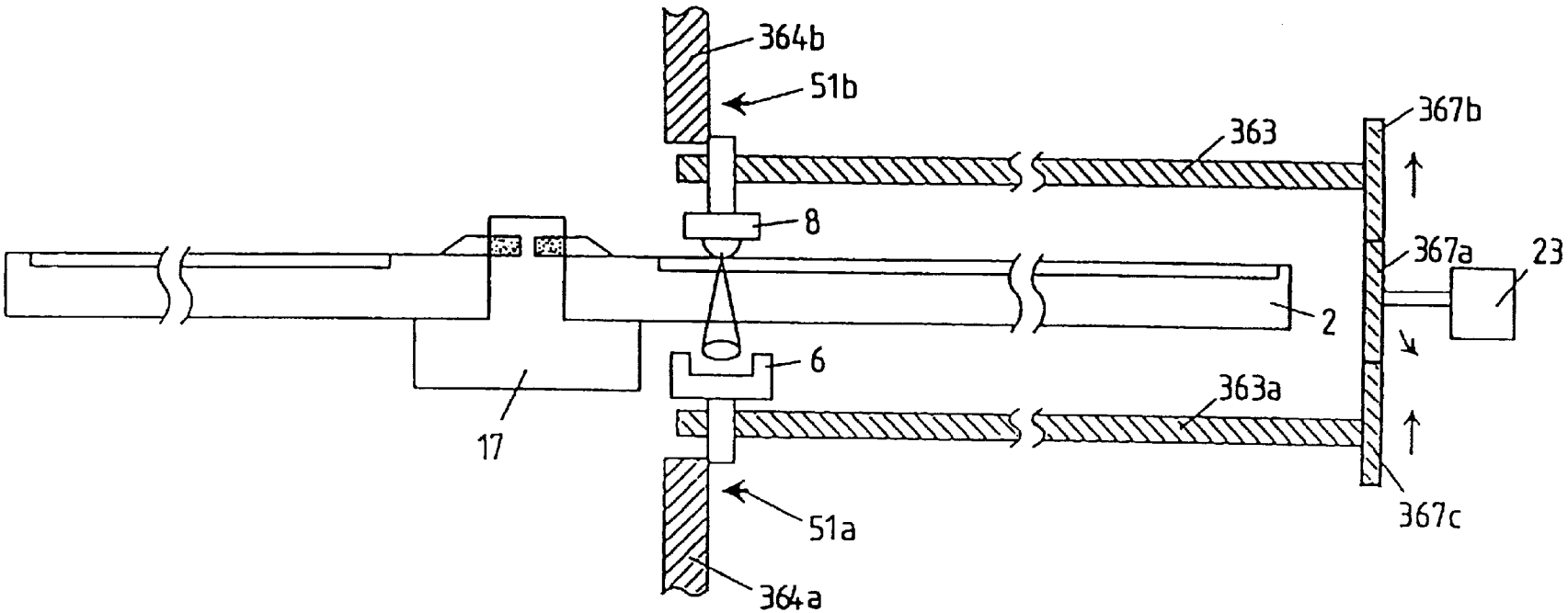

FIG. 119 is a transversely sectional view of another head traverse portion in the thirteenth embodiment.

Figure 120:
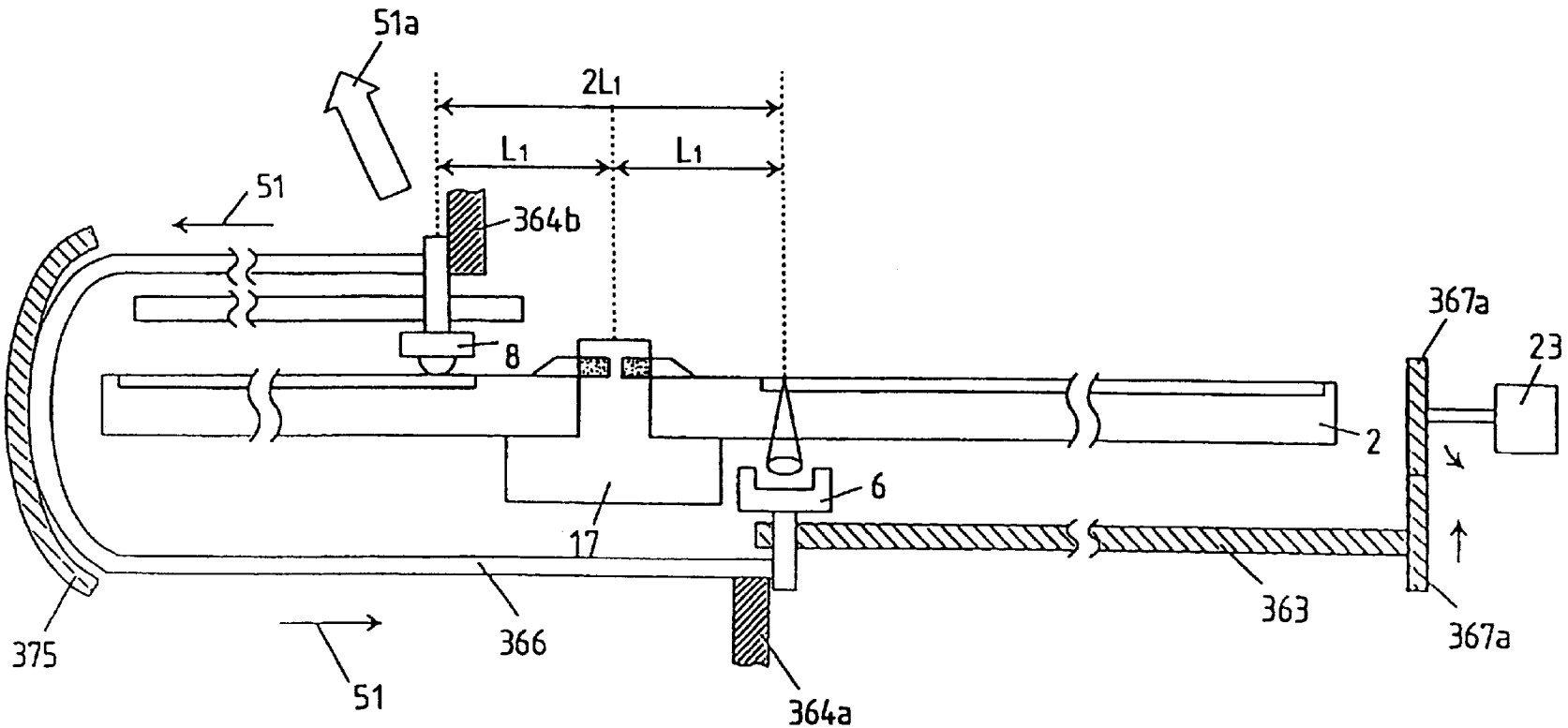

FIG. 120 is a transversely sectional view of another head traverse portion in the thirteenth embodiment.

Figure 121:
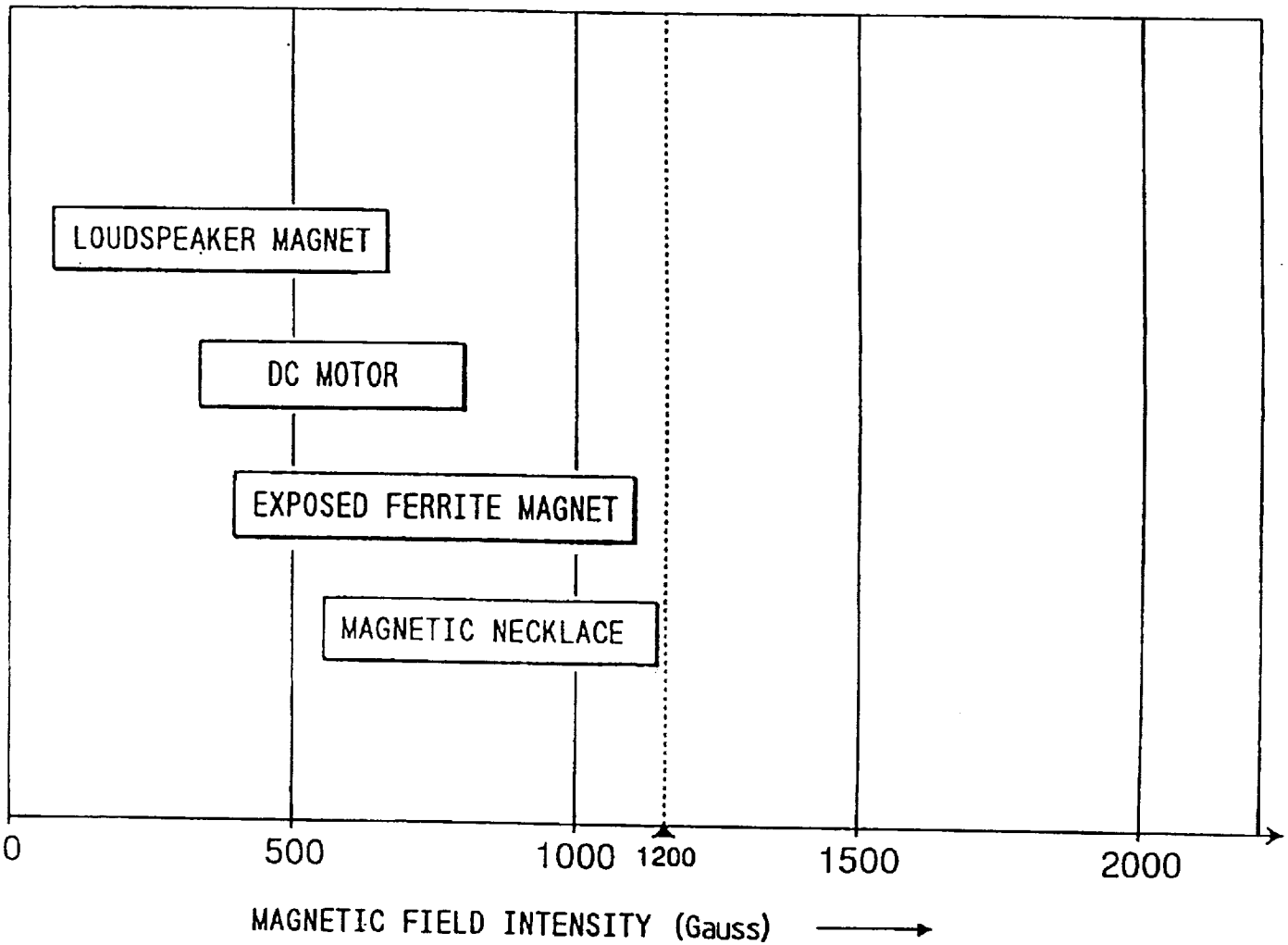

FIG. 121 is an illustration of the intensities of magnetic fields generated by various home-use appliances.

Figure 122:
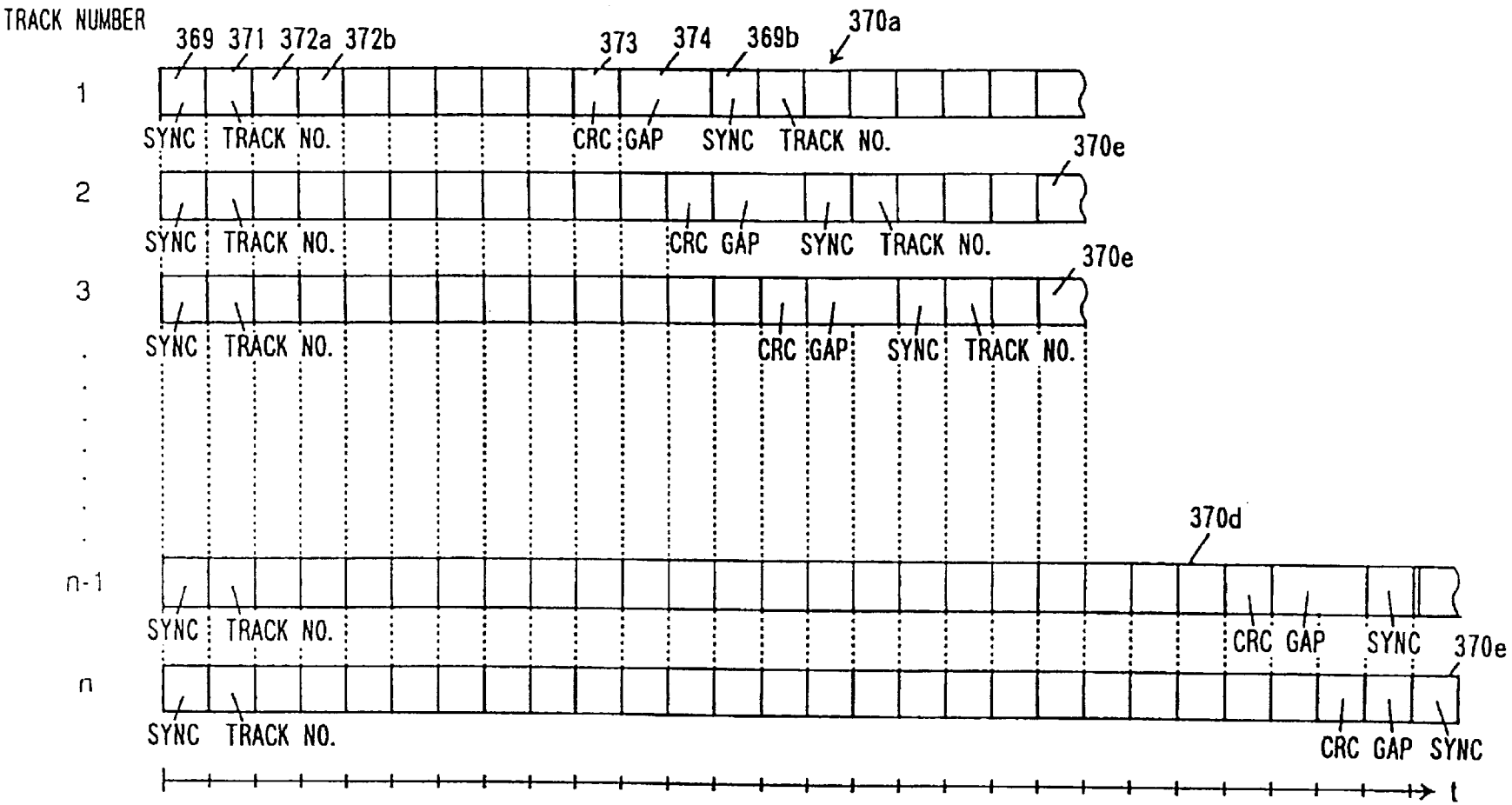

FIG. 122 is an illustration of a recording format on a recording medium in the thirteenth embodiment.

Figure 123:
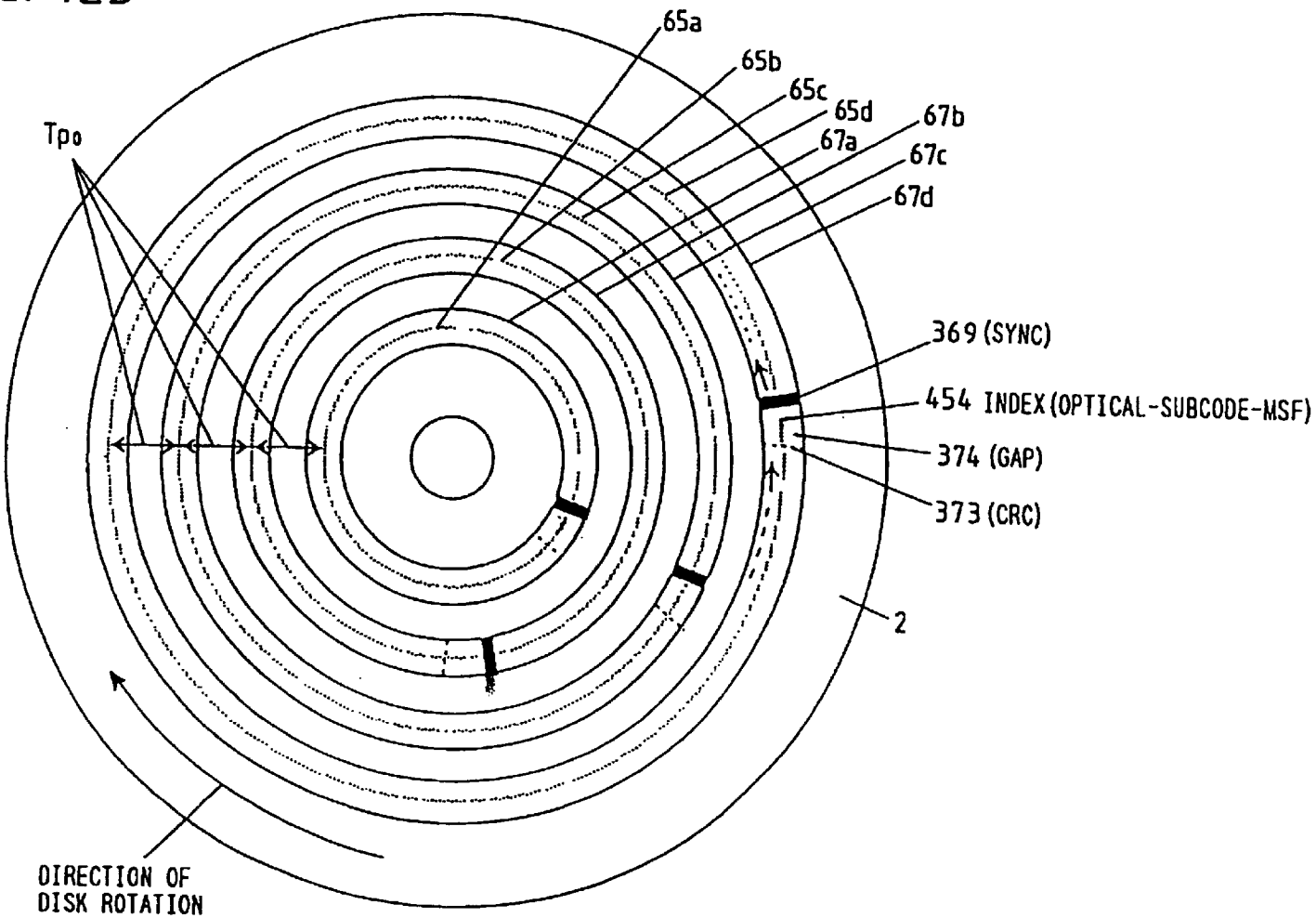

FIG. 123 is an illustration of a recording format on a recording medium in a normal mode in the thirteenth embodiment.

Figure 124:
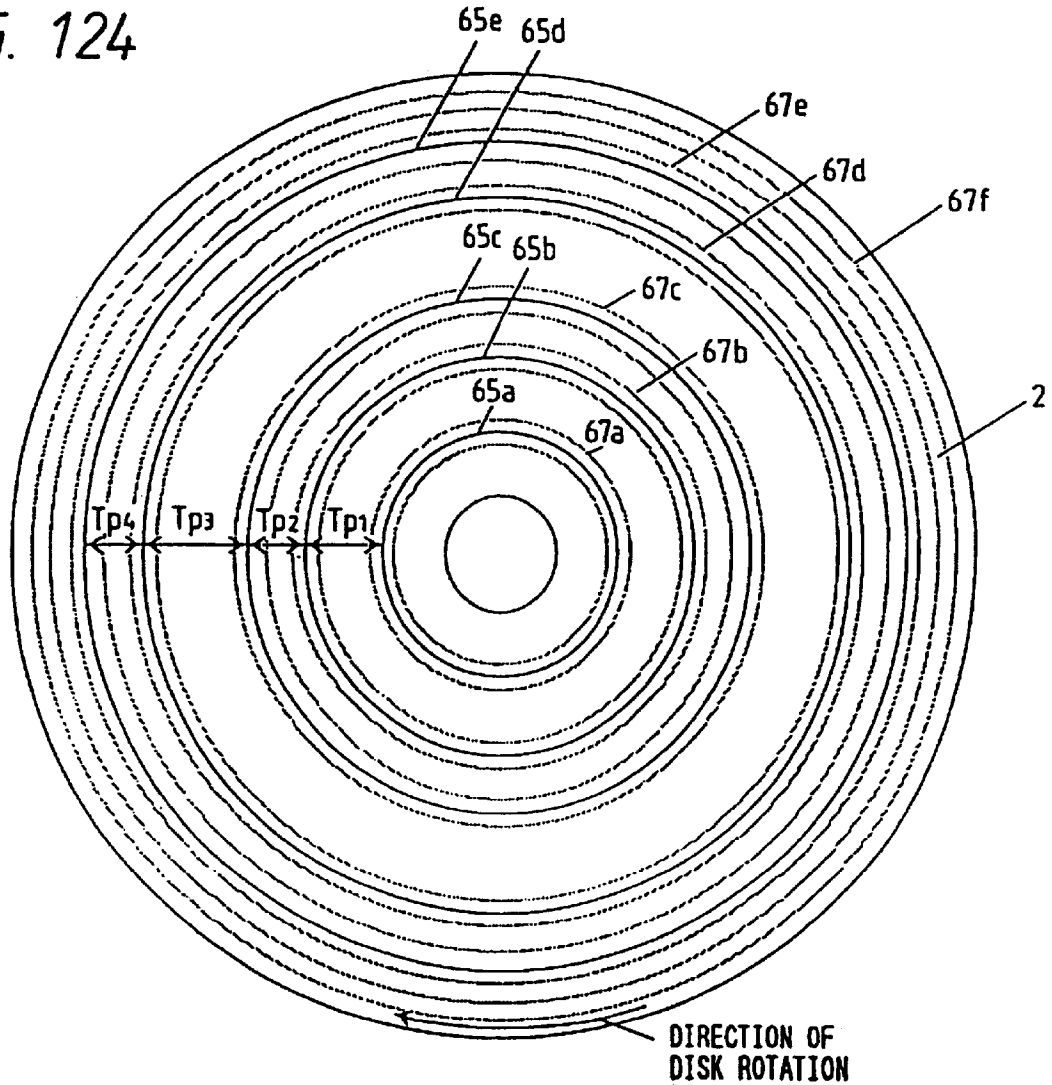

FIG. 124 is an illustration of a recording format on a recording medium in a variable track pitch mode in the thirteenth embodiment.

Figure 125:
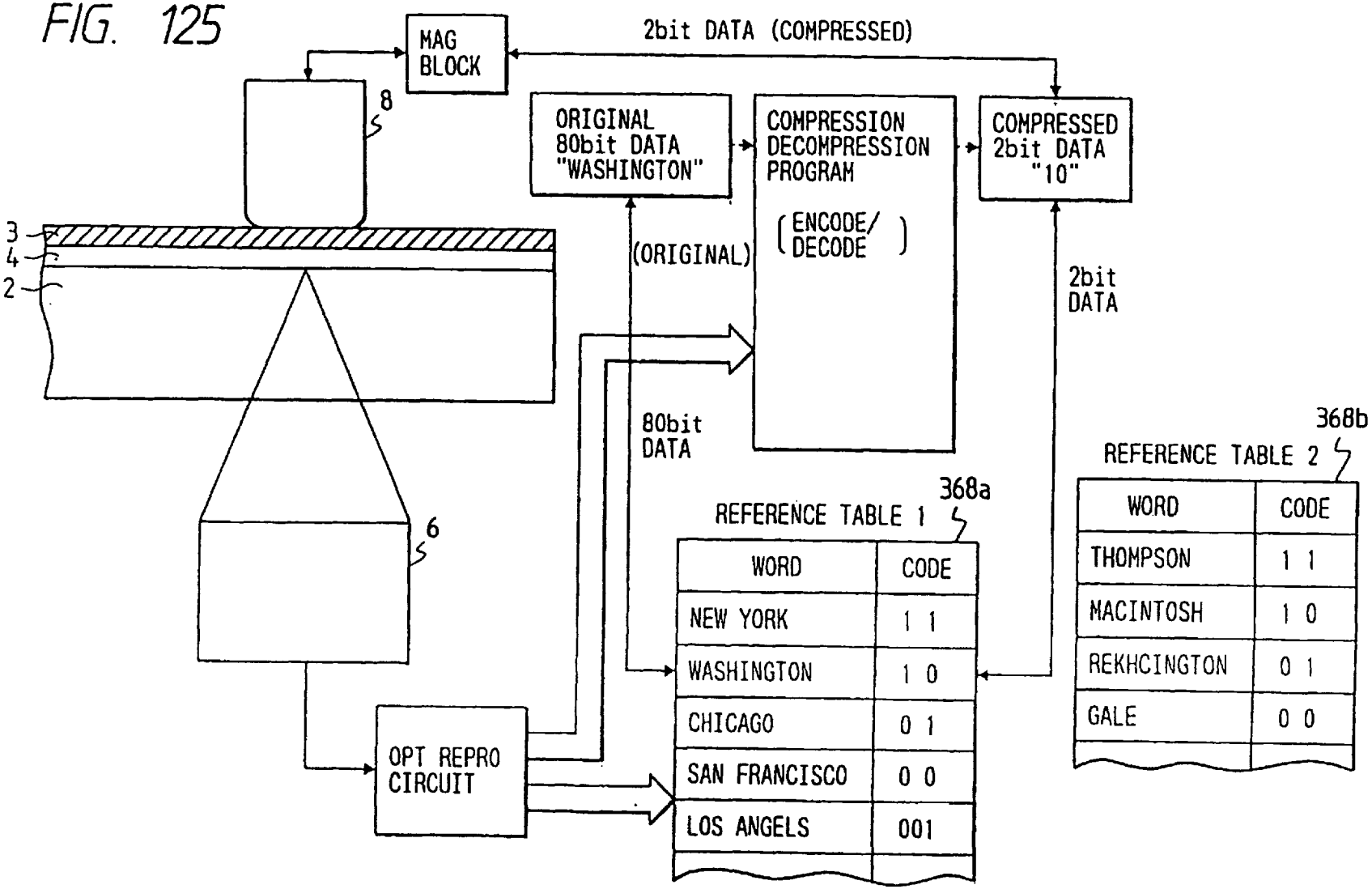

FIG. 125 is an illustration of compressing magnetic recorded information by using a reference table of optical recorded information in the thirteenth embodiment.

Figure 126:
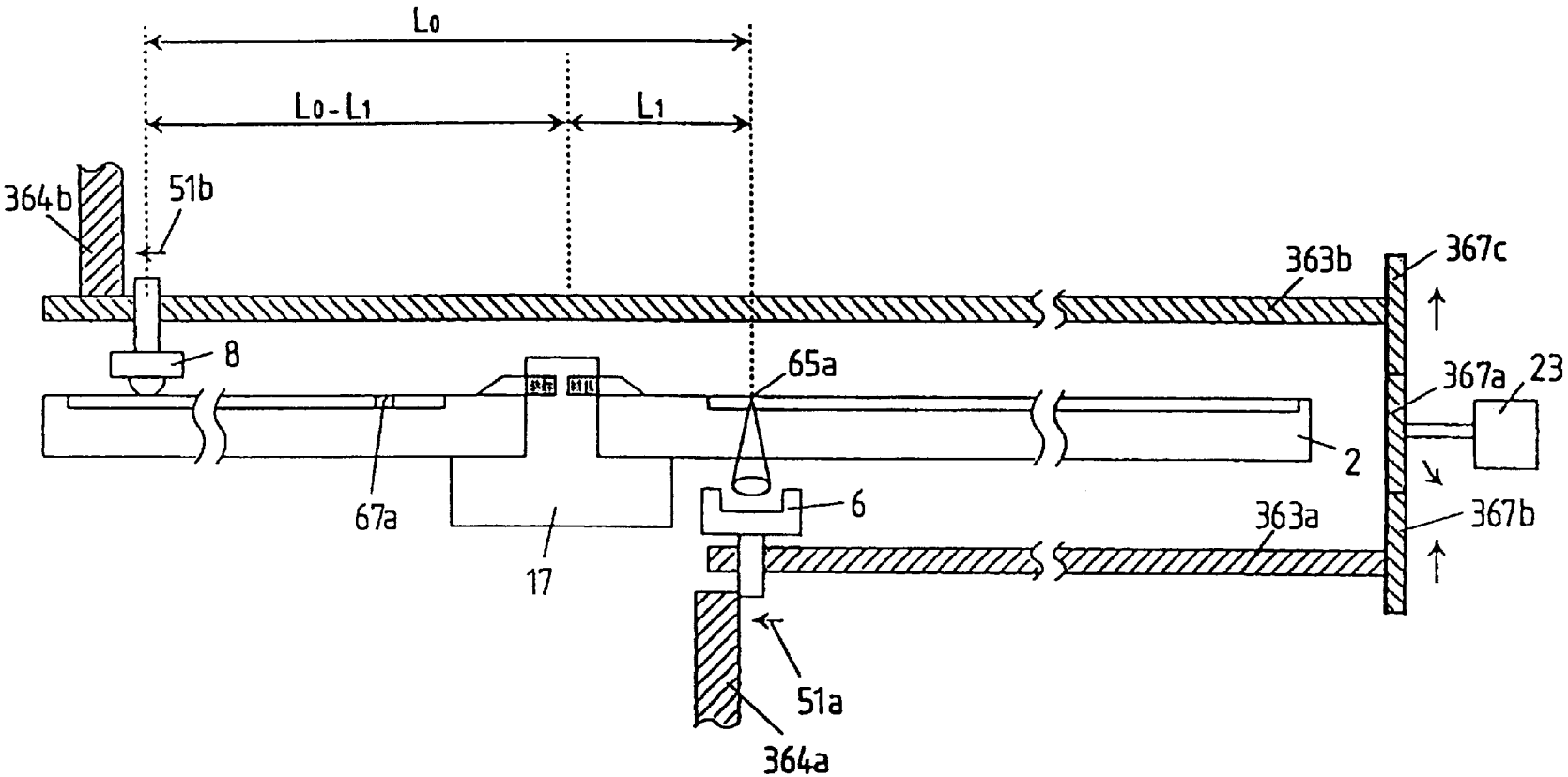

FIG. 126 is a transversely sectional view of a head traverse portion in the thirteenth embodiment.

Figure 127:
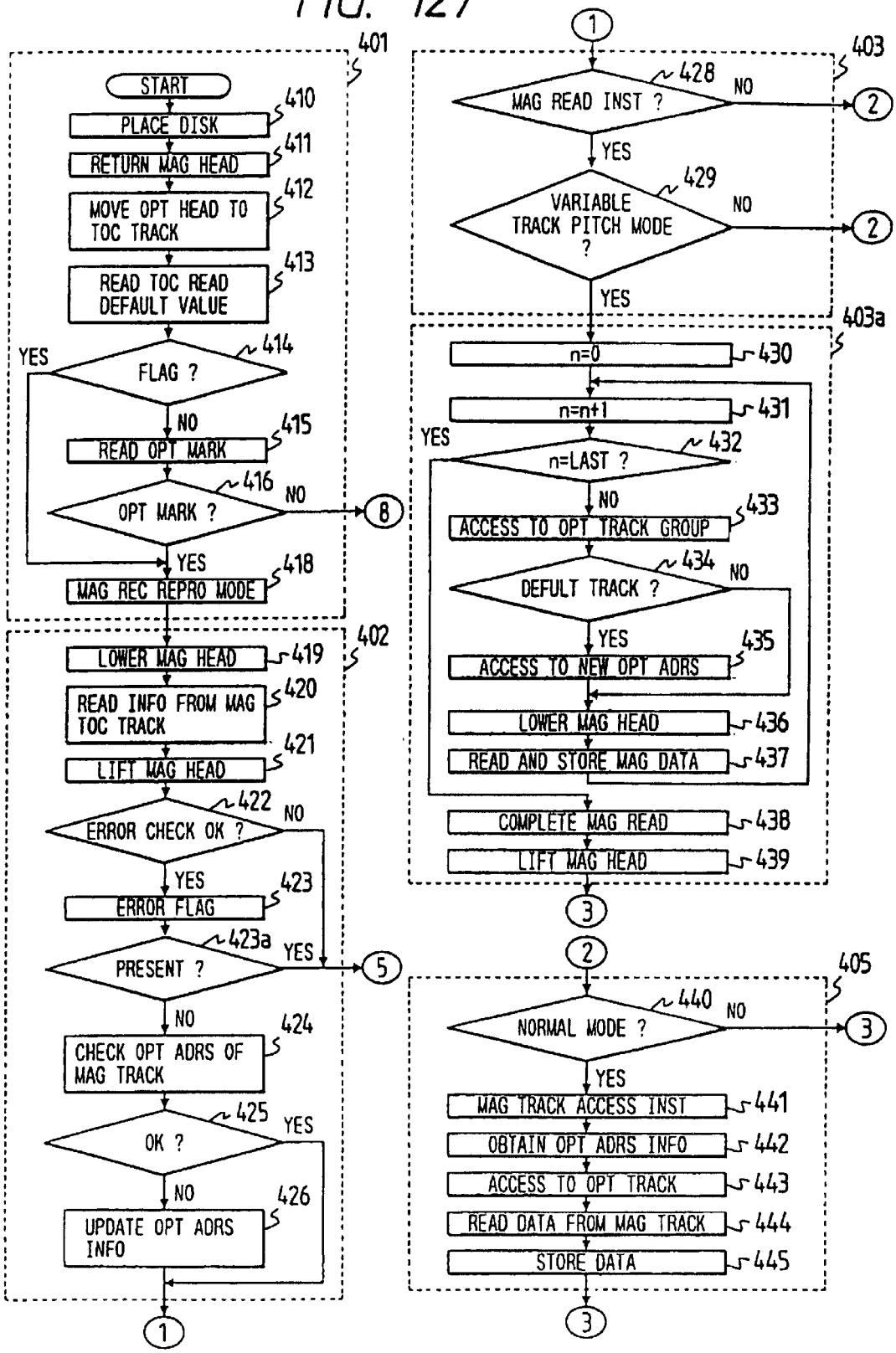

FIG. 127 is a flowchart of a recording and reproducing program in the thirteenth embodiment.

Figure 128:
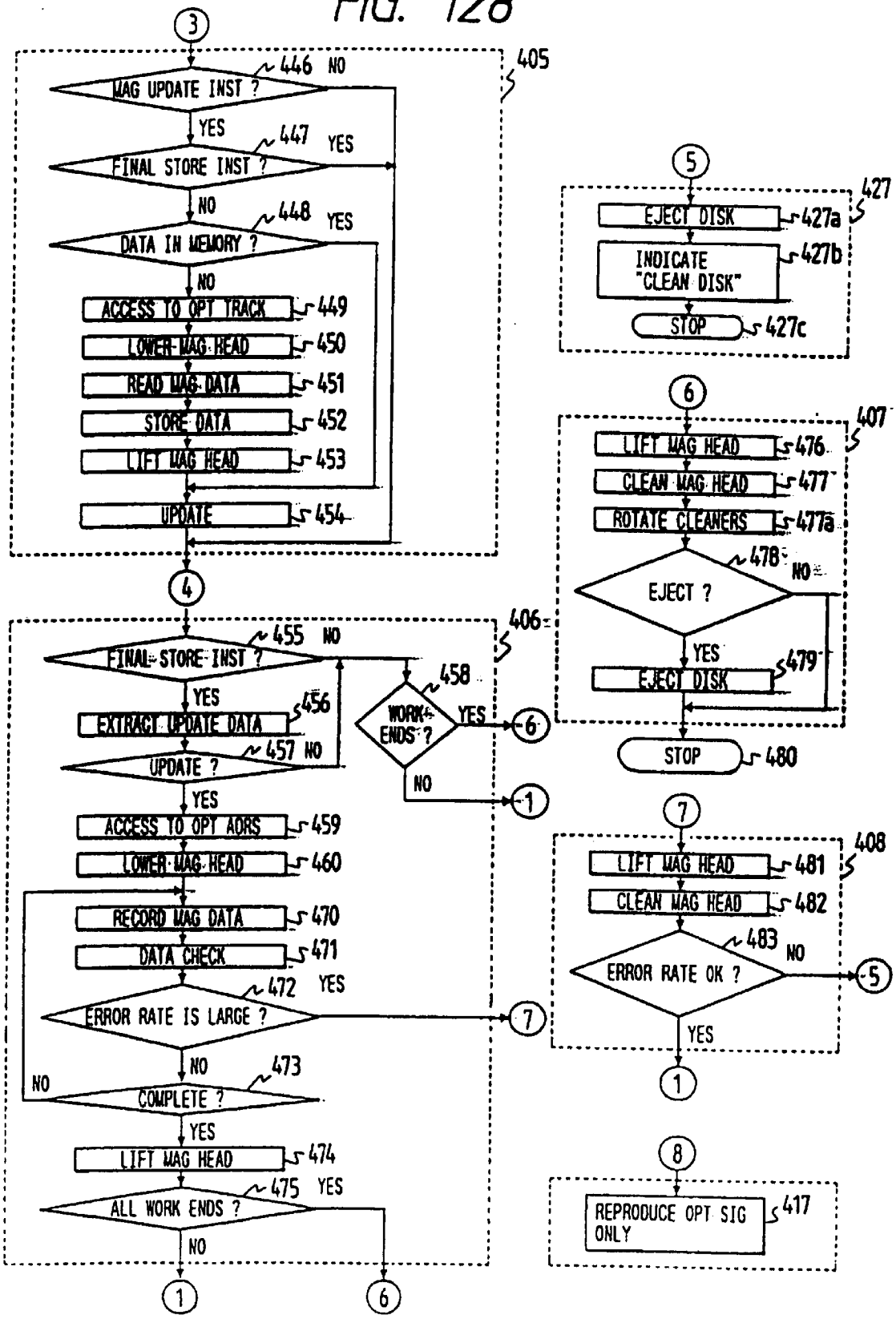

FIG. 128 is a flowchart of a recording and reproducing program in the thirteenth embodiment.

Figures 129A, 129B, 129C:
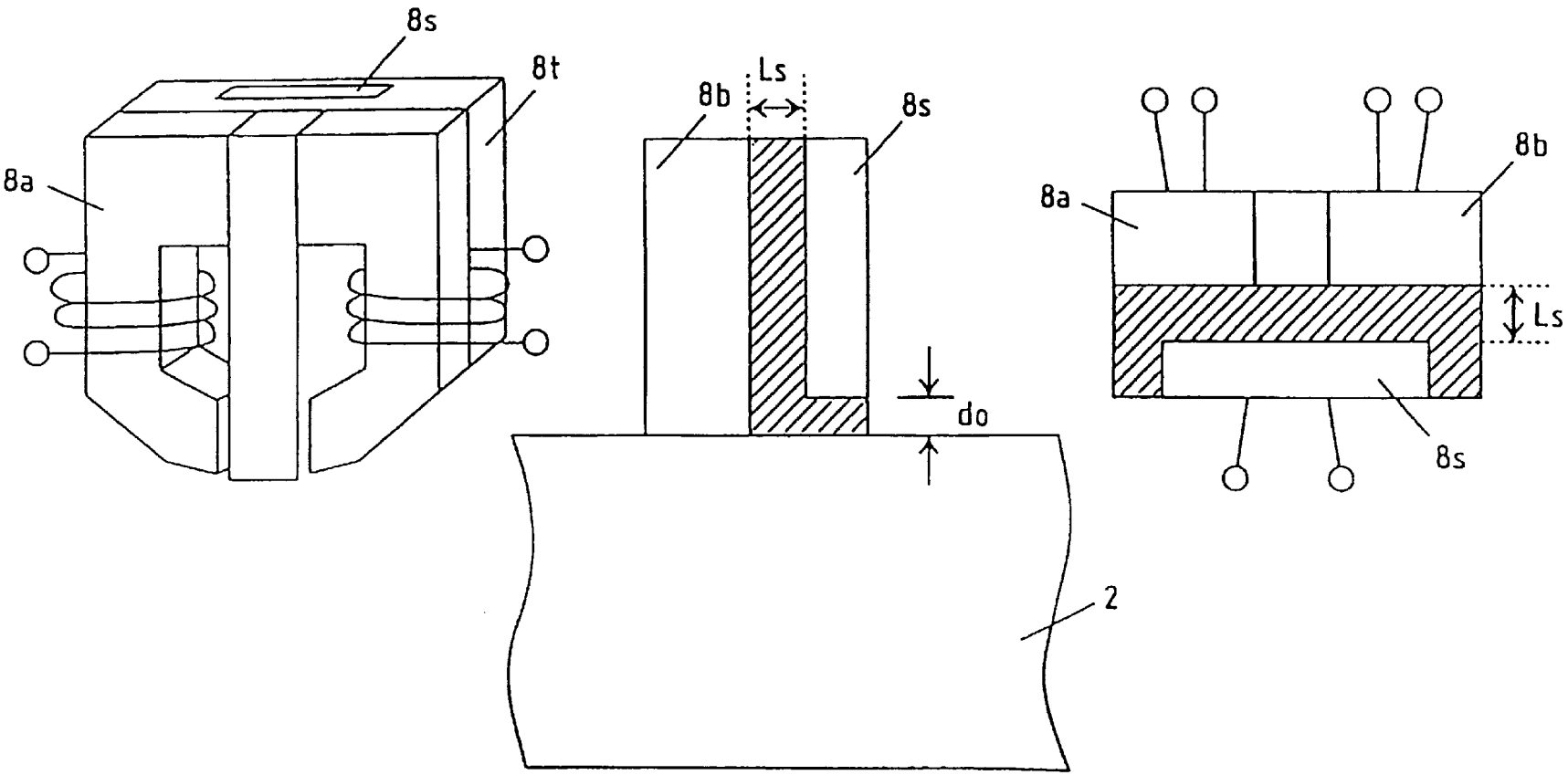

FIG. 129(a) is an illustration of a noise detecting head in the thirteenth embodiment.

FIG. 129(b) is an illustration of a noise detecting head in the thirteenth embodiment.

FIG. 129(c) is an illustration of a noise detecting head in the thirteenth embodiment.

Figure 130:
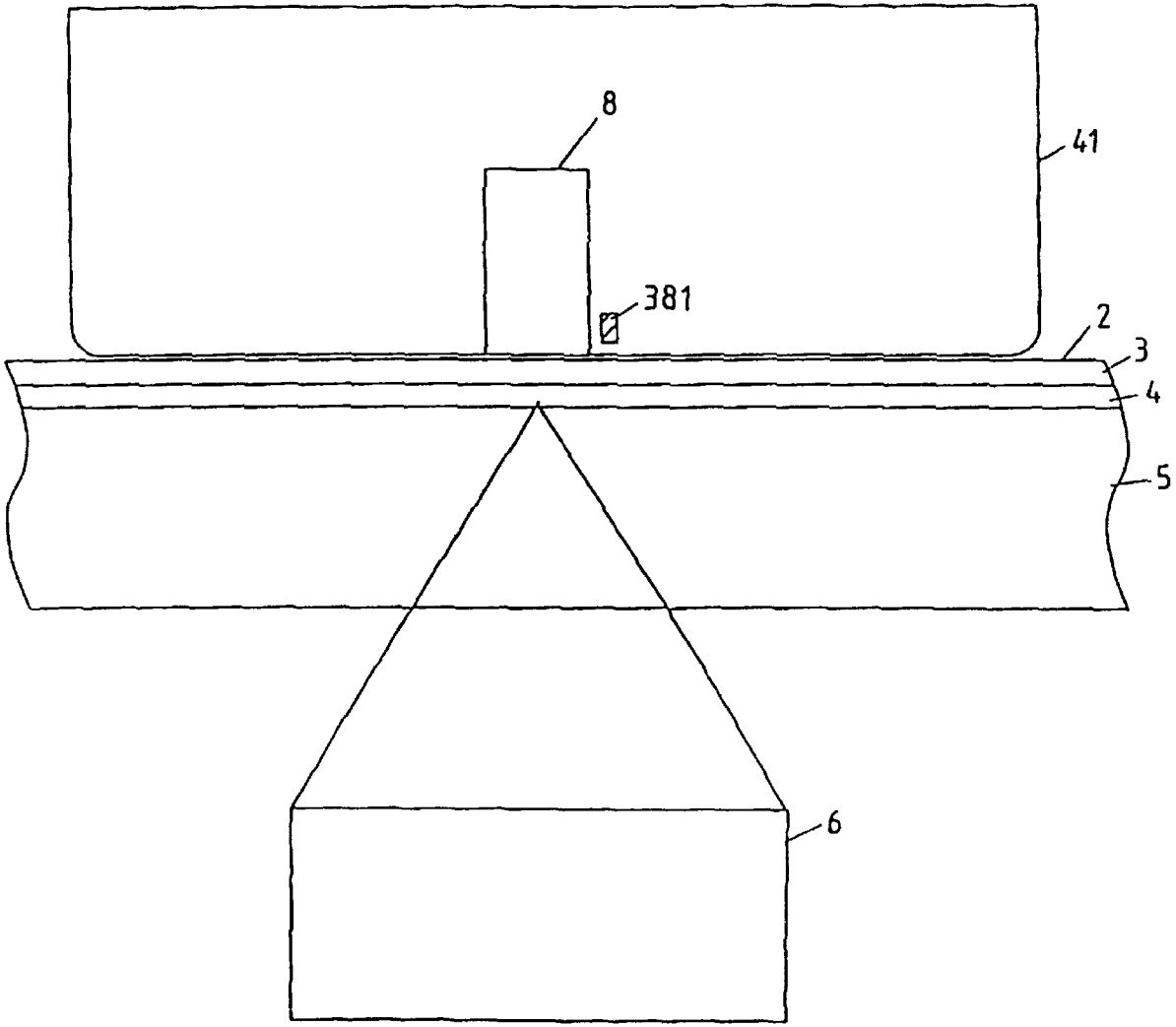

FIG. 130 is an illustration of a magnetic sensor in the thirteenth embodiment.

Figure 131:
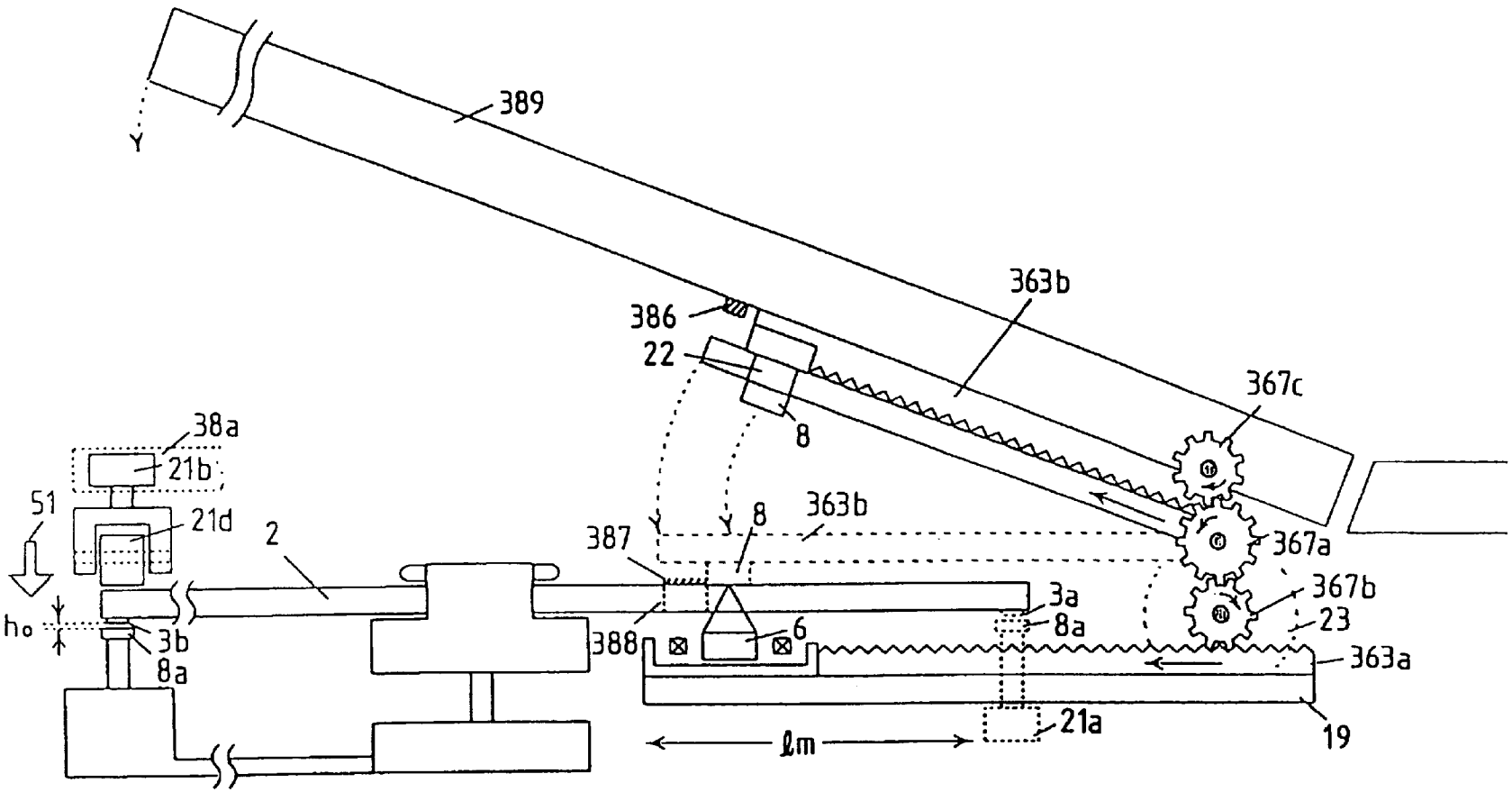
Figures 132A, 132B, 132C, 132D, 132E, 132F, 132G, 132H:
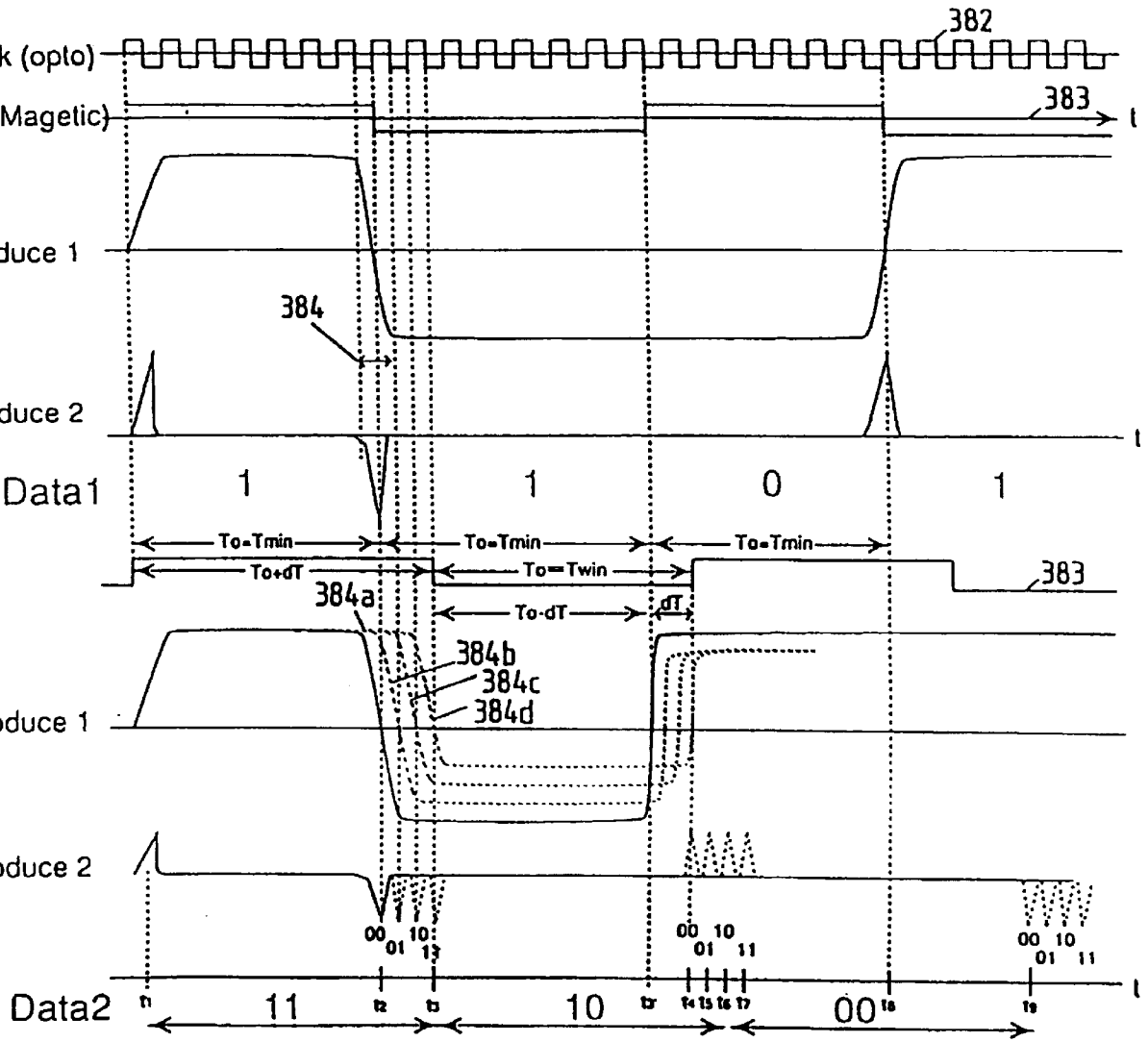

FIG. 131 is a sectional view of a recording and reproducing apparatus according to a fourteenth embodiment of this invention.

FIGS. 132(a)–132(h) are a time-domain diagram of various signals in the fourteenth embodiment.

Figure 133:
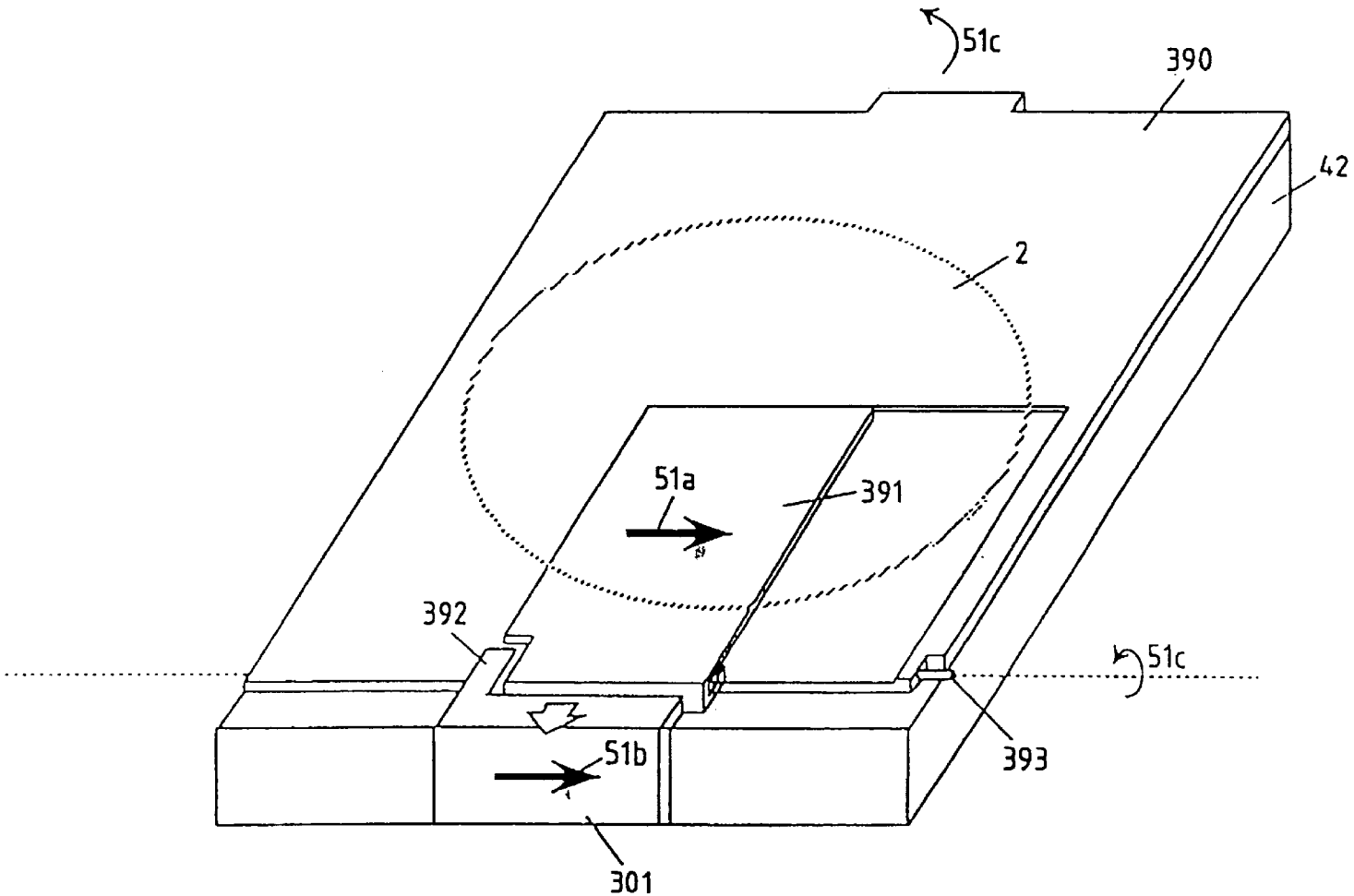

FIG. 133 is a perspective view of a cartridge for an optical recording medium in the fourteenth embodiment.

Figure 134:
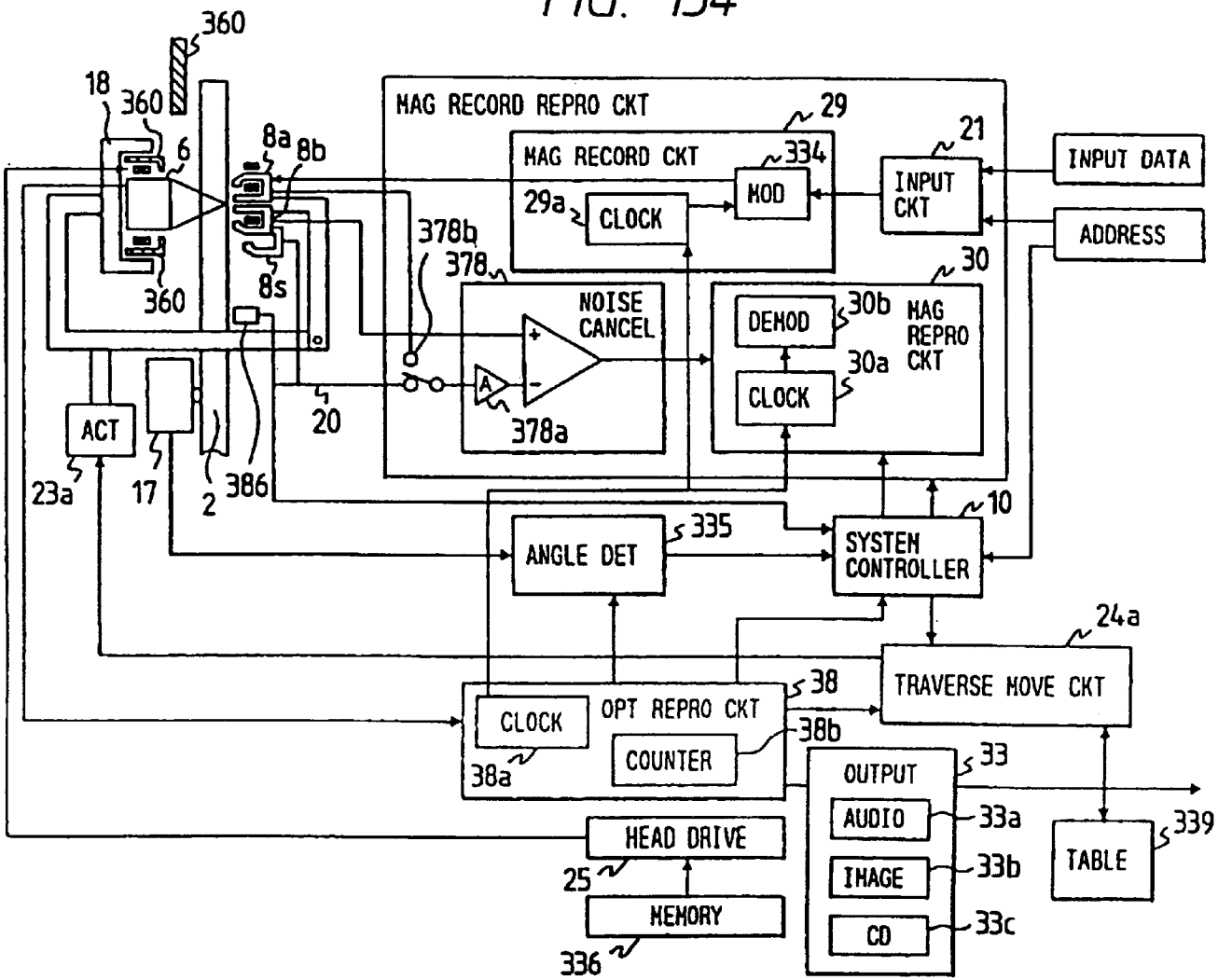
Figures 135A, 135B, 135C, 135D, 135E:
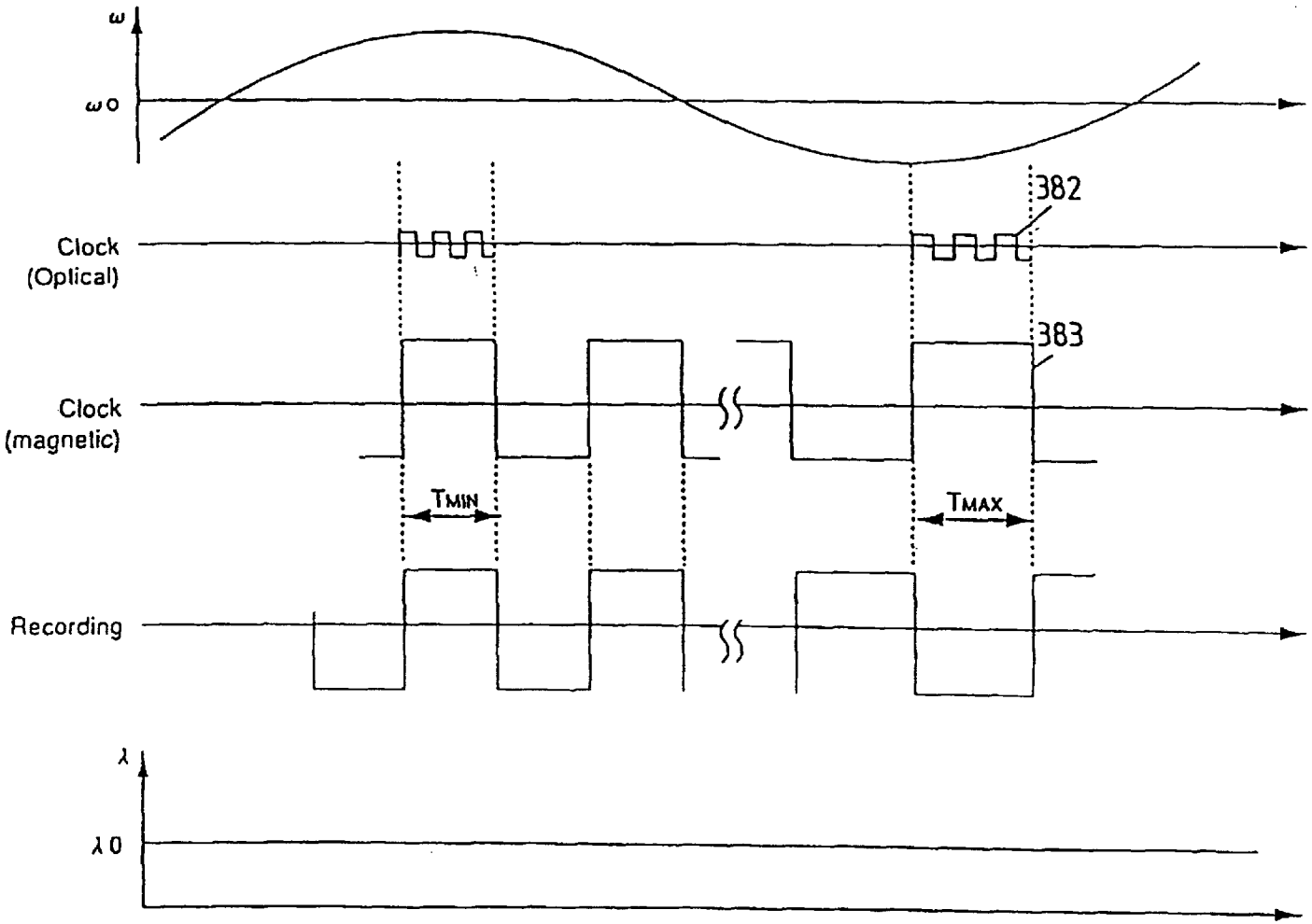

FIG. 134 is a block diagram of a recording and reproducing apparatus in the fourteenth embodiment.

FIGS. 135(a)–135(e) are a time-domain diagram of various signals in the fourteenth embodiment.

Figure 136:
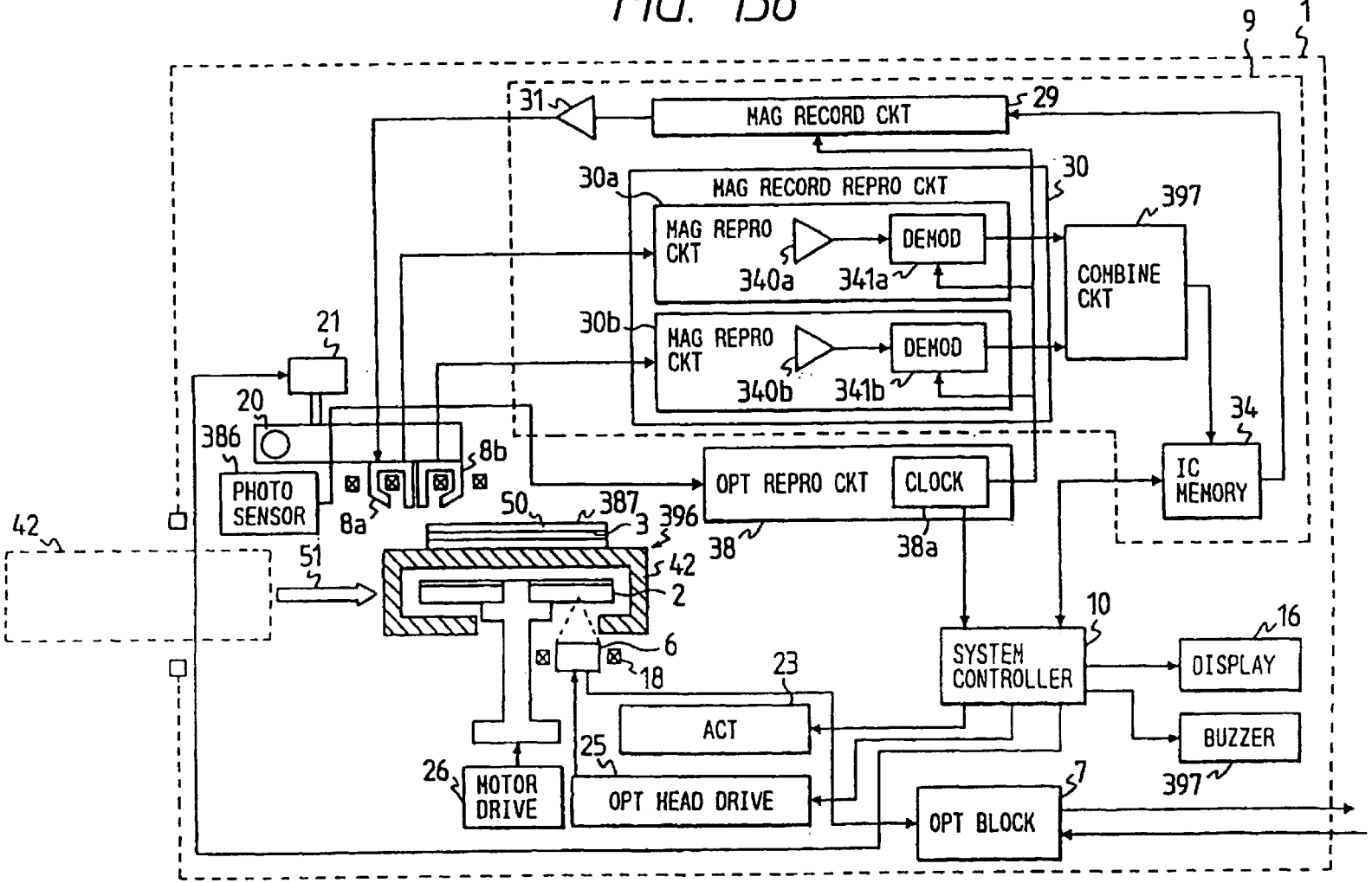

FIG. 136 is a block diagram of a recording and reproducing apparatus according to a fifteenth embodiment of this invention.

Figure 137A:
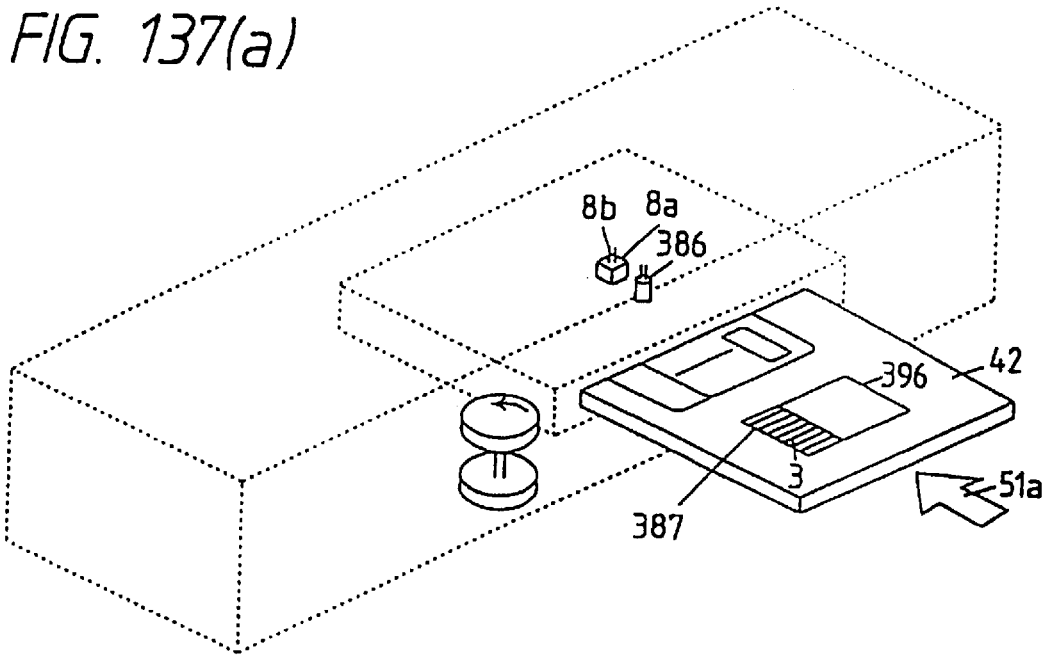

FIG. 137(a) is a perspective view of the fifteenth embodiment in which a cartridge is inserted into the apparatus.

Figure 137B:
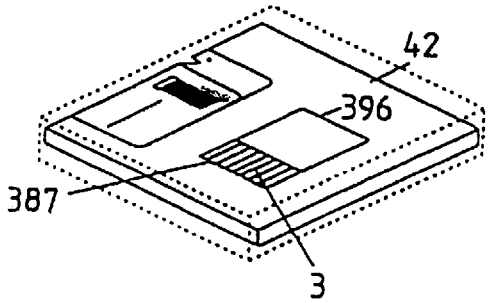

FIG. 137(b) is a perspective view of the fifteenth embodiment in which the cartridge is fixed.

Figure 137C:
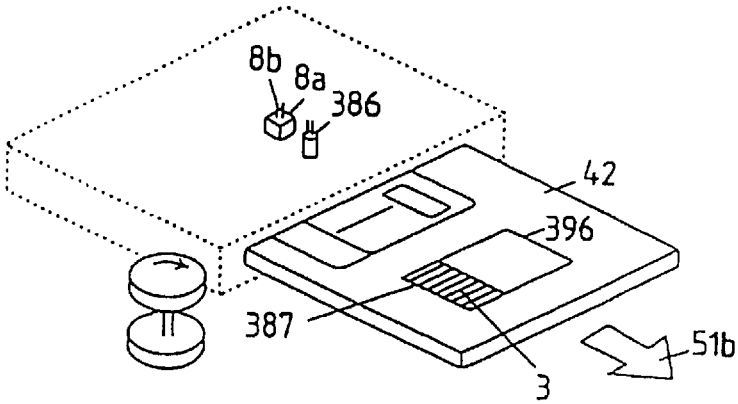

FIG. 137(c) is a perspective view of the fifteenth embodiment in which the cartridge is ejected from the apparatus.

Figure 138A:
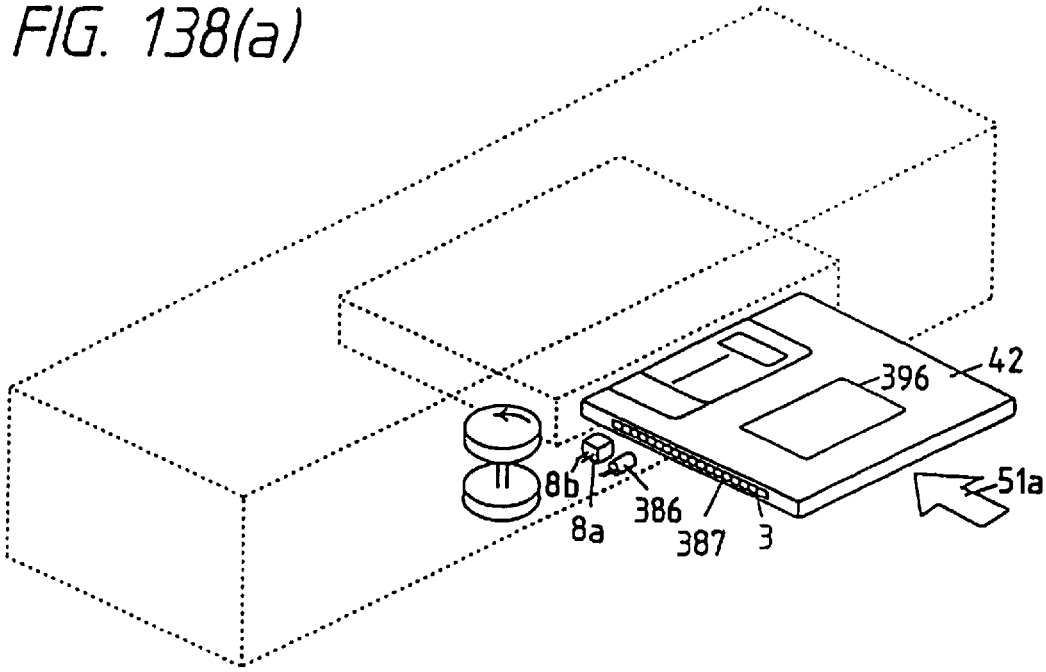

FIG. 138(a) is a perspective view of the fifteenth embodiment in which a cartridge is inserted into the apparatus.

Figure 138B:
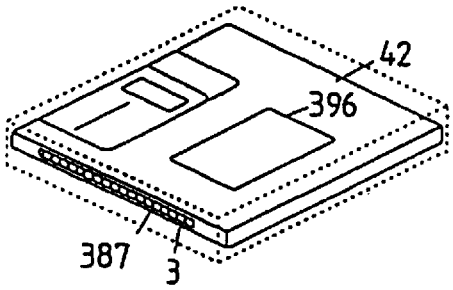

FIG. 138(b) is a perspective view of the fifteenth embodiment in which the cartridge is fixed.

Figure 138C:
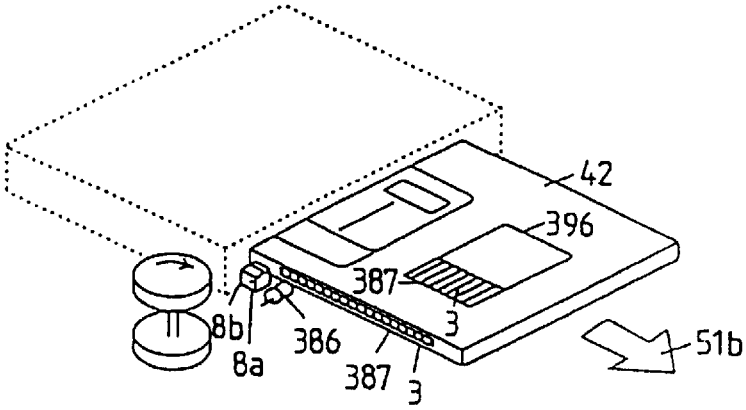

FIG. 138(c) is a perspective view of the fifteenth embodiment in which the cartridge is ejected from the apparatus.

Figures 139A, 139B, 139C:
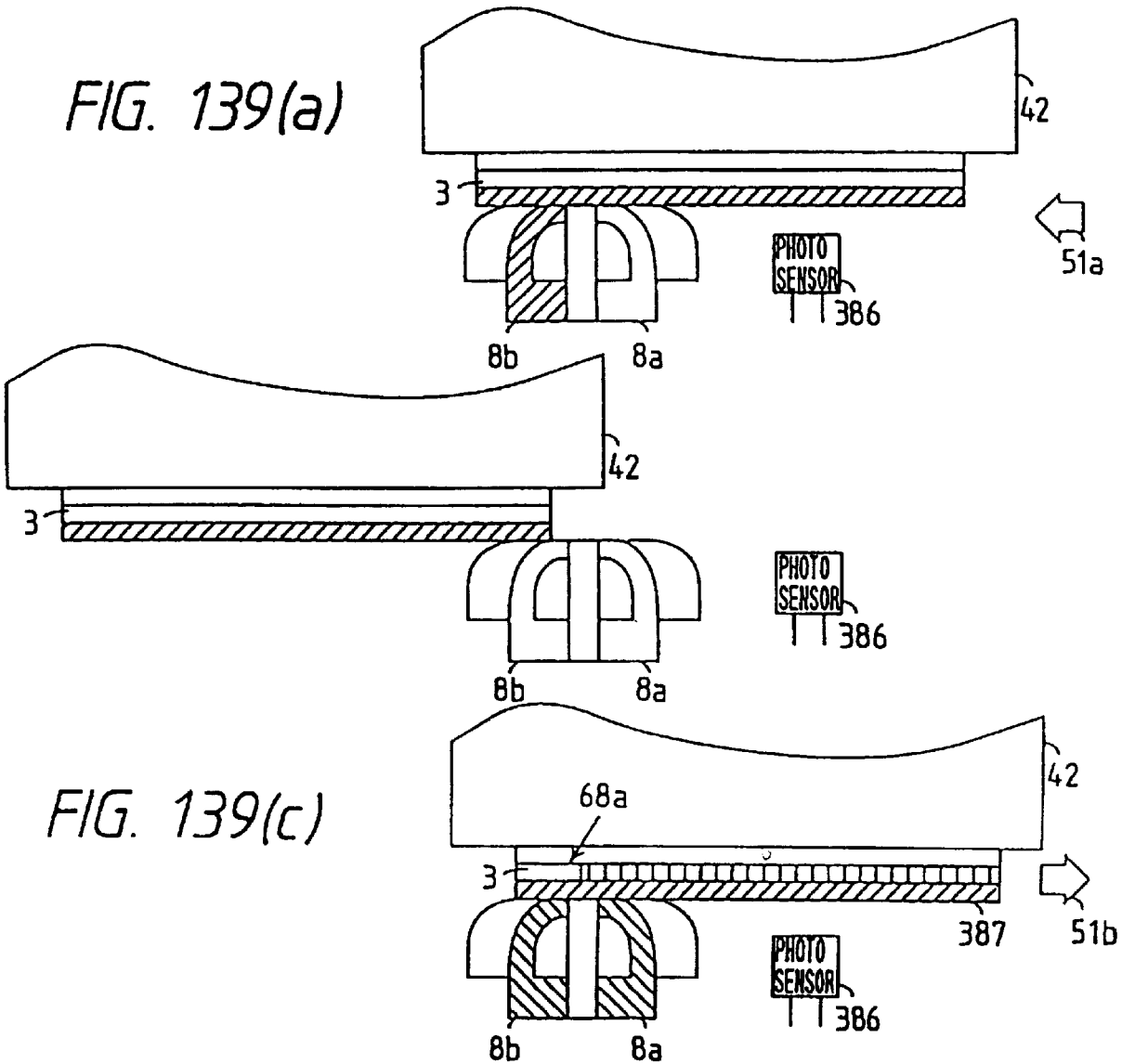

FIG. 139(a) is a sectional view of the fifteenth embodiment in which a cartridge is inserted into the apparatus.

FIG. 139(b) is a sectional view of the fifteenth embodiment in which the cartridge is fixed.

FIG. 139(c) is a sectional view of the fifteenth embodiment in which the cartridge is ejected from the apparatus.

Figure 140:
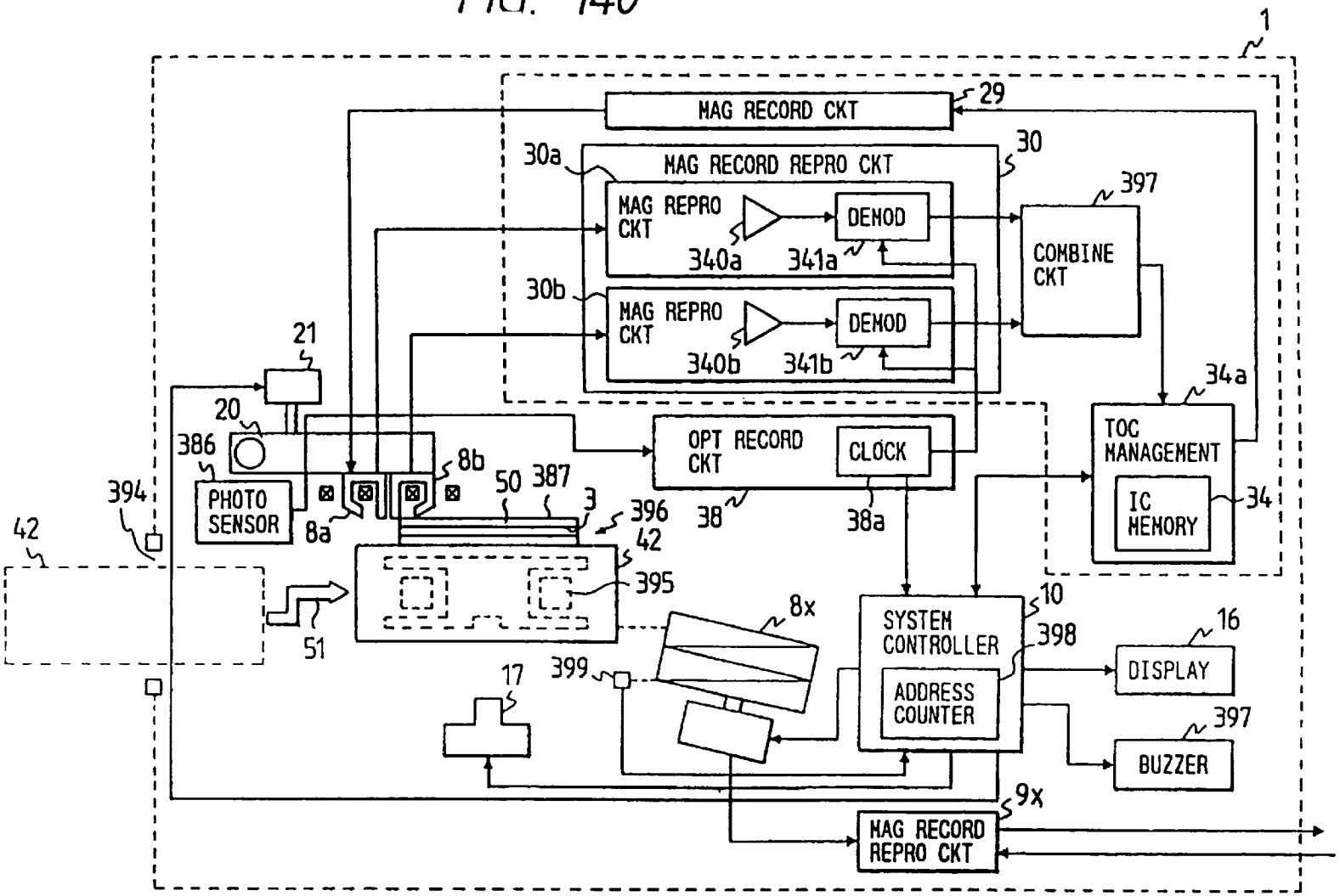

FIG. 140 is a block diagram of a recording and reproducing apparatus according to a sixteenth embodiment of this invention.

Figure 141A:
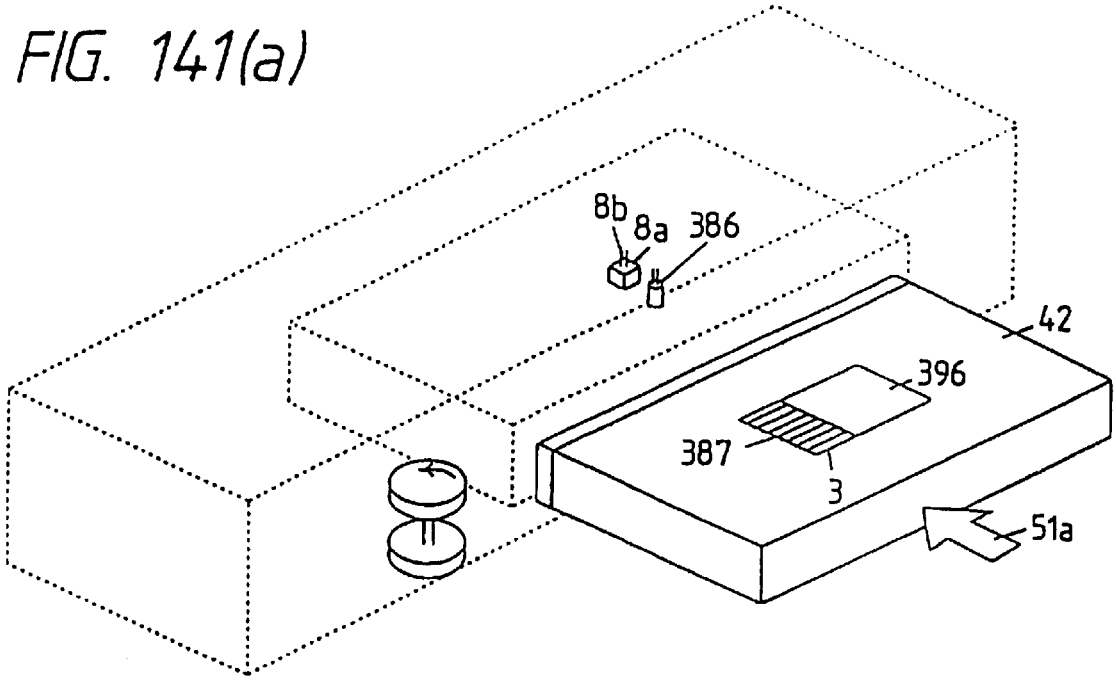

FIG. 141(a) is a perspective view of the sixteenth embodiment in which a cartridge is inserted into the apparatus.

Figure 141B:
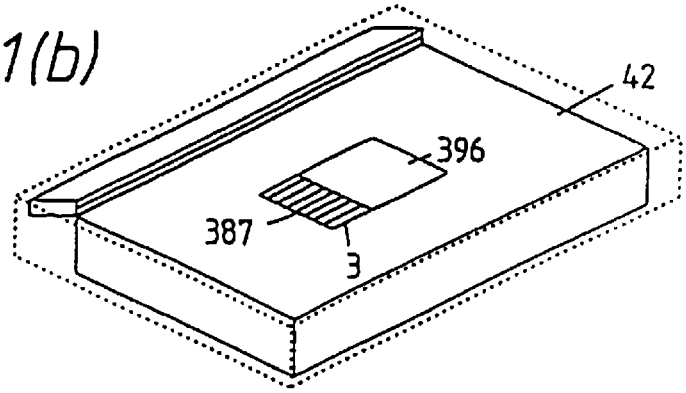

FIG. 141(b) is a perspective view of the sixteenth embodiment in which the cartridge is fixed.

Figure 141C:
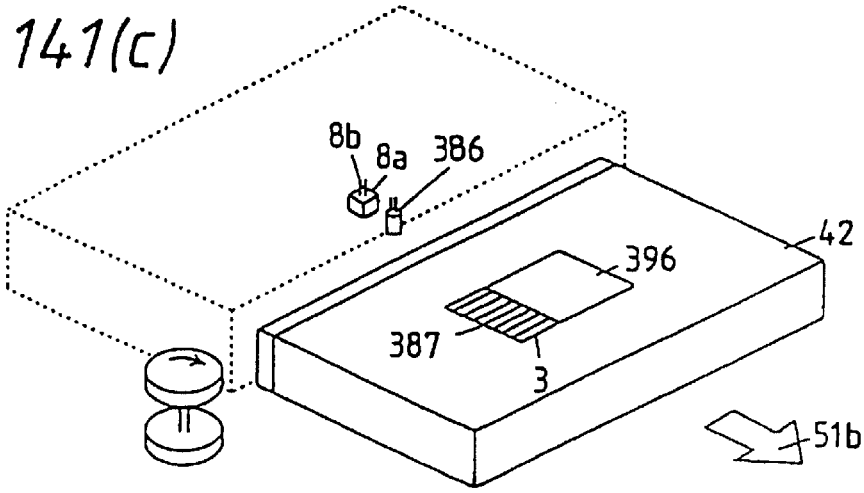

FIG. 141(c) is a perspective view of the sixteenth embodiment in which the cartridge is ejected from the apparatus.

Figure 142A:
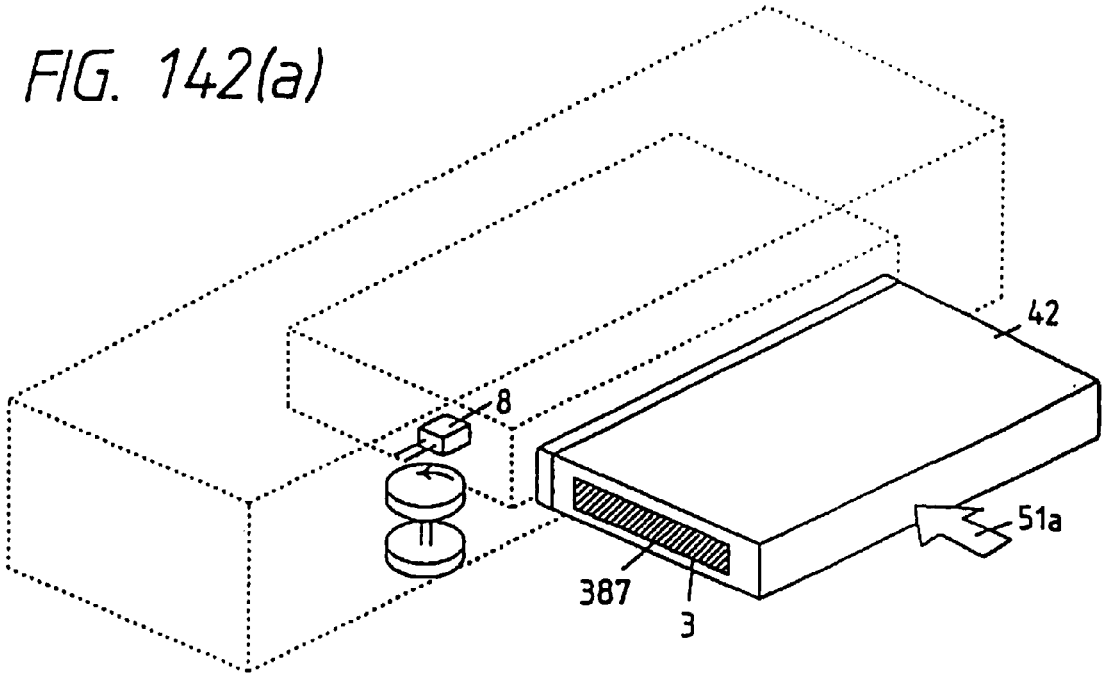

FIG. 142(a) is a perspective view of the sixteenth embodiment in which a cartridge is inserted into the apparatus.

Figure 142B:
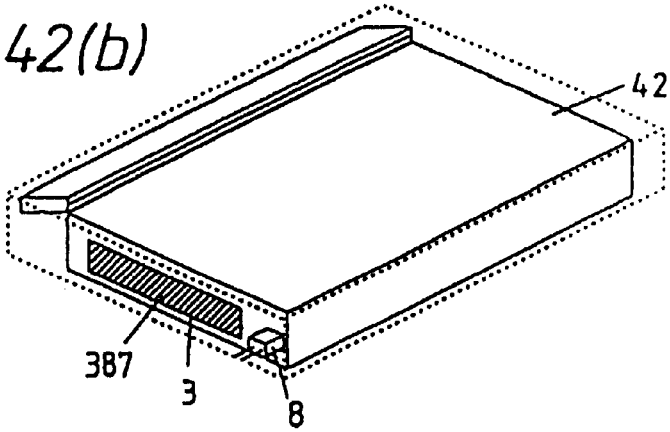

FIG. 142(b) is a perspective view of the sixteenth embodiment in which the cartridge is fixed.

Figure 142C:
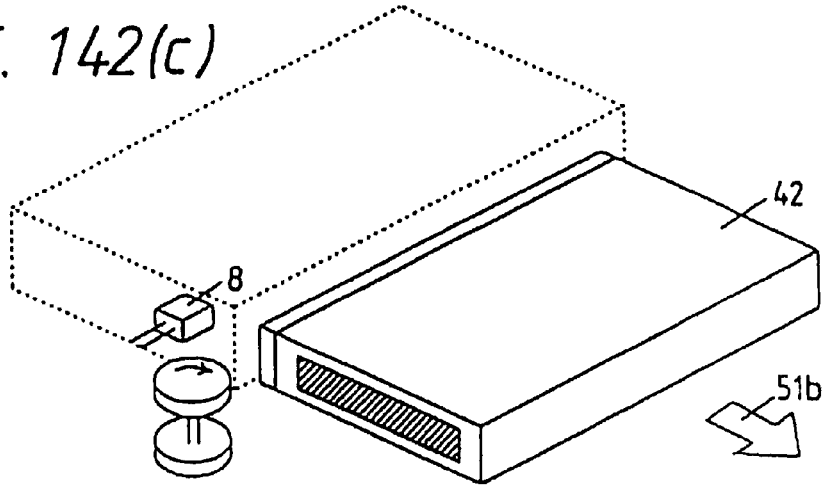

FIG. 142(c) is a perspective view of the sixteenth embodiment in which the cartridge is ejected from the apparatus.

Figures 143A, 143B, 143C:
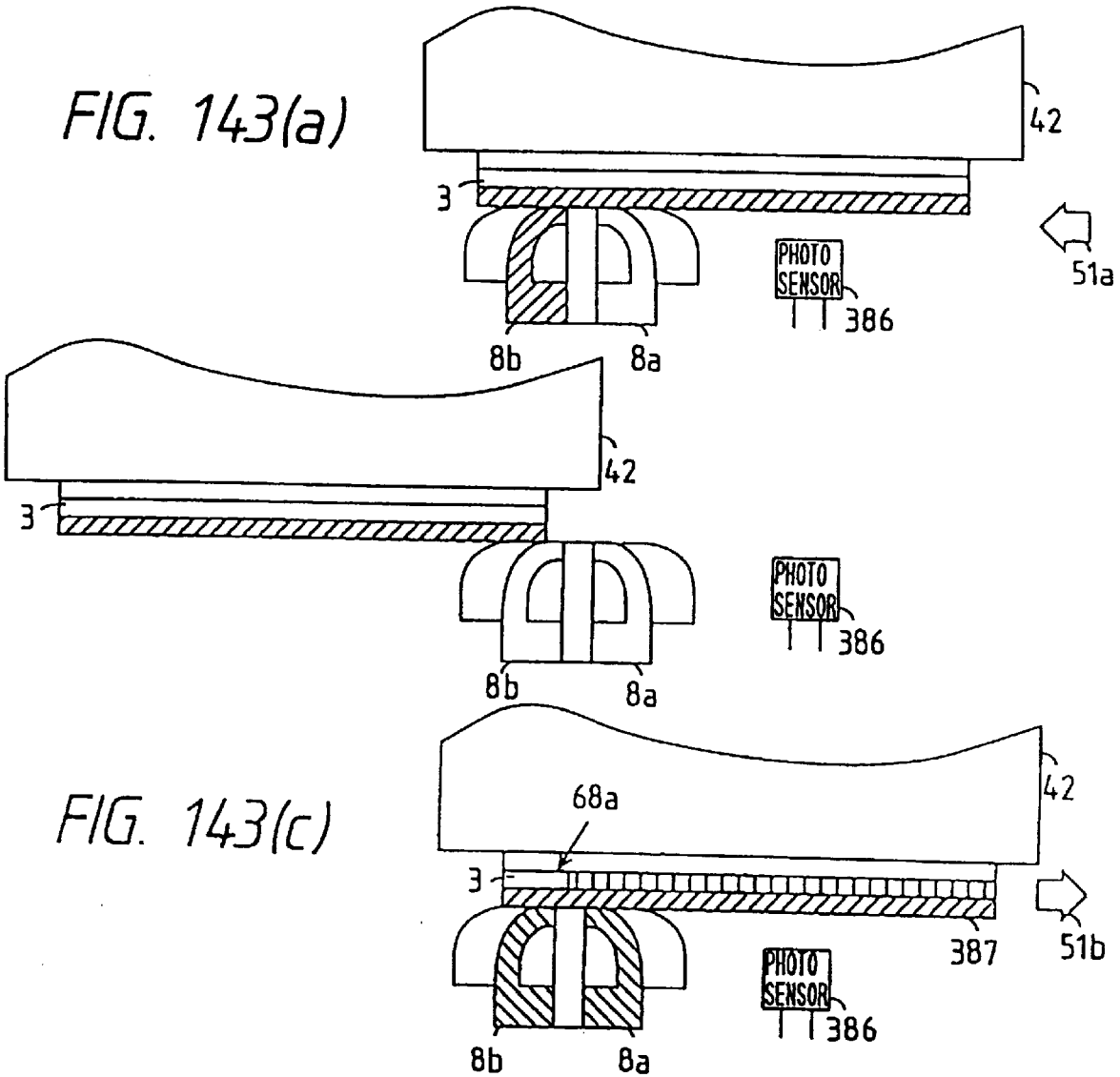

FIG. 143(a) is a sectional view of the sixteenth embodiment in which a cartridge is inserted into the apparatus.

FIG. 143(b) is a sectional view of the sixteenth embodiment in which the cartridge is fixed.

FIG. 143(c) is a sectional view of the sixteenth embodiment in which the cartridge is ejected from the apparatus.

Figures 144A, 144B:
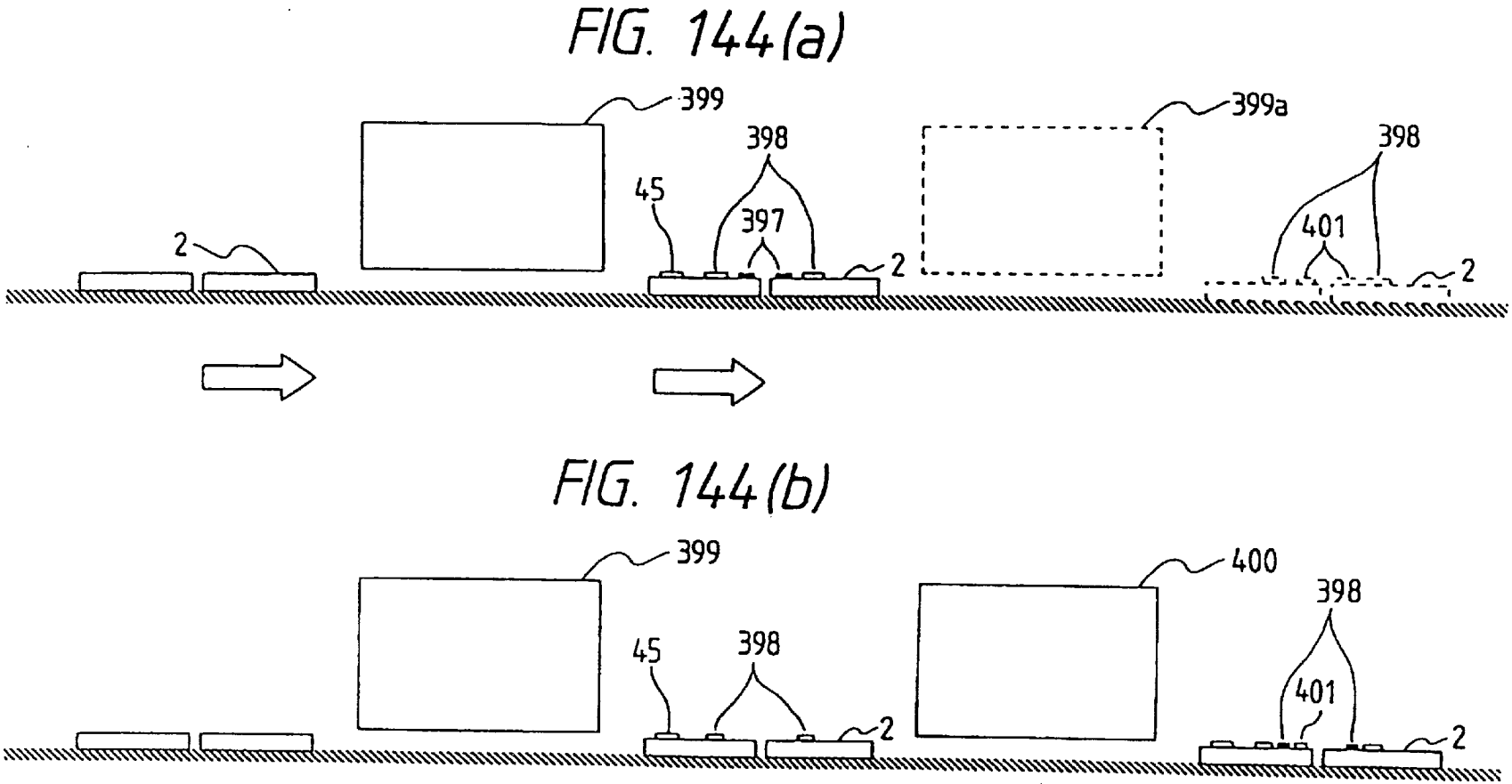

FIG. 144(a) is a diagram of a part of an apparatus for making a recording medium in the fourteenth embodiment.

FIG. 144(b) is a diagram of a part of an apparatus for making a recording medium in the fourteenth embodiment.

Figures 145A, 145B, 145C:
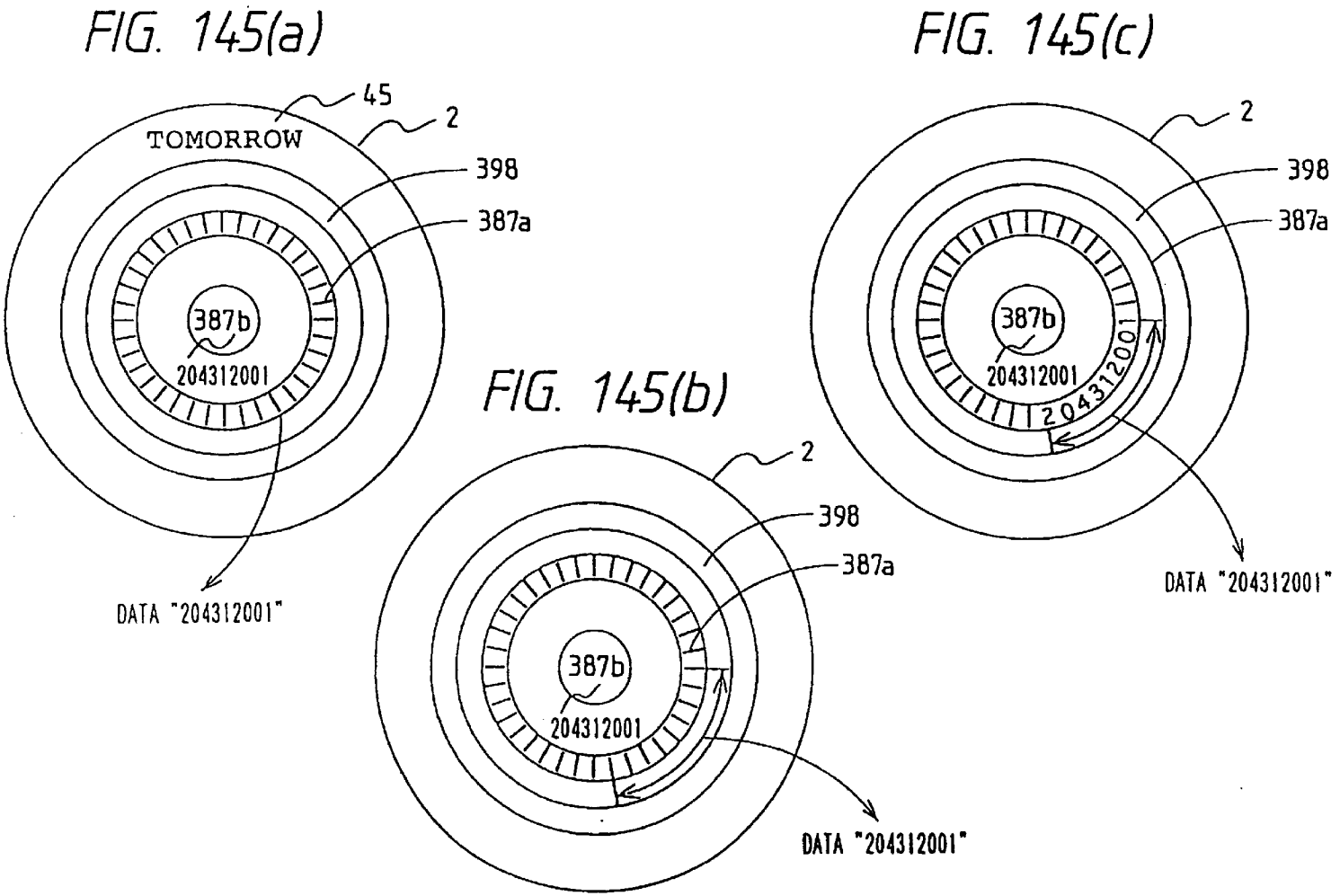

FIG. 145(a) is a top view of a recording medium in the fourteenth embodiment.

FIG. 145(b) is a top view of a recording medium in the fourteenth embodiment.

FIG. 145(c) is a top view of a recording medium in the fourteenth embodiment.

Figure 146A:
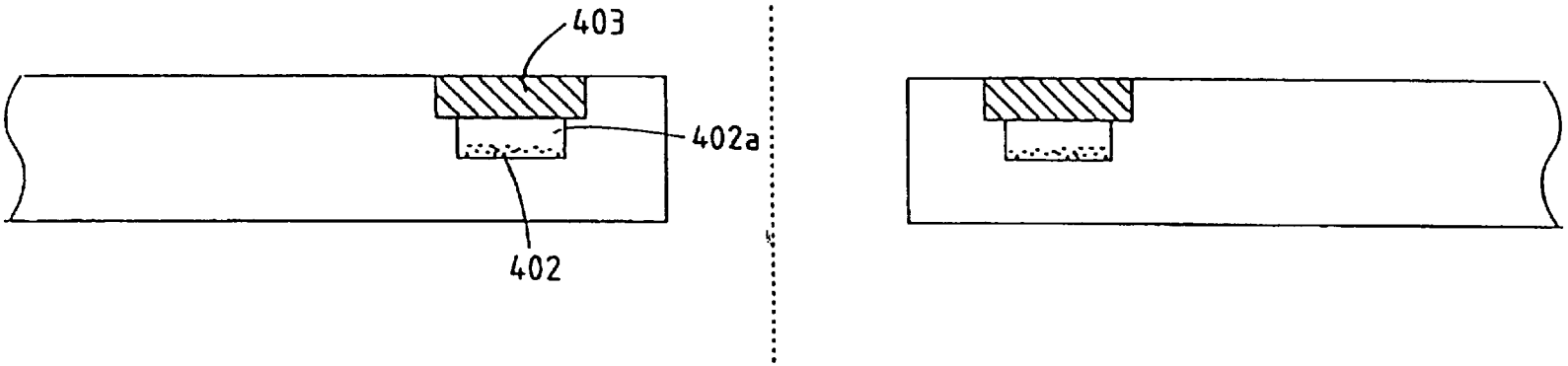

FIG. 146(a) is a sectional view of a recording medium in the fourteenth embodiment.

Figure 146B:
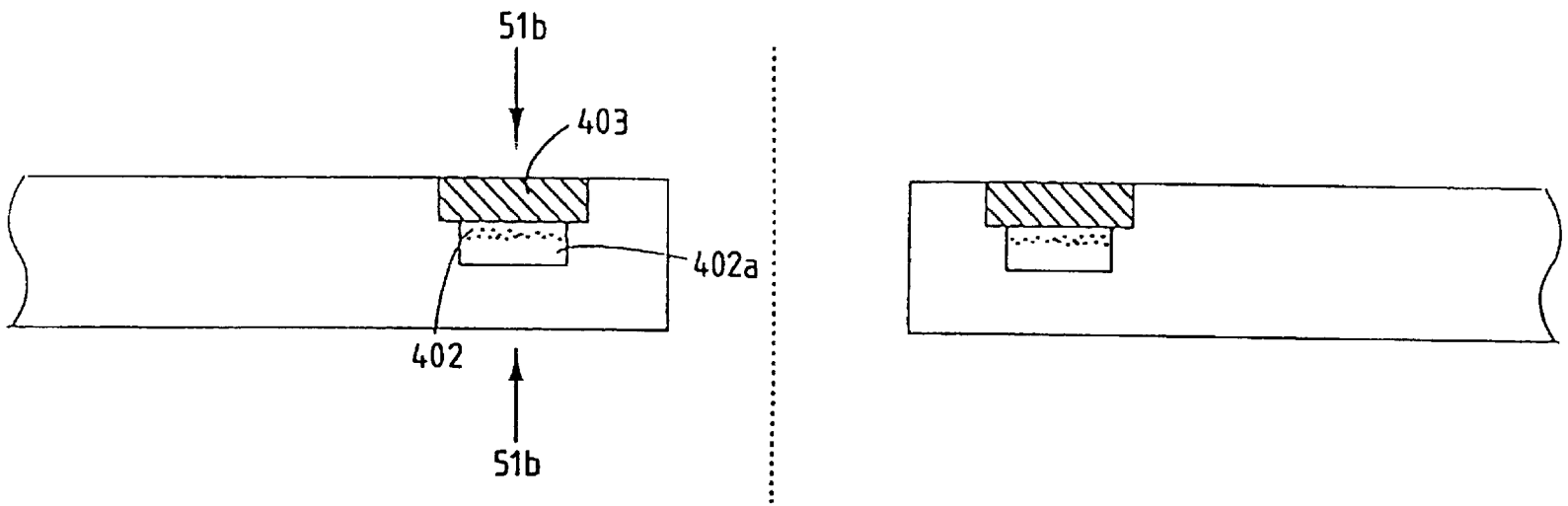

FIG. 146(b) is a sectional view of a recording medium in the fourteenth embodiment.

Figure 147:
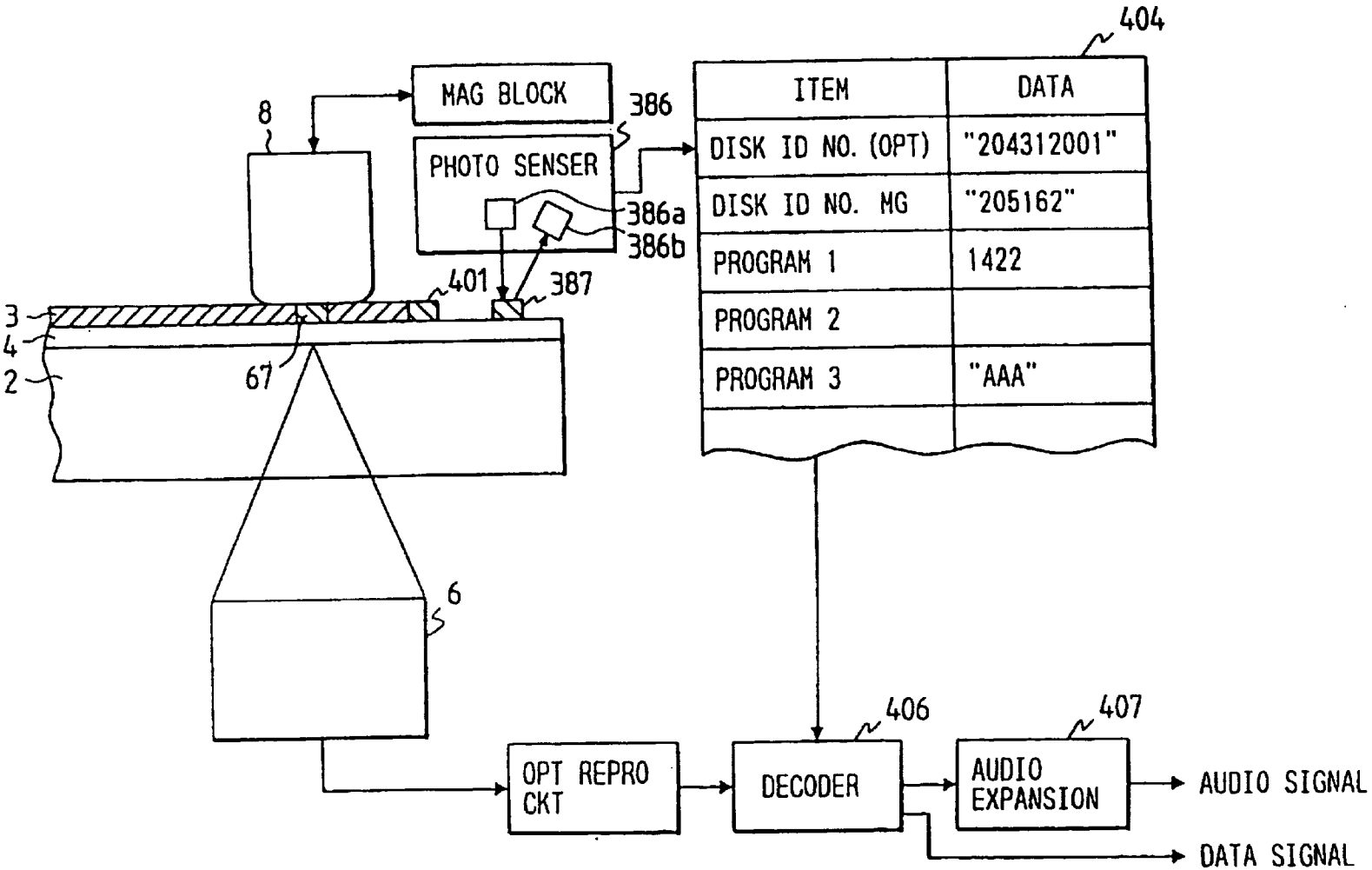

FIG. 147 is a block diagram of an apparatus according to a seventeenth embodiment of this invention.

Figure 148:
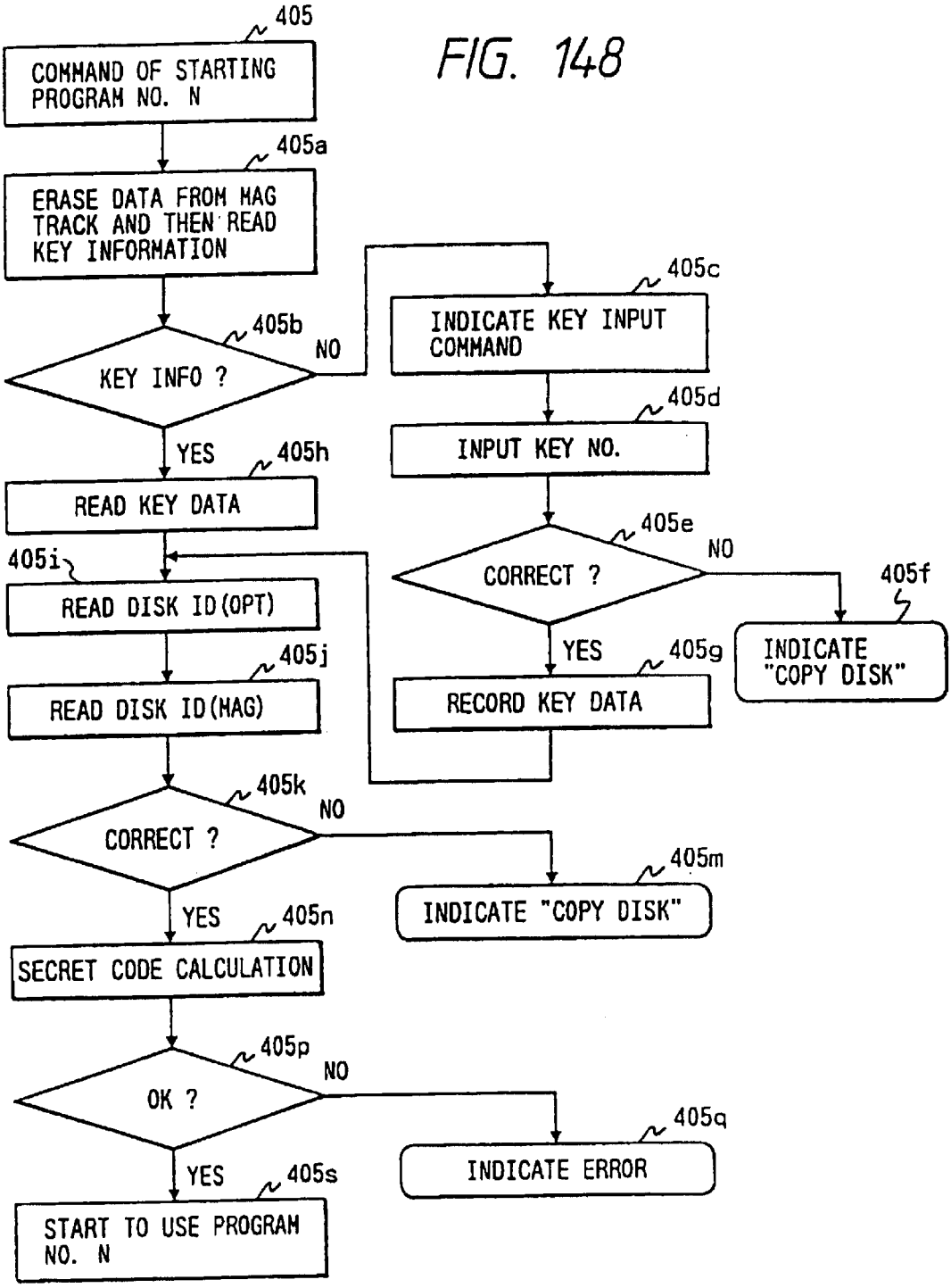

FIG. 148 is a flowchart of a program in the seventeenth embodiment.

Figure 149:
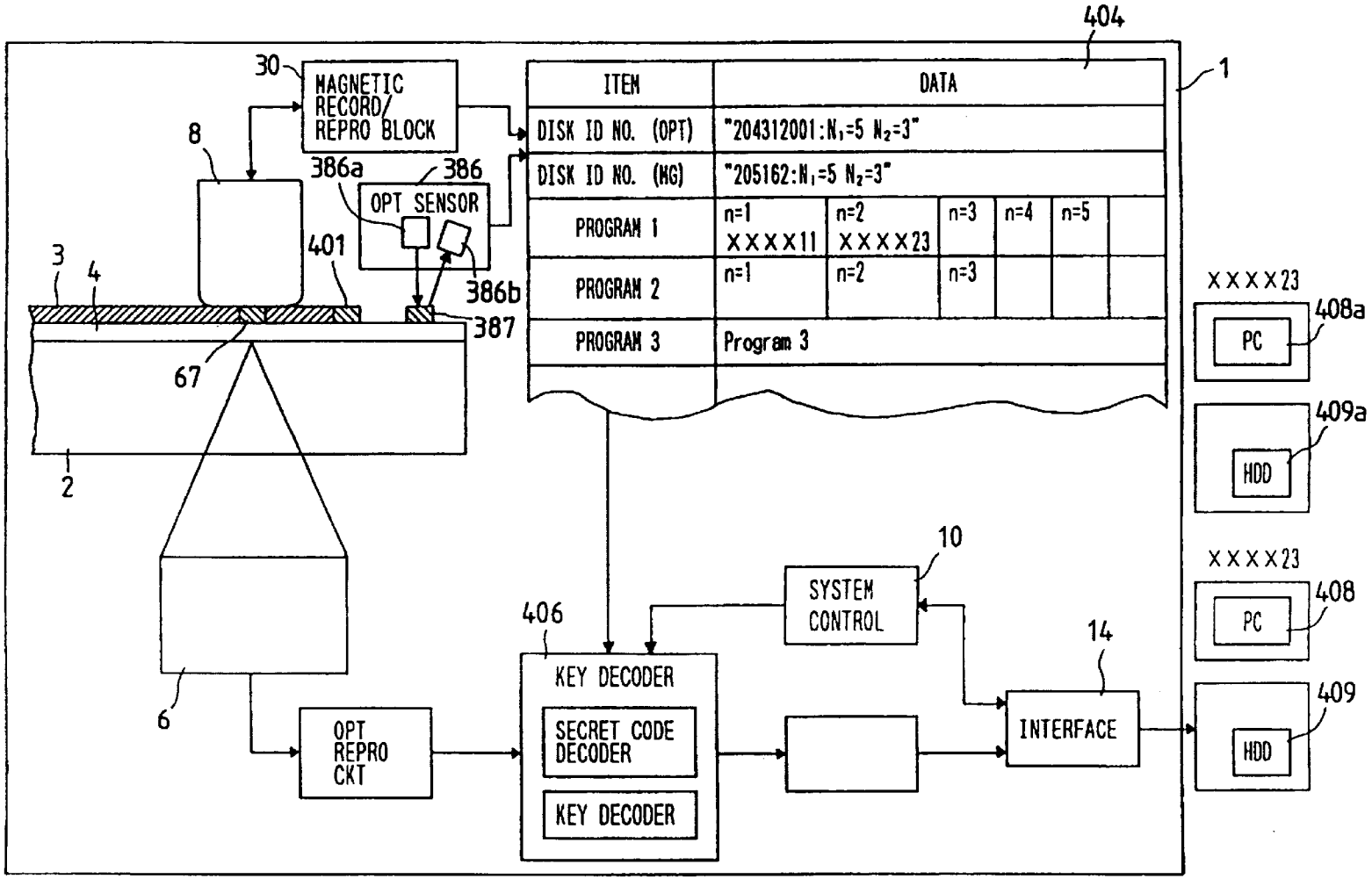

FIG. 149 is a block diagram of an apparatus according to an eighteenth embodiment of this invention.

Figure 150:
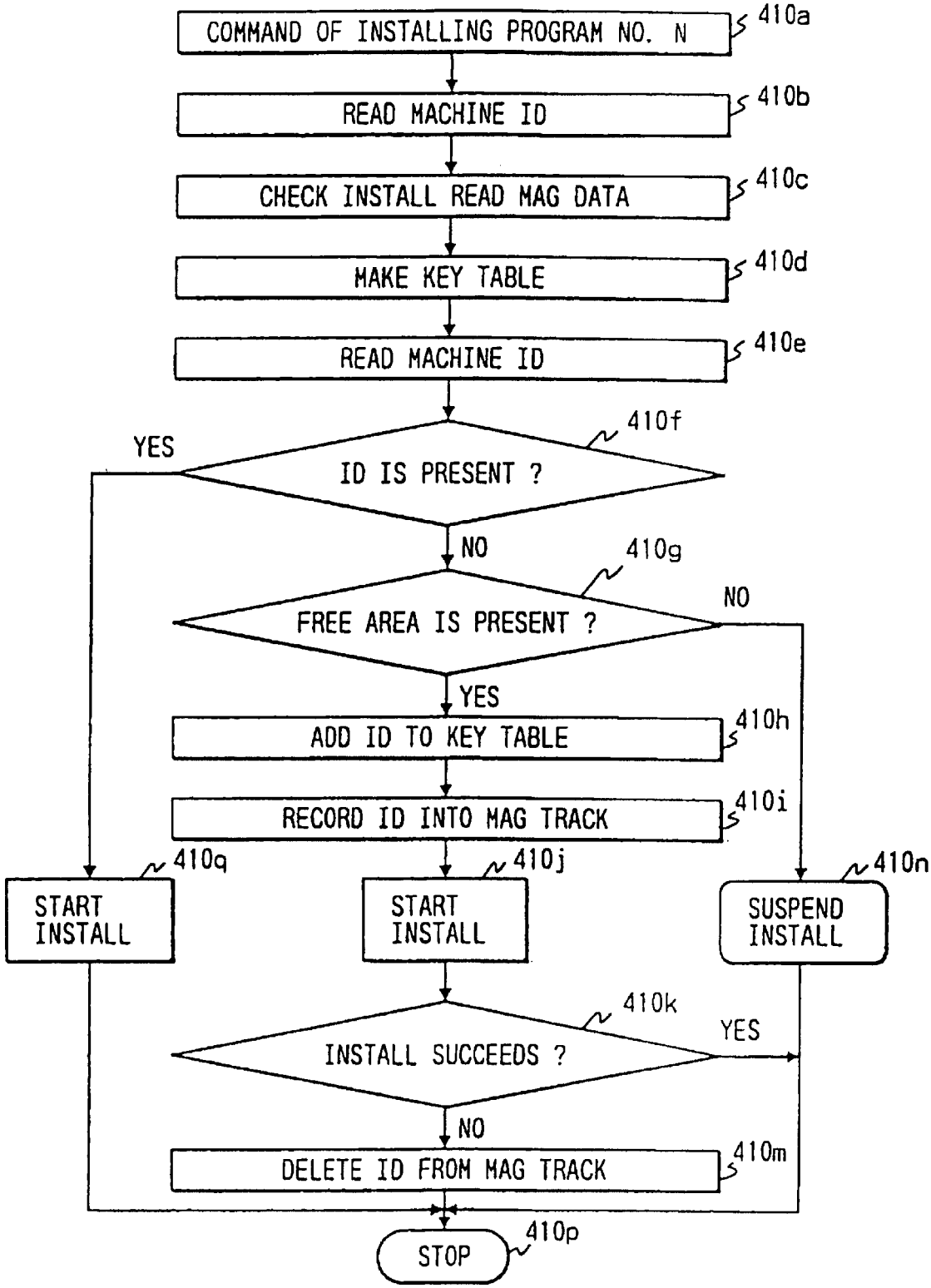

FIG. 150 is a flowchart of a program in the eighteenth embodiment.

Figure 151:
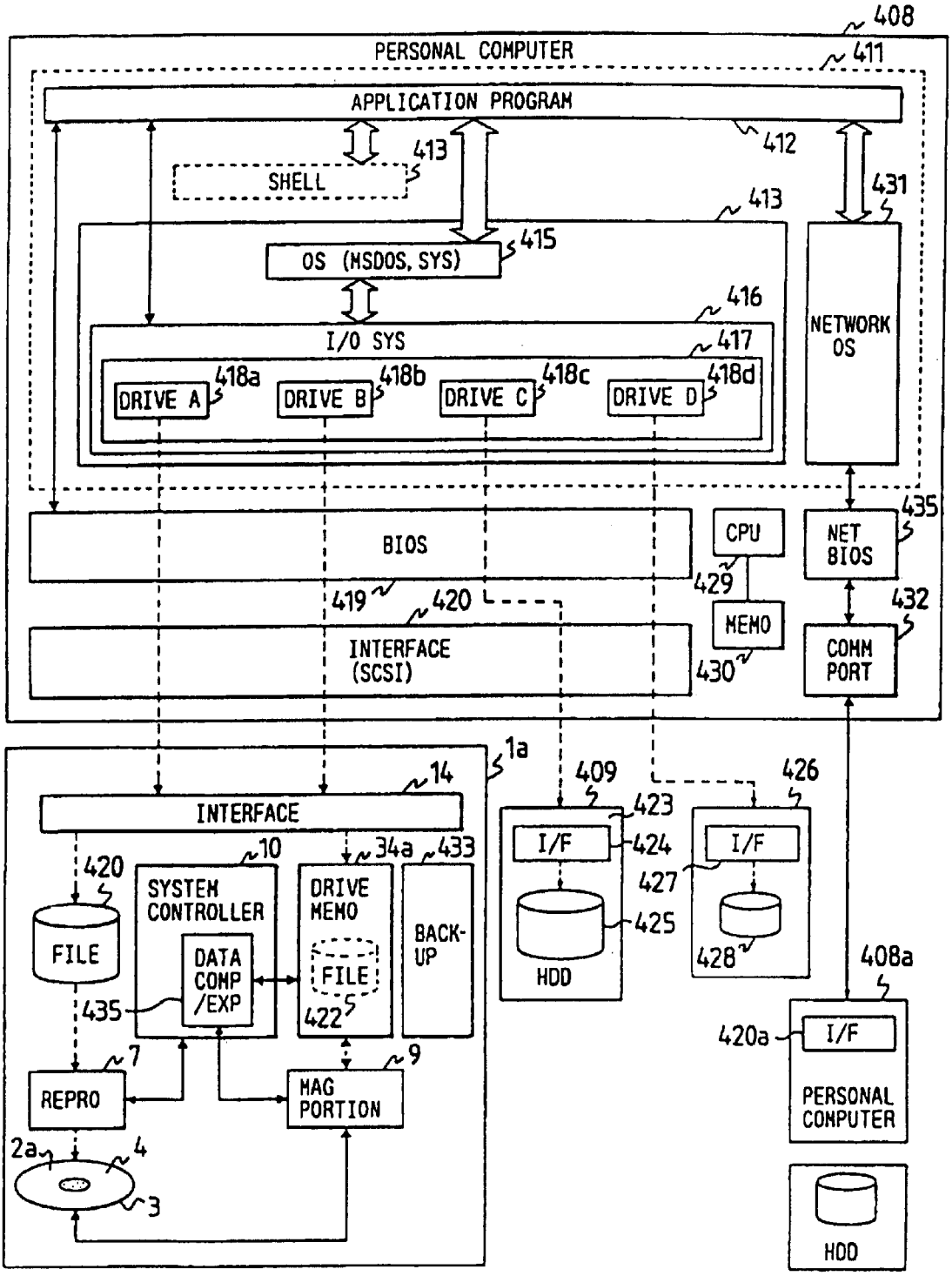

FIG. 151 is a block diagram of an apparatus according to a nineteenth embodiment of this invention.

Figure 152:
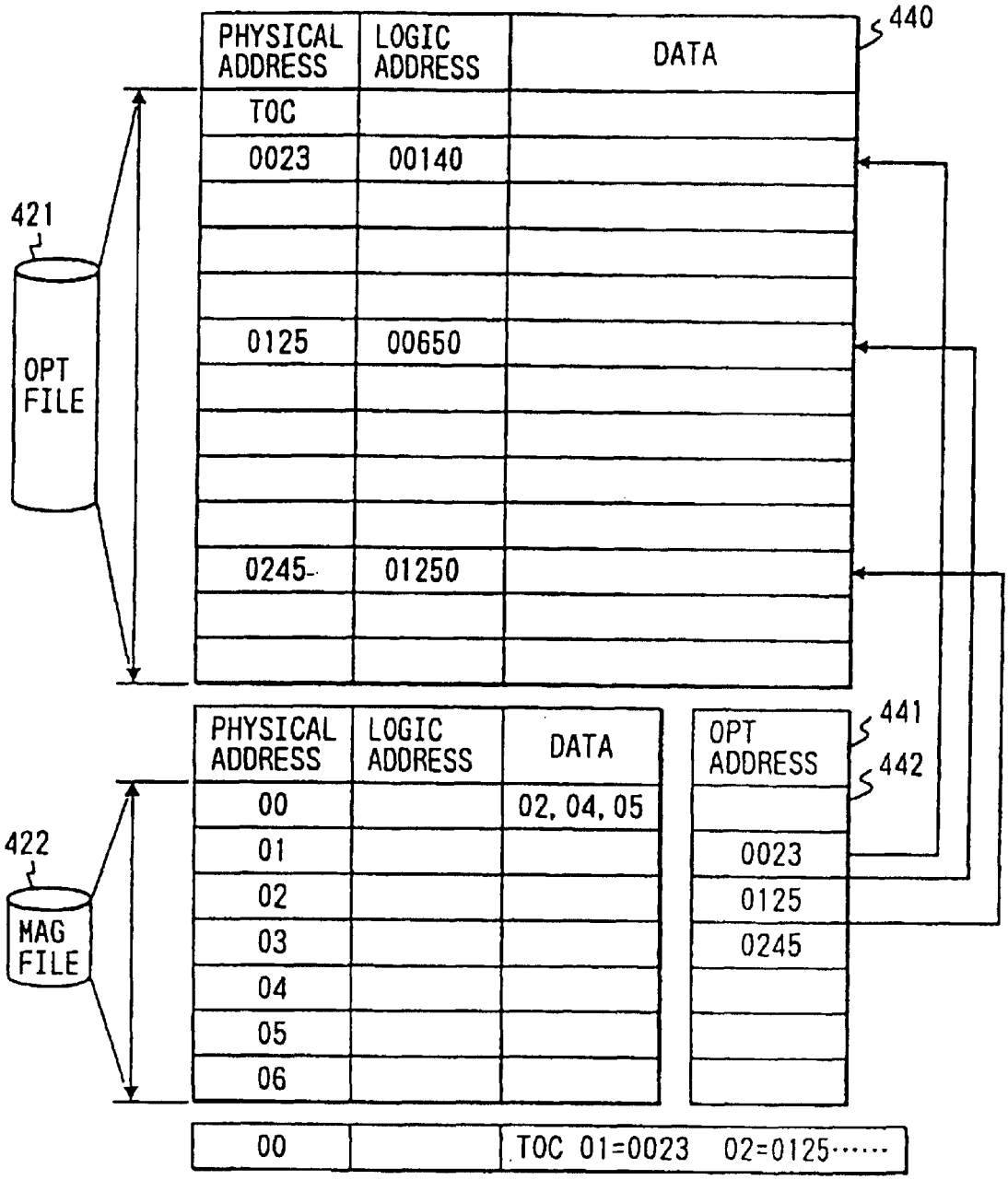

FIG. 152 is a diagram of an optical address table and a magnetic address table in a recording medium in the nineteenth embodiment.

Figure 153:
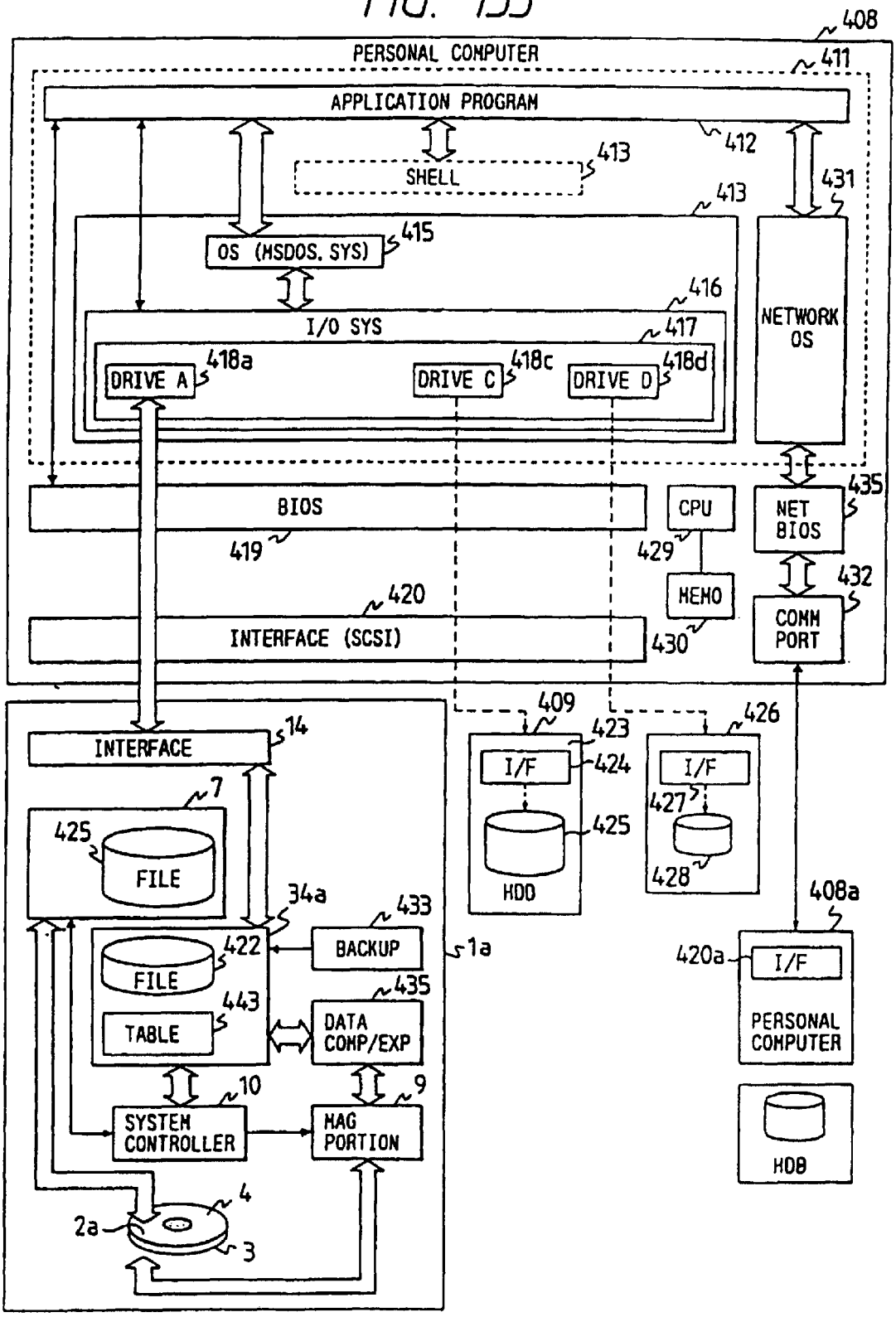

FIG. 153 is a block diagram of an apparatus in the nineteenth embodiment.

Figure 154A:
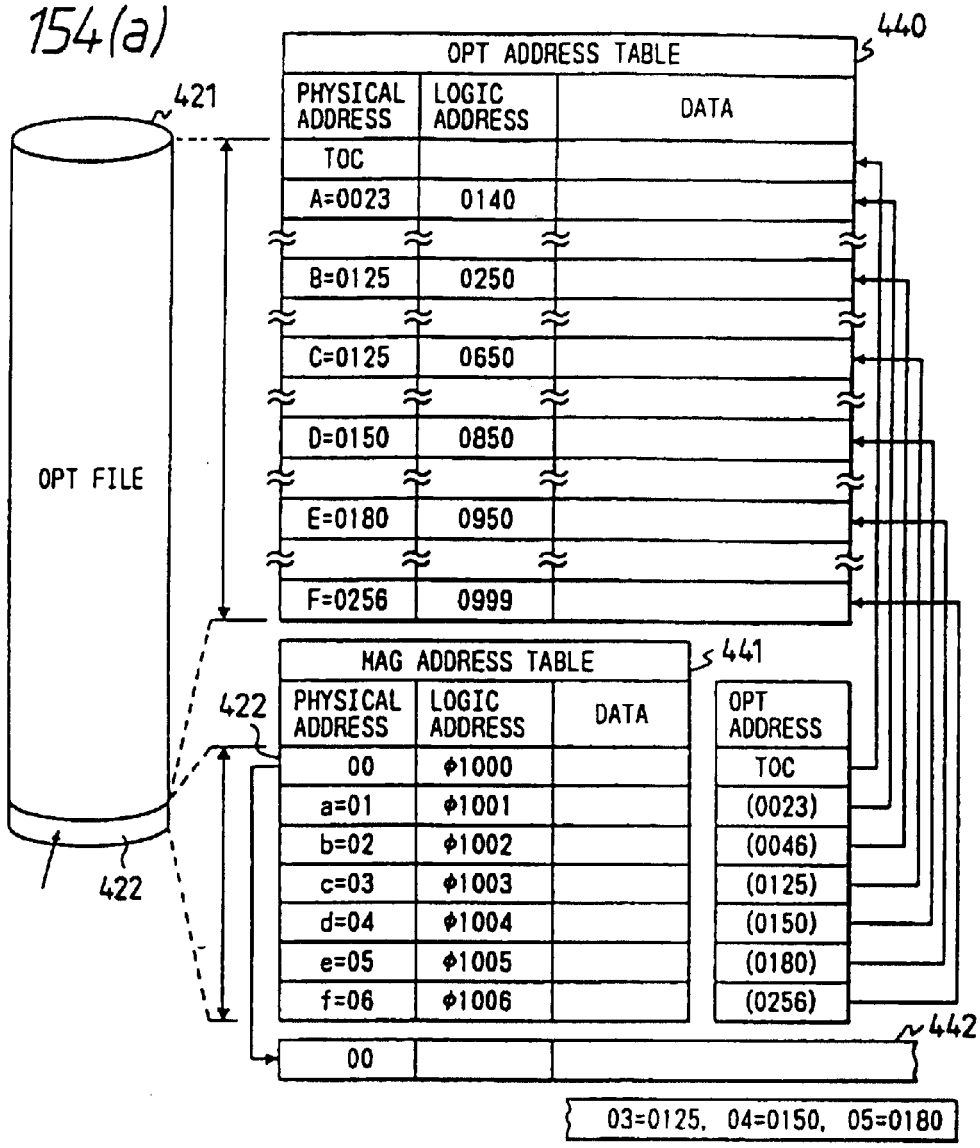

FIG. 154(a) is a diagram of an address table of an optical file and a magnetic file in the nineteenth embodiment.

Figure 154B:
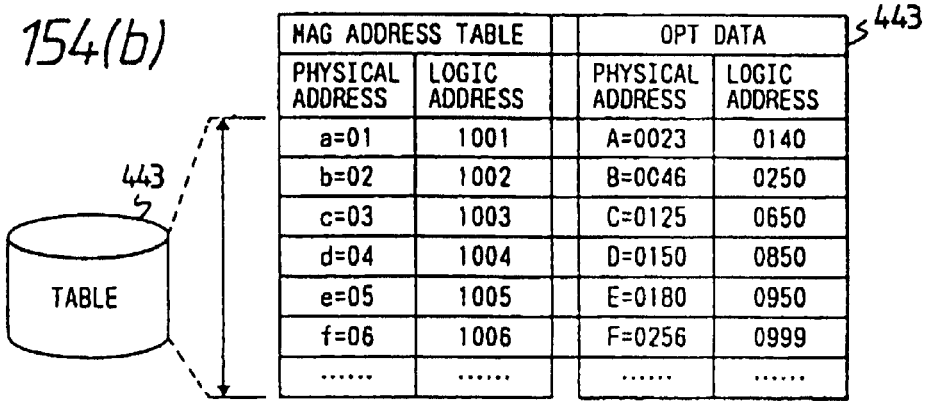

FIG. 154(b) is a diagram of an address link table between two files in the nineteenth embodiment.

Figure 155:
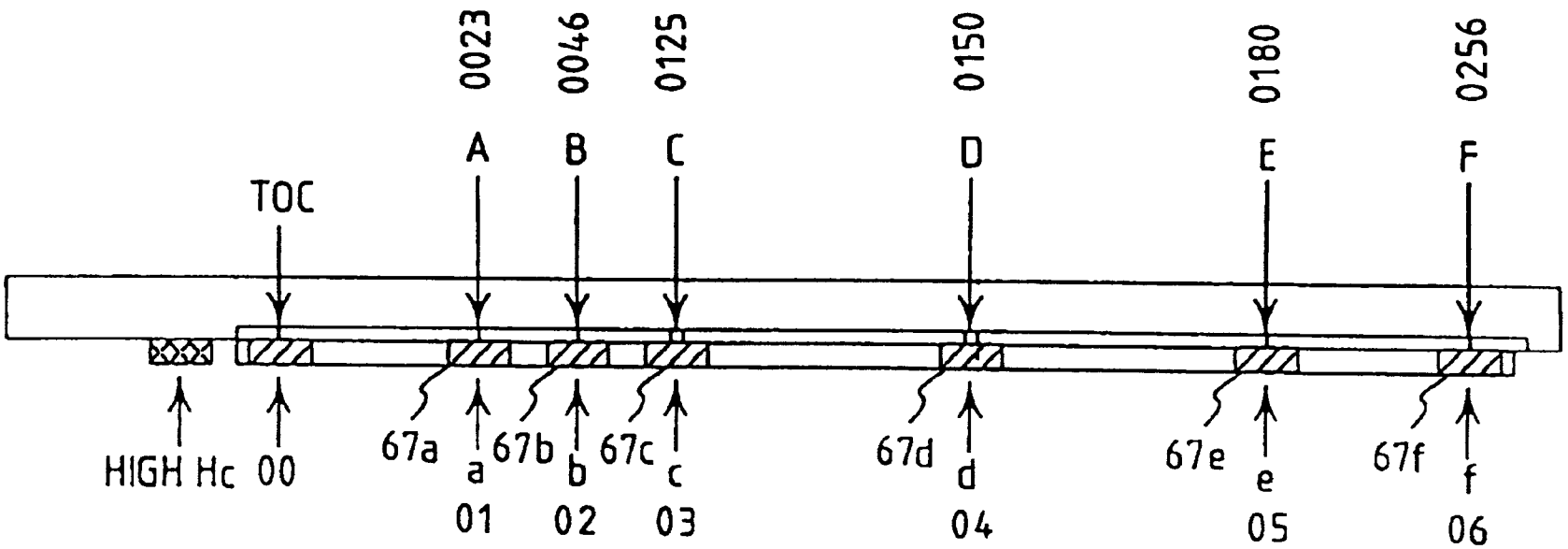

FIG. 155 is a sectional view of an optical recording medium in the nineteenth embodiment.

Figure 156:
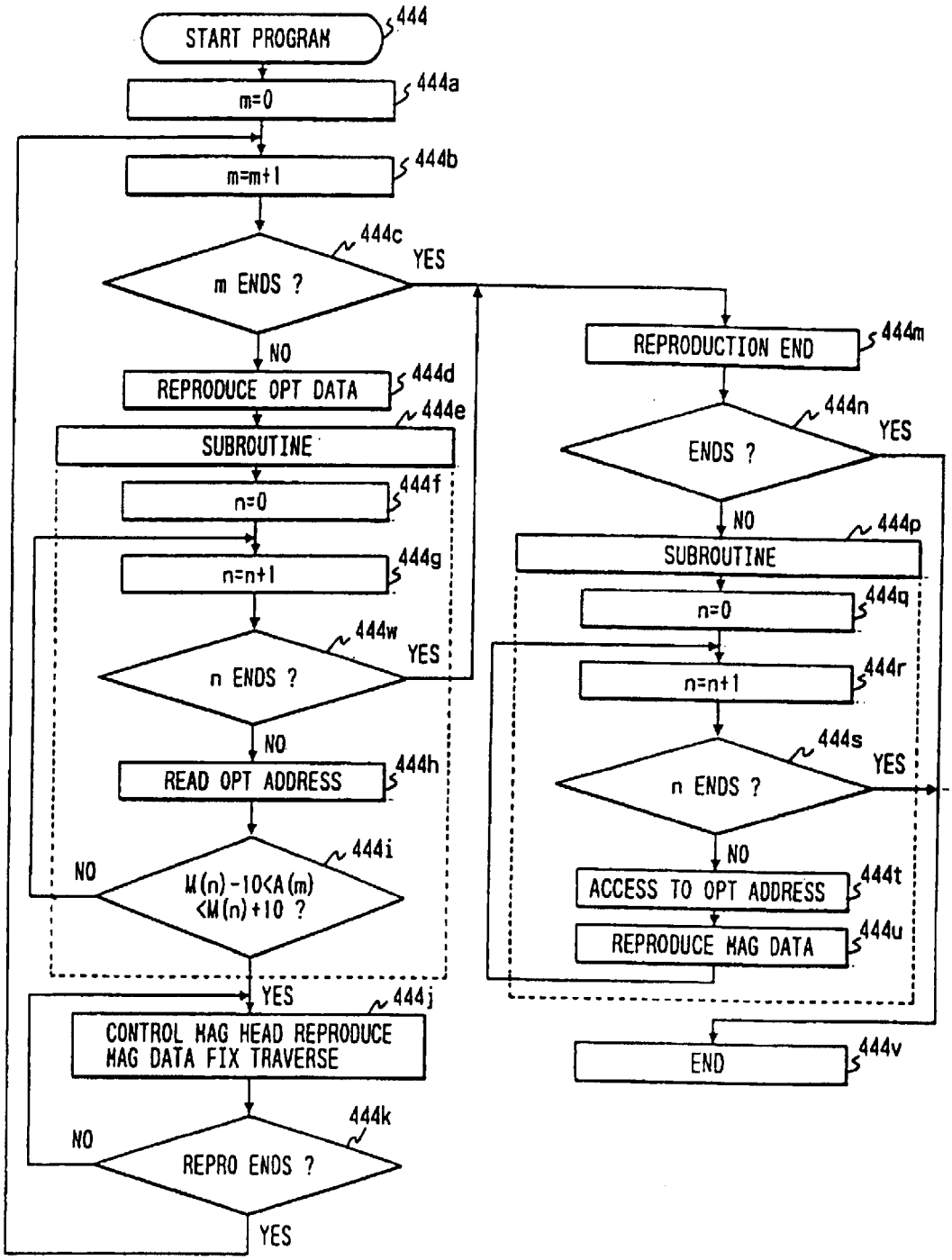

FIG. 156 is a flowchart of operation of starting up an optical disk in the nineteenth embodiment.

Figure 157A:
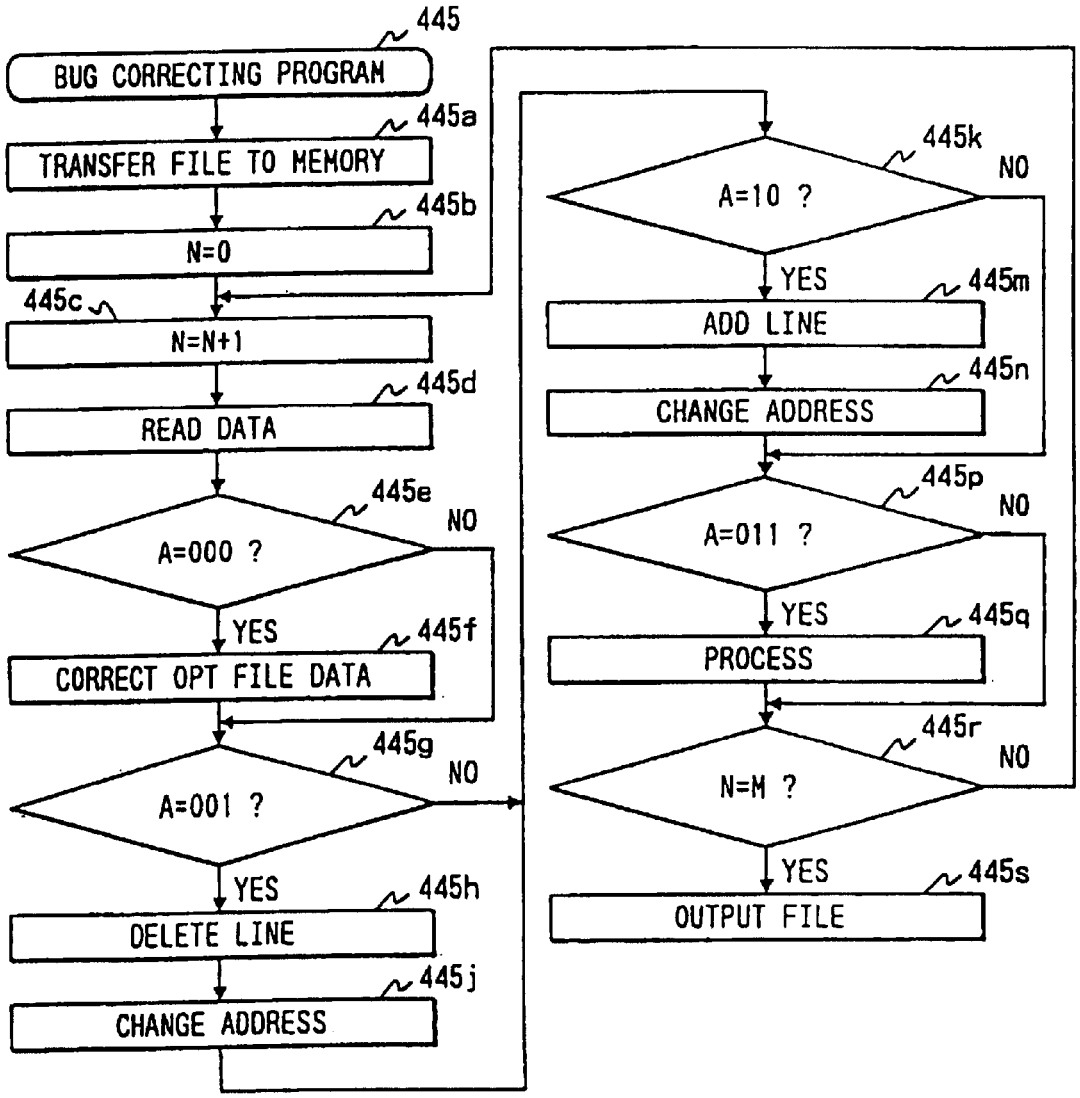

FIG. 157(a) is a flowchart of a program in a twentieth embodiment of this invention.

Figure 157B:
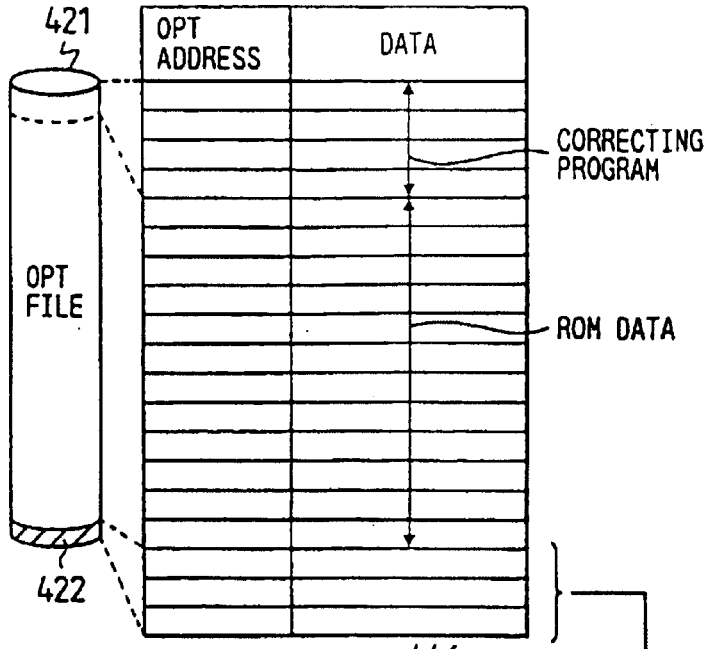

FIG. 157(b) is a diagram of an address data table of a magnetic file and an optical file in the twentieth embodiment.

Figure 157C:
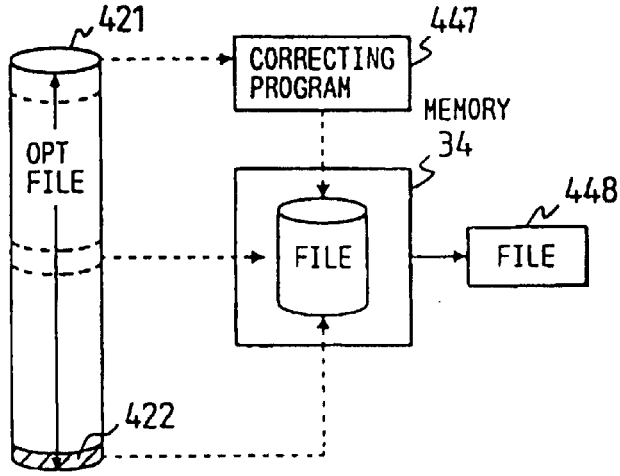

FIG. 157(c) is a block diagram of a bug correcting portion in the twentieth embodiment.

Figure 158A:
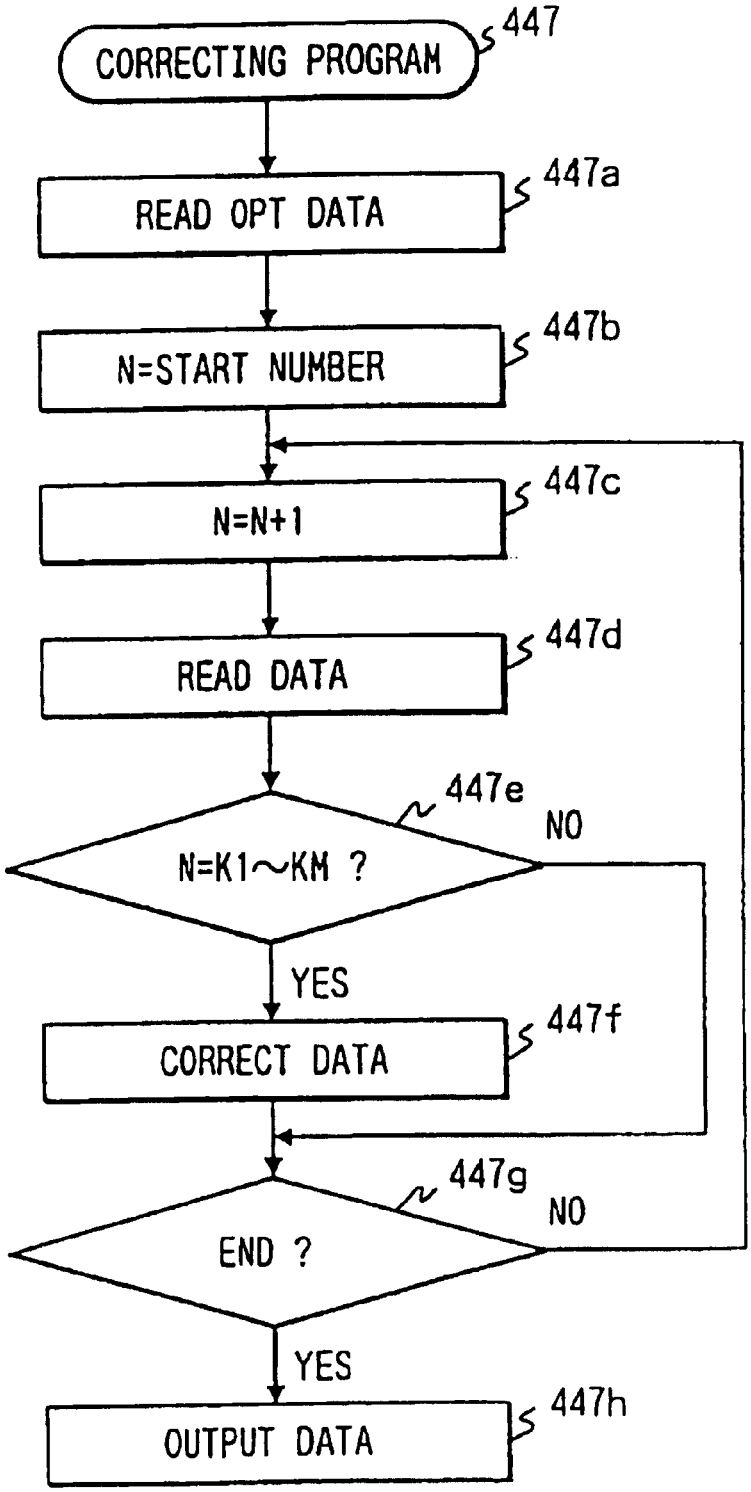

FIG. 158(a) is a flowchart of a program in a twenty-first embodiment of this invention.

Figure 158B:
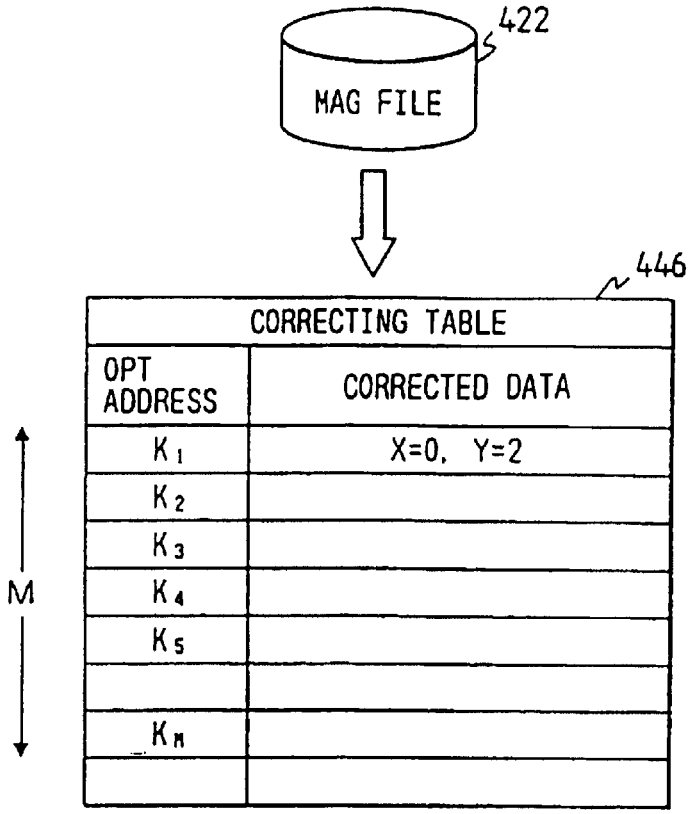

FIG. 158(b) is a diagram of a data correction table in the twenty-first embodiment.

Figure 158C:
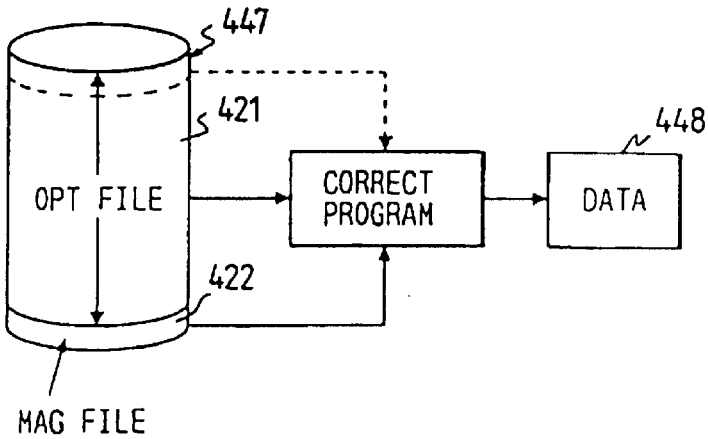

FIG. 158(c) is a block diagram of a bug correcting portion in the twenty-first embodiment.

Figure 159:
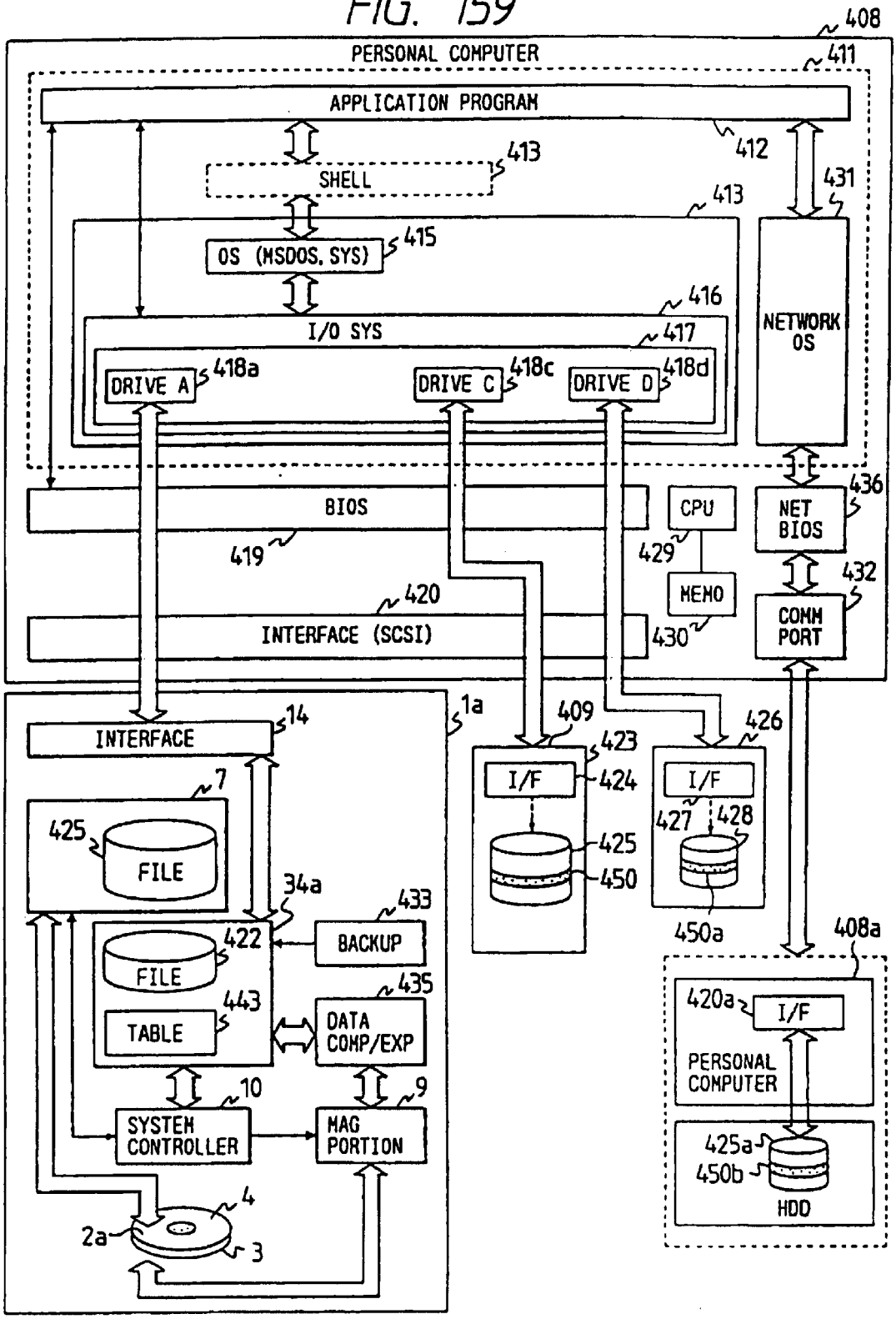

FIG. 159 is a block diagram of an apparatus according to a twenty-second embodiment of this invention.

FIG. 160 is a diagram of a file structure in a computer in the twenty-second embodiment.

Figure 161:
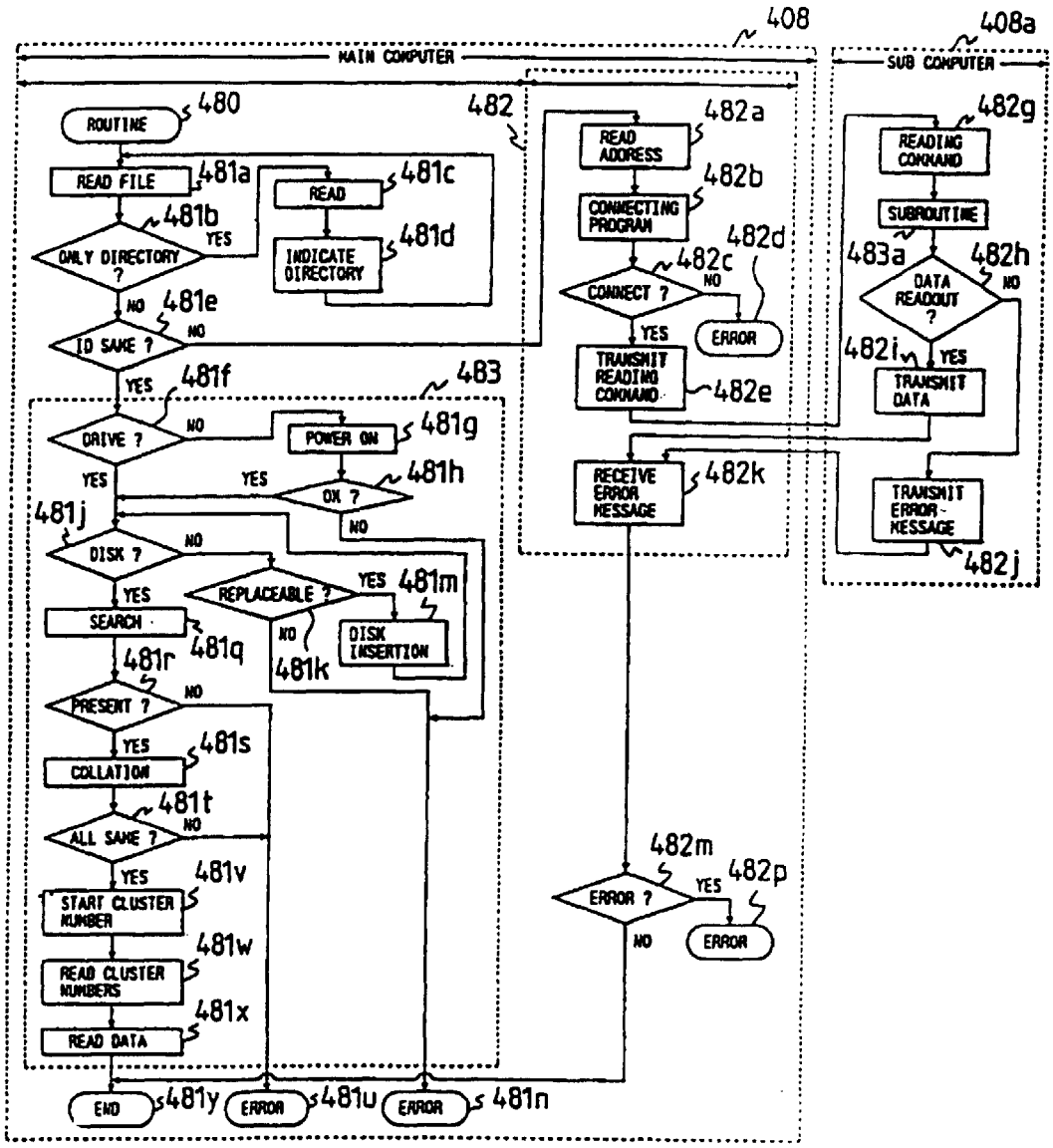

FIG. 161 is a flowchart of a program in the twenty-second embodiment.

Figure 162:
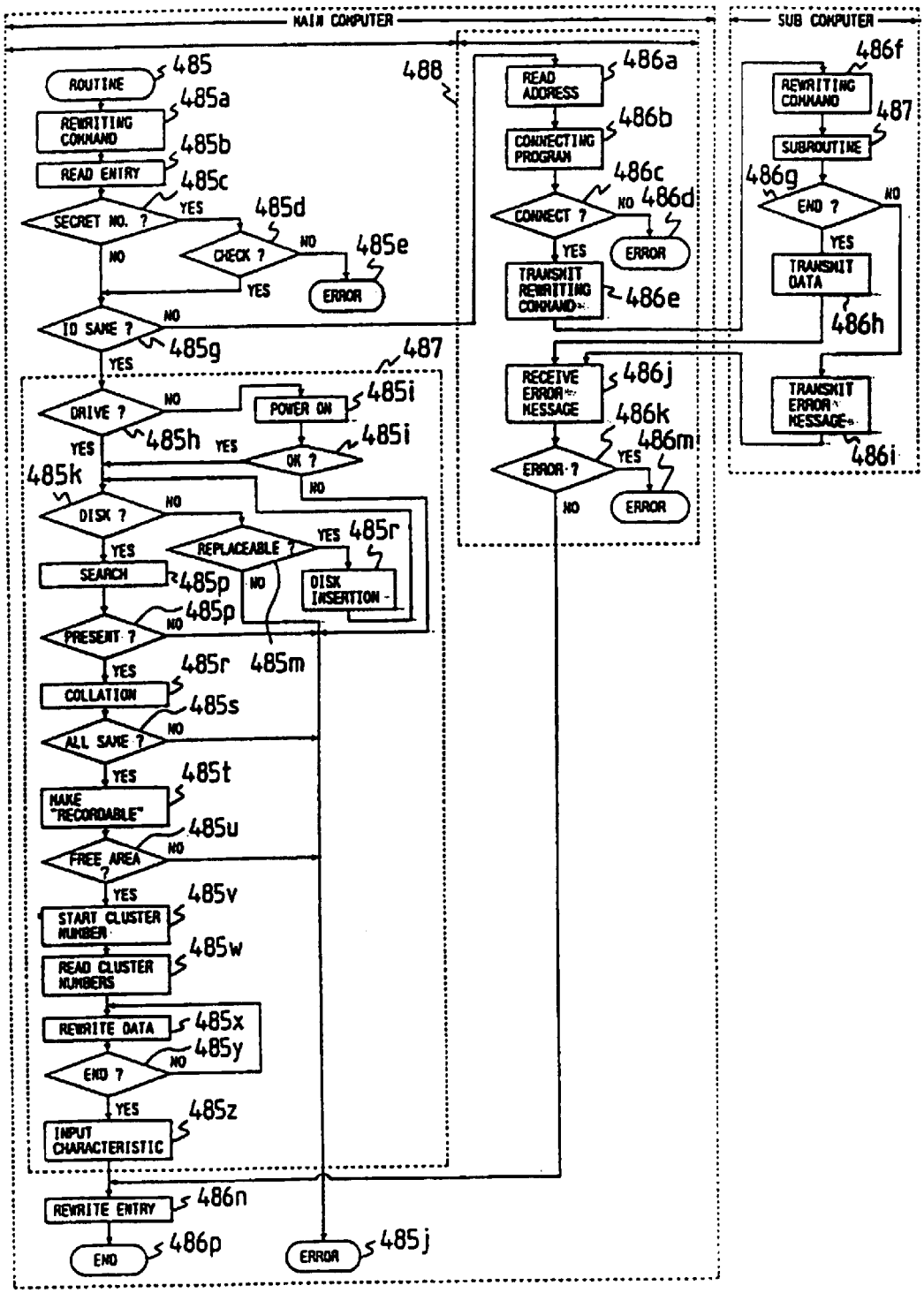

FIG. 162 is a flowchart of a program in the twenty-second embodiment.

Figure 163:
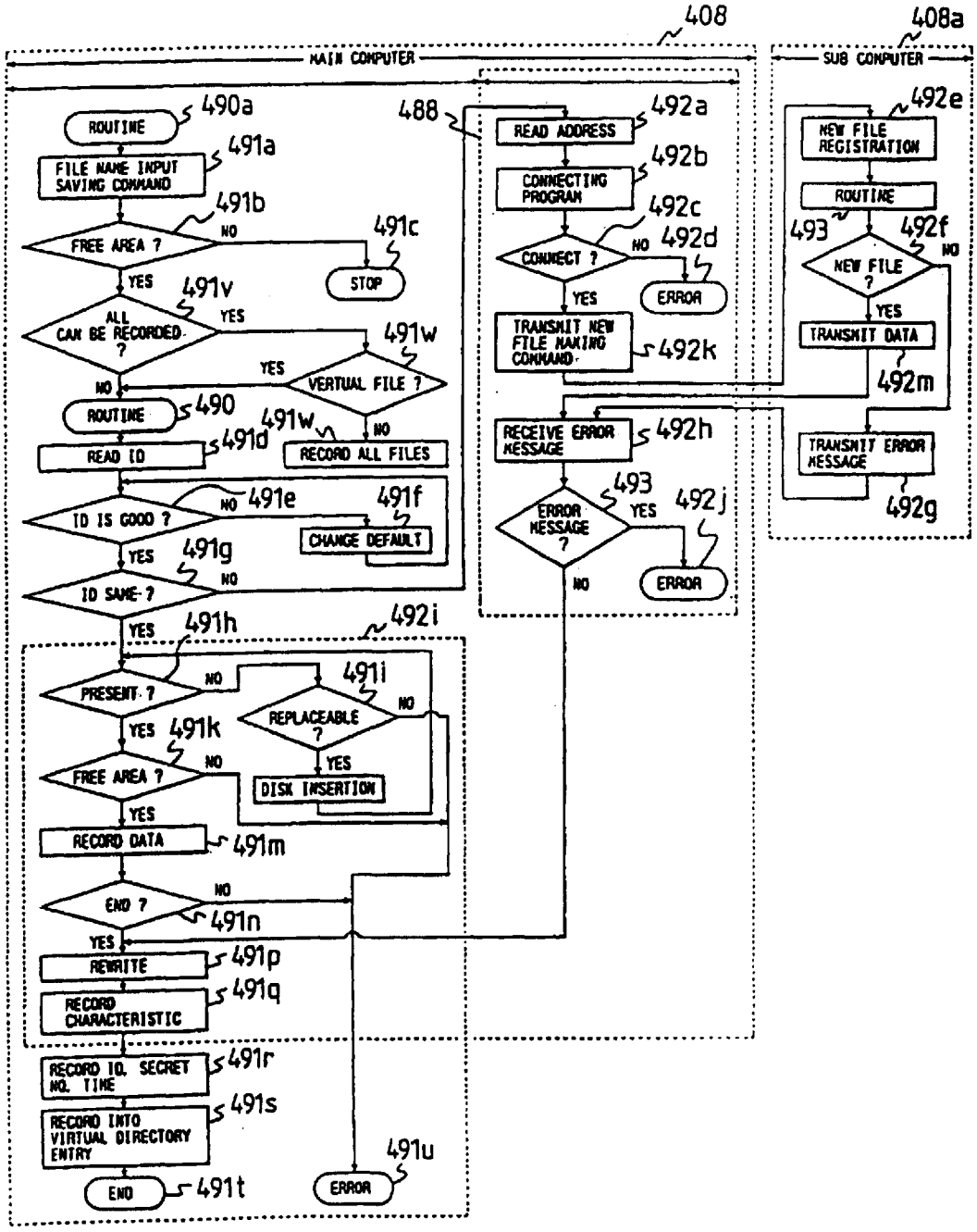

FIG. 163 is a flowchart of a program in the twenty-second embodiment.

Figure 164A:
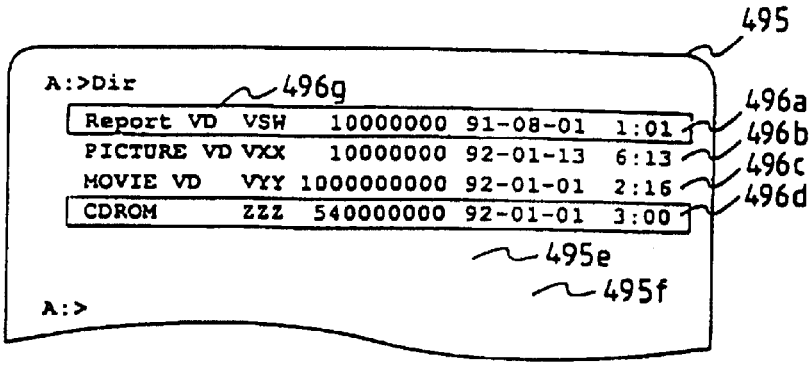

FIG. 164(a) is an illustration of a display screen of a main computer in the twenty-second embodiment.

Figure 164B:
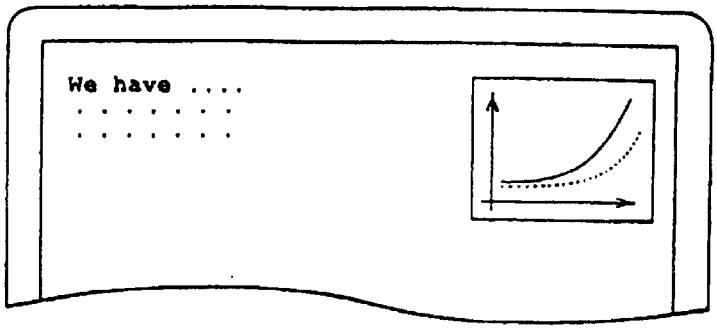

FIG. 164(b) is an illustration of a display screen of a main computer in the twenty-second embodiment.

Figure 164C:
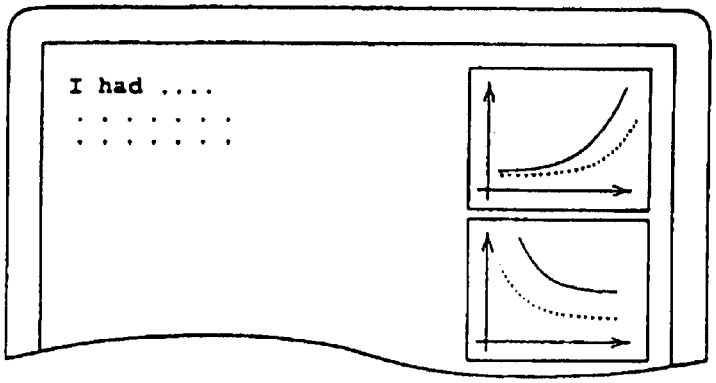

FIG. 164(c) is an illustration of a display screen of a main computer in the twenty-second embodiment.

Figure 164D:
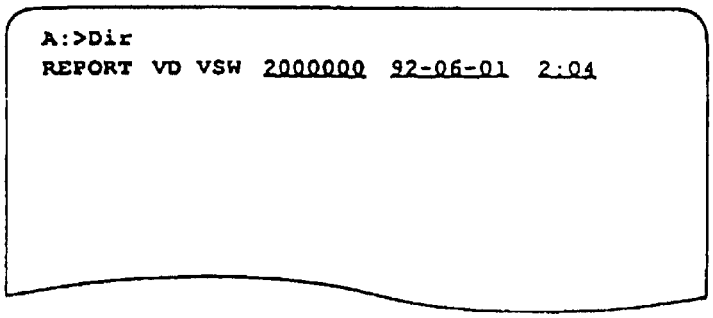

FIG. 164(d) is an illustration of a display screen of a main computer in the twenty-second embodiment.

FIG. 165 is an illustration of a display screen of a computer in the twenty-second embodiment.

Figure 166A:
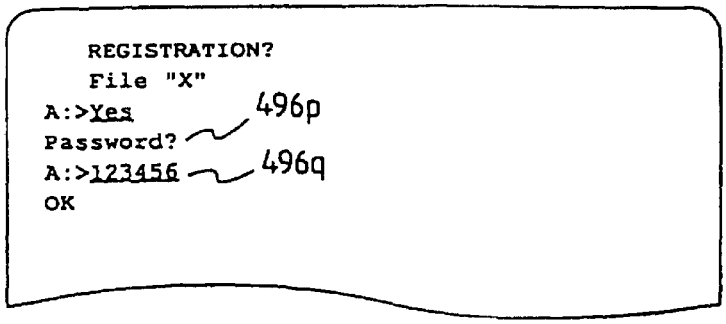

FIG. 166(a) is an illustration of a display screen of a main computer in the twenty-second embodiment.

Figure 166B:
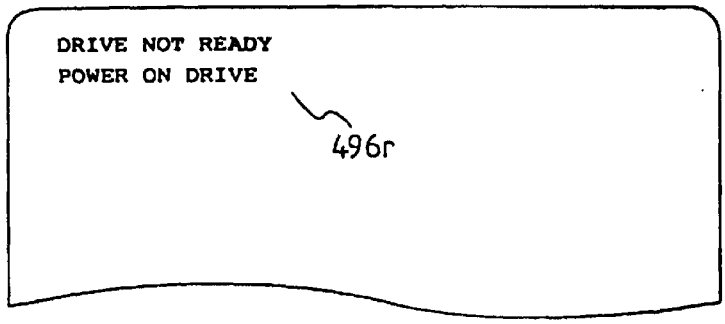

FIG. 166(b) is an illustration of a display screen of a main computer in the twenty-second embodiment.

Figure 166C:
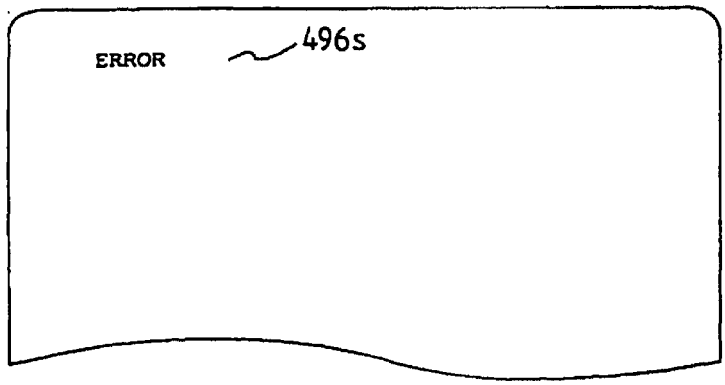

FIG. 166(c) is an illustration of a display screen of a main computer in the twenty-second embodiment.

Figure 166D:
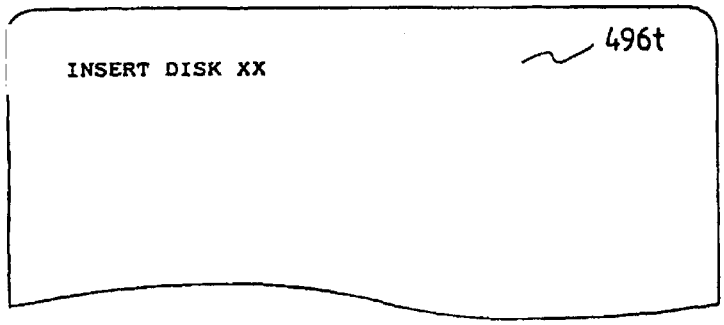

FIG. 166(d) is an illustration of a display screen of a main computer in the twenty-second embodiment.

FIG. 167(a) is an illustration of a display screen of a sub computer in the twenty-second embodiment.

FIG. 167(b) is an illustration of a display screen of a sub computer in the twenty-second embodiment.

Figure 168:
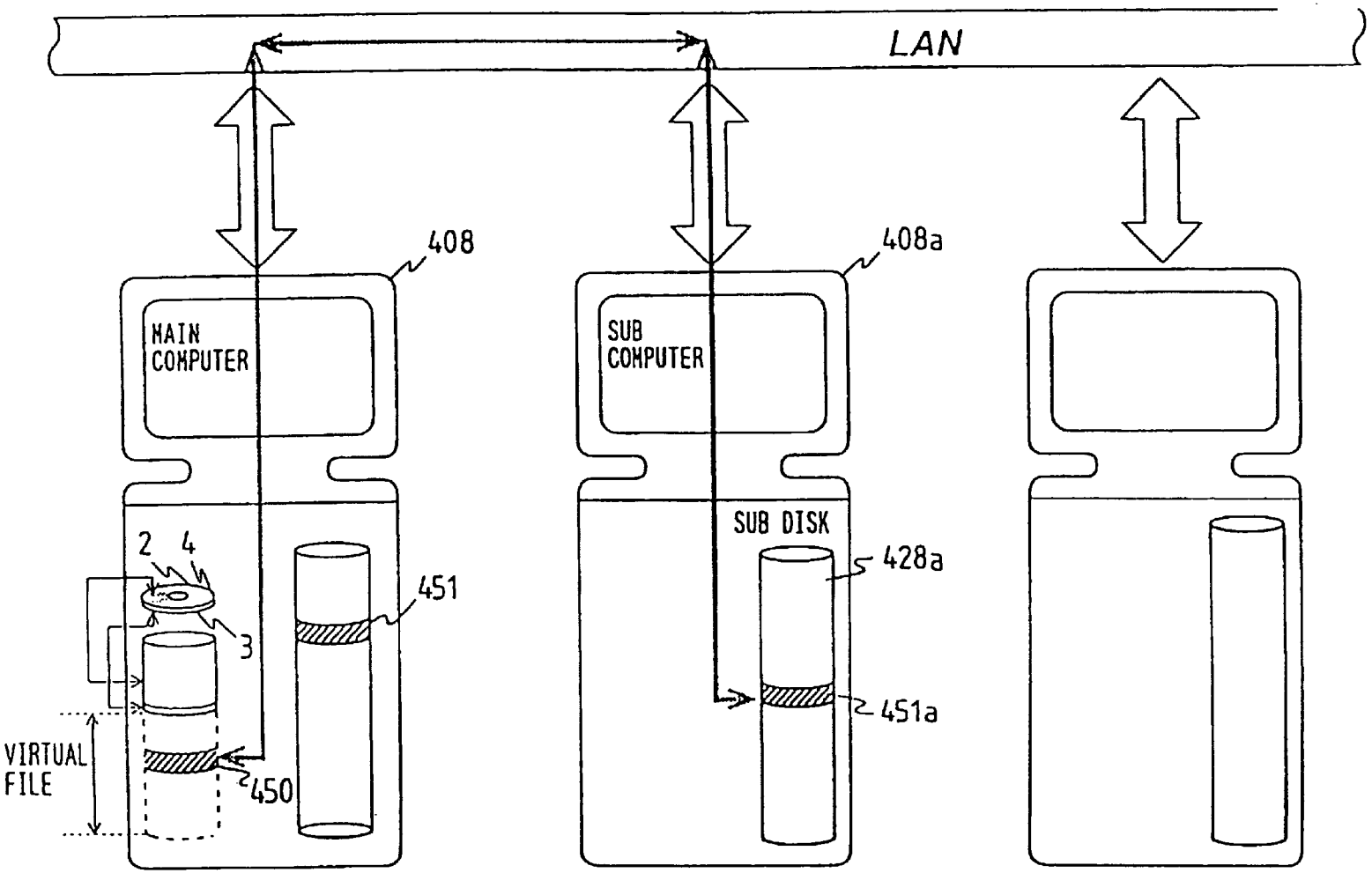

FIG. 168 is a diagram of a network in the twenty-second embodiment.

FIG. 169 is an illustration of a display screen of a main computer in the twenty-second embodiment.

FIG. 170 is an illustration of a display screen of a computer in the seventeenth embodiment.

Figure 171:
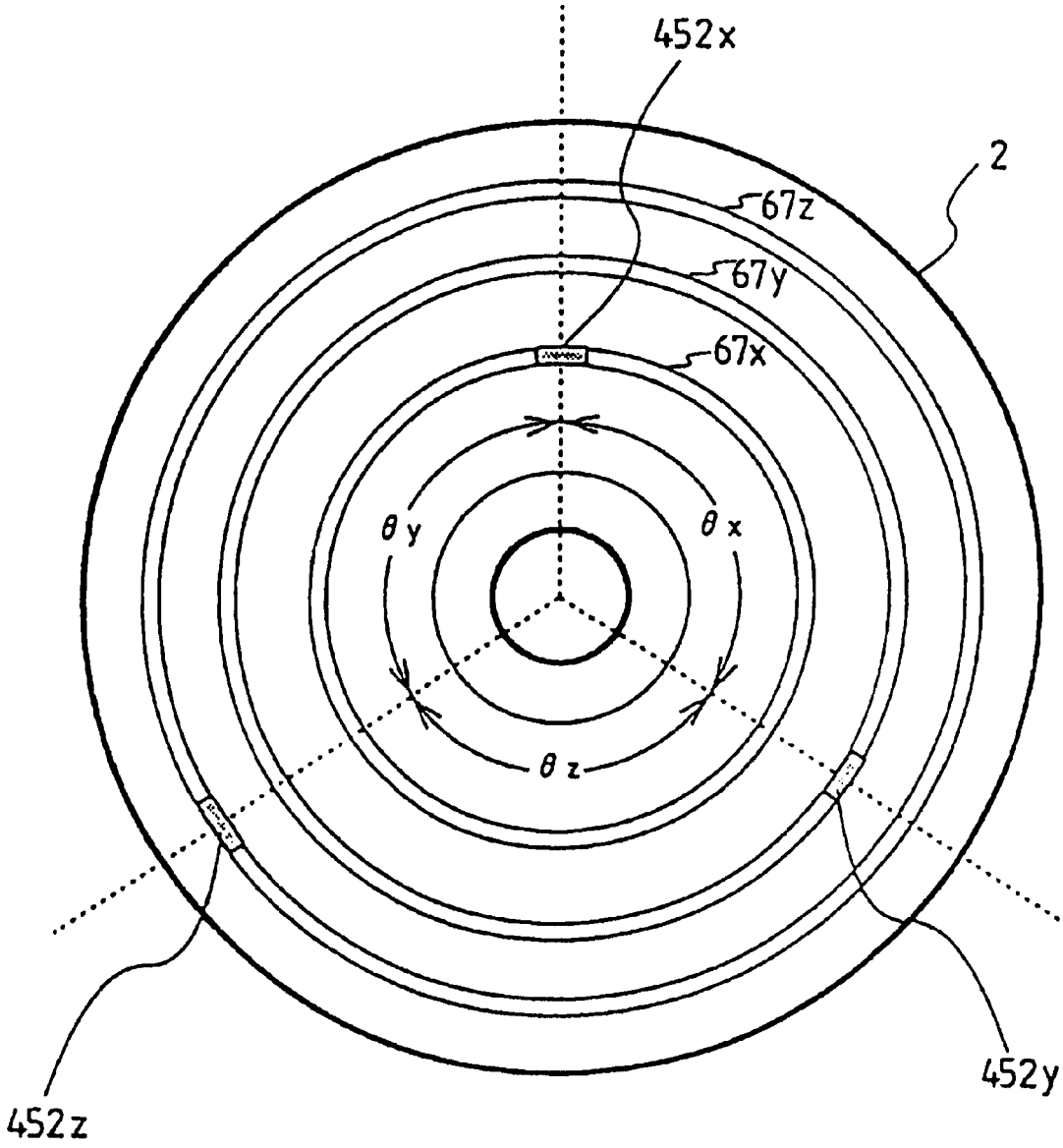

FIG. 171 is a diagram of a recording medium in the twenty-second embodiment.

Figure 172A:
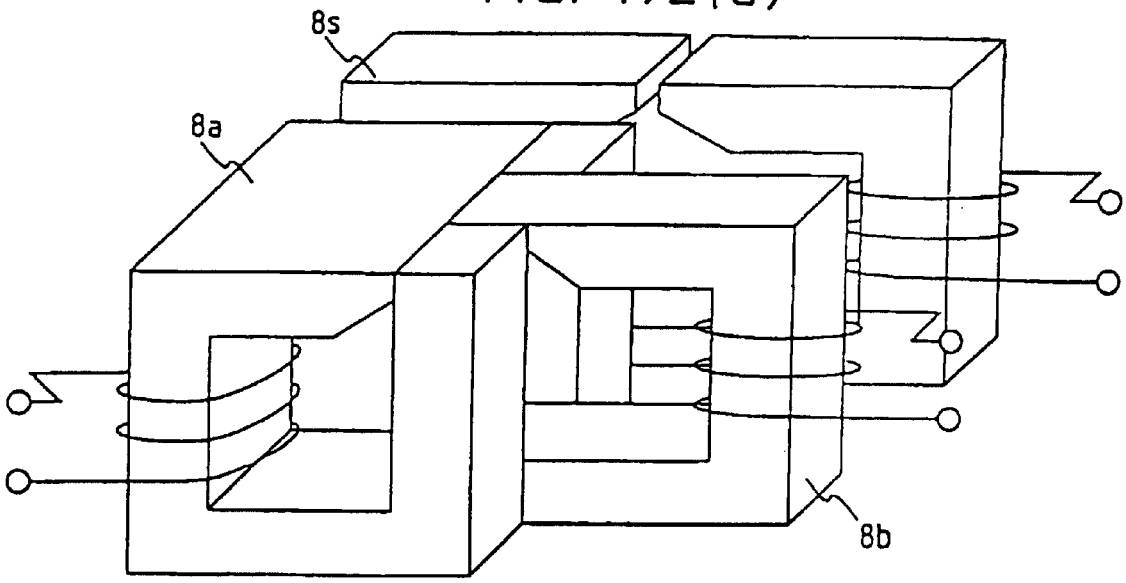

FIG. 172(a) is a perspective view of a magnetic head in the thirteenth embodiment.

Figure 172B:
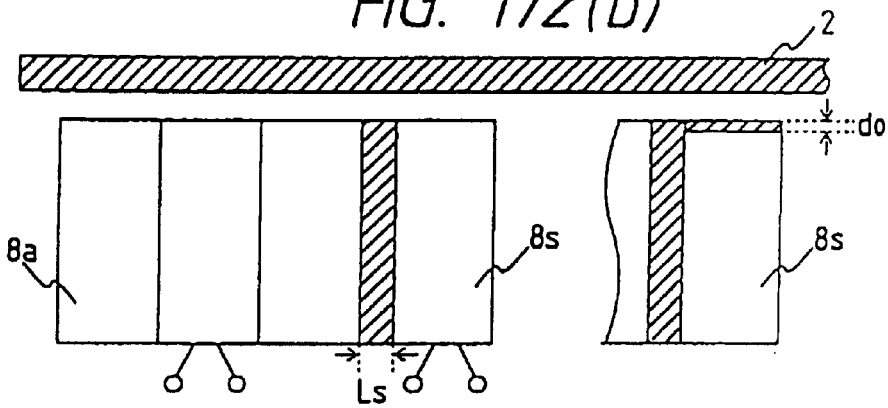

FIG. 172(b) is a sectional view of a magnetic head in the thirteenth embodiment.

Figure 172C:
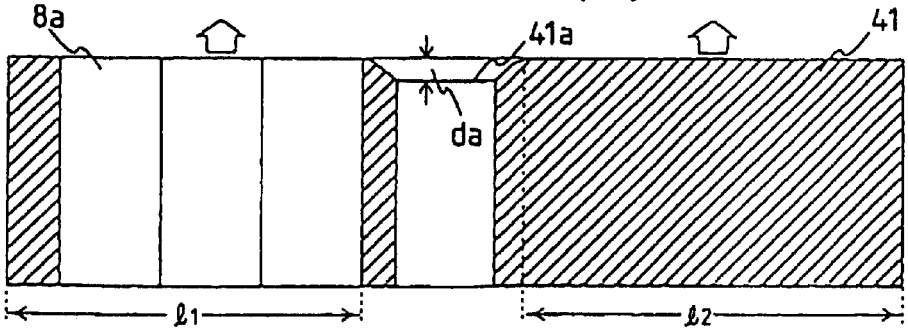

FIG. 172(c) is a sectional view of a magnetic head in the thirteenth embodiment.

Figure 173A:
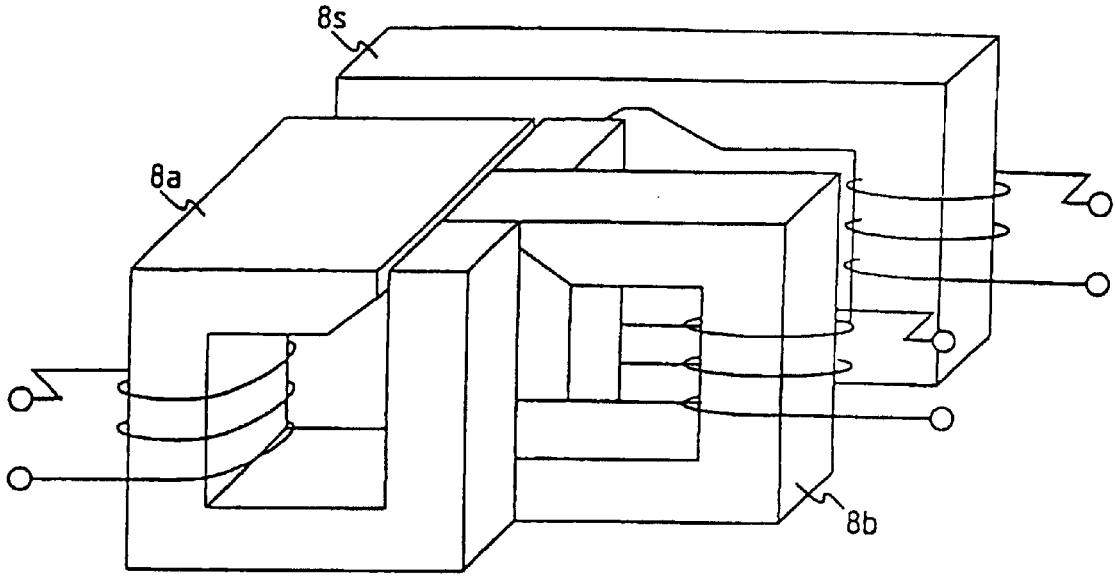

FIG. 173(a) is a perspective view of a magnetic head in the thirteenth embodiment.

Figure 173B:
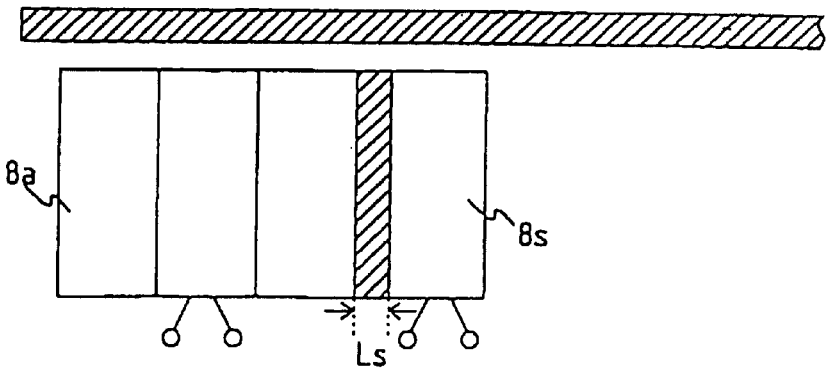

FIG. 173(b) is a sectional view of a magnetic head in the thirteenth embodiment.

Figure 174A:
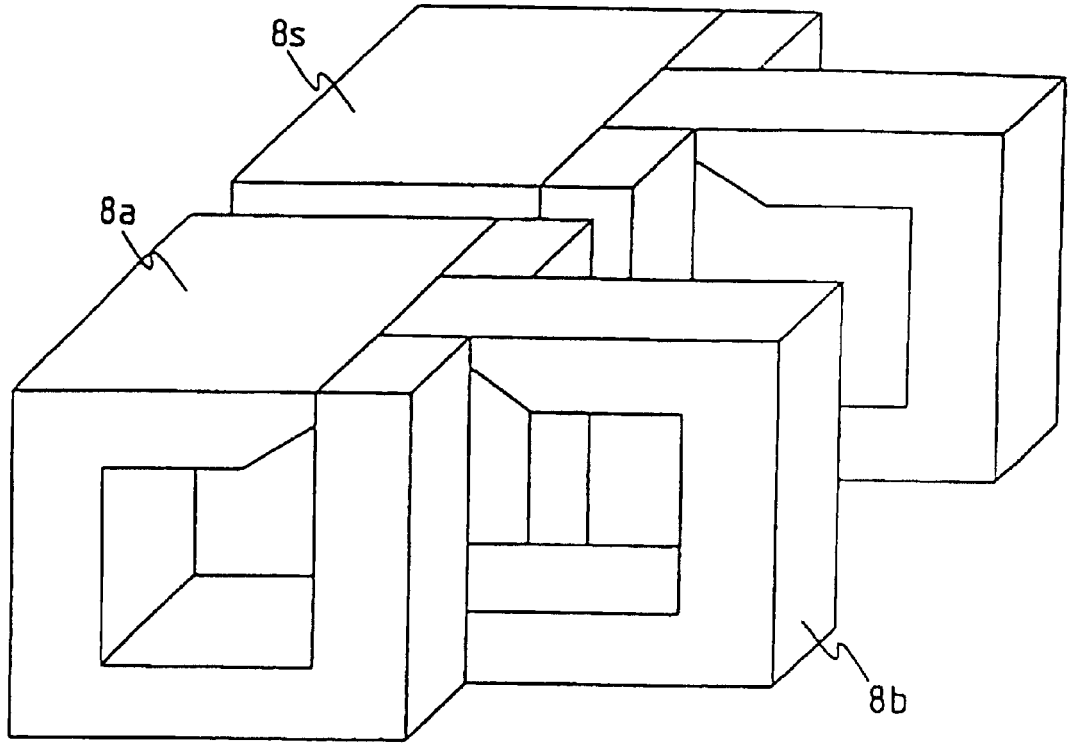

FIG. 174(a) is a perspective view of a magnetic head in the thirteenth embodiment.

Figure 174B:
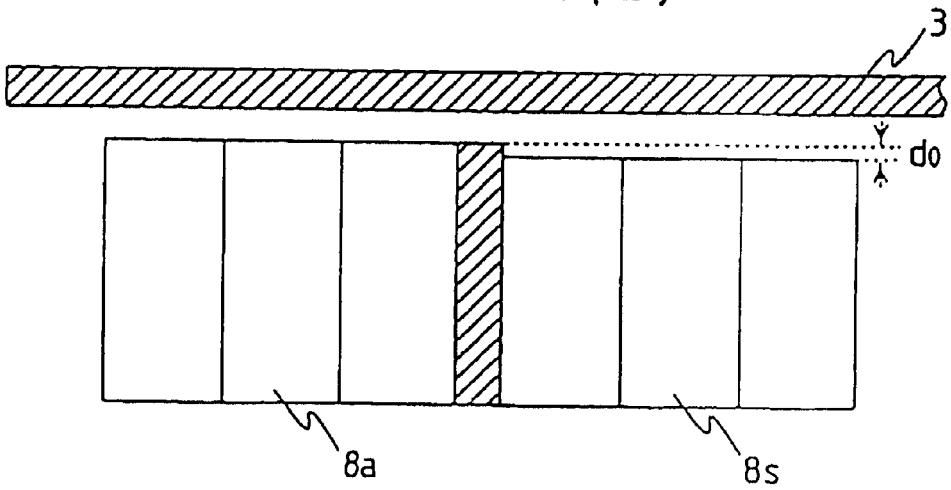

FIG. 174(b) is a sectional view of a magnetic head in the thirteenth embodiment.

Figure 175A:
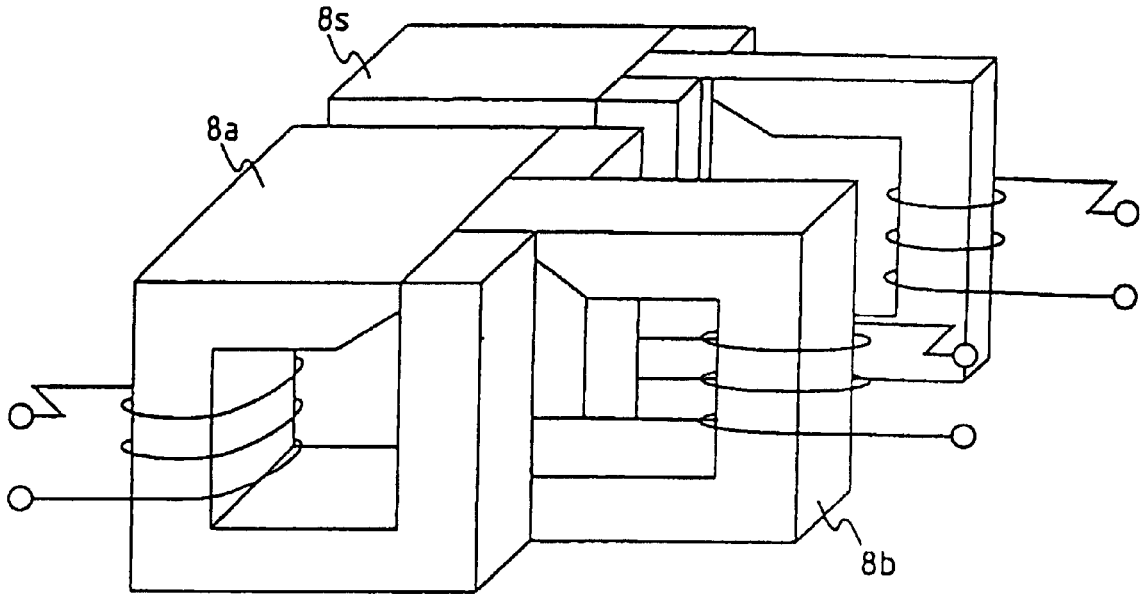

FIG. 175(a) is a perspective view of a magnetic head in the thirteenth embodiment.

Figure 175B:
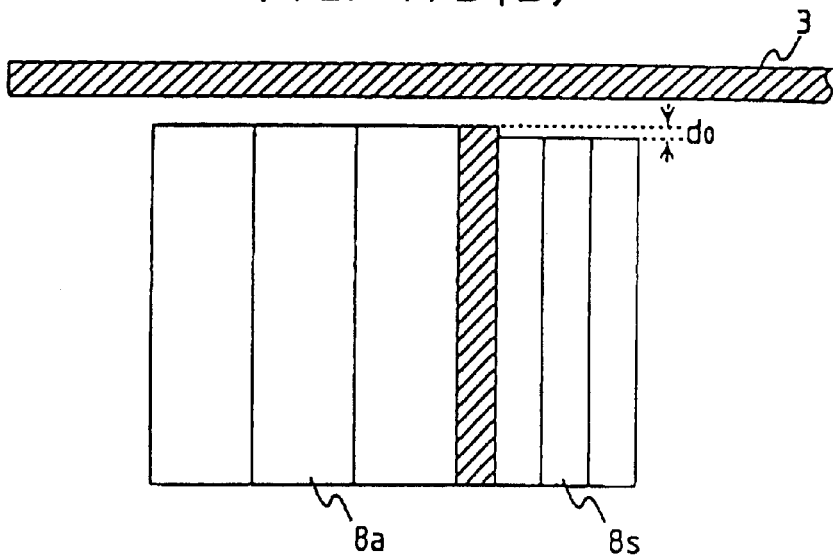

FIG. 175(b) is a sectional view of a magnetic head in the thirteenth embodiment.

Figure 176A:
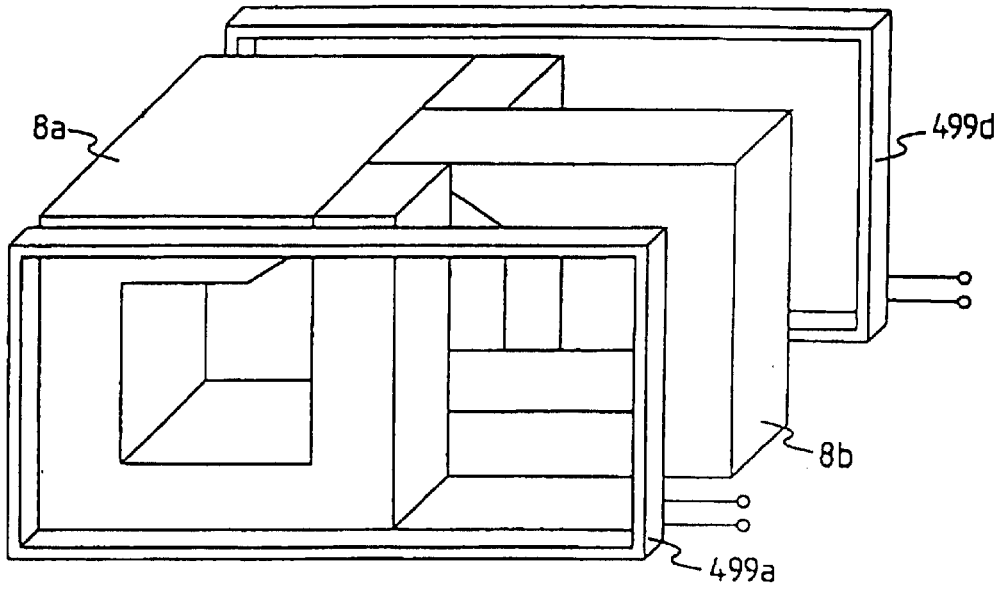

FIG. 176(a) is a perspective view of a noise detection coil in the thirteenth embodiment.

Figure 176B:
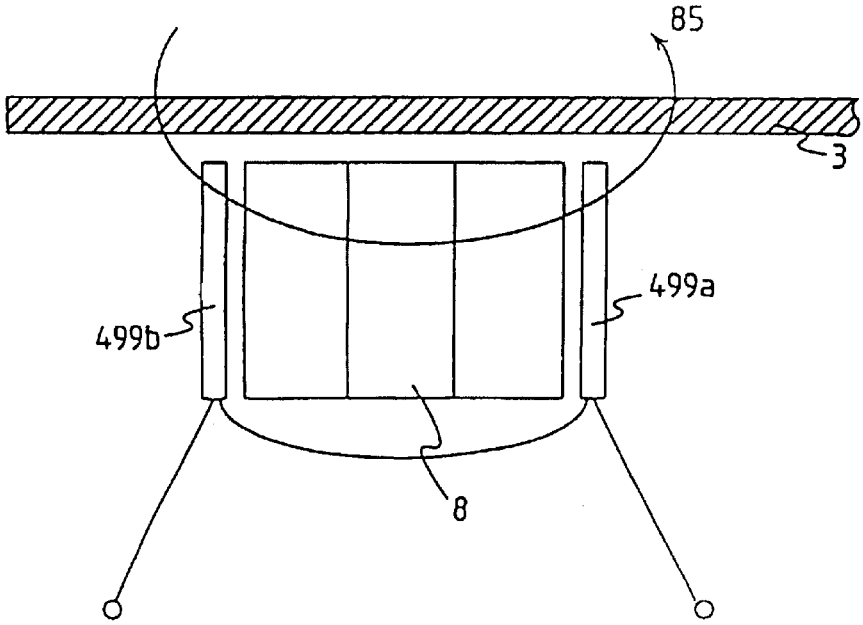

FIG. 176(b) is a sectional view of a noise detection coil in the thirteenth embodiment.

Figure 177A:
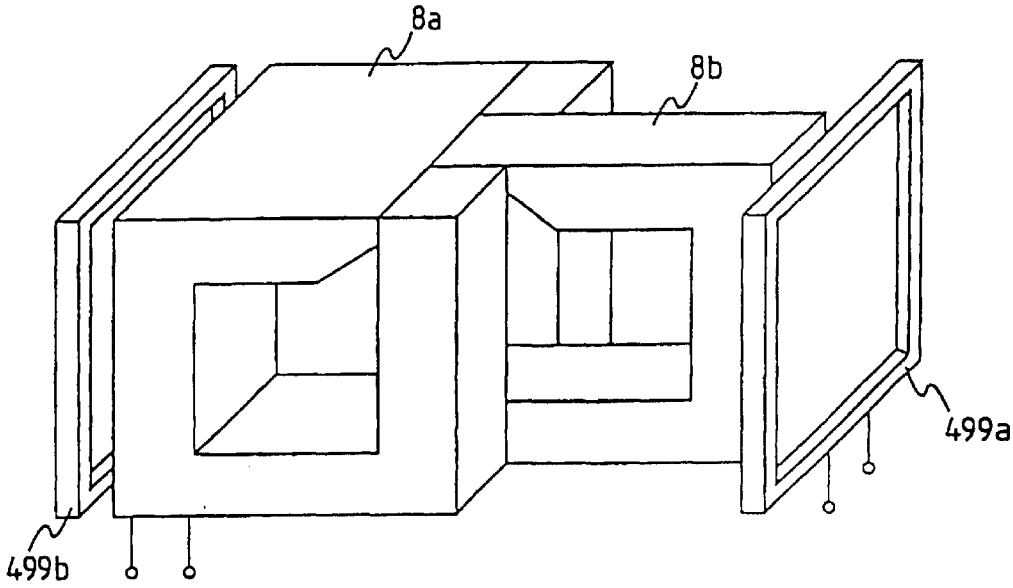

FIG. 177(a) is a perspective view of a noise detection coil in the thirteenth embodiment.

Figure 177B:
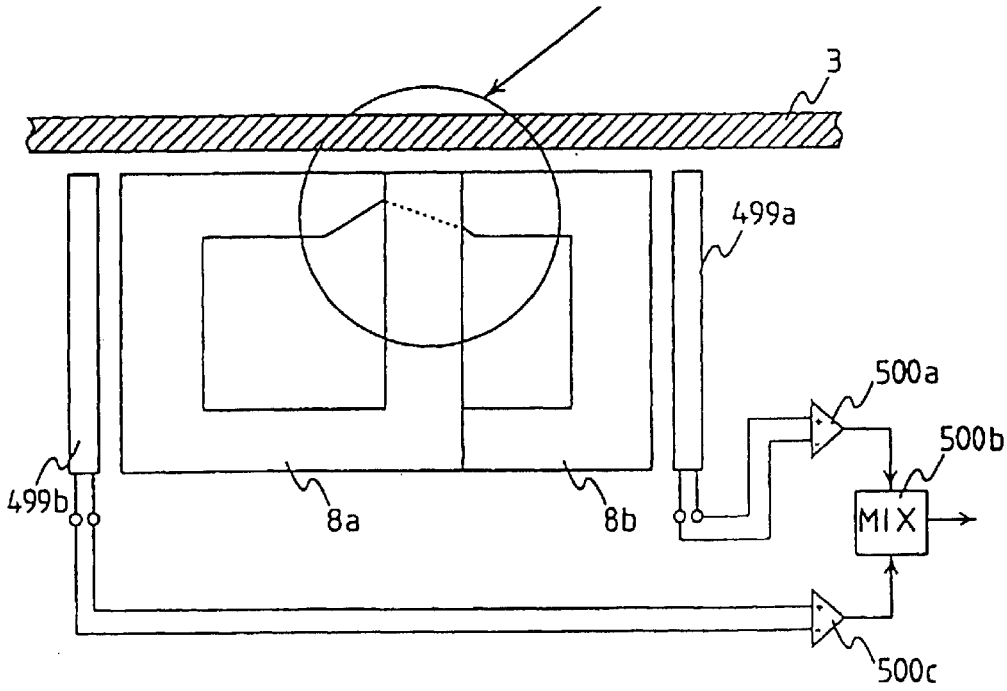

FIG. 177(b) is a block diagram of a noise detection system in the thirteenth embodiment.

Figure 178A:
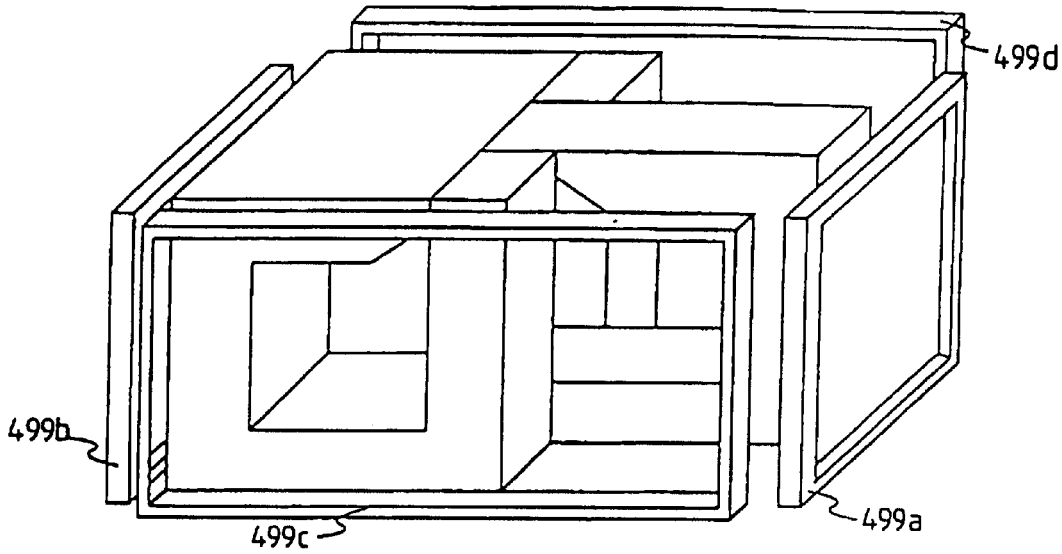

FIG. 178(a) is a perspective view of a noise detection coil in the thirteenth embodiment.

Figure 178B:
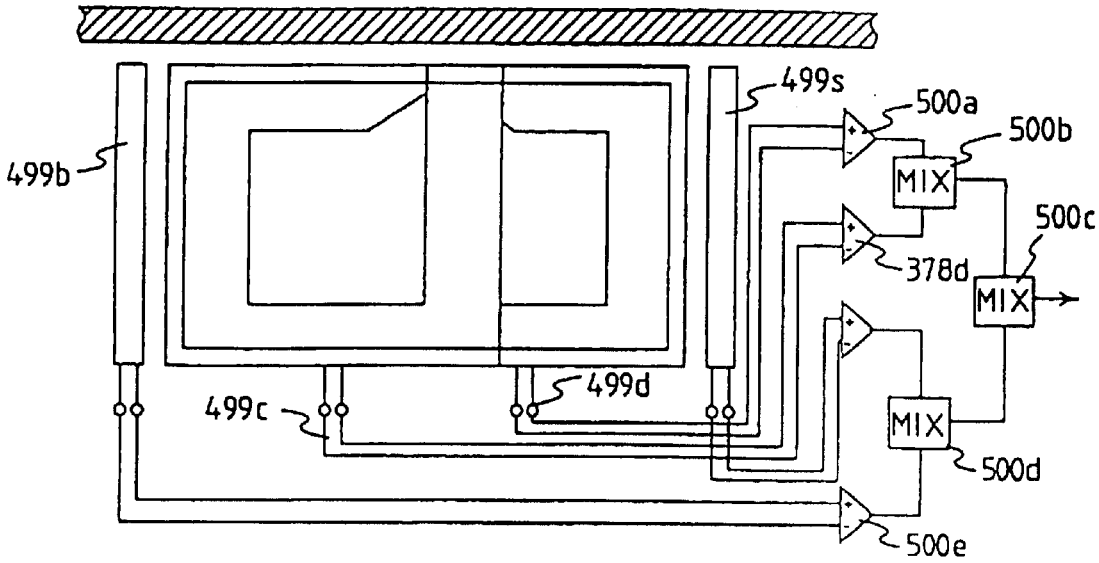

FIG. 178(b) is a block diagram of a noise detection system in the thirteenth embodiment.

Figure 179:
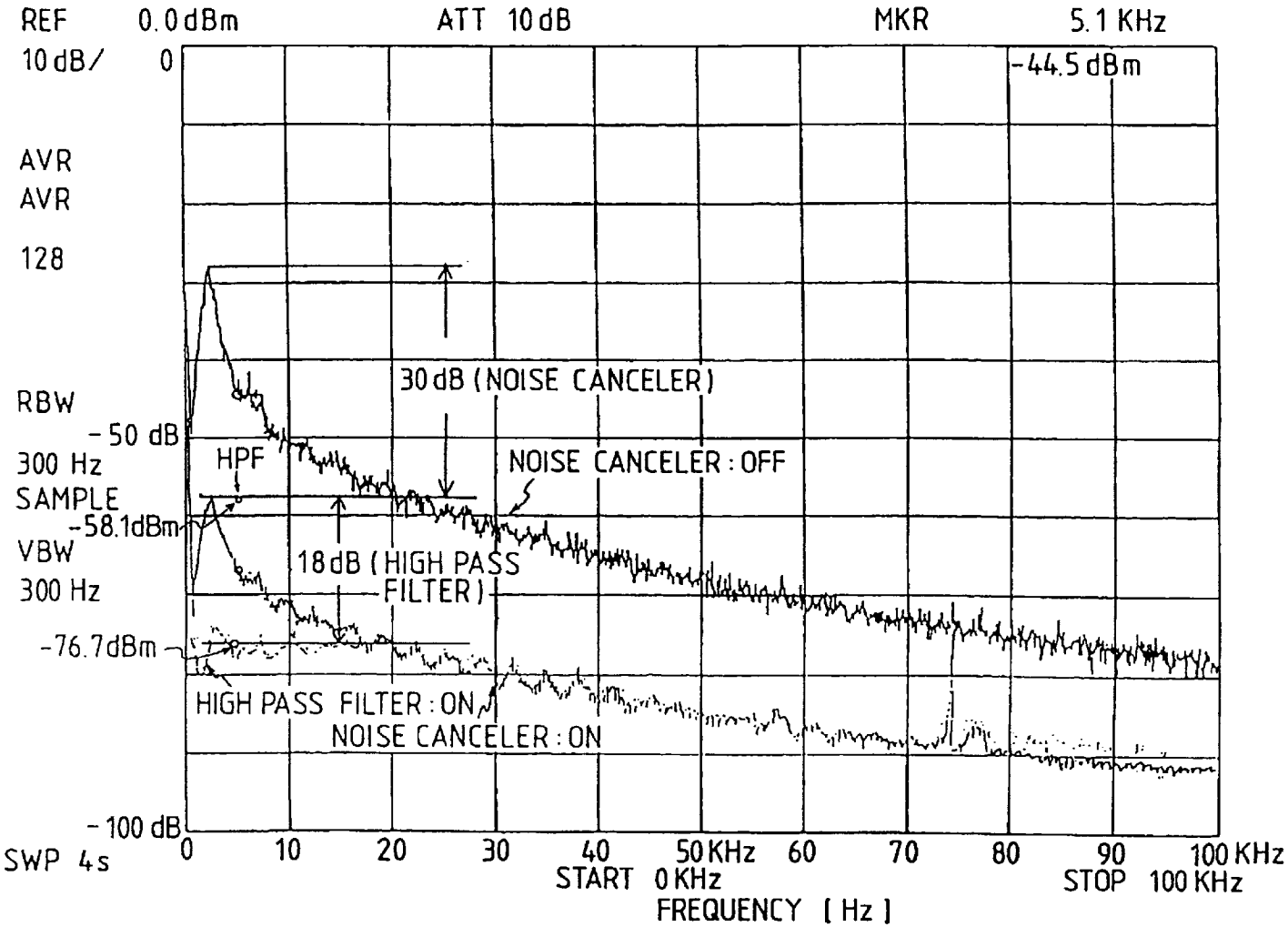

FIG. 179 is a diagram of frequency spectrums of reproduced signals which occur before and after noise cancel in the thirteenth embodiment.

Figure 180:
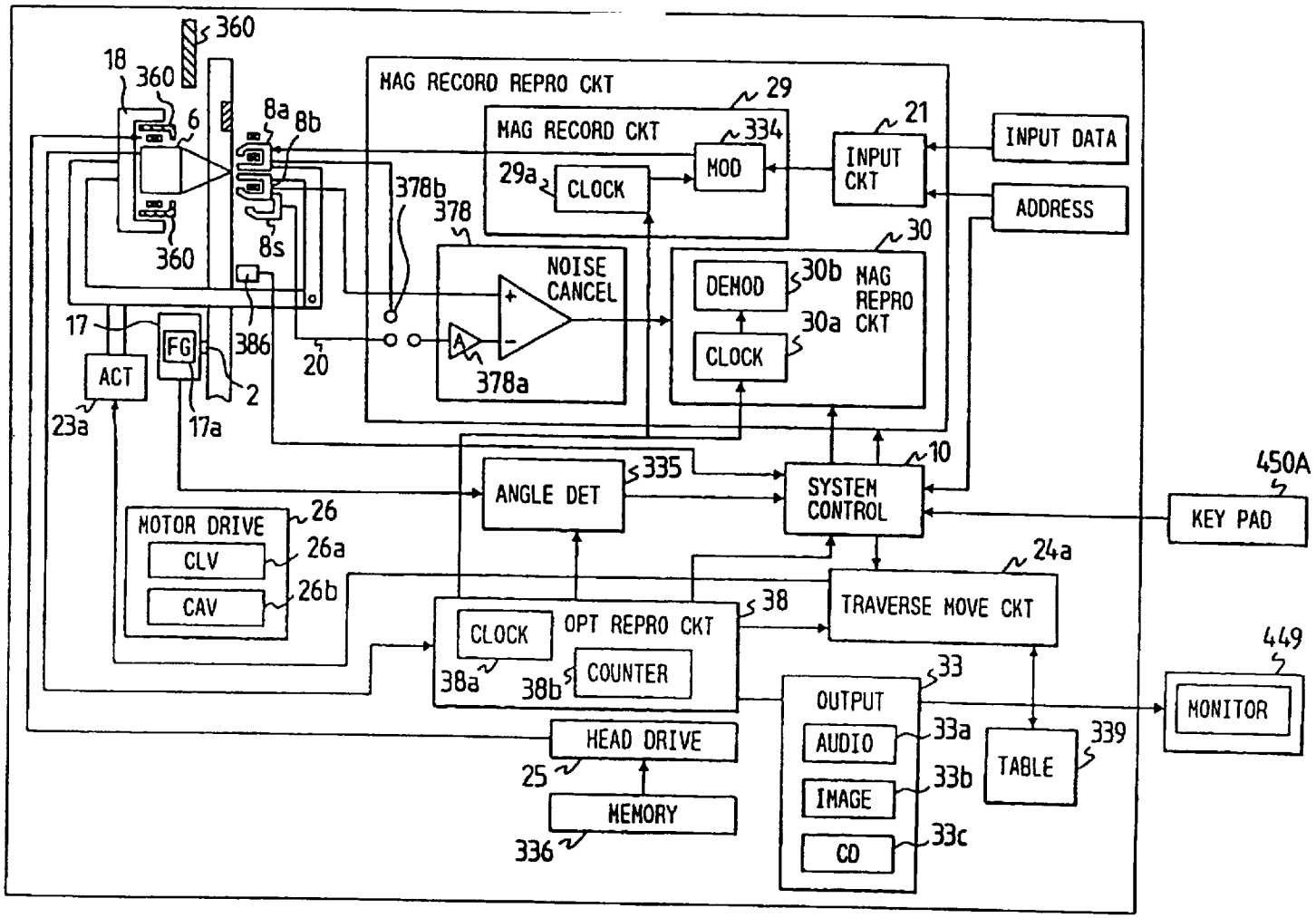

FIG. 180 is a block diagram of a recording and reproducing apparatus in the twenty-second embodiment.

Figure 181:
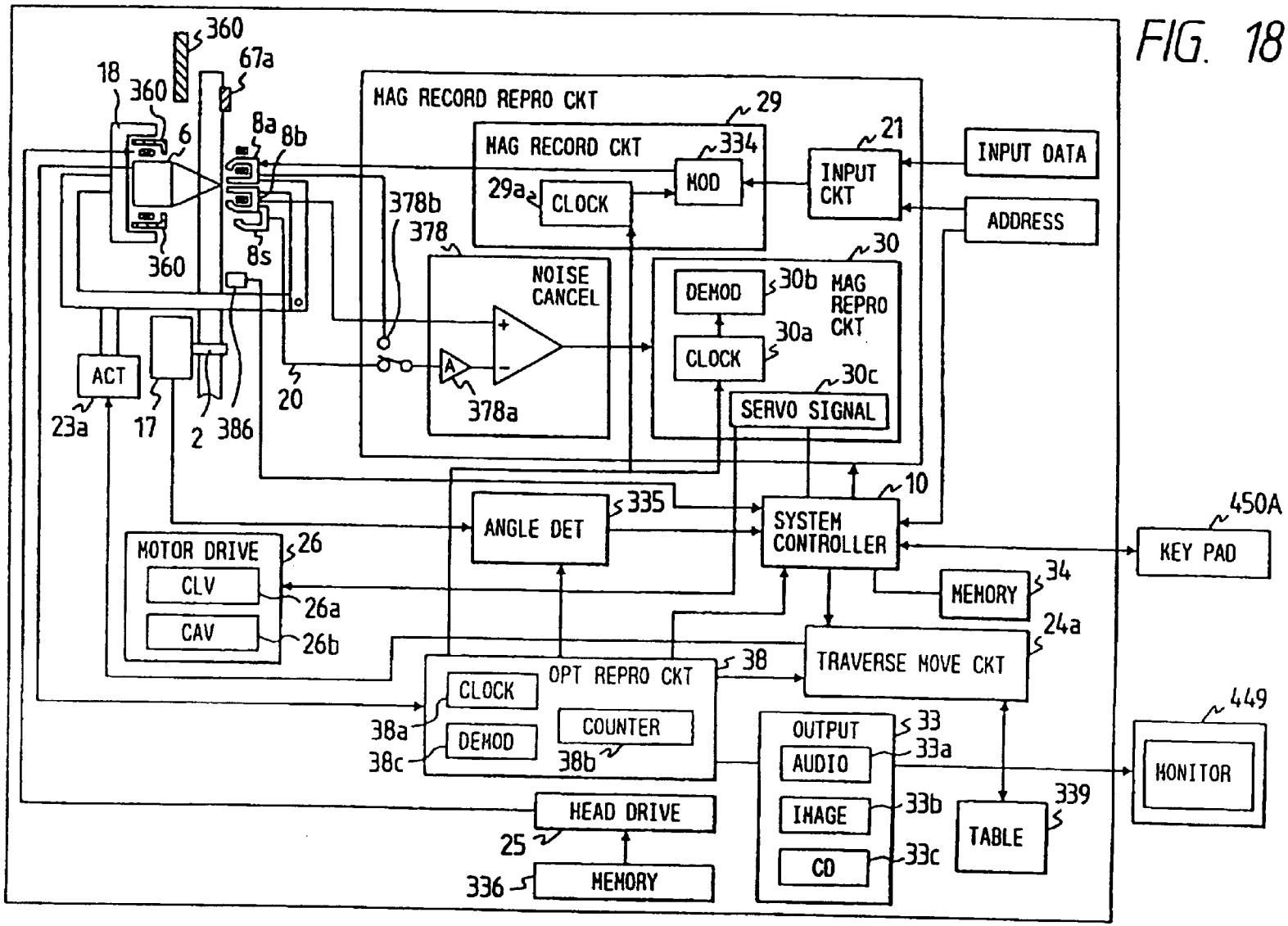

FIG. 181 is a block diagram of a recording and reproducing apparatus according to a twenty-third embodiment of this invention.

Figure 182B:
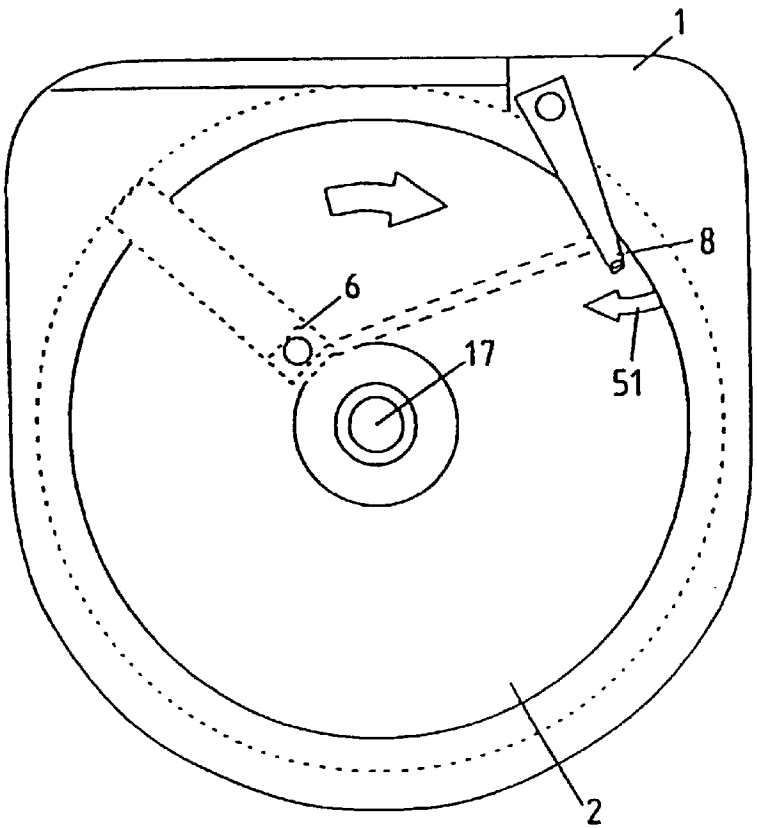
Figure 182A:
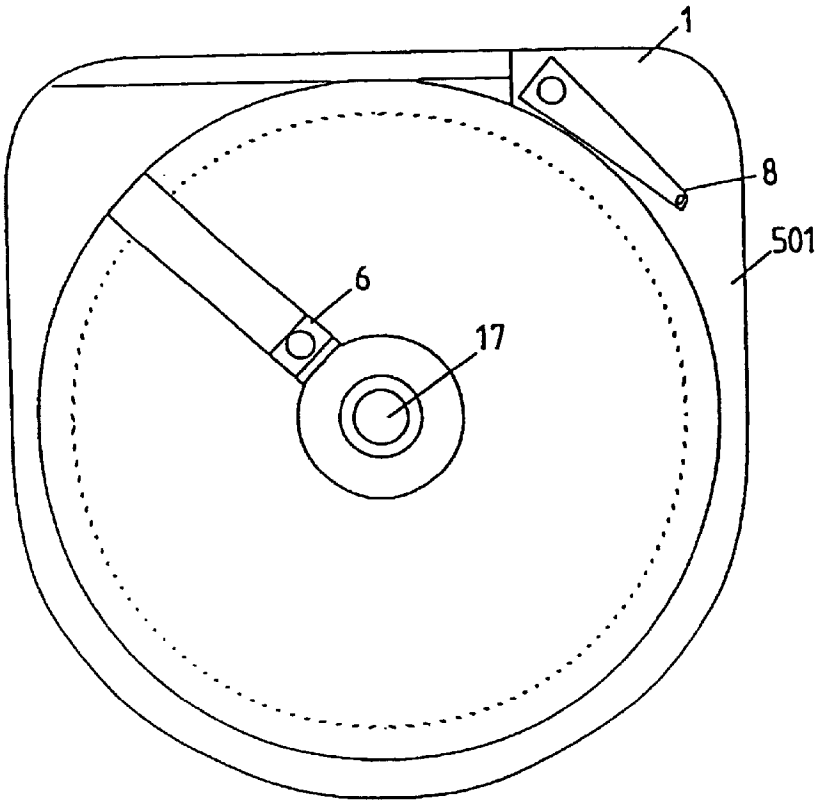

FIG. 182(a) is a top view of the recording and reproducing apparatus in the twenty-third embodiment.

FIG. 182(b) is a top view of the recording and reproducing apparatus in the twenty-third embodiment.

Figure 183:
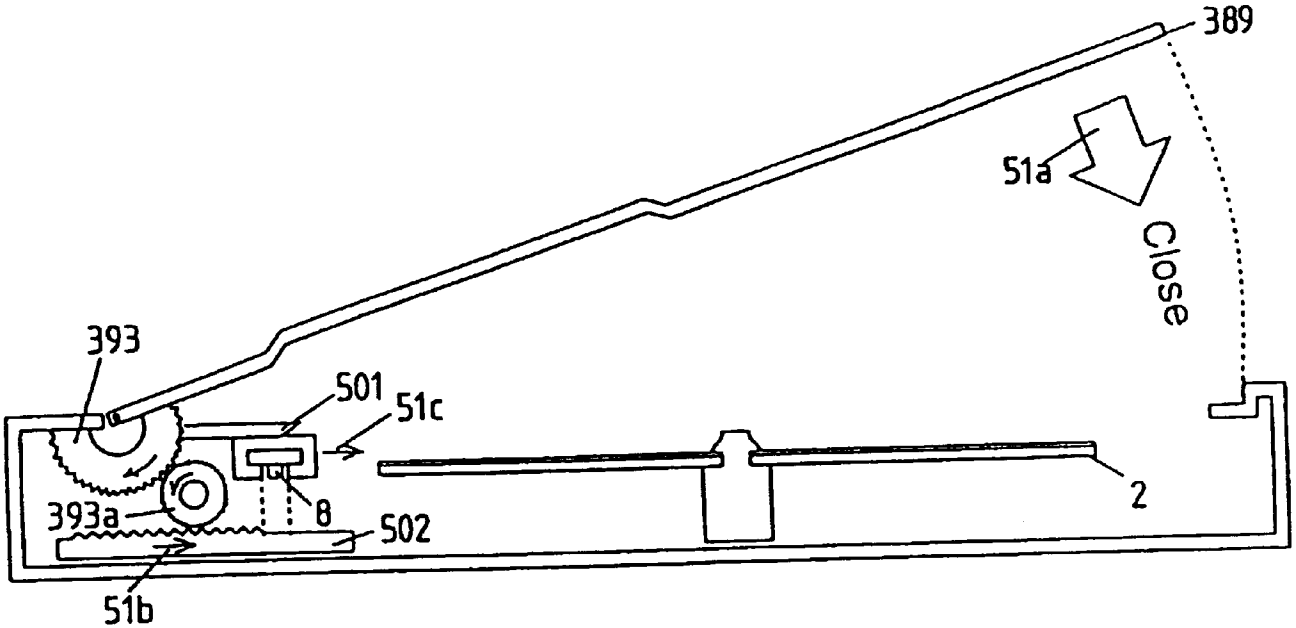

FIG. 183(a) is a sectional view of the recording and reproducing apparatus in the twenty-third embodiment.

Figure 183B:
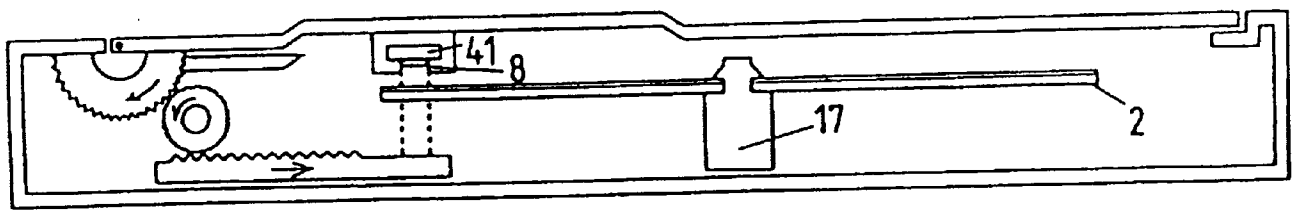

FIG. 183(b) is a sectional view of the recording and reproducing apparatus in the twenty-third embodiment.

Figure 183C:
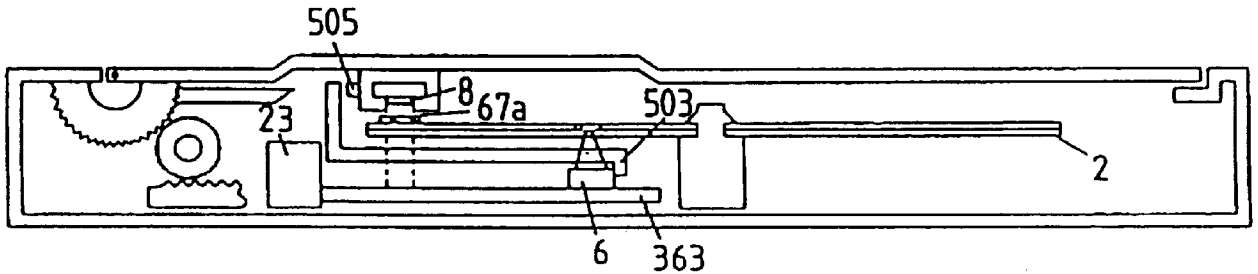

FIG. 183(c) is a sectional view of the recording and reproducing apparatus in the twenty-third embodiment.

Figure 183D:
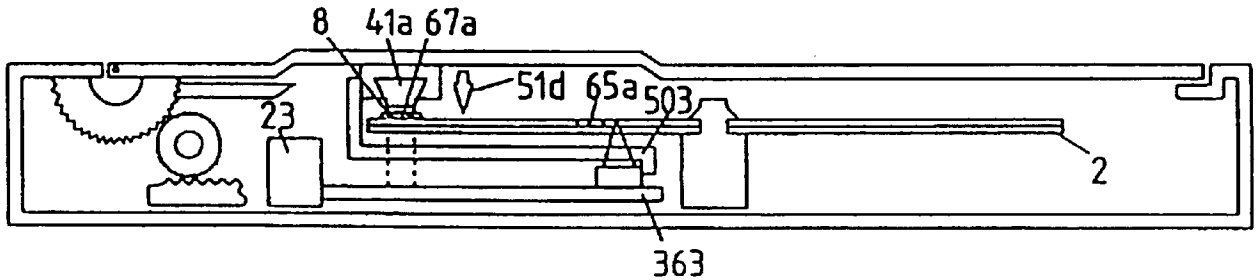

FIG. 183(d) is a sectional view of the recording and reproducing apparatus in the twenty-third embodiment.

Figure 183E:
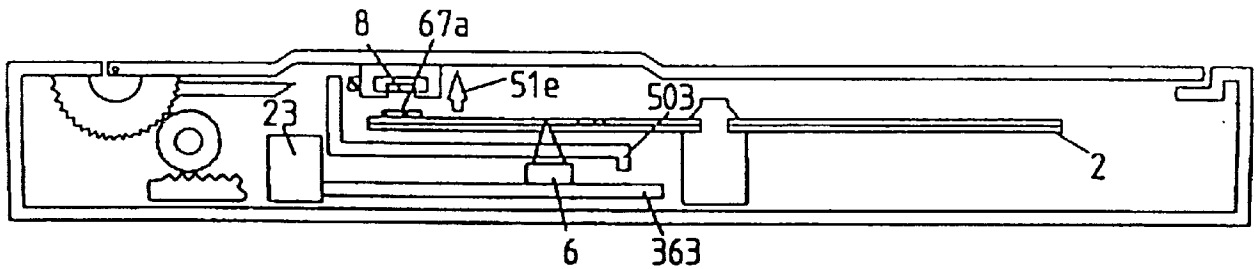

FIG. 183(e) is a sectional view of the recording and reproducing apparatus in the twenty-third embodiment.

Figure 184C:
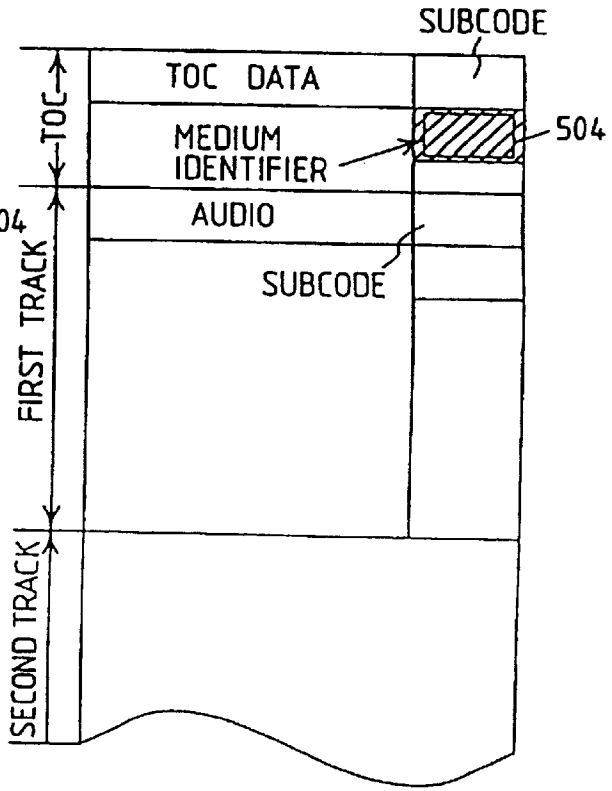
Figure 184B:
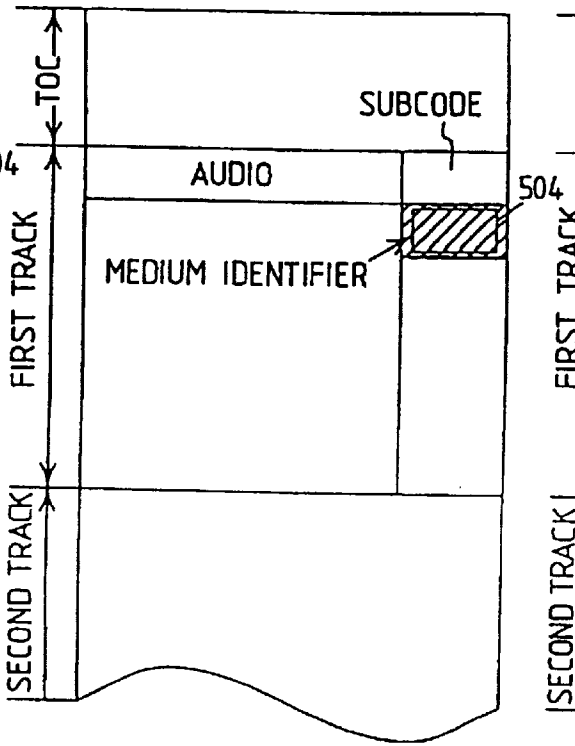
Figure 184A:
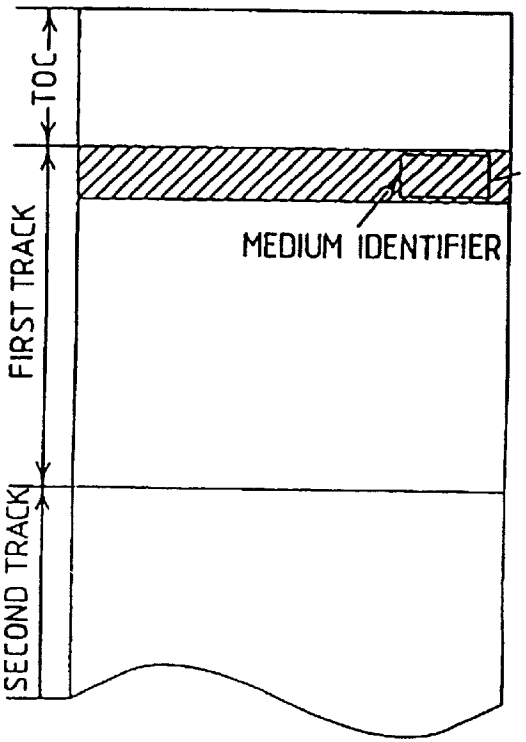

FIG. 184(a) is a diagram of a data structure in a recording medium in the twenty-third embodiment.

FIG. 184(b) is a diagram of a data structure in a recording medium in the twenty-third embodiment.

FIG. 184(c) is a diagram of a data structure in a recording medium in the twenty-third embodiment.

Figures 185A, 185B, 185C, 185D, 185E:
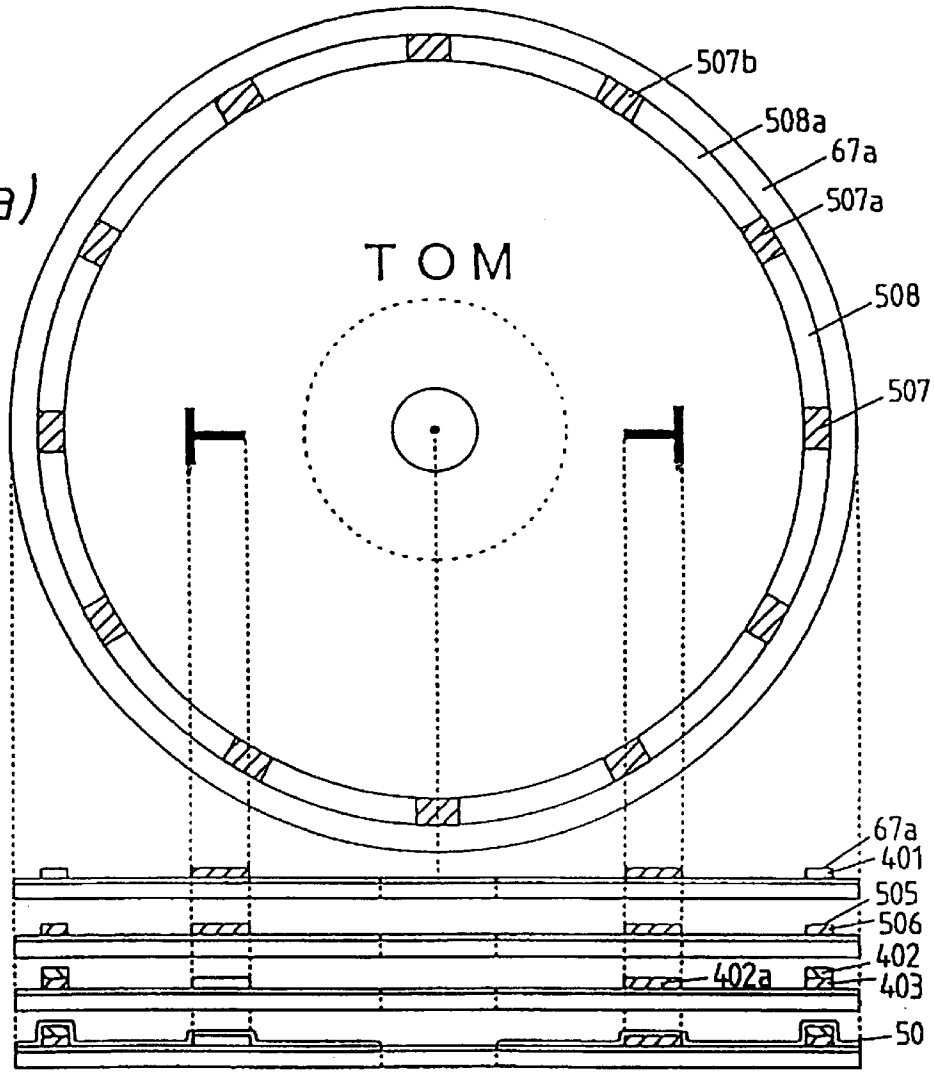

FIG. 185(a) is a top view of a recording medium in the twenty-third embodiment.

FIG. 185(b) is a sectional view of a recording medium in the twenty-third embodiment.

FIG. 185(c) is a sectional view of a recording medium in the twenty-third embodiment.

FIG. 185(d) is a sectional view of a recording medium in the twenty-third embodiment.

FIG. 185(e) is a sectional view of a recording medium in the twenty-third embodiment.

Figure 186A:
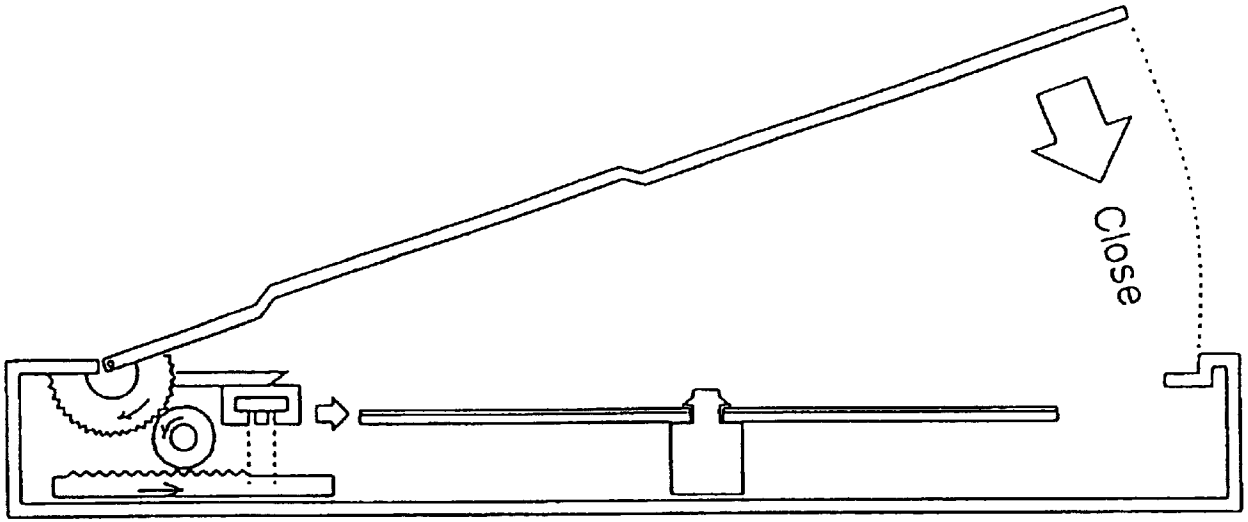

FIG. 186(a) is a sectional view of a recording and reproducing apparatus in the twenty-third embodiment.

Figure 186B:
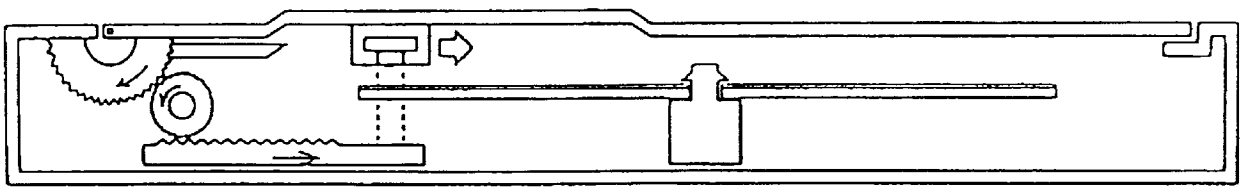

FIG. 186(b) is a sectional view of a recording and reproducing apparatus in the twenty-third embodiment.

Figure 186C:
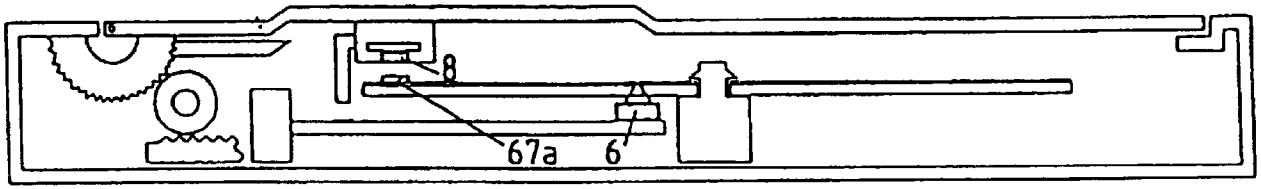

FIG. 186(c) is a sectional view of a recording and reproducing apparatus in the twenty-third embodiment.

Figure 186D:
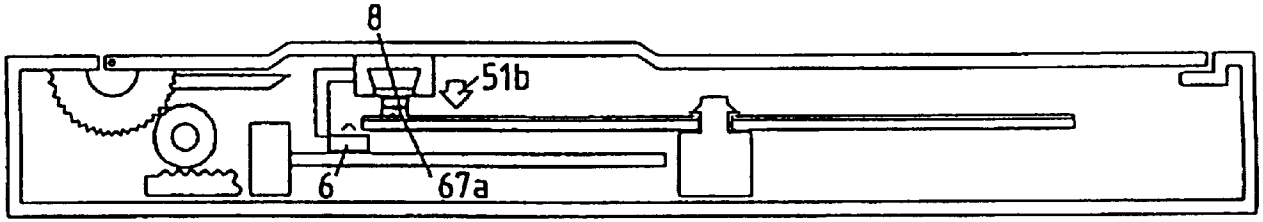

FIG. 186(d) is a sectional view of a recording and reproducing apparatus in the twenty-third embodiment.

Figure 186E:
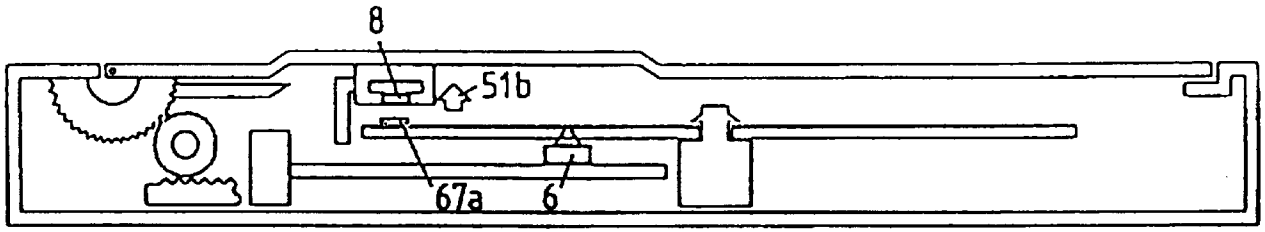

FIG. 186(e) is a sectional view of a recording and reproducing apparatus in the twenty-third embodiment.

Figures 187A, 187B, 187C, 187D, 187E:
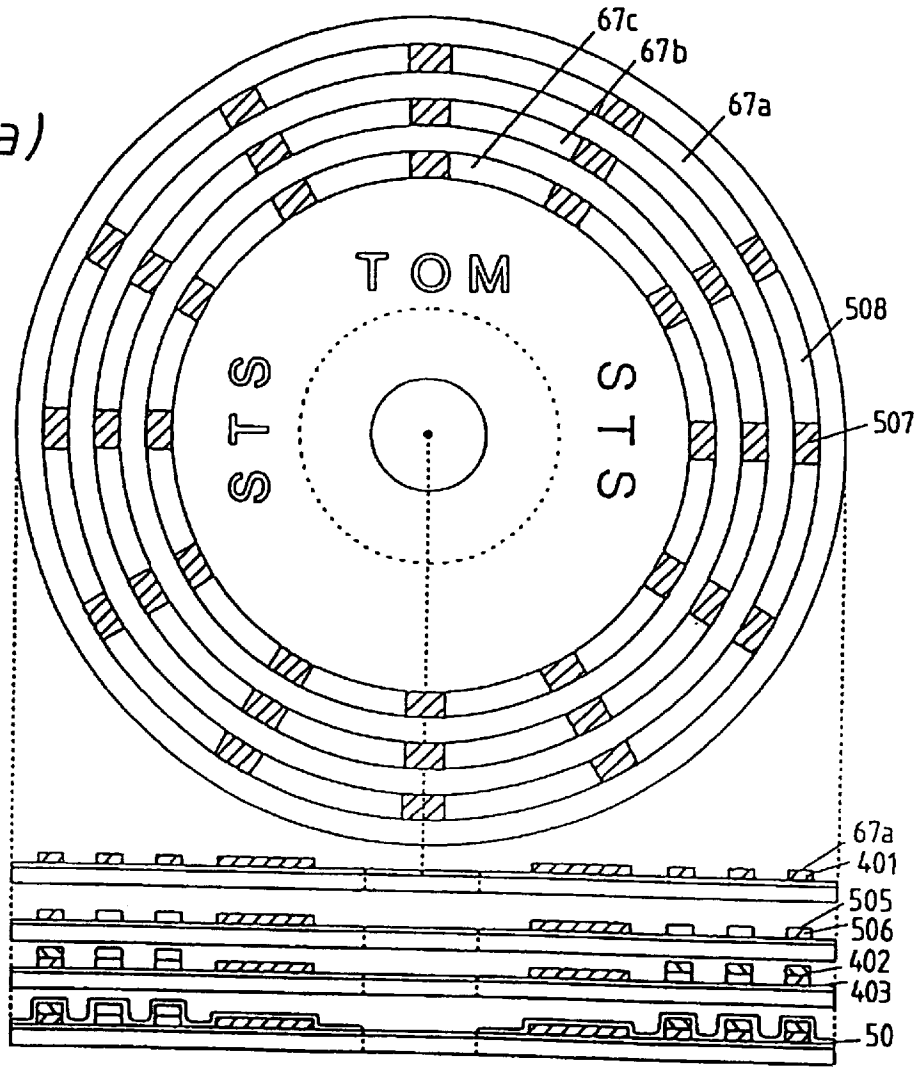

FIG. 187(a) is a sectional view of a recording and reproducing apparatus in the twenty-third embodiment.

FIG. 187(b) is a sectional view of a recording and reproducing apparatus in the twenty-third embodiment.

FIG. 187(c) is a sectional view of a recording and reproducing apparatus in the twenty-third embodiment.

FIG. 187(d) is a sectional view of a recording and reproducing apparatus in the twenty-third embodiment.

FIG. 187(e) is a sectional view of a recording and reproducing apparatus in the twenty-third embodiment.

Figures 188A, 188B, 188C, 188D, 188E, 188F:
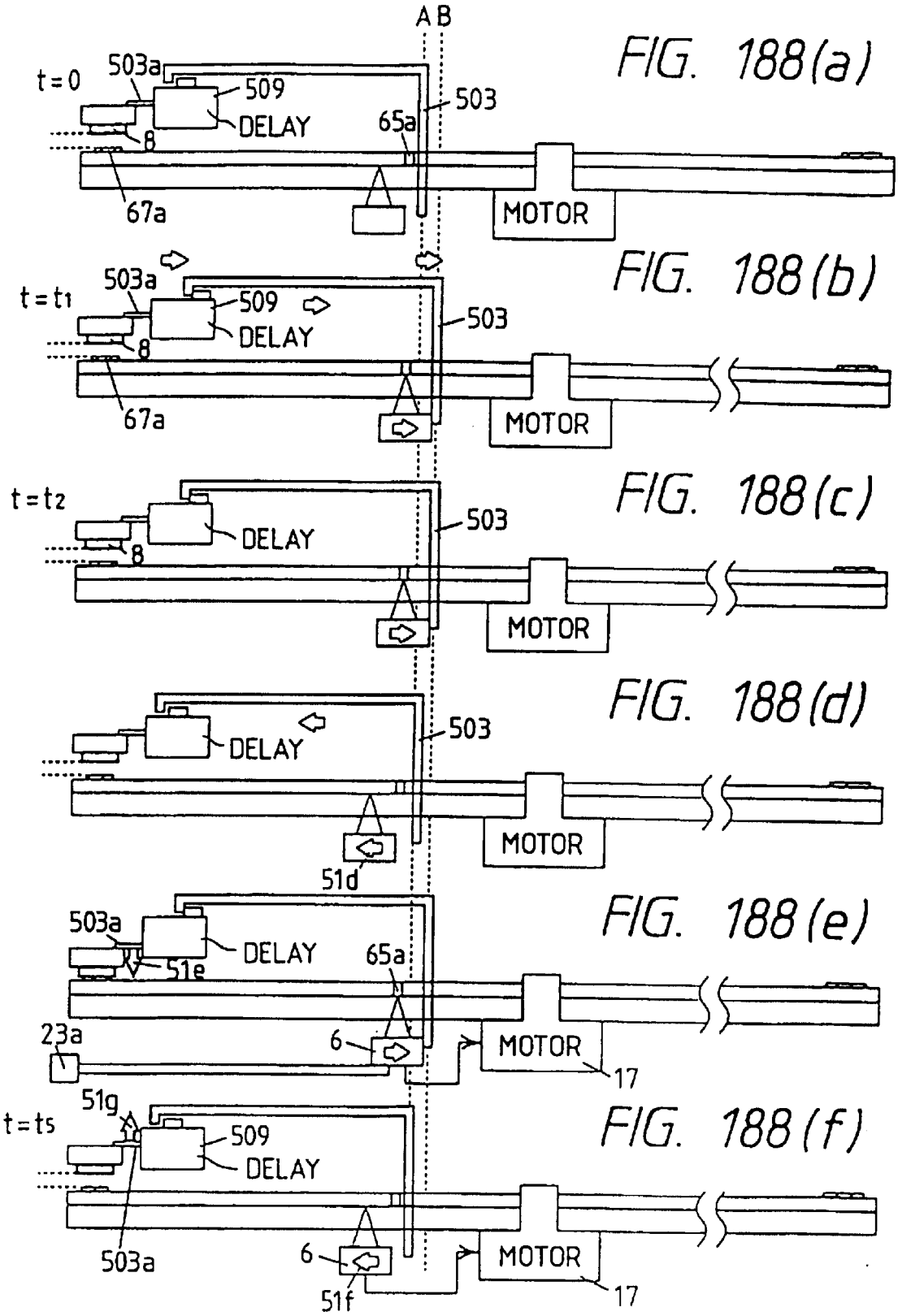

FIG. 188(a) is a sectional view of a recording and reproducing apparatus in the twenty-third embodiment.

FIG. 188(b) is a sectional view of a recording and reproducing apparatus in the twenty-third embodiment.

FIG. 188(c) is a sectional view of a recording and reproducing apparatus in the twenty-third embodiment.

FIG. 188(d) is a sectional view of a recording and reproducing apparatus in the twenty-third embodiment.

FIG. 188(e) is a sectional view of a recording and reproducing apparatus in the twenty-third embodiment.

FIG. 188(f) is a sectional view of a recording and reproducing apparatus in the twenty-third embodiment.

FIG. 189(a) is a sectional view of a recording and reproducing apparatus in the twenty-third embodiment.

FIG. 189(b) is a sectional view of a recording and reproducing apparatus in the twenty-third embodiment.

FIG. 189(c) is a sectional view of a recording and reproducing apparatus in the twenty-third embodiment.

FIG. 189(d) is a diagram of mathematical relations for calculating a track pitch in the twenty-third embodiment.

Figure 190:
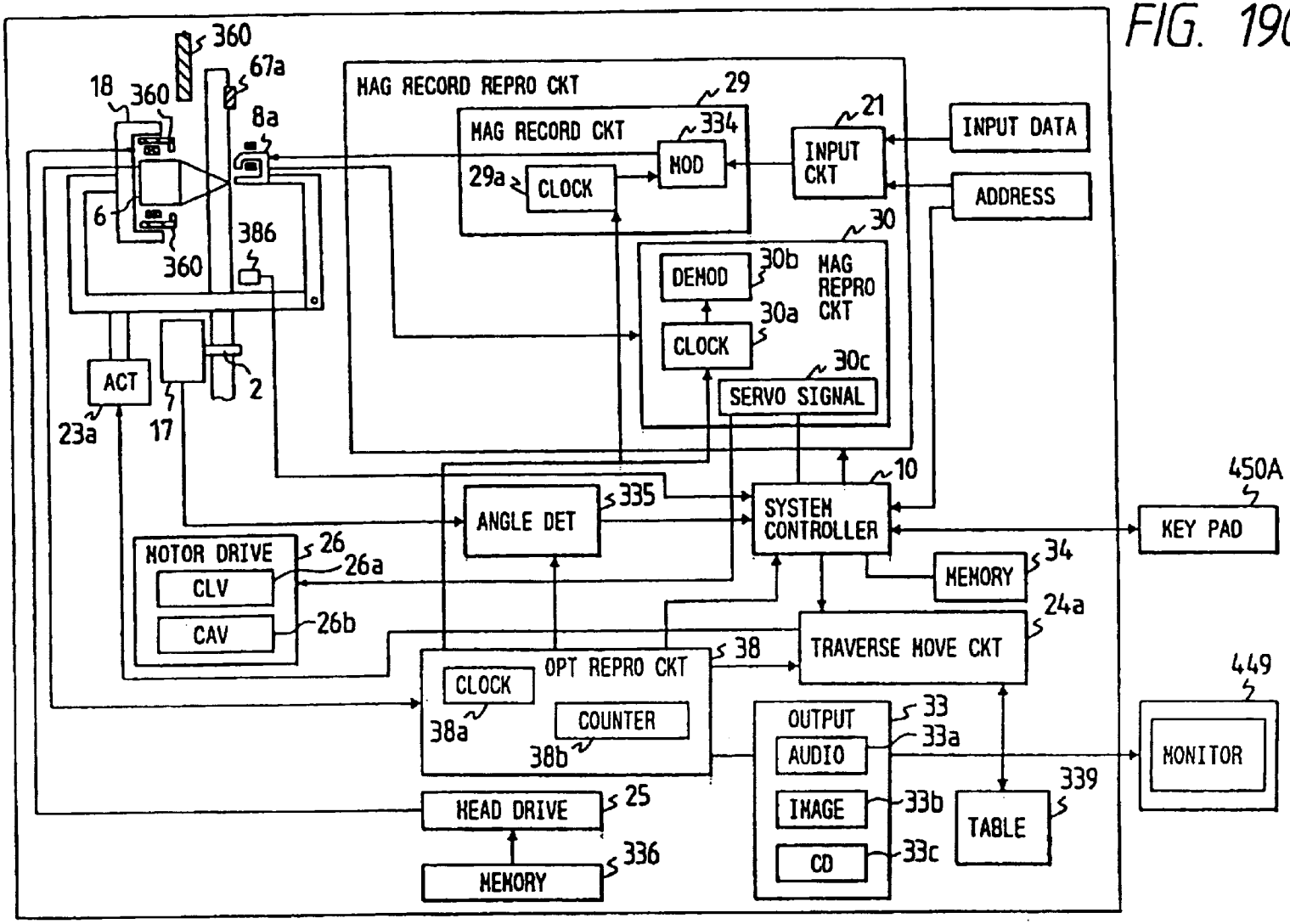

FIG. 190 is a block diagram of a recording and reproducing apparatus in the twenty-third embodiment.

Figure 191A:
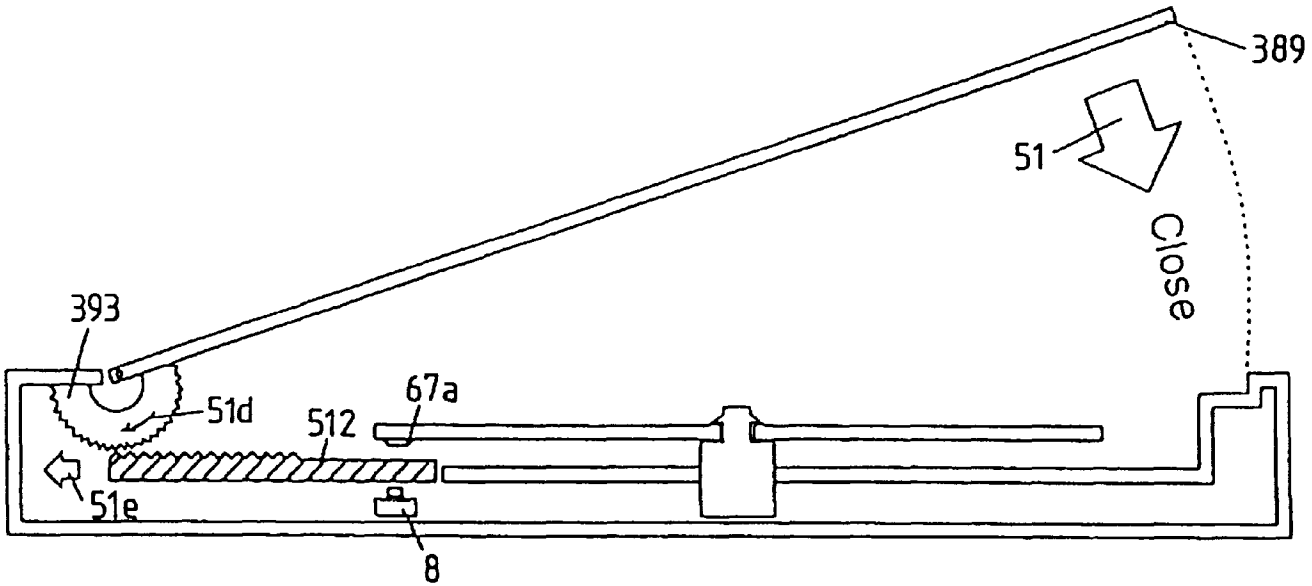

FIG. 191(a) is a sectional view of a recording and reproducing apparatus in the twenty-third embodiment.

Figure 191B:
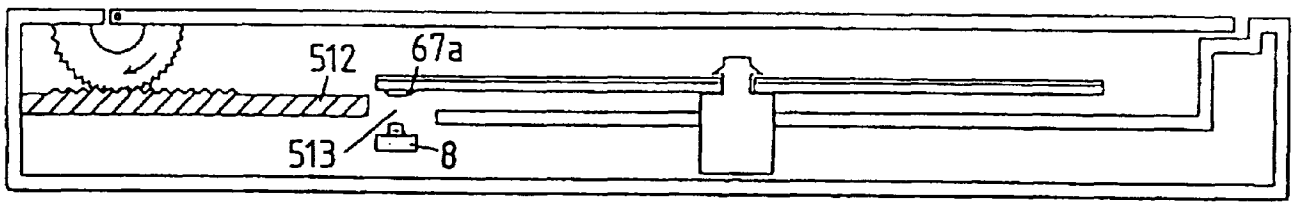

FIG. 191(b) is a sectional view of a recording and reproducing apparatus in the twenty-third embodiment.

Figures 191C, 191D, 191E:
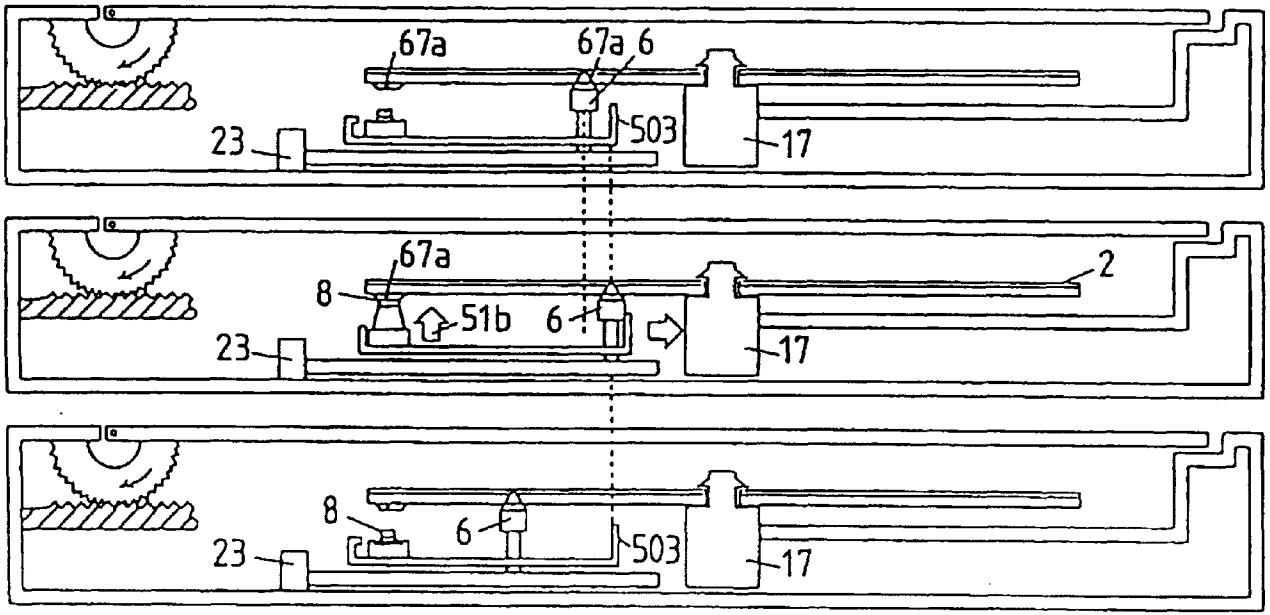

FIG. 191(c) is a sectional view of a recording and reproducing apparatus in the twenty-third embodiment.

FIG. 191(d) is a sectional view of a recording and reproducing apparatus in the twenty-third embodiment.

FIG. 191(e) is a sectional view of a recording and reproducing apparatus in the twenty-third embodiment.

Figure 192A:
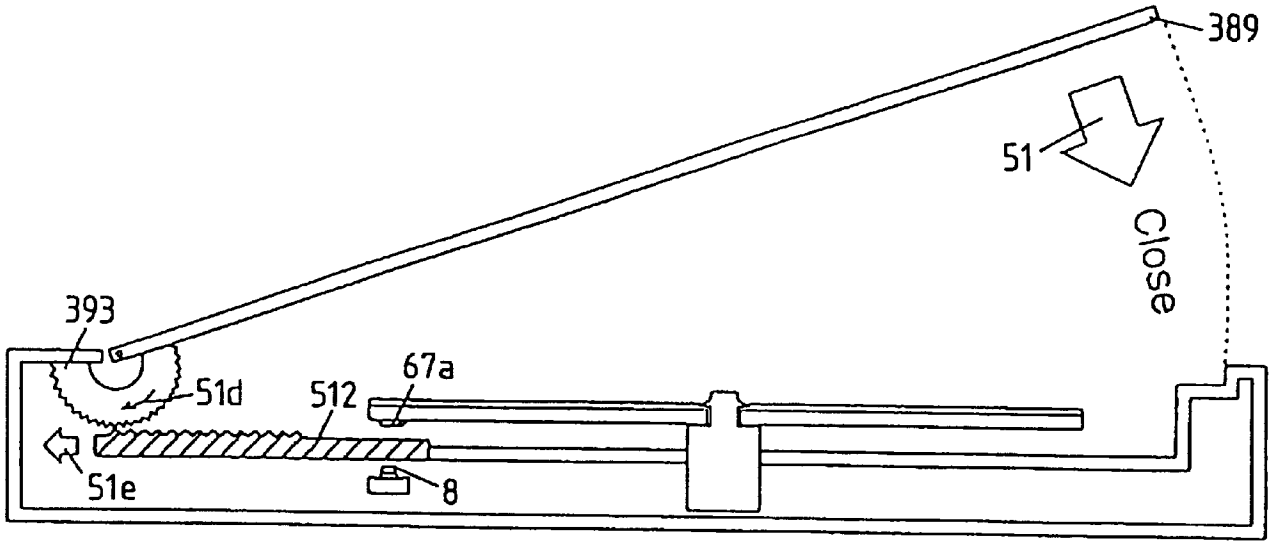

FIG. 192(a) is a sectional view of a recording and reproducing apparatus in the twenty-third embodiment.

Figure 192B:
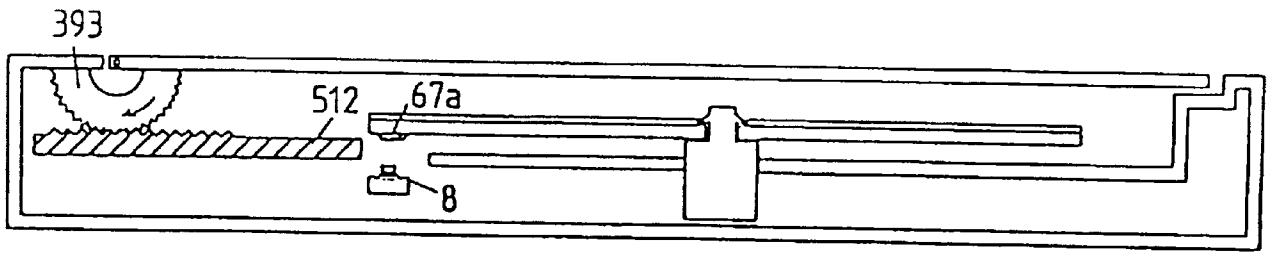

FIG. 192(b) is a sectional view of a recording and reproducing apparatus in the twenty-third embodiment.

Figures 192C, 192D, 192E:
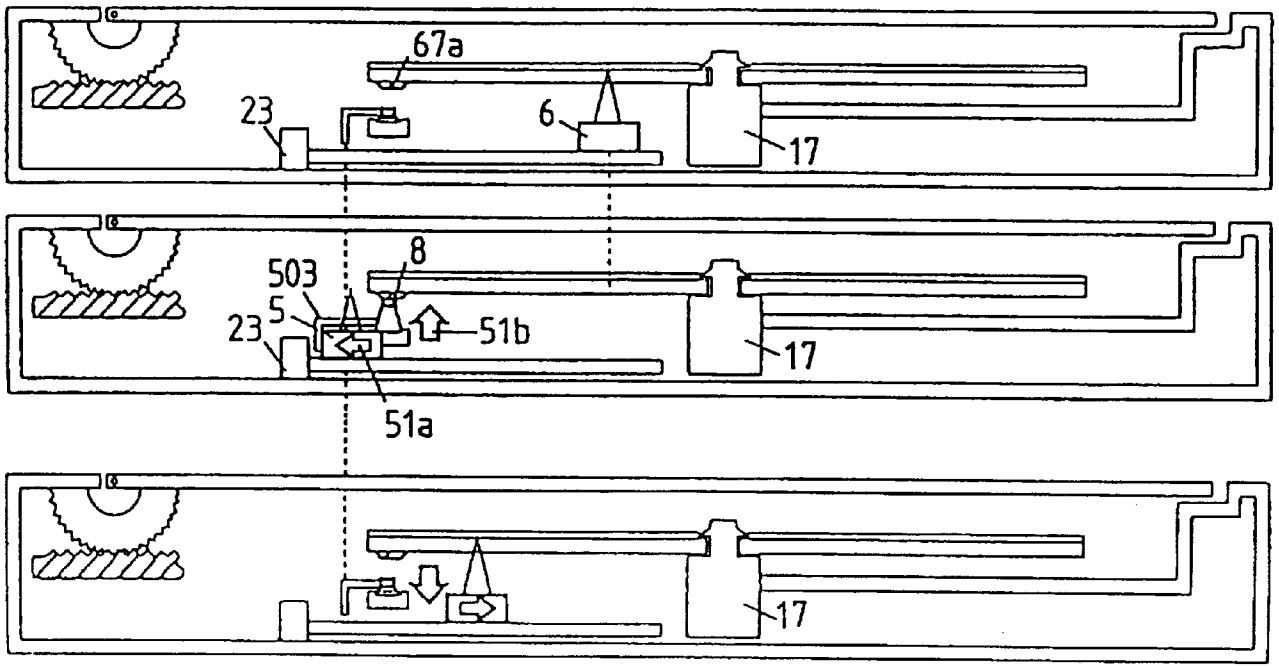

FIG. 192(c) is a sectional view of a recording and reproducing apparatus in the twenty-third embodiment.

FIG. 192(d) is a sectional view of a recording and reproducing apparatus in the twenty-third embodiment.

FIG. 192(e) is a sectional view of a recording and reproducing apparatus in the twenty-third embodiment.

Figure 193B:
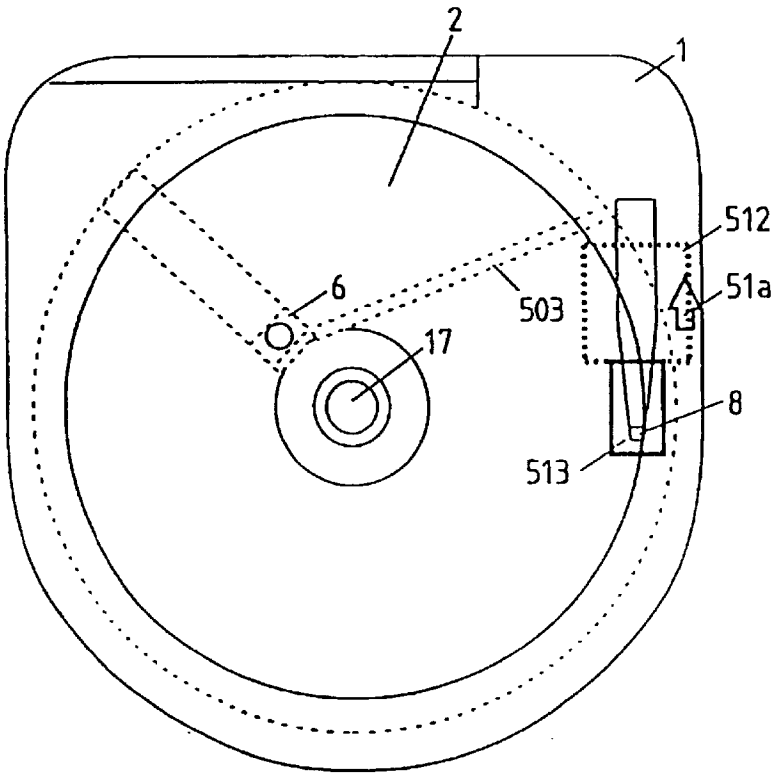
Figure 193A:
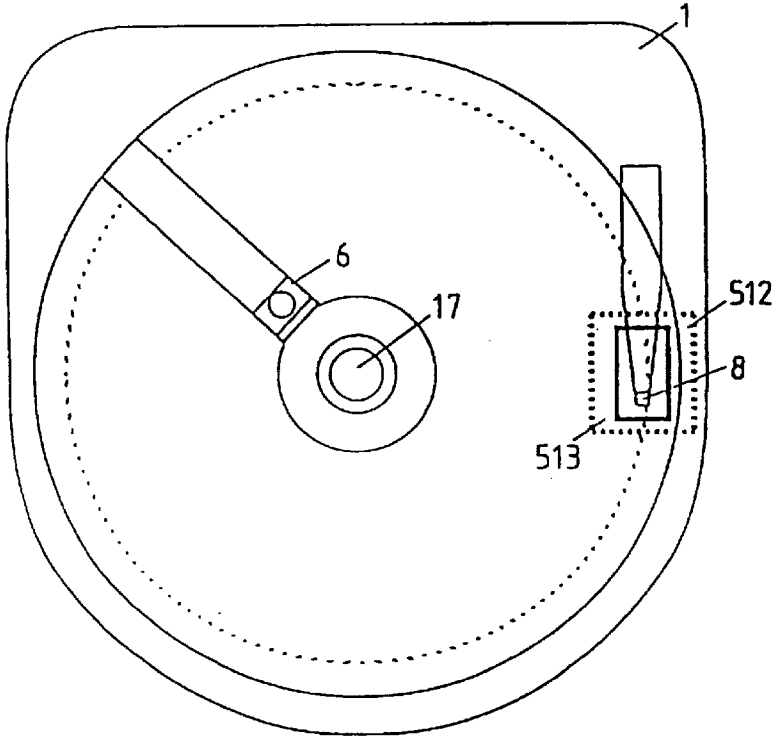

FIG. 193(a) is a top view of a recording and reproducing apparatus in the twenty-third embodiment.

FIG. 193(b) is a top view of a recording and reproducing apparatus in the twenty-third embodiment.

Figure 194A:
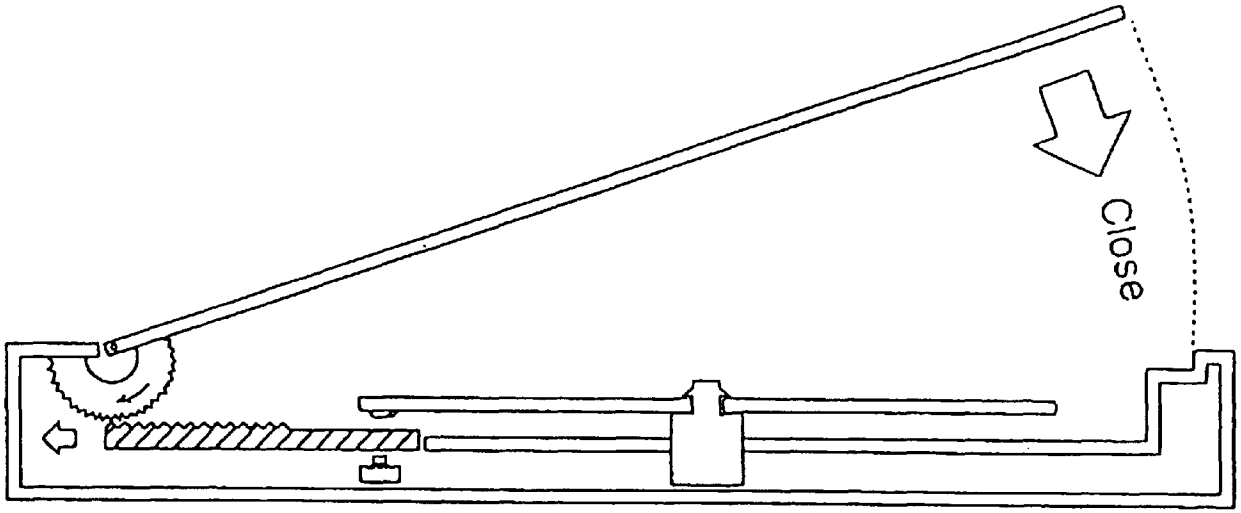

FIG. 194(a) is a sectional view of a recording and reproducing apparatus in the twenty-third embodiment.

Figure 194B:
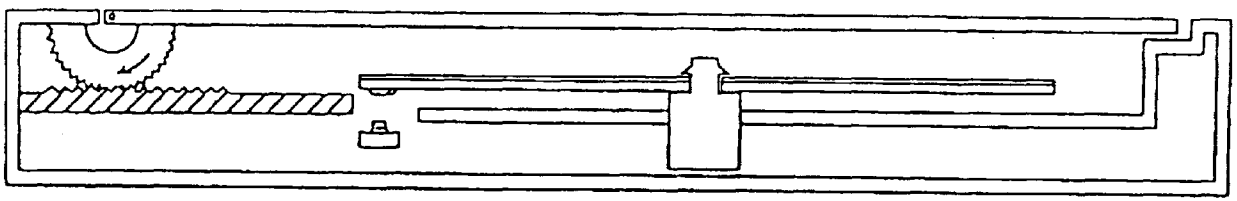

FIG. 194(b) is a sectional view of a recording and reproducing apparatus in the twenty-third embodiment.

Figures 194C, 194D, 194E:
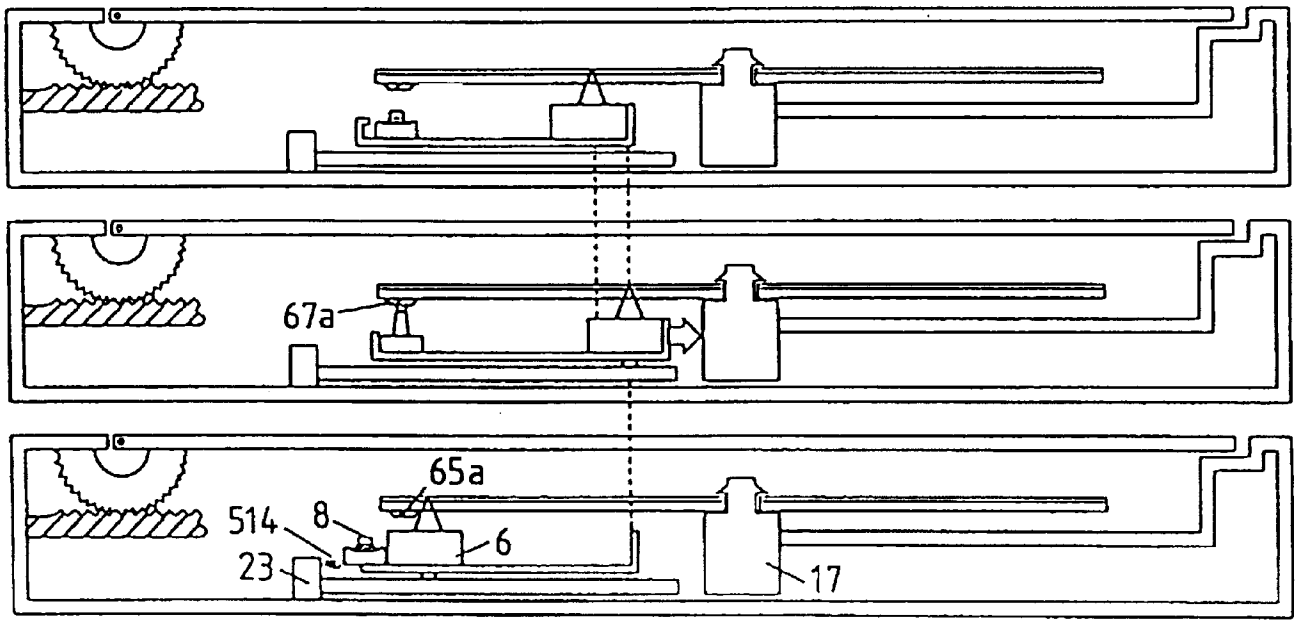

FIG. 194(c) is a sectional view of a recording and reproducing apparatus in the twenty-third embodiment.

FIG. 194(d) is a sectional view of a recording and reproducing apparatus in the twenty-third embodiment.

FIG. 194(e) is a sectional view of a recording and reproducing apparatus in the twenty-third embodiment.

Figures 195A, 195B:
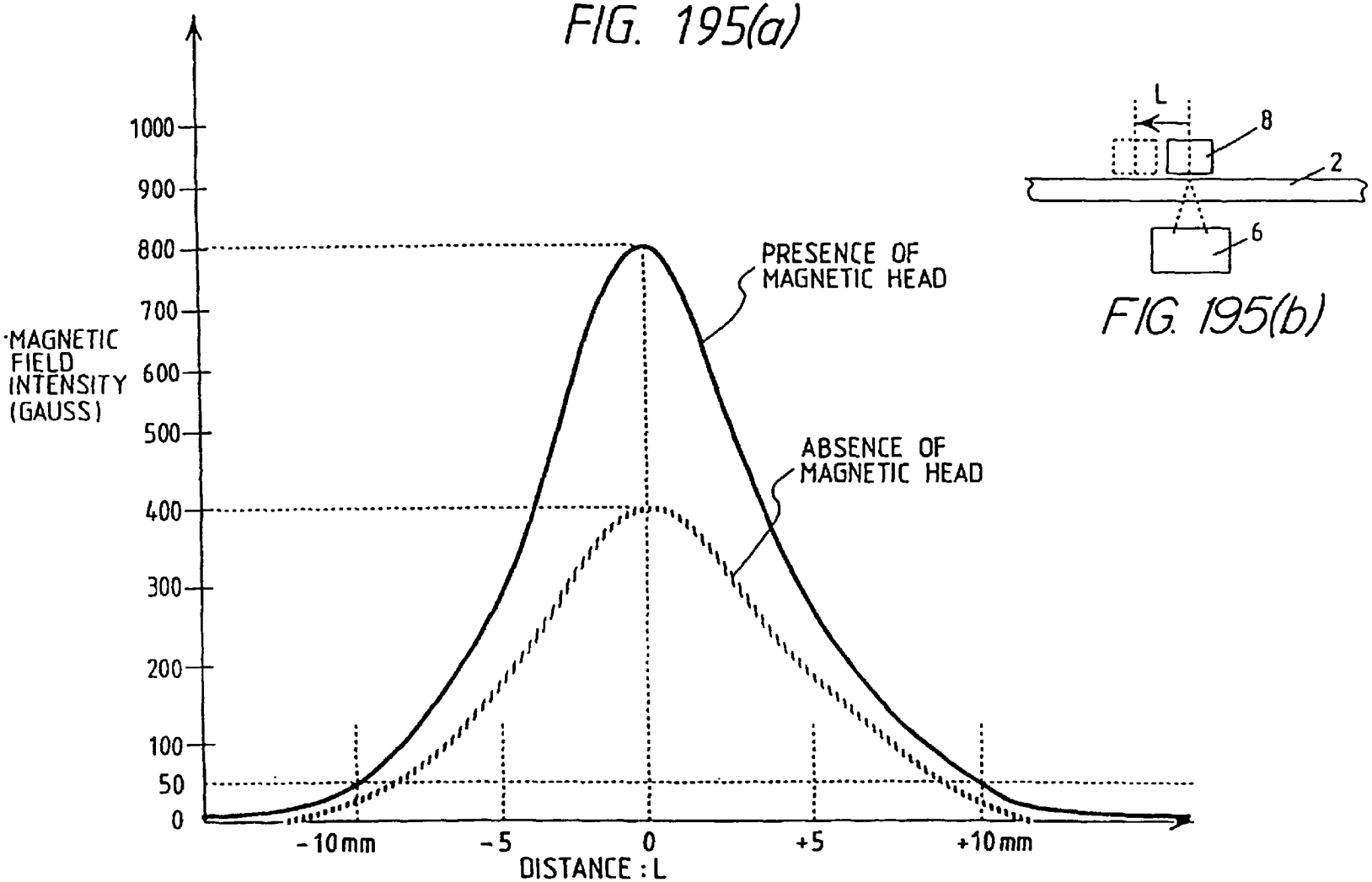

FIGS. 195(a) and 195(b) are a diagram of the relation between a distance from a magnetic head and the intensity of a de magnetic field.

Figure 196A:
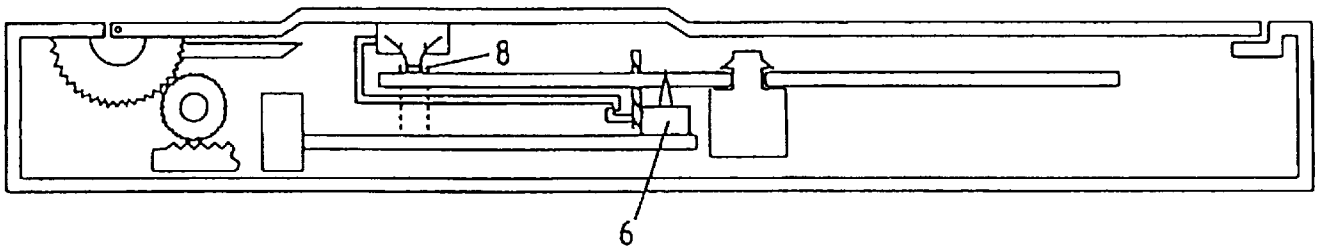

FIG. 196(a) is a sectional view of a recording and reproducing apparatus in the twenty-third embodiment.

Figure 196B:
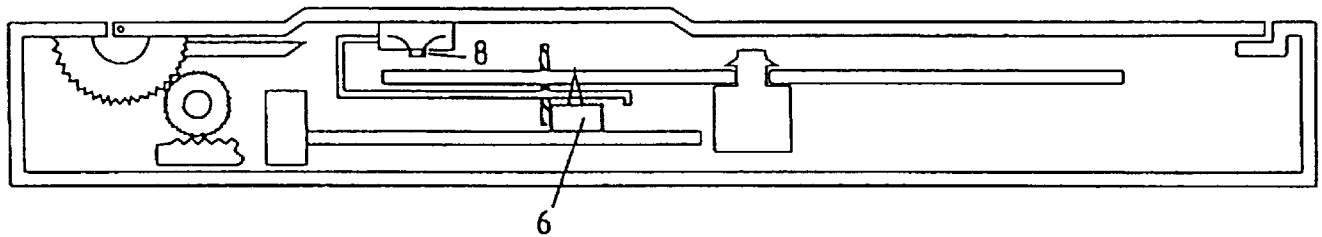

FIG. 196(b) is a sectional view of a recording and reproducing apparatus in the twenty-third embodiment.

Figure 196C:
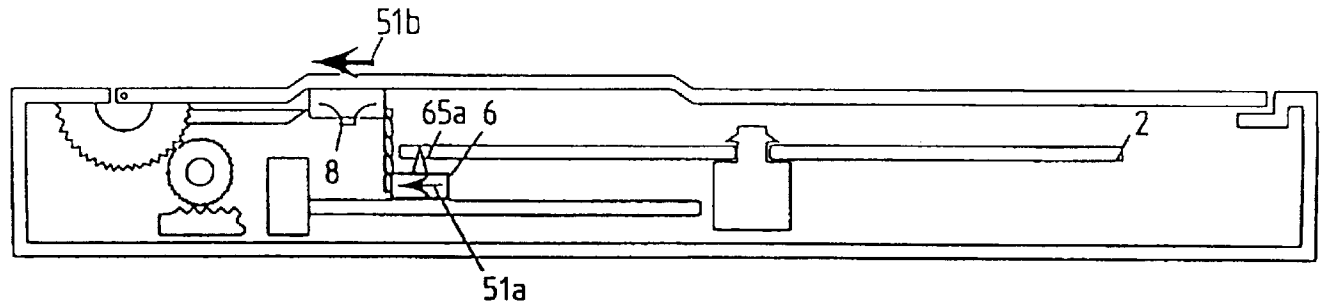

FIG. 196(c) is a sectional view of a recording and reproducing apparatus in the twenty-third embodiment.

Figure 197:
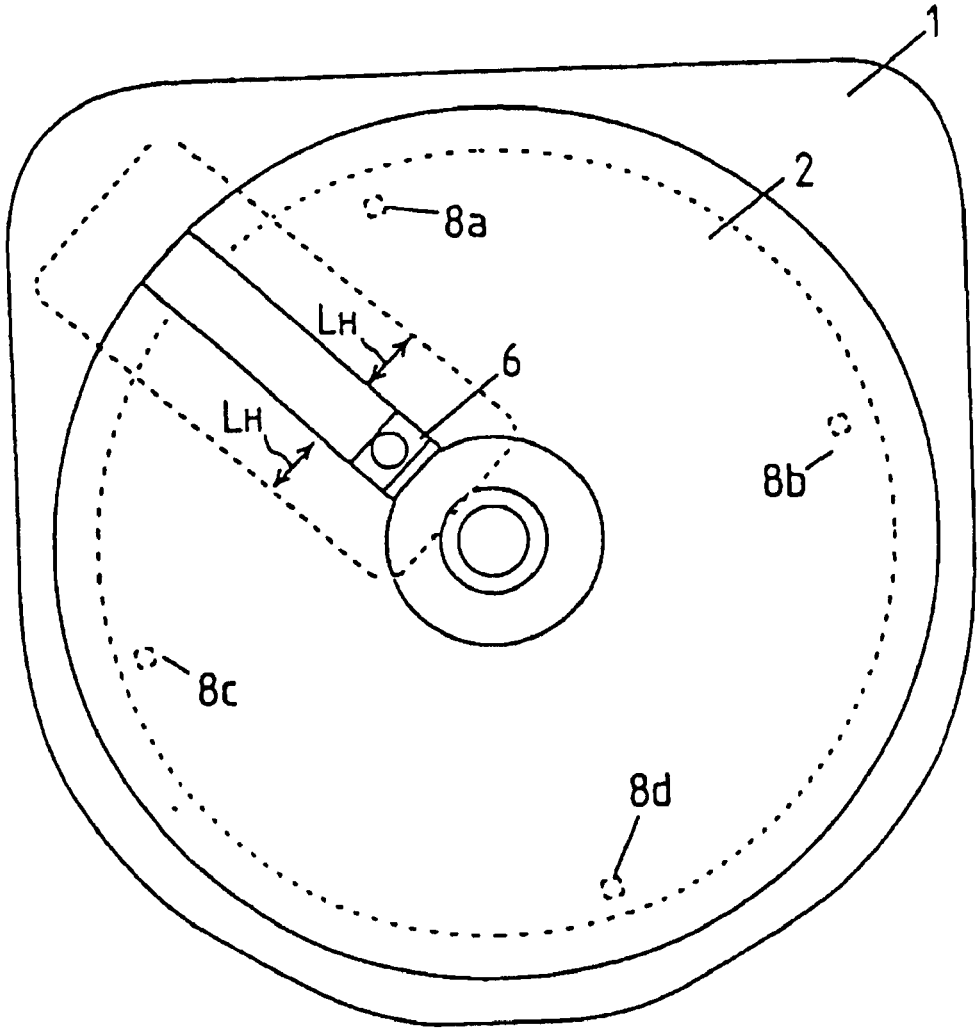

FIG. 197 is a top view of a recording and reproducing apparatus in the twenty-third embodiment.

FIG. 198(a) is a sectional view of a magnetic head in the twenty-third embodiment.

FIG. 198(b) is a top view of a magnetic head in the twenty-third embodiment.

FIG. 198(c) is a sectional view of a magnetic head in the twenty-third embodiment.

FIG. 198(d) is a top view of a magnetic head in the twenty-third embodiment.

Figures 199A, 199B, 199C:
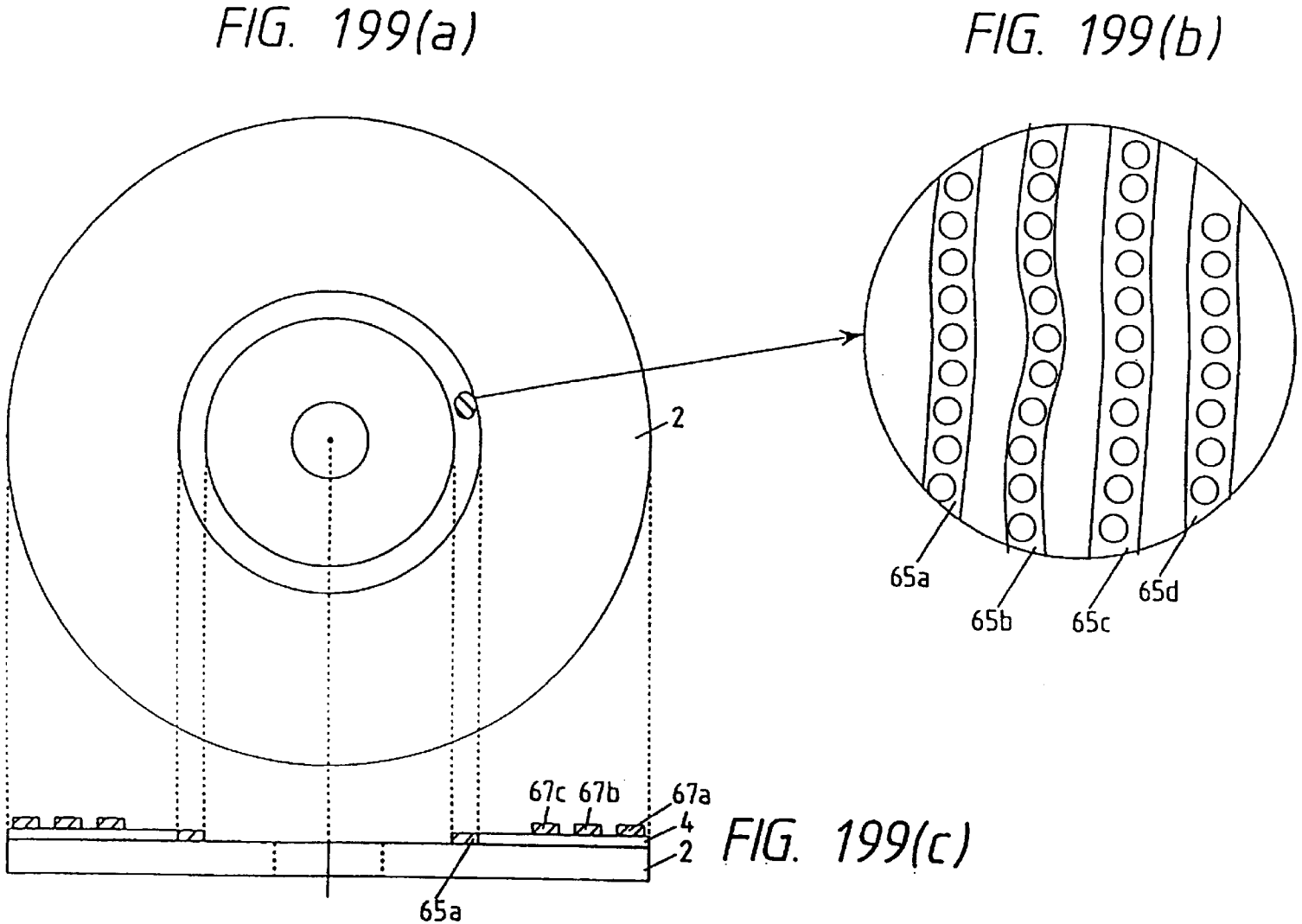

FIG. 199(a) is a top view of a recording medium in the twenty-third embodiment.

FIG. 199(b) is a top view of a recording medium in the twenty-third embodiment.

FIG. 199(c) is a sectional view of a recording medium in the twenty-third embodiment.

Figure 200:
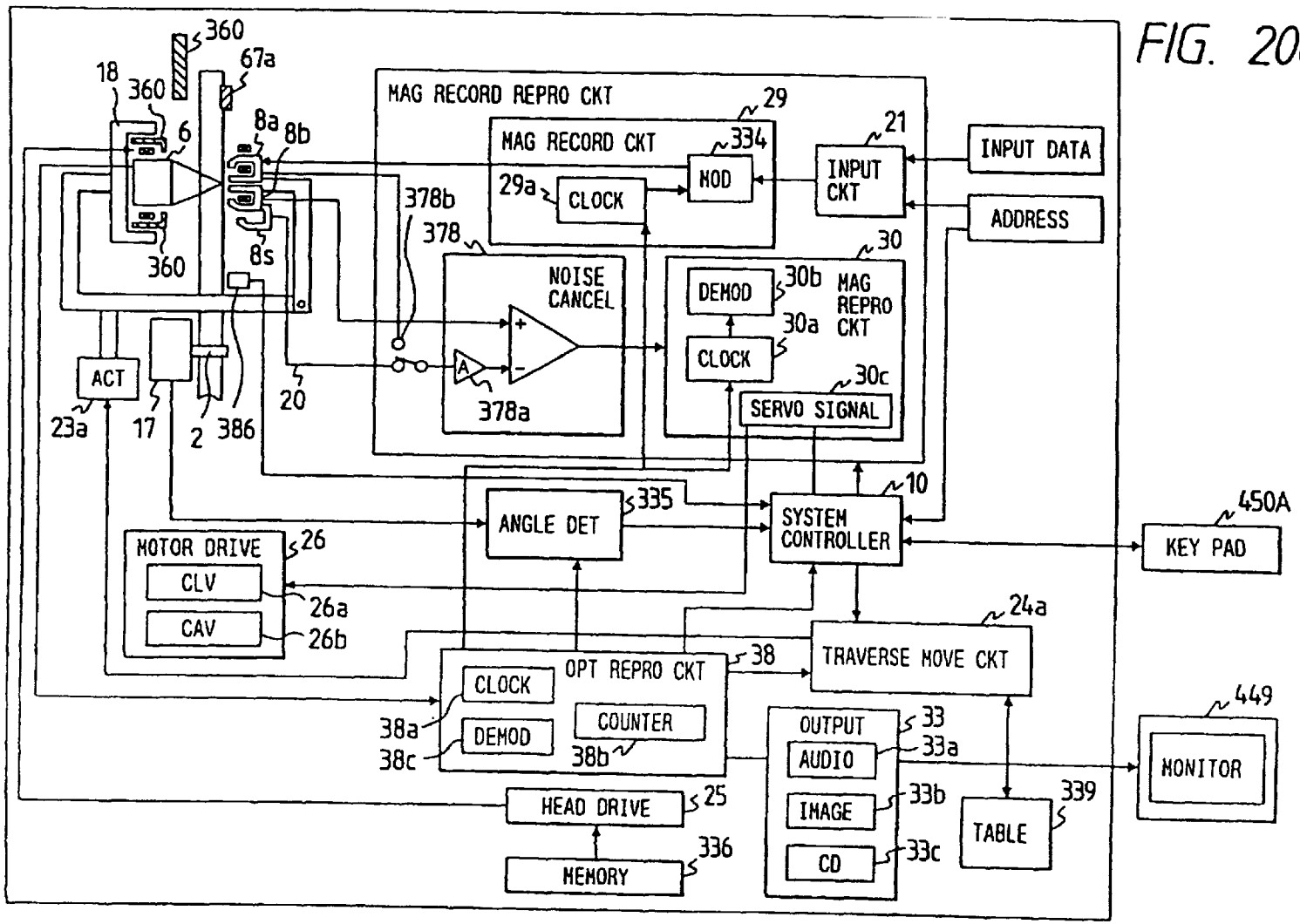

FIG. 200 is a block diagram of a recording and reproducing apparatus in the twenty-third embodiment.

Figure 201A:
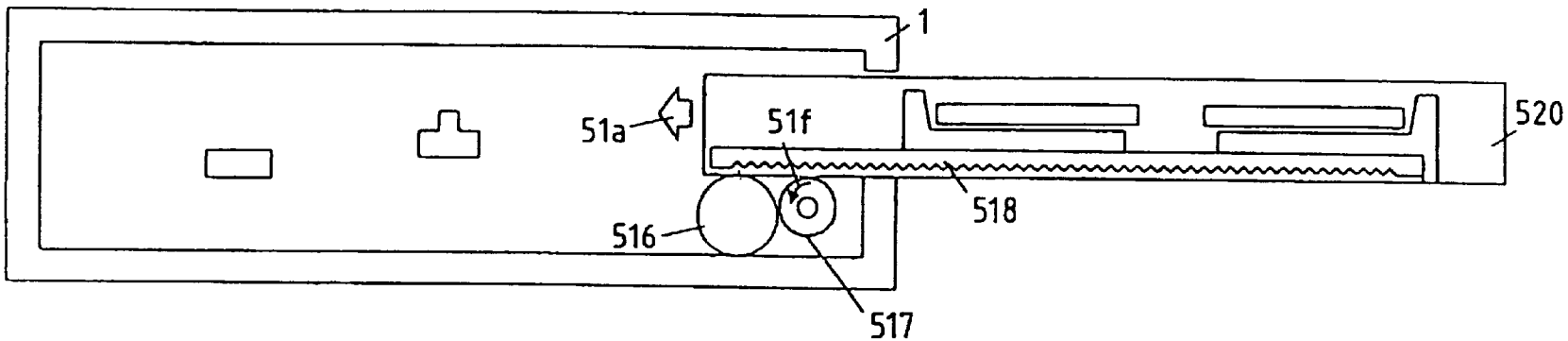

FIG. 201(a) is a sectional view of a recording and reproducing apparatus in the twenty-third embodiment.

Figure 201B:
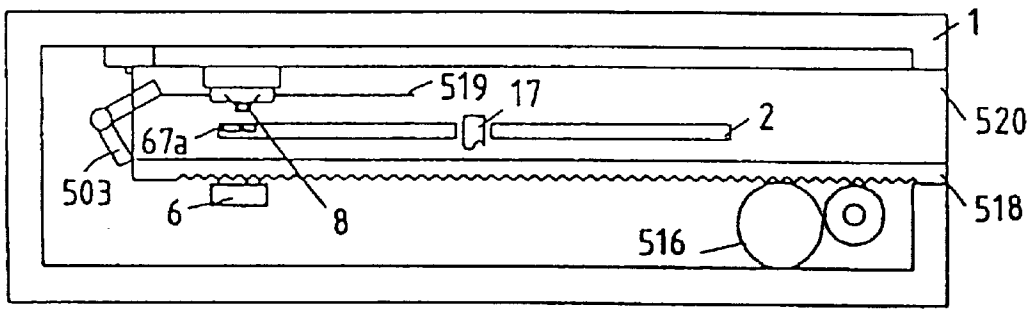

FIG. 201(b) is a sectional view of a recording and reproducing apparatus in the twenty-third embodiment.

Figure 201C:
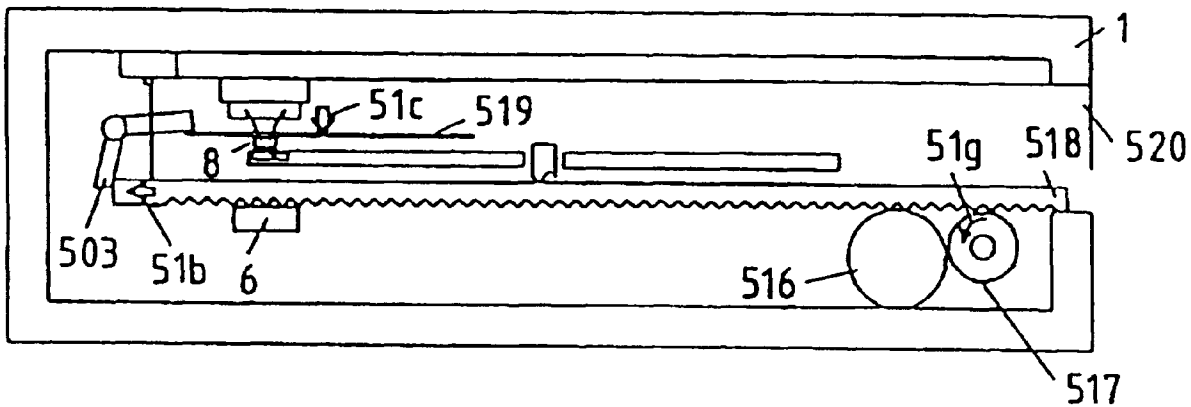

FIG. 201(c) is a sectional view of a recording and reproducing apparatus in the twenty-third embodiment.

Figure 201D:
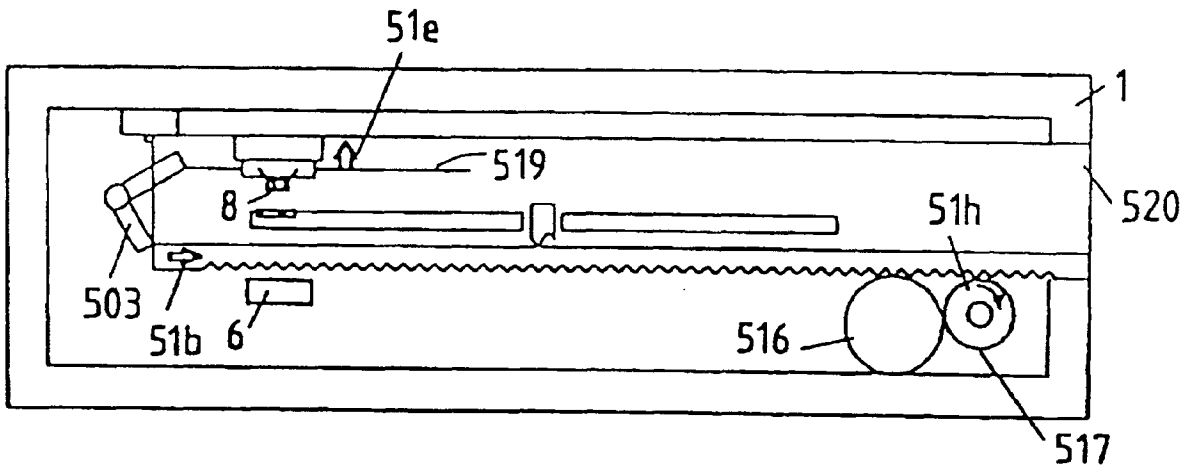

FIG. 201(d) is a sectional view of a recording and reproducing apparatus in the twenty-third embodiment.

Figure 202:
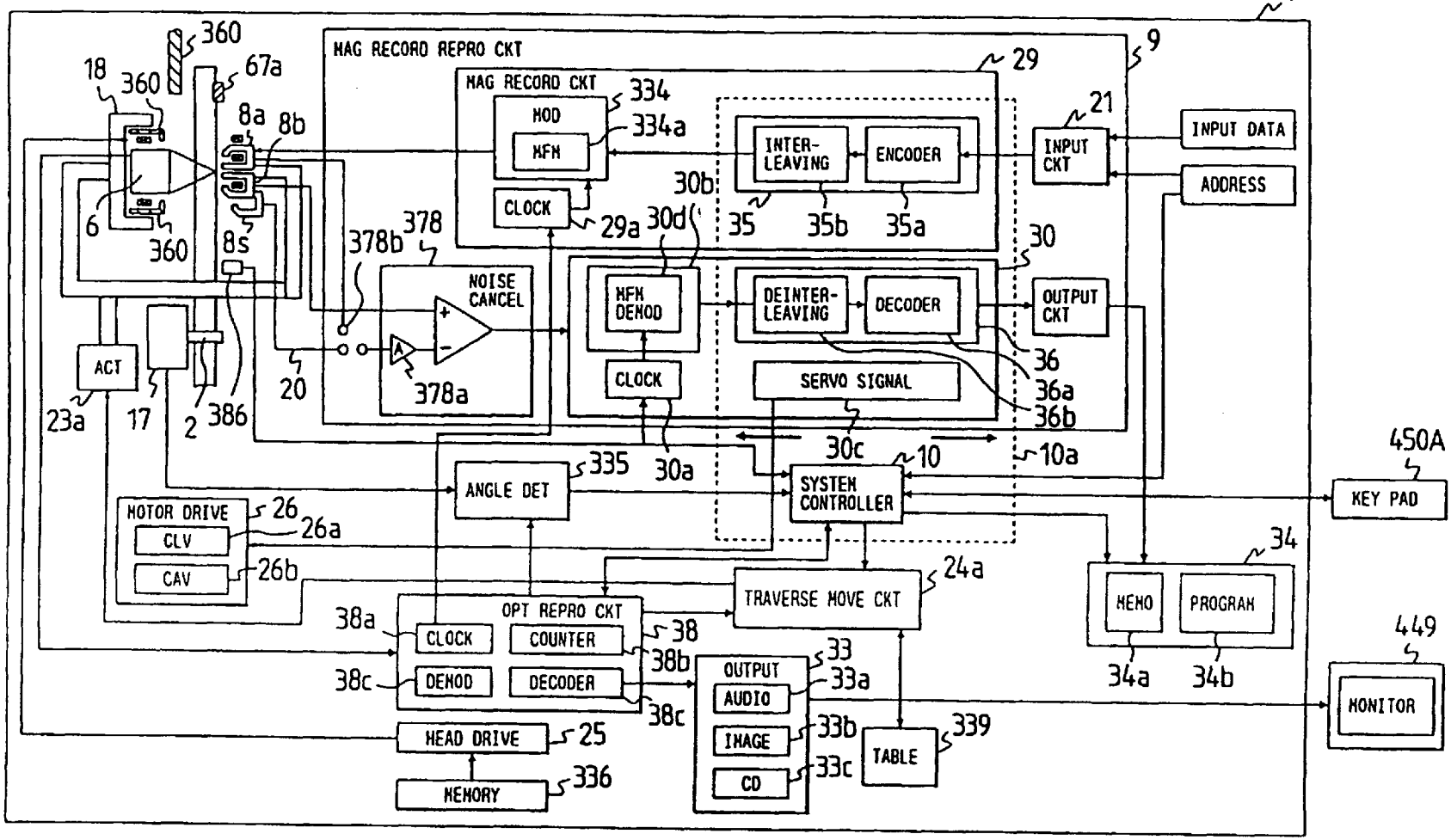

FIG. 202 is a block diagram of a recording and reproducing apparatus in the first embodiment.

Figures 203A, 203B:
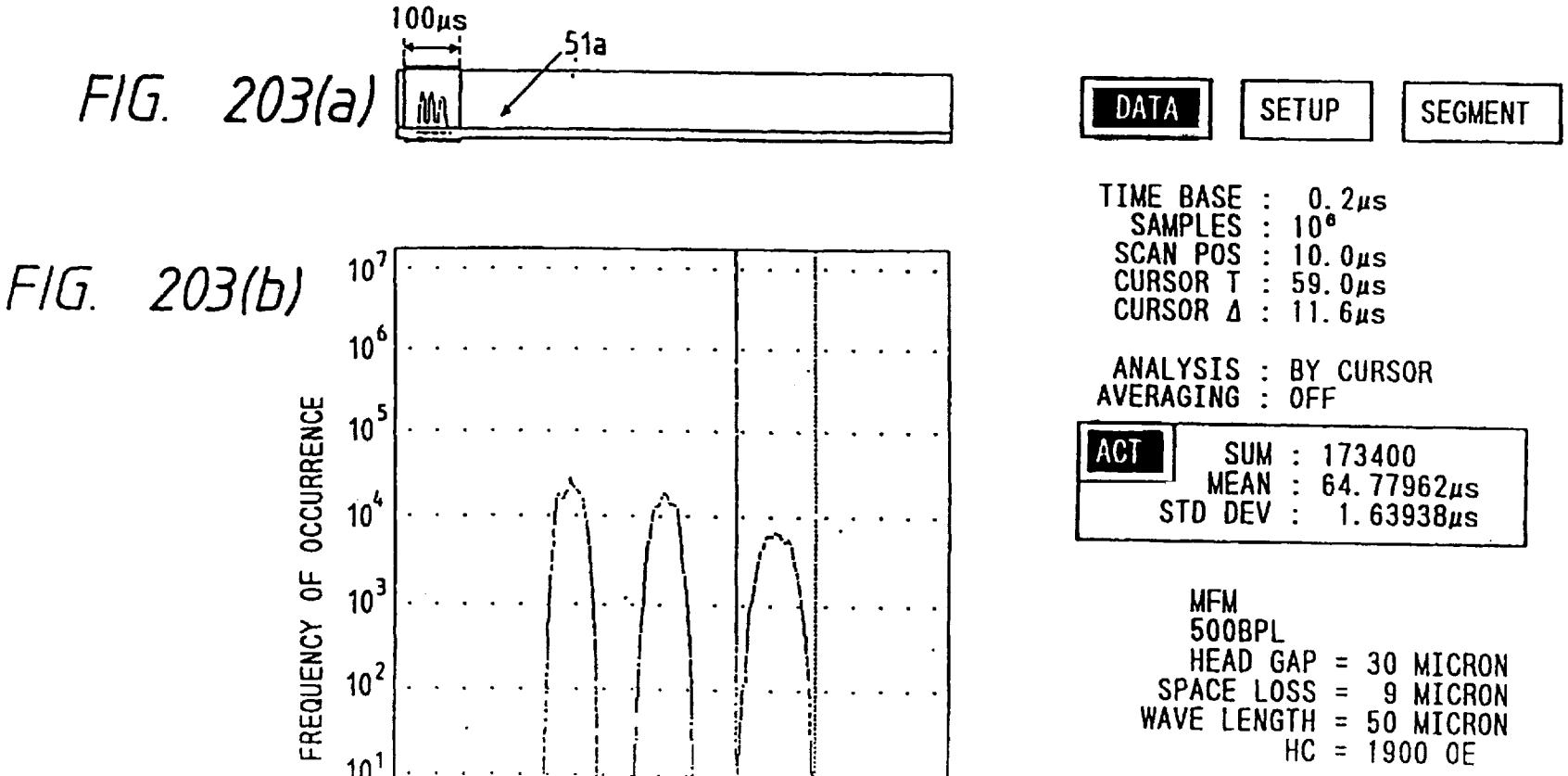

FIG. 203(a) is a diagram of the distribution of the frequencies of occurrence of periods T, 1.5T, and 2T in the first embodiment.

FIG. 203(b) is a diagram of the distribution of the frequencies of occurrence of periods T, 1.5T, and 2T in the first embodiment.

Figure 204:
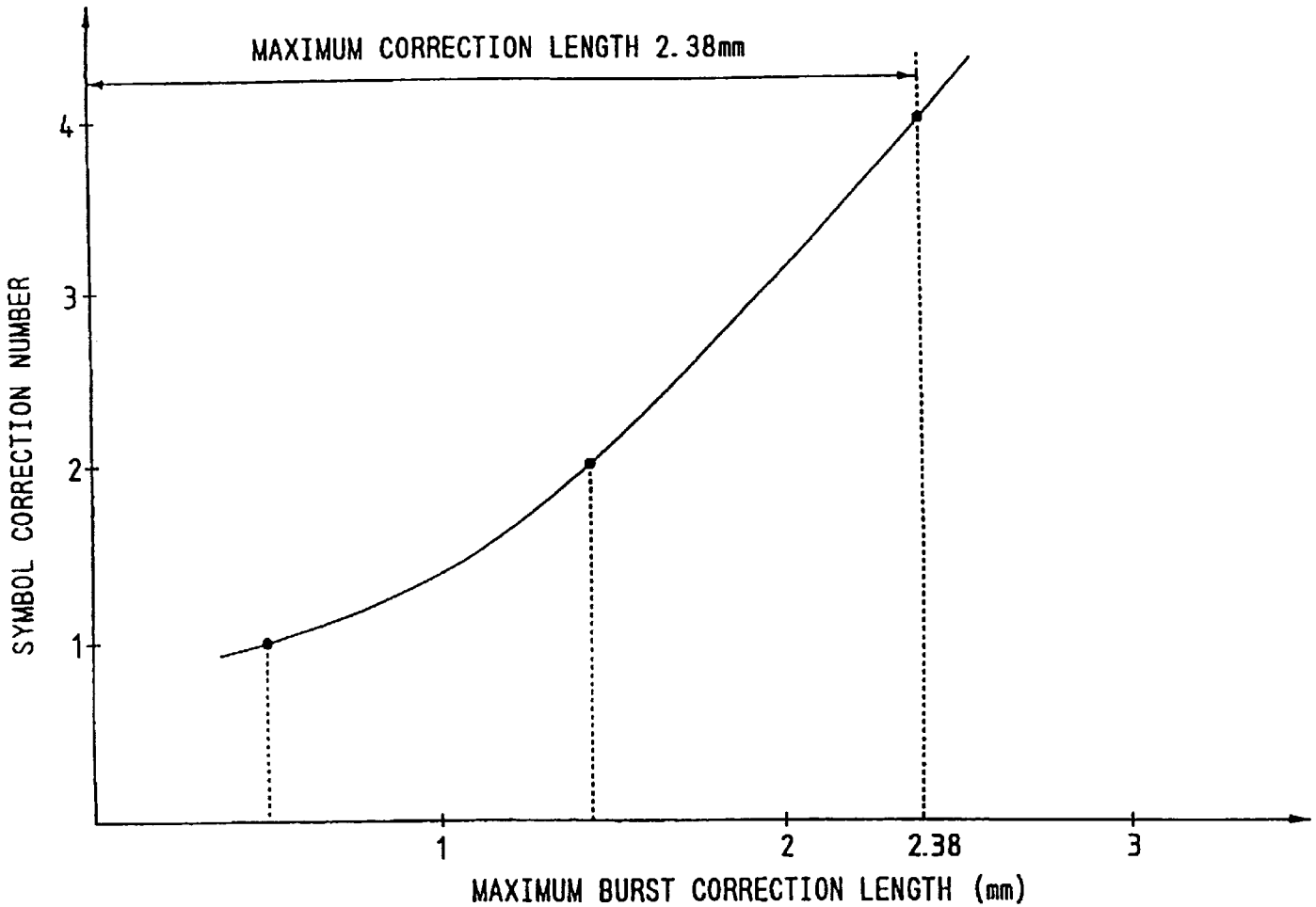

FIG. 204 is a diagram of the relation between the maximum burst correction length and the correction symbol number according to the CD standards.

Figure 205:
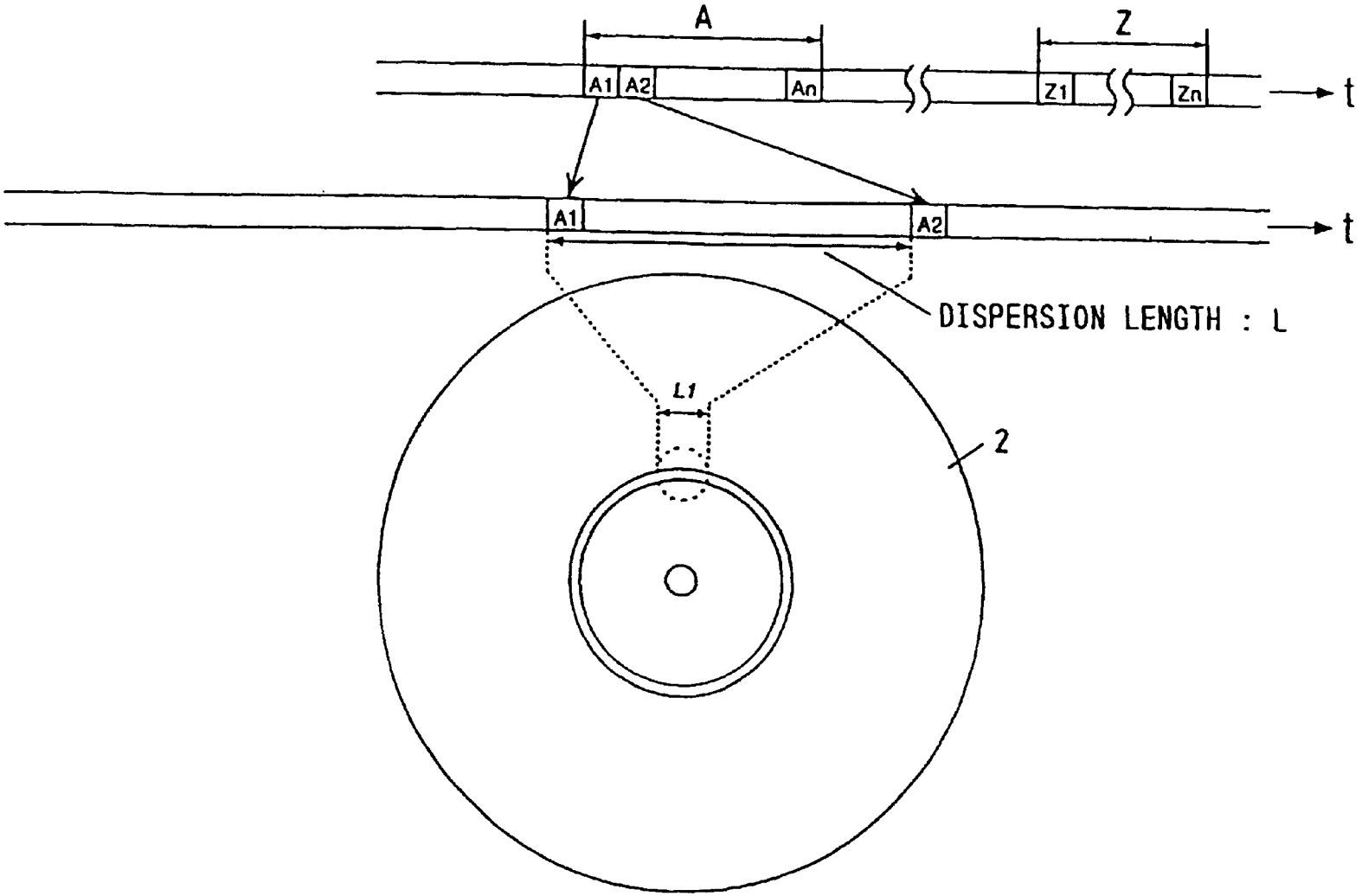

FIG. 205 is a diagram of the dispersion length of data on a recording medium in the first embodiment.

Figure 206:
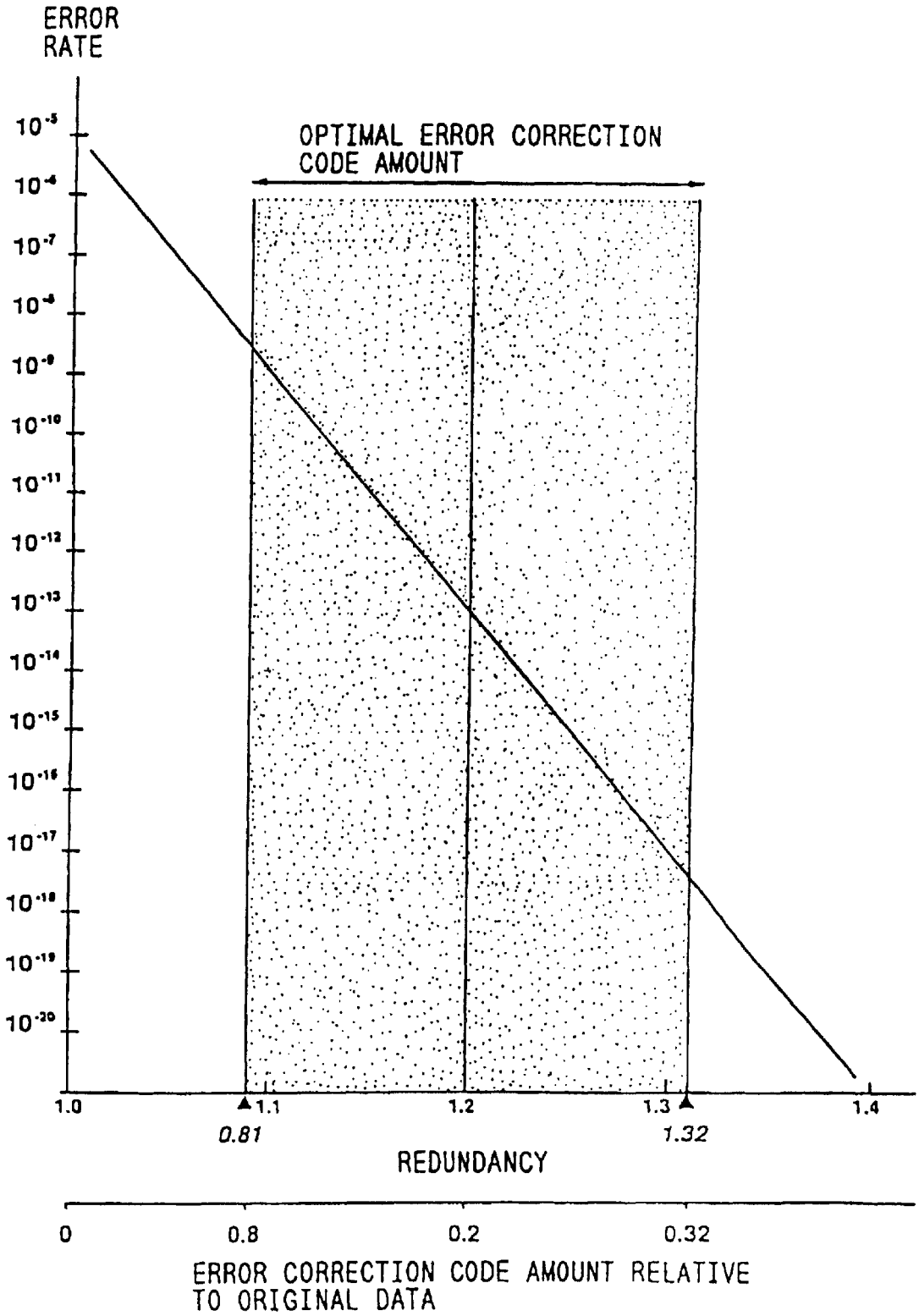

FIG. 206 is a diagram of the relation between the data amount of an error correction code and the error rate in the first embodiment.

Figure 207A:
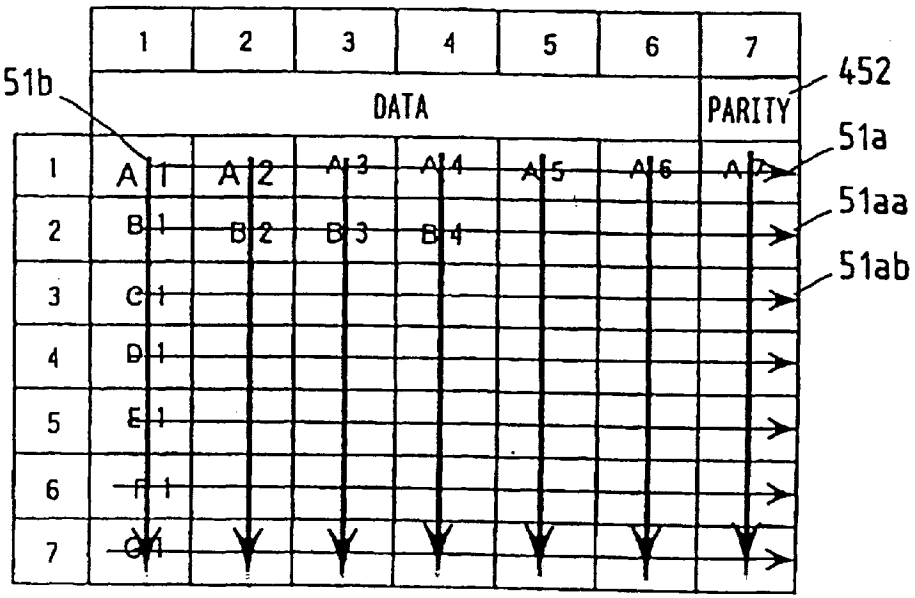

FIG. 207(a) is a diagram of arrangement conversion related to interleaving in the first embodiment.

Figure 207B:
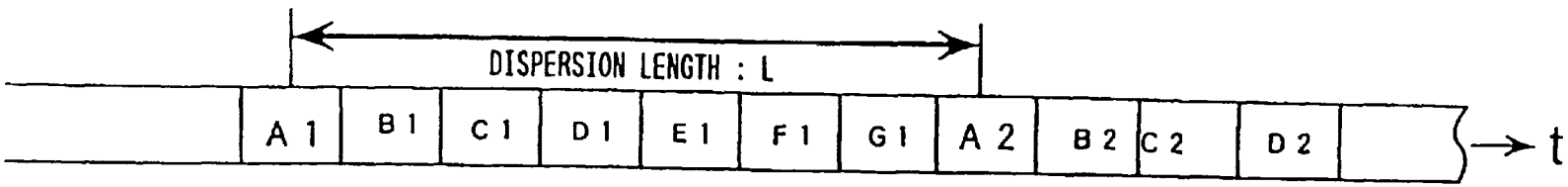

FIG. 207(b) is a diagram of the data dispersion length related to interleaving in the first embodiment.

Figure 208:
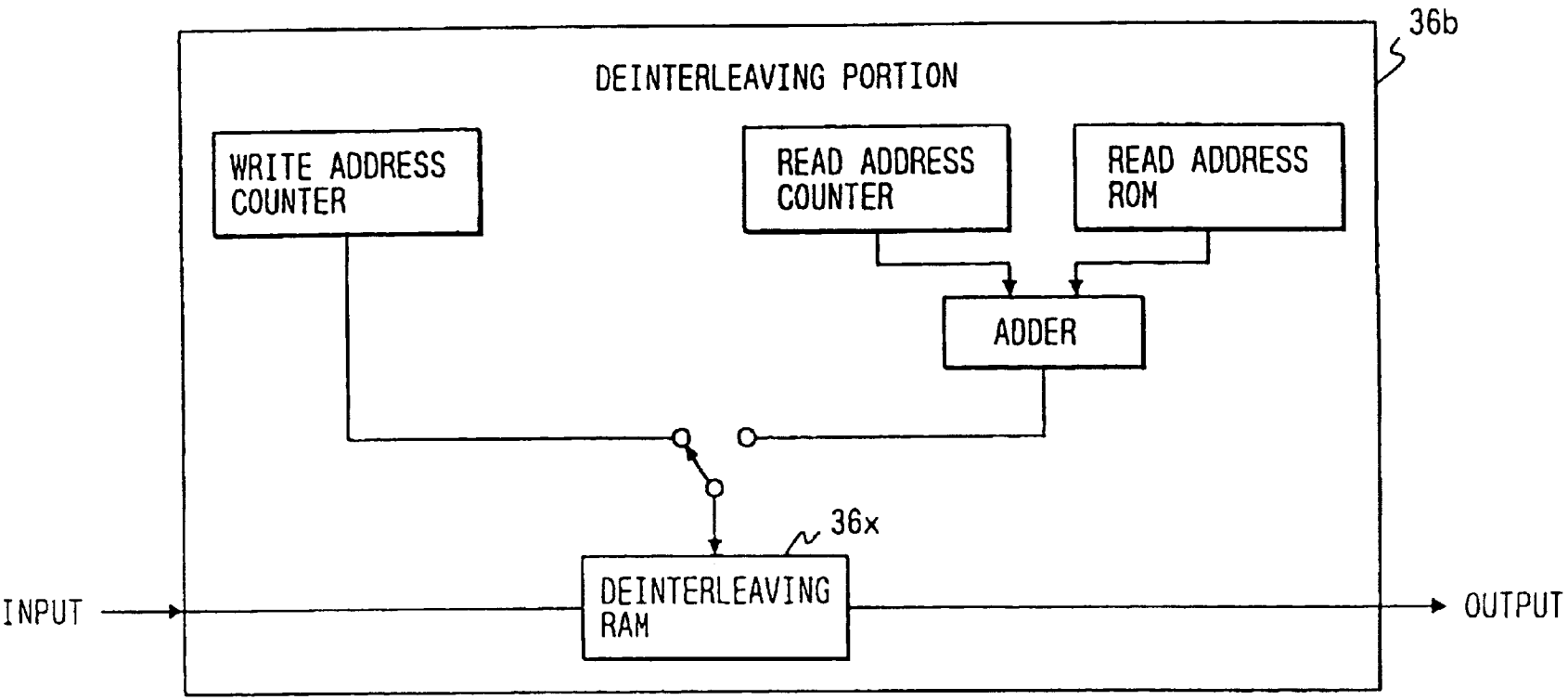

FIG. 208 is a block diagram of a de-interleaving portion in the first embodiment.

Figure 209A:
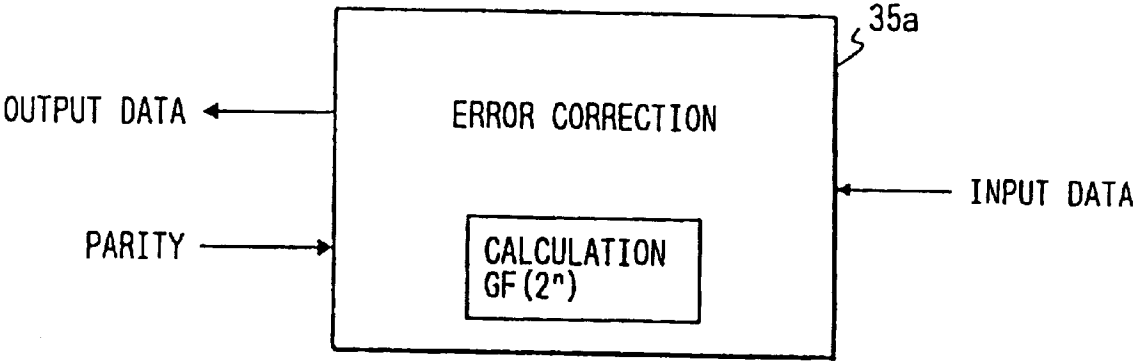

FIG. 209(a) is a block diagram of an ECC encoder in the first embodiment.

Figure 209B:
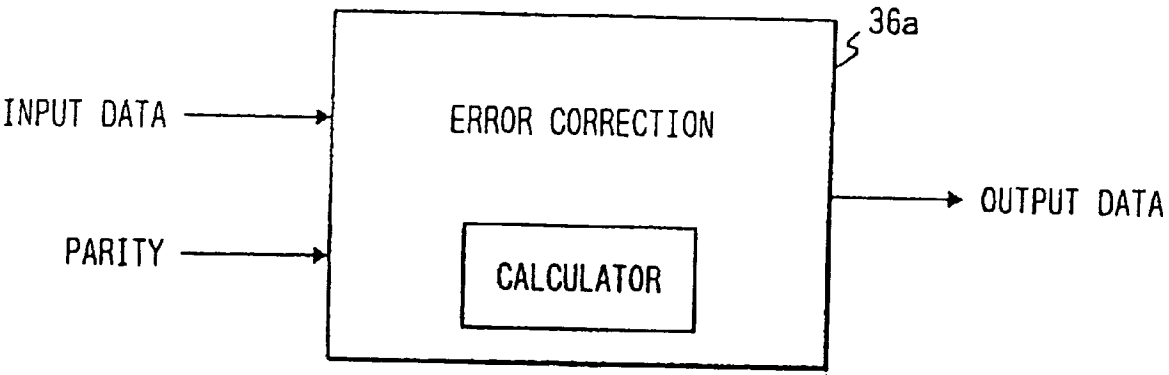

FIG. 209(b) is a block diagram of an ECC decoder in the first embodiment.

Figure 210:
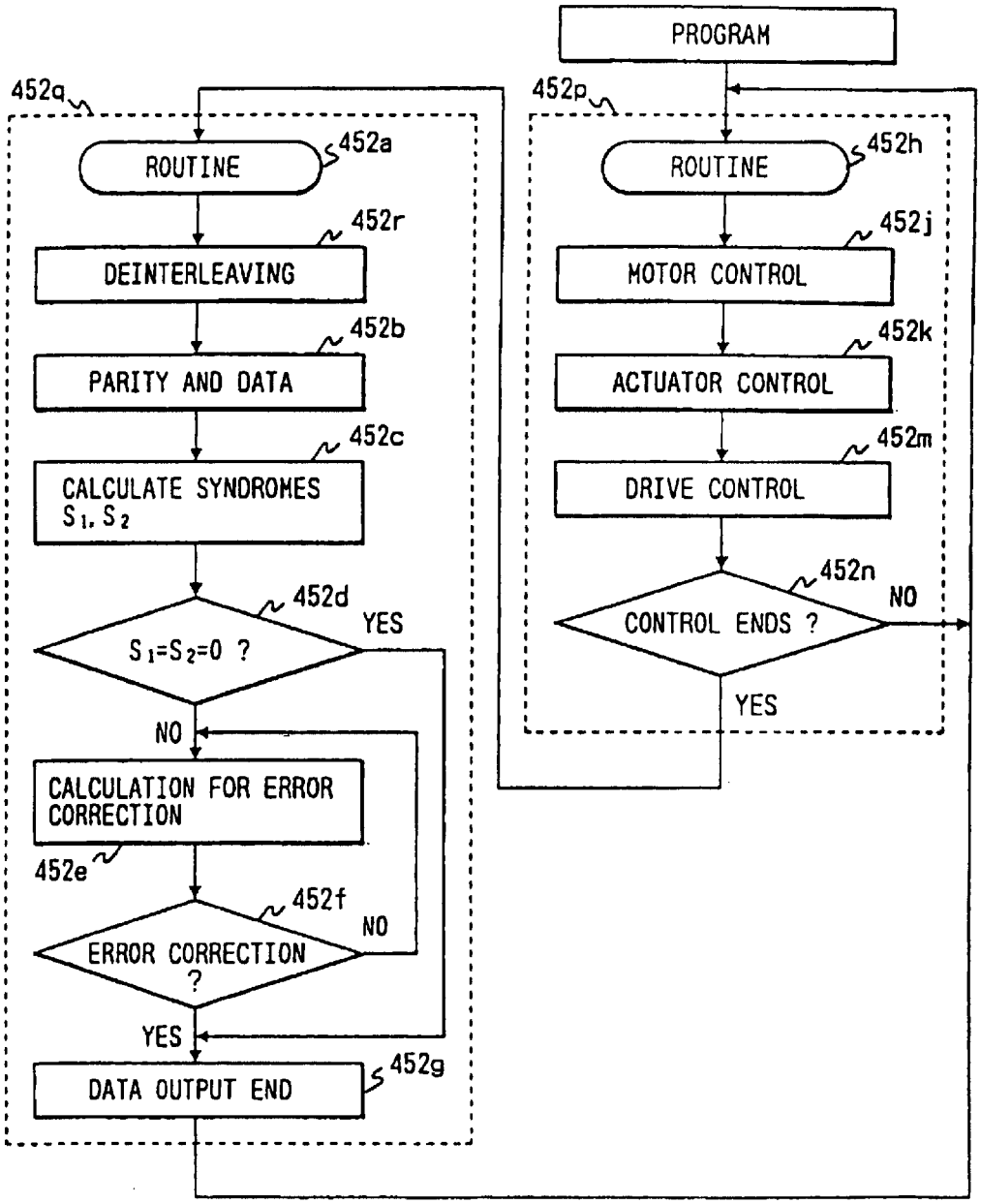

FIG. 210 is a flowchart of a program in the first embodiment.

Figure 211:
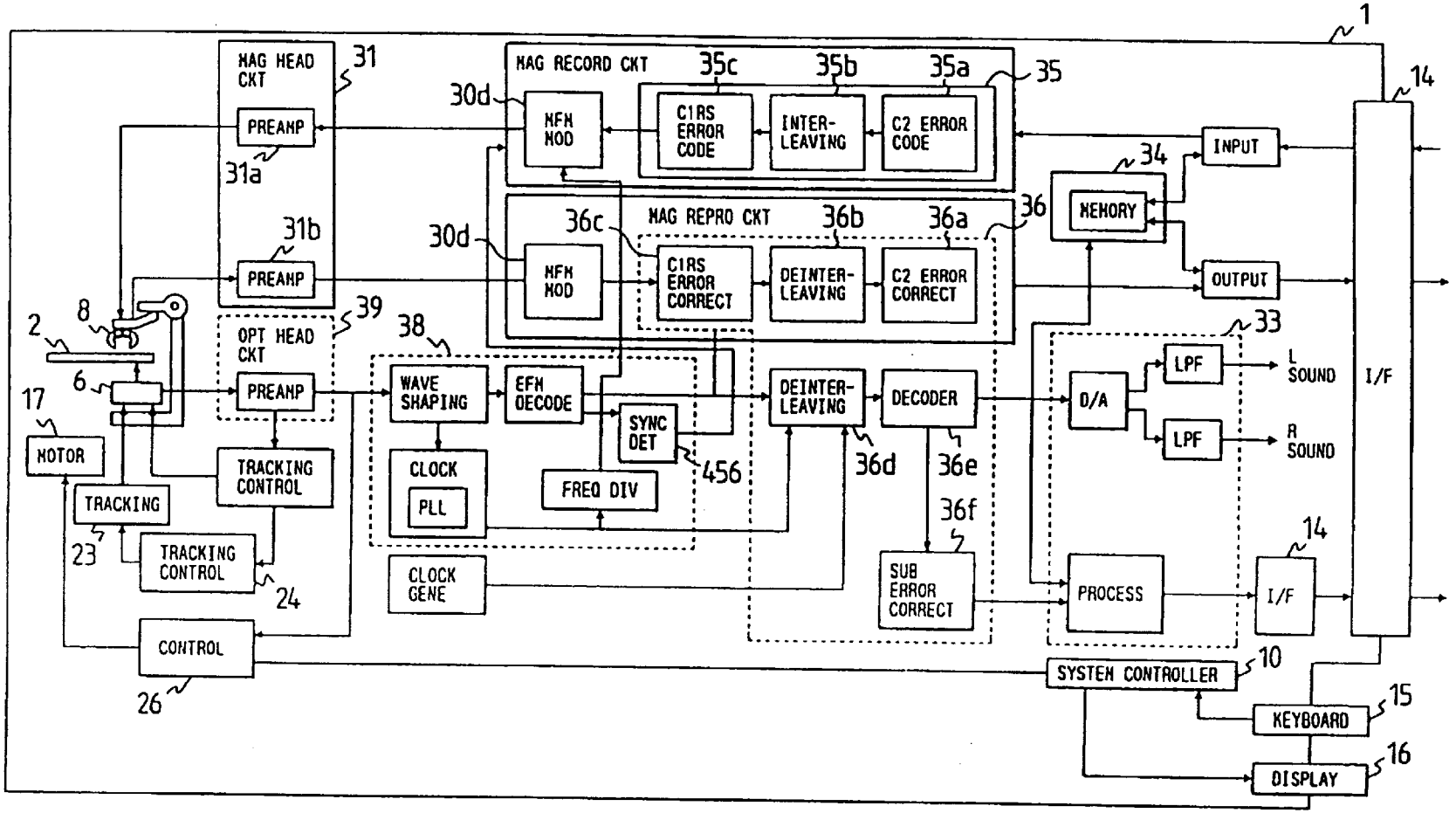

FIG. 211 is a block diagram of a recording and reproducing apparatus in the first embodiment.

Figure 212A:
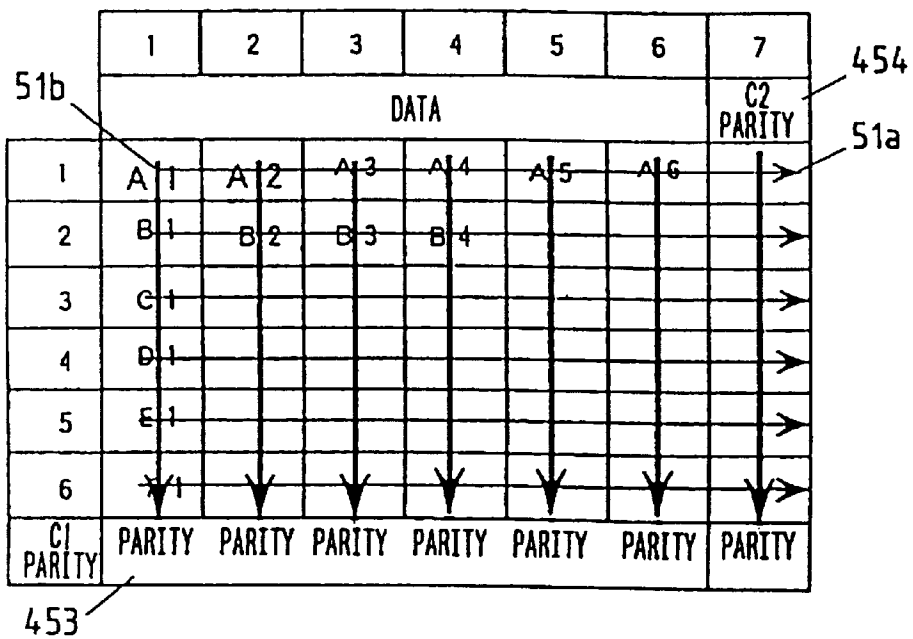

FIG. 212(a) is a diagram of arrangement conversion related to interleaving in the first embodiment.

Figure 212B:
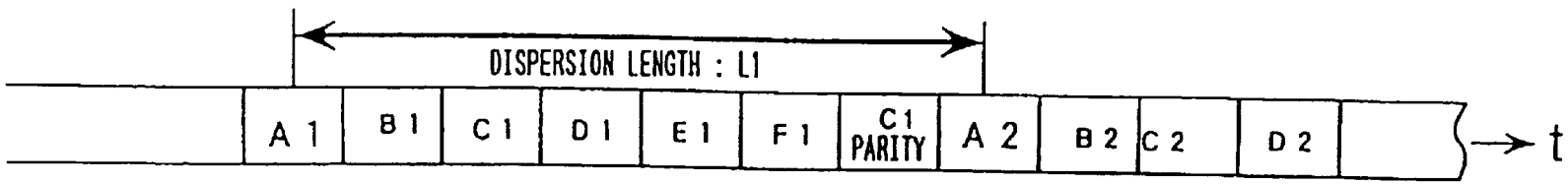

FIG. 212(b) is a diagram of the data dispersion length related to interleaving in the first embodiment.

Figure 213:
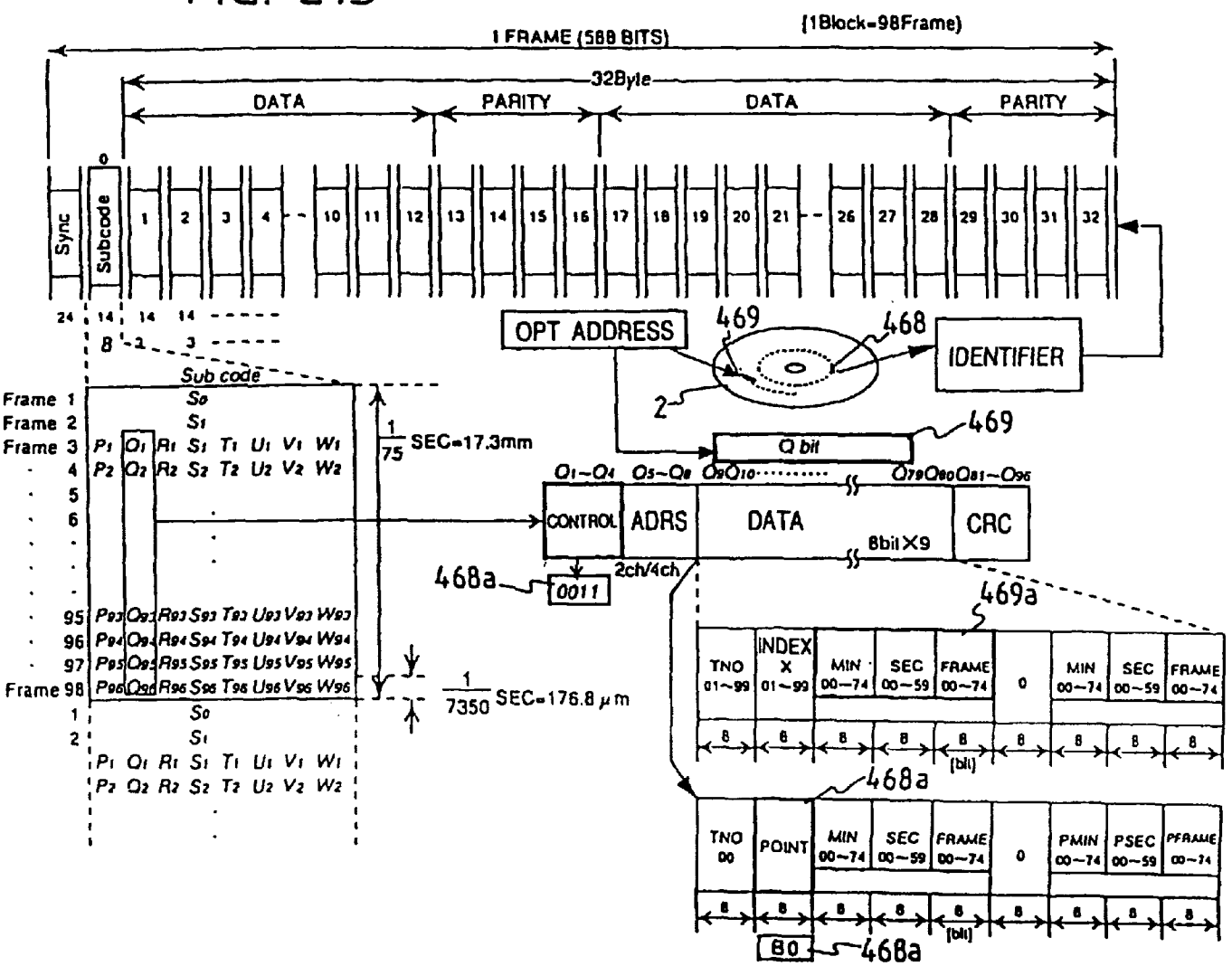

FIG. 213 is a diagram of the distance and the time interval of a CD subcode.

FIG. 214 is an illustration of a table of the correspondence between a magnetic track and an optical address in the fourteenth embodiment.

Figure 215:
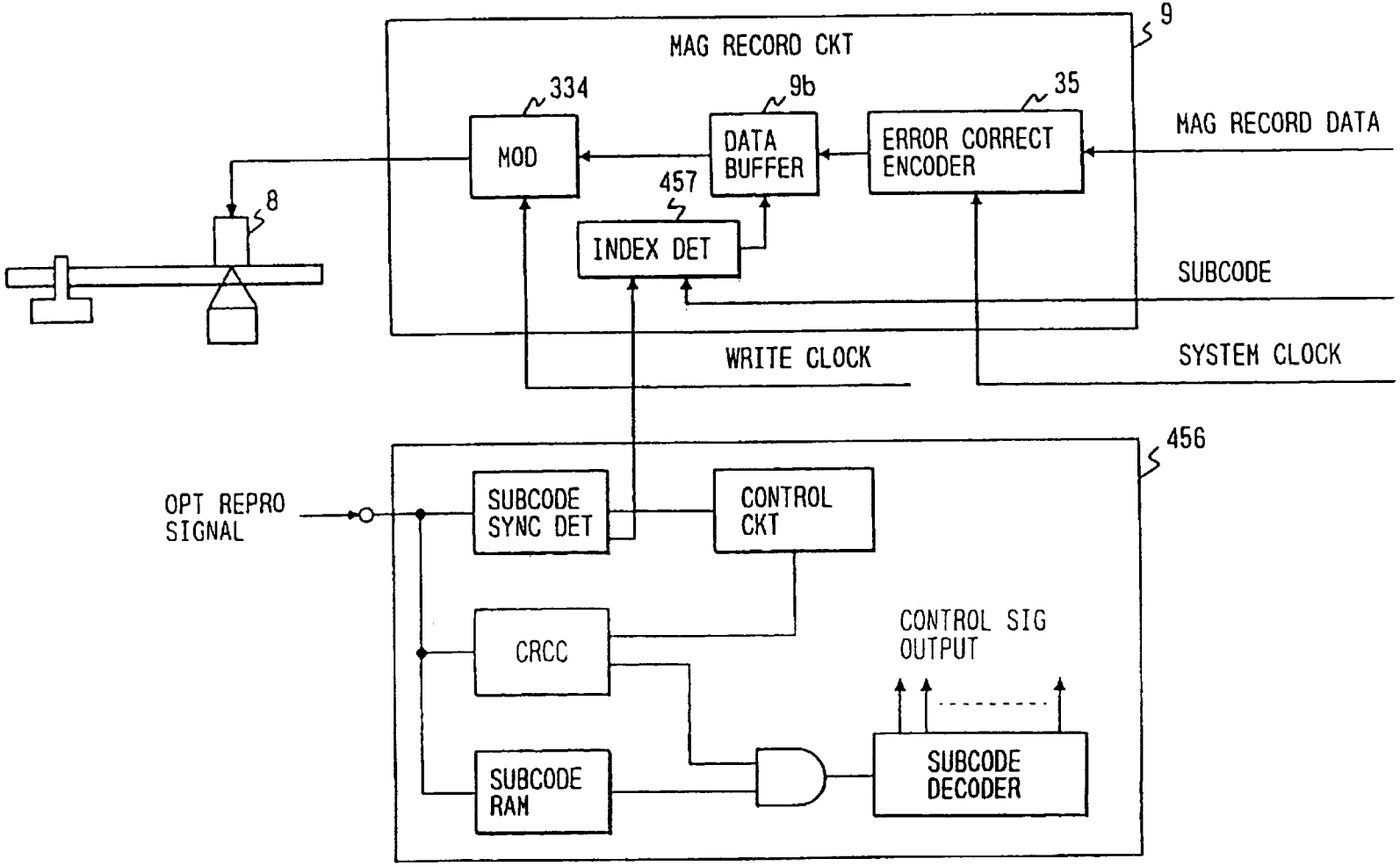

FIG. 215 is a block diagram of a subcode sync signal detector and a magnetic recording portion in the fourteenth embodiment.

Figure 216:
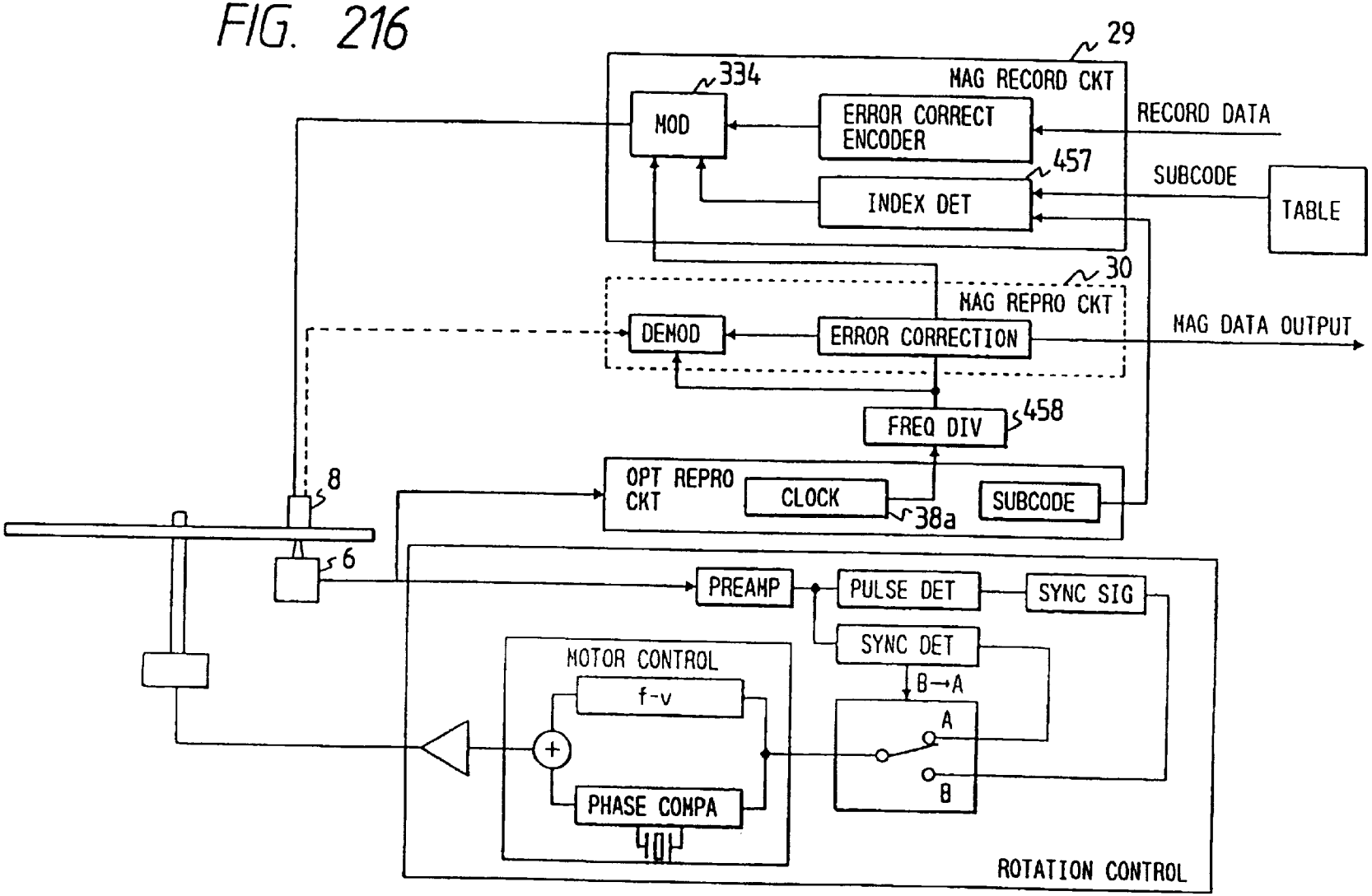

FIG. 216 is a block diagram of a recording and reproducing apparatus in the fourteenth embodiment.

Figure 217:
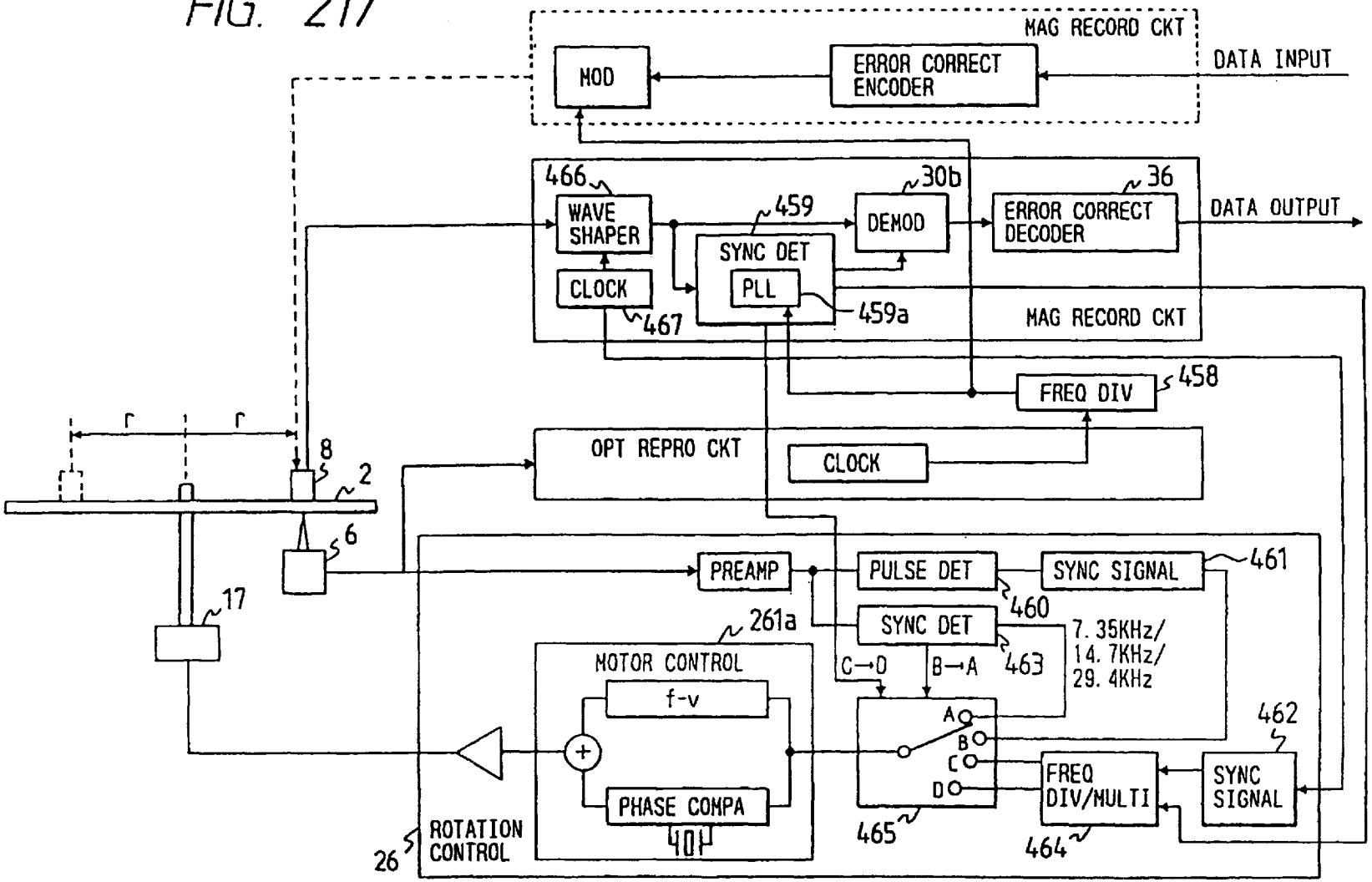

FIG. 217 is a block diagram of a recording and reproducing apparatus in the fourteenth embodiment.

Figures 218A, 218B, 218C, 218D, 218E, 218F, 218G, 218H:
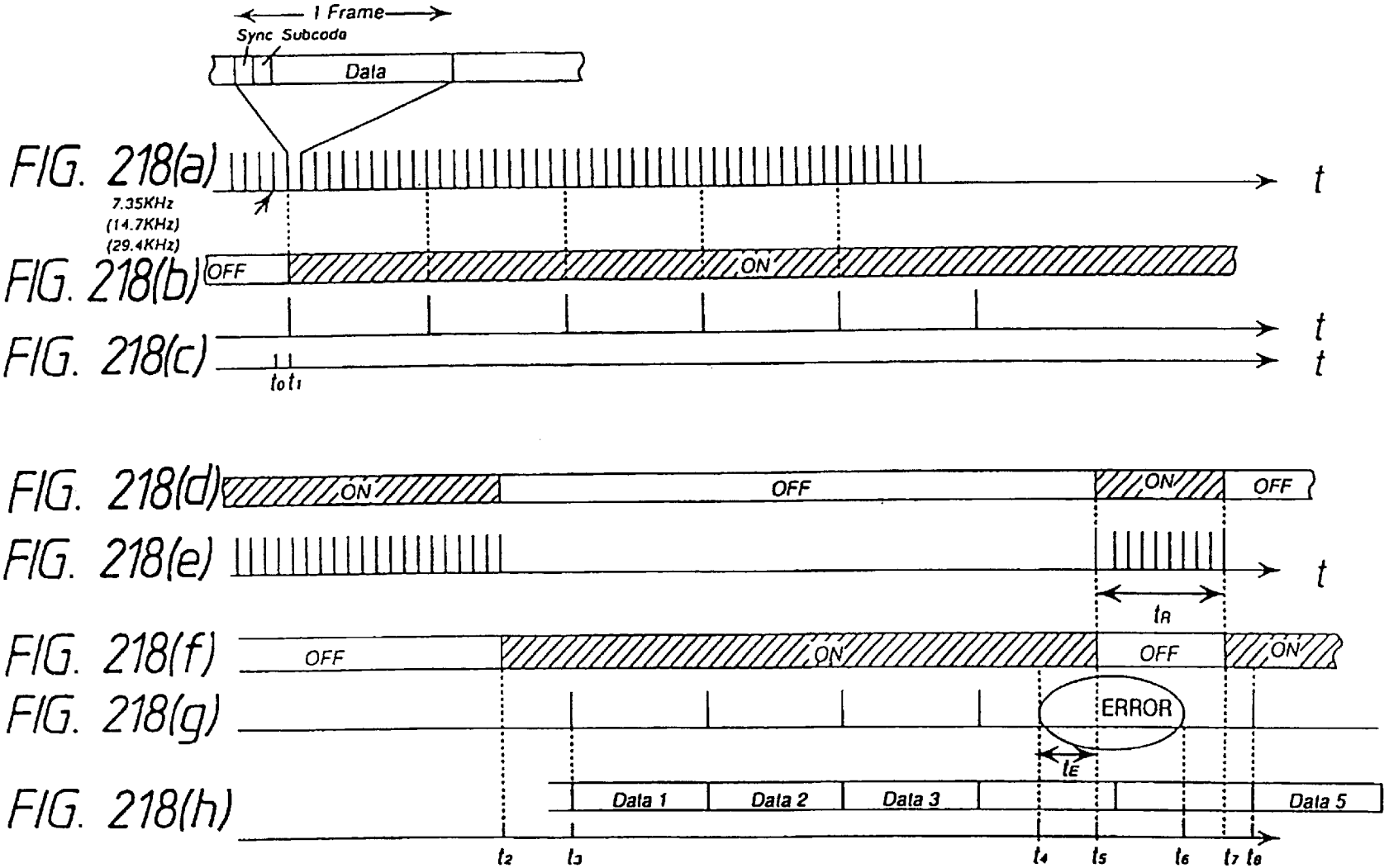

FIG. 218(a) is a time-domain diagram of an optical reproduction sync signal in the fourteenth embodiment.

FIG. 218(b) is a time-domain diagram of the conditions of magnetic recording operation in the fourteenth embodiment.

FIG. 218(c) is a time-domain diagram of a magnetic record sync signal in the fourteenth embodiment.

FIG. 218(d) is a time-domain diagram of the conditions of optical reproducing operation in the fourteenth embodiment.

FIG. 218(e) is a time-domain diagram of an optical reproduction sync signal in the fourteenth embodiment.

FIG. 218(f) is a time-domain diagram of the conditions of magnetic reproducing operation in the fourteenth embodiment.

FIG. 218(g) is a time-domain diagram of a magnetic reproduction sync signal in the fourteenth embodiment.

FIG. 218(h) is a time-domain diagram of magnetic reproduced data in the fourteenth embodiment.

FIG. 219 is a diagram of a disk eccentricity according to the CD standards.

Figure 220:
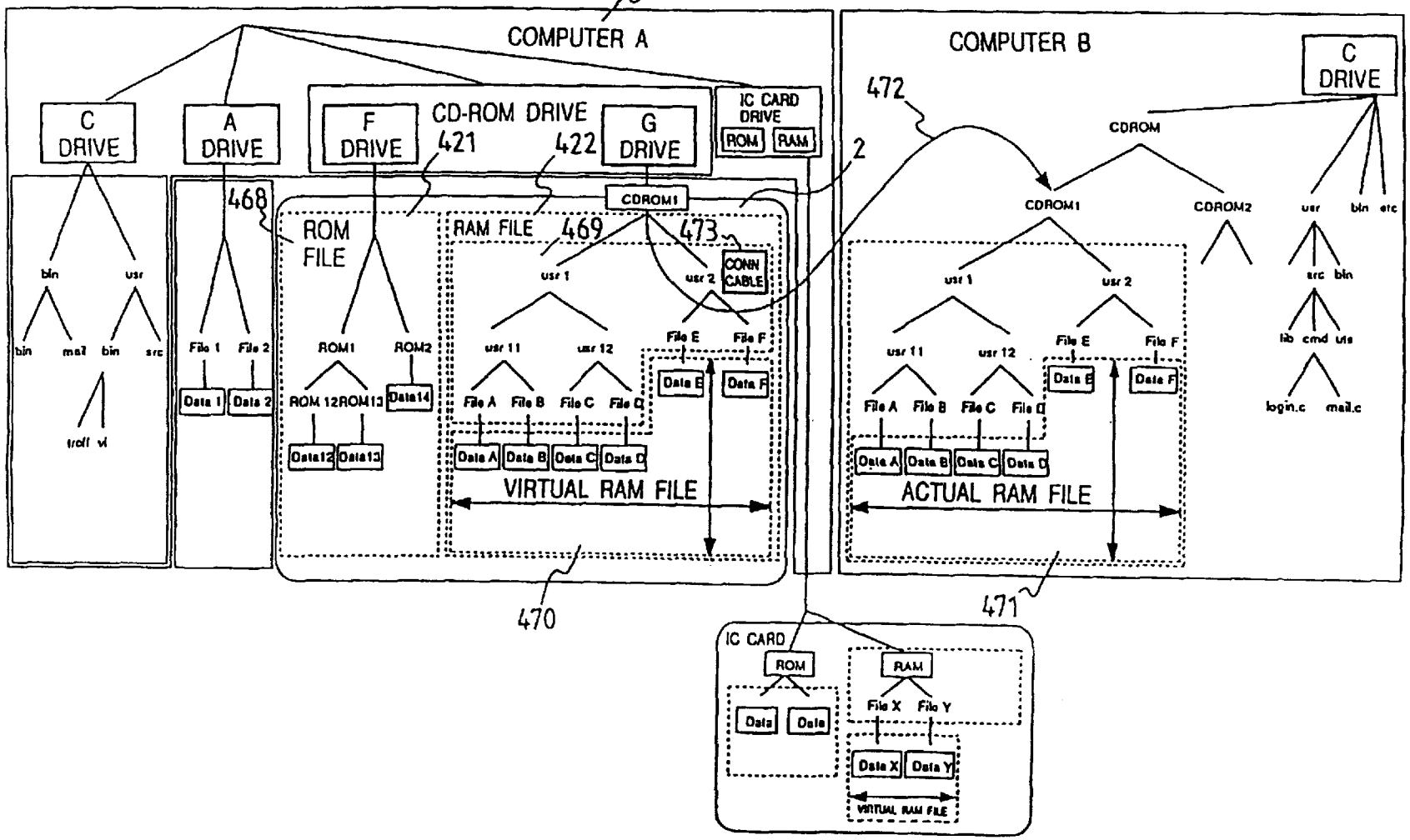

FIG. 220 is a diagram of a file structure in the twenty-second embodiment.

Figure 221:
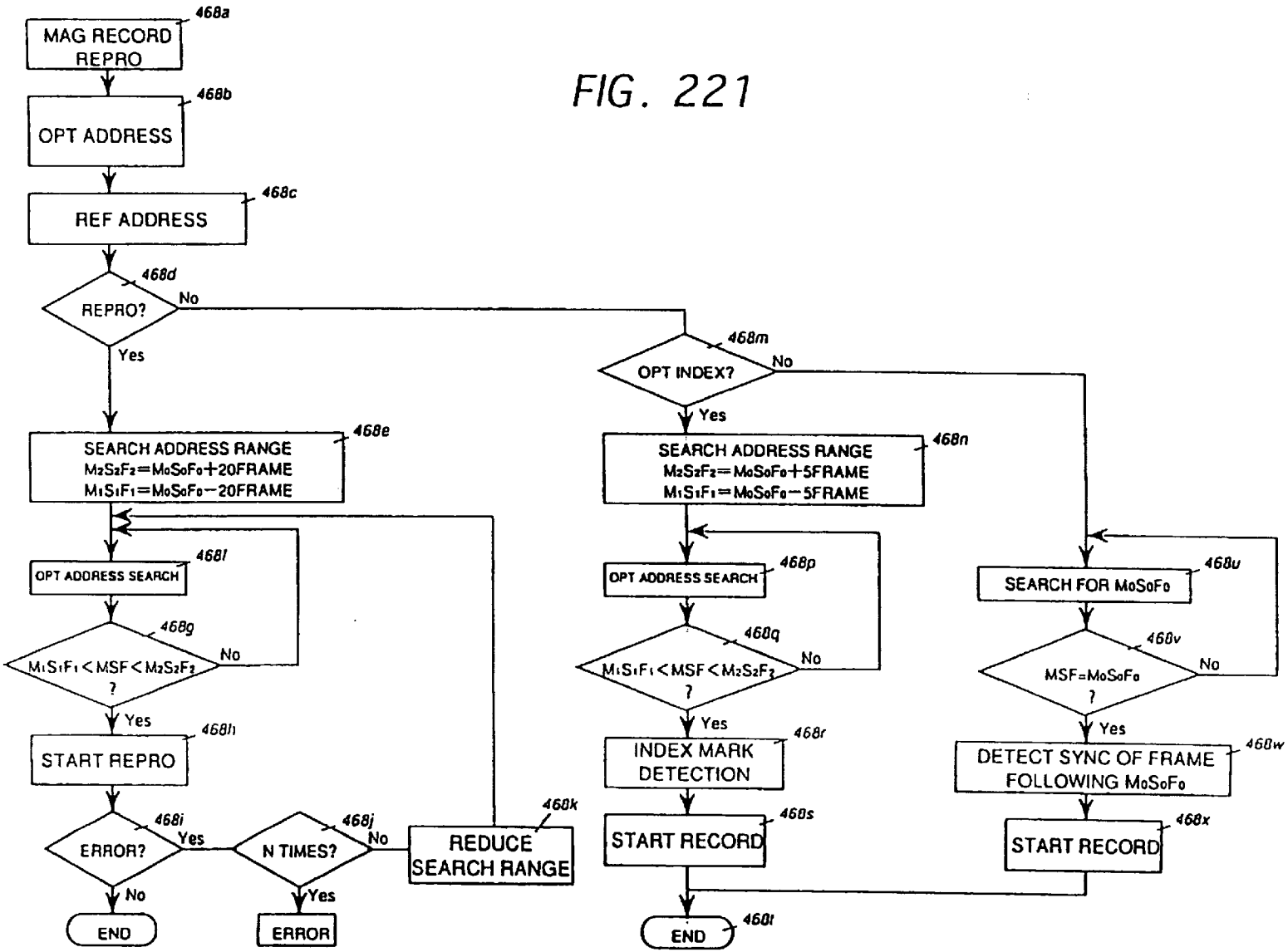

FIG. 221 is a flowchart of a program in the thirteenth embodiment.

Figures 222A, 222B, 222C, 222D, 222E, 222F:
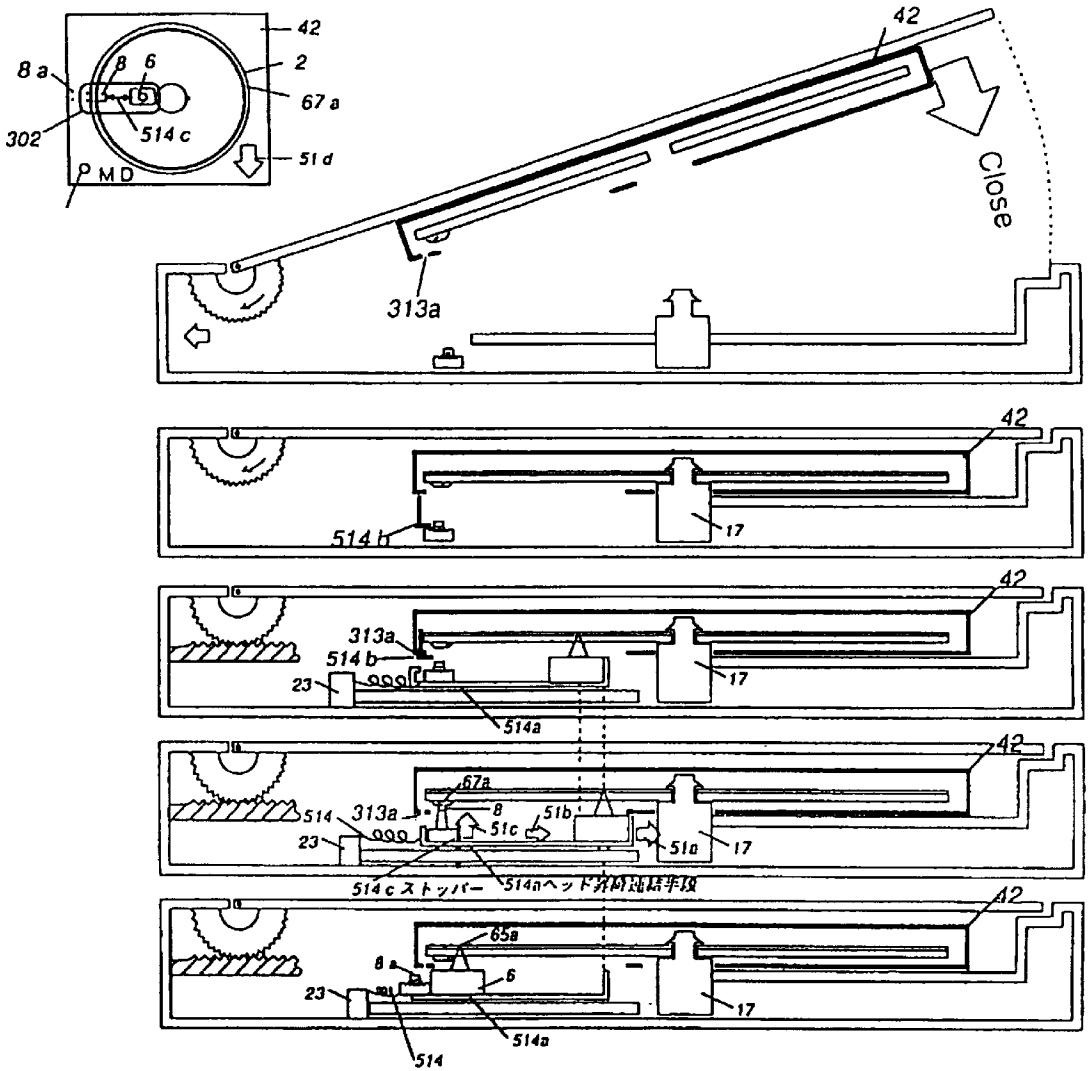

FIG. 222(a) is a top view of a recording medium in a cartridge in the twenty-third embodiment.

FIG. 222(b) is a sectional view of a recording and reproducing apparatus in the twenty-third embodiment.

FIG. 222(c) is a sectional view of a recording and reproducing apparatus in the twenty-third embodiment.

FIG. 222(d) is a sectional view of a recording and reproducing apparatus in the twenty-third embodiment.

FIG. 222(e) is a sectional view of a recording and reproducing apparatus in the twenty-third embodiment.

FIG. 222(f) is a sectional view of a recording and reproducing apparatus in the twenty-third embodiment.

FIG. 223(a) is a sectional view of a recording medium in the twelfth embodiment.

FIG. 223(b) is a diagram of the physical structure of a medium identifier in the twelfth embodiment.

Figures 223, 223C:
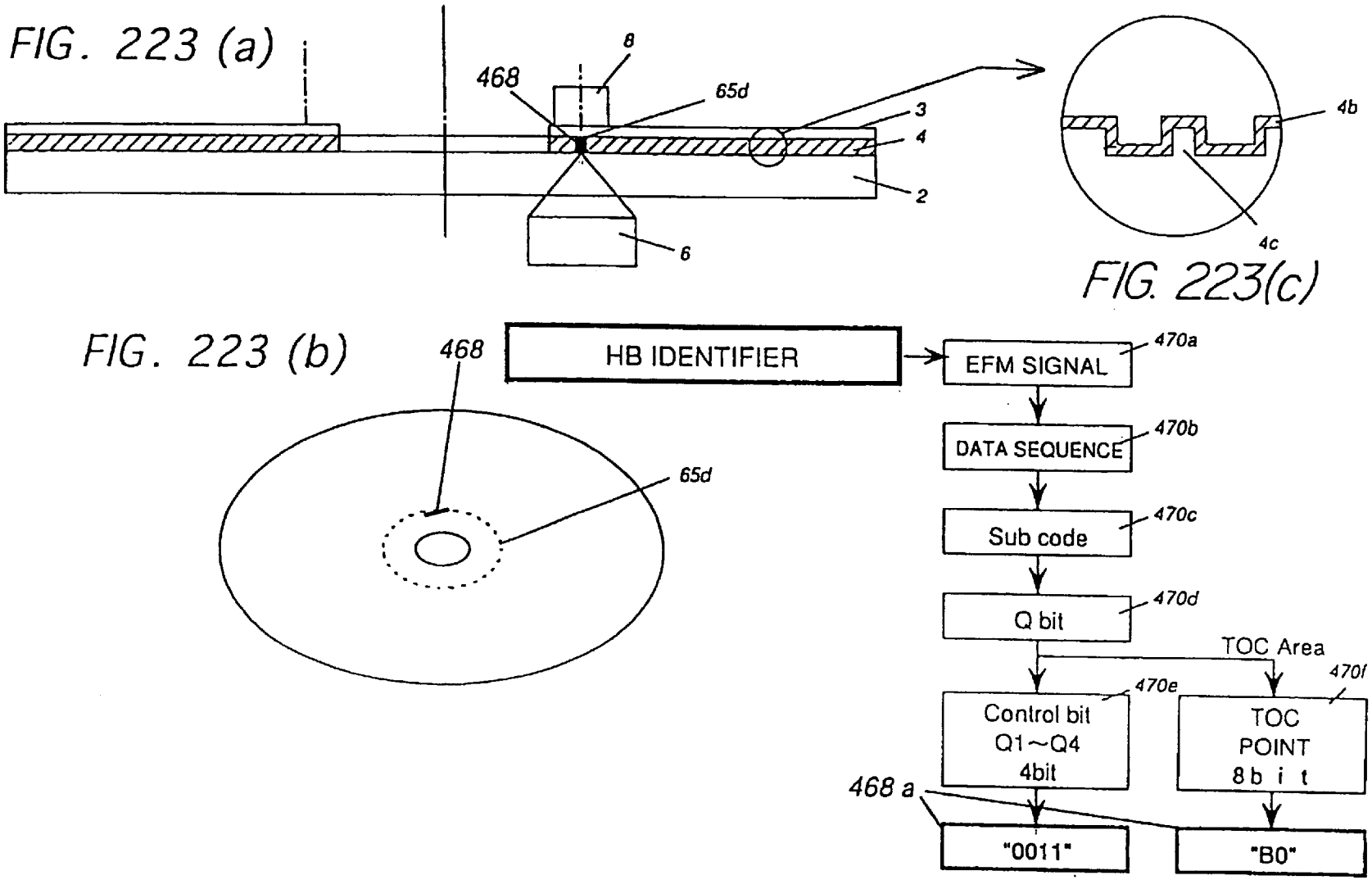

FIG. 223(c) is an exploded view of FIG. 223(a).

Figure 224:
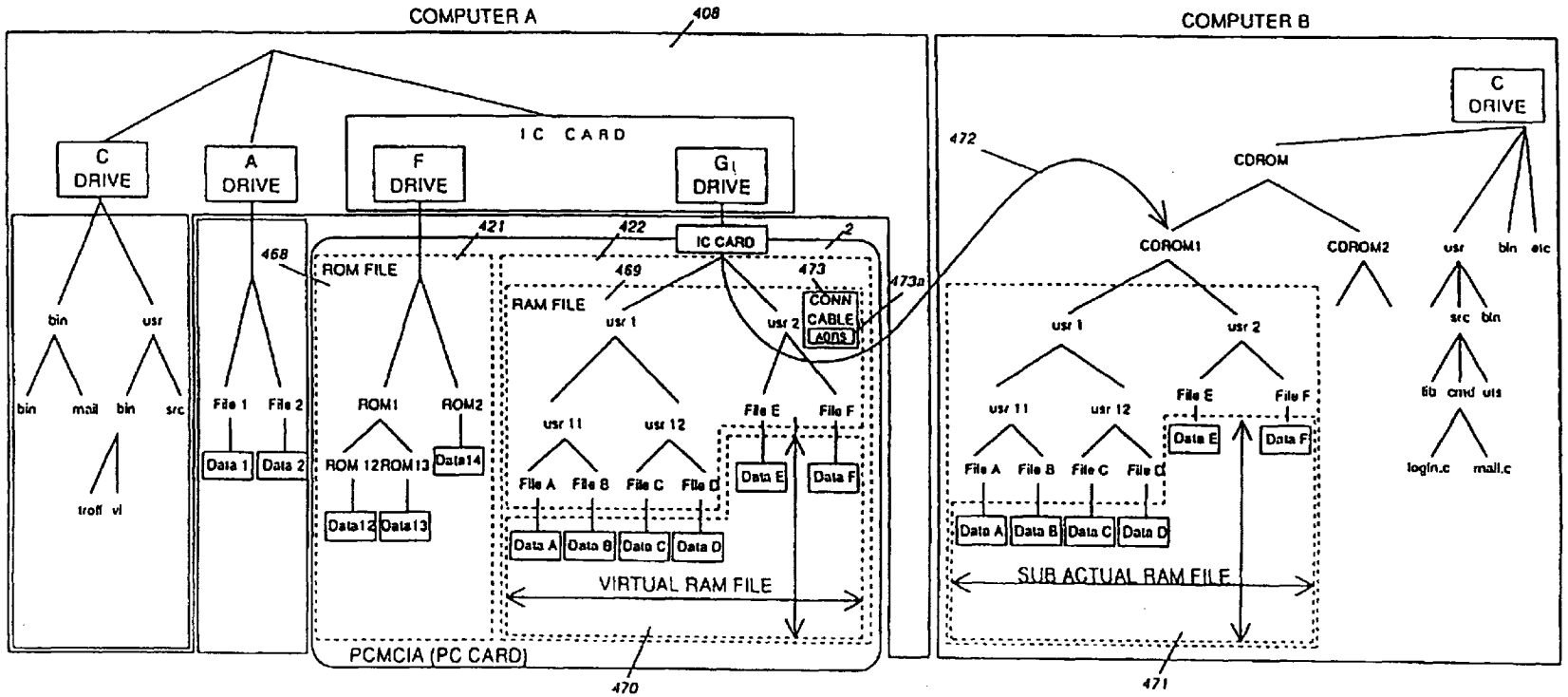

FIG. 224 is a diagram of a file structure in the twenty-second embodiment.

Figure 225:
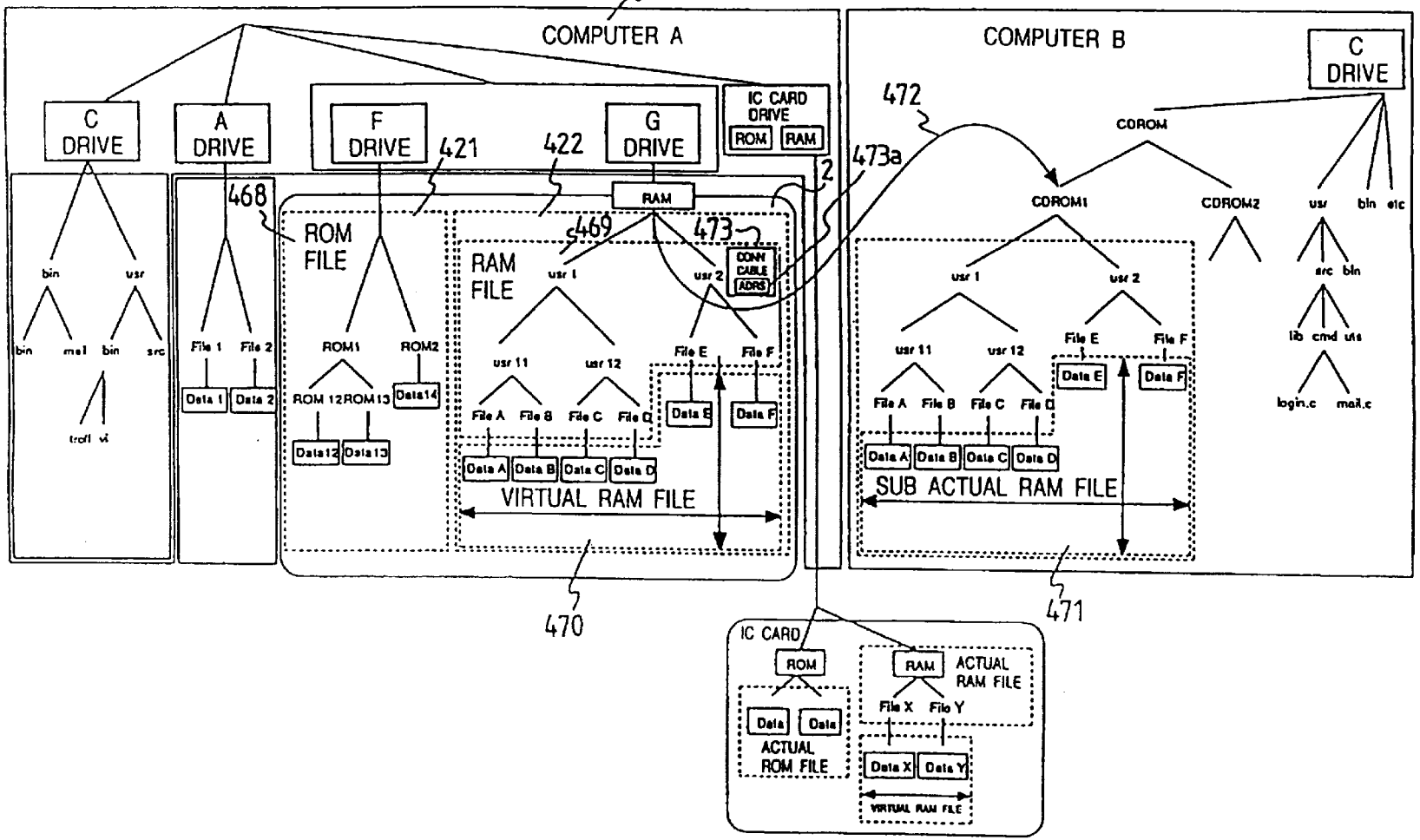

FIG. 225 is a diagram of a file structure in the twenty-second embodiment.

Figure 226:
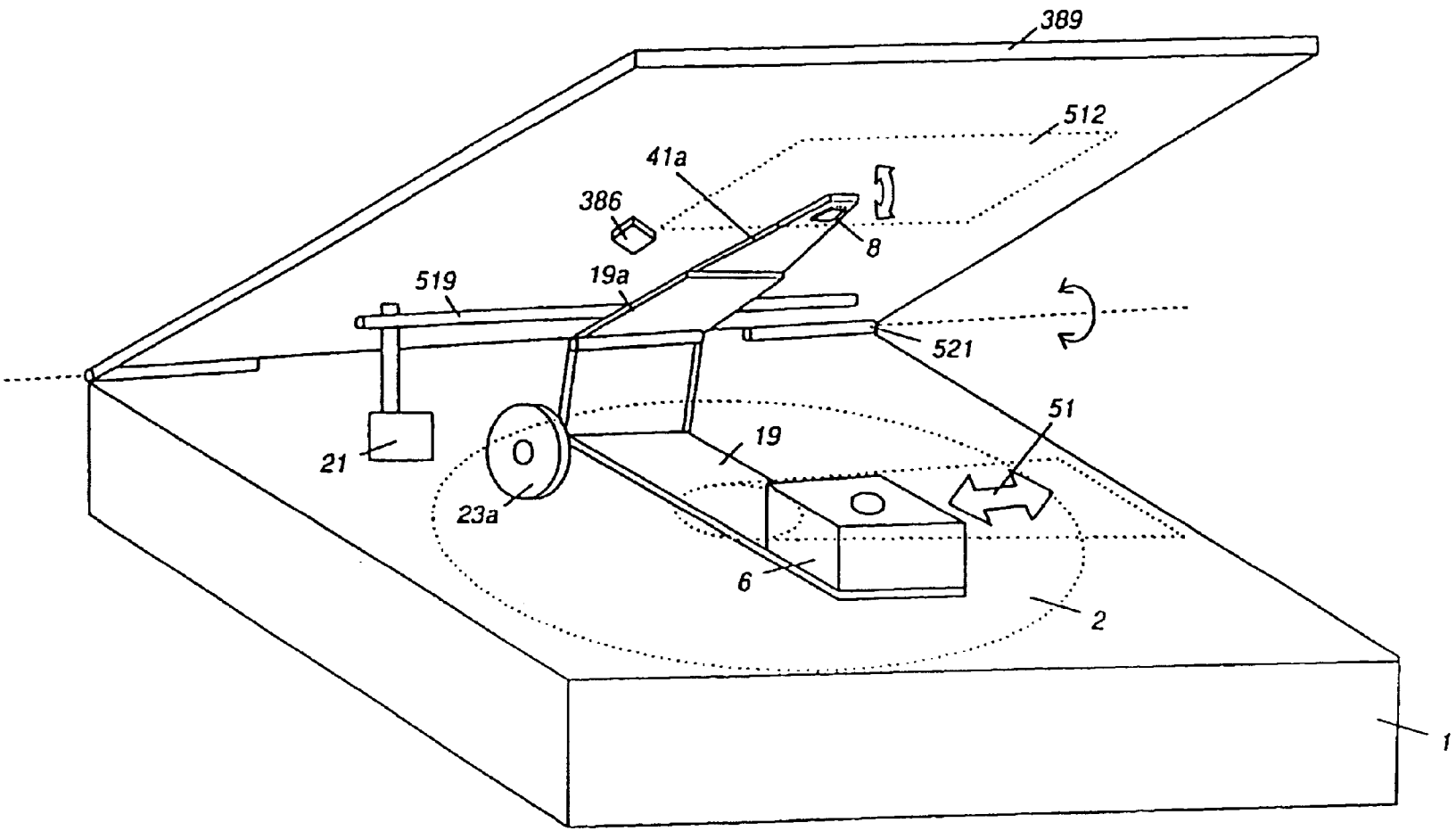

FIG. 226 is a perspective view of a recording and reproducing apparatus in the twenty-third embodiment.

Figure 227:
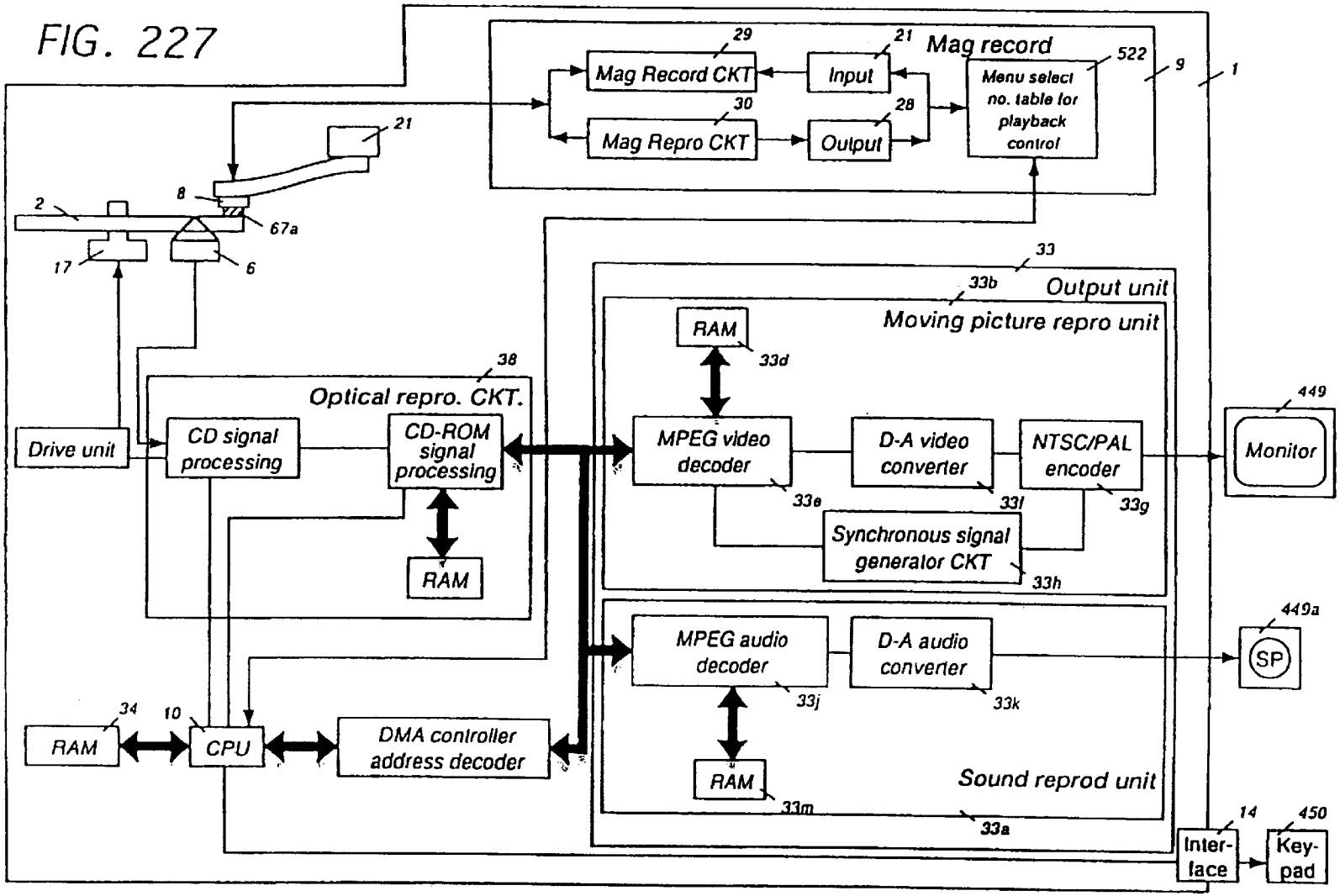

FIG. 227 is a block diagram of a recording and reproducing apparatus in the twenty-third embodiment.

Figure 228:
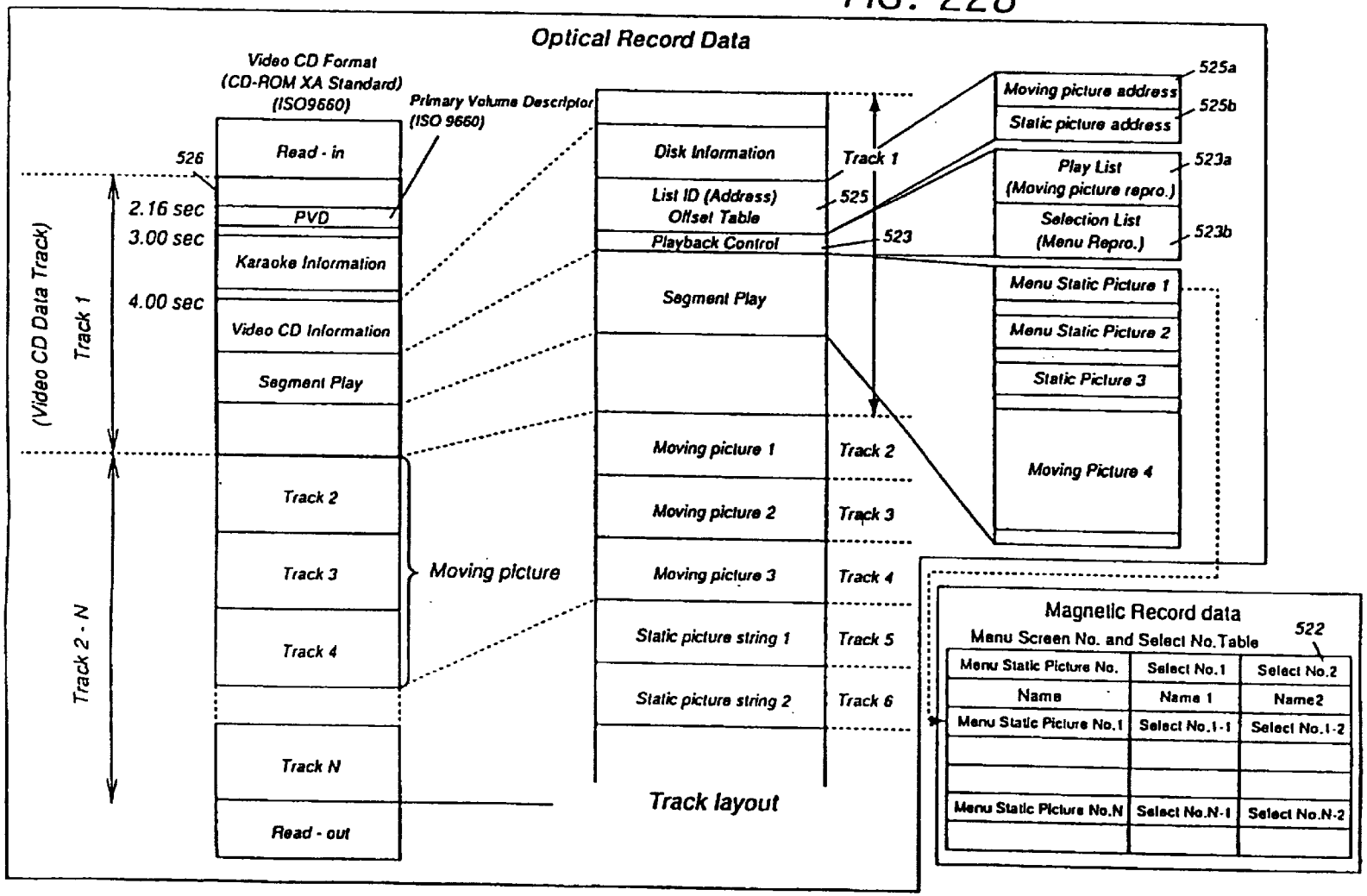

FIG. 228 is a diagram of a data structure of a video CD for the recording and reproducing apparatus in the twenty third embodiment.

Figure 229:
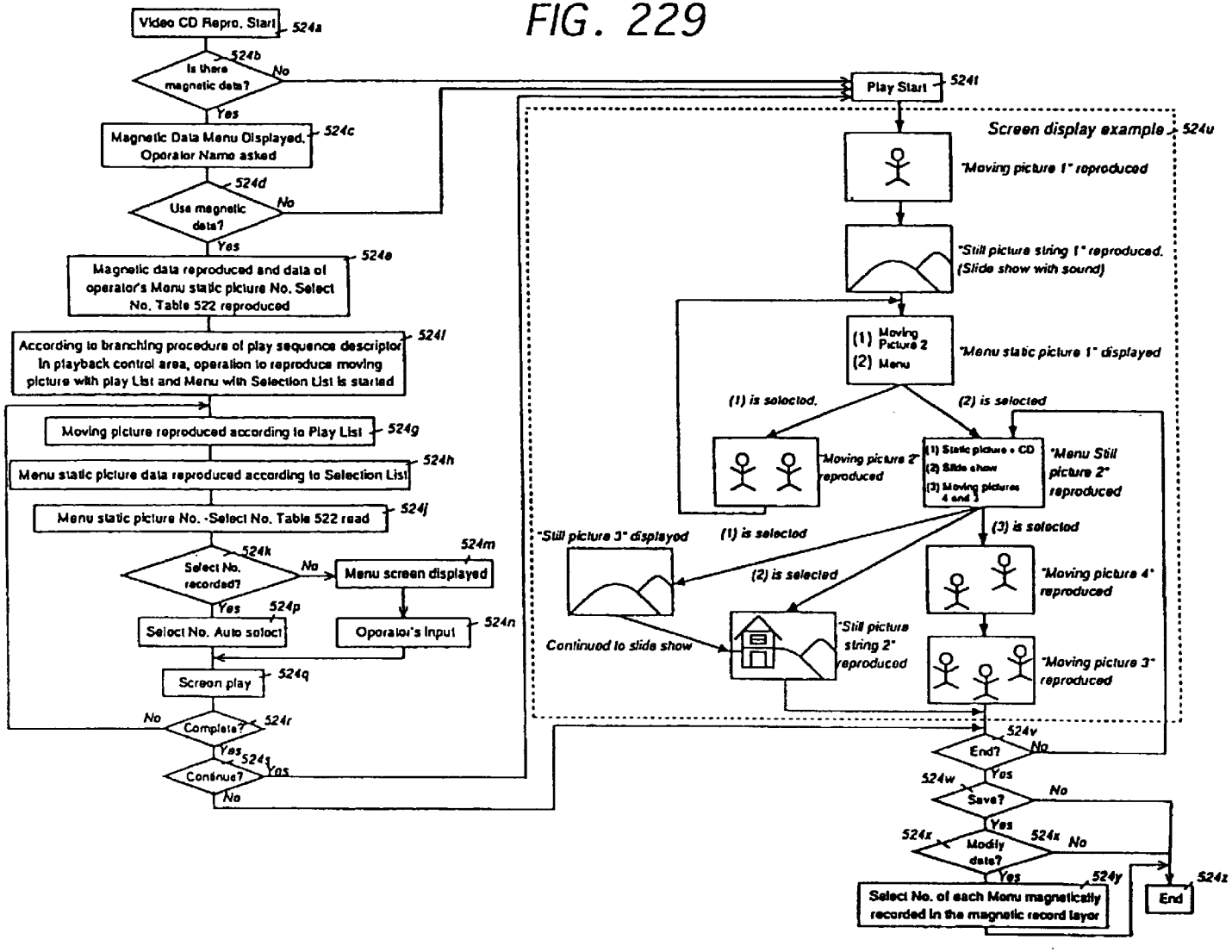

FIG. 229 is a flowchart of operation of the recording and reproducing apparatus in the twenty-third embodiment.

FIG. 230 is a diagram of a selection number table and a menu picture number in the recording and reproducing apparatus in the twenty-third embodiment.

Figure 231:
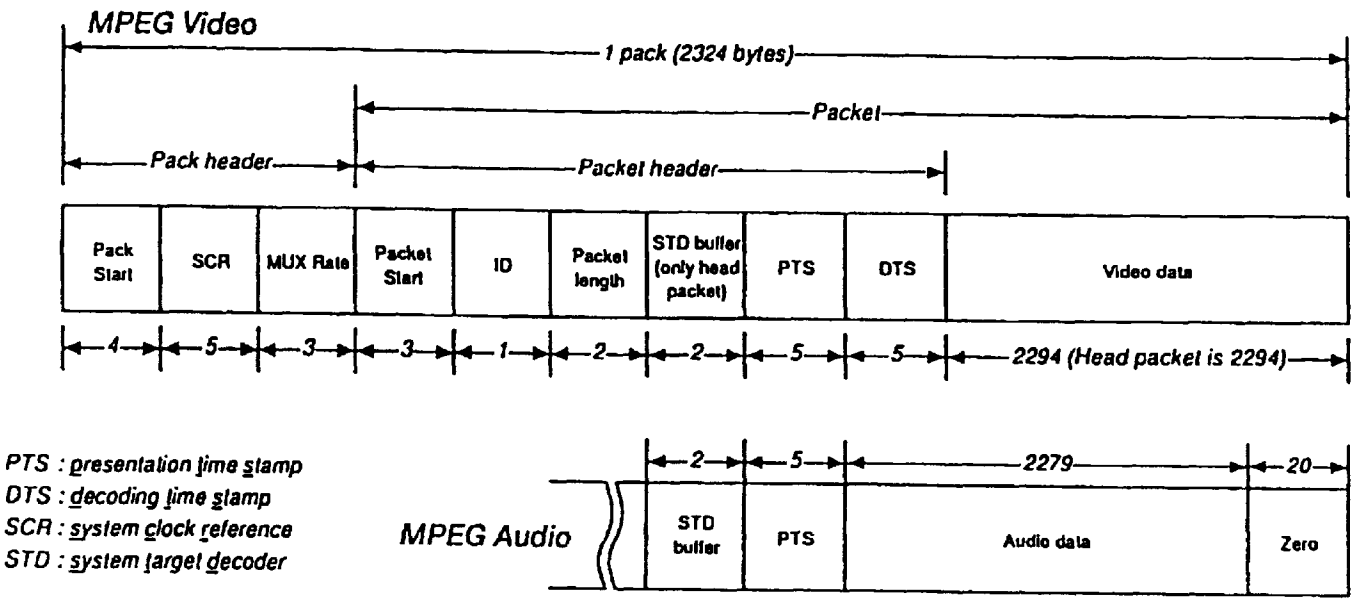
Figure 231:
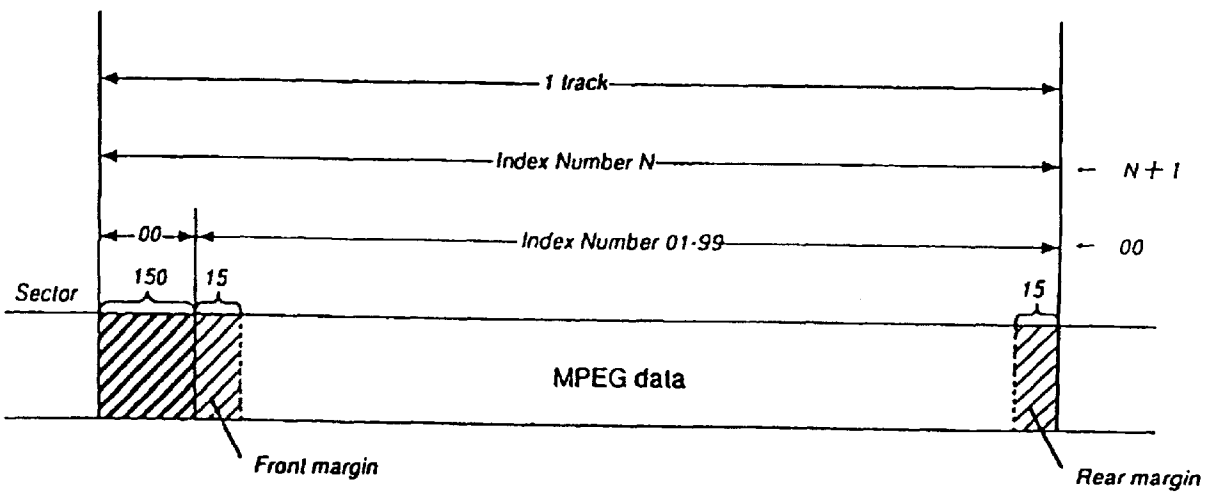

FIG. 231(a) is a diagram of a data format of a prior art video CD.

FIG. 231(b) is a diagram of a data format of a prior art video CD.

Figure 232:
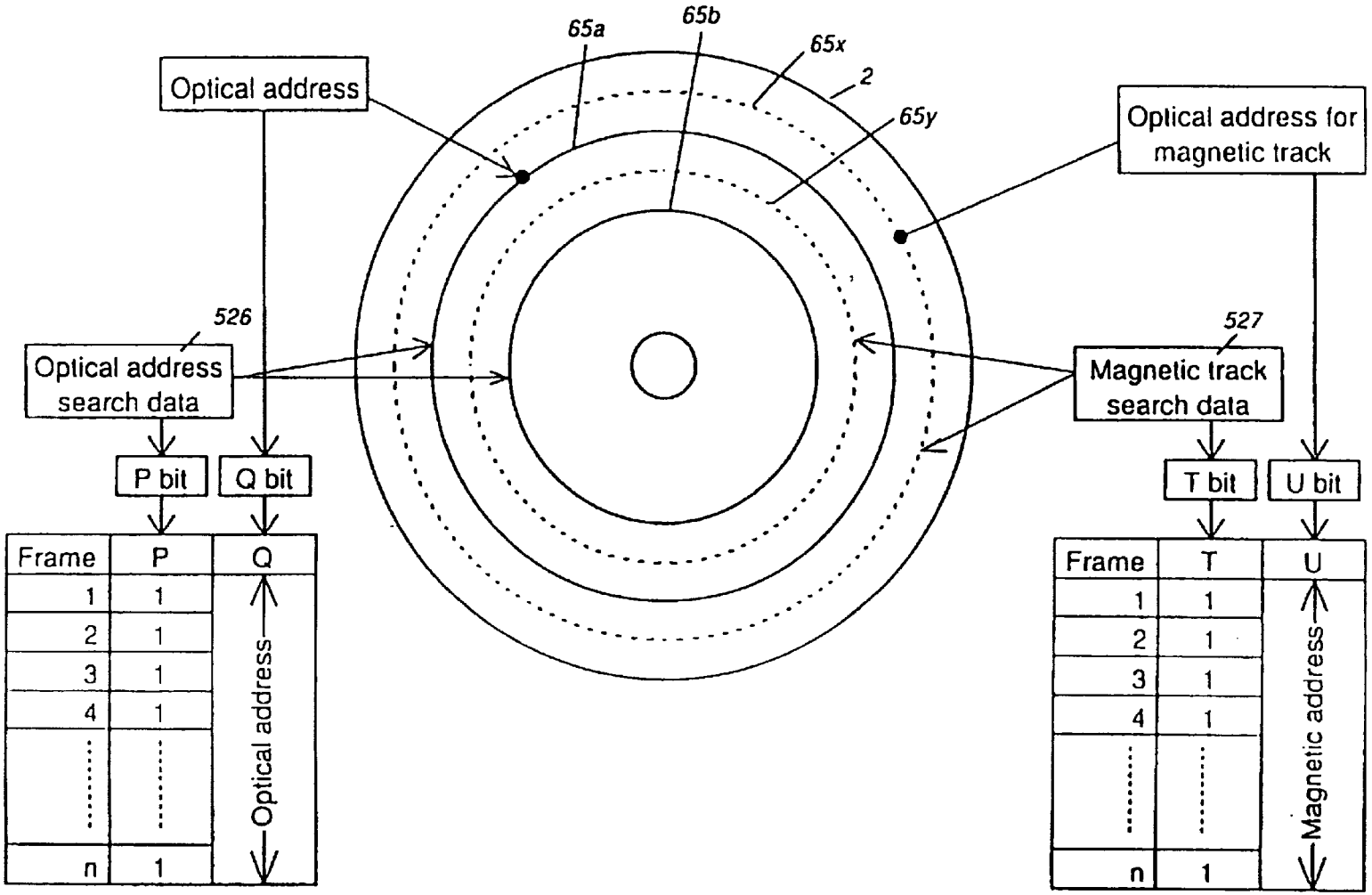

FIG. 232 is a diagram of optical address search information in the recording and reproducing apparatus in the twenty-third embodiment.

Figure 233:
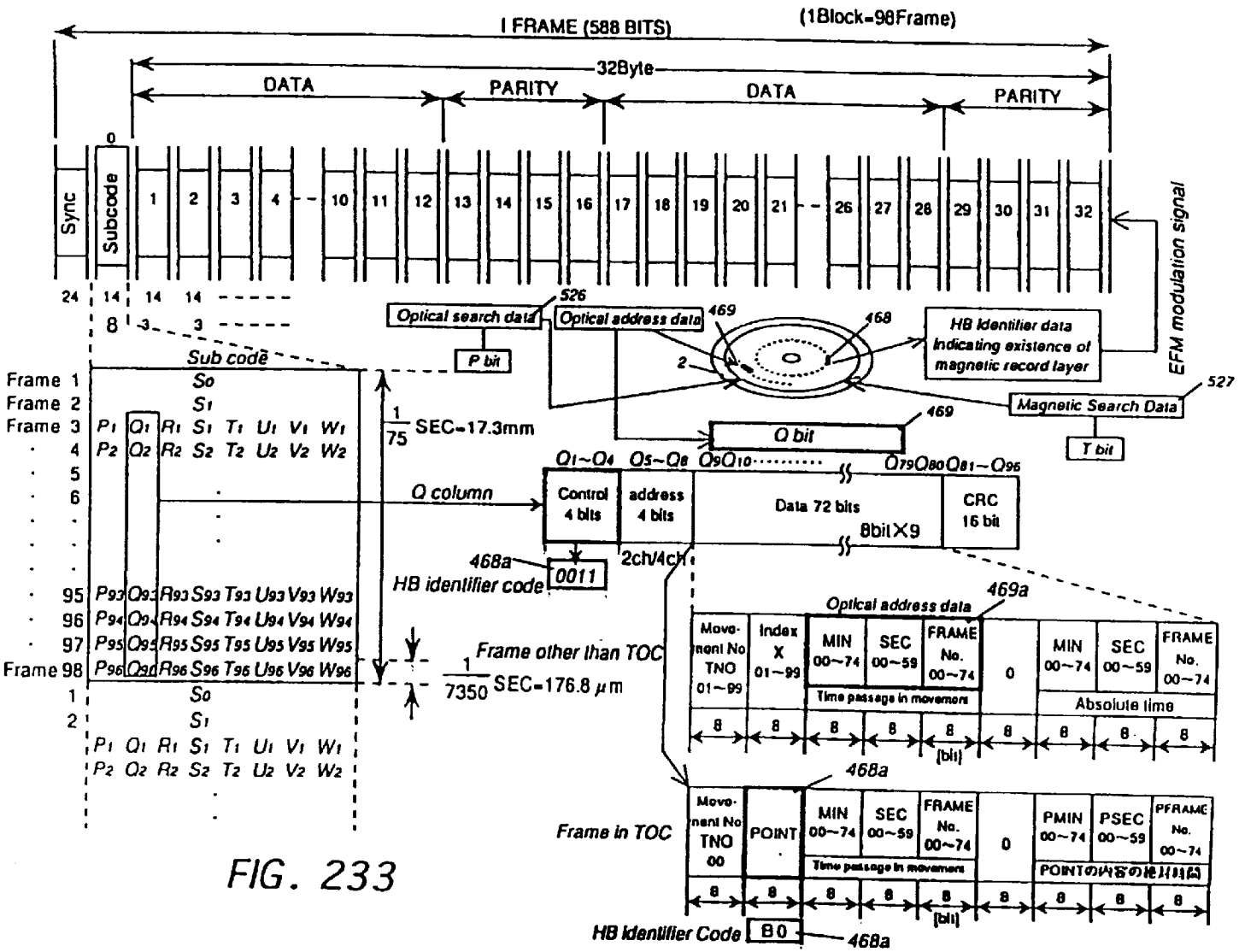

FIG. 233 is a diagram of a data structure in the recording and reproducing apparatus in the twenty-third embodiment.

Figure 234:
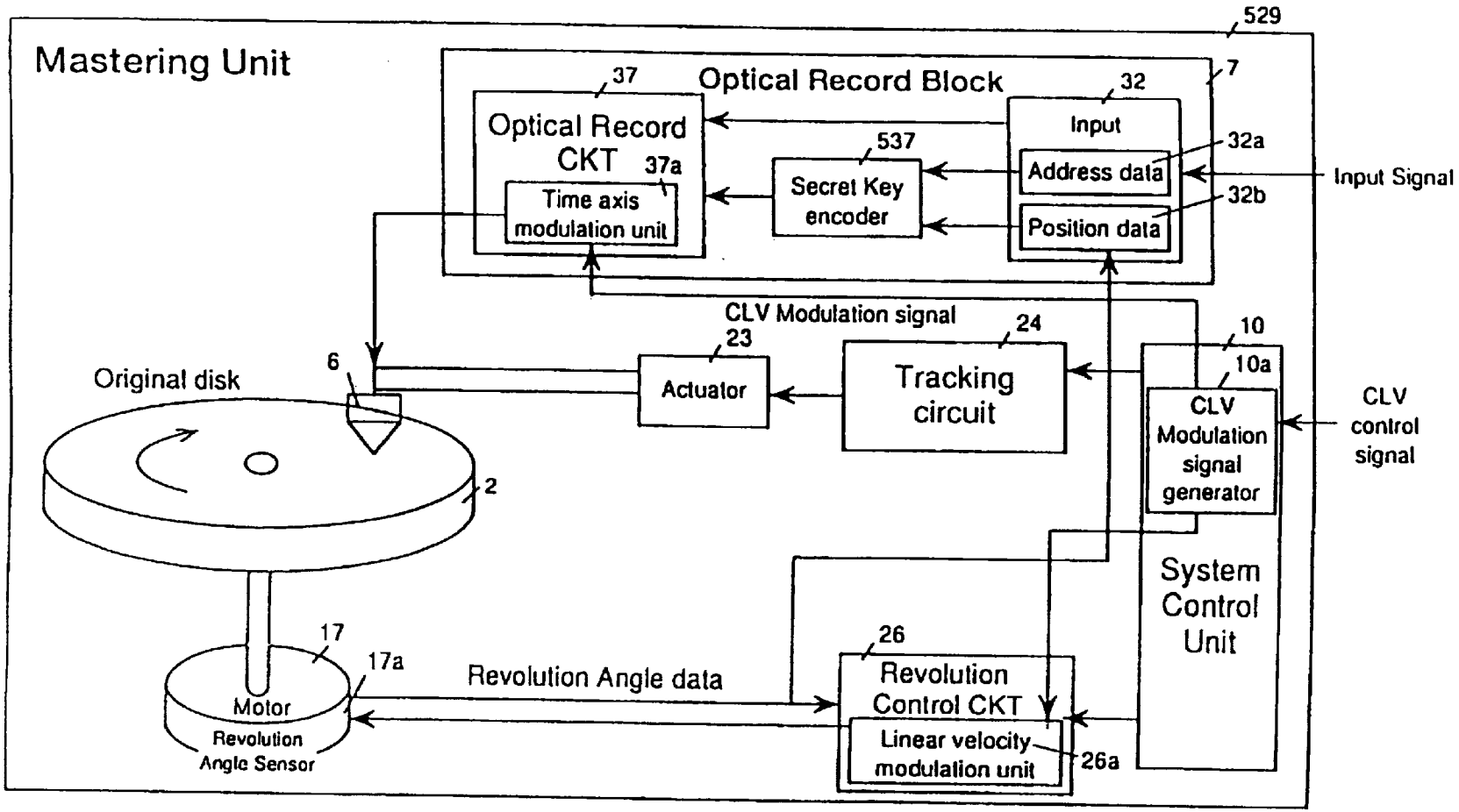

FIG. 234 is a block diagram of a mastering apparatus in the seventeenth embodiment.

Figure 235:
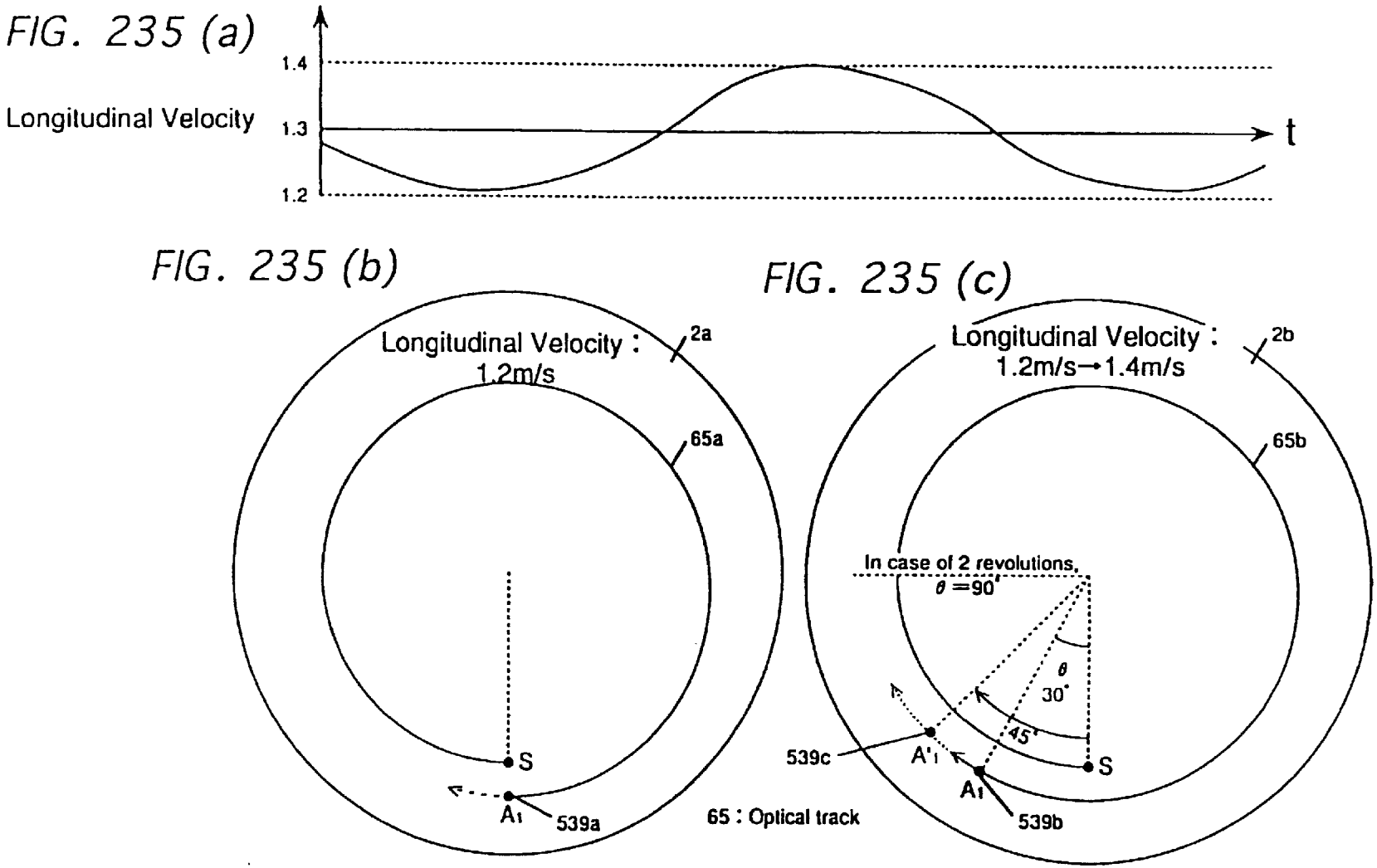

FIG. 235(a) is a time-domain diagram of a linear velocity which occurs during a recording process in the seventeenth embodiment.

FIG. 235(b) is a diagram of an address position on an optical disk which occurs at a linear velocity of 1.2 m/s in the seventeenth embodiment.

FIG. 235(c) is a diagram of an address position on an optical disk which occurs upon a change of a linear velocity from 1.2 m/s to 1.4 m/s in the seventeenth embodiment.

Figure 236:
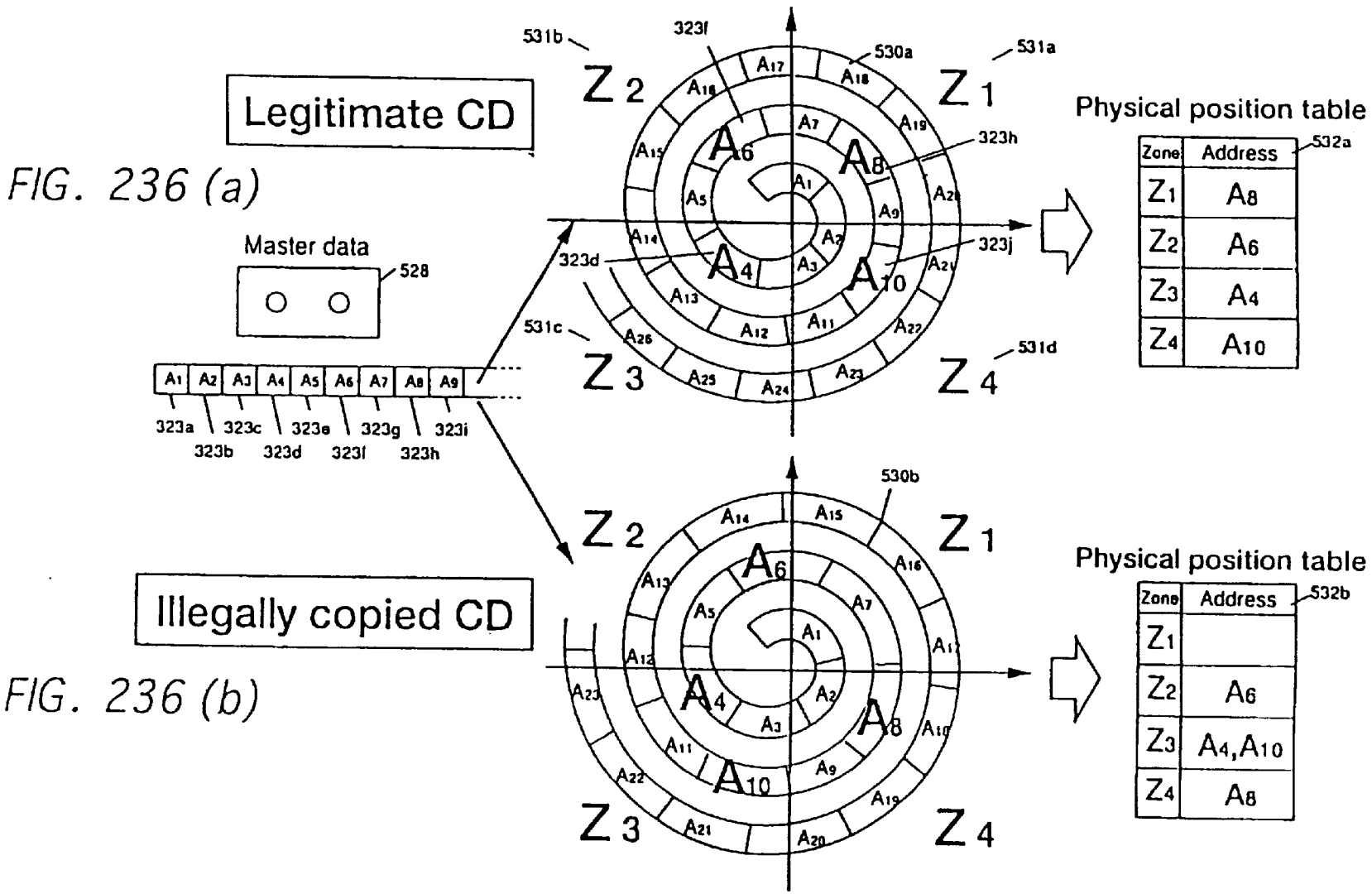

FIG. 236(a) is a diagram of a physical arrangement (layout) of addresses in a legal (legitimate) CD in the seventeenth embodiment.

FIG. 236(b) is a diagram of a physical arrangement (layout) of addresses in an illegally copied CD in the seventeenth embodiment.

Figure 237:
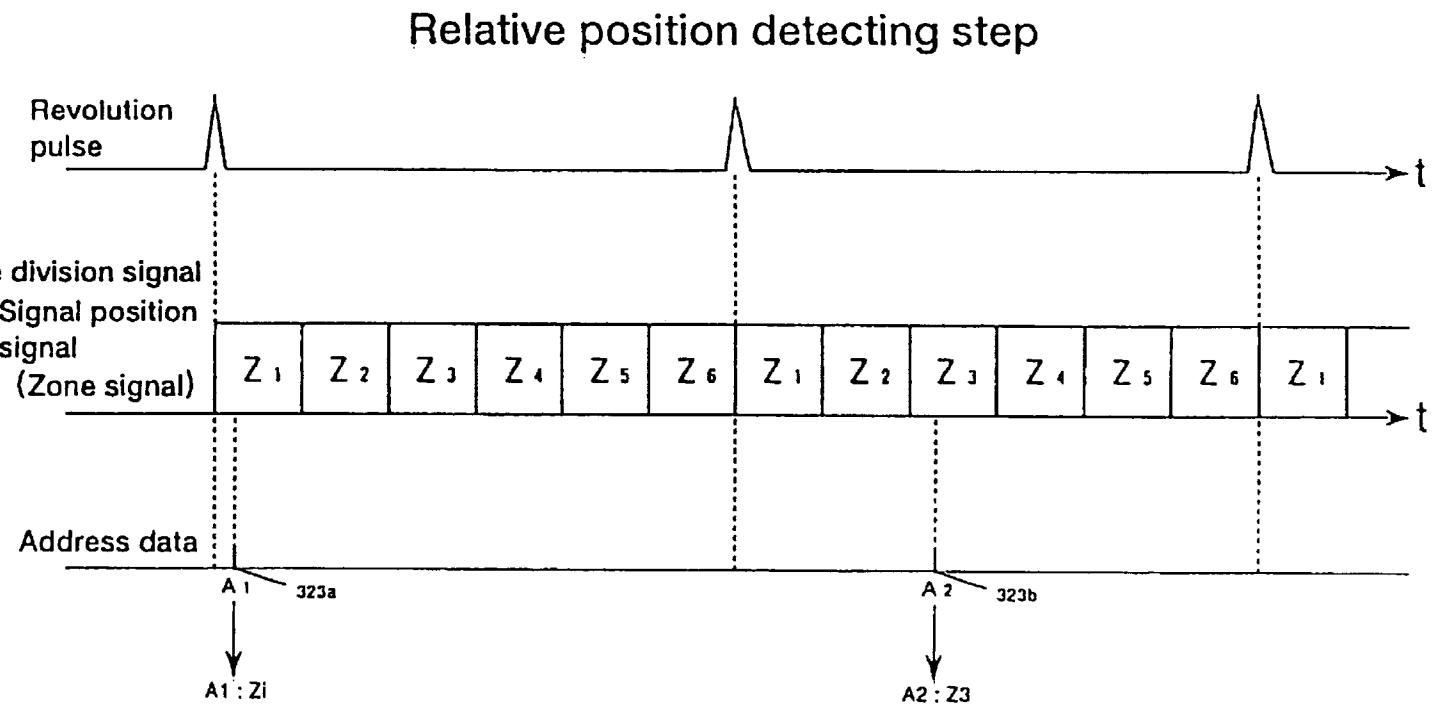

FIG. 237(a) is a time-domain of a disk rotation pulse in the seventeenth embodiment.

FIG. 237(b) is a time-domain diagram of a physical position signal in the seventeenth embodiment.

FIG. 237(c) is a time-domain diagram of address information in the seventeenth embodiment.

Figure 238:
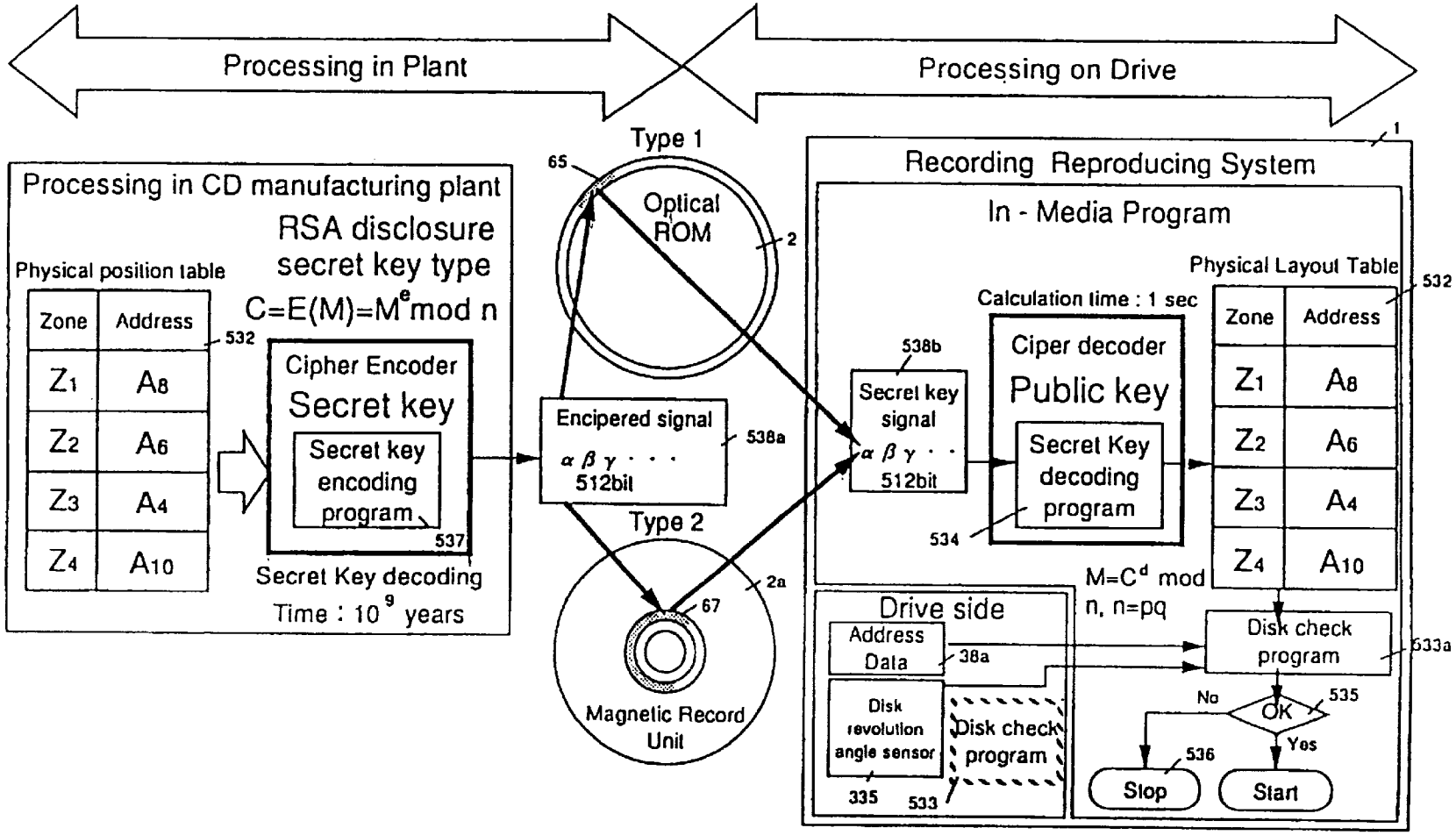

FIG. 238 is a diagram of copy protection for a CD in the seventeenth embodiment.

Figure 239:
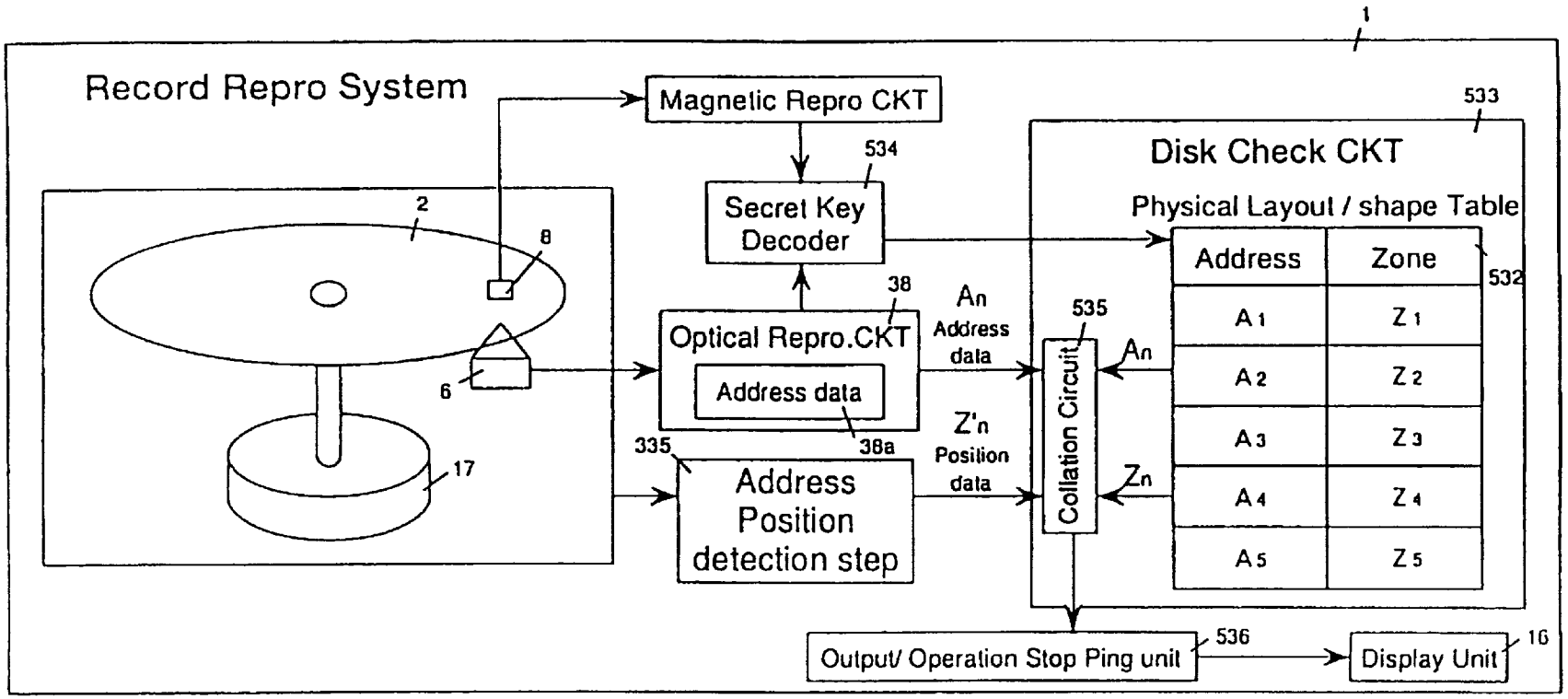

FIG. 239 is a block diagram of a recording and reproducing apparatus in the seventeenth embodiment.

Figure 240:
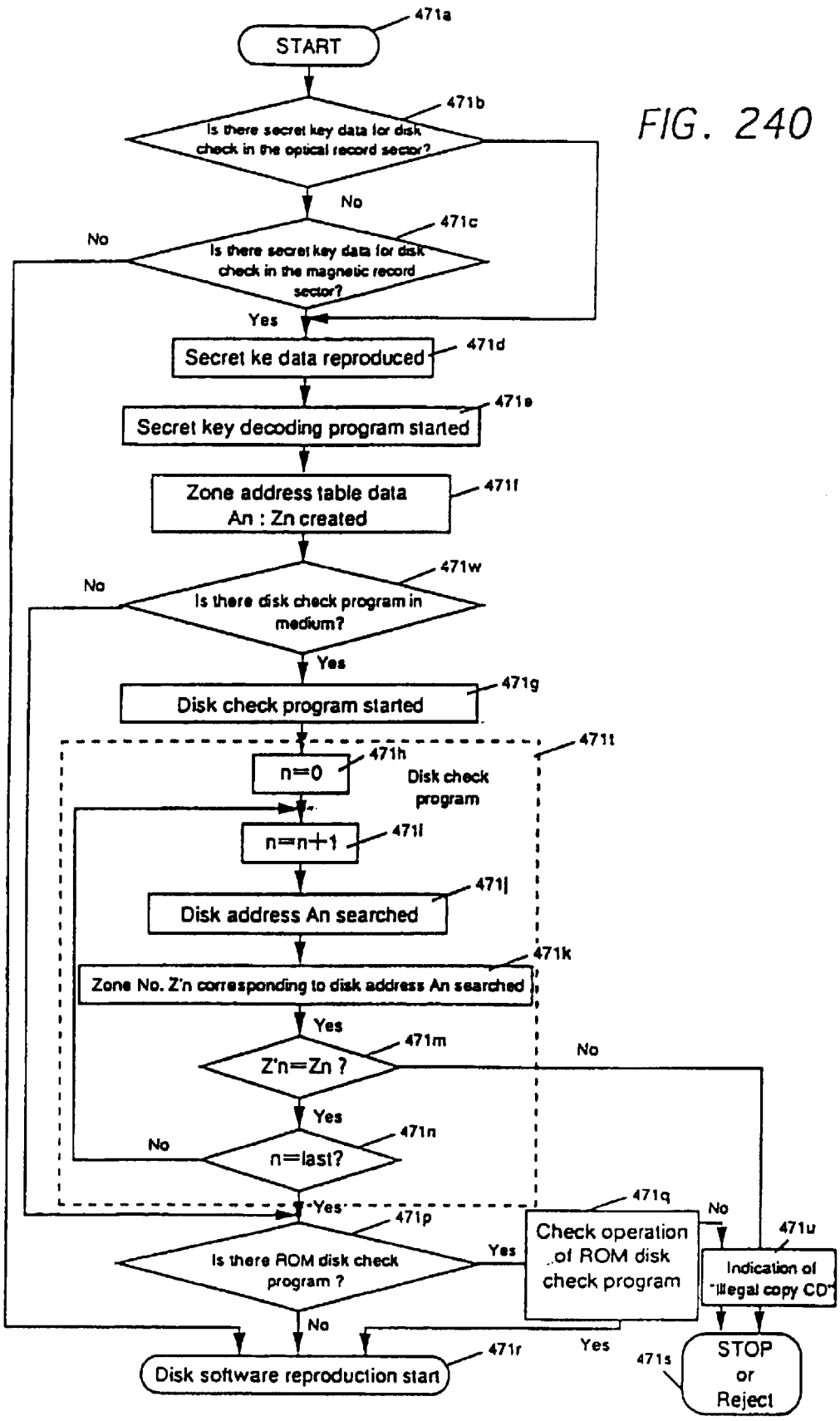

FIG. 240 is a flowchart of a check on an illegally copied disk in the seventeenth embodiment.

Figure 241:
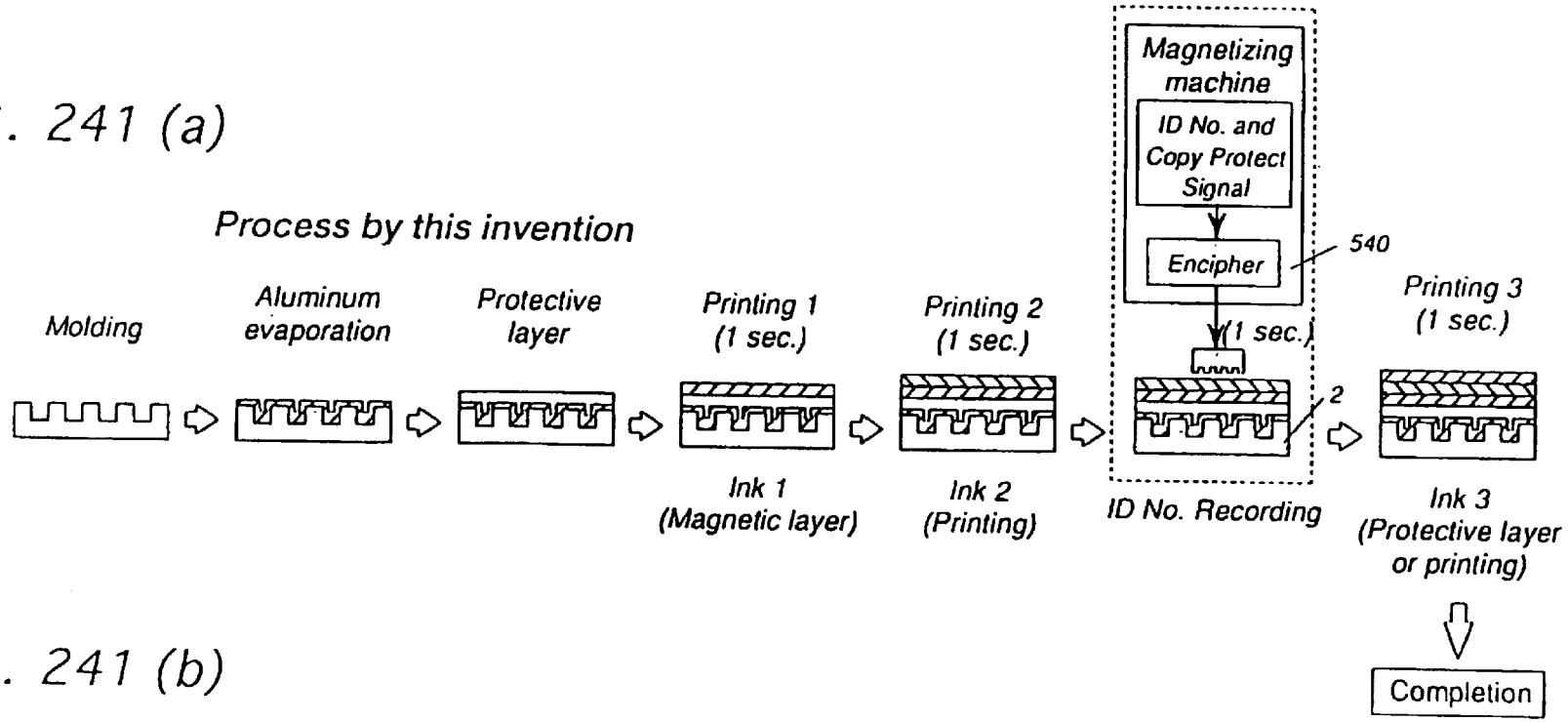
Figure 241:
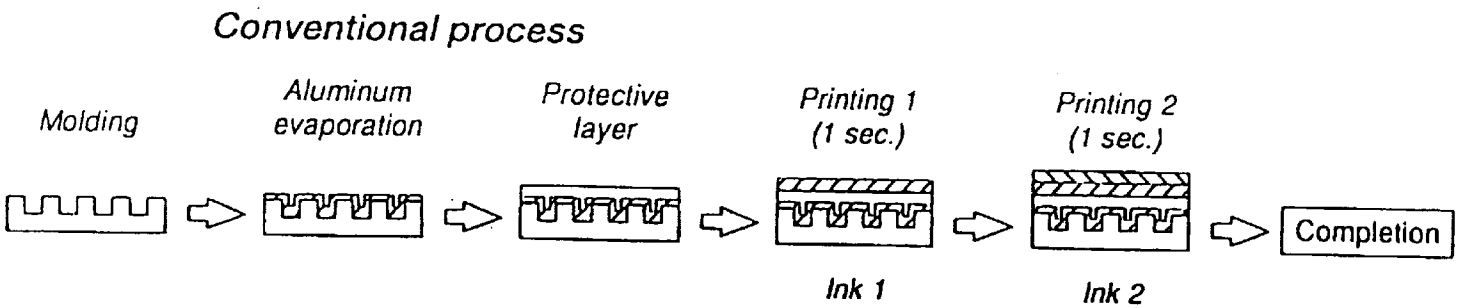

FIG. 241(a) is a diagram of steps for making a CD into which an ID number is recorded.

FIG. 241(b) is a diagram of steps for making a prior art: CD.

Figure 242:
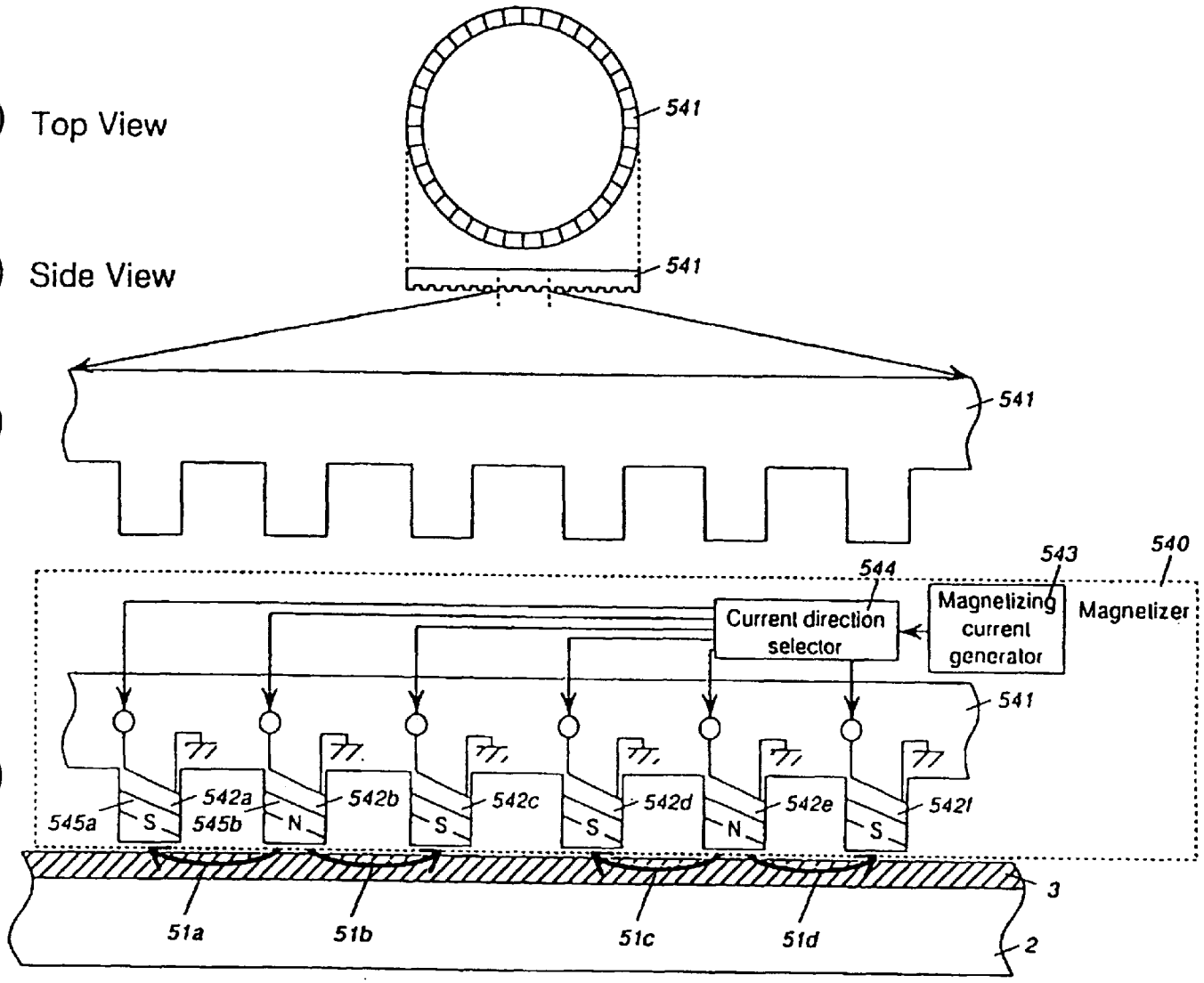

FIG. 242(a) is a top view of a magnetizing apparatus in the seventeenth embodiment.

FIG. 242(b) is a side view of the magnetizing apparatus in the seventeenth embodiment.

FIG. 242(c) is an enlarged side view of the magnetizing apparatus in the seventeenth embodiment.

FIG. 242(d) is a block diagram of the magnetizing apparatus in the seventeenth embodiment.

Figure 243:
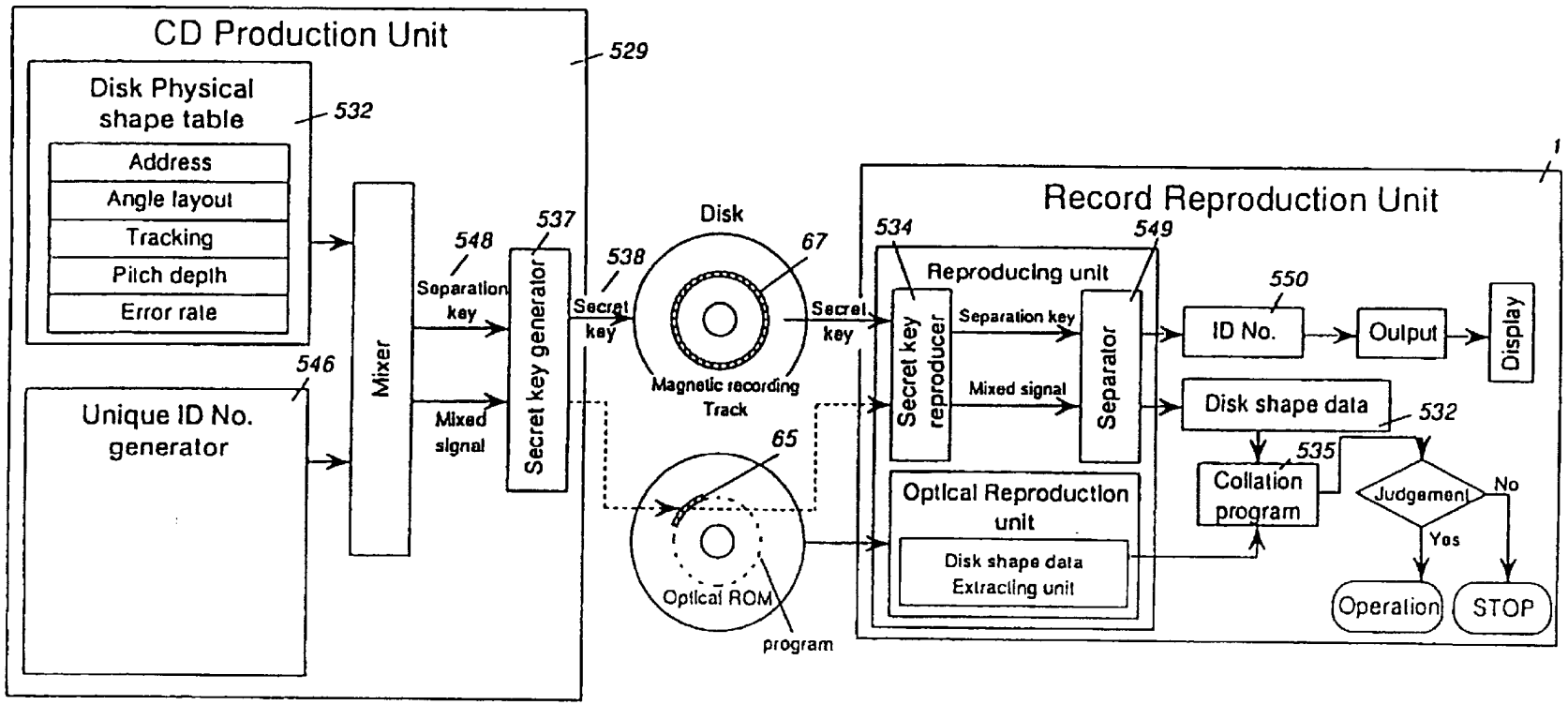

FIG. 243 is a diagram of inputting of an ID number in the seventeenth embodiment.

FIG. 244(a) is a time-domain diagram of a constant linear velocity in the seventeenth embodiment.

FIG. 244(b) is a time-domain diagram of a varying linear velocity in the seventeenth embodiment.

FIG. 244(c) is a diagram of a physical arrangement (layout) of addresses which occur at a constant linear velocity in the seventeenth embodiment.

FIG. 244(d) is a diagram of a physical arrangement (layout) of addresses which occur upon a change in a linear velocity in the seventeenth embodiment.

FIG. 245(a) is a sectional view of a legal (legitimate) original disk in, the seventeenth embodiment.

FIG. 245(b) is a sectional view of a legal (legitimate) molded disk in the seventeenth embodiment.

FIG. 245(c) is a sectional view of an illegally copied original disk in the seventeenth embodiment.

FIG. 245(d) is a sectional view of an illegally copied molded disk in the seventeenth embodiment.

Figure 246:
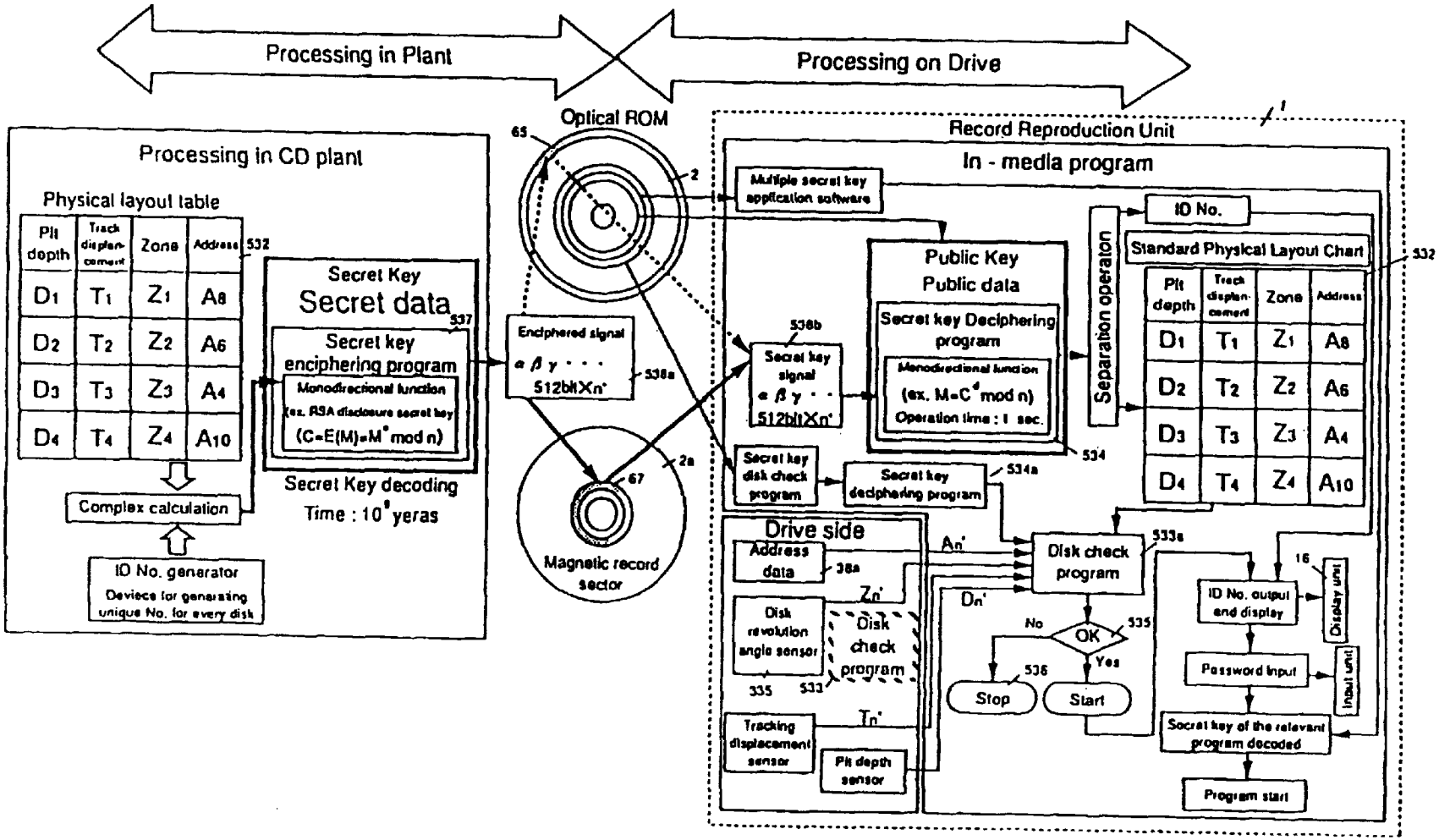

FIG. 246 is a block diagram of a CD making apparatus and a recording and reproducing apparatus in the seventeenth embodiment.

Figure 247:
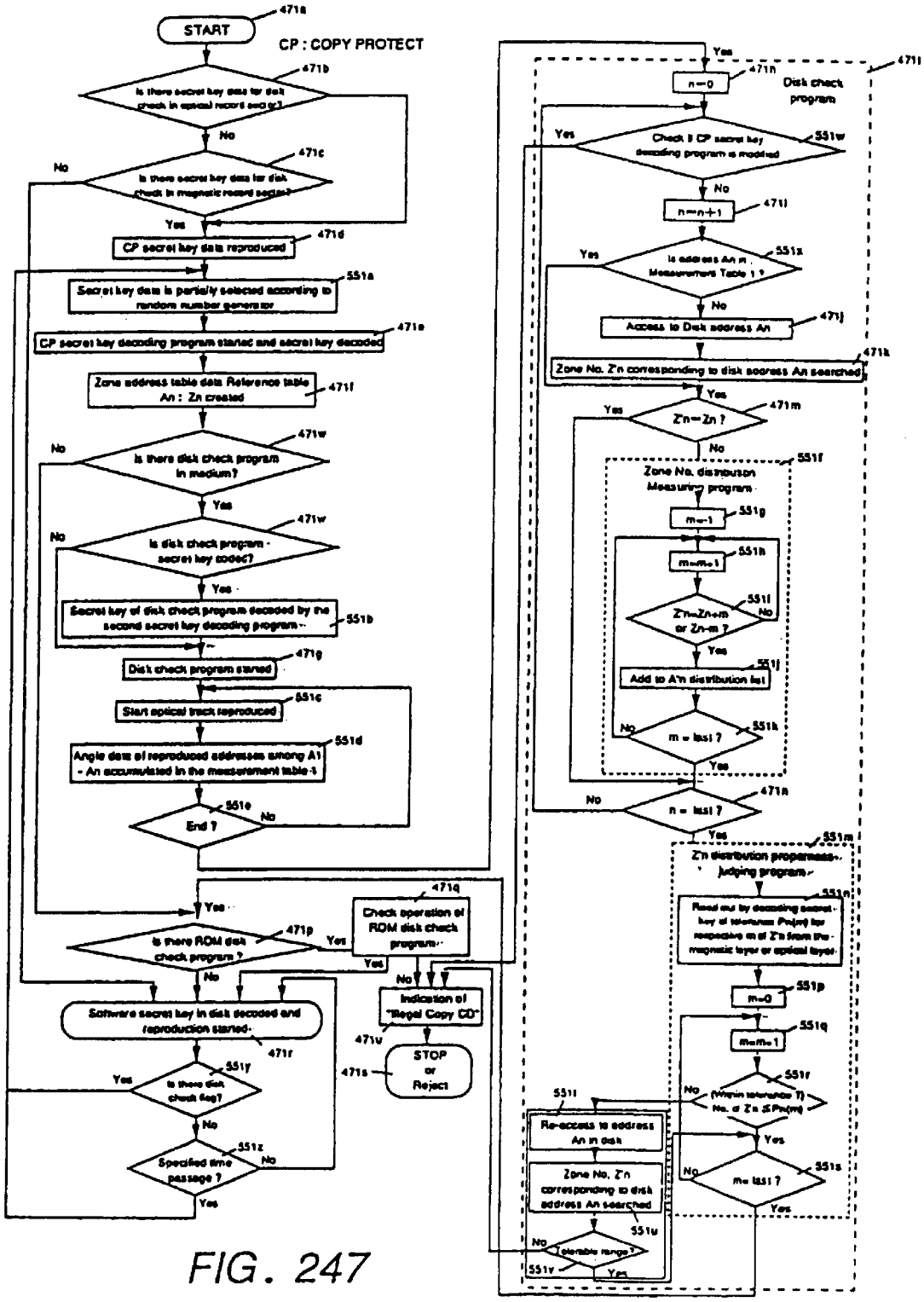

FIG. 247 is a flowchart of operation in the seventeenth embodiment.

Figure 248:
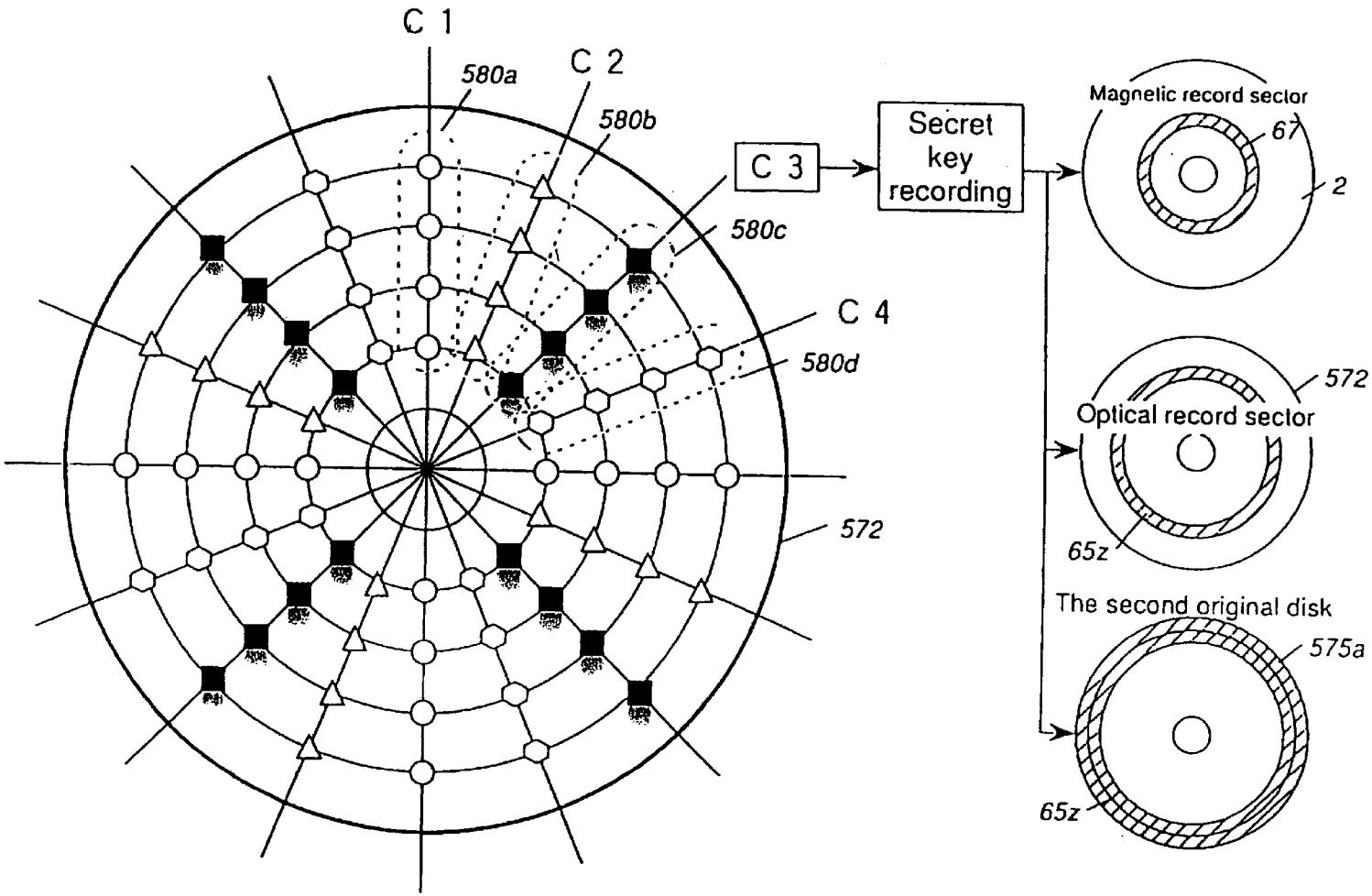

FIG. 248 is a diagram of an arrangement (layout) of addresses in an original disk in the seventeenth embodiment.

Figure 249:
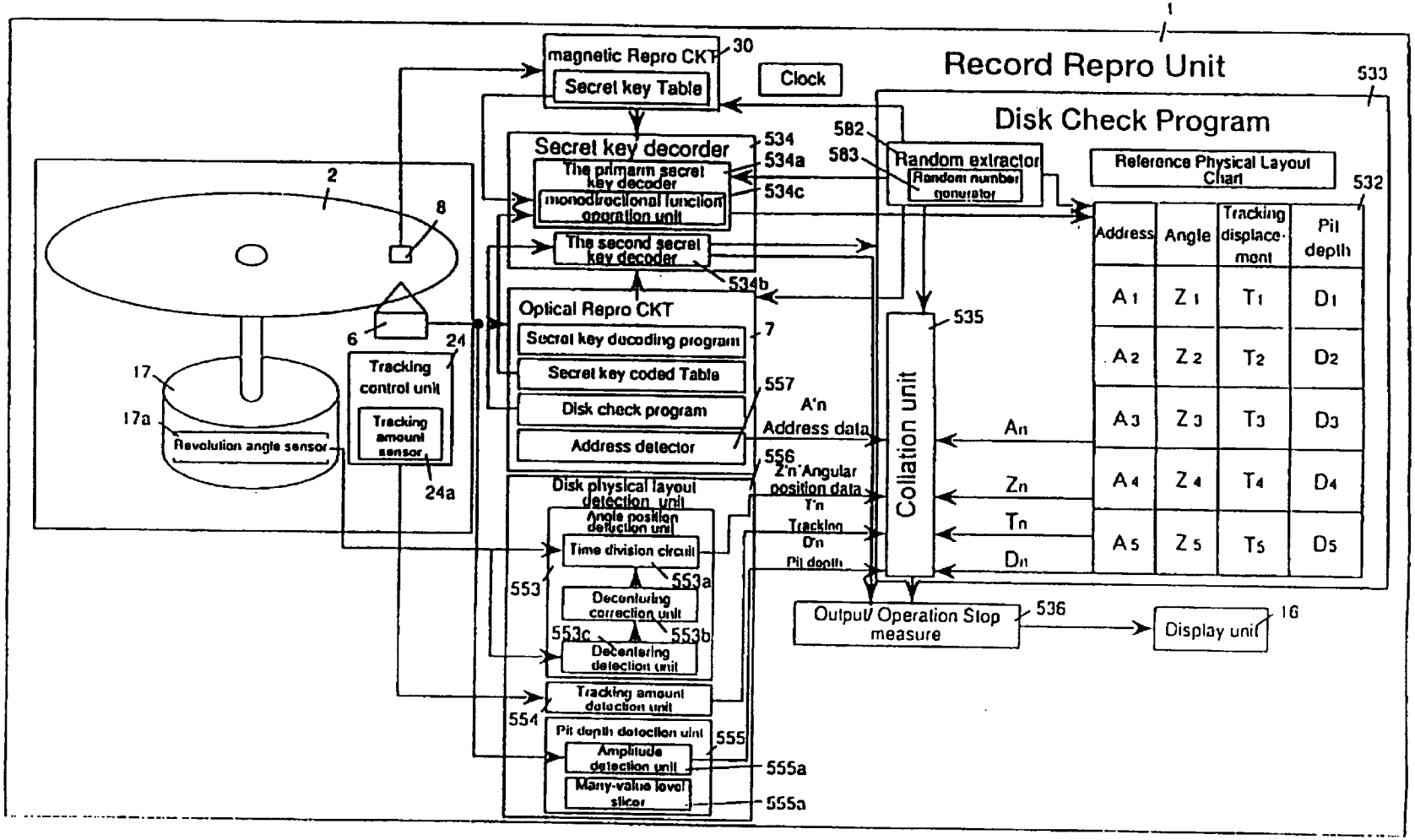

FIG. 249 is a block diagram of a recording and reproducing apparatus in the seventeenth embodiment.

Figure 250:
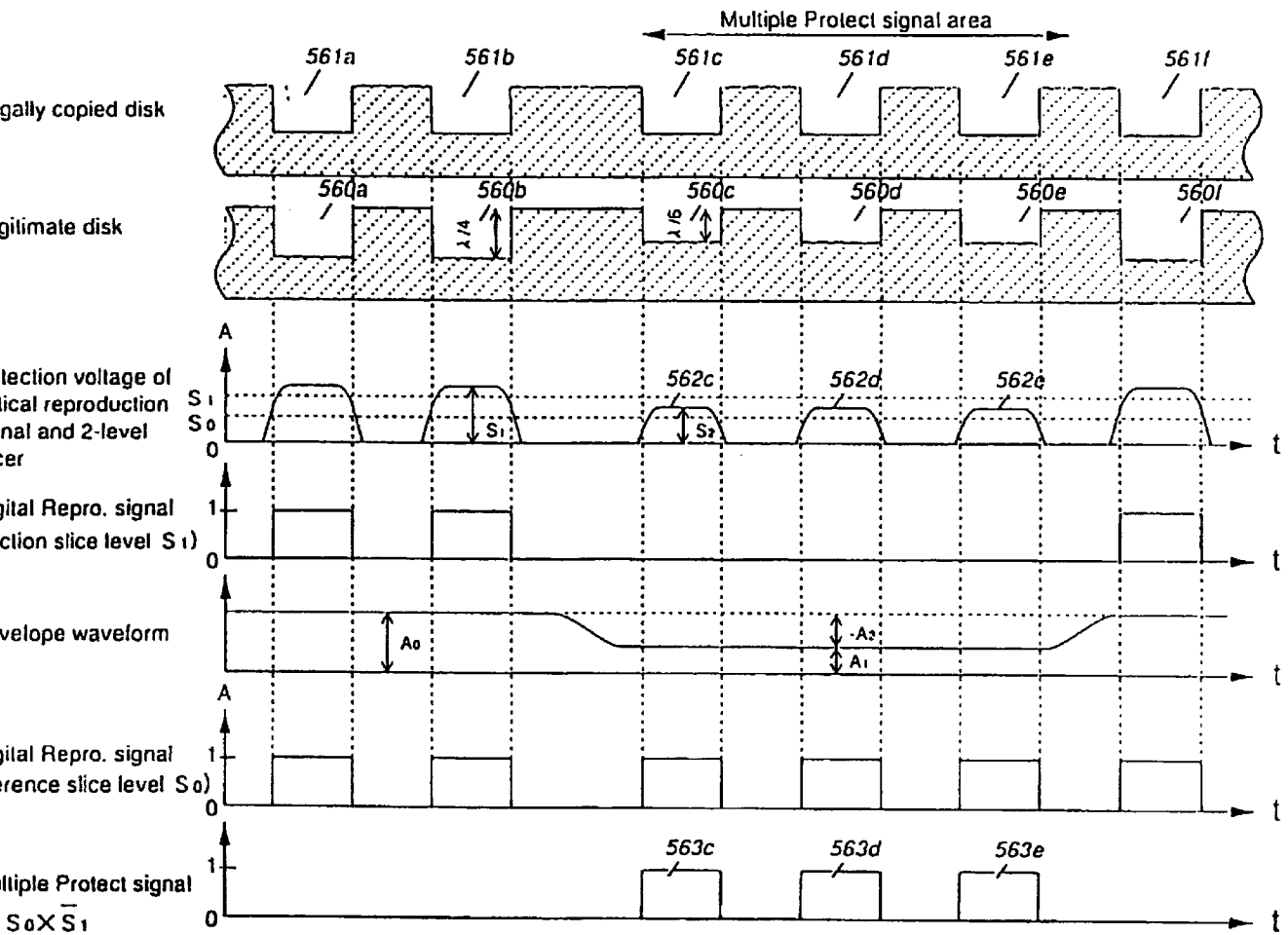

FIG. 250(a) is a sectional view of an illegal disk in the seventeenth embodiment.

FIG. 250(b) is a sectional view of a legal (legitimate) disk in the seventeenth embodiment.

FIG. 250(c) is a diagram of a waveform of an optical reproduced signal in the seventeenth embodiment.

FIG. 250(d) is a diagram of a waveform of a digital signal in the seventeenth embodiment.

FIG. 250(e) is a diagram of an envelope in the seventeenth embodiment.

FIG. 250(f) is a diagram of a waveform of a digital signal in the seventeenth embodiment.

FIG. 250(g) is a diagram of a waveform of a detection signal in the seventeenth embodiment.

Figure 251:
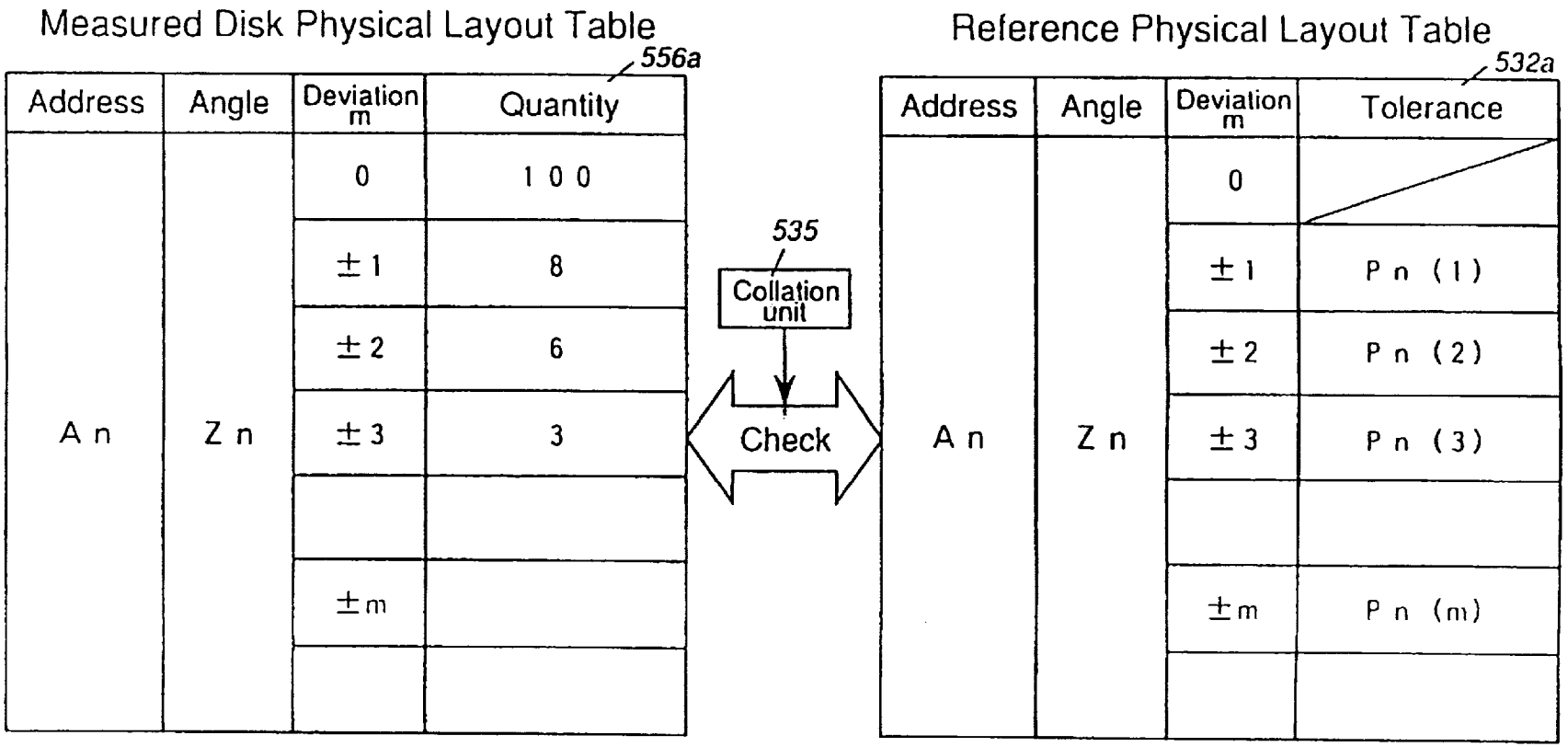

FIG. 251 is a diagram of a disk physical arrangement (layout) table in the seventeenth embodiment.

Figure 252:
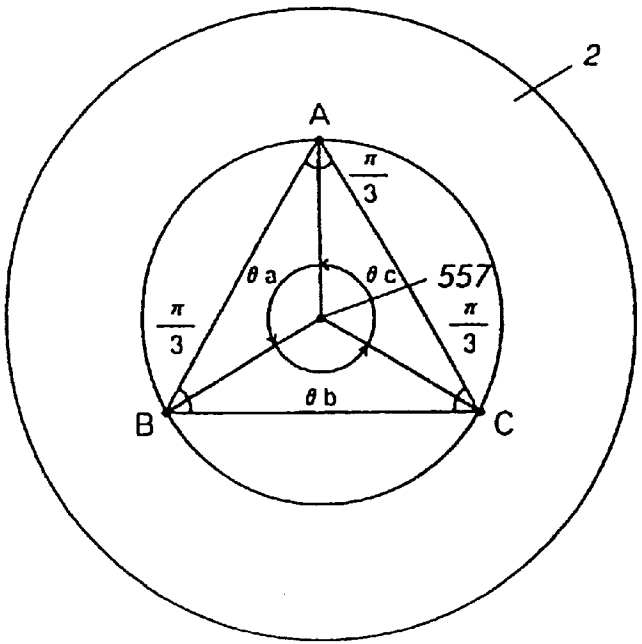
Figure 252:
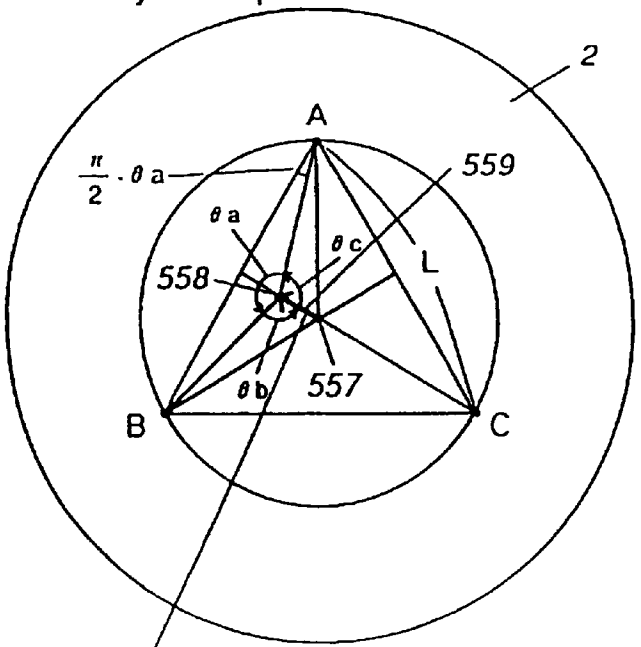

FIG. 252(a) is a diagram of an address arrangement (layout) in an optical disk free from an eccentricity in the seventeenth embodiment.

FIG. 252(b) is a diagram of an address arrangement (layout) in an optical disk with an eccentricity in the seventeenth embodiment.

FIG. 253(a) is a diagram of a tracking variation amount in a legal (legitimate) disk in the seventeenth embodiment.

FIG. 253(b) is a diagram of a tracking variation amount in an illegally copied disk in the seventeenth embodiment.

Figure 254:
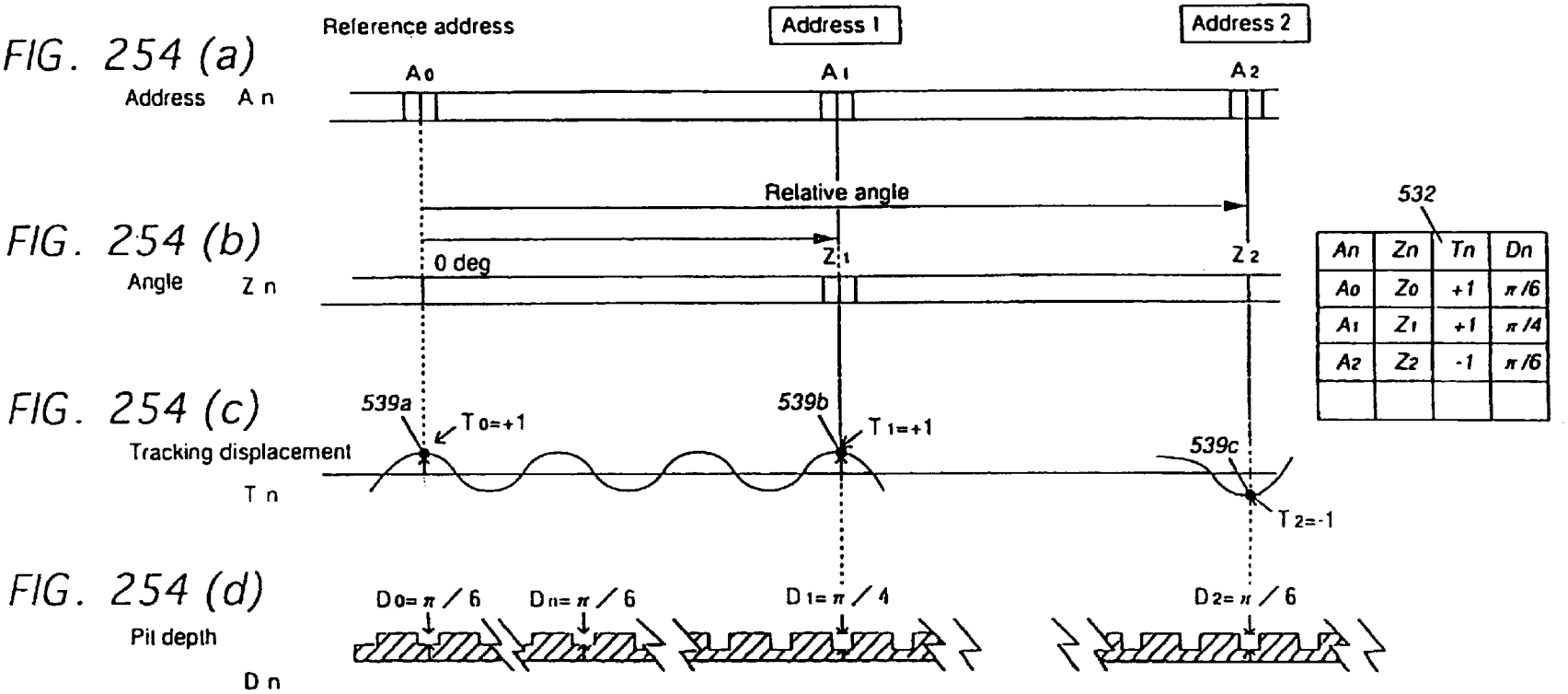
Figures 255A, 255B, 255C, 255D, 255E, 255F, 255G, 255H:
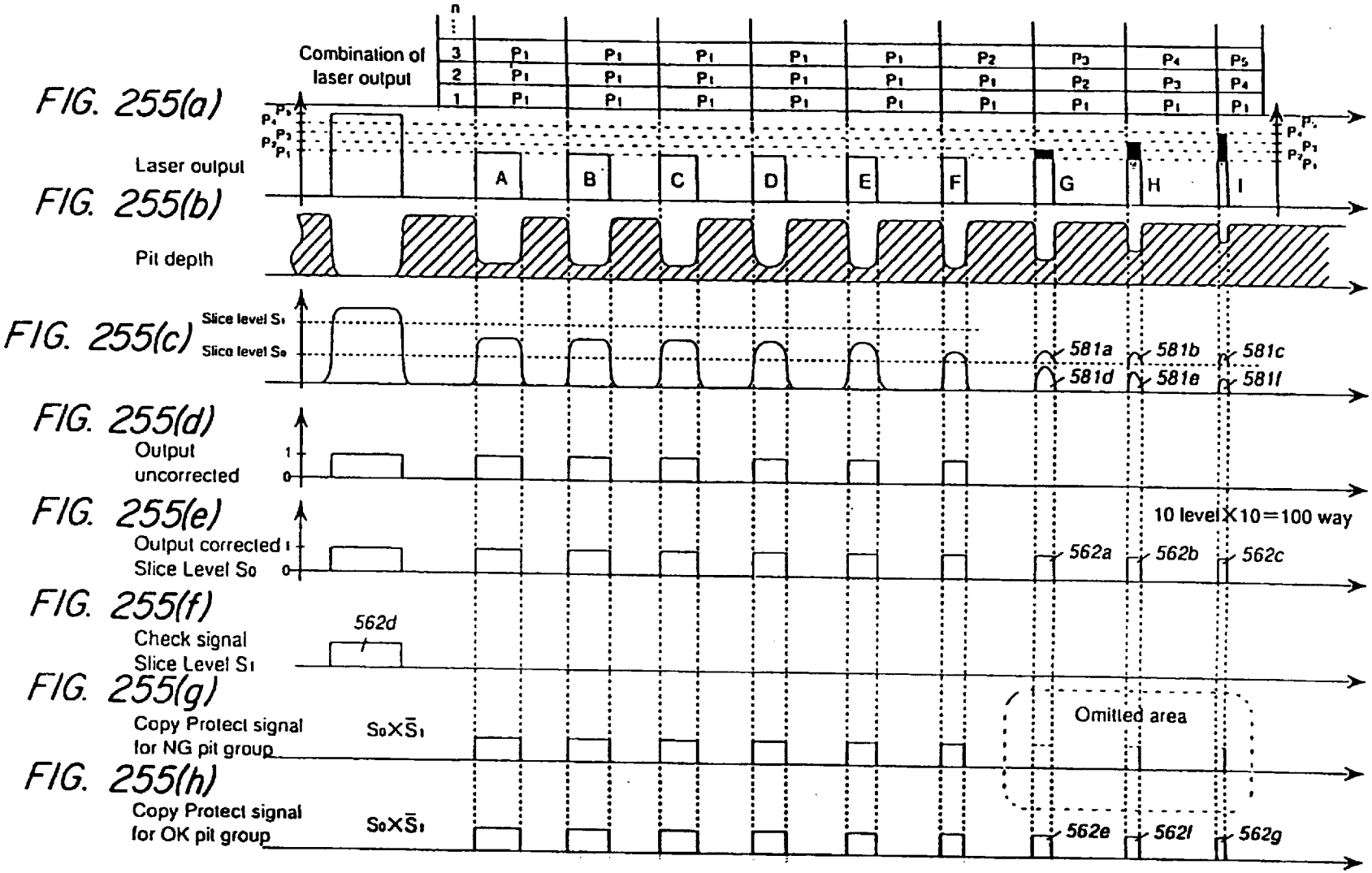

FIG. 254(a) is a diagram of an address An in the seventeenth embodiment.

FIG. 254(b) is a diagram of an angle Zn in the seventeenth embodiment.

FIG. 254(c) is a diagram of a tracking amount Tn in the seventeenth embodiment.

FIG. 254(d) is a diagram of a pit depth Dn in the seventeenth embodiment.

FIGS. 255(a)–255(h) are a time-domain diagram of an laser output, a pit depth, and a reproduced signal in the seventeenth embodiment.

FIG. 256 is a diagram of copy protection effects with respect to original disk making apparatuses in the seventeenth embodiment.

FIG. 257 is a block diagram of an original disk making apparatus in the seventeenth embodiment.

FIG. 258 is a block diagram of an original disk making apparatus in the seventeenth embodiment.

FIG. 259 is a block diagram of an original disk making apparatus in the seventeenth embodiment.

FIG. 260 is a block diagram of an original disk making apparatus in the seventeenth embodiment.

Figure 261:
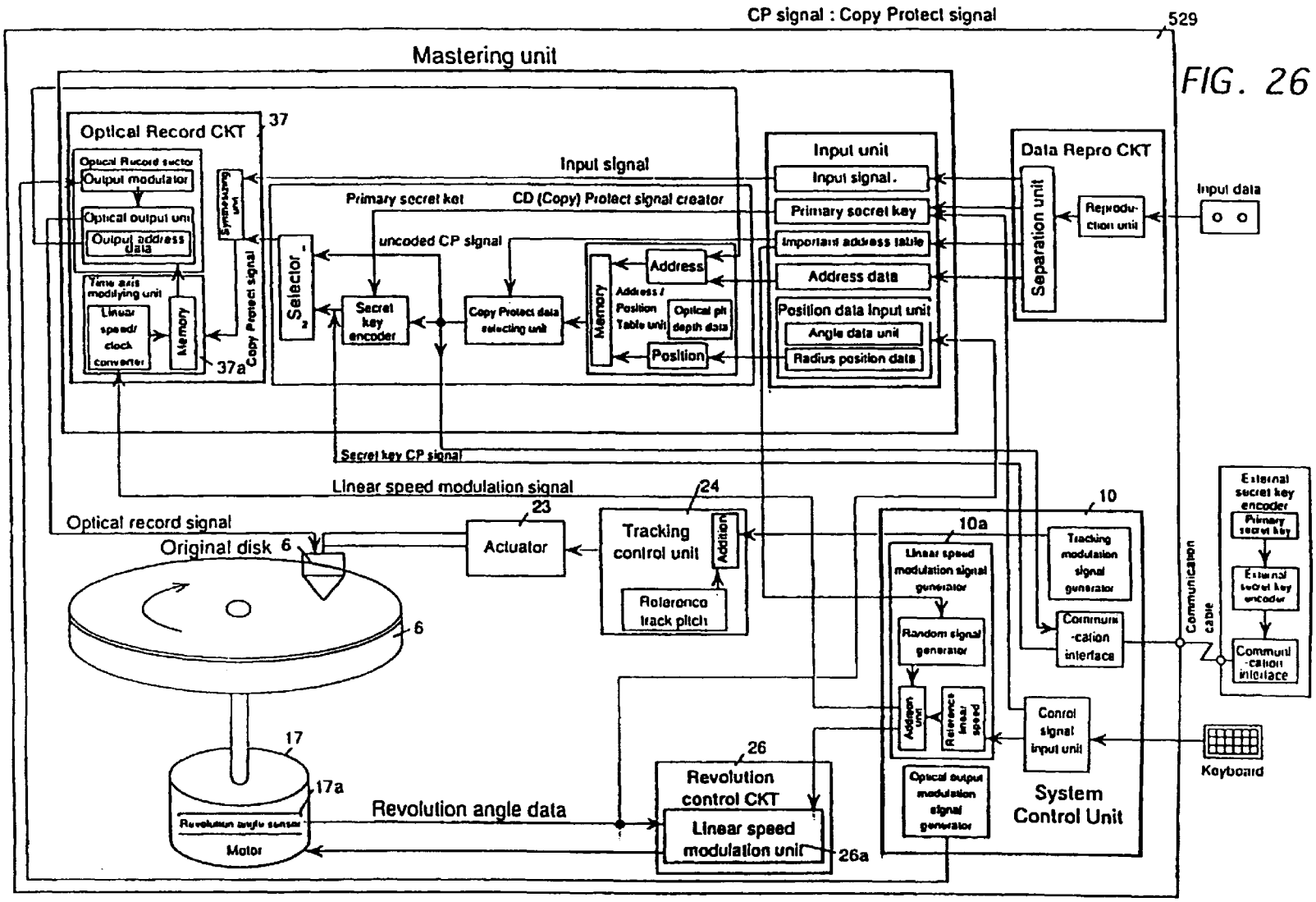

FIG. 261 is a block diagram of an original disk making apparatus in the seventeenth embodiment.

Figure 262:
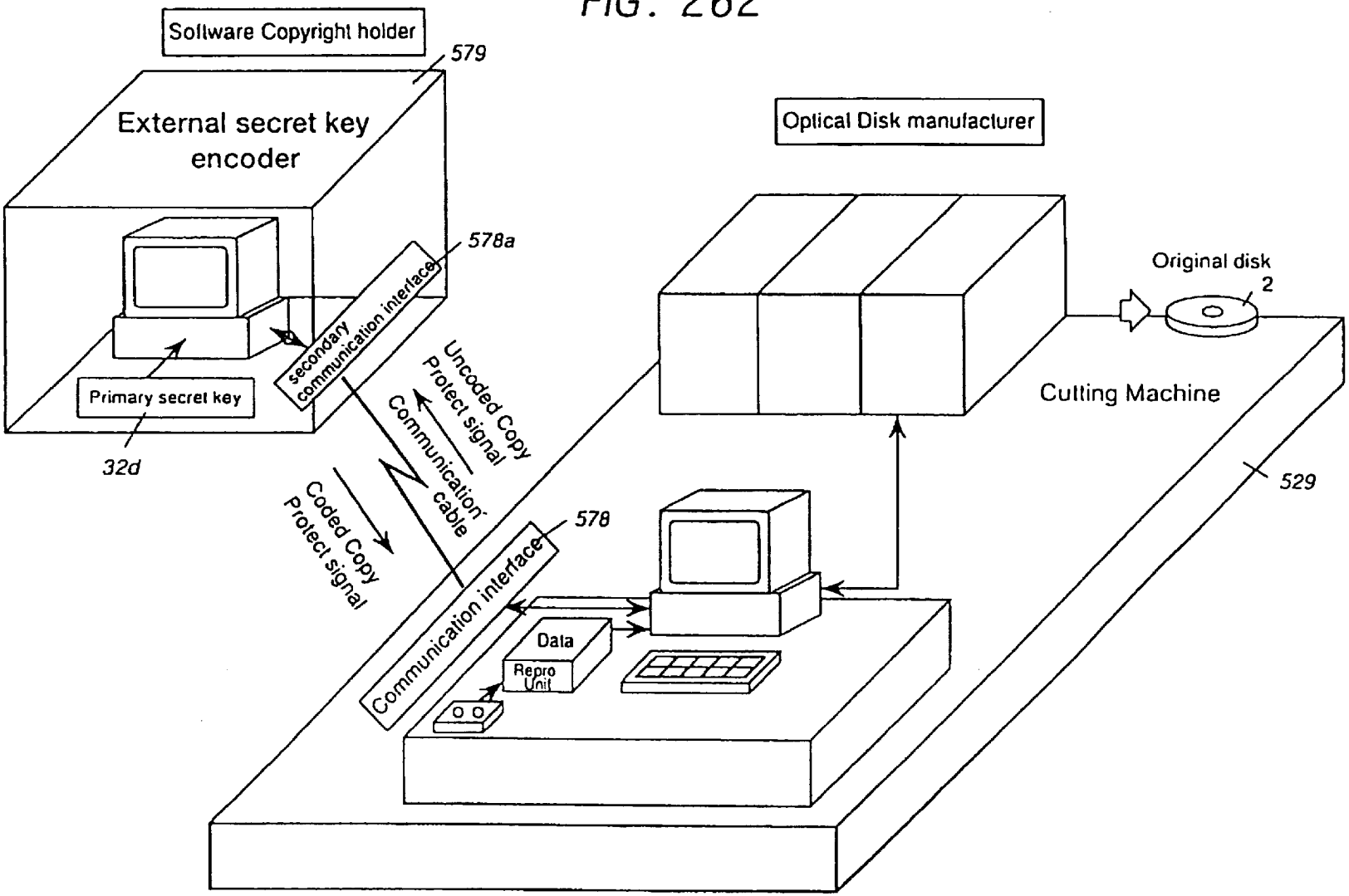

FIG. 262 is a block diagram of an original disk making system in the seventeenth embodiment.

Figure 263:
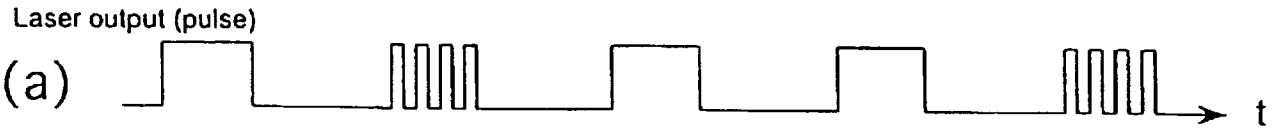
Figure 263:
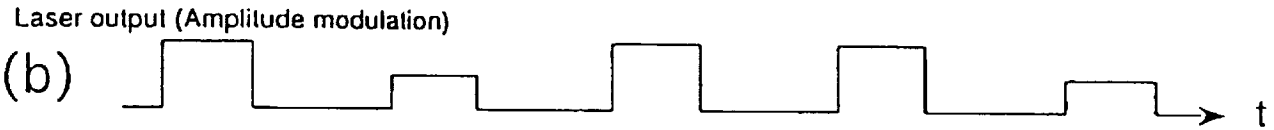
Figure 263:
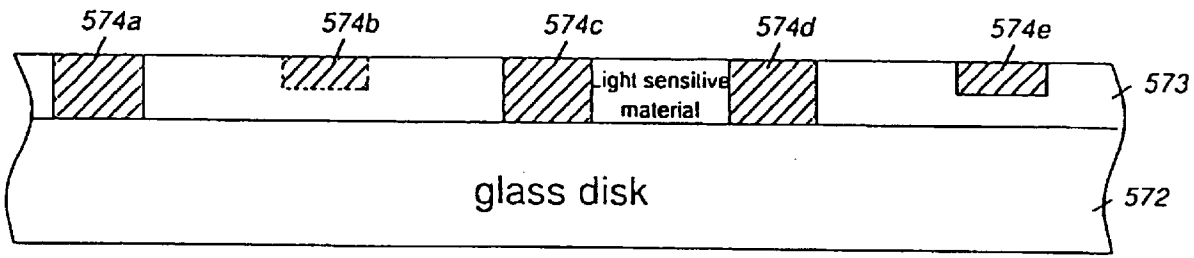
Figure 263:
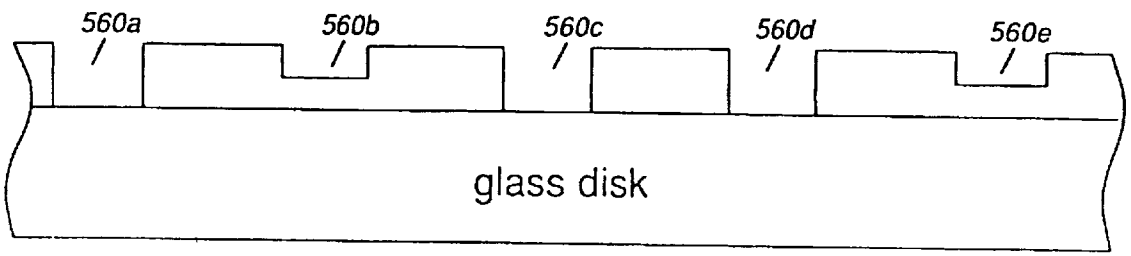
Figure 263:
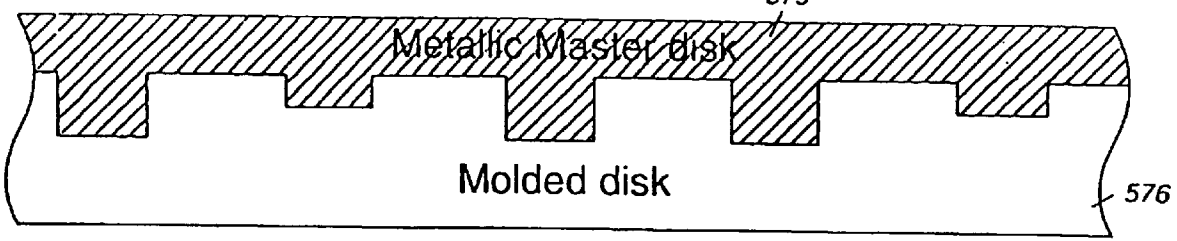
Figures 264A, 264B, 264C, 264D, 264E, 264F, 264G, 264H:
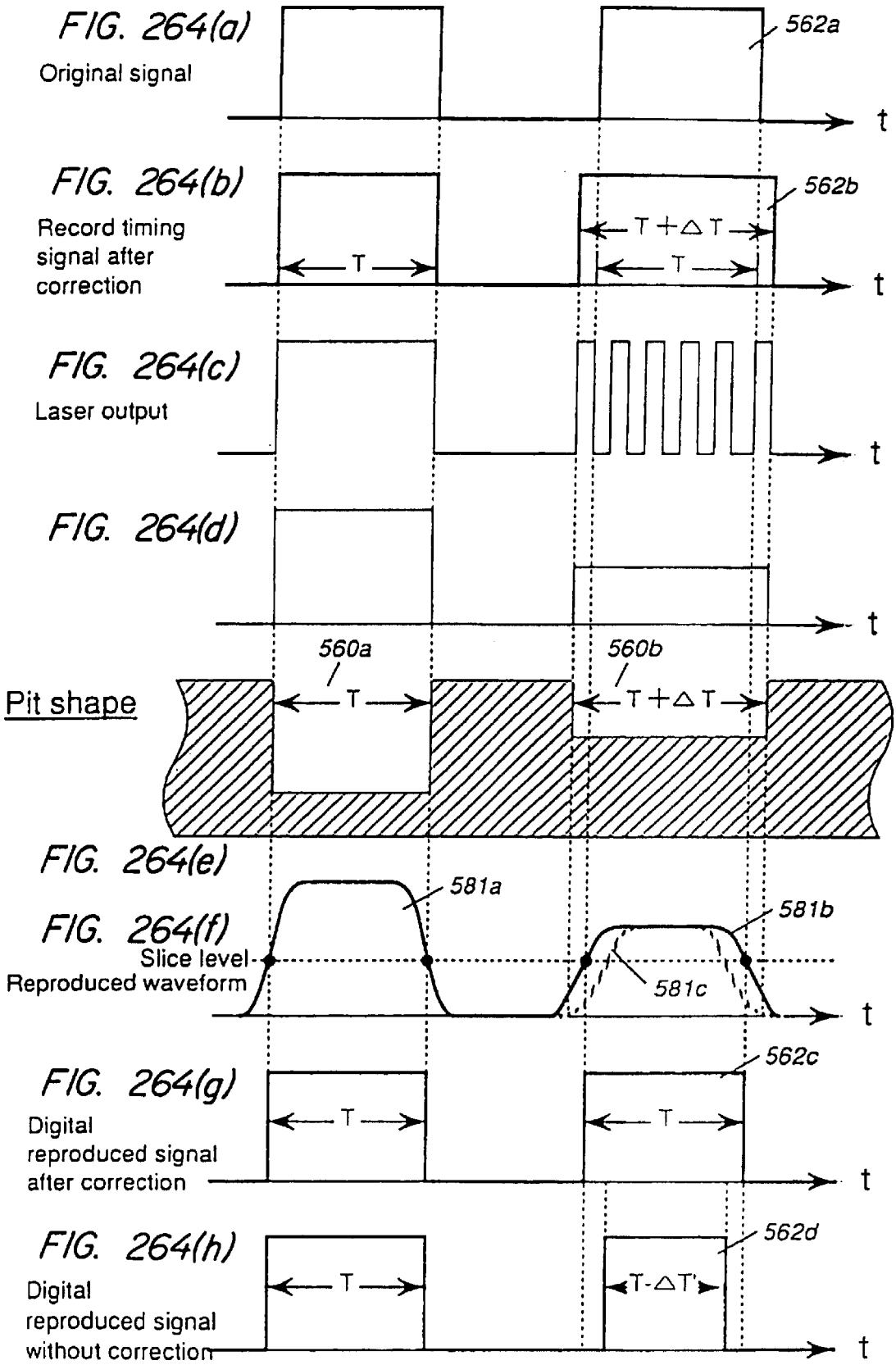

FIG. 263(a) is a diagram of a waveform of a laser output in the seventeenth embodiment.

FIG. 263(b) is a diagram of a waveform of a laser output in the seventeenth embodiment.

FIG. 263(c) is a sectional view of a disk substrate in the seventeenth embodiment.

FIG. 263(d) is a sectional view of a disk substrate in the seventeenth embodiment.

FIG. 263(e) is a sectional view of a molded disk in the seventeenth embodiment.

FIGS. 264(a)–264(h) are a diagram of the relation between a laser record output and a reproduced signal in the seventeenth embodiment.

FIGS. 265(a)–265(j) are a diagram of steps of making an original disk in the seventeenth embodiment.

Figure 266:
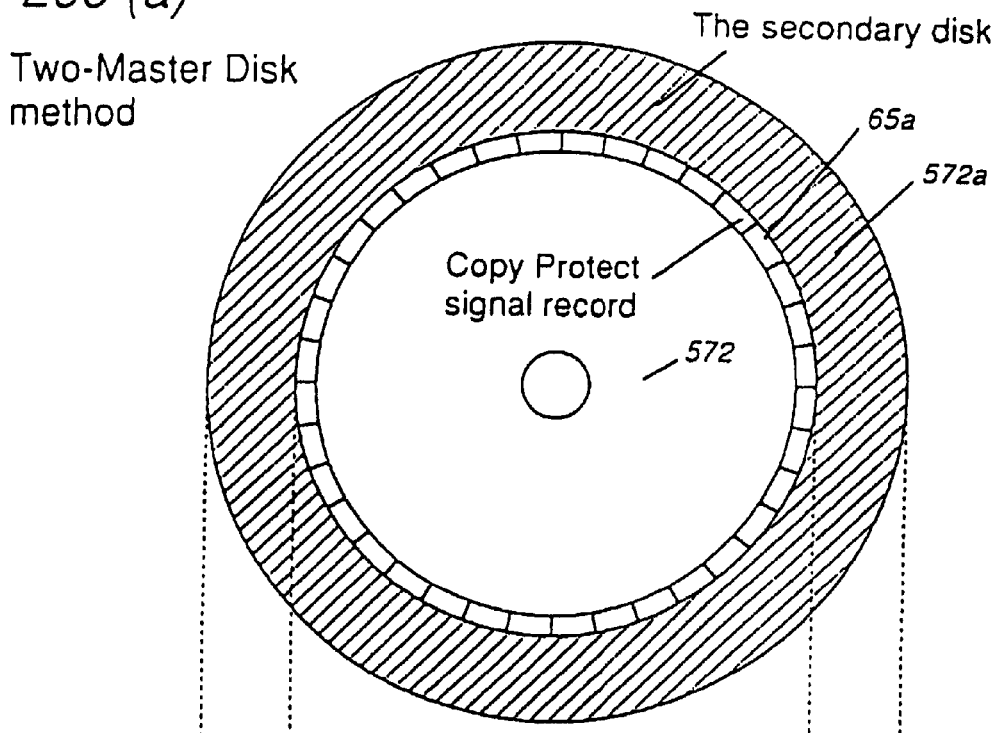
Figure 266:
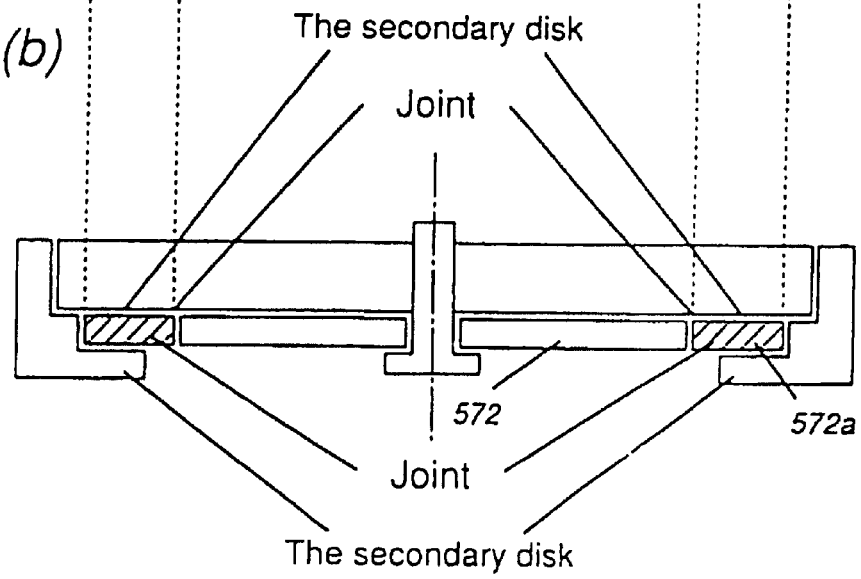
Figure 267A:
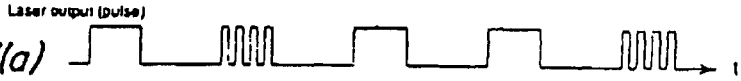
Figure 267B:
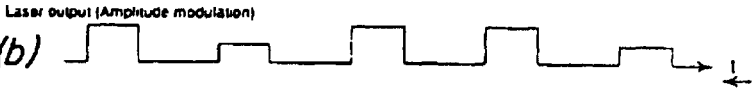
Figure 267C:
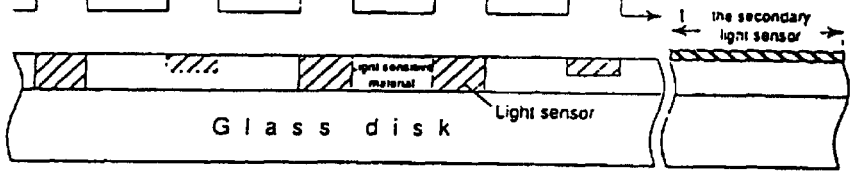
Figure 267D:
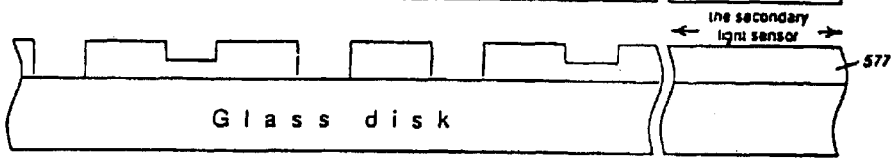
Figure 267E:
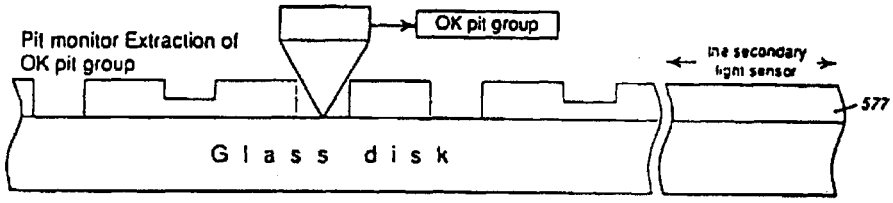
Figure 267F:
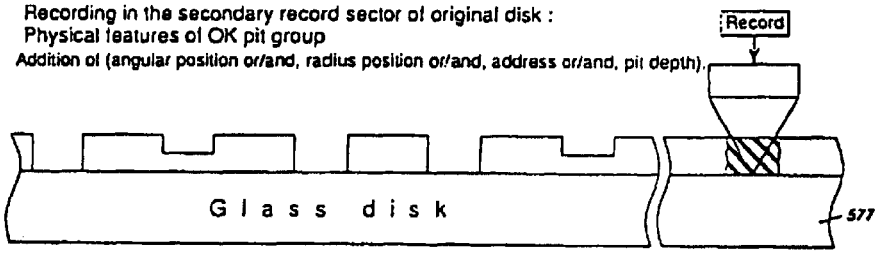
Figure 267G:
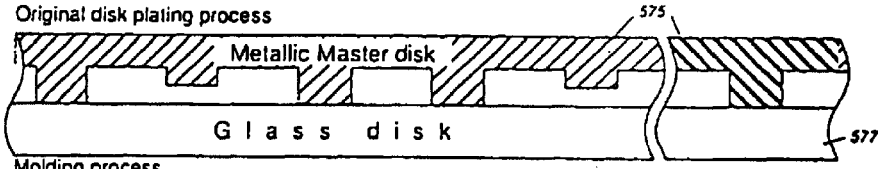
Figure 267H:
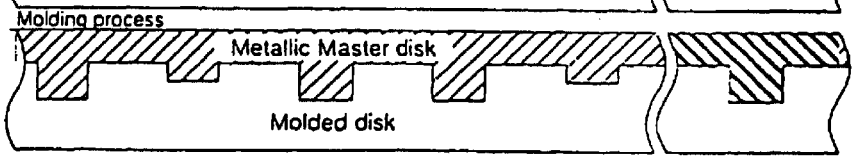
Figure 267I:
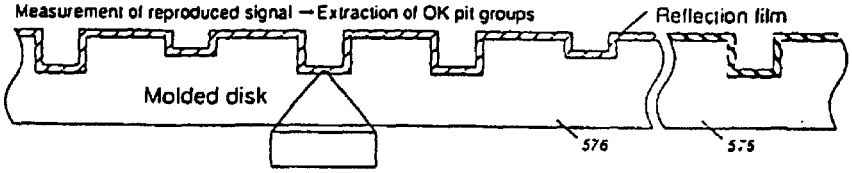

FIG. 266(a) is a top view of an original disk in the seventeenth embodiment.

FIG. 266(b) is a sectional view of a press of an original disk in the seventeenth embodiment.

FIGS. 267(a)–267(i) are a diagram of steps of making an original disk in the seventeenth embodiment.

Figure 268A:
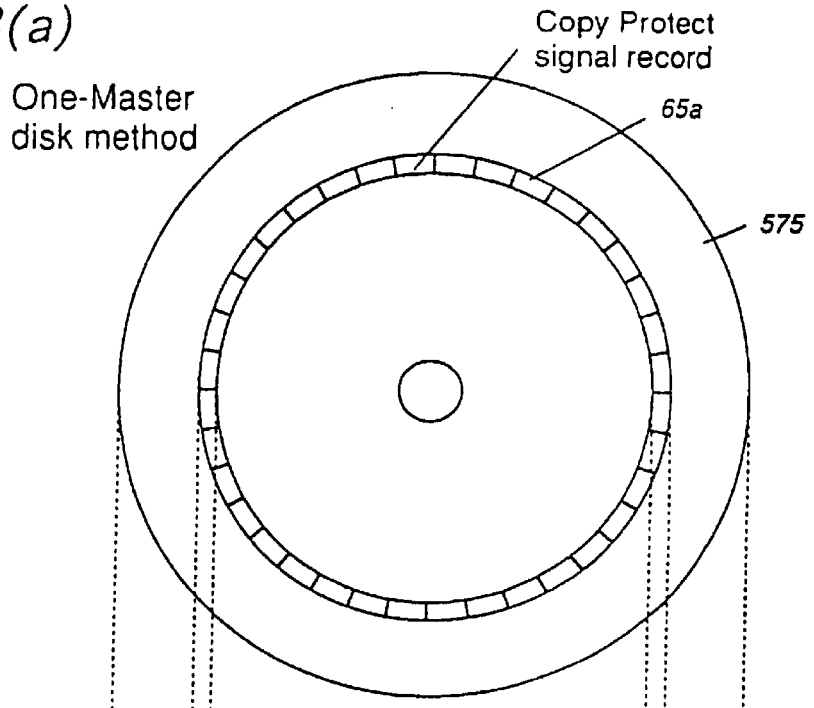

FIG. 268(a) is a top view of an original disk in the seventeenth embodiment.

Figure 268B:
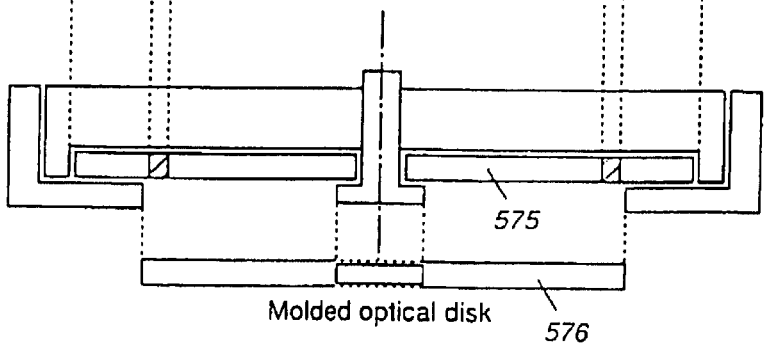

FIG. 268(b) is a sectional view of a press of an original disk in the seventeenth embodiment.

Figure 269:
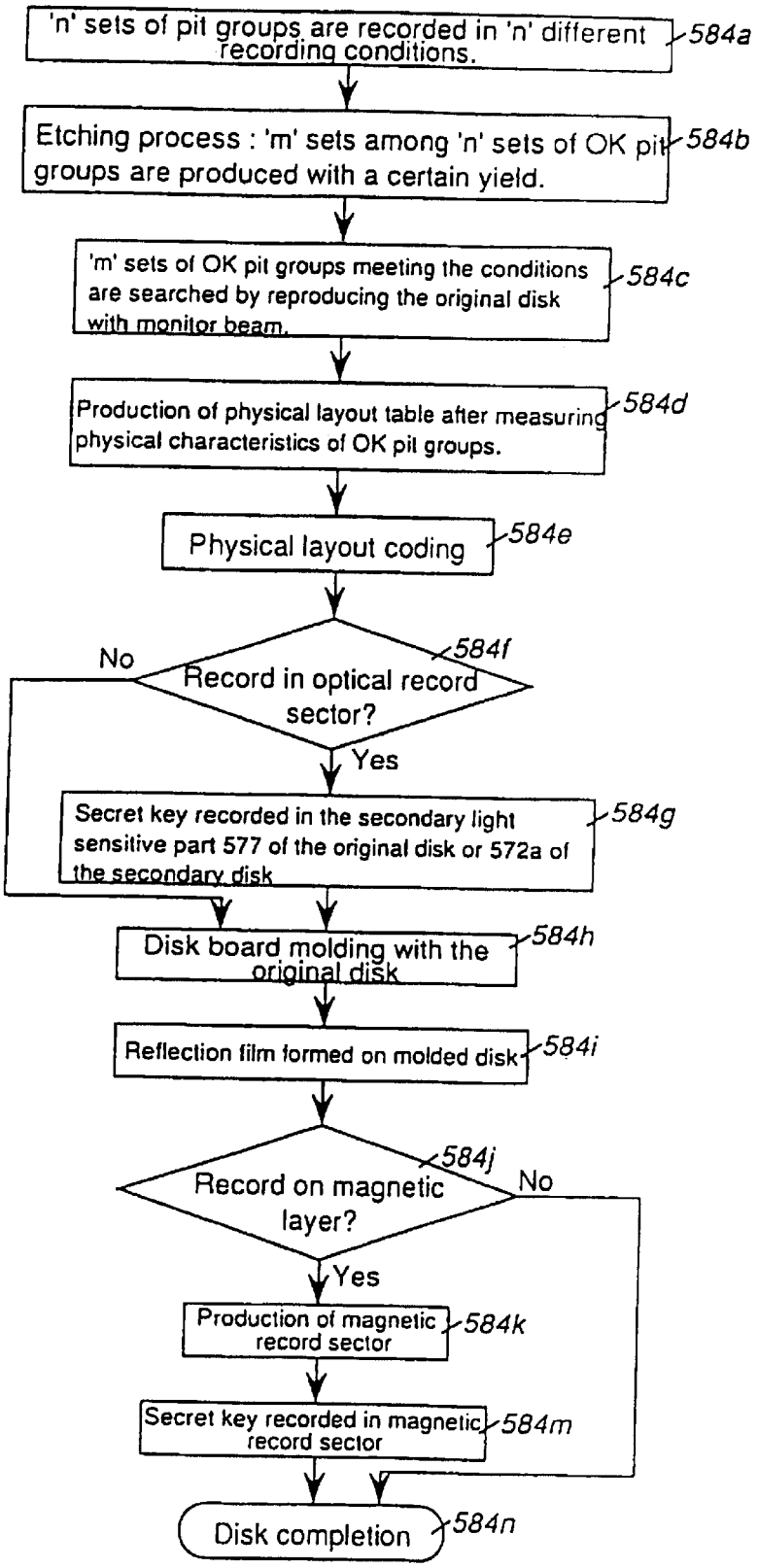

FIG. 269 is a flowchart of operation in the seventeenth embodiment.

Figure 270:
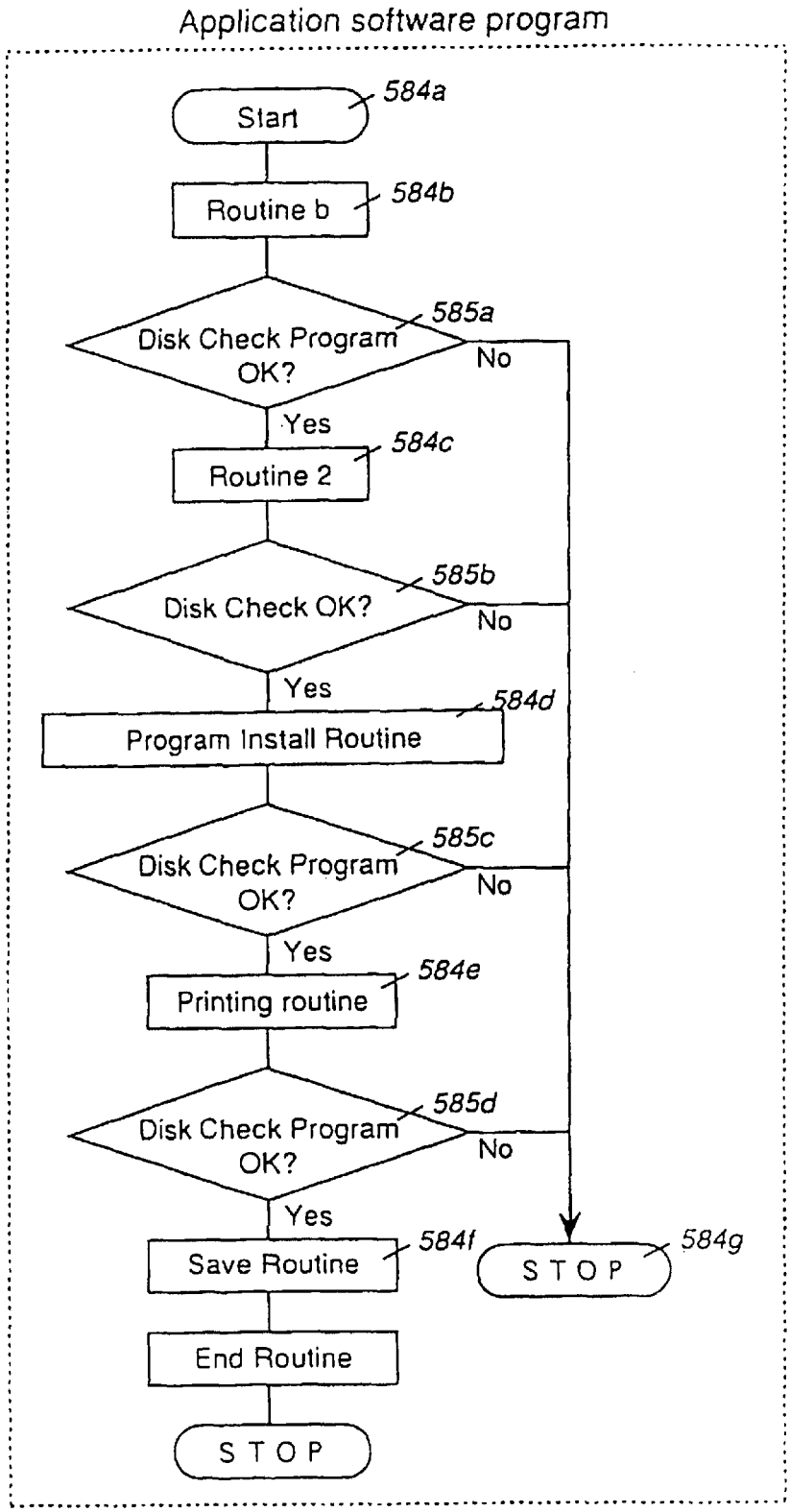

FIG. 270 is a flowchart of an application software in the seventeenth embodiment.

Figure 271:
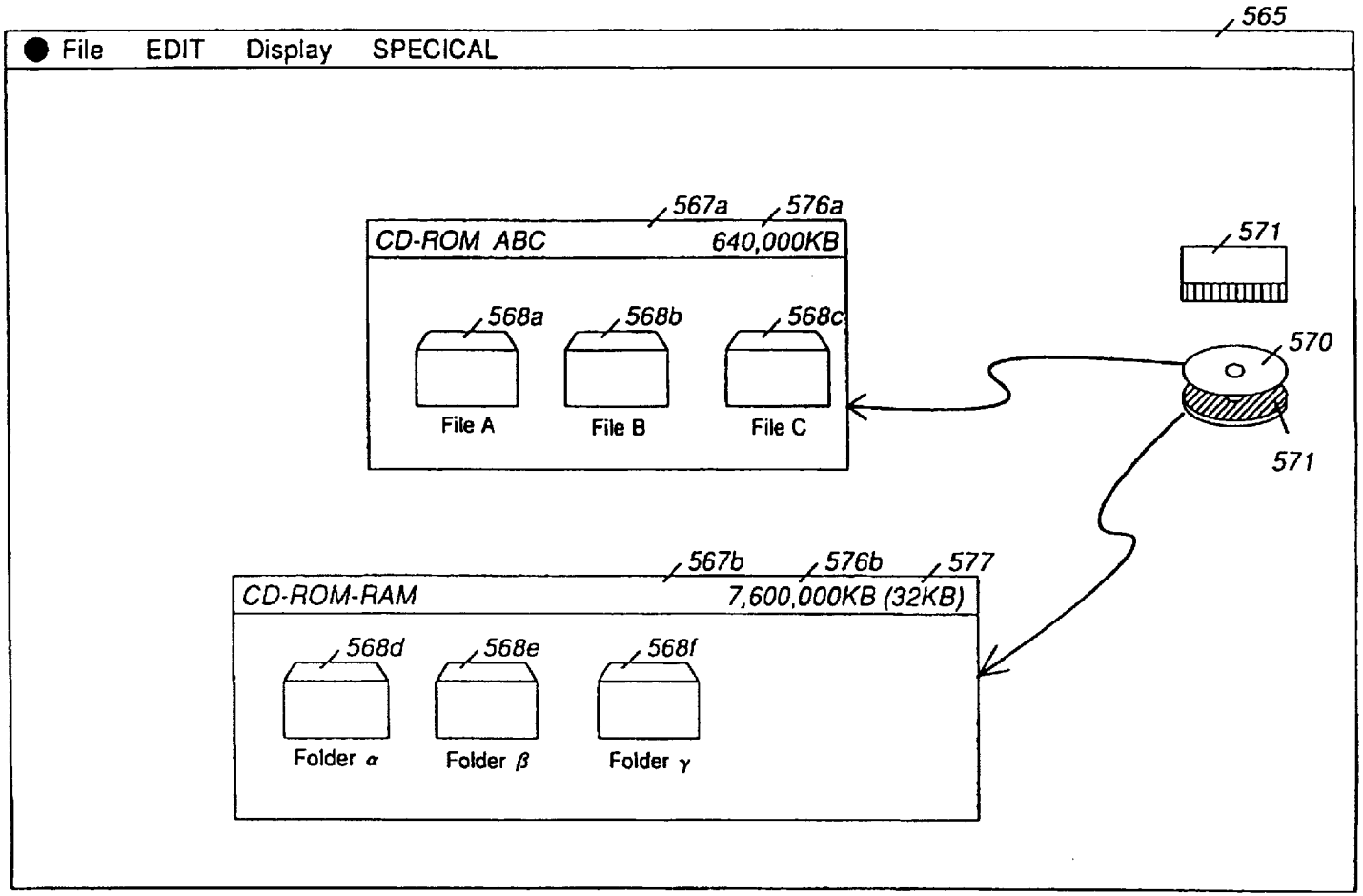

FIG. 271 is a diagram of display operation in the twenty-second embodiment.

Figure 272:
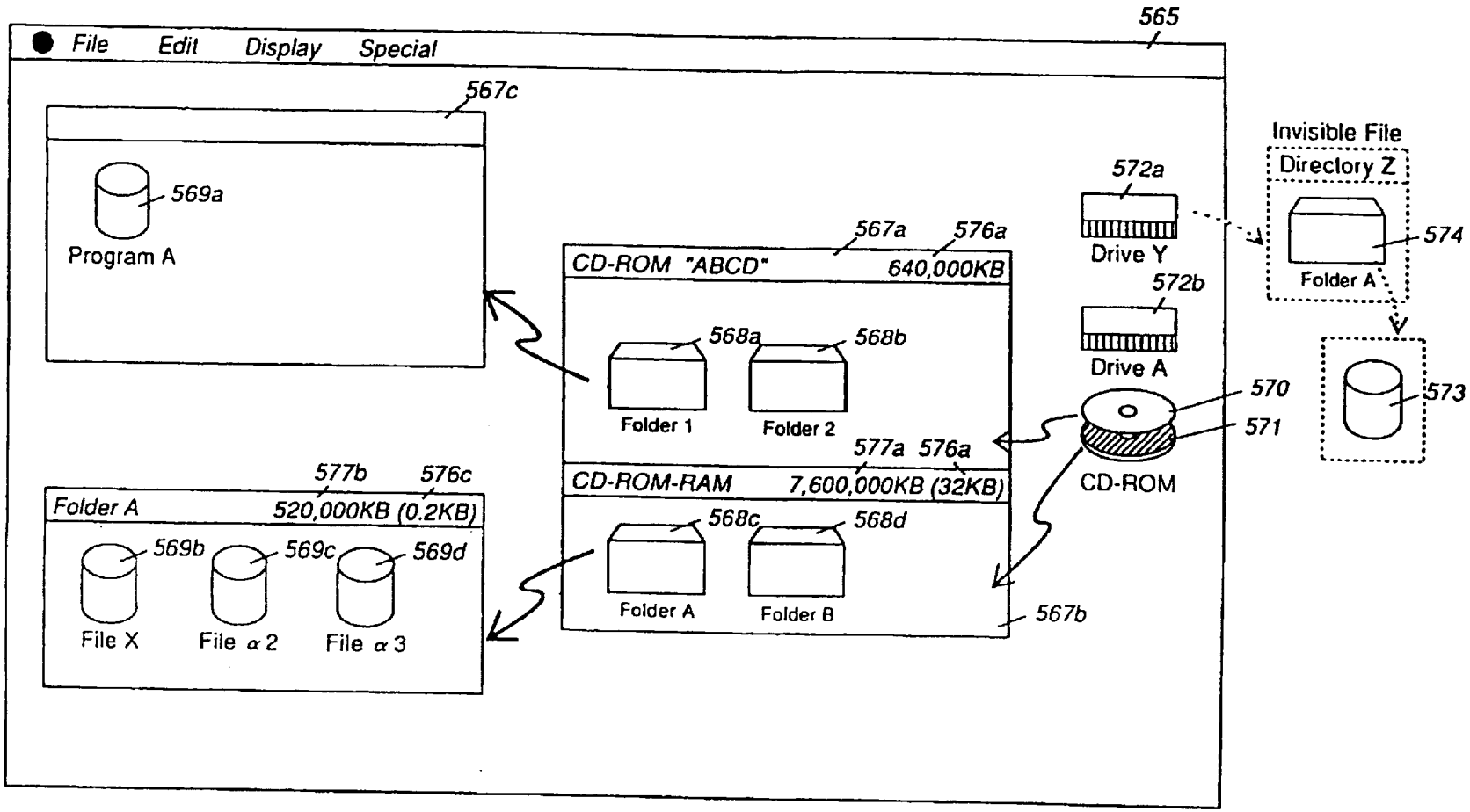

FIG. 272 is a diagram of display operation in the twenty-second embodiment.

Figure 273:
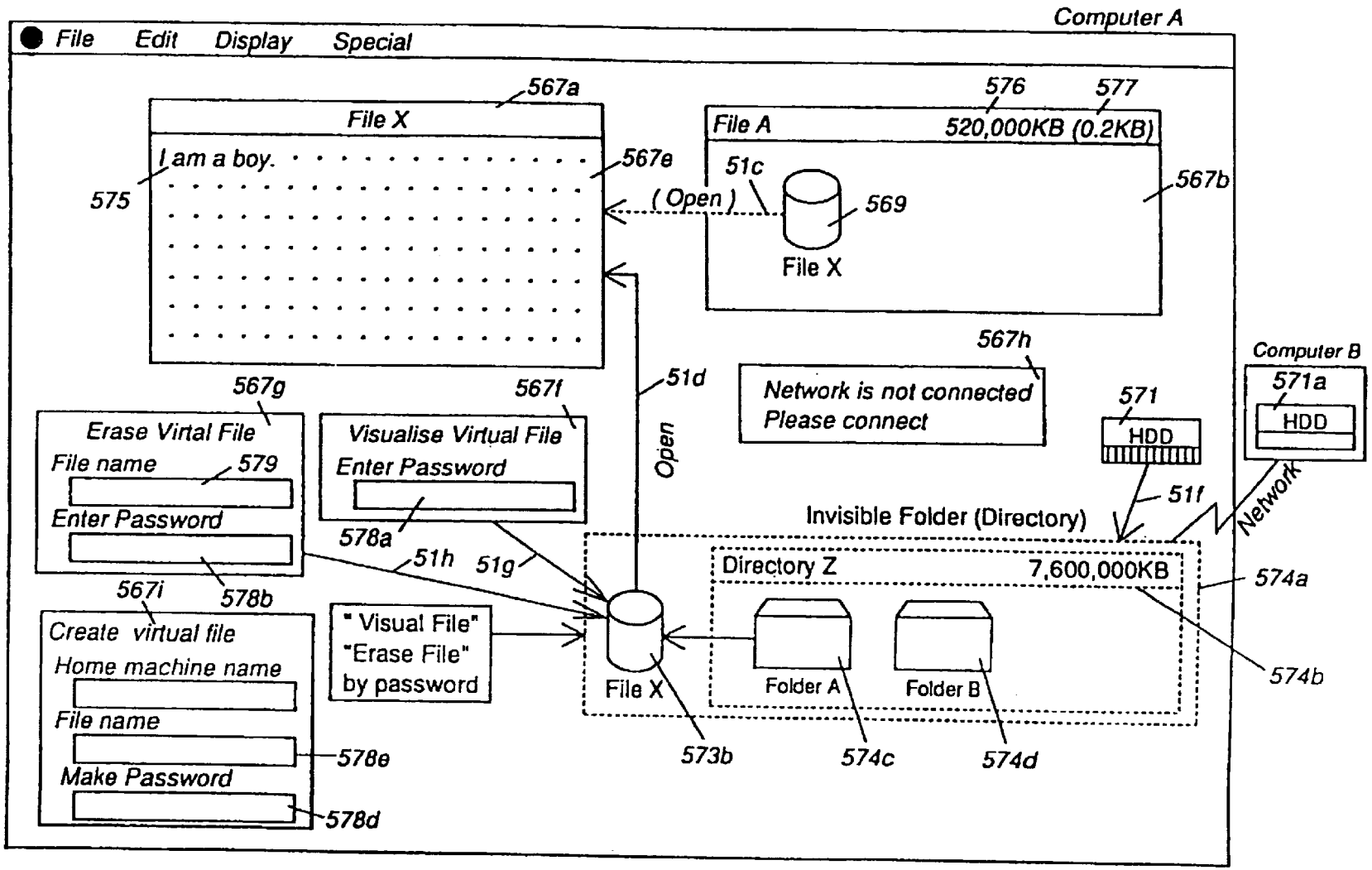

FIG. 273 is a diagram of display operation in the twenty-second embodiment.

Figure 274:
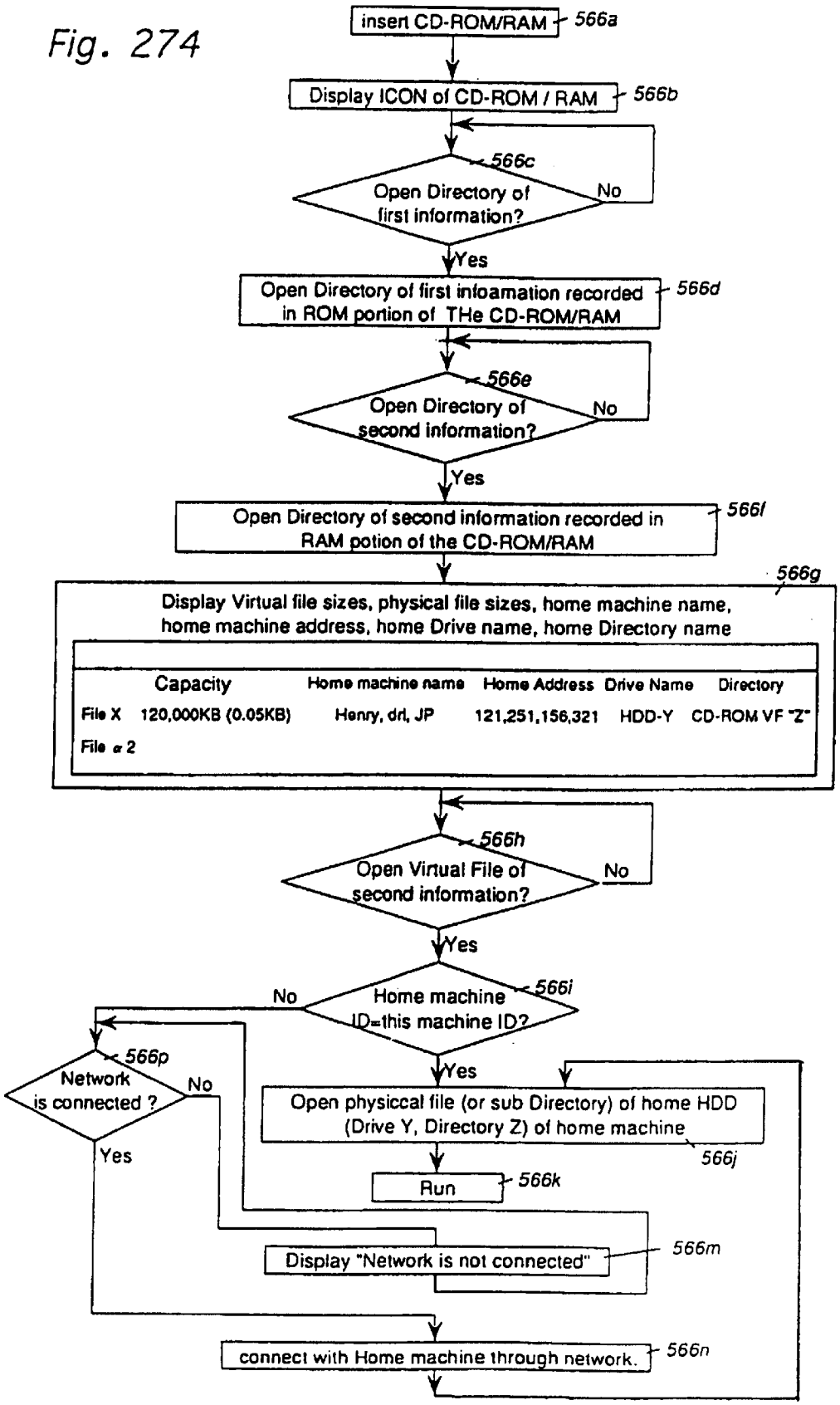

FIG. 274 is a flowchart of a program for indicating a virtual file in a window in the twenty-second embodiment.

DESCRIPTION OF THE FIRST PREFERRED EMBODIMENT

Figure 1:
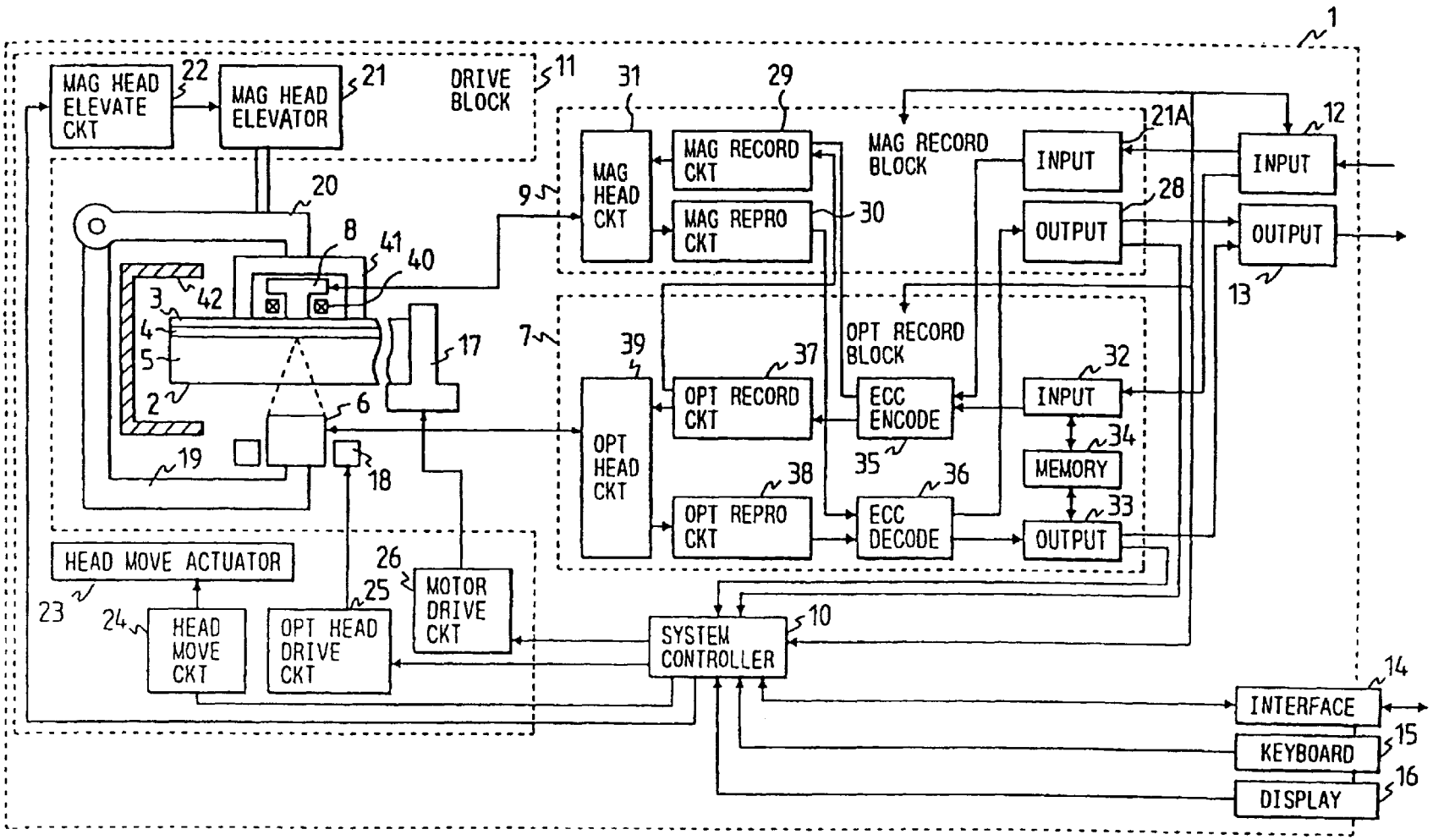
FIG. 1 is a block diagram of a recording and reproducing apparatus according to a first embodiment of this invention

With reference to FIG. 1, a recording and reproducing apparatus 1 contains a recording medium 2 which includes a laminated structure of a magnetic recording layer 3, an optical recording layer 4, and a transparent layer 5.

During the magneto-optical reproduction, light emitted from a light emitting section is focused on the optical recording layer 4 by an optical head 6 and an optical recording block 7, and a magneto-optically recording signal is reproduced from the recording medium 2.

During the magneto-optical recording, laser light is focused on a given region of the optical recording layer 4 by the optical head 6 and the optical recording block 7 so that a temperature at the given region increases to or above a Curie temperature of the optical recording layer 4. Under these conditions, a magnetic field applied to the given region of the optical recording layer 4 is modulated by a magnetic head 8 and a magnetic recording block 9 in response to information to be recorded, so that recording of the information on the optical recording layer 4 is done.

During the magnetic recording, the magnetic head 8 and the magnetic recording block 9 are used in recording information on the magnetic recording layer 3.

A system controller 10 receives operating information and output information from various circuits, and drives a drive block 11 and executes control of a motor 17 and tracking and focusing control with respect to the optical head 6. The system controller 10 includes a microcomputer or a similar device having a combination of a CPU, a ROM, a RAM, and an I/O port. The system controller 10 operates in accordance with a program stored in the ROM.

Figure 2:
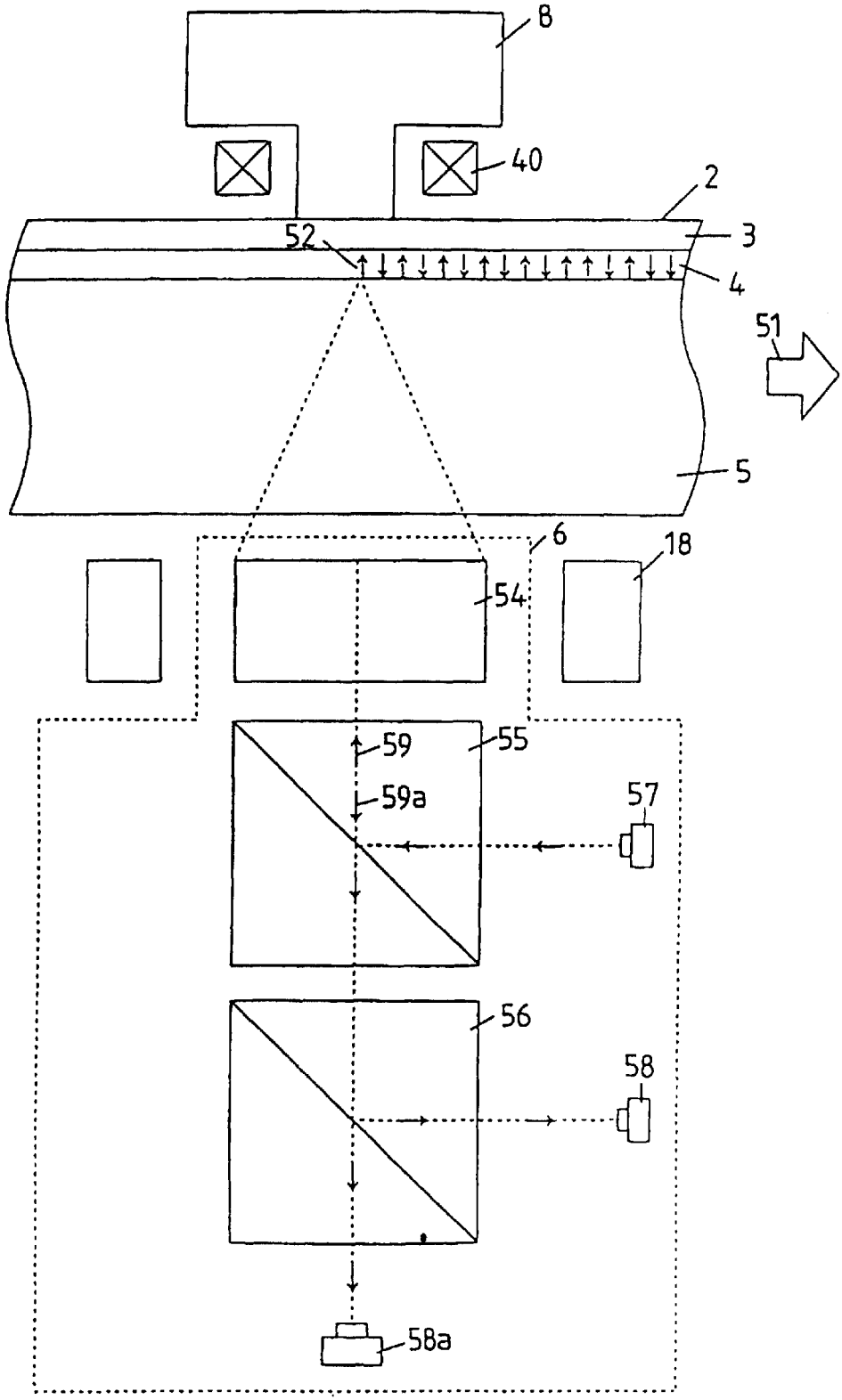
FIG. 2 is an enlarged view of an optical recording head portion in the first embodiment.

In the case where an input signal fed from an exterior is required to be recorded, a recording instruction is fed to the system controller 10 from an interface 14 or a keyboard 15 in response to the reception of the input signal or the operation of the keyboard 15 by the user. The system controller 10 outputs an inputting instruction to an input section 12, and also outputs an optical recording instruction to the optical recording block 7. The input signal, for example, an audio signal or a video signal, is received by the input section 12 and is converted by the input section 12 into a digital signal of a given format such as a PCM format. The digital signal is fed from the input section 12 to an input section 32 of the optical recording block 7, being coded by an ECC encoder 35 for error correction. An output signal of the ECC encoder 35 is transmitted to the magnetic head 8 via an optical recording circuit 37, and a magnetic recording circuit 29 and a magnetic recording circuit 29 in the magnetic recording block 9. The magnetic head 8 generates a recording magnetic field responsive to an optical recording signal, and applies the magnetic field to magneto-optical material (photo-magnetic material) in a given region of the optical recording layer 4. Recording material in a narrower region of the optical recording layer 4 is heated to a Curie temperature or higher by laser light applied from the optical head 6, so that this region of the optical recording layer 4 undergoes a magnetization change or transition responsive to the applied magnetic field. Thus, as shown in FIG. 2, narrower regions of the optical recording layer 4 are sequentially magnetized as denoted by arrows 52 while the recording medium 2 is rotated and scanned in a direction 51.

During the previously-mentioned recording of information on the optical recording layer 4, the system controller 10 receives tracking information, address information, and clock information from an optical head circuit 39 and an optical reproducing circuit 38 which have been recorded on the optical recording layer 4, and the system controller 10 outputs control information to the drive block 11 on the basis of the received information. Specifically, the system controller 10 feeds a control signal to a motor drive circuit 26 to control the rotational speed of the motor 17 for driving the recording medium 2 so that a relative speed between the optical head 6 and the recording medium 2 will be equal to a given linear velocity.

An optical head drive circuit and an optical head actuator 18 execute tracking control responsive to a control signal from the system controller 10 so that a light beam will scan a target track on the recording medium 2. In addition, the optical head drive circuit and the optical head actuator 18 execute focusing control responsive to a control signal from the system controller 10 so that the light beam will be accurately focused on the optical recording layer 4.

In the case where the access to another track is required, a head moving circuit 24 and a head moving actuator 23 moves a head base 19 in response to a control signal from the system controller 10 so that the optical head 6 and the magnetic head 8 on the head base 19 will be moved together. Thus, the both heads reach equal radial positions on opposite surfaces of the recording medium 2 which align with a desired track.

A head elevator 20 for the magnetic head 8 is driven by a magnetic head elevating circuit 22 and an elevating motor 21 in response to a control signal from the system controller 10. During a time where a disk cassette 42 is being loaded with the recording medium 2 or where magnetic recording is not executed, the magnetic head 8 and a slider 41 are separated from the magnetic recording layer 3 of the recording medium 2 to prevent wear of the magnetic head 8.

As described previously, the system controller 10 feeds various control signals to the drive block 11, and thereby executes tracking control and focusing control of the optical head 6 and the magnetic head 8, elevation control of the magnetic head 8, and control of the rotational speed of the motor 17.

A description will now be given of a method of reproducing a magneto-optically recorded signal. As shown in FIG. 2, laser light emitted from the light emitting section 57 is incident to a polarization beam splitter 55, being reflected and directed toward an optical path 59 by the polarization beam splitter 55. The laser light travels along the optical path 59, being incident to a lens 54 and then being focused on the optical recording layer 4 of the recording medium 2 by the lens 54. In this case, focusing and tracking control is done by driving only the lens 54 through the optical head drive section 18.

As shown in FIG. 2, the magneto-optical material of the optical recording layer 4 is in magnetized, conditions depending on the optical recorded signal. Thus, the polarization angle of reflected light traveling back along an optical path 59a depends on the direction of the magnetization of the optical recording layer 4 due to the Kerr effect. The reflected light is separated from the forward light by the polarization beam splitter 55, traveling through the polarization beam splitter 55 and entering another polarization beam splitter 56. The reflected light is divided by the polarization beam splitter 56 into two beams incident to light receiving sections 58 and 58a respectively. The light receiving sections 58 and 58a convert the incident light beams into corresponding electric signals respectively. A subtractor (not shown) derives a difference between the output signals of the light receiving sections 58 and 58a. Since the derived difference depends on the direction of the magnetization of the optical recording layer 4, the subtractor generates a signal equal to the reproduction of the optical recorded signal. In this way, the optical recorded signal is reproduced.

The reproduced signal is fed from the optical head 6 to the optical recording block 7, being processed by the optical head circuit 39 and the optical reproducing 38 and being subjected to error correction by an ECC decoder 36. As a result, the original digital signal is recovered from the reproduced signal. The recovered original digital signal is fed to an output section 33. The output section 33 is provided with a memory which stores a quantity of the recorded signal (the recorded information) which corresponds to a given interval of time. In the case where the memory 34 consists of a 1-Mbit IC memory and a compressed audio signal having a bit rate of 250 kbps is handled, a quantity of the recorded signal which corresponds to a time of about 4 seconds can be stored. In the case of an audio player, if the optical head 6 moves out of tracking by an external vibration, the recovery of tracking in a time of 4 seconds prevents the occurrence of a discontinuity in a reproduced audio signal. The reproduced signal is then transmitted from the output section 33 to an output section 13 at a final stage. In the case where the reproduced signal represents audio information, the reproduced signal is subjected to PCM demodulation before being outputted to an external device as an analog audio signal.

A description will now be given of a magnetic recording mode of operation. In FIG. 1, an input signal applied to an input section 12 from an external device or an output signal of the system controller 10 is transmitted to an input section 21A of the magnetic recording block 9 being subjected by the ECC encoder 35 in the optical recording block 7 to a coding process such as an error correcting process. The resultant coded signal is transmitted to the magnetic head 8 via the magnetic recording circuit 29 and the magnetic head circuit 31.

Figure 3:
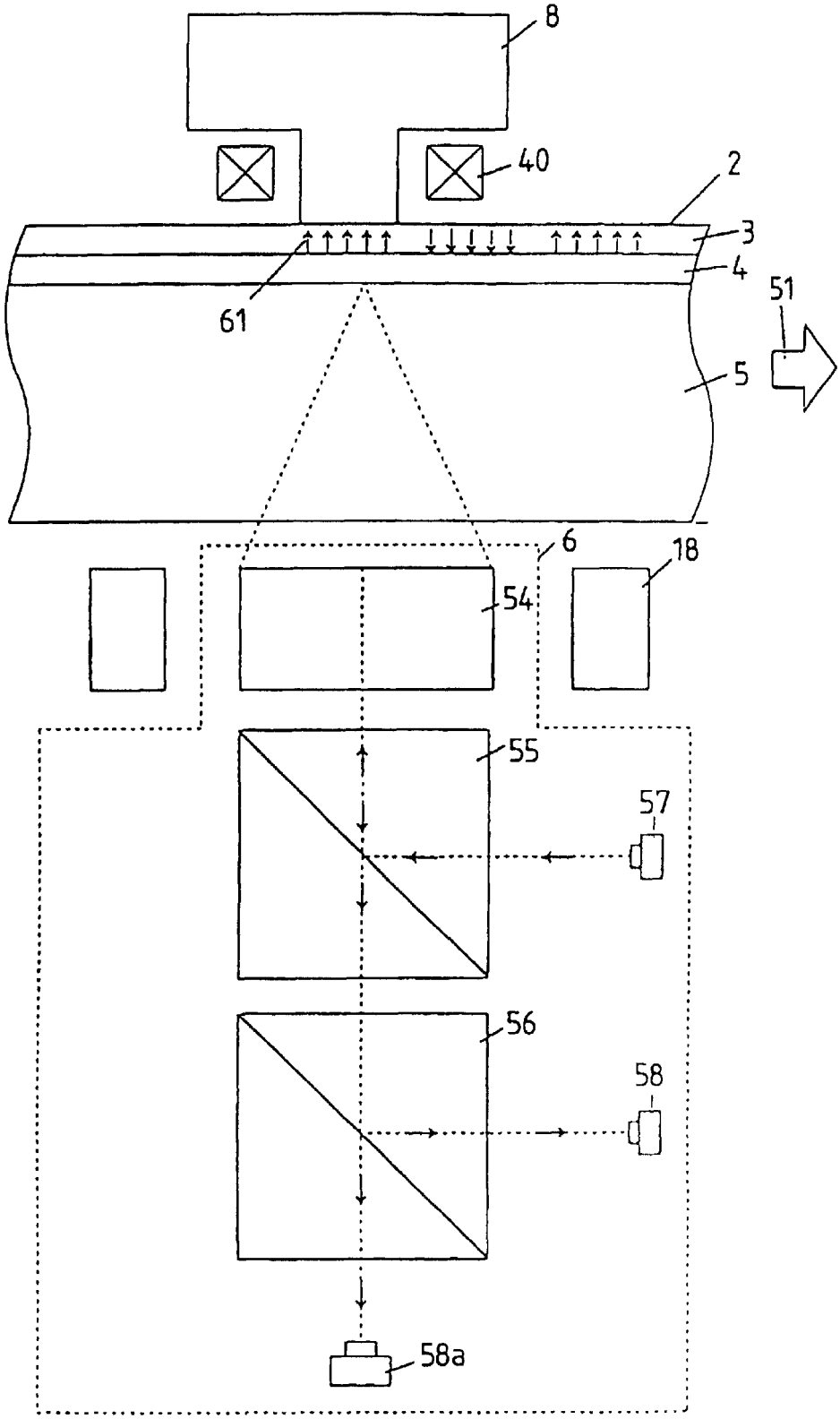
FIG. 3 is an enlarged view of a head portion in the first embodiment.

With reference to FIG. 3, the magnetic recorded signal fed to the magnetic head 8 is converted by a winding 40 into a corresponding magnetic field. The magnetic material of the magnetic recording layer 3 is vertically magnetized by the magnetic field as denoted by arrows 61 in FIG. 3. In this way, magnetic recording in a vertical direction is done so that the information signal is recorded on the recording medium 2. The recording medium 2 has a vertically magnetized film. As the recording medium 2 is moved along a direction 51, time segments of the information signal is sequentially recorded on the magnetic recording medium 2. In this case, although the optical recording layer 4 is also subjected to the magnetic field, the optical recording layer 4 is prevented from being magnetized by the magnetic field since the magneto-optical material of the optical recording layer 4 has a magnetic coercive force of several thousands to ten thousands of Oe at temperatures below the Curie temperature.

In the case where a portion of the magnetic recording layer 3 which actually undergoes the magnetic recording process is excessively close to the optical recording layer 4, the intensity of a magnetic filed applied to the optical recording layer 4 from the magnetic recording portion of the magnetic recording layer 3 sometimes reaches a level of several tens to several hundreds of Oe.

Under these conditions, in the case where the temperature of the optical recording layer 4 is increased above the Curie temperature for magneto-optical recording, the optical recording layer 4 tends to undergo a magnetization change or transition in response to the magnetic field from the magnetic recording portion of the magnetic recording layer 3 so that an error rate increases during the magneto-optical recording. To resolve such a problem, it is preferable to provide an interference layer 81 of a given thickness between the magnetic recording layer 3 and the optical recording layer 4 as shown in FIG. 7. Opposite surfaces of the optical recording layer 4 are provided with protective layers 82 and 82a to prevent deterioration thereof. The sum of the thickness of the interference layer 81 and the thickness of the protective layer 82 is equal to an interference interval or distance L. In this case, an attenuation rate is given as $56.4\times L/\lambda$ where $\lambda$ denotes a magnetic recording wavelength. When $\lambda=0.5$ μm, an interference interval L of 0.2 μm or greater can provide an adequate level of the effect.

As shown in FIG. 8, a protective layer 82 of a thickness equal to or greater than the interference interval may be provided between the magnetic recording layer 3 and the optical recording layer 4.

The magnetic recording medium 2 of FIG. 7 was fabricated as follows. The protective layer 82 and the interference layer 81 were sequentially formed on the optical recording layer 4. Magnetic material such as barium ferrite was prepared which had vertical anisotropy. Lubricant, binder, and the magnetic material were mixed. The resultant mixture was applied to the substrate by spin coat to form the magnetic recording layer 3 while a magnetic field was applied to the substrate in the vertical direction of the substrate.

The recording and reproducing apparatus 1 can operate on a ROM disk similar to a compact disk (CD). FIG. 9 shows an example of a ROM-type recording medium 2. The recording medium 2 of FIG. 9 was fabricated as follows. A substrate 5 was provided with pits. A reflecting film 84 of suitable material such as aluminum was formed over the pits of the substrate 5. Lubricant, binder, and magnetic material were mixed. The resultant mixture was applied to the reflecting film 84 to form a magnetic recording layer 3 while a magnetic field was applied to the substrate 5 in the vertical direction of the substrate 5. The magnetic recording layer 3 had a vertical magnetic recording film. The recording medium of FIG. 9 has the function of a CD ROM at one side, and has the function of a RAM at the other side. Thus, the recording medium of FIG. 9 provides various advantages as described later. In this case, a cost increase results from only adding the magnetic substance to the material which will form a protective film through spin coat similar to that executed to fabricate a currently-used CD. Accordingly, a manufacturing cost increase corresponds to only the cost of the magnetic substance. Since the cost of the magnetic substance is equal to a few percent of the manufacturing cost of the recording medium, the cost increase is very small.

Figure 4:
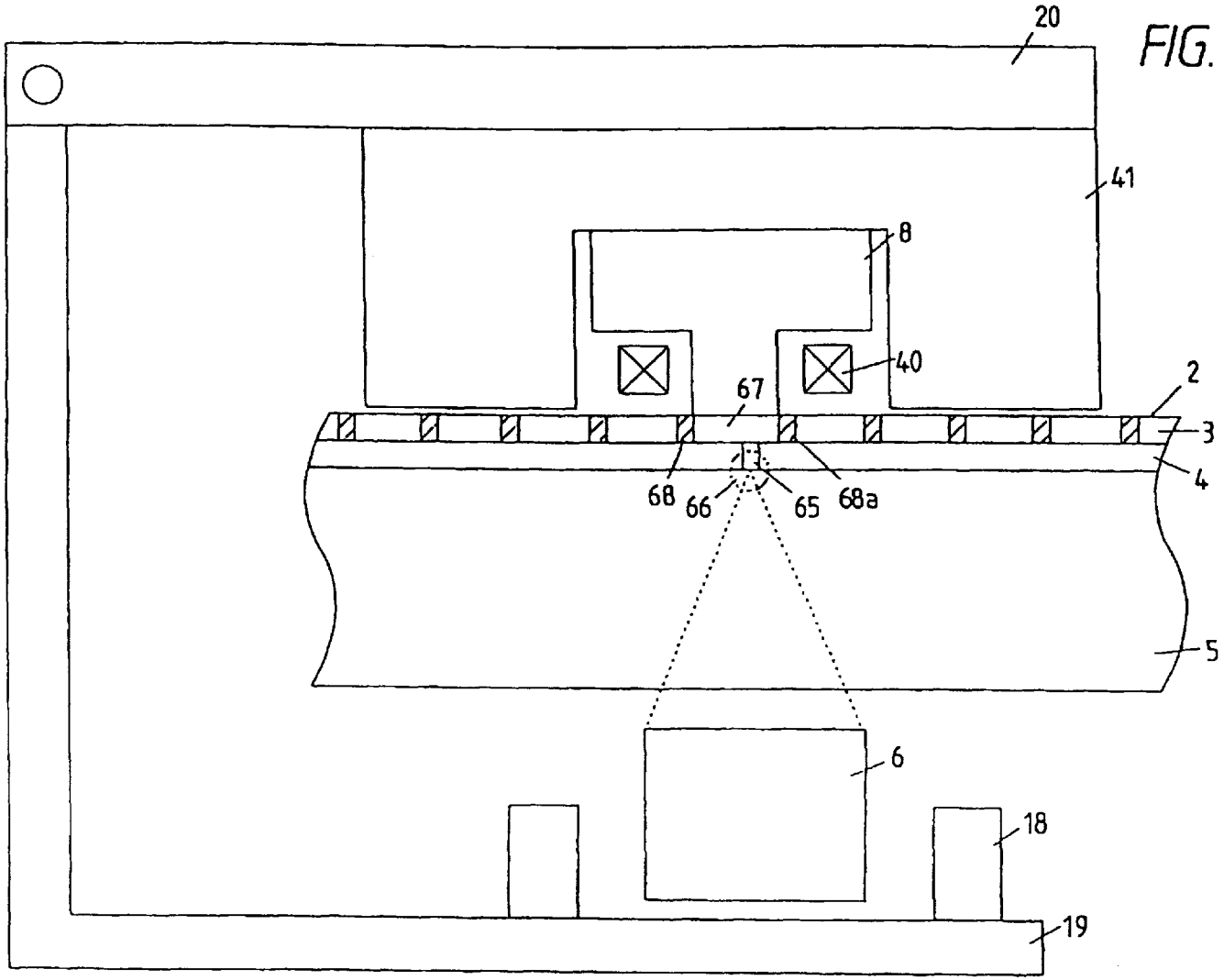
FIG. 4 is an enlarged view of a head portion in the first embodiment as viewed in a tracking direction.
Figure 5:
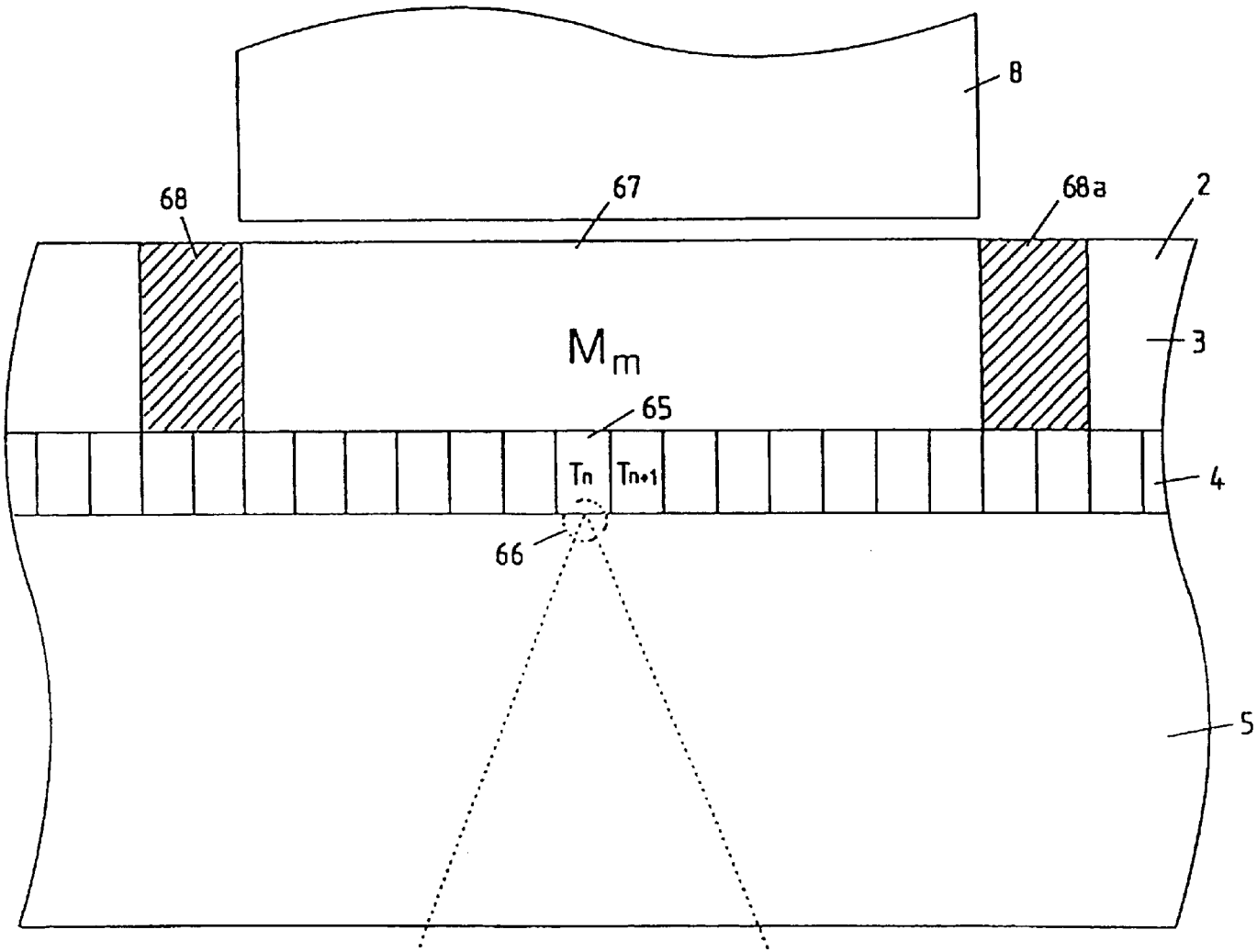
FIG. 5 is an enlarged view of a magnetic head portion in the first embodiment.
Figures 6A, 6B, 6C, 6D, 6E, 6F, 6G:
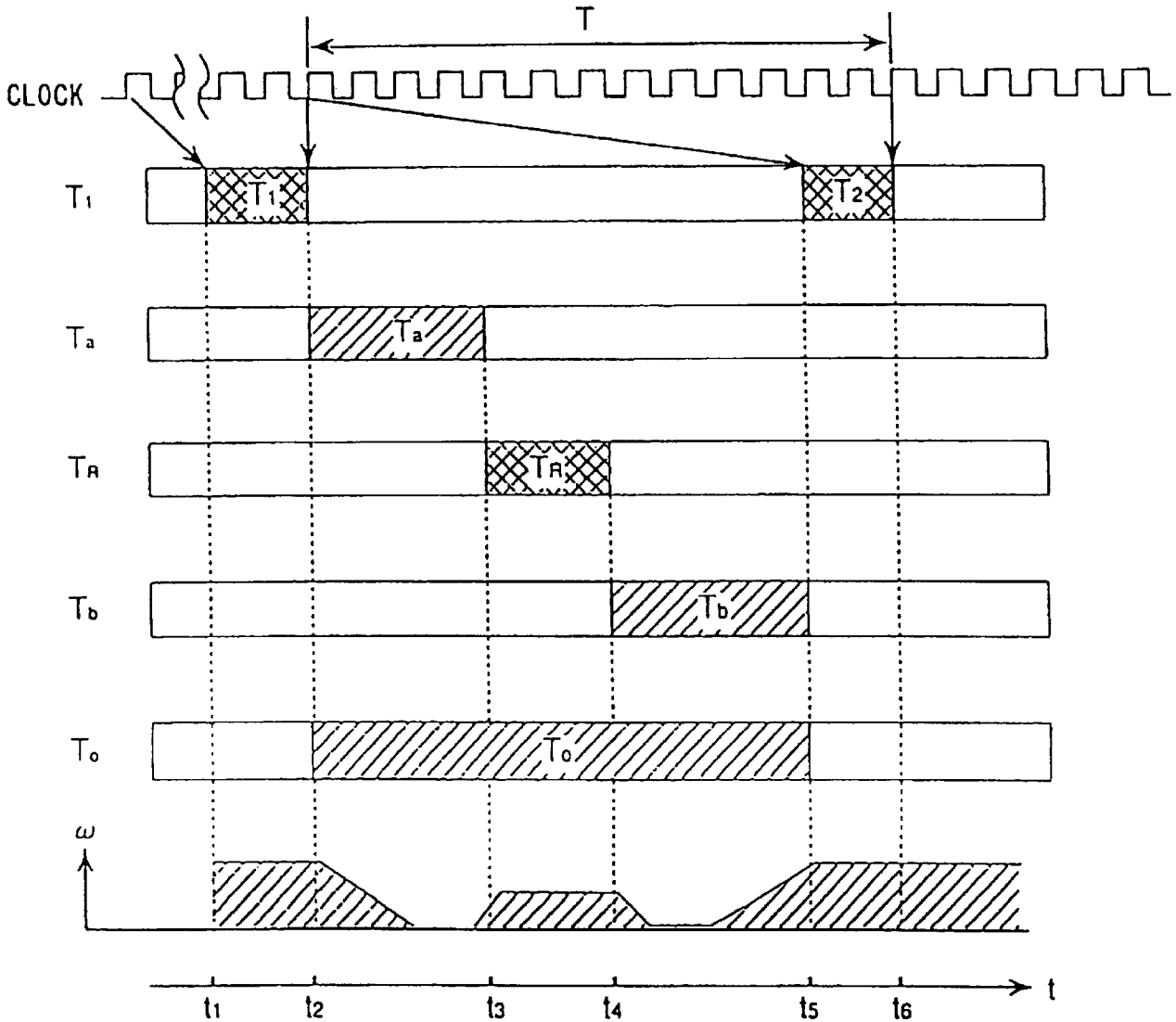

During the magnetic recording, tracking is executed as follows. In FIG. 1, the optical head 6 and the optical head circuit 39 reproduce tracking information from the recording medium 2. The system controller 10 outputs a moving instruction to the head moving circuit 24 in response to the reproduced tracking information, driving the actuator 23 and thereby moving the head base 19 in the tracking direction. Thus, as shown in FIG. 4, light beam emitted from the optical head 6 is focused into a spot 66 near a given optical recording track 65 of the optical recording layer 4. The optical head drive section 18 for driving the optical head 6 is mechanically coupled with the magnetic head 8 via the head base 19 and the head elevator 20. Therefore, the magnetic head 8 moves in the tracking direction as the optical head 6 moves. Thus, when the optical head 6 is aligned with the given optical track 66, the magnetic head 8 is moved into alignment with a given magnetic track 67 which extends at the opposite side of the optical track 66. Guard bands 68 and 68a are provided at opposite sides of the magnetic track 67. As shown in FIG. 5, when the position of the optical head 6 is controlled so as to scan a given Tn-th optical track 65, the magnetic head 8 runs along a given Mm-th magnetic track 67 extending at the opposite side of the optical track 65. In this case, the drive system for the optical head 6 suffices and it is unnecessary to provide a tracking control device for the magnetic head 8. Furthermore, it is unnecessary to provide a linear sensor required in a conventional magnetic disk drive.

A description will now be given of a method of accessing an optical track and a magnetic track. The optical head 6 is subjected to tracking together with the magnetic head 8. Therefore, in the case where there is a difference in radial direction between an optical track currently exposed to an information recording or reproducing process from the lower surface and a magnetic track desired to be accessed from the upper surface, the two tracks can not be accessed at the same time. In the case of a data signal, this access problem causes only a delay in access and does not cause a significant problem. In the case of a continuous signal such as an audio signal or a video signal, an interruption is generally unacceptable. Thus, the magnetic recording can not be executed during an optical recording or reproducing process at a normal speed. This embodiment uses the system in which the memory 34 is provided in connection with the input section 32 and the output section 33 to store a quantity of a signal which corresponds to an interval equal to several times the maximum access time of magnetic recording.

As shown in FIG. 6, the rotation speed of the recording medium 2 is increased by n times during a recording or reproducing process, and thereby an optical recording or reproducing time T is shortened to 1/n as compared with that of a normal speed and becomes equal to T1 and T2. Thus, a time T0 between t2 and t5 which equals to n−1 times the recording or reproducing time is a margin time. In the case where a magnetic track is accessed during an access time Ta between t2 and t3 in the margin time T0 and a magnetic recording or reproducing process is done during a recording or reproducing time TR between t3 and t4 and where head return or motion to an original optical track or a next optical track is done during a return time Tb between t5 and t6, access for the optical recording and access for the magnetic recording can be executed in time division by a single head moving section. In this case, the capacity of the memory 34 is chosen so that the memory 34 can store a continuous signal during the margin time T0.

Access to a track by the magnetic head 8 will now be described with reference to FIG. 6 and FIGS. 10–16. A cassette 42 shown in FIG. 15 includes the recording medium 2. The cassette 42 is inserted into a recess in a casing of the recording and reproducing apparatus 1 shown in FIG. 16.

Then, as shown in FIG. 10, a light beam emitted from the optical head 6 is focused on an optical track 65 in a TOC region on a recording surface of the recording medium 2, and TOC information is reproduced. Index information is recorded in the TOC region. During the reproduction of the TOC information, the magnetic head 8 travels on a magnetic track 67 at the opposite side of the optical track 65 so that magnetically recorded information is reproduced from the magnetic track 67. In this way, during the first process, information is reproduced from the optical track in the TOC region of the recording medium 2, and simultaneously information is reproduced from the magnetic track. The information reproduced from the magnetic track represents the contents of previous access, conditions at the end of previous operation, or others. As shown in FIG. 16, the contents of the reproduced information are indicated on a display 16.

In the case of audio information, a final music number, an elapsed time of an interruption thereof, a reserved music number, or others are automatically recorded on the magnetic recording region. When the magnetic recording medium 2 is inserted into the recording and reproducing apparatus 1 again, information of a table of contents is reproduced from the optical track 65 and also information at the end of previous operation is reproduced from the magnetic track 67 as previously described. The reproduced information is indicated on the display 16 as shown in FIG. 16. FIG. 16 shows conditions where the previous access end time, the operator name, the final music number, the elapsed time of an interruption, the previously preset music order, and the music number are recorded and indicated. Specifically, "Continue?" is indicated. When "Yes" is inputted as a reply, the music starts to be reproduced from a point at which the previous operation ends. When "No" is inputted as a reply, the music is reproduced in the preset order. In this way, the user is enabled to enjoy the automatic reproduction of the previously-interrupted contents as they are, or to listen the music in the desired order.

In the case of a CD ROM game device 18 shown in FIG. 18, the previously interrupted game contents, for example, the stage number, the acquired points, and the item attainment number, are recorded and reproduced. Upon the start of the game a certain time after the previous end of the game, the game can be started from the place same as the previous place and the conditions same as the previous conditions. This advantage can not be provided by a prior art CD ROM game device.

The above-mentioned simple method of accessing the magnetic track in the TOC region has an advantage in that the structure is simple and the cost is low although the memory capacity is small.

A description will now be given of access to a track outside the TOC region. FIG. 11 shows conditions where the optical head 6 accesses a given optical track 65a. At this time, the magnetic head 8 which moves together with the optical head 6 accesses a magnetic track 67a at the opposite side of the optical track 65a. In the case where required information is on a magnetic track 67b separate from the magnetic track 67a, it is necessary to move the magnetic head 8 to the magnetic track 67b. In this case, as previously described with reference to FIG. 6, it is necessary to complete the head movement, the recording, and the head return in a margin time T0. List information representing the correspondence between the magnetic track numbers and the optical track numbers is previously recorded on a TOC region or another given region of the optical recording layer 4. The list information is read out, and the optical track number corresponding to the, required magnetic track number is calculated by referring to the list information. Then, as shown in FIG. 12, during an access time Ta, the head base 19 is moved and fixed so that the optical head 6 can access an optical track 65b corresponding to the calculated optical track number. Thus, the magnetic head 8 will follow the required magnetic track 67b. In this way, the magnetic recording or reproduction can be executed. In this case, as shown in FIG. 13, while the optical track 65a is being scanned, the magnetic head 8 remains lifted to an upper position well separated from the magnetic recording layer 3 by the elevating motor 21. In addition, during the access time Ta, as denoted by the character "ω" in FIG. 6, the rotational speed of the motor 17 is lowered. While the rotational speed remains low, the magnetic head 8 is moved downward into contact with the magnetic recording layer 3. Thereby, it is possible to prevent the magnetic head 8 from being damaged. During an interval TR, the rotational speed is increased and the magnetic recording is done. During an interval T, the rotational speed is lowered and the magnetic head 8 is lifted. Then, the rotational speed is increased again, and the optical head 6 is returned to the optical track 65a as shown in FIG. 13. During an interval T2, optical recording and reproduction is done. Since the data stored in the memory 34 is reproduced during the margin time T0, the reproduced signal or the reproduced music will not be interrupted. As shown in FIG. 14, during access to the TOC region, the magnetic head 8 is not moved downward in the presence of an instruction representing that magnetic recording on the TOC region is unnecessary. Thereby, even if a recording medium 2 having no magnetic recording layer 3 is inserted into the recording and reproducing apparatus, the magnetic head 8 can be prevented from contacting the recording medium 2 and being thus damaged. In this way, the execution of the upward and downward movement of the magnetic head 8 during a period of the occurrence of a lowered rotational speed provides an advantage such that a damage to the magnetic head 8 can be prevented and wear thereof can be remarkably reduced.

FIG. 15 shows the cassette 42 which contains the recording medium 2. The cassette 42 is provided with a shutter 88, a magnetic recording prevention click 89, and an optical recording prevention click 89a. The magnetic recording prevention and the optical recording prevention can be set separately. In the case of a ROM cassette, only a magnetic recording prevention click 89a is provided thereon.

FIG. 17 shows a recording and reproducing apparatus for reproduction of optically recorded information. An optical recording circuit and an ECC encoder are omitted from an optical recording block 7 in the recording and reproducing apparatus of FIG. 17 as compared with that of FIG. 1. The recording and reproducing apparatus of FIG. 17 additionally includes a magnetic head elevator 20, a magnetic head 8, and a magnetic recording block 9 as compared with a conventional reproduction player such as a CD player. All the parts of the recording and reproducing apparatus of FIG. 17 can be used in common to the parts of the recording and reproducing apparatus of FIG. 1. Their costs are very low relative to optical recording parts, and the resultant cost increase is small. Although the memory capacity is smaller than that of a floppy disk, information can be recorded and reproduced on and from a ROM-type recording medium at such a low cost. Thus, in the case of a game device or a CD player requiring only a small memory capacity, various advantages are provided as previously described. According to estimation, in the case of a recording medium disk having a diameter of 60 mm, a magnetic recording memory capacity of about 1 KB to 10 KB is obtained by using a magnetic head for modulating a magnetic field. A memory of a 2-KB or 8-KB SRAM is provided on a typical game ROM IC, and thus the above-mentioned memory capacity is sufficient. Thus, there is an advantage such that the recording medium disk can replace a ROM IC.

The error correction encoder 35 and the error correction decoder 36 of FIG. 1 will now be described in detail. With respect to a normal magnetic disk such as a 3.5-inch floppy disk of the 2HD type or the 2DD type, an error correcting process is not executed. In the case of the 3.5-inch 2HD floppy disk, the error rate is close to $10^{-12}$ when record and reproduction are done at 135 TPI. Accordingly, in the case where the floppy disk is used in a cartridge, the disk is less contaminated or injured so that there hardly occurs a burst error. Therefore, it is unnecessary to execute error correction including interleaving. A CD ROM having a magnetic recording layer on a medium front surface or back surface is used without any cartridge. In the case of such a CD ROM, dust and a scratch cause a burst error.

The recording medium of this invention is designed, so that Hc=1900 Oe. The magnetic recording layer is applied to the CD label side in which the space loss by the print layer and the protective layer is 9 to 10 micrometers. During experiments, this recording medium was subjected $10^6$ times to recording and reproducing processes by a magnetic head of the amorphous lamination (multilayer) type through MFM modulation at 500 BPI, that is, a wavelength of 50 μm, and the frequencies of appearance of respective pulse widths were measured. FIG. 203(a) and FIG. 203(b) show the results of the measurement. FIG. 203(a) shows the results of the measurement of the pulse with up to 1 ms. FIG. 203(b) shows the enlarged measurement data of the pulse width up to 100 μs.

As noted by the arrow 51a of FIG. 203(a), some burst errors having long periods occur with respect to sampling of $10^6$ times. Thus, interleaving is done as shown in the error correcting portion 35 of FIG. 1 or FIG. 202. Specifically, as shown in FIGS. 207(a) and 207(b), ECC encoding is done before or after the interleaving.

As shown in FIG. 203(b), the intervals of 1T, 1.5T, and 2T in MFM modulation are adequately large. Thus, it is thought that an error rate of about $10^{-5}$ to $10^{-6}$ occurs under bad conditions.

Burst errors more frequently occur in comparison with a disk in a cartridge such as a floppy disk. In addition, more random error occur by several orders. Accordingly, to use such a recording medium without any cartridge, interleaving and good correction are necessary. As the amount of error correction code increases, the degree of redundancy increases but the amount of data decreases. A target value of burst error countermeasure is determined with reference to the allowable standard (reference) of scratch of a CD.

The probability of the occurrence of a scratch on the optical recording surface is equal to that on the label surface. FIG. 204 shows the ability of error correction with respect to a scratch on the optical recording layer of a CD. In the case of correction of 4 symbols, it is possible to compensate for a scratch corresponding to 14 frames or less, that is, a scratch having a length of 2.38 mm or less. The interleaving length is set to correspond to 108 frames, that is, a length of 18.36 mm. Thus, with respect to the magnetic recording layer, it is necessary to provide error correcting ability containing interleaving which can compensate for a scratch having a length of 2.38 mm or less. In this case, an optimal degree of redundancy is attained. Therefore, even if the magnetic recording portion of this recording medium is subjected to such a scratch, the resultant errors are corrected by the encoder 35 and the decoder 36 so that data errors do not occur. Thus, the user can handle the recording medium of this invention similarly to a CD or a CD ROM.

According to this invention, it was experimentally confirmed that a scratch of 7 mm at an outermost portion and a scratch of 3 mm at an innermost portion were compensated under conditions where the interleaving corresponded to a length of 18 mm or more and Reed-Solomon error correction was used, and the degree of redundancy corresponded to a factor of 1.2 in the range of upper and lower 10% as shown in FIG. 206. Thus, a scratch of 2.38 mm could be compensated under these conditions. The interleaving length Ld on the data is defined as shown in FIG. 205, and a physical interleaving length LM on the medium surface is set to 18 mm or more. In addition, as shown in FIG. 206, the data amount of error correction code such as Reed-Solomon code is set equal to the original data amount multiplied by a value of 0.08 to 0.32. Thereby, it is possible to attain error correction against a scratch which is comparable with that in a CD.

FIG. 202 shows the details of the error correction encoder 35 and the error correction decoder 36. The magnetic record signal is ECC-encoded by a Reed-Solomon encoder 35a for executing an operation of Reed-Solomon encoding. A transverse-direction parity 452a is added to the ECC-encoded data sequence. In an interleaving portion 35b, according to an interleaving table of FIGS. 207(a) and 207(b), the data sequence is read out in a longitudinal direction 51b so that the original data is separated by a dispersion distance L on the recording medium surface as shown in FIG. 207(b).

Even in the presence of a burst error, the data can be recovered in response to the parity 452. When the dispersion length L is set to 19 mm or more, an error compensating ability comparable to that of a CD can be attained. With respect to the reproduced signal, in a de-interleaving portion 36b shown in FIG. 208, the data is mapped onto a RAM 36x and is then subjected to address conversion reverse to that of FIGS. 207(a) and 207(b), so that the data is returned to the original arrangement (sequence).

Then, the reproduced data is processed by a Reed-Solomon decoder 36a of FIG. 209(b) as follows. As shown in FIG. 210, at a step 452b, P and Q parities and the data are inputted. At a step 452c, syndromes S1 and S2 are calculated. Only when S1=S2=0 at a step 452d, an advance to a step 452g is done so that the data is outputted. In the presence of an error, calculation for error correction is executed at a step 452e. Only when the error is corrected by a step 452f, the data is outputted at the step 452g. In this invention, the demodulation clock speed (rate), in the magnetic recording and reproducing portion is equal to 30 Kbps (see FIGS. 203(a) and 203(b) which is a data rate equal to 1/100 of the CD data rate. In view of this small data processing amount, error correction of the optical reproduced signal is done by an exclusive IC while the signal processing in the error correction encoder 35 and the error, correction decoder 36 of FIG. 202 is executed by a microcomputer 10a in the system controller 10 through a time division technique. Specifically, the interleaving of FIGS. 207(a) and 207(b) and the error correction in FIG. 210 are done by the microcomputer 10a.

The microcomputer 10a is of the 8-bit or 16-bit type driven by a clock signal having a several tens of MHz. As shown in FIG. 210, two routines, that is, a system control routine 452p and an error correcting routine 452a are executed in time division. Specifically, the system control routine is started as a step 452h, and motor rotation control is executed at a step 452j. At a step 452k, control for head movement and control for an actuator such as a traverse are executed. At a step 452m, indication of a drive and control of an input/output drive system are executed. Only in the case where one work unit for the system control is completed at a step 452n and error correction is required, entrance into the error correction routine 452q is done. At a step 452r, interleaving or deinterleaving is executed which has been described with reference to FIG. 207(a) and 207(b). Steps 452b–452g execute calculations for the previously-mentioned error correction.

In this invention, the magnetic recording has a data rate of about 30 kbps. Accordingly, an 8-bit or 16-bit microcomputer chip driven by a clock signal having a frequency of about 10 MHz can be used in executing the system control and the error correction. In the case where the error correction related to the optical reproduction is executed by an exclusive IC and the error correction related to the magnetic recording and reproduction is executed by the microcomputer, it is possible to omit a magnetic error correction circuit. Since it is unnecessary to add a new error correction circuit with an interleaving function in this way, this design is advantageous in that the structure of the apparatus is simple.

FIG. 211 shows an arrangement using a method in which error correction is performed both before and after an interleaving process. The arrangement of FIG. 211 is similar to the arrangement of FIG. 1 and FIG. 202 except for design changes indicated hereinafter.

In the arrangement of FIG. 211, magnetic record data is ECC-encoded by a Reed-Solomon C2 error correction encoder 35a in an error correcting portion 35, and a C2 parity 45 is added thereto. Then, the resultant data is processed by an interleaving portion 35b as follows. Specifically, as shown in FIG. 212(a), data in a transverse direction 51a is read out along a longitudinal direction 51b so that the data is outputted as shown in FIG. 212(b). For example, data segments A1 and A2 are dispersed and separated by a dispersion length L1. Subsequently, a Reed-Solomon C1 error correction encoder 35c subjects the data to error correction encoding in the longitudinal direction, and a C1 parity is added thereto. The resultant data is magnetically recorded onto a recording medium.

In the arrangement of FIG. 211, during reproduction, data demodulated by an MFM demodulator 30d is subjected by a Reed-Solomon C1 error correcting portion to random error correction responsive to the C1 parity. Then, the data is mapped by the RAM 36x of the de-interleaving portion 36b in FIG. 208, being subjected to address conversion reverse to that of FIGS. 212(a) and 212(b). Therefore, the data is re-arranged into the original data along the transverse direction before being outputted. In this way, a burst error is dispersed and made into random errors. The random errors are corrected by a Reed-Solomon C2 error correcting portion 36a of FIGS. 212(a) and 212(b), and the error-free resultant data is recovered and outputted.

Since the arrangement of FIGS. 212(a) and 212(b) executes the error correction at two stages, that is, before and after the interleaving, burst errors can be effectively compensated. Although the single-stage error correction in FIG. 202 suffices as shown by the experimental data, it is preferable to use such two-stage error correction in recording and reproducing very important data.

DESCRIPTION OF THE SECOND PREFERRED EMBODIMENT

FIG. 19 shows a recording and reproducing apparatus according to a second embodiment of this invention which is similar to the recording and reproducing apparatus of FIG. 1 except that a magnetic head 8a and a magnetic head circuit 31a are added thereto.

As shown in FIG. 20, a magnetic head 8 executes magnetic recording on an entire region of a magnetic recording layer 3, the magnetic recording having a long recording wavelength. This process is similar to the corresponding process in the first embodiment. Subsequently, the magnetic head 8a executes magnetic recording on a surface portion 3a, the magnetic recording having a short recording wavelength. Consequently, the surface portion 3a and a deep layer portion 3b are subjected to the magnetic recordings of independent sub and main channels having a shorter wavelength and a longer wavelength respectively. In the case where a magnetic recording layer subjected to two-layer recording as shown in FIG. 20 undergoes a reproducing process by use of a magnetic head for a long wavelength such as the magnetic head for modulating the magnetic field in the first embodiment, information can be reproduced from the main channel. This provided that summary information is recorded on the main channel while detailed information is recorded on the sub channel, the summary information can be reproduced by the system of the first embodiment and thus there will be an advantage such that the compatibility can be ensured between the apparatus of the first embodiment and the apparatus of the second embodiment.

FIG. 21 shows a case where only a short-wavelength magnetic head 8 is provided. In this case, a signal of the sub channel, on which a signal of the main channel is superimposed, is reproduced so that information of both the main and sub channels can be reproduced. When the structure of FIG. 21 is applied to an apparatus exclusively for reproduction, its cost can be low.

An upper part of FIG. 22 shows a case where recording is done by a magnetic head for modulating a magnetic field, that is, a magnetic head 8 for a long wavelength. As shown in the drawing, in the case where an N-pole portion is set "1" and a non-magnetized portion is set "0", recording is done as "0" in magnetization regions 120a and 120b and recording is done as "1" in a magnetization region 120c. Thus, a data sequence of "101" is obtained. As shown in a lower part of FIG. 22, in the case where an N-pole portion is set "1" and a non-magnetized portion is set "0" by using a short-wavelength magnetic head 8b for vertical, a data sequence of "10110110" is obtained. In this case, 8-bit information can be recorded on a region 120d equal in size to a region 120a in the upper part of the drawing. When the information is reproduced from the region 120d by the magnetic head 8, the reproduced information is decided to be "1" since there are only N-pole portions. This is the same as the region 120a. Thus, "1" in the data sequence 122a can be reproduced. In the case where an S-pole portion is defined as "0" and a non-magnetized portion is defined as "1" in a region 120e. 8-bit information, that is, a data sequence of "01001010", can be recorded. When this information is reproduced by the magnetic head 8, the reproduced information is decided to be "0" since there are only S-pole portions. This is one bit, and a signal equal in polarity to the signal on the region 120b is reproduced with a slightly-smaller amplitude. Thus, as shown in FIG. 22, the short-wavelength magnetic head 8b records and reproduces the signal of the data sequence 122a of the main channel D1 and the signal of the data sequence 122 of the sub channel D2, while the magnetic head 8 for modulating the magnetic field reproduces the data sequence 122a of the main channel D1. Accordingly, there will be an advantage such that the compatibility can be ensured. The gap of the magnetic head 8 for modulating the magnetic field is preferably equal to 0.2 to 2 μm.

DESCRIPTION OF THE THIRD PREFERRED EMBODIMENT

FIG. 23 shows a recording portion of a third embodiment of this invention. In the third embodiment, a reflecting film 84 provided with pits as shown in FIG. 9 was formed on a transparent substrate 5 for a recording medium 2, and a magnetic recording film 3 was provided. This process is similar to the corresponding process in the first embodiment except that a film of Co-ferrite was formed by plasma CVD or others. This material has a transparency, and it has a high light transmissivity when its thickness is small.

As shown in FIG. 23, light emitted from an optical head 6 is focused into a spot 66 on the recording medium from the back side thereof. The optical head 6 has a lens 54 which is connected to a slider 41 by a connecting portion 150. The connection portion 150 has a spring effect. The slider 41 is made of transparent material. A magnetic head 8 is embedded into the slider 41. Thus, the optical head 6 reads the pits in the reflecting film 84 from the back side, and thereby tracking and focusing are controlled. Thus the slider 41 connected thereto is subjected to tracking control so that the optical head 6 can follow a given optical track. A positional error between the lens 54 and the slider 41 is caused by only the spring effect of the connecting portion 150, and the slider 41 is controlled with an accuracy of a micron order. Upward and downward head movement is done together with the focusing control, and the movement is controlled with an accuracy of an order of several microns to several tens of microns.

Segments of information are sequentially recorded on the magnetic recording layer 3 by magnetic recording. In this embodiment, since optical tracking is enabled, there is a remarkable advantage such that a track pitch of several microns can be realized. Since the slider 41 and the magnetic head 8 are moved upward and downward according to the focusing control, a given track can be correctly followed by the magnetic head 8 even when the surface accuracy of the substrate 5 of the recording medium 2 is low. Thus, it is possible to use a substrate having a low surface accuracy. Accordingly, there is a advantage such that an inexpensive substrate, for example, a plastic substrate or a non-polished glass substrate, can be used which is much cheaper than a polished glass substrate.

FIG. 23 shows the case where the optical head 6 executes the information reproduction on the recording medium 2 from the back side thereof. The information reproduction can also be done on the recording medium 2 by a mechanism such as a conventional optical disk player from the upper side thereof, and thus there is an advantage such that the compatibility can be ensured. In addition, there is a notable advantage such that a memory capacity greater than that in a conventional case by one or more orders can be realized by using the optical tracking.

DESCRIPTION OF THE FOURTH PREFERRED EMBODIMENT

FIG. 24 shows a recording and reproducing apparatus according to a fourth embodiment of this invention which is similar to the recording and reproducing apparatus of FIG. 1 except for design changes indicated hereinafter. In the first embodiment; the magnetic head 8 uses the magneto-optical recording head for modulating the magnetic field as it is, and the vertical recording is done as shown in FIG. 3. On the other hand, in the fourth embodiment, as shown in FIG. 25, a magnetic head 8 has the function of horizontal magnetic recording and also the function of magneto-optical recording magnetic-field modulation, and the magnetic head 8 is used to execute horizontal recording on a magnetic recording layer 3 of a recording medium 2.

An equivalent head gap of the magnetic-field modulating head in the first embodiment, for example, a head for an MD (a minidisk), is generally 100 μm or greater, so that the recording wavelength λ is several hundreds of μm. In this case, a counter magnetic field is generated and thus a magnetism effectively used for actual recording is reduced, so that the level of a reproduced output is lowered. The first embodiment has a remarkable advantage such that a cost increase is prevented since a change of the structure is unnecessary, but the level of a reproduced output tends to be low.

In the case where a high level of a reproduced output is required with respect to long-wavelength recording, horizontal recording is preferable. In order to realize the horizontal recording, the fourth embodiment is modified from the first embodiment in a manner such that the structure of a magnetic head is changed and a recording system is changed from vertical recording to horizontal recording.

As shown in FIG. 25, the magnetic head 8 of the fourth embodiment has a main magnetic pole 8a, a sub magnetic pole 8b, a head gap 8c, and a winding 40. The main magnetic pole 8a has the function of a magnetic head for modulating a magnetic field. The sub magnetic pole 8b serves to form a closed magnetic circuit. The head gap 8c has a gap length L. During horizontal recording, the magnetic head 8 is regarded as a ring head having a gap length L. The magnetic head 8 is designed so as to apply a uniform magnetic field to an optical recording layer 4 during the magneto-optical, recording of the magnetic field modulation type.

In the case of a magnetic mode of operation which is shown in FIG. 25, light emitted from the optical head 6 is focused into a spot 66 on the optical recording layer 4, and the optical head 6 reads out track information or address information therefrom. The optical head 6 is subjected to tracking control so that a given, optical track can be scanned. Thus, the magnetic head 8 connected to the optical head 6 travels on a given magnetic track. As shown in FIG. 25, while the recording medium 2 is moved in a direction 51, horizontal magnetic signals 61 are sequentially recorded in the magnetic recording layer 3 in accordance with an electric information signal fed from a magnetic recording block 9. When the gap length is denoted by L and the recording wavelength is denoted by λ, there is a relation as $\lambda > 2L$. Thus, as the gap length L is decreased, a recording capacity is greater. In the case where the gap length L is reduced, a region subjected to a uniform magnetic field is narrowed during the generation of a modulation magnetic field for the magneto-optical recording. Thus, in this case, the recordable region with respect to the light spot 66 provided by the optical head 6 is narrowed and it is necessary to increase the accuracy of the sizes of the recording medium and the tracking mechanism, and thus the cost tends to be increased.

In the case of the execution of the magneto-optical recording as shown in FIG. 26, a spot 66 of laser light from the optical head 6 heats the corresponding point of the optical recording layer 4 to a temperature equal to or higher than a Curie temperature thereof. The point of the optical recording layer 4 which is exposed to the light spot 66 is magnetized in accordance With a modulation magnetic field generated by the magnetic head 8, and segments of an information signal 52 are sequentially recorded on the optical recording layer 4. The positional relation between the optical head 6 and the magnetic head 8 is affected by the accuracy of the size of the tracking mechanism which includes a head base 19. In the case of an MD, to lower the cost, the standard of the size accuracy is lenient. Thus, when worst conditions are considered, there is a chance that the positional relation between the optical head 6 and the magnetic head 8 is greatly out of order. Accordingly, it is preferable that the area of a region 8e exposed to a uniform magnetic field is as large as possible.

As shown in FIG. 26, the main magnetic pole portion 8a of the magnetic head 8 is formed with a tapered condensing section 8d, and thereby right-hand magnetic fluxes 85a and 85b are condensed so that a magnetic field is strengthened. Thus, the magnetic fluxes 85a and 85b are made equivalent to magnetic fluxes 85c, 85d, 85e, and 85f, and there is an advantage such that the region 8e exposed to a uniform magnetic field is enlarged. In this way, even when the relative position between the optical head 6 and the magnetic head 8 moves out of the correct position so that the relative position between the light spot 66 and the magnetic head 8 also moves out of the correct position, an optimal modulation magnetic field is applied to the optical recording layer 4 provided that the light spot 66 exists within the region 8e exposed to the uniform magnetic field. Accordingly, the magneto-optical recording is surely, executed, and an error rate is prevented from being worse.

As shown in FIG. 31, magnetic fluxes of the magnetically recorded signal 61 on the magnetic recording layer 3 are formed as magnetic fluxes 86a, 86b, 86c, and 86d. During the magneto-optical recording, the portion of the magneto-optical recording material which is heated by the light spot 66 to a temperature equal to or higher than the Curie temperature thereof is subjected to the magnetic field of the magnetic flux 86a by the magnetically recorded signal 61 and also the modulation magnetic field from the magnetic head 8. When the magnetic field of the magnetic flux 86a is stronger than the modulation magnetic field from the magnetic head 8, the magneto-optical recording responsive to the modulation magnetic field can not be correctly done. Thus, it is necessary to limit the magnitude of the magnetic flux 86a to a given level or less. Accordingly, an interference layer 81 having a thickness d is provided between the magnetic recording layer 3 and the optical recording layer 4 to reduce the adverse influence, of the magnetic flux 86a. When the shortest recording wavelength is denoted by $\lambda$, the strength of the magnetic flux 66 at the optical recording layer 4 is attenuated by about $54.6 \times d/\lambda$. In the case of a recording medium, it can be thought that various recording wavelengths $\lambda$ are used. It is general that the shortest recording wavelength is equal to 0.5 μm. In this case, when the thickness d is 0.5 μm, attenuation of about 60 dB is obtained so that the adverse influence of the magnetically recorded signal 61 hardly occurs.

As previously described, by using an interference film of a thickness of 0.5 μm or greater between the magnetic recording layer 3 and the optical recording layer 4, there is provided an advantage such that the magnetically recorded signal hardly affects the magneto-optical recording. The interference film is preferably made of non-magnetic material or magnetic material having a weak coercive force.

In the case where the magneto-optical recording and the magnetic recording are done by using a magneto-optical recording medium, a modulation magnetic field is prevented from injuring a recorded magnetic signal provided that the modulation magnetic field for the magneto-optical recording is sufficiently weaker than the coercive force of magnetic material for a magnetic recording layer. When a ring-type head is used as in the previously-mentioned case, a strong magnetic field occurs in a head gap portion. Thus, even if the modulation magnetic field is weak, there is a chance that the modulation magnetic field adversely affects a recorded magnetic signal and thus an error rate is increased. This problem is resolved as follows. In the case of recording on a magneto-optical recording medium, as shown in FIG. 27, before the optical head 6 records a main information signal on the optical recording layer, an information signal magnetically recorded on a magnetic track 67g at the opposite side of an optical track 65g to be scanned is transferred to the memory 34 in the recording and reproducing apparatus or written on the optical recording layer to be saved. The saving prevents a problem even when recorded data in the magnetic recording layer are damaged by the modulation magnetic field during the magneto-optical recording.

A system controller 10 operates in accordance with a program stored in an internal ROM. FIG. 28 is a flowchart of this program. The program of FIG. 28 is divided into six large blocks. A decision block 201 decides the character of a disk. In the case of a ROM disk, an exclusive-reproduction block 204 is used. In the case of reproduction on an optical RAM disk, a reproduction block 202 is executed and sometimes a reproduction/transfer block 203 is executed. In the case of recording on an optical RAM disk, a recording block 205 is used and sometimes a recording/transfer block 206 is used. In the presence of a free time, only transfer is executed by a transfer block 207.

The program of FIG. 28 will now be described in more detail. In the decision block 201, a step 220 places a recording medium 2, that is, a disk, into a correct position or an operable position. A step 221 decides the type of the disk by detecting a click on a disk cassette such as shown in FIG. 16. There are various types such as a ROM, a RAM, an magneto-optical recording medium, an optical recording prevention disk, and a magnetic recording prevention disk. A subsequent step 222 moves the optical head 6 to a position aligned with an inner most optical track 65a and an innermost magnetic track 67a. A step 223 reads out magnetic information data and optical information data from a TOC region of the recording medium. In the case of a music disk, data is inputted which represents a music number at the end of previous operation. In the case of a game disk, data is inputted which represents a stage number at the previous end of the game. As shown in FIG. 16, when the user desires continuation in response to the inputted data, conditions at the end of previous operation are retrieved. A step 224 reads out an un-transfer flag from the magnetic TOC region. The un-transfer flag being "1" represents that magnetic data which is not transferred to an optical data section remains. The un-transfer flag being "0" represents it does not remain. A step 225 decides whether the disk is a magneto-optical disk or a ROM disk. When the disk is a ROM disk, an advance toward a step 238 is done. When the disk is a magneto-optical disk an advance toward a step 226 is done. When the step 238 detects the presence of a reproducing instruction, a step 239 reproduces an optically recorded signal and a magnetically recorded signal. When the operation ends at a step 240, a step 241 writes information into, the TOC region of the magnetic track. The written information represents various changes occurring during the reproduction, for example, changes in the music reproduction order and the music number at the end of the operation. After writing the information is completed, a step 242 ejects the disk.

As previously described, when the disk is a magneto-optical disk, an advance toward a step 226 is done. In the presence of a reproducing instruction, an advance to a step 227 is done. Otherwise, an advance to a step 243 is done. The step 227 executes reproducing a main recorded signal on an optical recording surface at a speed higher than a normal reproduction speed, and sequentially stores the reproduced information into a memory. In the case of a music signal, an amount of data which corresponds to several seconds can be stored. Thus, even if the reproduction is interrupted, reproduced music can be continued. When a step 228 detects that the memory is completely filled with the reproduced information, a step 229 is executed. When the step 229 decides that an un-transfer flag is "1", the reproduction of the main recorded signal is interrupted and an advance to a step 230 in the reproduction/transfer block 203 is done. A check is made as to whether or not all of a sub recorded signal on a magnetic recording surface has been reproduced. When the result of the check is Yes, an advance to a step 234 is done. Otherwise, an advance to a step 231 is done, and the sub recorded signal on the magnetic recording surface is reproduced and the reproduced information is stored into the memory. A step 232 checks whether or not outputting the stored main recorded signal such as the music signal is still possible. When the result of the check is No, a return to the step 227 is done and reproducing and storing the main recorded information are executed. In the case where the result of the check is Yes, at the moment at which the sub recorded signal reaches a preset memory amount in a step 233, the step 234 again checks whether or not storing and reproducing the main recorded signal can be done. When the result of the check is Yes, a step 235 transfers and writes the sub recorded signal from the memory into a transfer region on the optical recording-surface. Then, a step 236 checks whether or not transferring all the data is completed. When the result of the check is No, a return to the step 230, is done and the transfer is continued. When the result of the check is Yes, a step 237 changes the un-transfer flag from "1" to "0" and then a return to the step 226 is done.

In the case of recording on the optical recording layer, an advance to a step 243 in the recording block 205 is done, and a check is given with respect to a recording instruction. When the result of the check is Yes, a step 244 executes storing the main recorded signal into the memory and the optical recording is not executed. A step 245 checks whether, or not the memory has a free area. When the result of the check is No, a step 245a executes the optical recording of the main recorded signal and a return to the step 243 is done. When the result of the check is Yes, an advance to a step 246 is done. When the un-transfer flag is not "1", a return to the step 243 is done. Otherwise, an advance to a step 247 in the recording/transfer block 206. The step 247 stores the main recorded signal into the memory, and simultaneously reproduces a sub recorded signal on a magnetic track 67g at the opposite side of an optical track 65g of FIG. 27 which is planned to be subjected to the optical recording at this time. In addition, the step 247 stores the reproduced sub recorded signal into the memory. A step 248 checks whether, or not the memory has a free area. When the result of the check is Yes, a step 248a transfers and writes the sub recorded signal into the optical recording layer. When the result of the check is No, a return to the step 245a is done and the optical recording is executed. A step 249 checks whether or not transferring all the data has been completed. When the result of the check is Yes, a step 250 changes the un-transfer flag from "1" to "0" and then a return to the step 243 is done. Otherwise, nothing is done and a return to the step 243 is done.

The step 243 checks whether or not a recording instruction is present. When the result of the check is No, an advance to a step 251 in the transfer block 207 is done. Here, recording and also reproducing the main recorded signal are unnecessary, and thus only the transfer of a sub recorded signal from a magnetic data surface to an optical data surface is executed. The step 251 executes reproducing the sub recorded information and storing the reproduced sub recorded information into the memory. A step 252 executes the transfer of the sub recorded signal from the memory to the optical recording layer. A step 253 checks whether or not transferring all the data has been completed. When the result of the check is No, a return to the step 251 is done so that the transfer is continued. Otherwise, a step 254 changes the un-transfer flag from "1" to "0", and then a step 255 checks whether or not all the operation has been ended. When the result of the check is No, a return to the first step 226 is done. Otherwise, an advance to a step 256 is done, and the information which has been changed by this work and other information such as information representing that the un-transfer flag is "0" are magnetically recorded on the TOC region of a magnetic track. Then, a step 257 ejects the disk, and the work regarding this disk is ended.

It should be noted that the step 256 may again write all the sub recorded signal into the magnetic recording layer from the memory to return the magnetic recording layer to the conditions which occur before the execution of the optical recording.

As previously described, only the data in the magnetic track among the data on the magnetic recording surface, which might be damaged by a modulation magnetic field during the optical recording, is transferred and saved into the memory or the optical recording surface. Thus, there is an advantage such that a damage to the data on the magnetic recording surface can be substantially prevented.

Optical recording may be done by recording saved data on a magnetic track again and retrieving the saved data after the work of optical recording. In this case, there is an advantage such that data on a magnetic recording surface is retrieved upon the ejection of a disk.

The design of FIG. 28 uses a method where data on a magnetic recording surface, which might be damaged, is transferred to an optical recording surface before magneto-optical recording is done. On the other hand, a design of FIG. 29 uses a method where data transfer to an optical recording surface is not executed. A decision block 201, a reproduction block 202, and an exclusive reproduction block 204 of FIG. 29 are similar to those of FIG. 28, and a description thereof will be omitted. Since the data transfer is not executed, it is unnecessary to provide a reproduction/transfer block 203, a recording/transfer block 206, and a transfer block 207. A recording block 205 of FIG. 29 differs from that of FIG. 28, and a detailed description thereof will be given hereinafter.

A step 226 in the reproduction block 202 checks whether or not a reproducing instruction is present. When the result of the check is No, an advance to a step 264 is done. Otherwise, an advance to a step 260 is done. The step 260 manages a processed optical track in unit of a magnetic track, and a calculation is given of a magnetic track at the opposite side of an optical track which may be damaged by magneto-optical recording. In addition, a check is made as to whether or not the present track is the same as the track subjected to previous saving. When the result of the check is Yes, a step 263 executes magneto-optical recording on the optical track. Otherwise, a step 261 writes the saved data into the previous magnetic track, and thereby the data on the previous magnetic track can be fully retrieved. Next, a step 262 reads out data from the magnetic track which may be damaged at this time, and saves the readout data into the memory. Then, a step 263 executes recording on the optical track, and a return to a step 243 is done. When the result of a check by the step 243 is No, a step 261a retrieves the previous conditions of the magnetic track. Thereafter, a step 264 in an end block 206A checks whether or not the operation is ended. When the result of the check is No, a return to the step 226 is done. Otherwise, a step 265 executes magnetically recording information which has been changed during the interval from the placement of the disk to the end, for example, information of the ending music number. Then, a step 266 ejects the disk. In this way, the work is ended. When a next disk is placed into an apparatus, the work is started again at the step 220.

In the design of FIG. 28, all the magnetic data is transferred to the optical recording layer to cope with a damage to the magnetic data by the magneto-optical recording. On the other hand, in the design of FIG. 29, magnetic data is managed in unit of a magnetic track, and reading is given on only magnetic data from a magnetic track which may be damaged by the magneto-optical recording. The readout data is stored into the memory. When the magnetic track is damaged by the magneto-optical recording and optical recording on another magnetic track is done, the former magnetic track is completely retrieved. Thereby, a memory capacity which corresponds to one magnetic track to three magnetic tracks suffices, and the capacity of the memory can be relatively small. As made clear from FIG. 29, the design of this drawing has an advantage such that a simple process can protect magnetic data from being damaged by the magneto-optical recording.

As shown in FIG. 30(a) and FIG. 30(b), a reproducing process can be given on a magneto-optical disk and a CD by using a same mechanism. In the case of a CD, since a protective cartridge is absent, the CD tends to be affected by an external magnetic field. By setting a magnetic coercive force in a magnetic recording layer 3 of a CD to 1,000 to 3,000 Oe and thus making it much stronger than that in a magnetic recording layer of a magneto-optical recording medium, there is provided an advantage such that magnetic data can be prevented from being damaged by an external magnetic field. In the case of a magneto-optical disk, if a magnetic coercive force is increased to a level near the magnitude of a modulation magnetic field, the magnetic coercive force can provide an adverse influence. Thus, the magnetic coercive force is set to 1,000 Oe or less.

DESCRIPTION OF THE FIFTH PREFERRED EMBODIMENT

FIG. 32 shows a recording and reproducing apparatus according to a fifth embodiment of this invention which is similar in basic operation to the apparatus of FIG. 1 and FIG. 24 related to the first embodiment and the fourth embodiment. The fifth embodiment differs from the first embodiment in the following points.

As shown in FIG. 33, the fifth embodiment includes two windings, that is, a magnetic-field modulating winding 40a and a magnetically recording winding 40b. With reference to FIG. 32, during the magnetic recording or reproduction, a magnetic head circuit 31 feeds or receives a current to or from the magnetic recording winding 40b to execute the magnetic recording or reproduction.

During the execution of the magneto-optically recording of the magnetic-field modulation type, a magnetic-field modulating circuit 37a in an optical recording circuit 37 feeds a modulation signal to the magnetic-field modulating winding 40a to realize the magneto-optical recording.

With reference to FIG. 33, a description will now be given of operation of the recording and reproducing apparatus which occurs during the magnetic recording and reproduction. A recording current fed from the magnetic head circuit 31 flows in a direction denoted by the arrow in the drawing. Thus, a magnetic closed circuit of magnetic fluxes 86c, 86a, and 86b is formed, and time segments of an information signal 61 are sequentially recorded on a magnetic recording layer 3. The magnetic recording is done in a horizontal direction. In this case, no current is basically fed to the magnetic-field modulating winding 40a. In this structure, a closed magnetic circuit including a gap 8c is formed, and optimal designing of a reproduction sensitivity is enabled.

With reference to FIG. 34, a description will now be given of operation of the recording and reproducing apparatus which occurs during the magneto-optical recording. The magnetic-field modulating winding 40a is wound on a main magnetic pole 8a and a sub magnetic pole 8b of a yoke in equal directions. Thus, when a modulating current flows from the magnetic-field modulating circuit 37a in a direction 51a, downward magnetic fluxes 85a, 85b, 85c, and 85d occur. Magneto-optically recording material in a point of an optical recording layer 4, which is exposed to a light spot 66 and which is heated to a Curie temperature thereof or higher, undergoes magnetization inversion in response to the magnetic field so that an information signal 52 is recorded. In this case, the strength of the magnetic field at the light spot 66 is generally set to 50–150 Oe in a region 8e exposed to a uniform magnetic field. As shown in FIG. 25, it is preferable to provide an interference layer 81 to prevent the magneto-optical recording material from being subjected to magnetization inversion in response to an information signal 61. It is good to set the thickness d of the interference layer 81 as $\lambda > d$.

The structure of FIG. 34 has an advantage such that the region 8e exposed to the uniform magnetic field can be wide. In addition, since recording heads can be independently designed with respect to the two windings, there is provided an advantage such that optimal magnetic-field modulating characteristics, optimal magnetic recording characteristics, and optimal magnetic reproducing characteristics can be attained. Since the head gap 8c of FIG. 33 can be small, it is possible to shorten the wavelength which occurs during the magnetic recording. Since optimal designing of the formation of a closed magnetic field is enabled, the reproduction sensitivity can be enhanced. As shown in FIG. 34, during the magnetic-field modulation, the magnetic flux 85a of the main magnetic pole 8a and the magnetic flux 85d of the sub magnetic pole 8b extend in the equal directions, so that a strong magnetic field does not occur in the gap 8c but only a weak magnetic field corresponding to the modulation magnetic field occurs. Since a magnetic coercive force in the magnetic recording, layer 3 is 800–1,500 Oe and is adequately stronger than the modulation magnetic field and since there is an easily magnetized axis in a horizontal direction there is provided an advantage such that a magnetically recorded signal 61 is prevented from being damaged by the modulation magnetic field. Thus, by setting the magnetic coercive force Hc of the magnetic recording layer 3 stronger than the recording magnetic field Hmax applied to the magneto-optical recording material, a damage to the data is prevented. In the case of the provision of an allowance corresponding to double, it is good to maintain a relation as $Hc < 2Hmax$. In addition, it is good to fabricate a recording medium 2 shown in FIG. 8. As shown in FIG. 35, in a magnetic head 8, windings 40a and 40b may be separately wound on a main magnetic pole 8a and a sub magnetic pole 8b respectively. In this case, during the magnetic-field modulation, a modulating current is also driven through the magnetic recording winding 40b in a direction 51b by using a magnetic head circuit 31, and thereby a magnetic flux 85d occurs which extends in a direction equal to the directions of the magnetic fluxes 85c, 85b, and 85a. Thus, it is possible to obtain an advantage similar to the advantage of the design of FIG. 34.

As shown in FIG. 36, a tap 40c may be provided to a single winding to form two divided sub windings having, three terminals. During the magnetic recording, the tap 40c and a tap 40e are used. During the magneto-optical recording, as shown in FIG. 37, a tap 40d and a gap 40e are used to generate a modulating magnetic field for the magneto-optical recording. In this way, three taps enable the formation of a magnetic head, and thus there is an advantage such that wiring is simple.

DESCRIPTION OF THE SIXTH PREFERRED EMBODIMENT

FIG. 38 shows a recording and reproducing apparatus according to a sixth embodiment of this invention which is similar in basic operation to the apparatus of FIG. 1. FIG. 24, and FIG. 32 related to the first embodiment, the fourth embodiment, and the fifth embodiment. The sixth embodiment differs from the fifth embodiment in the following points.

As shown in FIG. 38, a magnetic head 8 is formed with two gaps 8c and 8e. In addition, two windings 40b and 40f are connected to a magnetic head circuit 31, and one is used for recording and the other is used for erasing. Thus, erasing and recording can be done by a single head.

As shown in FIG. 39, the magnetic head 8 includes a first sub magnetic pole 8b and a second sub magnetic pole 8d. Before the magnetic recording is done by a magnetically recording winding 40b as described with reference to FIG. 33, the magnetic head circuit 31 feeds an erasing current via the second sub magnetic pole 8d. Thus, before the recording, erasing magnetization from a magnetic recording layer 3 can be done by the gap 8e. Therefore, ideal magnetic recording can be done by using the gap 8c, and there is provided an advantage such that C/N and S/N are enhanced while an error rate is reduced.

As shown in FIG. 41, guard bands 67f and 67g are provided along opposite sides of a recording track 67. First, the gap 8e of the second sub magnetic pole 8d executes an erasing process with a width of an erased region 210. As a result, an entire region of the recording track 67 and portions of the guard bands 67f and 67g are subjected to the erasing process. Thus, even if the magnetic head 8 has an tracking error, the gap 8c will not move out of the erased region 210 and the gap 8c can execute good recording.

As shown in FIG. 42, an erasing gap may be divided into two gaps 8e and 8h. In this case, a recording medium 2 is driven in a direction 51, and the magnetic recording is done by a gap 8c having a width greater than the width of a recording track 67 so that recording on portions of guard bands 67f and 67g is executed in an overlapped manner. Magnetization is erased from the overlapped portions by two erased regions 210a and 210b. Therefore, guard bands 67f and 67g are fully maintained. As a result, there is an advantage such that crosstalk between recording tracks is reduced and an error rate is lowered.

With reference to FIG. 40, a description will now be given of the case where magnetic-field modulation for magneto-optical recording is done by using the magnetic head 8. The magnetic-field modulating winding 40a is wound on the main magnetic pole 8a, the first sub magnetic pole 8b, and the second sub magnetic pole 8d so that magnetic fluxes 85a, 85b, 85c, 85d, and 85e uniformly occur in the respective magnetic poles. Thus, there is an advantage such that a wide region 8e exposed to a uniform magnetic field can be provided. In addition, even if an accuracy of track positions is low, a light spot 66 can be prevented from being out of an optical recording track 65.

FIG. 43 shows a magnetic head 8 having a modified winding. As shown in the drawing, a magnetic-field modulating winding 40d is extended and is used in common to a magnetic recording winding, and a central tap 40c is provided. Magnetic recording can be executed by using the tap 40c and a tap 40e. As shown in FIG. 44, currents are driven into the tap 40d and the tap 40e in directions 51a and 51b respectively while a current is driven into a tap 40f in a direction 51c, and thereby magnetic fluxes 85a, 85b, 85c, 85d, and 85e in equal directions occur so that a uniform modulation magnetic field results. In this case, there is an advantage such that the number of taps is reduced by one and the structure is simplified.

As previously described, according to the sixth embodiment, a single head can be used as an erasing head, a magnetic recording head, and a magnetic-field modulating head for the magneto-optical recording.

DESCRIPTION OF THE SEVENTH PREFERRED EMBODIMENT

A seventh embodiment of this invention relates to a disk cassette containing a recording medium. With reference to FIG. 45(a), a disk cassette 42 has a movable shutter 301 which can cover an opening 302 for a head and holes 303a, 303b, and 303c for a liner. As shown in FIG. 45(b), the shutter 301 is opened to unblock the opening 302 and also the holes 303a, 303b, and 303c in accordance with the insertion of the disk cassette 42 into a body of a recording and reproducing apparatus.

As shown in FIGS. 46(a) and 46(b), a single rectangular opening 303 for a liner may be provided.

As shown in FIGS. 47(a) and 47(b) and FIGS. 48(a) and 48(b), an opening for a liner may be provided in a direction opposite to an opening 302 for a head. In this case, as shown in FIGS. 49(a), 49(b), and 49(c), a liner 304 except a movable portion 305a is fixed to a disk cassette 42 by a liner support portion 305 and liner support fixing portions 306a, 306b, 306c, and 306d. The liner support portion 305 is made of a leaf spring or a plastic sheet. As shown in FIG. 49(c), a cassette half is formed with a groove 307 for a liner. The liner movable portion 305a is accommodated in the groove 307, and is held by an auxiliary liner support portion 305b. The liner 304 is held in a flat state by the return spring force of the liner support portion 305 as long as an external force is not applied thereto. The liner 304 being in this state separates from a recording layer at a surface of a recording medium 2. Thus, it is possible to prevent wear of the recording layer 3.

When an external force is applied in a direction toward the interior of the disk cassette 42 by a liner pin 310 through the opening 303, the liner support portion 305 and the liner 304 are pressed against the surface of the recording medium 2.

Another disk cassette will now be described. As shown in FIGS. 50(a), 50(b), and 50(c), a leaf spring of a liner support portion 305 is previously deformed toward the upper surface of a disk cassette 42. Thereby, as shown in FIG. 50(d), when the liner support portion 305 is fixed to the disk cassette 42, the liner support portion 305 continuously abuts against an upper cassette half 42a. Thus, as long as the liner support portion 305 is not depressed, by a liner pin 310, a liner 304 and a recording medium 2 remain out of contact with each other. According to this design, it is possible to omit the auxiliary liner support portion 305b.

A description will now be given of a way of moving the liner and the disk into and out of contact with each other by operating the liner pin 310. FIG. 51 shows conditions where the liner pin 310 is raised along a direction 51a in a liner pin guide 311, and thus the liner 304 and the recording layer 3 of the recording medium 2 are out of contact with each other. Therefore, the recording medium 2 receives a weak frictional force and can be rotated by a weak drive force.

As shown in FIG. 52, when the liner pin 310 is moved downward by an external force in a direction 51a, the liner 304 is pressed against the magnetic recording layer 3 of the recording medium 2 via the liner support portion 305. As the recording medium 2 is moved or rotated in a direction 51, dust is removed from the surface of the magnetic recording layer 3 by the liner 304. The liner 304 is made of, for example, cloth. Thus, in the case where the magnetic recording, the magnetic reproduction, or the magnetic-field modulation for the magneto-optical recording is executed by a recording head 8 in the head opening 301 of FIGS. 46(a) and 46(b), there is provided an advantage such that an error rate is remarkably reduced. The material of the liner 304 may be the same as the material of a liner for a conventional floppy disk. As shown in FIG. 45(a), the liner pin 310 is located above the portion of the magnetic recording layer 3 which precedes the magnetic head 8 with respect to the rotation of the recording medium 2 in the direction 51, and thus there is an advantage such that the cleaning effect is enhanced.

In the case where the liner control method of this invention is applied to a disk cassette 42 for a contact-type magneto-optical recording medium having no magnetic recording layer 3, dust is removed and thus there is provided an advantage such that an error rate is improved during the magneto-optical recording.

As shown in FIG. 53(b), the control of the liner pin 310 is designed so that the liner pin 310 can be moved together with the magnetic head 8. When the magnetic head 8 falls into a contact state, the liner 304 is surely moved into, contact with the recording medium 2. Thus, a single actuator can be used in common. In the case where the magnetic head, 8 separates from the contact state, the line pin 310 is generally raised to move the liner 304 out of contact with the recording medium 2. As shown in FIGS. 53(a) and 53(b), in the case where the liner pin 310 and the magnetic head 8 are moved together, the liner 304 and the recording medium 2 can be out of contact with each other when the identification hole for the magnetic recording layer is absent from the cassette 42. Thus, the liner 304 less wears the surface of the magnetic recording layer 3. In addition, the frictional force on the recording medium 2 is reduced, and thus there is an advantage such that a weaker rotational torque of a drive motor suffices and the rate of consumption of electric power is decreased. When a recording medium 2 which does not have any magnetic recording layer is inserted into the apparatus, the magnetic head 8 and the recording medium 2 remain out of contact with each other so that a damage to the two can be prevented as shown in FIG. 75.

In the case where the disk cassette 42 of this invention is placed into a conventional recording and reproducing apparatus, the liner 304 does not contact the recording medium 2 as shown in FIG. 54(b) since the conventional apparatus does not have the liner pin 310 and the related elevating function as shown in FIGS. 54(a) and 54(b). Thus, the recording medium 2 can be stably rotated by the conventional apparatus which generally provides a weak disk drive torque. Accordingly, there is an advantage such that the compatibility between the disk cassette 42 of this invention and conventional disk cassettes can be maintained.

In the case where a conventional disk cassette 42 which does not have the liner 304 and the opening 303 is placed into the recording and reproducing apparatus of this invention, the liner pin 310 is not inserted since the opening 303 is absent as shown in FIGS. 55(a) and 55(b). Thus, the liner pin 310 does not contact the recording medium 2 and the liner 304, and there occurs no problem. Accordingly, there is an advantage such that the compatibility between the disk cassette 42 of this invention and conventional disk cassettes can be maintained. In this case, lubricant on the conventional recording medium is liable to adhere to the contact surface of the magnetic head 8 so that the error rate tends to be increased. To remove this problem, a cleaning track 67x is set as shown in FIG. 56. In the case where the conventional recording medium 2 is placed into and ejected from the recording and reproducing apparatus of this invention and then the recording medium 2 of this invention is inserted thereinto, the magnetic head 8 is forced to travel on the cleaning track 67x at least once. Thereby, the lubricant is transferred from the magnetic head 8 to the cleaning track 67x. Then, the lubricant is removed from the cleaning track 67x by the liner 304 which contacts the recording medium 2. In this way, the lubricant or dust is removed from the contact surface of the magnetic head 8. Thus, there is an advantage such that the error rate is small and reliable recording and reproduction are enabled.

The liner pin 310 can be moved between an OFF position and an ON position as shown in FIGS. 57(a) and 57(b). The mechanism for elevating the liner 304 has a structure such as shown in FIG. 58 and FIG. 59.

A modified liner pin 310 will now be described. As shown in FIG. 60 and FIG. 61, a liner pin 310 is of a leaf spring type. As shown in FIG. 62 and FIG. 63, the liner pin 310 can be moved between an OFF position and an ON position. The liner pin 310 is driven in directions 51 and 51a by an elevating motor 21 via a pin drive lever 312, being moved between the ON position and the OFF position.

In the case of use of a single rectangular opening 303, a liner pin 310 can be moved between an OFF position and an ON position as shown in FIG. 64 and FIG. 65. In this case, the area of contact between the liner pin and the liner attachment portion is large, and thus there is an advantage such that dust can be surely removed.

According to a liner pin shown in FIG. 66 and FIG. 67, a liner guide 311 is provided with a protective portion 314. As shown in FIG. 66, a disk cassette 42 of this invention has a recognition hole 313. In the case where the disk cassette 42 of this invention is inserted into a recording and reproducing apparatus, the liner pin 310 is placed in an opening 303. In the case where a conventional disk cassette 42 which does not have a recognition hole 313 is inserted into the recording and reproducing apparatus, the protective portion 314 contacts an outer shell of the disk cassette 42 so that the liner pin 310 remains out of contact with the outer shell of the disk cassette 42. Thus, there is an advantage such that the liner pin 310 can be prevented from becoming dirty or being damaged.

DESCRIPTION OF THE EIGHTH PREFERRED EMBODIMENT

An eighth embodiment of this invention relates to a mechanism for elevating a liner pin to move a liner.

As shown in FIGS. 68(a) and 68(b), an upper surface of a disk cassette has no opening for a liner. A back side of the disk cassette has recognition holes 313a, 313b, and 313c, and an opening 303 for a liner. The opening 303 extends near the recognition holes 313a, 313b, and 313c. A liner pin is inserted into the disk cassette through the opening 303 from the back side, and thereby a liner is moved vertically.

FIG. 69(a) shows conditions where a liner pin 310 is in an OFF position so that a liner 304 separates from a recording medium 2. As shown in FIG. 69(b), when a liner pin 310 is inserted into the opening 303, a liner drive member 316 is deformed by the liner pin 310 toward a right-hand side and is thus rotated counterclockwise about a pin shaft 315. Thereby, a liner support portion 305 is forced downward by the liner drive member 316 so that the liner 304 is brought into contact with the recording medium 2. As the recording medium 2 rotates, the liner 304 removes dust from the recording medium 2. The liner drive member 316 is made of a leaf spring.

The liner has a structure such as shown in FIGS. 70(a), 70(b), and 70(c). The liner structure is basically similar to the liner structure previously described with reference to FIGS. 49(a), 49(b), and 49(c) except for the following design changes. An edge of the liner drive member 316 is provided with a movable portion 305a. In addition, as shown in FIG. 70(c), a groove 30a is added for accommodating the liner drive member 316.

The drive mechanism for the liner 310 will be further described. The liner pin 310 and a motor 17 are in a positional relation such as shown in FIG. 71. As shown in FIG. 72(a), in the case where a disk cassette 42 of this invention is inserted into a recording and reproducing apparatus in a direction 51, the liner 304 is moved vertically together therewith even if an actuator for the liner pin 310 is not provided. As shown in FIG. 72(b), in the case where a conventional disk cassette 42 having no opening 303 is inserted into the recording and reproducing apparatus, the liner pin 310 is automatically moved downward against the force of a spring 317 since the opening 303 is absent. Thus, there is an advantage such that the conventional disk cassette 42 is prevented from being damaged by the liner-pin 310. In the case of use in an apparatus such as a game machine where the frequency of access to a disk is very low, the structure of the apparatus can be simplified since it is unnecessary to provide an actuator for the liner pin 310.

As shown in FIGS. 73(a) and 73(b), an elevating motor 21 for a magnetic head 8 may be used also to drive a liner pin 310 via an elevator 20 and a connecting portion 318. In this design, when the magnetic head 8 contacts a recording medium 2, a liner 304 always contacts the recording medium 2. Thus, there is an advantage such that a single actuator can be used in common for the magnetic head 8 and the liner pin 310.

FIGS. 74(a) and 74(b) show another disk cassette 42 which is basically similar to the disk cassette of FIGS. 69(a) and 69(b) except that a liner drive member 316 is extended and a pin shutter 319 is added. Thus, as shown in FIG. 74(a), the pin shutter 319 is closed when a liner pin 310 assumes an OFF state, and thus there is an advantage such that external dust is prevented from entering the disk cassette 42. According to this design, since the part near a recognition hole in the disk cassette is used, the addition of only one small hole through a conventional disk cassette suffices. Thus, there is an advantage such that the degree of the compatibility between the disk cassette of this invention and the conventional disk cassette can be enhanced. The structure of FIGS. 69(a) and 69(b) has an advantage such that an occupied space in a horizontal direction can be small. Therefore, as shown in FIGS. 68(a), and 68(b), even in the case where only a small usable space is present, an opening 303a for the liner can be provided. Thus, the degree of freedom in designing of a disk cassette is enhanced.

DESCRIPTION OF THE NINTH PREFERRED EMBODIMENT

FIG. 75 shows a disk cassette according to a ninth embodiment of this invention. A liner 304 and a liner attachment portion 305a are approximately similar in structure to those in FIGS. 49(a), 49(b), and 49(c). In this embodiment, as shown in FIG. 76 and FIG. 77, the liner-attachment portion 305 has a movable section 305a provided with a liner elevator 305c. As the liner elevator 305c is depressed by a liner drive portion 316, the liner 304 is moved vertically. In the case where a liner pin 310 assumes an OFF state, a pin shutter 319 is pressed against a cassette lower wall by a spring 317 so that external dust is prevented from entering the disk cassette. The liner support portion 305 and the movable section 305a are pressed against a cassette upper wall by a leaf spring effect and an auxiliary liner support portion 305b. Thus, in this case, the liner 304 remains out of contact with a recording medium 2.

As shown in FIG. 77, when the liner pin 310 assumes an ON state, the pin shutter 319 forces the liner drive portion 316 to rotate clockwise about a pin shaft 316 so that the liner drive portion 316 depresses the liner elevator 305c. Therefore, the movable section 305a of the liner attachment portion 305 is lowered so that the liner 304 is brought into contact with the recording medium 2. As the recording medium 2 rotates in a direction 51, the liner 304 removes dust from the surface of the recording medium 2. Thus, there is an advantage such that an error rate can be reduced. In addition, the ninth embodiment has an advantage such that the structure thereof is relatively simple and the upward and downward movement of the liner 304 can be surely executed. Since it is unnecessary to provide a groove in the disk cassette 42, there is an advantage such that the durability of the disk cassette 42 can be high.

In the case where this embodiment is applied to the design of FIG. 68(a), the liner elevating mechanism has a structure such as shown in FIGS. 78(a) and 78(b). The operation of the structure of FIGS. 78(a) and 78(b) is similar to the operation of the structure of FIGS. 76 and 77. As shown in FIG. 78(a), when a liner pin 310 is in an OFF position, an opening for a liner is closed by a pin shutter 319. As shown in FIG. 78(b), when the liner pin 310 assumes an ON position, a liner drive portion 316 is rotated counterclockwise and depresses a liner elevator 305c. Thus, a liner attachment portion 305a and a liner 304 are lowered so that the liner 304 is brought into contact with a recording medium 2. This design has an advantage over the design of FIG. 76 such that the liner elevating mechanism occupies a smaller space.

In a design where a liner and a recording medium separate from each other when a liner pin 310 is inserted into a disk cassette 42, there is an advantage such that the liner contacts the recording medium and prevents the recording medium from being rotated and damaged during unuse conditions of the disk cassette 42.

DESCRIPTION OF THE TENTH PREFERRED EMBODIMENT

A recording and reproducing apparatus according to a tenth embodiment of this invention is similar to the recording and reproducing apparatus of FIG. 38 except for design changes indicated later.

First, tracking will be described. As shown in FIG. 79(a), under ideal conditions, a magnetic head 8 vertically aligns with an optical head 6. Thus, when the optical head accesses an optical track 65 of a given address, the magnetic head 8 accesses a corresponding magnetic track 67 at the opposite side of the optical track 65. In this case, a DC offset voltage is absent from a tracking error signal outputted by an optical head actuator 18. However, in fact, a variation in a spring constant of the optical actuator 18 and an influence of gravity cause the center of the optical head actuator 18 to be subjected to a positional offset of several tens of μm to several hundreds of μm. In addition, during assembly, a positional error is offered to the center of the magnetic head 8. Thus, as shown in FIG. 79(b), there occurs a positional offset Δ1 between the center of the magnetic head 8 and the center of the optical head actuator 18.

Even when an optical track of a given address is scanned by the optical head 6, there is a chance that an unrelated magnetic track is scanned by the magnetic head 8 since a correspondence relation with a magnetic track scanned by the magnetic head 8 is absent. Specifically, a pitch of magnetic tracks is generally set to 50 to 200 μm. A possible maximum offset between the center of the optical head 6 and the magnetic head 8 is equal to several hundreds of μm. Thus, under bad conditions, there is a chance that the magnetic head 8 travels on a magnetic track neighboring a desired magnetic track and thereby wrong recording of data is executed.

To prevent such a problem, this invention adopts a method in which an offset voltage ΔVo is provided to a tracking control signal to compensate for the positional offset of the optical head 6 so that the optical head 6 can accurately face the opposite side of a reference (currently-scanned) magnetic track 67. According to this design, the magnetic head 8 and the optical head 6 reliably remain in vertical alignment with each other, and the positions of the optical track 65 and the magnetic track 67 are more highly correlated. In general, the offset between the magnetic head 8 and the optical head 6 falls in a range well covered by a normal tracking error of several μm to several tens of μm. Even in the case where the track pitch is set to 50 μm, the magnetic head 8 can be held in good tracking conditions with respect to a desired magnetic track by referring to the address of a currently-scanned optical track.

In the case where an offset voltage ΔVo is applied as shown in FIG. 80(b), the offset of the optical head 6 is corrected so that the magnetic head 8 can access a desired magnetic track 67 by accessing the address of a currently-scanned optical track 68.

A description will now be given of calculation of a desired value of the offset voltage ΔVo. According to the standards for a CD or an MD (a mini-disk), a maximum possible offset of an optical track 65 is 200 μm. A pitch of magnetic tracks 67 corresponds to 2DD and is thus equal to 200 μm in the case of a 135-TPI class. Thus, if no countermeasure is provided, it is generally difficult to access a desired magnetic track 67 by referring the address of an optical track 65 at the opposite side thereof.

As shown in FIG. 81(a), there occurs an offset Δrn between a pre-mastered optical track 65PM and a locus 65T of the optical head 6 free from servo control. Here, in the case where a traverse is held fixed and the optical head 6 is subjected to tracking servo control, the offset of the optical track causes a tracking error signal such as shown in FIG. 81(b).

In the case where an optical track address is read out and is set as a reference point when θ=0, the tracking radius is made equal to rn-Δrn by the offset and is thus smaller than a designed tracking radius rn. On the other hand, in the case where an optical track address is read out and is set as a reference point when θ=180°, the tracking radius is made equal to rn+Δrn by the offset and is thus greater than the designed tracking radius rn.

In the case where the track pitch is equal to 100–200 μm and the offset of the optical track is equal to ±200 μm, the tracking radius tends to deviate from a desired radius if tracking servo control is absent.

As shown in FIG. 81(b), the error is minimized when θ=90° and θ=270°. Accordingly, the address of an optical track 65PM which occurs when θ=90° or η=270° is used as a reference and the position of the center of an optical track is determined on the basis of the reference, and thereby the radius rn of an n-th track corresponding to a setting value is determined.

As made clear from FIG. 81(b), Δrn=0 when θ=90° and θ=270°, and a standard (reference) tracking radius rn is determined. The positions of θ=90° and θ=270° are determined by referring to the tracking error signal. The address of an optical track 65 in a position on a line of extension of these angles is used, and the optical head is subjected to tracking control with respect to this optical track address 65s. Thereby, there is provided an advantage such that a standard (reference) tracking radius rn is obtained and more accurate tracking by the magnetic head is enabled. It should be noted that the optical track address information is recorded on a first track of a magnetic track 67 or a TOC track.

In the case of the CD or MD format, the number of pieces of address information pre round of an optical track is relatively small. Thus, 360 addresses can not be obtained for one degrees of 360°. As shown in FIG. 86, it can be known what degrees of an angle θ a block in a given order number in an address 1 corresponds to. Thereby, for example, an angular resolution in unit of degree can be obtained. Thus, by executing management in unit of block, it is possible to obtain optical address information of an arbitrary radius and an arbitrary angle. A table representing the correspondence between optical address information and a magnetic track number will be referred to as an address correspondence table.

Next, a description will be given of methods of providing the correspondence between a magnetic track radius rm and an optical track radius ro. A positional offset between the optical head and the magnetic head has a first component caused during manufacture and assembly and a second component caused during operation. Positions and sizes vary parts by parts or devices to devices, and therefore the offset components can not be uniquely determined. To maintain the compatibility, it is important to clarify the correspondence between the magnetic track radius and the optical track radius.

According to a first method, a reference track is not provided on a magnetic surface of a recording medium. As shown in FIG. 79(b), during the formatting of a magnetic surface, a positional offset is always present between the magnetic head 8 and the optical head 6. If the formatting is done under these conditions, a track with a positional offset is recorded. In the case where recording and reproduction are done on a same disk by a same drive, there is no problem since an equal positional offset is always present.

In the case where tracking is moved to a given track, a traverse is required to be moved always in a same direction, for example, a direction from an inside toward an outside, in view of the fact that an actuator for the traverse has a backlash. In the case where tracking is done again on an n-th track, an offset distance is present between the magnetic track 8 and the optical head 6 as shown in FIG. 79(b) if an offset voltage is not applied during the tracking. Thus, when an optical track same as the optical track during the recording is accessed, tracking, is done with respect to a magnetic track same as the magnetic track during the recording so that data can be recorded and reproduced into and from the desired magnetic track.

In the case where the recording medium which has been formatted is operated by another drive and the drive has characteristics such that an offset equals zero in the absence of an offset voltage as shown in FIG. 82(a), an optical track and a magnetic track are out of alignment by an offset distance as compared with the previous recording so that data will be recorded and reproduced into and from a wrong magnetic track.

In this invention, to remove such a problem, the traverse is controlled and moved so that a reference magnetic track will be accessed first as shown in FIG. 82(a). Then, under conditions where the traverse is fixed, an offset voltage ΔV is varied so that the optical track 6 will access an optical track 65 containing a reference address signal. As a result, the offset voltage ΔVo is determined. Thereby, the relation of the correspondence between the optical track and the magnetic track is provided similar to the drive which has executed the previous formatting.

The offset voltage ΔVo is continuously applied to the actuator for the optical track 6. Thereby, a simple structure can produce an advantage such that all the magnetic tracks and the optical tracks correspond to each other with an accuracy of several μm to several tens of μm. Thus, by applying the offset voltage, it is possible to automatically access a given magnetic track when a given optical track is accessed. Since this advantage is obtained by the structure having no position sensor for the lens of the optical head 6, there is an advantage such that the number of parts can be reduced.

Next, a description will be given of a second method in which a reference track is previously recorded on a magnetic recording surface. As shown in FIG. 83, during the fabrication of a disk, one magnetic track 67 is provided which records an embedded servo track. With respect to this servo magnetic track 67s, as shown in the left-hand part of FIG. 83, two magnetic tracks are recorded while the are partially overlapped. Carriers of frequencies fa and fb are recorded on the two magnetic tracks respectively.

When the magnetic head 8 executes tracking on the center of the servo magnetic track during the reproduction, the magnitudes of reproduced signals of the frequencies fa and fb are equal to each other. When the tracking deviates inwardly from the center, the output signal of the frequency fa is greater. On the other hand, when the tracking deviates outwardly from the center, the output signal of the frequency fb is greater. Thus, the traverse is moved so that the magnetic head 8 can be positionally controlled at the center of the track.

Although the provision of the servo magnetic track causes a slight increase in the cost of a recording medium, there is an advantage such that the offset voltage ΔVo can be more accurately calculated in connection with FIG. 80(a). In addition, eccentricity information of an optical track can be more accurately determined.

As shown in FIGS. 84(a) and 84(b), a slider 41 of the magnetic head 8 is made of soft material such as teflon other than metal, and is formed by molding. Thereby, there is an advantage such that the slider 41 less damages a magnetic recording layer 3.

As shown in FIGS. 85(a) and 85(b), when the magnetic recording is not executed, a slider actuator inclines the slider 41 so that the magnetic head 8 is separated from the magnetic recording layer 3 and a part of an edge of the slider 41 is brought into contact therewith.

As shown in FIG. 85(b), only when the magnetic recording is executed, the actuator inclines the slider into parallel with the magnetic recording layer so that the magnetic head 8 moves into contact with the magnetic recording layer 3. Thus, the magnetic recording is possible. In this case, there is an advantage such that wear of the magnetic head 8 can be reduced during unexecution of magnetic recording.

DESCRIPTION OF THE ELEVENTH PREFERRED EMBODIMENT

A recording and reproducing apparatus according to an eleventh embodiment of this invention is similar to the recording and reproducing apparatus of FIG. 38 except for design changes indicated later. The eleventh embodiment uses a non-tracking system in which tracking servo control is not executed on a magnetic head. The eleventh embodiment includes a recording circuit such as shown in FIG. 87.

As shown in FIGS. 88(a) and 88(b), recording is done by using two magnetic heads 8a and 8b, that is, an A head 8a and a B head 8b, which have different azimuth angles respectively. As shown in FIG. 88(b), the track pitch Tp of a magnetic track 67 and a head width TH have a relation as Tp<TH<2 Tp. Normally used conditions are as TH=1.5–2.0 Tp. Thus, in the case of recording on an n-th track, recording is also done on a region of an (n+1)-th track in an overlapped manner. The overlapped portion is subjected to overwriting record during the recording on the (n+1)-th track, and therefore a recording track is formed which has a width corresponding to the width Tp.

As shown in FIG. 89, recording is done while the two heads, that is, the A head 8a and the B head 8b, which have the different azimuth angles are changed at θ=0° and data is overwritten thereby alternately in a spiral shape. Thus, as shown in FIG. 88, the formed track width Tp is smaller than the head width TH. Since A tracks 67a and B tracks 67b having different azimuth angles alternate with each other, crosstalk between tracks is absent during the reproduction. As shown in FIG. 90, guard, bands 325 are provided between neighboring track groups 326, and thus independent recording and reproduction can be done on each of the track groups.

As shown in FIG. 91, data of respective tracks such as A1, B1, and A2 is composed of a plurality of blocks 327, and one track group is set by combining a plurality of tracks. Guard bands 325 are provided between track groups so that rewriting can be done in unit of track group. A plurality of blocks which compose one track have a sync signal 328, an address 329, a parity 330, data 331, and an error detection signal 332.

Operation which occurs during the recording will now be described. Input data related to a designated address is fed to an input circuit 21. In the eleventh embodiment, data is rewritten while a track group 326 of FIG. 91 is used as a unit. Thus, simultaneous recording is done with respect to a plurality of tracks. Since track groups 326 are separated by guard bands 325 as shown in FIG. 90, an adverse influence on other track groups, is prevented even if the recording and reproduction is done in this unit.

In the case where the input data contains only information of a part of a plurality of tracks, the data is insufficient and thus rewriting can not be done on the whole of one track group 326. Accordingly, in the case of rewriting on an n-th track group, reproduction is previously done on the n-th track group and all the data is stored into a buffer memory 34 of a magnetic reproducing circuit 30. The data is transmitted to the input circuit 21 as an address and data during the writing, and data of an address equal to the input data address is replaced by the input data. In this case, data of an address equal to the address related to the input data in the buffer memory 34 may replace the input data.

All the data of the n-th track group 326n which should be written is transmitted from the input circuit 21 to a magnetic recording circuit 29 and is modulated by a modulating circuit 334, and a separating circuit 333 generates data for the A head 8a and data for the B head 8b.

As shown in FIG. 92a(a), recording A track data 328a1 is done by the A head 8a at t=t1. At t=t2 where a disk is rotated through 360°, recording B track data 328b1 is done by the B head 8b.

With respect to a timing signal for the change between the A head and the B head, a rotation signal for a disk motor 17 is used or 360° -revolution is detected by using optical address information from an optical reproducing circuit 38. The timing signal is transmitted from a disk rotation angle detecting portion 335 to the magnetic recording circuit 29. An end of each track data 328 is provided with a non-signal part 337, and a signal guard band results which prevents A track data 328a and B track data 328b from overlapping.

The guard bands are present on the disk. To prevent data from being recorded on a track group 326 adjacent to a desired track group while being passed over a guard band 325, it is necessary to accurately set a record starting radius and a record ending radius. This invention adopts a method in which a given optical address is used as a reference point and a permanent absolute radius is attained.

In FIG. 87, an optical address is read out by the optical head 6 and the optical reproducing circuit 38. The method of optical head offset correction which has been described with reference to FIGS. 80(a), 80(b), 82(a), and 82(b) is used to increase an accuracy. According to the same method, an offset corrective amount is calculated, and is stored into an offset corrective quantity memory 336. The offset corrective amount is read out therefrom when needed. Under conditions where an optical head drive circuit 25 offers an offset to the optical head 6, a traverse actuator 23a is driven by a traverse moving circuit 24a while an optical address is referred to, and a traverse is moved. In this way, an optical address of the optical track is referred to, and tracking can be accurately executed on a magnetic track 67. According to the example where the recording is done by alternately using the two magnetic heads 8a and 8b which have the different azimuth angles, the recording time tends to be long.

As shown in FIG. 88(c), the radial positions of two heads are offset by Tp. In addition, A track data and B track data are simultaneously outputted and transmitted from the separating circuit 333 of FIG. 87, and the traverse is fed or moved at a pitch twice Tp every round. Thereby, as shown in FIG. 92(b), recording on one track group can be executed in a time half the time of the above-mentioned case, and there is an advantage such that higher-speed recording can be done.

In this way, the input data is recorded on the tracks in a spiral shape.

An example of specific designing will now be described. Even in the case where an offset of an optical track is ±200 μm, the offset correcting arrangement removes adverse affection of the offset and the offset falls into a range of a chucking offset amount which equals ±25 μm. An offset of the rotational shaft of a motor can be limited to within a range corresponding to ± several μm. In this case, by setting the guard band width equal to 50 μm or more, a track can be recorded which has a width or an error within ± several μm. Thus, there is an advantage such that a large amount of data can be recorded by the non-tracking system.

A description will now be given of traverse control which occurs in the case of spiral recording. With reference to FIG. 89, a record starting point optical address 320a and a record ending point optical address 320e are set as reference points. In the design of FIG. 89, it is good that while the disk is rotated four times, the traverse is driven at an equal pitch from the starting point to the ending point. This invention adopts a structure in which a rotational motor rotates a screw and thereby feeds or moves the traverse. Rotation pulses from the rotational motor can be obtained.

As shown in FIG. 97, the traverse is moved from the starting point optical address 320a to the ending point optical address 320e. During this period, the rotation number no of a traverse drive gear is measured. Since the disk is rotated four times, a system controller 10 calculates a rotational speed corresponding to no/4T r.p.s. The system controller 10 outputs an instruction for rotating the traverse drive gear at this speed (rotation number). The magnetic head executes data recording with an accurate track pitch. At the end of the recording, since the magnetic head 8 lies near the ending point optical address 320e, passing over the guard band and reaching the starting point optical address 320x of a neighboring track group can be prevented. It is sufficient that measuring the rotational speed of the traverse drive gear is executed once each time disks are changed. This information may be recorded on a disk. By doing traverse control while counting the line number of an optical track, it is possible to execute smoother and more accurate feed of the traverse.

FIG. 96 shows designing which uses coaxial tracks. In this case, during the recording on respective tracks, the traverse is moved each time so that six points corresponding to optical addresses 320a, 320b, 320c, 320d, 320e, and 320f will be accessed by the optical head. Thereby, cylindrical tracks are formed.

In the presence of a non-address region 346 which does not have an optical address and a signal, access by referring to the optical address can not be executed. In this case, with respect to an optical address region 347, a reference radius and a disk rotational reference angle are determined, and the line number of an optical track is counted. Thereby, tracking can be done on a given relative position even in the non-address region 346. Provided that a table indicating the line numbers from reference optical address points for respective tracks is made and is written into a magnetic TOC region 348, another drive can access a target magnetic track. The method of executing access by referring to the line number is less accurate in absolute position than the method using the optical address, and is advantageous thereover in that an access speed is higher. It is preferable to use the two methods. From the standpoint of high-speed access, it is good to adopt the method which uses counting the line number during the reproduction. Drives are of a high density type and a normal density type. The high density type has a head width TH which equals ½ to ⅓ of that of the normal density type. In addition, its track pitch equal ½ to ⅓ of the track pitch Tpo of the normal density type. In the case of non-tracking, the high density type can reproduce data of a normal density type but the normal density type can not reproduce data of a high density type.

To attain the compatibility, a compatible track is provided during the recording by using the high density type. In addition, as shown in FIG. 99, the recording is done at a track pitch equal to Tpo. Thereby, the normal density type can reproduce the recorded data. In the case where data on an optical surface is divided into three programs 65a, 65b, and 65c as shown in FIG. 100, regions for magnetic recorded data to be saved are set in magnetic tracks 67a, 67b, and 67c extending on the surface. Thus, there is an advantage such that the displacement of the traverse is small and an access time is short.

Next, a description will be given of the reproduction principle. FIG. 93 shows a reproducing section of the apparatus. The reproducing section of FIG. 93 is approximately similar to that of FIG. 87 except for a magnetic reproducing portion 30.

First, the system controller 10 transmits a reproducing instruction and a magnetic track number accessing instruction to a traverse controller 338. As in the design of FIG. 87, the magnetic head accurately accesses a target magnetic track number.

As shown in FIG. 89, tracking is done with respect to a magnetic track 67 in a spiral shape, and both the output signals of the A head 8a and the B head 8b are simultaneously inputted into the magnetic reproducing portion 30. The input signals are amplified by head amplifiers 340a and 340b respectively, being subjected to demodulation by demodulators 341a and 341b and being subjected to error check by error check portions 342a and 342b to derive correct data. The correct data signals are fed to AND circuits 344a and 344b. Data separating portions execute the separation between addresses and data. Only data free from errors is transmitted to the buffer memory 34 via the AND circuits 344a and 344b, and respective pieces of the data are stored into respective addresses. The data is outputted from the memory 34 in response to a reading clock signal from the system controller 10. When the buffer memory 34 reaches given conditions close to overflow conditions, an overflow signal is transmitted to the system controller 10 and the system controller 10 outputs an instruction to the traverse controller to reduce the traverse feed width. Alternatively, the system controller 10 may lower the speed of the motor 17 to reduce the reproduction transmission rate. As a result, overflow is prevented.

In the case where the number of errors detected by the error check portion 342 is large, an error signal is transmitted to the system controller 10 and the system controller 10 outputs an instruction to a traverse control circuit 24a to reduce the track pitch. As a result, during the reproduction, the track pitch is reduced from the normal value Tp to ⅔ Tp, ½ Tp, and ⅓ Tp so that the data of an equal address is reproduced 1.5 times, double, and three times. Thus, the error rate is lowered.

In the case where all data in an (n+1)-th track gathers before all data in an n-th track gathers in the buffer memory 34, there is a chance that the data of the n-th track can not be reproduced. In this case, the system controller 10 outputs a reverse direction traverse instruction to the traverse controller to return the traverse inwardly. Then, the n-th track is subjected to the reproducing process. As a result, the data of the n-th track can be reproduced.

In this way, there is an advantage such that data can be surely reproduced without increasing the error rate.

A description will now be given of operation of reproducing information from a disk with non-tracking. As shown in FIG. 94, data is recorded on a disk, and the data includes data 345a, 345b, 345c, and 345d in an A track. In addition, data B1, B2, B3, and B4 in a B track are also recorded. When the reproduction is executed by the A head, the data in the B track can not be reproduced due to a discrepancy in azimuth angle.

For the simplicity of description, the data in the B track will be omitted. In the case where the recorded data 345 in the A track is reproduced by the A head 8a with a track pitch Tpo equal to that during the recording, the loci of the track extend as track loci 349a, 349b, 349c, and 349d since there is an offset in chucking with respect to the disk. The head width TH of the A head 8a is greater than the track pitch Tpo, and therefore halves of tracks on both sides are subjected to a reproduction process. The B track is not subjected to a reproduction process. Accordingly, reproduced data free from errors, among signals reproduced from the respective track loci, have forms such as A head reproduced data 350a, 350b, 350c, 350d, and 350e. The data are sequentially transmitted to the buffer memory 34 of FIG. 93, and are recorded into given disk addresses. Thus, the data of the respective tracks are fully reproduced as memory data 351a and 351b. In this way, the data of the A track with non-tracking is reproduced. The data of the B track is similarly reproduced.

As previously described, in the eleventh embodiment, the recording and reproduction can be done with a small track pitch even in the absence of tracking servo control of the magnetic head. Thus, there is an advantage such that a memory of a large capacity can be realized by a simple structure. Since the traverse control is done by using the addresses on the optical surface, a low accuracy of, feed of the traverse suffices and a linear sensor regarding a radial direction can be omitted. In the case of a non-tracking system, the accuracy of tracking basically depends on the accuracy of a bearing of a rotational motor. Generally, a high accuracy of the bearing of the rotational motor can be realized with a low cost. In the case of an MD ROM used in a cartridge, the recording wavelength can be equal to 1 μm or less so that a recording capacity of 2 to 5 MB can be obtained. In the case of a CD ROM, a print layer and a protective layer are formed on a magnetic layer as will be described later so that the recording wavelength is generally equal to 10 μm or more. Thus, a capacity of only several tens of KB can be obtained according to the normal system. On the other hand, a capacity of several tens of KB to 1 MB can be obtained by using the non-tracking system. As previously described, the eleventh embodiment has an advantage such that a large memory capacity can be realized with a low cost while a conventional optical access mechanism for a CD, a CD ROM, an MD, or an MD ROM is used as it is.

DESCRIPTION OF THE TWELFTH PREFERRED EMBODIMENT

A recording and reproducing apparatus according to a twelfth embodiment of this invention is similar to the recording and reproducing apparatus of FIG. 87 except for design changes indicated later. The twelfth embodiment uses a recording medium in which a magnetic recording layer is formed on the back side of a ROM disk without a cartridge such as a CD ROM.

As shown in FIG. 101, the recording medium 2 includes a transparent layer 5, an optical recording layer 4, a magnetic recording layer 3, and a print layer 43 arranged sequentially with respect to an upward direction. The print layer 43 has a print area 44. A label of a CD title or letters 45 are printed on the print area 44. A protective layer 50 may be provided on the print area 44. The protective layer 50 is made of hard material having a Mohs scale of 5 or more. In the case of a recording medium such as a CD or a CD ROM which is not provided with a cartridge and which has a single optical recording surface, the print area 44 can be provided in approximately the whole of the opposite surface. As shown in FIG. 102, in the case of an LD. LD ROM, or others which have two optical recording surfaces, the print area 44 is provided, at a central narrow region to prevent an adverse influence on the optical reproduction.

This embodiment will be further described with respect to the case where a CD ROM is used as the recording medium.

The recording medium is designed and fabricated as follows. As shown in FIG. 103, at a step number P=1, a substrate (a base plate) 47 is prepared which has a transparent portion 5 with pits 46. At a step number P=2, an optical reflecting film 48 made of suitable material such as aluminum is formed by vapor deposition or sputtering.

At a step number P3, suitable magnetic material such as barium ferrite having a magnetic coercive force Hc of 1, 750 or 2, 750 is directly applied, and thereby a magnetic, recording layer 3 is formed. It may be good that the magnetic material is applied to a base film and the base film with the magnetic material is transported together with a bonding layer to form a magnetic recording layer 3. The recording medium of this embodiment is not protected by a cartridge. Thus, it is necessary to use magnetic material having a high magnetic coercive force Hc to protect recorded data from an external magnetic field generated by, for example, a magnet. It has been experimentally confirmed through a field test that a damage to recorded data is absent when an exposed recording medium including a magnetic recording material having a magnetic coercive force Hc of 1,750 Oe to 2,750 Oe is used under normal industrial use conditions. As understood from FIG. 121, only a magnetic field of 1,000 to 1,200 Gauss is present in a normal home. Thus, it is good that the magnetic coercive force Hc of magnetic material for the magnetic recording layer 3 is set to 1,200 Oe or more. In this embodiment by using the material having a magnetic coercive force of 1,200 Oe or more, a damage to data is prevented during normal use. Provided that the magnetic coercive force Hc of the magnetic material is increased to 2,500 Oe or more by using barium ferrite or others, the reliability during the data recording can be enhanced. The material of barium ferrite is inexpensive, and is formed by a cheap application step. In addition, the material of barium ferrite naturally exhibits random orientation so that a randomizing step is unnecessary. Thus, the material of barium ferrite is suited to a partial RAM disk of a CD ROM type which generally requires low-cost mass production. In this case, the magnetic material, is processed into a disk. Since recording and reproduction are done along a circumferential direction, recording characteristics are lowered if the magnetic material has magnetic orientation in a given direction such as a magnetic card or a magnetic tape. To prevent the occurrence of such orientation in a given direction, a magnetic film is formed while a randomizer applies magnetic fields in various directions before applied magnetic material hardens. As previously described, in the case of barium ferrite, there is an advantage such that a randomizing step can be omitted. In the case of a CD or a CD ROM, the CD standards require that the title and the contents of a medium should be printed as a label to enable a consumer to visually identify and recognize the contents of the medium. In addition, it is preferable that a color photograph is printed to make the appearance beautiful to increase the product value. Generally, the magnetic material has a brown color or a black color of a dark tone, and therefore direct printing thereon is difficult.

At a step number P=4, to enable color printing to conceal the dark color of the magnetic recording layer 3, a backing or preliminary layer 43 with a color such as a white color which has a high reflectivity is formed by, for example, application. The thickness of the preliminary layer 43 is equal to several hundreds of nm to several μm. From the standpoint of recording characteristics, a thin preliminary layer 43 is better. On the other hand, if the preliminary layer 43 is excessively thin, the color of the magnetic recording layer can not be concealed. Thus, the thickness d2 of the preliminary layer 43 is required to be a certain thickness. To block the transmission of light, a thickness equal to a half of the light wavelength or more is preferable. When the shortest wavelength $\lambda$ of visible light is defined as $\lambda$=0.4 μm, a thickness of 0.2 μm (=$\lambda/2$) or more is preferable. Thus, the thickness d2 is preferably equal to 0.2 μm or more. When d2≧0.2 μm, it is possible to attain the effect of concealing the color of the magnetic material. From the standpoint of recording characteristics, it is preferable that d2≦10 μm. Thus, it is desirable that 0.2 μm≦10 μm. In this case, there is an advantage such that both color concealing characteristics and magnetic recording characteristics can be adequately obtained.

According to the results of experiments, it is discovered that a thickness d2 of about 1 μm is most preferable. In the case where magnetic material is mixed with and added to the preliminary layer 43, there is an advantage such that an effective space loss can be decreased.

At a step number P=5, print ink 49 made of dyes is applied so that printed letters 45 such as a label of FIG. 101 are indicated. Full color printing is possible since the printing is done on the white-color preliminary layer 43. As shown in FIG. 103, the print ink 49 of the dyes is applied, and the ink soaks into the preliminary layer 43 by a depth d3 so that roughness is absent from the surface of the preliminary layer 43. Thus, there is an advantage such that, during the magnetic recording and reproduction, a magnetic head touch is good and the travel of the magnetic head is prevented from removing the printed letters. In this way, the recording medium is completed.

The magnetic recording layer 3 at the step number P=3 and the print ink 49 at the step number P=5 are formed by using a gravure application step such as shown in FIG. 105. Specifically, application material including magnetic material of barium ferrite is transferred onto an application material transfer roll 353 from an application material bowl 352, and the application material on the roll 353 is selectively etched into a CD-shaped etching portion 355 which remains on an intaglio drum. Unnecessary application material is removed by a scriber 356. A soft transfer roll 367 is covered with a soft resin portion 361. The CD-shaped application material is transferred onto the soft transfer roll 367 as a CD-shaped application portion 358. The application portion 358 is transferred and applied to the surface of a recording medium 2 such as a CD. Before the execution of a drying process, a random magnetic field generator 362 applies a random magnetic field to the recording medium with the application material so that the application material has random magnetic orientation. Since the transfer roll 367 is soft, accurate application to a stiff object such as a CD can be done thereby. In this way, the applications at the step numbers P=3, P=4, and P=6 are executed. The printing step P=5 may be an offset printing step in consideration of a small film thickness.

As shown in FIG. 103, at a step number P=6, a protective layer 50 may be applied to the recording medium. The protective layer 50 is made of a hard and transparent material having a Mohs scale of 5 or more. The protective layer 50 has a given thickness d4. The protective layer 50 prevents the removal of the print ink, and protects the magnetic recording layer 3 from wear by an external injury or the magnetic head. Thus, there is an advantage such that the reliability of data is enhanced.

As shown in FIG. 106, a protective layer 50, a print ink 49, a preliminary layer 43, and a magnetic recording layer 3 may be applied onto a removable film 359 by steps of P=6, 5, 4, and 3 in an order reverse to the order of the steps previously described with reference to FIG. 103. Random magnetic orientation is provided by the random magnetic field generator 362. The resultant application film is accurately located on the surface of a substrate 4 which is provided with pits 46, and transfer is executed and then fixing is executed by a thermal pressing process. Subsequently, the removable film 359 is removed. As a result, a recording medium is completed which has a structure equal to the structure at the step P=6 regarding FIG. 103. In the case of mass production, the transfer method increases the throughput but decreases the cost. Thus, in the case of mass production of CD's, there is an advantage such that the production efficiency is increased.

While the dyes are used during the printing in connection with FIG. 103, print ink 49 of a pigment may be used at a step number P=5 of FIG. 104. In this case, a given thickness d3 is provided. At a-step number P=6, there is provided a protective layer 50 made of transparent material containing lubricant such as d4>d3. Thereby, there is an advantage such that roughness on the surface is decreased and a good head touch is enabled by the lubricant. The use of the pigment causes an advantage such that better color printing is enabled. In this case, after the step P=5, thermal pressing may be executed to remove roughness from the surface, and the resultant is used as a final product. In this case, since a step of making the protective layer 50 can be omitted, there is an advantage such that the number of manufacturing steps can be reduced by one.

Next, a description will now be given of a method of making a magnetic shield layer. The magnetic head is present at the side of the recording medium 2 near the magnetic recording layer 3, while the optical head is present at the side of the recording medium 2 near the transparent layer. Thus, there is a chance that electromagnetic noise leaks from the actuator for the optical head into the magnetic head and therefore the error rate increases during the magnetic signal reproduction. As shown in FIG. 116, noise of a level close to 50 dB occurs. A magnetic shield is provided in the recording medium 2 as a countermeasure, and thereby adverse influence of the electromagnetic noise can be reduced. As shown in FIG. 107, at a step number P=2, a magnetic layer 69 made, of permalloy which has a high μ (magnetic permeability) and a weak magnetic coercive force Hc is formed by a suitable process such as a sputtering process. The magnetic layer 69 provides a magnetic shielding effect. In the case where a magnetic layer 69 having a weak magnetic coercive force is required to be formed in a short time or a thick magnetic layer 69 is required to be formed during the manufacture, a permalloy foil having a thickness of several μm to several tens of μm may be used. A thick magnetic layer 69 can be formed by plating. A thicker magnetic layer 69 provides an enhanced magnetic shielding effect. While the optical reflecting layer 48 is made of aluminum at the step number P=2 of FIG. 103, a film of permalloy may be formed by sputtering. In this case, a single film provides both an optical reflecting effect and a magnetic shielding effect. A thick permalloy film can be formed by plating: with a low cost. Thereby, there is an advantage such that the number of steps of forming a reflecting film and a shielding film can be halved. In addition to the transfer step of FIG. 106 with respect to the recording medium of FIG. 108, a bonding layer 60a and a magnetic layer 69 may be provided in a sandwiched manner. The magnetic layer 69 has a high-μ film such as a permalloy film having a thickness of several μm to several tens of μm. Thus, a recording medium having a magnetic field shielding effect can be fabricated through the transfer step.

In a way such as previously mentioned, a recording medium is fabricated which includes an optical recording layer and a magnetic recording layer with a print surface such as shown in FIG. 101. Thus, there is an advantage such that a label similar to a label of a conventional CD which meets the CD standards is provided and simultaneously a magnetic recording surface is added. As previously described with reference to FIG. 121, most of normally used magnets are ferrite magnets. In general, such magnets are not exposed. Even if a magnet is exposed, only a magnet field of about 1,000 Oe occurs therearound. Some of magnetic necklaces are made of rare-earth material, and such magnetic necklaces are small in size so that they hardly magnetizes the magnetic recording material of barium ferrite. In the case of use of a magnetic recording layer made of suitable material such as barium ferrite which has a magnetic coercive force Hc of 1,200 Oe. 1,500 Oe or more, there is an advantage such that data on the magnetic recording layer is prevented from being damaged by a normally used magnet. Furthermore, it is possible to add a magnetic shield layer made of high-μ magnetic material, electromagnetic noise from the optical head can be remarkably suppressed during the magnetic reproduction. The above-mentioned manufacturing method uses an inexpensive technique such as a gravure application technique and inexpensive materials. Thus, there is an advantage such that a RAM function and a print surface can be obtained without increasing the cost of a partial RAM disk such as a CD or CD ROM.

A description will now be given of a method of providing the recording medium with an identifier, that is, an HB (hybrid) identifier, which indicates the presence or absence of the magnetic recording layer. In the case of a CD, with respect to data in the optical recording layer, one block is composed of 98 frames of the EFM modulated data structure as shown in FIG. 213. According to an example, in Q bits of the subcode in the frame in the TOC area, code data in which POINT is set as "BO" is defined as an HB identifier code data 468a. Since BO is not currently used, a conventional CD, a conventional CD ROM, and an HB medium with a magnetic recording layer according to this invention can be discriminated while the compatibility thereamong can be maintained. Since the HB identifying information is stored in the TOC area, the HB recording medium can be identified upon the first reading of the TOC area information. Therefore, this design is advantageous in that an HB recording medium can be identified in a short time.

As shown in FIG. 223(a), an HB recording medium 2 includes a transparent substrate 5 on which an aluminum vapor deposited film 4b and pits 4c are provided. In addition, a magnetic layer 3 is provided thereon. The pits indicate an EFM modulated signal which has a data sequence 470b containing subcode 470c. In the case of control bits 470e of Q bits 470d in the subcode 470c, recorded HB identifier code data 468a is "0011". According to another way, identifying code data 468a "BO" is recorded in the POINT 470f of the TOC area. The recording medium 2 is advantageous in that the presence and absence of the magnetic recording layer can be detected without changing the structure thereof.

DESCRIPTION OF THE THIRTEENTH PREFERRED EMBODIMENT

A recording and reproducing apparatus according to a thirteenth embodiment of this invention is similar to the recording and reproducing apparatus of FIG. 87 except for design changes indicated later. The thirteenth embodiment uses a recording medium in which magnetic material having a magnetic coercive force Hc greater than that of a normal magnetic disk is used and, a protective layer having a thickness of 1 μm or more is provided on an uppermost portion of a magnetic recording layer as previously described with reference to the twelfth embodiment. In addition, the thirteenth embodiment uses a magnetic head suited to the recording medium. Furthermore, the thirteenth embodiment is provided with a countermeasure to the introduction of noise from an optical head through a magnetic field.

First, the structure of the magnetic head will be described. FIG. 110 shows the recording and reproducing apparatus which uses a 3-head arrangement. Specifically, the magnetic head of FIG. 87 is divided into two portions and a magnetic head 8a and a reading magnetic head 8b are made into a single unit, and a noise cancelling magnetic head 8s is additionally provided. Reproduction can be done while recording is being executed. Thus, error check is executed simultaneously.

The magnetic heads 8a and 8b will now be described with reference to FIG. 111. An optical head 6 and the magnetic heads 8a and 8b are located at opposite sides of the recording medium 2, and are opposed to each other. The optical head 6 serves to access a desired track on an optical recording layer 4 of the recording medium 2. The magnetic heads 8a and 8b move together with the optical head 6. Thus, the magnetic head 8a and 8b travel on a magnetic track at the opposite side of the optical track scanned by the optical head 6. The magnetic recording is executed by the magnetic head 8a designed for writing. The reproduction is, executed by the magnetic head 8b.

Recording and reproducing conditions will, now be described with references to FIG. 113. The magnetic head 8a has a writing track width La and a head gap 70a with a length Lgap. Thus, a magnetic track 67a having a width equal to La is recorded on the magnetic recording layer 3. Above the magnetic track accessed by the magnetic head 8, there is a disk cleaning portion 376 including a circular plate made of soft material such as felt. The disk cleaning portion 376 removes dust from the disk, and thus there is an advantage such that the error rate can be reduced during the reproduction. The disk cleaning portion 376 is connected to a connection member 380 including a spring. In an OFF state of FIG. 111, both the magnetic head 8 and the disk cleaning portion 376 are out of contact with the recording medium 2. As shown in the part ON-A of FIG. 111, when the magnetic head 8 is moved downward, the disk cleaning portion 376 lands on the recording medium 2. The connection member 380 including the spring holds the magnetic head 8 out of contact with the recording medium 2 for a moment. Then, in an ON-B state, the magnetic head 8 softly lands on the recording medium 2. In this way, the magnetic head 8 makes a soft landing on the recording medium 2 through two steps. Thus, there is an advantage such that even if the magnetic head 8 is moved upward and downward during the rotation of the recording medium 2, a damage to the magnetic head 8 or the recording medium 2 is prevented. As shown in FIG. 113, a portion of a magnetic track 67a which precedes the magnetic, head 8 is cleaned, and thus there is an advantage such that the error rate is reduced during the magnetic recording and reproduction. A magnetic head cleaning portion 377 is also provided which moves together with a magnetic head elevator 21. During the insertion of a disk into the apparatus or during the upward or downward movement of the magnetic head 8, a contact part of the magnetic head 8 is cleaned by the magnetic head cleaning portion 377 at least once. At this time, a circular plate of the disk cleaning portion 376 slightly rotates so that a new surface thereof comes operable. During the next insertion of a disk into the apparatus, the disk is cleaned by the new surface of the disk cleaning portion 377. Since the reproducing head gap 70b of the magnetic head 8a has a width Lb, only a part of the magnetic track 67a which corresponds to the width of the reproduced track 67b is subjected to a reproducing process.

In the thirteenth embodiment, the head gap length Lgap of the magnetic head 8a is important for the reason as follows. As previously described with reference to FIG. 103, the recording medium of the twelfth embodiment includes the preliminary layer 43, the print layer 49, and the protective layer 50 which extend between the magnetic recording layer 3 and the magnetic heads 8a and 8b, and which have the thicknesses d2, d3, and d4 respectively. Thus, a space loss corresponding to d=d2+d3+d4 is always present. The space loss S in unit of dB is given as:

$$S=54.6(d/\lambda) \tag{1}$$

where λ denotes the recording wavelength. The head gap Lgap and the recording wavelength λ has the following relation.

$$\lambda=3\times Lgap \tag{2}$$

According to the results of experiments, the thickness of the preliminary layer 43 is preferably equal to 1 μm or more in view of light blocking characteristics. Generally, it is necessary that the sum of the thicknesses of the print layer 49 and the protective layer 50 is equal to at least 1 μm. Thus, the value d generally needs to be at least 2 μm, and the following relation is present.

$$d\geqq 2\ \mu m \tag{3}$$

By referring to the equations (1), (2), and (3), a minimum space loss S in unit of dB is given as:

$$S=54.6\times 2/3 Lgap \tag{4}$$

The equation (4) determines the relation between the head gap and the space loss which is shown in FIG. 112.

Generally, to attain sufficient recording and reproducing characteristics, it is necessary to limit the space loss to 10 dB or less. Thus, it is found from FIG. 112 that the, head gap Lgap needs to be set to 5 μm or more. In a conventional recording and reproducing apparatus for rotating a hard disk or a floppy disk to execute information recording and reproduction, a magnetic head has a slider portion and is provided with a head gap of 0.5 μm or less. If information is recorded and reproduced into and from the recording medium of this invention by using such a conventional magnetic head, sufficient recording and reproducing characteristics can not be obtained due to the presence of the protective layer or the print layer. On the other hand, in the thirteenth embodiment, the magnetic head 8a has a slider portion 41 as shown in FIG. 111 and the head gap of the recording head 8a is equal to 5 μm or more so that the space loss is equal to 10 dB or less as understood from FIG. 112. Thus, there is an advantage such that sufficient recording and reproducing characteristics can be attained during the recording and reproduction.

In the thirteenth embodiment, it is possible to execute full color label printing on the surface of the recording medium. It is possible to adopt the recording medium having the same appearance as that of a conventional CD or CD ROM as shown in FIG. 101. Thus, there is an, advantage such that when a CD having the magnetic recording layer of this invention is used, a consumer is prevented from being confused and the basic function of the CD standards is maintained. The magnetic recording layer uses barium ferrite which has a high magnetic coercive force Hc and which does not require the random orientation step. Thus, there is an advantage such that recorded data is not damaged under normal conditions and the recording medium can be manufactured at a low cost. The recording medium of this invention can be handled in the way same as the way of handling a conventional CD as previously described, and thus there is an advantage such that a full compatibility between the recording medium of this invention and the conventional CD can be, attained.

Next, a description will be given of countermeasures to magnetic field noise transmitted from the optical head to the magnetic head. Electromagnetic noise generated by an optical head actuator 18 tends to enter the reproducing magnetic head 8b so that the error rate may be increased. According to a first countermeasure, as shown in FIG. 114, a magnetic shield layer 69 previously described with reference to the twelfth embodiment is provided in the recording medium 2. Thereby, electromagnetic noise generated by the actuator of the optical head 6, is prevented from entering the magnetic head 8 so that an increase in the error rate can be prevented. In this case, when the optical head reaches an edge of the disk, electromagnetic noise tends to be transmitted from the optical head actuator to the magnetic head 8 since the magnetic shield is absent from an area outside the disk.

Accordingly, as shown in FIG. 110, it is preferable that the recording and reproducing apparatus is provided with a magnetic shield 360 extending around the edge of the disk to block the electromagnetic noise. According to a second countermeasure, as shown in FIG. 111, the optical head actuator 18 is surrounded by a magnetic shield 360 made of high-μ material such as permalloy or iron. The magnetic shield 360 has an opening 362 for a lens. Thus, there is an advantage such that the transmission of electromagnetic noise from the optical head actuator to the magnetic head 8b is suppressed and related noise in the output signal from the magnetic head is remarkably decreased.

Experiments were done under the following conditions. The optical head of the recording and reproducing apparatus was held fixed, and the optical recording portion was subjected to focusing control. On the other hand, the magnetic head was moved on the surface of the recording medium. During the experiments, a relative level of electromagnetic noise entering the magnetic head 8 from the optical head 6 was measured. FIG. 116 shows the relation between the measured relative level of the electromagnetic noise and the distance between the magnetic head and the optical head.

According to another countermeasure to noise, the noise is detected, and the detected noise is added to a reproduced signal at an opposite phase to reduce the noise component from the reproduced signal. As shown in FIG. 111, the magnetic recording and reproducing apparatus is provided with a noise cancel magnetic head 8s and a noise detector such as a magnetic sensor. In a noise canceler portion 378, a reproduced signal from the magnetic head 8b and the detected noise are added with opposite phases respectively and at a given addition ratio A so that the noise component of the reproduced signal can be canceled. By optimizing the addition ratio A, the noise component can be adequately canceled. The optimal addition ratio Ao is determined by scanning a magnetic track free from a recorded signal and varying the addition ratio so as to minimize the level of the reproduced signal. The optimal addition ratio Ao can be calibrated and updated. It is good to execute the calibration when the noise level exceeds an acceptable range.

By utilizing the fact that the recording head 8a remains unused during the reproducing process in FIG. 110, the recording head 8a may be employed as a noise detector. In this case, a signal outputted from the recording head 8a is inputted into the noise canceler portion 378 to remove the noise component from the reproduced signal, and the noise cancel magnetic head 8s can be omitted.

A description will now be given of the structure which includes the noise cancel magnetic head 8s. As shown in FIGS. 129(a) 129(b), and 129(c), the noise cancel magnetic head 8s is connected to the magnetic heads 8a and 8b via an attachment portion 8t. When the magnetic head unit contacts the recording medium 2 as shown in FIG. 129(b), a space loss having a height do occurs with respect to the noise cancel magnetic head 8s.

In the case where λ=200 μm and the space loss height do is equal to 200 μm or more, the level of a reproduced signal from the magnetic recording layer is estimated as being equal to about −60 dB and the reproduction is almost difficult. When the magnetic head is moved upward by 0.2 mm, the level of noise is reduced by only −1 dB or less as shown in FIG. 116. In the case where λ=200 μm, provided that the distance between the noise cancel magnetic head 8s and the reproducing magnetic head 8b is set to at least λ/5 equal to 40 μm, the entrance of an original signal from the reproducing head can be prevented. Thus, there is an advantage such that the transmission of electromagnetic noise from the optical head actuator to the reproducing magnetic head can be essentially completely suppressed.

It should be noted that the noise cancel magnetic head 8s may be replaced by a magnetic sensor such as a Hall element or an MR element. An example of the magnetic sensor is shown in FIG. 130. The drive magnetic noise of the optical head 6 is detected by the magnetic sensor, and a signal representative thereof is added in opposite phase to the magnetic reproduced signal. Thereby, the introduced noise can be greatly reduced. This design enables the apparatus to be further miniaturized in comparison with the magnetic head detection type.

FIGS. 172(a) and 172(b) to FIGS. 175(a) and 175(b) show examples of the details of the arrangement of FIGS. 129(a), 129(b), and 129(c). FIG. 172(a) shows an example using a head with one gap which serves as both the recording head 8a and the reproducing head 8b. In the case where heads of equal sizes are, arranged as shown in FIGS. 175(a) and 175 (b), a high effect is attained although the size of the composite head is large. FIGS. 175(a) and 175(b) show an example where the width of the noise cancel head 8s is set small to realize the miniaturization. FIGS. 172(a) and 172(b) show an example using a noise cancel head 8s having a uniform width. In the arrangement of FIG. 172(c), a slider 41 is provided with a groove 41a which also forms the previously-mentioned groove having the gap do. The slider 41 is greater than the head 8a in the area of the surface contacting air, so that the magnetic head 8a receives a weaker air pressure.

Therefore, the contact between the head and the recording medium is made better. In this case, 12>11. FIGS. 173(a) and 173(b) show an arrangement in which the head gap is removed from the noise cancel head 8s of FIG. 171. Since, a magnetic signal is not read out even when the noise cancel head 8s is brought into contact with the magnetic surface of the recording medium, there is an advantage such that only noise can be picked up.

FIGS. 176(a) and 176(b) to FIGS. 178(a) and 178(b) show arrangements each using a coil 499 as a noise cancel head. FIG. 176(a) shows an arrangement in which two coils 499a and 499b are located in a groove of a magnetic head 8. It is possible to detect a noise magnetic flux 85 as in FIG. 175(b). FIG. 177(a) shows an arrangement in which coils 499a and 499b are located in parallel with the gap of a head. It is possible to detect noise in the direction of the head magnetic field. FIG. 177(b) shows a noise cancel arrangement in which signals from the coils 499a and 499b are enlarged by amplifiers 500a and 500c respectively, and are combined by an amplifier 500b into a composite signal inputted to the noise canceler 378 of FIG. 134. FIG. 178(a) shows an arrangement in which vertical coils 499c and 499d are provided in addition to the coils 499a and 499b parallel to the head gap. The four coils enable higher noise detection ability. By adjusting and mixing the output signals of the parallel coils 499a and 499b and the vertical coils 499c and 499d as shown in FIG. 178(b), it is possible to obtain a noise detection signal optimal for noise cancel.

FIG. 179 shows a spectrum distribution having the results of measurement of actual electromagnetic noise caused by the optical pickup portion in the apparatus equipped with the noise cancel head. As understood from the drawing, noise having frequencies of several KHz overlaps in frequency with the reproduction frequency band in the apparatus of this invention which uses a wavelength of 100 micrometers. Therefore, this noise significantly interferes with the reproduction. As shown in the drawing, the noise cancel head enables the reduction of the noise in the frequency band by about 38 dB. The noise reduction results in an improvement of the error rate during the reproduction.

According to another countermeasure to noise, the distance between the optical head and the magnetic head is set to 10 mm or more, and the noise is reduced by 15 dB or more as understood from FIG. 116. Thus, by setting the distance between the optical head and the magnetic head to 10 mm or more, there is provided an advantage such that the noise is remarkably reduced. In this case, it is important to maintain the accuracy of the positional relation between the optical head and the magnetic head.

A description will now be given of a method of maintaining the positional accuracy. As shown in FIG. 117, with respect to the optical head 6 and the magnetic head 8, traverse shafts 363a and 363b are rotated in equal directions in response to rotation of a common traverse actuator 23 via traverse gears 367a, 367b, and 367c. The traverse shafts are provided with opposite screws respectively so that the optical head 6 is moved in a leftward direction 51a while the magnetic head 8 is moved in a rightward direction 51b. The respective heads meet positional reference points 364a and 364b, and therefore positions thereof are adjusted. Thus, the optical head 6 is moved to a position above a reference optical track 65a while the magnetic head 8 is moved to a position above a reference magnetic track 67a. In this way, initial setting of the positions of the two heads is executed. Therefore, the accuracy of the positional relation between the two heads is maintained during the movements thereof. The positional setting is done at least once when a new recording medium 2 is inserted into the apparatus or when a power supply switch of the apparatus is turned on. Thereby, during later operation of the apparatus, the two heads are moved by equal distances. Thus, in the case where the optical head 8 accesses a given optical track 65, the magnetic head 6 accurately accesses a given magnetic track 67 on a radius equal to the radius of the currently-accessed optical track 65. In the case where the optical head 6 is moved thereafter, the magnetic head 8 is moved by the same distance. Thus, as shown in FIG. 118, an magnetic track 67b and a magnetic track 65b on the same radius are accurately accessed. In the case of access to an outermost part of the recording medium, the two heads are positioned above tracks on a circumference having a radius L2. In the case of access to an innermost part of the recording medium, the two heads are moved to positions above tracks on a circumference having a radius L1. In this case, the distance between the optical head 6 and the magnetic head 8 is equal to 2L1. Provided that this distance is set to 10 mm or more, the level of noise transmitted from the optical head to the magnetic head is adequately small. In the case of a CD, L1=23 mm and thus the distance between the two heads is given as 2L1=46 mm, so that the level of noise is equal to 10 dB or less as understood from FIG. 116. Thus, there is an advantage such that an adverse influence of the noise hardly occurs.

As shown in FIG. 117, when a recording medium 2 is required to be inserted into the apparatus, the presence of the magnetic head 8 makes difficult the direct insertion of the recording medium 2. Accordingly, the elevator 21 for the magnetic head lifts the magnetic head 8 and the traverse by a significant distance, and then the recording medium is inserted into the apparatus. At this time, the previously-mentioned positional relation between the two heads tends to be out of order. On the other hand, at this time, as previously described, the magnetic head cleaning portion 377 cleans the contact surface of the magnetic head 8. Then, the magnetic head 8 and the traverse are returned to given positions. When the magnetic head 8 and the traverse are returned to the given positions, the positional relation between the optical head 6 and the magnetic head 8 is still out of order. Thus, if the magnetic head 8 is moved together with the optical head 6 without correcting the positional relation therebetween, the magnetic head 8 can not accurately access a given magnetic track 67 on a radius equal to the radius of a currently-accessed optical track 65. The previously-mentioned positional setting is done at least once when the recording medium is inserted into the apparatus. Thereby, there is provided an advantage such that a simple structure can increase the positional accuracy of access to a given magnetic track 67 by the magnetic head 8. This is an important function in realizing a home-use low-cost apparatus.

FIG. 120 shows another design in which a traverse connecting portion 366 includes a flexible member such as a leaf spring. The traverse connecting portion 366 is guided by a connecting portion guide 375. An optical head 6 and a magnetic head 8 are connected by the traverse connecting portion 366 and the guide 375. Thus, the optical head 6 and the magnetic head 8 can move together in a direction 51. Thus, it is possible to obtain the advantage which results from the linkage between the movements of the two heads as previously described with reference to FIG. 117. Since the traverse connecting portion 366 is flexible, the magnetic head 8 can be easily lifted in a direction 51a. Thus, there is an additional advantage such that the magnetic head elevator can easily lift the magnetic head 8 during the insertion of the recording medium 2 into the apparatus.

The design of FIG. 117 may be modified into a design of FIG. 126 in which the distance between the optical head 6 and the magnetic head 8 is always equal to a given value Lo. In this case, the optical head 6 and the magnetic head 8 are moved in equal directions 51a and 51b. Since the distance between the magnetic head 8 and the optical head 6 can be set large, there is an advantage such that the transmission of noise from the optical head to the magnetic head can be suppressed. This design is effective in noise suppression especially for a small-diameter recording medium such as an MD.

In the previous description of this embodiment, the magnetic head and the optical head are angularly separated by 180° with respect to the center of the disk as shown in FIG. 117. The angular separation between the two heads may be 45°, 60°, 90°, or 120°. In these cases, provided that the shortest distance between the two heads is 10 mm or more, it is possible to obtain an advantage such that the level of noise can be adequately decreased.

It is preferable to adopt one of the previously-mentioned countermeasures to noise or a combination of two or more of the previously-mentioned countermeasures to noise.

In the case where the electromagnetic shield with respect to the optical head 6 is adequately effective, the optical head 6 and the magnetic head 8 can be opposed to each other in a vertical direction as shown in FIG. 119. In this case, by providing positional references 364a and 364b, there is provided an advantage such that the accuracy of positional alignment between the two heads can be increased. The above-mentioned opposed configuration has an advantage such that the apparatus can be miniaturized since all the parts can be located at one side of the disk.

Next, a recording format will be described. With respect to an optical disk for data, a CAV (constant angular velocity) is provided and thus the rotational speed thereof remains the same even when the radius of the optical disk varies. In the application to a CD ROM, the rotation of a disk is controlled at a CLV (constant linear velocity) so that the linear speed remains constant although the rotational speed depends on the radius of a track. In this case, it is difficult to adopt a recording format of a conventional floppy disk or a conventional hard disk. In the application to a CD ROM, to increase a recording capacity, this invention uses the following design. As shown at 370a, 370b, 370c, 370d, and 370e in FIG. 122, the data capacities of respective tracks are larger as they are closer to the outer edge of the disk. A head of data has a sync portion 369 and a track number portion 371 followed by a data portion 372 and a CRC portion 373. The capacity of the data portion 372 depends on the track. The CRC portion 373 is used for error check. A gap portion 374 having no signal is set after the CRC portion 373 so that a sync portion 369b in a next head or others can be prevented from being erroneously erased even when the linear velocity is different during the recording. This design has an advantage such that, in the case of a CD, the recording capacity is equal to about 1.5 times the recording capacity which occurs in the design where respective tracks are set to equal capacities as in a conventional floppy disk. In addition, since the magnetic head executes the magnetic recording and reproduction by directly using the CLV rotation control of the motor in response to the signal of the optical head for the CD, there is an advantage such that a motor control circuit exclusively for the magnetic recording can be omitted.

Next, physical formats on a disk will be described. The physical formats are of two types, a "normal mode" and a "variable track pitch mode". As shown in FIG. 123, magnetic tracks 67a, 67b, 67c, and 67d are located at opposite (back) sides of optical tracks 65a, 65b, 65c, and 65d, and the tracks are arranged at equal track pitches Tpo according to the "normal mode".

This invention adopts a "variable angle" system. As shown in, FIG. 117 and FIG. 119, in this invention, the angular separation between the optical head 6 and the magnetic head 8 is equal to one of various values such as 0°, 180°, 45°, and 90°. Generally, in a conventional recording and reproducing apparatus of the rotational magnetic disk type, sync portions 369 of data, that is, indexes 455, are located at positions with a given angle as seen from the center of the disk. In the case of index of the variable, angle system of this invention, as shown in FIG. 123, the angle of the location of the sync portion 369 at the data starting point can be, arbitrarily chosen with a pitch of 17.3 mm in the circumferential direction by defining a given MSF optical block of the optical record portion as index. In this case, as shown in FIG. 214, provided that optical frame given MSF information is recorded as index for every track, index information can be obtained simultaneously with tracking. In the case where "sync" following the given MSF, that is, the sync EFM modulated code data S0 and S1 in the first and second frames of the subcode in FIG. 213, is used as index, recording can be started with an accuracy corresponding to 170.8 μm as shown in FIG. 213. In this case, although magnetic recording can be accurately started from the sync portion 369 in response to the index, the magnetic recording can not be always ended accurately. If the magnetic recording is not accurately ended, the last portion of the record signal is written over the sync portion 369. To prevent such a problem, it is necessary to know the number of optical pulses per round. Accordingly, rotation is designed to start from the optical record portion of index. At a mid time point, the optical beam is returned to the original track by one track. Thus, the reproduction is again made on the optical address corresponding to the index. Accurate one revolution can be performed provided that the number of optical pulses which occurs during this interval is recorded. The data obtained through the measurement in this way is recorded on the magnetic record portion of the magnetic track-optical address correspondence table, that is, the track 0 or the track 1. Thereby, it is unnecessary to measure the pulse number again.

Since the physical frame number and the MSF block number corresponding to one revolution (round) are known, the magnetic recording can be ended with a high accuracy corresponding to 170 μm. Therefore, the sync portion 369 can be prevented from being damaged while the gap 374 can be minimized so that a greater recording capacity is enabled.

In this case, it is necessary to promptly get subcode data to establish synchronization. In FIG. 211, after an optical reproduced signal is subjected to EFM decoding, a subcode sync detector 456 obtains given MSF subcode. In more detail, with reference to FIG. 215, an index detector 457 receives the subcode from the subcode sync detector 456, and compares it with subcode in an optical address of a given magnetic track. When the two are equal, the index detector 457 controls a data buffer 9b to output data therefrom to start data recording from the sync of a block following the index address. Since this design uses the subcode information which can be obtained fastest, there is an advantage such that a delay time is short and the reproduction is accurately started with the head of a desired tune.

In the case where data in the optical address which corresponds to index is damaged, magnetic recording on the track is difficult. To solve such a problem, as shown in FIG. 214, an error-free optical address following the wrong address is defined, and the optical address MSF information thereof is recorded on the magnetic track table of the magnetic record portion so that the track in question can be used again.

This design makes it possible to omit a detecting circuit or a detector for the absolute angle of the disk. The recording of a head portion can be started from a part of an arbitrary angle. Therefore, in the case of a CD, data recording can be started immediately after the reading of given optical address information in the optical record portion such as subcode which forms index. Thus, during reproduction, immediately after the optical information of the track is read out, the sync portion in the head of magnetic data starts to be reproduced. Accordingly, a loss time being a rotation waiting time is completely removed from the period of magnetic data recording and the period of reproduction, and a substantive data access time is shorter. This advantage is great especially in the case where recording and reproducing apparatus of equal types are used.

A description will now be given of a method accessing a magnetic track. As shown in FIG. 213, optical address information is recorded in the Q bits of the subcode in the MSF format or others. The MSF needs to be accessed when an optical track is accessed. The width of the magnetic track is equal to several hundreds of μm, and is greater than that of the optical track by two orders.

Accordingly, as shown in FIG. 221, at a step 468a, the recording and reproduction of a given magnetic track are started. At a step 468b, an optical address is obtained by referring to the optical address-magnetic track correspondence table. At a step 468c, a reference optical address M0S0F0 is obtained. At a step 468d, a check is made as to whether it is magnetic reproduction. If it is the reproduction, calculation is given of the upper limit value M2S2F2 and the lower limit value M1S1F1 of a search address range. A step 468f executes search for the optical address. At a step 468g, a check is made as to whether the optical address is in the range between the upper limit value and the lower limit value. At a step 468h, a work of reproducing the magnetic data is started. If an error is absent at a step 468i, the reproduction is completed. If an error is present, a check is made as to the number of times at a step 468j. At a step 468k, the search address range is contracted. Then, the magnetic reproduction is executed.

If it is magnetic recording at the step 468d, a check is made at a step 468m as to whether the optical index is present. If it is yes, optical addresses of, for example, ±5 frames, in a range narrower than that at the step 468e are set at a step 468n. At steps 468p and 468q, the optical head is forced to access the optical track range. At a step 468r, a head is found in response to the optical index mark. At a step 468s, the magnetic recording is started. At a step 468t, the magnetic recording is completed.

If the optical index mark is decided to be absent at the step 468m, a step 468u searches for the given optical address M0S0F0. In the case where access is done by a step 468v, when the given code data S0 and S1 (see FIG. 213) in a block immediately following the block M0S0F0 are detected at a step 468w, a head of the magnetic recording is found and set. At a step 468x, the recording is started. At a step 468t, the recording is completed.

According to the design of FIG. 221, in the case of access to the magnetic recording track, it is sufficient to search for optical addresses in several tens of frames. Thus, there is an advantage such that a time of access to the magnetic track is shorter. In the case where the optical address search range for recording is narrower than the optical address search range for reproduction, optical recording can be more reliably executed.

Next, the "variable track pitch mode" will be described. As in a game machine, a general ROM disk is inserted into the apparatus. At the start of a program, information is first read out from a track of a TOC region, and information is read out from a given track recording the program and information is read out from a given track recording data. This sequence is the same at every starting.

In the case where a CAV optical disk is used, it is now assumed that, as shown in FIG. 124, access is made with respect to decided tracks such as a first track 65b, a 1004-th track, 65c, a 2004-th track 65d, and a 3604-th track 65e. In the case where the hybrid disk of this invention is used, if magnetic information necessary for starting is present in a magnetic, track out of alignment with the back side of an optical track accessed during the starting, wasteful access to the magnetic track is executed in addition to access to the optical track. Thus, the completion of the starting is delayed commensurately. In the case of the equal intervals of the "normal mode", there is a small possibility that the center of the magnetic track comes into alignment with the back side of the optical track. Therefore, it is necessary to access another magnetic track, and the speed of the starting is slow also in this case. The "variable track pitch mode" of this invention features that the magnetic tracks 67b, 67c, 67d, and 67e are defined at the back sides of the four optical tracks 65b, 65c, 65d, and 65e which are required to be read out at the starting. The track numbers and the address information of the optical recording portion which forms index and which corresponds to the track numbers are recorded on the TOC region of the optical recording portion or the TOC region of the magnetic recording portion. In the case of a CD, subcode information is recorded thereon. Data to be read out at the starting is set so as to be recorded on the magnetic track, and the data represents a game gain item number, a progress degree, points, a personal name, and others. Thereby, at the starting, the magnetic track which records the information necessary for the starting is automatically accessed at the same time as access to optical data, and the information is read out from the magnetic track. Thus, a loss time is nullified, and there is an advantage such that the starting time is very short., In this case, as shown in FIG. 124, the track pitches between the tracks are equal to random values as Tp1, Tp2, Tp3, and Tp4. Therefore, although the recording capacity is slightly lowered, this design is effective to use which needs high-speed starting.

The "variable pitch mode" and the "variable angle mode" are effective to music use, for example, accompaniment use. In the case where this invention is applied to accompaniment use, personal environment setting data can be recorded and stored which represents musical intervals for respective music numbers desired by persons respectively, desired tempos of respective music numbers, desired amounts of echo, respective desired parameters of DSP, and others. Thereby, there is provided the following advantage. Provided that data setting is done once, only by inserting an accompaniment CD into an accompaniment machine, music is reproduced automatically with the musical intervals, the tempos, and the echoes desired by the respective persons. Thus, it is possible for the respective persons to enjoy the accompaniments under conditions well suited to the abilities and the tastes of the persons. In this case, magnetic tracks at the back sides of the optical tracks 65b, 65c, 65d, and 65e for determining the heads of music numbers are defined, and personal accompaniment data regarding the music numbers are recorded on the magnetic tracks 67b, 67c, 67d, and 67e. In the case where the accompaniment on the optical track 65c is selected, the related personal accompaniment data is recorded on the magnetic track 57 at the back side thereof. During the start of reproduction of a given music number, the musical interval, the tempo, and the echo of the music number are set in a period of one revolution of the disk and the reproduced music starts to be outputted. Thus, also in music use, the "variable pitch mode" provides an advantage such that both optical data and magnetic data can be quickly accessed. In general music use, this design is effective when environment setting about, for example, DSP sound fields for respective music numbers, is used.

In the case where this invention is applied to a CD ROM, when the magnetic coercive force Hc is set to 1,750 Oe, a RAM capacity of about 32 kB can be attained. The optical recording surface of a CD ROM has a ROM capacity of 540 MB. Thus, there is a capacity, difference by about one hundred thousand times. In most of actual products using a CD ROM, the 540-MB capacity thereof is not fully used. Generally, a CD ROM has an unused or free capacity of at least several tens of MB. This invention uses the free area of the ROM and records data compressing and expanding programs and various data compressing reference tables into the ROM to execute the compression of data recorded into the RAM.

The data compressing design will now be described with reference to FIG. 125. In the case of a game machine, the optical recording portion 4 is previously loaded with information closely related to game contents possibly required during the execution of a game program, for example, data compressing reference tables such as a place name reference table 368a and a person's name reference table 368b. The free area in the ROM is large, and various reference tables can be prepared which are of information having a high possible use frequency among words such as person's names, place names, and numeral sequences. If the word "Washington" is directly recorded on the magnetic recording layer 3 forming the RAM, an area of 80 bits is consumed. On the other hand, in this invention, the data compressing reference table 368a defines "Washington" as a binary code "10", and thus the 80-bit data is compressed into the 2-bit data "10". The compressed data is recorded on the magnetic recording layer 3, and thereby the information is recorded while the used capacity is reduced by a factor of 1/40. It is known that general data compression techniques provide data compression corresponding to double or three times. Provided that use is limited, data compression by a factor of 10 or more can be done according to this data compressing design. Thus, the 32-kB magnetic recording capacity of a CD ROM is substantially equivalent to the 320-kB magnetic recording capacity of a magnetic disk. As previously described, in the hybrid disk of this invention, the ROM area of the optical recording portion is used in compressing data to be stored into the RAM, and thus there is an advantage such that the logical RAM capacity is virtually increased although the physical ROM capacity decreases. In FIG. 125, since the data compressing and expanding programs are stored in the ROM of the optical record portion, the substantive capacity of the RAM is prevented from decreasing. The data compressing and expanding programs may be stored in the magnetic record portion. The data compressing design may use a Huffman optimal coding method or a Ziv-Lempel method. In the case of the Ziv-Lempel method, previously-prepared reference tables and Hash functions are recorded in the optical record portion, and thereby record data in the magnetic record portion can be compressed.

The overall operation of the recording and reproducing apparatus will be described hereinafter with reference to FIG. 127 and FIG. 128. The system controller 10 operates in accordance with a program, the flowchart of which is shown in FIG. 127 and FIG. 128.

Under conditions where the magnetic head is lifted, a step 410 places a disk into a correct position. Then, a step 411 returns the magnetic head to the normal position. A step 412 moves the optical head to a TOC track, and a step 413 reads out optical data from the TOC track. A first way uses control bits, that is, Q1–Q4 bits of the subcode in FIG. 213. The magnetic layer can be recognized provided that a recording medium is defined as being with the magnetic recording layer when Q3=1. In FIG. 213, there are already used conditions of Q1, Q2, Q3, Q4=0, 0, 0, 0, conditions of Q1, Q2, Q3, Q4=1, 0, 0, 0, conditions of Q1, Q2, Q3, Q4=0, 0, 0, 1, conditions of Q1, Q2, Q3, Q4=1, 0, 0, 1, and conditions of Q1, Q2, Q3, Q4=0, 1, 0, 0. Thus, conditions of Q1, Q2, Q3, Q4=0, 1, 1, 0 are defined as a magnetic data track. In this case, the magnetic track format information can be recorded in the TOC. Specifically, as shown in FIG. 214, there are recorded physical positions in a CD optical record portion which form indexes corresponding to starting points of recording and reproduction of respective magnetic tracks. For example, in the case of the first track, when the optical head accesses the MSF or the block of 3-minute 15-second 55-frame, the magnetic head accesses the first track. As shown in FIG. 213, the index indicating the record starting position enables an accuracy corresponding to 17.3 mm with the MSF information only. The use of a given frame in a given MSF enables an index signal to be obtained at a higher accuracy, for example, an accuracy of 176 μm. Thus, in the case where index is made from the sync signal in a block following the given MSF block and the recording is started, the reproduction can be started from a head of a desired tune at an accuracy of 176 μm. In this case, as described with reference to FIG. 123, CLV is adopted so that indexes of the respective tracks are different. The different indexes do not adversely affect actual recording and reproduction. Since the use of the MSF information obtains the index in this way, it is unnecessary to provide special index. The readout data contains a flag representing whether or not the optical disk has a magnetic recording portion, address information such as CD subcode numbers corresponding to the positions of magnetic tracks for defaults of magnetic data, and information representing whether or not the variable pitch mode is present. A step 414 checks the presence of the flag of the magnetic recording layer. When the result of the check is Yes, an advance to a step 418 is done. When the result of the check is No, a step 415 reads out an optical mark representing whether or not the magnetic recording layer on the magnetic recording surface or others is present. When a step 416 detects the absence of the optical mark, a jump to a step 417 is done so that magnetic recording and reproduction regarding the present disk are not executed.

The program enters a magnetic recording and reproducing mode at the step 418, and advances to a block 402 which executes initial setting of the magnetic track. A step 419 in the block 402 moves the magnetic head downward onto the surface of the recording medium, and a step 420 reads out magnetic data from the TOC area. Then, a step 421 lifts the magnetic head to prevent wear thereof. A step 422 checks whether or not an error flag representing error conditions of the magnetic data is present. When a step 423a detects the presence of the error flag, an advance to a step 427a is done. The step 427a ejects the optical disk, and a step 427b indicates "clean optical disk" on a display of the apparatus. Then, a step 427c stops the program.

On the other hand, a step 424 checks whether or not the default value recorded on the optical recording surface is good with the optical address correspondence table of the respective magnetic tracks. When the result of the check is No, a step 426 updates the contents of a part of the magnetic track-optical address correspondence table in response to the magnetic data information of the TOC track. The updated table is stored into an internal memory of the apparatus. When the result of the check is Yes, an advance to a step 428 is done.

When the step 428 detects the presence of a reading instruction regarding the magnetic track, an advance to a step 440 is done. Otherwise, an advance to a step 429 is done. In cases other than the variable track pitch mode, an advance to the step 440 is done. In the case of the variable track pitch mode, a step 430 sets an optical track group number n to 0. A step 431 increments n by 1. When a step 432 detects that n is equal to a final value, a jump to a step 438 is done. Otherwise, a step 433 accesses a heading optical track in the n-th optical track group. When a step 434 detects that the default magnetic track is good, a step 436 moves the magnetic head downward onto the surface of the recording medium. Then, a step 437 reads out magnetic data and stores the readout data into the internal memory of the apparatus, and a return to the step 431 is done. On the other hand, when the optical address corresponding to the magnetic head is the default value so that bad conditions are detected, a step 435 accesses an optical address other than the default value. Then, steps 436 and 437 read out magnetic data, and a return to the step 431 is done. The step 431 increments n by 1. When n reaches the final value at the step 432, reading out the optical data and the magnetic data is completed at the step 438. Therefore, in the case of a game machine, a game program is started, and the game scene which occurs at the previous end is retrieved on the basis of the data recorded on the magnetic recording portion. A step, 439 lifts the magnetic head, and an advance to a step 446 is done.

When the step 429 detects the absence of the variable track pitch mode, a jump to a step 440 is, done. When the step 440 detects the absence of the normal track pitch mode, a jump to a step 446 is done. Otherwise, a step 441 receives an instruction of accessing the n-th magnetic track. A step 442 derives the optical address corresponding to the n-th magnetic track by referring to the information in the internal memory of the system controller 10, and a step 443 accesses the, optical address. Then, a step 444 reads out magnetic data, and a step 445 stores the readout data into the internal memory and a jump to the step 446 is done.

The step 446 checks whether or not a rewriting instruction is present. When the result of the check is No, a jump to a step 455 is done. When the result of the check is Yes, a step 447 is executed. The step 447 checks whether or not a final storing instruction is present. When the result of the check is Yes, an advance to the step 427a (or the step 455) is done. When the result of the check is No, an advance to a step 448 is done. The step 448 checks whether or not data desired to be rewritten is present in the internal memory of the apparatus. When the result of the check is Yes, a jump to a step 454 is done so that the magnetic recording is not executed but only rewriting of the internal memory is executed. When the result of the check is No, a step 449 refers to the magnetic track-optical address correspondence table and accesses the given optical track. Then, a step 450 moves the magnetic head downward, and steps 451, 452, and 453 execute reading out the magnetic data, storing the readout data into the internal memory, and lifting the magnetic head. A step 454 rewrites or updates the information transferred into the internal memory, and then an advance to the step 455 is done.

The step 455 checks whether or not a final storing instruction is present. When the result of the check is No, an advance to a step 458 is done. The step 458 detects whether or not the work has been completed. When the work has been completed, an advance to a step 476 is done. Otherwise, a return to the step 428 is done. When the result of the check at the step 455 is Yes, an advance to a step 456 is done. The step 456 extracts only updated data from the magnetic data in the internal memory, and a step 457 detects whether or not updating is present. In the absence of updating, an advance to a step 458 is done. In the presence of updating, a step 459 accesses the optical address of the corresponding magnetic track. Steps 460, 470, and 471 execute moving the magnetic head downward, recording magnetic data immediately after the detection of the optical address, and checking the recorded data. When a step 472 detects that the error rate is large, a jump to a step 481 is done. The step 481 lifts the magnetic head, and a step 482 cleans the magnetic head with the head cleaning portion. A step 483 executes the recording again and checks the error rate. When the error rate is good, an advance to the step 428 is done. When the error rate is bad, a jump to the step 427a is done.

When the step 472 detects that the error rate is small, an advance to a step 473 is done. The step 473 checks whether or not the recording has been completed. When the result of the check is No, a return to the step 470 is done. When the result of the check is Yes, a step 474 lifts the magnetic head. A step 475 checks whether or not all the work has been completed. When all the work has been completed, an advance to a step 476 is done. Otherwise, a return to the step 428 is done.

The step 476 lifts the magnetic head, and a step 477 cleans the magnetic head with the head cleaning portion. Then, a step 478 detects whether or not an ejecting instruction is present. In the presence of the ejecting instruction, a step 479 ejects the optical disk. In the absence of the ejecting instruction, a step 480 stops the program.

A band pass filter tuned to a frequency band equal to a frequency distribution of a reproduced signal from the magnetic head may be provided in the drive circuit for the actuator 18 to remove noise. Electromagnetic noise may be reduced by the following design. After access to a magnetic head, a drive current to the actuator for the optical head 6 is turned off. Then, reproduction is executed by the magnetic head. When the reproduction is completed, driving the actuator is restarted.

In most of conventional CD's, a thick films of print ink are applied to the back sides thereof by screen printing or others, so that there is a roughness of several tens of μm. When the magnetic head is brought into contact with such a CD, print ink is removed or damaged. As shown in the ON state of FIG. 115, the recording medium 2 having a magnetic shield layer 69 is inserted into the apparatus. In this case, the transmission of electromagnetic noise from the actuator for the optical head 6 is remarkably suppressed as compared with the OFF state of FIG. 115 in which the recording medium 2 having no magnetic shield layer 69 is inserted into the apparatus. The noise is outputted from the magnetic head reproducing circuit 30, and can be easily detected. Accordingly, even when the magnetic head 8 is not brought into contact with the magnetic recording layer 3, the recording medium of this invention can be discriminated from a conventional recording medium such as a CD. Only when the recording medium of this invention which has the magnetic recording layer is inserted into the apparatus, the, magnetic head 8 is brought into contact with the surface of the recording medium. Thus, the magnetic head is prevented from contacting the back side of a recording medium such as a CD or an LD which has no magnetic recording layer. Therefore, there is an advantage such that the magnetic head is prevented from damaging the optical recording surface of the recording medium and printed matters on the back side of the recording medium.

According to another design, in FIG. 111, a discrimination code signal denoting the presence of a magnetic recording layer in a recording medium is previously recorded on a TOC area of the optical recording portion of a CD or on an optical track portion near the TOC area. First, optical TOC information is read out from a recording medium while the magnetic head is held out of contact with the recording medium. Only when the discrimination code signal for the presence of the magnetic layer is detected, the magnetic head 8 is moved into contact with the recording medium. In this design, when a conventional CD is inserted into the apparatus, the magnetic head 8 does not contact the optical recording side and the label side of the recording medium. Thus, there is an advantage such that a damage to the conventional CD can be prevented. It may be good that a given optical mark is provided on the print surface of an optical disk, and a magnetic recording layer is decided to be present only when the optical mark is detected.

DESCRIPTION OF THE FOURTEENTH PREFERRED EMBODIMENT

FIG. 134 shows a recording and reproducing apparatus according to an eighteenth embodiment of this invention which is similar to the embodiment of FIG. 110 except for design changes which will be described later. Information recording and reproduction into and from a magnetic recording portion 3 of a recording medium 2 are executed through modulation and demodulation responsive to an optical-system clock signal 382 which is extracted from a reproduced signal related to an optical recording surface of the recording medium 2.

In FIG. 134, an optical reproducing circuit 38 includes a clock reproducing circuit 38a which recovers the optical-system clock signal 382 from the optically reproduced signal. A clock circuit 29a contained in a magnetic recording circuit 29 subjects the optical-system clock signal 382 to frequency division, generating a magnetic-system clock signal 383. The magnetic-system clock signal 383 is used as a reference in modulation executed by a modulating circuit 334 in the magnetic recording circuit, 29. These conditions are shown in FIG. 216. The optical-system clock signal from the clock reproducing circuit 38a has a frequency of 4.3 MHz. The optical-system clock signal is down-converted to the modulation clock signal for the MFM modulator 334 of this invention which has a frequency of 15–30 KHz, and magnetic recording is done. Starting with a head of a tune is performed through the detection of an optical address by an index detector 457 as previously described. In this case, the control of rotation of a motor is performed in response to the optical signal. As shown in FIGS. 218(a)–218(h), the magnetic recording is started by a periodical signal after the optical index.

During the reproduction of information from the magnetic recording portion of the recording medium 2, a clock circuit 30a in a magnetic reproducing circuit 30 recovers a magnetic-system clock signal 383, and the magnetic-system clock signal 383 is used as a reference in demodulation executed by a demodulating section 30b in the magnetic reproducing circuit 30.

With reference to FIG. 217, a detailed description will now be given of operation which occurs during the magnetic reproduction. After the reproduction is made on the optical address for the index, a power supply to an actuator of an optical pickup portion 6 is turned off to prevent the occurrence of electromagnetic noise as shown in FIG. 218(d). Then, the magnetic reproduction is turned on, and the control of the rotation of the motor and the demodulation of data are done in response to the magnetic record signal. The reproduced signal from a magnetic head 8 is shaped by a wave shaper 466, and a clock reproducing section 467 reproduces a clock signal therefrom. The reproduced clock signal is fed to a pseudo magnetic sync signal generator 462. A magnetic sync signal detector 459 reproduces a magnetic sync clock signal, and an MFM demodulator 30b executes demodulation into a digital signal. The demodulated signal is subjected by an error correcting section 36 to error correction before being outputted as magnetic reproduced data.

The magnetic reproduced signal corresponds to frequency division of the optical reproduced signal by a given factor. Immediately before a change from "optical" to "magnetic", the signal resulting from the frequency division of the optical reproduced, clock signal continues to be fed to a PLL 459a of the magnetic sync signal detector 459 as reference information. The central frequency of the PLL locking is set close thereto. Accordingly, upon a change from "optical" to "mangetic", the frequency lockup is executed in a short time according to the magnetic reproduced clock PLL. In this way, the magnetic recording clock signal is generated by the frequency division of the optical reproduced clock signal, and the magnetic recording, is done in response to the magnetic recording clock signal. This design is advantageous in that the optical reproduced clock signal can be replaced by the magnetic reproduced clock signal in a short time upon a change of the optical head 6 into an off state during the reproduction of the magnetic signal. In the case where the optical head 6 and the magnetic head 8 fixedly travel on, the, same circumference or different circumferences, a constant division ratio is good. In the case where the heads travel on different circumferences without being fixed, the radiuses rM and ro of the circumferences are derived and the division ratio is corrected in accordance with the derived radiuses.

A description will now be given of the way of the rotation control. With respect to the rotation control during the optical reproduction, a pseudo optical sync signal generator 461 and a shortest/longest pulse detector 460 in a motor rotation controller 26 of FIG. 217 generate an optical sync signal. A motor controller 261a controls the rotational speed of a motor 17 at a prescribed rotational speed in response to the optical sync signal. At this time, a change switch 465 is in a position "B". When an optical sync signal detector 465 establishes synchronization, it feeds a changing command to the change switch 465 so that the switch 465 changes from the position "B" to a position "A". Thus, the motor 17 rotates at the synchronized rotational speed.

With reference to FIGS. 218(a)–218(h), at t=t2, the optical reproduction is turned off and is replaced by the magnetic reproduction. Immediately thereafter, the MFM period T of the magnetic reproduced signal is measured by the wave shaper 466, and thereby the magnetic sync signal having a frequency of 15 KHz or 30 KHz can be obtained. The obtained magnetic sync signal is processed by the pseudo magnetic sync signal generator 462 and a frequency divider/multiplier 464 into a clock signal matching in frequency to the optical rotation sync signal and being fed to the change switch 465. Immediately after a change from "optical" to "magnetic", the change switch 465 moves from the position "A" to a position "C" so that rough rotation control is executed. During a later period, when the locking is established through the PLL 459a in the magnetic sync signal detector 459, the change switch 465 moves from the position "C" to a position "D" so that accurate rotation control responsive to the magnetic sync signal will be started. With reference to FIG. 218(a)–218(h), at a moment of t=t3, the magnetic reproduced signal is synchronous with the reproduced clock signal so that the magnetic data will be continuously demodulated.

It is now assumed that an error is caused by a scratch on the recording medium surface at t=t4, and the error continues for a certain time tE. In this case, at t=t5, the magnetic reproduction is turned off while the optical reproduction is turned on. During a period tR, the rotation control responsive to the optical reproduced signal is done to stabilize the rotation of the motor.

At t=t7, the period tR terminates, and the optical reproduction is turned off while the magnetic reproduction is turned on. Since the error has ended, the change of the rotation control from "optical" to "magnetic" is completed in a short time. At t=t8, the magnetic record sync signal is reproduced so that data is surely reproduced. In this way, the error is compensated. As previously described, the magnetic reproduction is executed while the rotation control responsive to the optical reproduced signal and the rotation control responsive to the magnetic reproduced signal are changed in a time division manner. This design is advantageous in that the reproduction of the magnetic signal is prevented from being adversely affected by the electromagnetic noise caused by the optical pickup portion during the optical reproduction. Also in the case where the magnetic head 8 and the optical head 6, are separated by 1 cm or more, the magnetic reproduction is enabled by using the system of FIG. 217 and FIGS. 218(a)–218(h). In this case, the optical reproduction and the magnetic reproduction can be simultaneously executed.

As shown in FIG. 135, the velocity ω of rotation of the recording medium 2 tends to fluctuate due to a variation in rotation of a drive motor which is generally referred to as "a wow flutter". In a conceivable design where the frequency of a magnetic recording clock signal is fixed, the recording wavelength λ of a magnetically recorded signal on a recording medium 2 tends to vary even in one track according to the wow flutter. On the other hand, in the recording and reproducing apparatus of FIG. 135, since the magnetic-system clock signal 383 is generated on the basis of the optically reproduced signal through frequency division and the magnetic recording is executed in response to the magnetic-system clock signal 383, the affection of the wow flutter is canceled so that the magnetically recorded signal on the recording medium 2 has an accurate constant period. Therefore, there is an advantage such that accurate recording can be realized even at a short recording wavelength. In addition, since a given time part of the recorded signal can be accurately located in one round of a track, a gap portion 374 (see FIG. 123) for preventing overlapped record can be set as small as possible. During the reproduction of a magnetically recorded signal, the optical-system clock signal is subjected to frequency division so that the magnetic-system clock signal for demodulation can be accurately recovered as shown in FIG. 132. Thus, a decision or discrimination window time 385 (Twin) for the demodulation in the reproduction can be set short, and the data discrimination performance can be enhanced and also the error rate can be improved.

As denoted by "data 1" in FIG. 132, according to conventional two-value (bi-value) recording, only one bit can be recorded per symbol. On the other hand, in this embodiment, two bits or more can be recorded per symbol as will be described hereinafter. Specifically, as shown in "reproduce 2" in FIG. 132, a signal 384 to be magnetically recorded can be subjected to pulse width modulation (PWM) by using an accurate time Top determined by the optical-system clock signal 382. Four digital values "00", "01", "10", and "11" are assigned to four different recorded signals 384a, 384b, 384c, and 384d respectively which can result from pulse width modulation of a 1-symbol waveform. Thus, two bits can be recorded per symbol so that an increased amount of recorded data can be realized.

If recording is executed at uniform periods To, the value of λ/2 is equal to t3'−t3=To−dT and is thus smaller than the shortest record period Tmin so that the accuracy of recorded information can not be maintained regarding the signal 384d of FIG. 150. Accordingly, in the case of the signal 384d, a new starting point is set to the moment t3 and then magnetic-system clock signal is, shifted by the time dT. Thus, a discrimination (decision) window 384 for detecting "00" of "data 2" is defined by a moment t4=t3'+dT. In addition, pulses which occur moments t5, t6, and t7 are decided to be "01", "10", and "11" respectively. In this way, the 2-bit data is demodulated.

When the pulse width modulation is designed so that eight different modulated signals can be generated, three bits can be recorded per symbol. When the pulse width modulation is designed so that sixteen different modulated signals can be generated four bits can be recorded per symbol. In these cases, a more increased amount of recorded data can be realized.

The optical recording wavelength is 1 μm ore less while the magnetic recording wavelength equals a larger value of, for example, 10 μm to 100 μm, due to a great space loss. Thus, when a pulse interval (pulse width) is measured by using the optical-system clock signal as a reference, a higher resolution in the measurement is attained. The combination of PWM and the optical-system clock signal provides a recording capacity remarkably greater than the recording capacity realized by conventional two-value recording.

In this embodiment, a region in the magnetic recording portion of the recording medium 2 is designed according to a use. In the case of a CD ROM for a game machine or a CD ROM for a personal computer, a large recording capacity is required, and thus recording regions for tracks are set over an entire surface of the recording medium 2. Music CD's generally require only several hundreds of bytes for recording information of music names, a music order, copy guard (protection) code, and others. Thus, in the case of music CD's, recording regions of one track to several tracks are set, and a remaining area except a magnetic track portion can be used for other purposes such as a screen, print area with unevenness.

One magnetic track may be provided on an outer area or an inner area of the optical recording surface side of a recording medium. In the case of one track, as shown in FIGS. 84(a) and 84(b), recording material can be added to an exclusive playback disk by additionally providing the elevating motor 21, the elevating circuit 22, the magnetic recording and reproducing block 9, and the magnetic head 8. This design is advantageous in that the apparatus structure is simple and the apparatus cost is low. When one track is provided on an inner area of the recording medium, the recording capacity of that one track is relatively small. When one track is provided on an outermost area of the recording medium such as a magnetic track 67f of FIG. 124, the recording capacity of that one track is 2 KB at a wavelength of 40 μm. In this case, since a mechanism for accessing the track is unnecessary, there is an advantage such that the apparatus structure can be simple and small.

In this case, when a CD is inserted into the apparatus, the TOC of the optical track 64a in FIG. 124 is read out by the optical head 6 and simultaneously the rotational motor 17 is subjected to CLV drive in response to the clock signal of the TOC. Since the TOC radius of the CD is constant, rotation at a constant velocity is enabled. Under these conditions, the magnetic recording and reproduction are executed. The sync signal and the index signal for the magnetic recording are read out from the optical track 65. It is now assumed that, as shown in FIGS. 84(a) and 84(b), information indicating the presence of the magnetic recording layer 3 is in an optical track 65 at or near the TOC area. The optical recording block 7 detects this information, driving the head elevating motor 21 and bringing the magnetic head 8 into contact with the magnetic recording layer 3 as shown in FIG. 84(b) to execute the reproduction of the magnetic record signal.

The reproduced data is temporarily stored into the memory 34 of the recording and reproducing apparatus 1, and updating is executed in response to the stored data to reduce the number of times of actual magnetic recording and reproduction and to reduce a wear.

The optical track 65a at the TOC and the outermost magnetic track 67f are simultaneously subjected to recording and reproduction, and are thus separated by a physical distance close to 3 cm as shown in FIGS. 84(a) and 84(b). Therefore, as shown in FIG. 116, the degree of the entrance of electromagnetic noise, caused by the optical head 6 into the magnetic head 8 is reduced by 34 dB.

In the one-track system, the magnetic recording layer 3 uses an outer portion of the recording medium, and may be provided on the optical recording side of the recording medium. In the case where this design is applied to a CD player having an upper lid 38a as shown in FIG. 131, since the magnetic head 8a is accommodated under the CD, the CD player can be small in size and simple in structure.

In the case where the magnetic recording layer 3a of FIG. 131 is formed on the side of the transparent substrate 5 of the recording medium by a thick film fabrication technology such as a screen printing technology, there occurs an additional thickness or height of several tens of μm to several hundreds of μm. This additional height causes the magnetic head 8a to contact only the magnetic recording layer 3a but not contact the transparent substrate 5. Thus, the magnetic head 8a is prevented from damaging the transparent substrate 5. The provision of the magnetic recording portion reduces the capacity of the optical recording portion. In the case where the magnetic head 8a is fixed with being separated from the CD 2 by a distance ho of 0.22 mm or more, and where an elevating member 21b supported on the upper lid 38a forces a rubber roller 21d in a direction 51, the CD is deformed thereby so that the magnetic recording portion 3b contacts the magnetic head 8a. The pressure applied via the rubber roller 21d enables reliable contact between the magnetic recording portion i3b and the magnetic head 8a, and thus enables good magnetic recording characteristics.

In this case, as shown in FIG. 98, the magnetic track 67f is provided by applying magnetic recording material to an outermost area of the side of the transparent substrate 5 of the CD recording medium through a screen printing technique. In fact, printing is done under conditions where a conventional CD is reversed to cause a back side thereof to face upward at a screen printing step. Such a recording medium can be made by a conventional CD manufacturing line.

If the magnetic head contacts the uneven screen print area or the transparent substrate on the optical recording side, the magnetic head and the print area or the transparent substrate tend to be damaged. In this embodiment, such a problem is resolved as follows. As shown in FIG. 131, the magnetic recording surface of the recording medium 2 is formed with an optical mark 387. The optical mark 387 may be provided on the opposite side of the recording medium 2. The optical mark 387 has printed data, such as a bar code, which represents the size of the magnetic recording region. An optical sensor 386 provided at a side of the magnetic head 8 serves to read out data or information represented by the optical mark 387 on the recording medium 2 in a known way. Specifically, an optical detector 386 having a combination of an LED and an optical sensor reproduces the bar code data. The optical mark 387 is generally located on or inward of a TOC portion of a CD. The optical mark 387 is used in preventing a damage from being caused by the magnetic head 8.

Specifically, as shown in FIG. 131(b) and FIG. 145(a), the bar code information read out from the optical mark 387 represents a region of the magnetic recording layer of the CD in the radial direction, the value of the magnetic coercive force Hc of the magnetic recording material, a secret code for a copy guard, or the identification number of the CD. A mechanism or a circuit for moving the magnetic head 8 is activated in response to the readout information so that the magnetic head 8 can be prevented from contacting an area of the recording medium 2 except the region of the magnetic recording layer. Thus, a damage by the magnetic head 8 can be prevented.

This embodiment may be modified as follows. In the case of a CD, an area inward of a TOC region is not provided with an optical recording portion. As shown in FIG. 131(a), this area is formed with a transparent portion 388 extending below the optical mark 387. The optical head 6 serves to read out information from the back side of the optical mark 387 through the transparent portion 388. In this case, the optical sensor 386 can be omitted.

It should be noted that the optical sensor 386 may be provided at a side of the optical head 6. In this case, the optical sensor 386 is located at a fixed part of the recording and reproducing apparatus or the upper-lid type CD player of FIG. 131, and hence wiring to the optical sensor 386 can be simplified.

In addition, the optical sensor 386 may be designed so as to detect light which has passed through the optical mark 387. Furthermore, the optical sensor 386 may be common to an optical sensor for detecting the presence and the absence of a CD in the recording and reproducing apparatus.

According to one example, optical recording layers are formed at intervals through vapor deposition of aluminum or other substances so that a circumferential bar code or a concentric-circle bar code is provided as an optical mark. In this case, the optical mark can be formed during the fabrication of the optical recording film.

As shown in FIG. 131(b), FIG. 144(a), and FIG. 145(a), three films of a magnetic recording region 398, printed letters 45, and an optical mark 387 can be formed in a step of applying screen printed material 399 to a CD twice during the formation of a magnetic recording layer 3. The resultant print surface of the-CD has a state such as shown in FIG. 145(a). When black material having a high magnetic coercive force Hc is used, a good contrast of the printed title letters 45 is attained. Provided that print ink is replaced by ink of magnetic material-having a high magnetic coercive force Hc in a conventional CD manufacturing line, the recording medium 2 of this invention can be made through screen printing. Thus, the recording medium 2 of this invention, that is, a CD with a RAM, can be made at a cost similar to the cost of manufacture of a conventional CD.

As shown in FIG. 145(a), data "204312001" is read out from the bar code 387a. A screen printing machine 399 prints data of different ID numbers on CD's respectively. In the case where the screen printing machine 399 is inhibited from changing the printed contents from a CD to a CD having a copy protecting function, a circular bar code printer 400 prints a bar code 387a or numerals 387b representative of a disk ID number as shown in FIG. 144(a) and FIG. 144 (b). In this case, normal ink may be used, and the resultant print surface has a state such as shown in FIG. 145(b). This design is advantageous in that the user can visually read the disk ID number. In the case where OCR numerals 387b representing a disk ID number are printed on a bar code area 387a, it is possible to confirm the disk ID number by either visual observation or use of art optical detector.

As shown in FIG. 144(a), a second printer 399a provides a magnetic recording region 401 of material having a high Hc of, for example, 4000 Oe, which is greater than that of a magnetic recording region 398. The magnetic recording region 401 can be subjected to reproduction by a normal recording and reproducing apparatus, but cannot be subjected to record thereby. In a factory, a disk ID number or a secret code is recorded thereinto. This design is advantageous in that illegal copy of the disk is more difficult.

As shown, in FIG. 146(a), an optical disk 2 is provided with a space portion 402a filled with magnetic powder 402 such as iron powder, and a magnetic portion 403 is provided at a top thereof, the magnetic portion 403 has a magnetic coercive force Hc comparable with that of iron. When the magnetic portion 403 is not magnetized, the magnetic powder 402 is not attracted by the magnetic portion 403 so that letters will not appear as shown in FIG. 145(a). After the magnetic portion 403 is magnetized by a multi-channel magnetic head, the magnetic powder 402 is attracted thereby so that the letters appear as shown in FIG. 146(b). In the case where OCR letters are recorded as shown in FIG. 145(c), the user can visually read the OCR letters along direction 51a. On the other hand, the magnetic head 8 can read outs magnetic recorded information of a disk ID number or others from the magnetic recording portion 403. According to this design, it is sufficient that data of a disk ID number or others is magnetically recorded in an OCR configuration disk by disk in a factory. Thus, this design is advantageous in that conventional disk manufacturing steps can be used.

According to another design, a magnetic recording layer 3 is provided at an outer portion of the side of a transparent substrate 5 of a recording medium as shown in FIG. 98, and a copy guard signal is recorded thereon in a factory. This design enables the use of a conventional caddy. Therefore, this design is advantageous in that the compatibility between caddies is attained.

In the case of an exclusive playback MD-type disk, only one side has a shutter. By providing a magnetic layer on a side of a transparent substrate of the disk, this invention can be applied thereto.

Copy protection and key unlocking will now be described. It is now assumed that a CD contains 100 programs locked by logical keys. The user informs the program maker (the software maker) of a disk ID number and pays a given fee. The program maker replies key numbers, corresponding to the disk ID number, to the user. For example, the key number corresponding to the tenth program is recorded into the TOC area of the magnetic recording region of the CD. When the tenth program is reproduced, the-key information in the magnetic recording layer and the disk ID number in the optical mark are inputted into a use allowing program. If the key information is right, use of the program is permitted according to the use allowing program. In this way, during a later period, the program can be used without any additional operation. Thus, this design is advantageous in that the program can be used without inputting the key information after the key information has been inputted once. Since a disk ID number varies from disk to disk and can not be changed, a key can not be unlocked even if key information of a personal disk is inputted into another personal disk. Thus, this design is advantageous in that use of a program without paying a given fee can be inhibited.

As shown in FIG. 131, a portable CD player has a movable upper lid or door 389. When a CD is moved into and from the player, the upper lid 389 is open. In this embodiment, the magnetic head 8 and a magnetic head traverse shaft 363b move together with the upper lid 389. When the upper lid 389 assumes an open position, the magnetic head 8 and the upper lid 389 are separate from the recording medium 2 so that the movement of the recording medium 2 into and from the player can be easily performed. When the upper lid 389 assumes a closed position, the magnetic head 8 and the magnetic head traverse shaft 363b are close to the recording medium 2. Only when the execution of magnetic recording or reproduction is required, the magnetic head 8 is brought into contact with the recording medium 2 by a head actuator 22.

The optical head 6 is subjected to tracking operation by a traverse actuator 23, a traverse gear 367b, and a traverse shaft 363a. The traverse gear 367b and traverse gears 367a and 367c are in mesh with each other. The drive force of the traverse actuator 23 is transmitted to the traverse gear 367c via the traverse gears 367a and 367b. In FIG. 151, as the traverse gear 367b is rotated clockwise by the traverse actuator 23, the magnetic head traverse shaft 367b is moved in the direction denoted by the arrow. In this way, the magnetic head 8 and the optical head 6, are moved together by equal distances in equal radial directions of the recording disk 2. Thus, provided that positional adjustment of the optical head 6 and the magnetic head 8 is previously executed, the optical head 6 and the magnetic head 8 are automatically enabled to access an optical track and a magnetic track at opposite positions on the surfaces of the recording medium 2 respectively when the upper lid 389 is closed. In this way, the mechanism for moving the magnetic head 8 and the magnetic head traverse 363b together with the upper lid 389 makes it possible to apply this embodiment to a CD player, and the recording and reproducing apparatus can be compact.

With reference to FIG. 133, a CD ROM cartridge has a lid 390 which can rotate between a closed position and an open position about a shaft 393 in a direction 51c. When the lid 390 is rotated to the open position, a CD ROM or a recording medium 2 can be moved into and from the cartridge. The CD ROM cartridge has a window and a movable shutter 301 for optical recording.

In this embodiment, the CD ROM cartridge has a movable shutter 391 which blocks and unblocks a window for magnetic, recording. The magnetic-recording window is formed in the lid 390. The magnetic-recording shutter 391 is movably supported on the lid 390. The magnetic-recording shutter 391 and the optical-recording shutter 301 engage each other via a connecting portion 392. As the optical-recording shutter 301 is opened in the direction 51b, the magnetic-recording shutter 391 is moved in the direction 51a so that the magnetic-recording window is unblocked. In this way the magnetic-recording window and the optical-recording window are simultaneously opened to enable the movement of a CD into and from the cartridge. The CD ROM cartridge of this embodiment is compatible with a conventional CD ROM cartridge.

DESCRIPTION OF THE FIFTEENTH PREFERRED EMBODIMENT

According to a fifteen embodiment of this invention, a magnetic recording layer 3 is provided on an outer surface of a cartridge 42 for a disk 2. FIG. 136 shows a recording and reproducing apparatus in the fifteenth embodiment. FIGS. 137(a), 137(b), 137(c), and FIGS. 138(a), 138(b), and 138(c) show conditions of recording and reproduction which occur when the cartridge is inserted into, fixed, or ejected from the apparatus. FIGS. 139(a), 139(b), and 139(c) show sections of the conditions of FIGS. 137(a), 137(b), 137(c).

An optical recording and reproducing section, and a magnetic recording and reproducing section of the apparatus of FIG. 136 are basically similar to those of the apparatus of FIG. 87 and FIG. 110 except that the noise canceler is omitted from the magnetic recording and reproducing section.

The recording and reproducing apparatus 1 of FIG. 136 has an opening 394 for inserting the disk cartridge thereinto. FIG. 136 shows conditions where the cartridge 42 has been inserted in a direction 51.

In the case where the cartridge 42 is inserted into the recording and reproducing apparatus 1 as shown in FIG. 137(a), an optical sensor 386 reads out an optical mark 387 such as a bar code provided on a part of a label portion 396 of the cartridge. An optical reproducing circuit 38 in FIG. 136 reproduces data, and a clock reproducing circuit 389 reproduces a sync clock signal. The reproducing data is fed to a system controller 10. If a magnetic recording layer 3 is decided to be present, a head moving command is fed to a head actuator 21 so that a head elevating section 20 moves magnetic heads 8a and 8b toward the magnetic recording layer 3. Data in the magnetic recording layer 3 is read out by the magnetic heads 8a and 8b, being demodulated into original data by demodulators 341a and 341b of magnetic reproducing circuits 30a and 30b. At this time, a clock reproducing circuit 38a reproduces a sync clock signal on the basis of a signal in the optical mark 387. The use of the sync clock signal enables reliable demodulation even if a running velocity fluctuates. Therefore, this design is advantageous in that the data in the magnetic recording layer 3 can be surely read out even if the running velocity fluctuates due to a shock upon the insertion of the cartridge 42 into the apparatus. In the case where identification information of a cartridge ID number, a software title, or others is recorded in, the optical mark 387, data management can be done cartridge by cartridge.

Generally, only a single magnetic head 8 suffices. As shown in FIG. 136, two magnetic heads may be provided to execute the recording and reproduction of same data twice. This design improves a reliability in the readout of the data. A combining circuit 397 combines error-free portions of data 1 and data 2 into error-free complete data, thereby reproducing data containing index information such as TOC data information which is stored into an IC memory 34. The TOC data contains information of the results and the processes of the recording and reproduction, and the previous directory of the cartridge 42. Therefore, the progress of use and the contents of the optical disk can be detected upon the insertion of the cartridge 42 into the apparatus.

While the cartridge 42 remains in the apparatus as shown in FIG. 137(b), magnetic recording and reproduction are arbitrarily done to add new information or to delete the recorded information. In this case, the contents of the TOC needs to be changed. In this invention, the TOC data in the IC memory 34 is updated without rewriting the data in the magnetic recording layer 3. Thus, the new TOC data in the IC memory 34 is different in contents from the old TOC data in the magnetic recording layer 3. When the cartridge 42 is ejected from the apparatus as shown in FIG. 137(c), the data in the magnetic recording layer 3 is updated. The new data is immediately reproduced by the magnetic head 8b, being checked and confirmed.

In the presence of multiple tracks such as three tracks, data updating is executed only on one, for example, a second one, of the tracks which requires a TOC data change, and thereby the number of errors is reduced during the recording. In this case, when the cartridge 42 is ejected from the apparatus as shown in FIG. 137(c), only third one of the tracks is subjected to recording by the magnetic head 8b.

In the presence of two heads as shown in FIGS. 137(a), 137(b), and 137(c), a recorded signal 68 is simultaneously read out by the magnetic head 8a, and error check is executed thereon. As shown in FIG. 139(c), a magnetic signal 68a which has been recorded by the magnetic head 8b can be checked by using the magnetic head 8a. If an error is present, an error message is indicated on a display section 16 of the recording and reproducing apparatus 1. An indication may also be given which represents "please insert the cartridge into the body again". In addition, a warning sound may be generated by a buzzer 397. Therefore, the user is forced to insert the cartridge 42 into the insertion portion 394 of the apparatus again. In the case where the cartridge 42 has been inserted into the apparatus again, TOC data is recorded once again when the cartridge 42 is ejected from the apparatus. The second recording has no error at a high probability. If such a process is repeated a given number of times, the magnetic recording layer 3 of the cartridge 42 is decided to be damaged while the ID number of the optical mark 387 is recorded. During a later period, when the cartridge 42 having this recorded ID number, a command of lowering the magnetic head 8 is not issued to unexecute the readout of the data. The data of the ID number is stored in the IC memory 34 with being backed up. In this way, TOC data can be reliably recorded and reproduced into and from each cartridge 42. This design is advantageous in that the addition of a simple arrangement enables the detection of a table of contents of a recording disk upon the insertion of a related cartridge into the apparatus. For a recording medium side, the attachment of a magnetic label to a conventional cartridge 42 suffices.

DESCRIPTION OF THE SIXTEENTH PREFERRED EMBODIMENT

A sixteenth embodiment of this invention is similar to the fifteenth embodiment except that a disk cartridge is replaced by a tape cartridge. Specifically, a magnetic layer 3 provided with a protective layer 50 which has been described with reference to FIG. 103 is attached to an upper portion of a tape cartridge 42 for a recording and reproducing apparatus 1.

FIG. 140 shows a whole arrangement which is similar to the arrangement of FIG. 136 except for design changes indicated hereinafter. The recording and reproducing apparatus 1 of FIG. 140 has an insertion opening 394 for a VTR cassette or cartridge 42 FIG. 140 shows conditions where the cassette 42 is being inserted into the apparatus along a direction 51. FIGS. 141(a), 141(b), 141(c), 142(a), 142(b), and 142(c) show conditions where the cassette is placed in and out of the apparatus. FIGS. 142(a), 142(b), and 143(c) show a transverse section of a magnetic head portion with the cassette being placed in the apparatus.

In the case where the cartridge 42 is inserted into the recording and reproducing apparatus (VTR) 1 as shown in FIG. 142(a), an optical sensor 386 reads out an optical mark 387 provided on a part of a label portion 396 of the cartridge. Bar code information and a sync signal are recorded on the optical mark 387. An optical reproducing circuit 38 in FIG. 140 reproduces data, and a clock reproducing circuit 389 reproduces a sync clock signal. The reproduced data is fed to a system controller 10. If a magnetic recording layer 3 is decided to be present, a head moving command is fed to a head actuator 21 so that a head elevating section 20 brings magnetic heads 8a and 8b into contact with the magnetic recording layer 3. Data in the magnetic recording layer 3 is read out by the magnetic heads 8a and 8b, being demodulated into original data by demodulators 341a and 341b of magnetic reproducing circuits 30a and 30b. At this time, a clock reproducing circuit 38a reproduces a sync clock signal on the basis of a signal in the optical mark 387. The use of the sync clock signal enables reliable demodulation even if a running velocity fluctuates. Therefore, this design is advantageous in that the data in the magnetic recording layer 3 can be surely read out even if the running velocity fluctuates due to a shock upon the insertion of the cartridge 42 into the apparatus. In the case where index information such as a cartridge ID number or a software title is recorded in the optical mark 387, data management can be done cartridge by cartridge (cassette by cassette).

Generally, only a single magnetic head 8 suffices. Two magnetic heads may be provided to execute the recording and reproduction of same data twice. This design improves a reliability inn the readout of the data. A combining circuit 397 combines error-free portions of data 1 and data 2 into error-free complete data, thereby reproducing data containing TOC data and others which is stored into an IC memory 34. The TOC data contains the absolute address which occurs at the moment of the end of the preceding operation of the cartridge 42, and the absolute addresses of the start and the end of respective segments and respective tunes. Accordingly, when the magnetic data is reproduced, the current tape absolute address is known which occurs at the moment of the insertion of the cartridge 42 into the apparatus. The contents of an absolute address counter 398 in the system controller 10 are updated in response to the information of the absolute address.

It is now assumed that the tape stores tunes. For example, it is known that the current address corresponds to 1-minute 32-second of an eighth tune while the current absolute address corresponds to 62-minute 12-second. In the case where a point at an absolute address of 42-minute and 26-second in a sixth tune is desired to be accessed, the tape is rewound by an amount corresponding to an absolute address of 19-minute 46-second while referring to the data from an absolute address detecting head 399 so that the current tape position can be quickly accorded with the head of the sixth tune. The interval between the current tape position and the desired tape position is previously known, so that the access speed can be high by accelerating, moving, and decelerating the tape at optimal rates. In addition, the list of the TOC information can be immediately indicated upon the insertion of the tape cassette into the apparatus.

While the cartridge 42 remains in the apparatus as shown in FIG. 141(b), magnetic recording and reproduction are arbitrarily done to add a new tune or to delete a recorded tune. In this case, the contents of the TOC needs to be changed. In this invention, the TOC data in the IC memory 34 is updated without rewriting the data in the magnetic recording layer 3. Thus, the new TOC data in the IC memory 34 is different in contents from the old TOC data in the magnetic recording layer 3.

In the presence of multiple tracks such as three tracks, data updating is executed only on one, for example, a second one, of the tracks which requires a TOC data change, and thereby the number of errors is reduced during the recording. In this case, when the cartridge 42 is ejected from the apparatus as shown in FIG. 137(c), only third one of the tracks is subjected to recording by the magnetic head 8b.

In the presence of two heads as shown in FIGS. 137(a), 137(b), and 137(c), a recorded signal 68 is simultaneously read out by the magnetic head 8a, and error check is executed thereon. As shown in FIG. 139(c), a magnetic signal 68a which has been recorded by the magnetic head 8b can be checked by using the magnetic head 8a. If an error is present, an error message is indicated on a display section 16 of the recording and reproducing apparatus 1. An indication may also, be given which represents "please insert the cartridge into the body again". In addition, a warning sound may be generated by a buzzer 397. Therefore, the user is forced to insert the cartridge 42 into the insertion portion 394 of the apparatus again. In the case where the cartridge 42 has been inserted into the apparatus again, TOC data is recorded once again when the cartridge 42 is ejected from the apparatus. The second recording has no error at a high probability. If such a process is repeated a given number of times, the magnetic recording layer 3 of the cartridge 42 is decided to be damaged while the ID number of the optical mark 387 is recorded. During a later period, when the cartridge 42 having this recorded ID number, a command of lowering the magnetic head 8 is not issued to unexecute the readout of the data. The data of the ID number is stored in the IC memory 34 with being backed up. In this way, TOC data can be reliably recorded and reproduced into and from each VTR tape cartridge 42. This design is advantageous in that the addition of a simple arrangement enables the TOC function which does not need any additional access time. For a recording medium side, the attachment of a magnetic label to a conventional cartridge 42 suffices.

DESCRIPTION OF THE SEVENTEENTH PREFERRED NEMBODIMENT

A seventeenth embodiment of this invention relates to a method of unlocking a key of a given program in an optical disk such as a CD ROM. As shown in FIG. 147, an ID number which varies from disk to disk is recorded on an optical mark portion 387 of a CD. The data representing, for example, "204312001" is read out from the optical mark portion 387 by an optical sensor 386 having a combination of a light emitting section 386a and a light receiving section 386b. The readout data is put into a disk ID number area (OPT) of a key management table 404 in a CPU.

To enhance the copy guard function, there is provided a high Hc portion 401 of barium ferrite having a magnetic coercive force Hc of 4000 Oe. In a factory, ID number data (Mag) of, for example, "205162", is magnetically recorded on the high Hc portion 401. The ID number data is read out from the high Hc portion 401 by a normal magnetic head. The readout data is put into a disk ID number area (Mag) of the key management table 404.

With reference to FIG. 241(a), in the case where a magnetizing machine 540 of FIG. 242(a)–242(d) is used, a step of recording an ID number into a medium 2 can be executed in one second or shorter. As shown in FIGS. 242(a) and 242(b), the magnetizing machine 540 is of a ring shape. As shown in FIGS. 242(c) and 242(d), the magnetizing machine 540 has a plurality of magnetizing poles 542a–542f and windings 545a–545f. A current from a magnetizing current generator 543 is fed via a current direction changing device 544 to the windings 545a–545f so that an arbitrary magnetization direction can be attained.

FIG. 242(d) shows a case where magnetization directions of S, N, S, S, N, and S poles are set from the left. In this case, magnetic record signals of directions denoted by the arrows 51a, 51b, 51c, and 51d are instantaneously recorded into a magnetic recording layer 3. Recording can done into a magnetic material having a high Hc of 4000 Oe. Thus, as shown in FIG. 242(a), a CD into which an ID number is recorded can be made in the same time interval as that in the prior art of FIG. 241 (b).

As previously described, in the case where a magnetizing machine 540 of FIG. 242(a)–242(d) is used, a step of, recording an ID number into a medium 2 can be executed in one second or shorter. Thus, the magnetizing machine 540 is more suited, to a step with a greater throughput. As previously described, as shown in FIGS. 242(a) and 242(b), the magnetizing machine 540 is of a ring shape.

As shown in FIGS. 242(c) and 242(d), the magnetizing machine 540 has a plurality of magnetizing poles 542a–542f and windings 545a–545f. A current from a magnetizing current generator 543 is fed via a current direction changing device 544 to the windings 545a–545f so that an arbitrary magnetization direction can be attained. FIG. 242(d) shows a case where magnetization directions of S, N, S, S, N, and S poles are set from the left. In this case, magnetic record signals of directions denoted by the arrows 51a, 51b, 51c, and 51d are recorded on a given track in a magnetic recording layer 3 in a short time, for example, several ms. In the case of the magnetizing machine 540, since a great current can be fed, recording can done into a magnetic material having a high Hc of 4000 Oe. Thus, as shown in FIG. 241(a), and ID number can be recorded in a work time comparable to that in the prior art of FIG. 241(b), and a CD can be made without changing a flow of steps. In the case where the magnetizing machine 540 is used, an ID number can be magnetically recorded without rotating a medium 2. Accordingly, it is possible to increase the throughput. The absence of rotation of a medium provides an advantage such that matters can be accurately printed on the medium with a given angle after an ID number is recorded as shown in FIG. 241(a).

As previously described, in the case of the magnetizing machine 540, since a great current can be fed, recording can done into a magnetic material having a high Hc of 4000 Oe. It is preferable that a medium uses such a high-Hc magnetic material in a region corresponding to a given track, and an ID number is recorded on the given track by the magnetizing machine 540. In this case, the recorded ID number can not be rewritten by a normal magnetic head 8, and an improvement can be attained on the security of a password related to the ID number. It should be noted that the normal magnetic head 8 is designed to be capable of operating on a magnetic recording layer with an Hc of 2700 Oe or less.

In this invention, as shown in FIG. 243, data of a physical arrangement (layout) table 532 of a disk and a signal from a generator 546 for a unique ID number are mixed by a mixer 547 in a manner such that it is difficult to separate them in the absence of a separation key. The mix-resultant signal and a separation key 548 are fed to a secret code device 537, being made into a secret code 538. The secret code 538 is recorded on a magnetic recording track 67 after a shaping step. The secret code 538 may be recorded on an optical recording track 65 in an original disk making step.

In a recording and reproducing apparatus 1, a secret code decoder 543 decodes a secret code, and a separator 549 divides the output signal of the decoder 543 into an ID number 550 and a disk physical arrangement (layout) table 532 in response to the separation key. As will be described later with reference to FIG. 238 and FIG. 240, a check is made as to whether or not the current disk is an illegal disk. When the current disk is judged to be an illegal disk, operation of the current disk is stopped.

In the system of FIG. 243, a word of the secret code 538 recorded on a magnetic recording track 67 varies from a disk to disk. Each disk uses the previously-indicated illegal-copy guard of this invention so that it is difficult to copy information in an optical recording portion of a CD. According to the system of FIG. 243, a plurality of different original disks are present for one disk, and a word of the secret code 538 varies from a disk to disk. Thus, it is difficult to confirm that two disks are the same original disk only by referring to the secret code. It is necessary to read out all information in a disk physical arrangement (layout) table 532 of each disk, and to check whether or not the two disks are the same original disk by referring to the readout information. Checking all data of an address, an angle, tracking, a pit depth, and an error rate requires a large-scale apparatus, and needs a certain length of time for confirmation. Thus, it is difficult to search for an original disk same as a disk or a CD related to a known password. This is advantageous in the illegal-copy guard since it is difficult to illegally rewrite an ID number of a disk.

A specific operation sequence will be described with reference to FIG. 148. In the case where a command of starting a program having a number N comes at a step 405, a reading process is done to check whether key information of the program is recorded on a magnetic track at a step 405a. At this time, a recording current is driven in the magnetic head to erase data from the magnetic track. In the case of a formal disk, key information is not erased because of a high Hc. In the case of an illegal disk, key information is erased. Next, at a step 405b, a check is made as to whether key data or a password is present. If it is no, the user is informed of a key inputting command as shown in FIG. 170 at a step 405c. Then, at a step 405d, the user inputs, for example, "123456". At a step 405e, a check is made as to the input data is correct. If it is no, the operation stops, at a step 405f and an indication of "a copy disk and a wrong key" is given on a display screen. If it is yes, an advance to a step 405g so that the key data for opening the program having the number N is recorded on the magnetic track of the recording medium 2. Then, a jump to a step 405i is done.

Returning to the step 405b, if it is yes, an advance to a step 405h is done. At the step 405h, the key data of the program having the number N is read out. At a step 405i, a disk ID number (OPT) is read out from the optical recording layer. At a step 405j, a disk ID number (Mag) is read out from the magnetic recording layer. At a step 405k, a check is made as to the ID numbers are correct. If it is no, an indication of "a copy disk" is given on the display screen at a step 405m and the operation stops. If it is yes, secret code unlocking calculation is executed among the key data, the disk ID number (OPT), and the disk ID number (Mag) to check whether the data is correct. A step 405p executes a check. If it is no, an error indication is executed at a step 405q. If it is yes, a step 405s starts the program having the number N to be used.

According to this invention, for example, 120 tunes are recorded into a CD while being compressed by a factor of ⅕. For example, 12 tunes among the 120 tunes have no keys and thus can be reproduced freely while the other tunes are locked by keys. Such a CD is sold at a price corresponding to a copyright fee of the 12 tunes. The user is informed of data of the keys by paying an additional fee. Then, the user can enjoy the other tunes as shown in FIG. 147.

According to this invention for example, a plurality of, game programs are recorded into a CD. For example, only one game program thereamong has no key and thus can be reproduced freely while the other game programs are locked by keys. Such a CD is sold at a price corresponding to a copyright fee of one game program. The user is informed of data of the keys by paying an additional fee. Then, the user can enjoy the other game programs as shown in FIG. 147.

The use of an audio expansion block 407 enables a CD to contain a 370-minute length of music. A desired tune can be selected by unlocking the related key. When a key is unlocked once, key data is recorded. Accordingly, during a later period, it is unnecessary to input the key data. This invention can also be applied to a CD forming an electronic dictionary, a CD containing video information, or a CD containing general application programs. It should be noted that the ID number in the high Hc portion 401 may be omitted to lower the cost.

With reference to FIG. 234, a description will now be given of a mastering apparatus 529 for making an original disk for a CLV type optical disk such as a CD. In the case of a CD, while a linear velocity controller 26a maintains a linear velocity in the range of 1.2 m/s to 1.4 m/s, an optical head 6 subjects a photosensitive member on a disk 2 to a light exposure process in which pits representing a latent image are recorded thereon by a light beam. In the case of a CD, a tracking circuit 24 increases a radius "r" by a pitch of about 1.6 μm per revolution so that pits are recorded in a spiral configuration. Thus, as shown in FIG. 236(a), data is spirally recorded.

As previously described, in the case of a CLV optical disk such as a CD-ROM, recording in a spiral configuration is done with a constant linear velocity previously set in the range of 1.2 m/s to 1.4 m/s. In the case of CLV, the amount of recorded data in one round varies as the linear velocity changes. When the linear velocity is low, a data arrangement (layout) 530a such as shown in FIG. 236(a) is provided. When the linear velocity is high, a data arrangement (layout) 530b such as shown in FIG. 236(b) is provided. In the case where a normal mastering apparatus is used, a legal (ligitimate) CD and an illegal CD have different data arrangements (layouts) 530. A normal mastering apparatus for a CD can set a linear velocity at an accuracy of 0.001 m/s. As previously described, an original disk is formed at a constant linear velocity. Even in the case where an original disk for a 74-minute CD is formed at a linear velocity of 1.2 m/s with such a high accuracy, the outermost track has an error corresponding to 11.78 rounds in a plus side. In other words, an available data arrangement (layout) 530b is in a condition where an outermost portion has an angular error corresponding to the product of 11.783 rounds: and 360 degrees. Thus, as shown in FIG. 236(a) and FIG. 236(b), a legal (legitimate) CD and an illegal CD are different from each other in data arrangements (layouts) 530, that is, addresses 323a–323x of A1–A26. For example, in the case where arrangement zones 531 being Z1–Z4 are defined according to division into four, the arrangement zones 531 of the addresses 323 of A1–A26 are different. Thus, in the case where physical position tables 532, that is, tables of correspondence between addresses 323 and arrangement zones 531 of two CD's, are formed, physical position tables 532a and 532 are different as shown in FIG. 236(a) and FIG. 236(b). This condition can be used in discriminating a legal (ligitimate) CD and an illegal CD.

As shown in FIG. 238, in this invention, a physical position table 532 is made during or after the manufacture of an original disk for CD's, and a secret coding device 537 executes coding into a secret code by using a one-directional function in an open secret code key system of an RSA type. The resultant secret code is recorded into an optical ROM portion 65 of a CD 2 or a magnetic recording track 67 of a CD 2a.

In a drive side, a secret code 538b is reproduced from a CD 2 or 2a, and a physical arrangement (layout) table 532 is recovered by using a secret code decoding program 534 reproduced from the CD. By using a disk check program 533a reproduced from the CD, disk rotation information 335 with respect to an actual CD address 38a is obtained from an index or a rotation pulse signal from a previously-mentioned FG. The information is collated with data in the physical arrangement (layout) table 532. If the result of the collation is OK, starting is done. If the result of the collation is NO, the current disk is judged to be an illegal CD so that the operation of the software program and the reproduction of a music software are stopped. Since the illegal CD shown in FIG. 236(b) differs from a legal (legitimate) CD in the physical position table 532b, the illegal CD is rejected. An illegal disk with a copied secret code is rejected. If the secret code encoding program 537 can not be decoded, an illegal CD will not start to operate. Thus, there is a great advantage such that the reproduction of an illegal CD is prevented.

In this invention, since the secret code decoding program 534 and the disk check program 533a are provided in a medium side rather than a drive side, they can be changed press by press or title by title of CD-ROM's. This is advantageous in a guard against illegal copy.

This invention uses a one-directional function of an open secret code key system of the RSA type such as shown in FIG. 238. For example, it is possible to use a calculation equation as $C=E(M)=M^{e}{}_{mod}n$. One of the key, that is, the secret code decoding program on a CD-ROM, is open to the public while the other of the key, that is, the secret code encoding program, remains secret. In the system of FIG. 238, the secret code decoding program, 534 is provided in a medium side rather than a drive side. If the secret code encoding program 537 is leaked, it is good to change both the secret code decoding program and the secret code encoding program to recover the guard against illegal copy.

In the mastering apparatus 529 of this invention, as shown in FIG. 234, a CLV modulation signal generator 10a generates a CLV modulation signal, which is fed to a linear velocity modulator 26a or a time base modulator 37a of an optical record circuit 37 to execute CLV modulation. As shown in FIG. 235(a), the linear velocity modulator 26a modulates the linear velocity at random in the range of 1.2 m/s to 1.4 m/s. A similar process can be implemented by modulating a signal by the time base modulator 37a while holding the linear velocity constant. It is difficult to accurately detect the linear velocity modulation from an original CD. The random modulation makes it difficult for the mastering apparatus, which makes the original disk, to copy the disk. As a result of the random modulation, original disks differ from each other. Therefore, it is difficult to completely copy a CD with the linear velocity modulation. Since the linear velocity varies only in the allowable standard range of 1.2 m/s to 1.4 m/s, data is accurately from a CD by a normal CD-ROM player.

A start point S is defined in the case where equal data is recorded on a given optical track 65a at a constant linear velocity of 1.2 m/s as shown in FIG. 235(b). It is now assumed that an end point A1 at which the data has been recorded agrees with a position of 360 degrees. Under these conditions, in the case where the linear velocity is increased from 1.2 m/s to 1.4 m/s at a constant rate in one revolution, the physical position 539a of an address A3 agrees with a physical position 539b offset by 30 degrees. In the case where the linear velocity is increased in a ½ revolution the physical position 539a agrees with a physical position 539c offset by 45 degrees. Thus a position can be changed by 45 degrees or less in one round. Since a normal mastering apparatus for CLV generates only one rotation pulse per revolution, the error is accumulated into a positional shift of 90 degrees until two revolutions are completed. The linear velocity modulation of this invention causes a positional deviation of 90 degrees between a legal (legitimate) original disk and an illegal original disk. A CD formed by illegal copy can be detected by sensing this positional deviation. It is good that the resolution of sensing of the positional deviation is chosen to correspond to 90 degrees or less. Thus, in the case where the linear velocity is varies in the range of 1.2 m/s to 1.4 m/s, an illegal CD can be detected by setting at least four 90-degree divided zones Z1, Z2, Z3, and Z4 as shown in FIGS. 236(a) and 236(b).

The mastering apparatus of FIG. 234 has a rotational angle sensor 17a. In the mastering apparatus, a physical position table 532 is generated from address information 32a of input data and positional information 32b of a rotational angle from a motor 17, being made into a secret code by a secret code encoder 537 and being recorded on an outer portion of an original disk 2 by an optical record circuit 37. Thereby, the secret code of the physical arrangement (layout) table 532 can be recorded on an optical track 65 of a disk 2 in FIG. 238 during the manufacture of the original disk. The resultant disk can be subjected to a reproducing process by a normal CD-ROM drive without any-magnetic head. In this case, as shown in FIG. 238 and FIG. 239, the drive is required to have a disk rotational angle sensor 335. It is sufficient that this sensing means can detect a 90-degree zone at a relative position related to an address 323. Thus, it is unnecessary to use a complicated sensor such as an angle, sensor in the sensing means.

A way of detecting a relative position will now be described. As shown in FIG. 237(a), one rotation pulse of a motor or one index signal of an optical sensor is generated per revolution of a disk. This period is subjected to time division as shown in FIG. 237(b). In the case of division into six zones, signal position time slots Z1–Z6 are determined. As previously described, address signals 323a and 323b are generated from the sub code of a reproduced signal. From signal position signals, it is possible to detect that the address A1 is in the zone Z1 while the address A2 is in the zone Z3.

With reference to FIG. 239, in a recording and reproducing apparatus 1, a signal is reproduced by an optical reproduction circuit 38. If a physical arrangement (layout) table 532 is present in an optical track, advance from a step 471b to steps 471d and 471e is done in FIG. 240. If it is no at the step 471b, a check is made at a step 471c as to whether or not secret code data is present in a magnetic record portion 67. If it is no, advance to a step 471r is done to allow start. If it is yes, advance to the steps 471d and 471e is done so that the secret code data is reproduced. In addition, a secret code decoding program for a secret code decoder 534 which is stored in a ROM of the drive or the disk is started, and the secret code is decoded. At a step 471f, the physical arrangement (layout) table 532, that is, a zone address correspondence table of An:Zn, is made. At a step 471w, a check is made as to whether or not a disk check program is, present in the medium. If it is no, advance to a step 471p is done. If it is yes, the disk check program recorded in the disk is started at a step 471g. In the disk check program of the step 471f. "n=0" is executed at a step 471h, and "n=n+1" is executed at a step 471i. At a step 471j, the drive side is operated to search for an address An of the disk 2, and to reproduce the address. At a step 471k, the previously-mentioned address position sensing means 335 detects positional information Z'n and outputs the information. At a step 471m, a check is made as to whether or not "n=Zn" is satisfied. If it is no, the current disk is judged to be an illegal CD at a step 471u and a display 16 is controlled to indicate "illegal copy CD". Then, stopping is executed at a step 471s. If it is yes at the step 471m, a check is made at a step 471n as to whether or not "n=last" is satisfied. If it is no, return to the step 471i is done. If it is yes, advance to a step 471p is done. At the step 471p, a check is made as to whether or not the disk check program is present in the RAM or the ROM in the drive side. If it is no, a software is started at the step 471r. If it is yes, the disk check program is started at a step 471q. Its contents are the same as those of a step 471t. If it is no, advance to steps 471u and 471s is done. If it is yes, a software in the disk starts to be reproduced at the step 471r.

As previously described, a linear velocity is varied in the range of 1.2 m/s to 1.4 m/s during the formation of a disk. When a conventional CD player subjects such a disk to a reproducing process, an original signal can be recovered without any problem. A mastering apparatus is able to execute a cutting process at an accuracy whose minimum value corresponds to a linear velocity of 0.001 m/s. With respect to CD's, there are provided such standards for a mastering apparatus that a linear velocity is equal to ±0.01 m/s. A linear velocity can be increased from 1.20 m/s to 1.22 m/s as shown in FIGS. 244(a) and 244(b) while the standards are met. In this case, as shown in FIGS. 244(c) and 244(d), a physical arrangement of an angle of a same address shifts from a state 539a to a state 539b by an angle of 5.9 degrees per revolution of the disk. As shown in FIG. 246, a recording and reproducing apparatus is provided with a rotational angle sensor 335 for detecting an angular shift of 5.9 degrees, and thereby a difference between physical arrangements can be detected. In the case of a CD, it is good to provide a rotational angle sensor 335 having a resolution of 6 degrees, that is, having an angular division into 60 or more per revolution.

The rotational angle sensor 335 has a structure such as shown in FIG. 249. Pulses outputted from a rotational angle sensor 17a such as an FG associated with a motor 17 are subjected to time division by a time division circuit 553a in an angular position detector 553 of a disk physical arrangement detector 556. Even in the case where one rotation pulse signal occurs per revolution, when a time accuracy of ±5% is available, division into 20 can be done so that an angular resolution of about 18 degrees can be attained. It should be noted that the operation of the rotational angle sensor 335 has been described with reference to FIGS. 237(a), 237(b), and 237(c).

In the case of a CD, since there is an eccentricity of ±200 μm, an error in measurement of an angle is caused by the eccentricity. In the case of a disk according to the CD standards, an error in the angular measurement which corresponds to 0.8 degree or less in P—P is caused by an eccentricity. As shown in FIG. 249, the angular position detector 553 is provided with an eccentricity detector 553c for detecting an eccentricity, and an eccentricity corrector 553b executes corrective calculation to compensate for the eccentricity.

The detection of the eccentricity and the calculation of the corrective value will now be described. In the absence of an eccentricity as shown in FIG. 252(a), the center of a triangle defined by three points A, B, and C on a common radius is coincident with the center 557 of the disk when "θa=θb=θc" is satisfied. In fact, as shown in FIGS. 252(b), there occurs an offset (an eccentricity) 559 due to an, eccentricity of the disk or an error in the position of the disk relative to the apparatus. As shown in FIG. 252(b), the relative angles of the addresses of the three points A, B, and C are detected by the angle sensor 335, and the difference L'a between the center 558 of rotation of the disk and the true center 557 of the disk is calculated by referring to the equation as "L'a=f (θa, θb, θc)". The eccentricity corrector 553b corrects the rotational angle signal of the rotational angle sensor 17a in response to the calculated eccentricity (offset or difference). Thereby, it is possible to compensate for the eccentricity. Thus, there is an advantage such that the angular resolution can be increased to an accuracy of one degree or less, and that the accuracy of detection of a illegal disk can be improved.

A flowchart of FIG. 247 is a modification of the flowchart of FIG. 240. The flowchart of FIG. 247 is designed so that an address judged to be illegal is accessed and reproduced twice or more, and a check is done to prevent wrong judgment (see steps 551t, 551u, and 551v). The flowchart of FIG. 247 is similar to the flowchart of FIG. 240 except for the following points. If a judgment of being not within an allowable range is done at a step 551r, an address An is accessed twice or more at a step 551t. Then, at a step 551u, detection is given of a zone number Z'n denoting the relative angle with respect to the address An. At a step 551v, a check is made twice or more as to whether or not it is within the allowable range. It it is yes, the current disk is judged to be a legal (legitimate) disk and advance to a step 551s is done. If it is no, the current disk is judged to be an illegal disk and advance to steps 471u and 471s is done to prevent start of a program.

The prevention of wrong judgement is also enabled by using a statistical process as follows. As shown in FIG. 245 (a), a legal (legitimate) original disk has frequency distributions as in a graph 1 regarding angle-address, angle-tracking direction, address-tracking direction, angle-pit depth, and address-pit depth. As in g graph 2, specified data is selected. In the case where reproduction is done by a player, data of sample addresses which can be easily discriminated is selected. As shown n FIG. 245(b), reproduction is done on a formed disk, and a signal portion outside an allowable range is found out as denoted in black in a graph 3. An abnormal value outside the allowable range is deleted from a list as shown in a graph 4. The drawing shows the frequency distribution of angle-address arrangement (layout). A similar advantage is available in the case of a distribution of pit depth or a distribution of address-tracking amount. In this way, it is possible to delete a copy protecting signal portion from the list. It should be noted that the deleted copy protecting signal portion tends to be erroneously judged to be wrong since discrimination thereof is difficult. Accordingly, the rate of occurrence of wrong judgment is reduced during reproduction by the reproducing player. The probability of errors can be further reduced by accessing an address which has been judged to be illegal twice or more.

In the case of an illegally copied original disk, as shown in FIG. 245(c), the original disk is formed by reading out addresses of a formed disk. Thus, as in a graph 5, there occurs a CP (copy protection) signal distributed in a range where a probability is constant. In this case, a disk physical arrangement (layout) table can not be changed, and selection of data can riot be executed as in the graph 2. Therefore, data close to the allowable range limit or a CP signal exceeding the allowable range is present in the physical arrangement (layout) of the illegal original disk. An optical disk formed from such an illegal original disk by shaping press has an additional error due to a shaping variation, and a distribution is in a condition as in a graph 6. Thus, there is generated a physical arrangement signal 552b which exceeds the allowable range as denoted in black. The physical arrangement signal 552b peculiar to the illegal disk is detected by the disk check program, and the detection thereof stops the program and prevents the use of the copied disk. In this way, the temporal distribution of the CP signal related to angle-address is dispersed in a small range by the shaping press. With reference to FIG. 250(b), a pit depth is greatly varied in response to cutting and shaping conditions. Since accurate control of the pit depth tends to be difficult, the yield of illegally copied disks is remarkably reduced. Thus, in the case of a pit depth, a stronger copy protection can be provided.

With reference to FIG. 246 and FIG. 249, a recording and reproducing apparatus 1 includes a disk physical arrangement detector 556 having three detectors, that is, an angular position detector 553, a tracking variation detector 554, and a pit depth detector 555. The detectors detect angular position information Z'n, a tracking variation T'n, and a pit depth D'n, and output detection signals representative thereof. Confirmation as to agreement with a signal A'n of an address detector 557 provides correspondence data of A'n–Z'n, A'n–T'n, and A'n–D'n, or Z'n–T'n, Z'n–D'n, and T'n–D'n. A secret code decoder 534 outputs data corresponding to a legal (legitimate) disk, and the output data is stored into a reference disk physical arrangement (layout) table 532. In a collating portion 535, the previously indicated correspondence data is collated with data An, Zn, Tn, and Dn in the table 532. If the current disk is judged to be an illegal disk as a result of the collation, an output/operation stopping device, 536 stops operation of the program.

A flowchart of FIG. 247 is similar to the flowchart of FIG. 240 except for the following points. A disk check program includes a step 551w at which a check is made as to whether or not a CP secret key decoding program is modified, that is, whether or not a first secret code decoder 534a having a one-direction function calculator 534c of RSA or others for decoding a secret code in the reference physical arrangement (layout) table 532 in a secret code decoder 534 of FIG. 249 is changed. It it is yes, operation is stopped. Thus, even if the first secret code decoder 534a is illegally replaced by another, operation is stopped. Accordingly, there is an advantage such that the safety of the secret code can be higher while the copy protection can be better. At a step 551f, the position of a given address is measured in the case of an angular position. In addition, measurement is given of the condition of distribution of the error amount with respect to the reference angle in the reference physical arrangement (layout) table 532 of the zone number. A definition is now made such that "m=0" means the absence of a zone having an error and "m=±n" means the presence of n zones having errors. At a step 551g, setting is done as "m=−1". At a step 551h, setting is done as "m=m+1". At a step 551i, a check is made as to whether m members of the measured angular zones Z'n have errors. If it is no, return to the step 551h is done. If it is yes, addition to the error distribution list of Z'n is done at a step 551j. Thus, tables of distributions of errors are sequentially made. If "m=last" is detected at a step 551k, advance to a step 471n is done. Otherwise, return to the step 551h is done. In this way, measurement is made as to the conditions of the distributions of errors from the references with respect to the angular position of the given address, the tacking variation, the pit depth, and the angle/address position shown in FIG. 249.

A step 551m in the disk check program 471t is a properness judging program which provides the following process. A step 551 executes readout by decoding a secret key of a maximum tolerance (allowable range) Pn(m) with respect to the error amount m from the reference value of the angular arrangement Z'n of the address n which has been made into a secret code and recorded on the optical recording layer or the magnetic layer. Then, a check is made on the reference physical arrangement (layout) table 532a and the error distribution table 556a of FIG. 251 which is made according to the distribution measuring program for the physical position in the step 551f, and judgment is done regarding whether the current disk is legal or illegal. At a step 551p, setting is done as "m=O". At a step 551q, setting is done as "m=m=1". At a step 551r, a check is made as to a condition of being, within the tolerance (allowable range). Specifically, the check regarding the condition of being within the tolerance (allowable range) is executed by deciding whether or not the number of Z'n is smaller than the tolerance Pn(m) of FIG. 251. If it is no, advance to the step 551f is done so that the present address is accessed again. When this access results in a negative state, the current disk is judged to be illegal. If it is yes at the step 551r, advance to a step 551s is done. When "m=last" is detected at the step 551s, advance to a step 471p is done. Otherwise, return to the step 551q is done. In this way, measurement is made as to the distribution of errors of Z'n relative to zn, and the statistical process is executed. According to the statistical process, the current disk is judged to be a legal (legitimate) disk under the condition of being within the tolerance, and the current disk, is judged to be an illegal disk under the condition of being outside the tolerance. Thus, there is an advantage such that the discrimination between a legal (legitimate) disk and an illegal disk can be executed more accurately.

The flowchart of FIG. 247 includes a step 551a at which a random deriving device 582 such as a random number generator 583 of FIG. 249 is controlled to feed a partial selection signal to a magnetic reproduction circuit 30 or a secret code decoder 534 so that an optical track or a magnetic track storing a secret code is selected from among all tracks and is accessed and subjected to reproduction. Thus, access to a portion of the whole amount of secret code data suffices, and there is an advantage such that a mechanical access time is shortened and a copy checking time is shortened. The random deriving device 582 feeds a selection signal to the secret code decoder 534, and a portion of the reproduced secret code data is decoded. This partial selection process provides an advantage such that a secret code decoding time is shortened. The random number generator 584 enables such a function that, with respect to only a necessary minimum amount of samples for each time, sample data which varies time to time is subjected to disk check. This function enhances the copy protection. The addition of the random deriving device 582 remarkably shortens the disk checking time without reducing the copy protection.

As shown in FIG. 249, the disk physical arrangement detector in the recording and reproducing apparatus 1 has two detectors, that is, a tracking amount detector 554 and a pit depth detector 555, in addition to the angular position detector 553. A tracking amount sensor 24a can be a tracking error detection circuit which is able to measure wobbling of a tracking control portion 24 of an optical head 6. The tracking amount detector 554 receives a tracking amount Tn of an address n from the tracking amount sensor 24a, and measures temporal agreement between the tracking amount and other detection signals A'n, Z'n, and D'n and outputs a result of the measurement to the collating portion 535 as a signal T'n.

In the case of a legal (legitimate) disk of FIG. 253(a), the physical-position 539a of an address A1 is subjected to modulation such as wobbling in the tracking direction during the manufacture of an original disk. Therefore, tracking is offset in a direction toward an outer edge. This condition is defined as "T1=+1", and the relation "T2=−1" appears at the physical position 539b of an address A2. This information can be detected during or after the manufacture of an original disk, and a reference physical arrangement (layout) table 532 is made which is converted into a secret code before being recorded on the medium 2.

Figure 253:
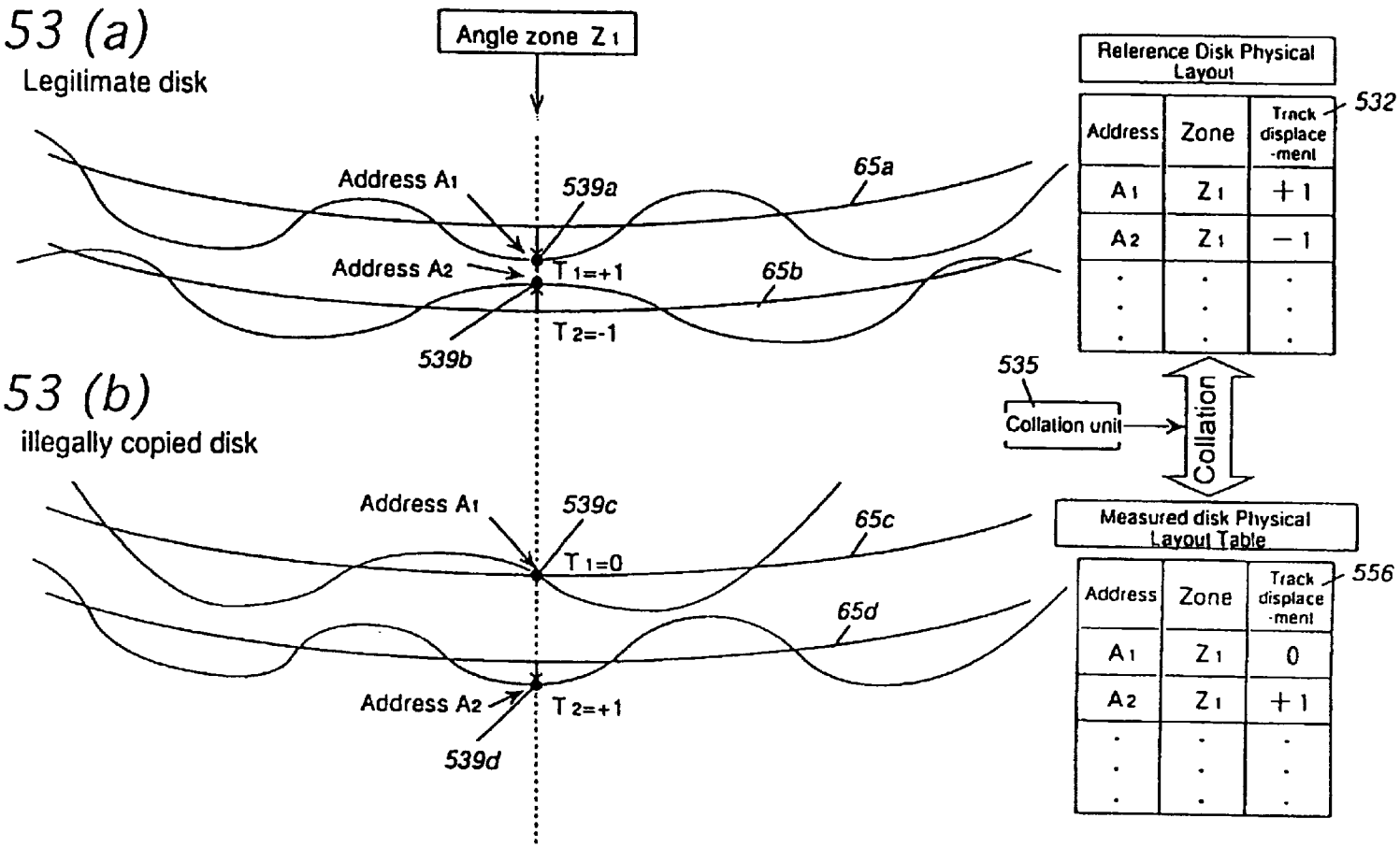

In the case of an illegally copied medium 2 of FIG. 253 (b), a normal tracking variation fails to be added. Even if a tracking variation is added, tracking variations T'1 and T'2 of addresses A1 and A2 in a same angular zone Z1 are in a state of O1+1 as shown in the drawing. Thus, a measured disk physical arrangement (layout) table 556 differs from the reference physical arrangement (layout) table 532 corresponding to a legal (legitimate) disk. This fact is detected by the collating portion 535 in the disk check portion 533 of FIG. 249, and the output/operation stopping device 536 stops the outputting of the program, the operation of the program, or the decoding of the secret code of an application program by a second secret code decoder 534b. In addition, the display 16 is controlled to indicate "illegally copied disk". In FIG. 249, the disk check program is made into the secret code, and it is difficult to change the disk check program. This is advantageous in the copy protection.

As shown in FIG. 249, the optical reproduced signal is fed from the optical head 6 to an amplitude detector 555a in the pit depth detector 555. The information detected by the amplitude detector 555a relates to a variation in the degree of modulation or an amplitude such as an envelope. The amplitude detector 555a can be a multiple value level slicer. The amplitude detector 555a detects a pit depth in response to an amplitude variation, and outputs a detection output signal D'n to the collating portion 535. In the collating portion 535, the detected information D'n is collated with data in the reference physical arrangement (layout) table 532. If the detected information D'n differs from the reference data, the copy protecting process is started.

In this way, as shown in FIGS. 254(a), 254(b), 254(c), and 254(d), four parameters being an address An, an angle Zn, a tracking variation amount Tn, and a pit depth Dn are checked with respect to physical arrangements 539a, 539b, and 539c composing one sample point. This is advantageous in enhancing the copy protection.

As shown in FIG. 269, at a step 584a, for example, 1000 pit groups are recorded on a same original disk with 1000 different recording conditions related to a recording output and a pulse width. In this case, at a step 584b, pit groups are made which meet 5 different conditions when the yield corresponds to, for example, 1/200. At a step 564c, the physical arrangements of these good pit groups are found out by monitoring the original disk with laser light. At a step 584d, a physical arrangement (layout) table corresponding to the good pit groups is made. At a step 584e, the physical arrangement (layout), table is made into a secret code. In the case of optical recording which is detected at a step 584f, the secret code is recorded on a second photosensitive portion 572a of the original disk at a step 584g. At a step 584h, plastic is injected into the original disk to form an optical disk. At a step 584i, a reflecting film is made. If a requirement for a magnetic layer is not detected at a step 584j, the optical disk is completed. Otherwise, at a step 584k, a magnetic record portion is made. At a step 584m, the secret code is recorded on the magnetic record portion. As a result, the optical disk is completed. Since the pit depth is measured after the original disk is formed and the arrangement (layout) table is made into the secret code before being recorded, it is possible to increase the yield to about 100% during the manufacture of the original disk.

In the case of an illegally copied disk of FIG. 250(a), pits 561a–561f are equal in depth. In the case of a legal (legitimate) disk of FIG. 250(b), pits 560c, 560d, and 560e have small depths. Accordingly, as shown in FIG. 250(c), corresponding reproduction pulses 562c, 562d, and 562e have small peak values. An effective output signal such as shown in FIG. 250(f) appears with a reference slice level S0 in the multiple level slicer 555b. On the other hand, as shown in FIG. 250(d), no effective output signal appears with a detection slice level S1. Thus, AND operation is executed between the inverted value of S1 and S0, and thereby copy protection signals 563c, 563d, and 563e are generated only in the case of a legal (legitimate) disk as shown in FIG. 250(g). In the case of an illegal disk, since the output of the detecting slice level S1 is consecutively "1", any copy protection signal is not outputted. Accordingly, a copied disk is detected. A similar advantage is available also in the case where, as shown in FIG. 250(e), the amplitude amount detector 555a detects a reduction in the modulation rate or a reduction in the amplitude of the envelope of the optical output waveform, and thereby an inverted code signal with respect to S1 is generated.

It is clear from FIG. 256 that, in an original disk making apparatus for a normal CD or MD, an angle control function is absent and thus disk check in an angular direction, that is, "A", is effective. In an original disk making apparatus for a ROM, a CD, an MD, or a laser disk, a device for control in a tracking direction or in wobbling is absent and thus a variation in the tracking direction, that is. "B", is effective. The combination "A+B" provides reliable copy protection, and is compatible with conventional IC's for a CD and an MD.

FIG. 257 shows a mastering apparatus 529 which is similar to the mastering apparatus of FIG. 234 except for the following points. As shown in FIG. 257, a system controller has a tracking modulation signal generator 564 which feeds a tracking controller 24 with a modulation signal. Thus, tracking is done with approximately a constant radius r0 based on a reference track pitch 24a. Modulation such as wobbling is carried out in the range of r0+dr with respect to the track radius r0. Therefore, as shown in FIGS. 253(a) and 253(b), a zigzag track is formed on, an original disk 572. Information of the tracking variation amount if fed to a tracking variation information portion 32g in a positional information input portion 32b. A copy protection signal generator 565 makes a reference physical arrangement (layout) table 532 which is a table of an address An, an, angle Zn, a tracking variation amount Tn, and a pit depth Dn. The reference physical arrangement (layout) table 532 has been described with reference to FIG. 246. A secret code encoder 537 encodes the table into a secret code. The secret code is recorded on a second original disk 572a provided on an outer portion of an original disk such as shown in FIG. 265 and FIGS. 266(a) and 266(b), or is recorded on an original disk at a second region provided on an outer portion such as shown in FIG. 267 and FIGS. 268(a) and 268(b). It is possible to independently add modulation Dn in a pit depth direction. The system controller 10 in FIG. 257 has an optical output modulation signal generator 566, and the amplitude of a laser output of an output modulator 567 in an optical record portion 37b is varied as shown in FIG. 263(b) or a pulse width or a pulse interval is modulated by a pulse width modulator 568 while the amplitude is held constant. Thereby, the effective value of the laser output can be varied. Thus, as shown in FIG. 263(c), a photosensitive portion 573 of the original disk 572 is formed with a portion 574 which is different in depth. The original disk is etched, and pits 560a–560e having different depths are formed as shown in FIG. 263(d). For example, pits 560a, 560c, and 560d have greater depths corresponding to about $\lambda/4$, while pits 560b and 560e have smaller depths corresponding to about $\lambda 6$. The original disk 572 is subjected to metal plating such as nickel plating, and thereby the original disk 572 is made into a metal original disk 575 such as shown in FIG. 263(e). Then, plastic molding is executed to form a molded disk 576.

In this way, the original disk is formed with pits while the amplitude of the laser output is varied. In the case of such a disk, as shown in a waveform (5) of FIG. 264, the peak value of a reproduced output signal is, equal to a reduced value. Thus, when a level slicer executes a slicing process with a given slice level, a pulse width is detected as being narrower than that in a pit of a greater depth so that a correct digital output signal is not available. To solve this problem, a pulse width adjuster 569 generates pulses of wider widths $T+\Delta T$ such as shown in a waveform (2) of FIG. 264 in response to an original signal having a period T such as shown in a waveform (1) of FIG. 264. Thus, as shown in a waveform (6) of FIG. 264, the digital signal is corrected. In the absence of this correction, a sliced digital output signal narrower in width than the original signal appears as shown in a waveform (7) of FIG. 264 so that a wrong digital signal is outputted.

In this way, the pit depth is modulated by the optical output modulator 567. The pit depth information Dn is fed from the optical output modulation signal generator 566 to the pit depth information portion 32h. The copy protection signal generator 565 makes the reference physical arrangement (layout) table 532 which is a table of the previously-indicated parameters An, Zn, Tn, and Dn. The secret code encoder 537 encodes the table into the secret code, which is recorded on the magnetic recording layer.

According to an alternative way, as in steps of FIG. 267, after a photosensitive portion 577 provided on an outer portion of an original disk has been made, pit depths and others are measured (see a step 5) and a physical arrangement (layout) table is generated. The table is made into a secret code. At a step 6, the secret code is recorded on a second photosensitive portion 577. Thereby, as shown in steps 7, 8, and 9, a program software and the physical arrangement (layout) table 532 can be recorded on a single original disk. In the case where different ID numbers are not recorded on respective disks, a magnetic layer may be omitted. In this case, copy protection can be attained only by an optical record portion.

FIG. 268(a) is a top view of an original disk. FIG. 268(b) is a sectional view of the original disk. As shown in FIG. 265 and FIGS. 266(a) and 266(b), two original disks may be bonded together.

As shown in FIG. 257, a communication interface 578 serves for communication with an external device. As shown in FIG. 262, a software copyright holder has an external secret code encoder 579. The external secret code encoder 579 encodes a physical arrangement (layout) table into a secret code in response to a first secret code, key 32d. The secret code is transmitted from the external secret code encoder 579 to the mastering apparatus 529 in an optical disk maker via a second communication interface 578a, a communication line, and the communication interface 578. Since the first secret code key 32d is not given to the optical disk maker from the software copyright holder, the safety of the secret code is high.

In the case where a combination of a pulse width and a pit depth is intended to be changed as shown in FIG. 255, the amplitude of the laser output and the pulse width are changed for each pulse. In this case, optimal conditions of the laser output and the pulse width vary from pulse to pulse. Accordingly, as shown in FIG. 255, n different conditions of the combination are made while the value of the laser output and the pulse width are varied in consideration of a gamma characteristic. For example, several hundreds of combinations of laser outputs are made, and original disks are formed under several hundreds of different conditions. In this case, several original disks have pits of optimal depths. When a signal is reproduced from such a good original disk, the reproduced signal reaches the reference voltage S0 but not reach the detection voltage S1 as shown by waveforms 581a and 581c in the portion (3) of FIG. 255.

This invention uses a way of making optimal pits during the manufacture of an original disk. Specifically, as shown in FIGS. 263(a)–263(e), several hundreds "n" of bit groups 580a–580d are provided, and recording is done under "n" different laser output conditions. In this case, several pit groups among the "n" pit groups meet required conditions of pit depths, pit shapes, and pulse widths. As shown in FIG. 248, the physical arrangement (layout) table 532 of such a good pit group 580c is made into a secret code, and the secret code is recorded on the magnetic record portion of the disk 2. The secret code may be recorded on the optical record portion of the original disk 572 in the second photosensitive portion or the second original disk shown in FIGS. 266(a) and 266(b) and FIGS. 268(a) and 268(b). In this way, the disk is obtained which has the copy protection using the pit depth.

A similar advantage is provided in the case where a record type optical disk such as a partial ROM is used, and a physical arrangement (layout) table is made into a secret code, which is recorded on the recording layer of the optical RAM. A plurality of the disk check programs may be placed in a program installing routine 584d, a printing routine 584e, a saving routine 584f, and other routines of a program 586 in an application, software (see FIG. 270) respectively. This design enhances the copy protection.

DESCRIPTION OF THE EIGHTEENTH PREFERRED EMBODIMENT

An eighteenth embodiment of this invention realizes a copy guard function which can be applied to the case where a software such as an OS is installed into a given number of machines or personal computers. FIG. 149 shows an arrangement of the eighteenth embodiment which is similar to the arrangement of FIG. 147 except for design changes indicated hereinafter.

An optical mark portion 387 or a high Hc portion 401 of a disk stores data of the maximum number of personal computers into which information is permitted to be installed from the disk The data is formed as data of a disk ID number (OPT) or a disk ID number (Mag) for a key management table. For example, the data represents "ID=204312001. N1=5, N2=3". This means that the disk ID number is "204312001". Additionally, this means that the maximum number of personal computers into which a first program is permitted to be installed is equal to 5, and that the maximum number of personal computers into which a second program is permitted to be installed is equal to 3. As shown in the drawing, in the case where a program 1 is installed into a first personal computer 408 identified as "xxxx11", a key unlocking decoder 406 outputs data since five tables of the program 1 remain. The output data enables a program such as an OS to be installed into a hard disk 409 of the first personal computer 408 via an external interface 14. At this time, the data of the ID number "xxxx11" of the personal computer 408 is fed to a CD ROM drive 1a. The ID data is stored into an "n=1" position of the program 1 in the key management table 404, and is then recorded on a magnetic track 67 of the CD ROM.

In the case where the program such as the OS is intended to be installed from the CD ROM 2a into a second personal computer 408a identified as "xxxx23", a check is made on the key management table 404. As a result of the check, it is known that four machines remain into which the program is permitted to be installed. Thus, the installing process is started and executed. The data of the ID number "xxxx23" of the personal computer 408a is stored into an "n=2" column in the program 1 in the key management table 404. In such a way, the program such as the OS can be installed into at most five personal computers. In the case where the program such as the OS is intended to be installed into a sixth personal computer, there is no unoccupied column in the program 1 so that an ID number of the sixth personal computer can not be recorded. Thus, the program such as the OS is inhibited from being installed into the sixth personal computer. In this way, illegal copy of the program such as the OS is prevented. If the program such as the OS in one of the first personal computer to the fifth personal computer breaks, the program such as the OS can be freely installed thereinto since the ID number of that personal computer has been already registered. As previously described, the disk ID number is recorded into the high Hc portion 401 and the optical mark 387 as two types of data. This design causes more work and cost to be necessary in copying a disk, and thus enhances the copy guard function.

A programmed operation sequence for executing the method of this invention will now be described with reference to FIG. 150. At a step 410a, a command of installing a program having a number N is issued. At a step 410b, an ID number of a personal computer is read out. For example, the ID number is "xxxx11". Then, a CD ROM 2a is set in a CD ROM drive 1a. At a step 410c, magnetic data is fed to a memory of the personal computer 408 and a key management table 404 is made. At a step 410e, a machine ID number registered in a column of the program having the number N in the table 404 is readout. At a step 410f, a check is made as to whether the readout ID number is equal to the ID number of the personal computer into which the program is intended to be installed. If it is yes, an advance to a step 410q is done. If it is no, a check is made at a step 410g as to whether an unoccupied column (area) for registering the machine ID number is present. Specifically, a check is made as to how many personal computers remain into which the program is permitted to be installed. If it is no, an advance to a step 410n so that the program is prevented from being installed. Then, operation stops at a step 410p. On the other hand, if it is yes, the ID number of the personal computer into which the program is intended to be installed is registered in the table 404. As a result, a reduction occurs in the number of remaining personal computers into which the program is permitted to be installed. At a step 410i, the machine ID number is recorded into the magnetic track 67 by the magnetic head. At a step 410j an installing process is started. If the installing process succeeds at a step 410k, the operation stops at the step 410p. If the installing process fails, the ID number of the personal computer into which the program is intended to be installed is deleted from the magnetic track. Then, the operation stops at the step 410p.

DESCRIPTION OF THE NINETEENTH PREFERRED EMBODIMENT

A ninth embodiment of this invention relates to an interface between a personal computer and a CD ROM drive. As shown in FIG. 151, a personal computer 408 has a software portion 411 containing an application program 412 such as a word processing software. A Cornell portion 414 manages a system. The application transmits and receives information to and from the Cornell portion 414 via a shell portion 413. The Cornell portion 414 has an operating system (OS) 415 in a narrow sense, and an input/output control system 416. The input/output control system 416 includes a device driver 417 for the inputting and outputting of signals from and to devices such as a hard disk. As shown in the drawing, A, B, C, and D drivers 418a, 418b, 418c, and 418d are logically defined as external storage units. The personal computer is physically connected to interfaces 14 and 424 of external storage units such as an HDD 409, a CD ROM 2a, and an FDD 426 via an interface 420 such as an SCSI and a BIOS 419 composed of a hardware including a software such as information in a ROM IC. The personal computer transmits and receives data to and from the interfaces 14 and 424.

In the case of a drive 1a for a CD ROM which has a magnetic recording portion of this invention, two drivers, that is, the A driver 418a and the B driver 418b are defined in the input/output control system 416. The A driver functions to reproduce data of a logically defined optical record file 421 via the interface 14 in the CD ROM drive 1a. The A driver does not operate for recording. Specifically, an optical reproducing portion 7 reads out exclusive playback data from an optical recording layer 4 in the optical disk, and the readout data is transmitted to the personal computer 408 via the A driver. The B driver functions to record and reproduce data into and from a logically defined magnetic record file 422. Specifically, a magnetic recording and reproducing portion 9 records and reproduces data into and from the magnetic recording layer 3 of the optical disk 2. The magnetic recording and reproducing portion 9 transmits and receives data to and from the personal computer 408 via the B driver 418b in the device driver 417.

In this embodiment, the two drivers 418a and 418b are defined with respect to the single drive 1a for a CD ROM having a RAM. According to this design, provided that the OS 415 executes multiple tasks, the recording and reproduction of the magnetic file 422 can be executed while the personal computer 408 reproduces the optical record file 421. Thus, a process of inputting and outputting the files can be performed at a higher speed than the speed in the case where only a single drive 418 is present. This advantage is remarkable when a virtual file is used.

Methods of executing the above-mentioned simultaneous processing will be described. A first method is designed as follows. FIG. 152 shows an optical address table 433 and a magnetic data table 434 of a CD ROM 2a having a RAM. In the case of a CD ROM, a write inhibiting flag is active for all the data in the optical address table 440. As long as special designation is absent, all the data in the magnetic address table 441 can be rewritten. A CD ROM drive 1a previously transfers data which is high in use frequency, to a drive memory 34a upon the insertion of the CD ROM 2a. Accordingly, the addresses of necessary data in the magnetic address table 441 are arranged according to the order of the use frequencies thereof as magnetic data having a physical address of, for example, "00". When the disk is inserted into the device, the magnetic data at the address "00" is read out and is transferred to the drive memory 34a in an arrangement according to the order of necessity. The drive memory 34a includes an IC memory. This design makes it sufficient that, during the recording and reproduction of magnetic data into and from the CD ROM, the recording and reproduction are executed only by accessing the data in the IC memory 34a. Thus, in the case where the simultaneous processing is executed by time-division processing in a CPU of a system controller 10, data reading and writing from and into the magnetic file 422 in the drive memory 34a can be performed while an optical reproducing section 7 reproduces optical data. Since it is sufficient that the recording and reproduction is executed only once on the magnetic recording layer 3 of the CD ROM 2a, the recording surface thereof is less injured. Even when a power supply to the CD ROM drive 1a is turned off, the contents of the drive memory 34a is backed up by a memory backup portion 433. Only when the CD ROM 2a is ejected from the device, changed magnetic record data in the drive memory 34a is selected and is recorded into the magnetic recording layer 3 regardless of whether the power supply is on or off. Thus, recording into the magnetic recording layer 3 is done only once during the interval between the insertion of the disk to the ejection of the disk. Therefore, a long life of the disk is enabled. The files are processed simultaneously or in parallel in this way, so that a higher data transfer speed is attained. The data in the drive memory 34a is backed up by the memory backup portion 433 even when the power supply to the CD ROM drive 1a is turned off. Thus, in the case where the power supply is turned on again, it is unnecessary to read out the magnetic data from the CD ROM as long as the CD ROM has not been replaced.

A data compressing/expanding portion 435 of FIG. 1 may be provided in the system controller 10 of the CD ROM drive 1a. This design increases the substantive capacity of the magnetic file 422.

Next, a description will be given of the case where the CD ROM drive of this invention is handled as a single drive. The operation in this case is similar to that in the case of two drives except for the following points.

As shown in FIG. 153, a CD ROM having a RAM according to this invention can be handled as one drive such as an A drive 418 in an input/output control system 416 of a personal computer 408. In this case, even a single-task OS can read and write data from and into a drive 1a for the CD ROM having the RAM. According to a file design, as shown in FIGS. 154(a) and 154(b), successive addresses are assigned to an optical file 421 and a magnetic file 422. In addition, an optical data table 440 and a magnetic data table 441 are handled as a single file. For example, as shown in the drawing, addresses up to a logic address "01251" are assigned to data of the CD ROM, and active write inhibiting flags are applied to all of them. Addresses starting from the logic address "01252" are assigned to magnetic data, and active write enabling flags are applied thereto.

The personal computer is enabled to handle the CD ROM having the RAM as a single memory disk. The optical data can be reproduced. The magnetic data can be recorded and reproduced. The address of magnetic data which is high in use frequency is recorded as the logic address "01252". Thus, by transferring the data in the magnetic recording layer 3, which corresponds to this address, to the magnetic file 422 of the drive memory 34a via the magnetic recording and reproducing section 9 and the data compressing/expanding section 435 after the insertion of the CD ROM 2a into the device as shown in the drawing, it is hardly necessary to physically read out the data from the magnetic recording layer 3 in a later period. The recording and reproduction of the magnetic data are virtually performed by rewriting the data in the drive memory 34a composed of the IC memory. The amount of the magnetic data is equal to a small value, for example, 32 KB, so that all the magnetic data can be stored in a small-capacity IC memory. This design enables a longer life of the disk and higher speeds of access, and data inputting and outputting processes. As previously described, the magnetic data is physically recorded only when the disk is ejected from the device. The one-drive system can be simple in structure.

A method of effectively executing the reproduction of data from the magnetic recording layer 3 and the reproduction of data from the optical recording layer 4. To prevent a reduction in data transmission rate of a CD ROM, it is desirable that the reproduction on the magnetic recording layer is done while the reproduction on the optical recording layer is being executed. In addition, it is important to shorten a start-up time upon the insertion of a CD ROM into a drive. A file arrangement according to this embodiment is designed as follows. As shown in FIGS. 154(a) and 154(b), a CD ROM 2a having a magnetic recording layer has an optical file 421 and a small-capacity magnetic file 422 provided with physical and optical addresses and magnetic-addresses other than an optical address table 440 respectively. As shown in FIG. 155, magnetic drives 67a, 67b, 67c, 67d, 67e, and 67f are located at back sides of the optical addresses A, B, C, D, E, and F, which correspond to the magnetic addresses a, b, c, d, e, and f respectively. This correspondence relation is recorded in a magnetic TOC area at a magnetic address of 00 together with frequency management data. The system controller 10 of FIG. 153 has a 1-address link table 443 which informs the drive memory 34a of the physical positions of the optical address and the magnetic address. As shown in FIG. 154(b), the contents thereof have two address link recorded information.

A specific method of simultaneously performing the reproduction of the magnetic data and the reproduction of the optical data will now be explained. In the case where a CD ROM is inserted into the drive to start up only a necessary program the reproduction of only necessary optical data is executed. It is good that only magnetic data necessary for starting the program is recorded in the magnetic track on the back side of the optical track storing the necessarily reproduced data. The necessary magnetic data is, for example, personal point data and personal progress data related to a game software.

The operation according to this method will now be described with reference to FIG. 156. At a step 444a, an initial value "m=0" is set. At a step 444b, an incrementing process is done by referring to a statement "m=m+1". At a step 444c, a check is made as to whether the number m is equal to a final value. If it is yes, a jump to a step 444m is done. If it is no, an advance to a step 444d is done so that optical data in an m-th optical address A(m) is reproduced. Then, at a step 444e, an entrance into a subroutine is done which serves to find an optical address, among optical addresses in the optical track corresponding to the magnetic track, which is close to the optical address A(m). In the subroutine, at a step 444f, setting "n=0" is done. At a step 444g, an incrementing process is executed by referring to a -statement "n=n+1". At a step 444w a check is made as to whether the number n is equal to a final value. If it is yes, a jump to the step 444m is done. If it is yes, an optical address M(n) at the back side of the n-th magnetic address is read out from the address link table 443 at a step 444h. At a step 444i, a checking process of, for example, "M(n)+10" is done to check whether the optical address is close thereto. If it is no, a return to the step 444g is done to check a next optical address. If it is yes, the magnetic head is lowered onto the magnetic recording layer 3 at a step 444j so that the data in the magnetic address n is reproduced and the optical traverse is fixed. At a step 444k, a check-is made as to whether the reproduction of the magnetic data has been completed. If it is no, the step 444j is executed again. If it is yes, a return to the step 444b is done so that the number m is incremented by one. The above-mentioned processes are repeated. Here, if the number m reaches an end value (a completed value), a jump to a step 444m is done to check whether the reproduction on the magnetic track containing the data necessary for starting the program has been completed in conjunction with a step 444n. If it has been completed, a jump to a step 444v is done. If it has not yet been completed, the entrance into a subroutine 444p for the reproduction on n0 magnetic tracks is performed to reproduce the remaining magnetic data. In this subroutine, setting "n=0" is done at a step 444q, and setting "n=n+1" is done at a step 444r. At a step 444s, a check is made as to whether the number n reaches a completed value. If it is yes, a jump to the step 444v is done. If it is no, the optical address corresponding to the n-th magnetic address is accessed. The magnetic data is reproduced at a step 444u, and a return to the step 444r is done to execute the setting "n=n+1". As long as the completion has not yet been reached, the similar processes are repeated. If the completion has been attained, a jump to the step 444v is done so that the work of reproducing the data for starting the program is completed.

According to this design, the magnetic data necessary for starting the program is recorded on the magnetic track at the back side of the optical track of the optical data. Thereby, there is an advantage such that a time for starting the program can be shorted. In this case, as shown in FIGS. 154(a) and 154(b), the selection of the magnetic tracks on the back sides of the optical tracks means that the magnetic tracks are not always arranged at equal intervals. The use of the variable pitch magnetic tracks of this invention realizes the shortening of the time for starting the program.

As shown in FIG. 154(a) and 154(b), the optical addresses of the optical tracks at the back sides of the magnetic tracks 01, 02, . . . into the magnetic TOC area, and magnetic tracks at a free pitch can be realized. The magnetic tracks are arranged according to the use frequency, and thereby frequency management data can be omitted and the substantive capacity can be larger.

DESCRIPTION OF THE TWENTIETH PREFERRED EMBODIMENT

A twentieth embodiment of this invention relates to a method of correcting bugs in a program in a CD ROM software by using a CD ROM 1a. As shown in FIG. 157(b), a bug correcting program 455 is recorded in an optical file 421 in the CD ROM 1a having a capacity of 540 MB. A program such as an OS is also stored in the remaining part thereof as a ROM data. A magnetic file 422 has a capacity of about 32

KB, which contains only bug correcting data. As shown in FIG. 157(b), correction data, correction contents, and optical addresses of optical ROM data to be corrected are contained therein. As shown in FIG. 157(c), only a given file such as an OS which has bugs is transferred to a memory 34, and correction-resultant data 448 is generated in response to the bug correcting program 447 and the bug correcting data 446.

An operation sequence will now be described with reference to FIG. 157(a). When the given file having the bugs is read out at a step 445a, the whole of the given file is transferred to the memory 34. At a step 445b, setting "N=0" is done. At a step 445c, the number N is incremented. At a step 445d, N-th bug correcting data in the given file is read out. At a step 445e, a check is made as to whether the correction is of the type without changing the address. If it is yes, the data is corrected at a step 445f. If it is no, the line is deleted at a step 445h. At a step 445j, the logic address of the optical file is changed. Then, an advance to a step 445k is done. At the step 445k, a check is made as to whether a line is added. If it is no, an advance to a step 445p is done. If it is yes, the addition of the line is executed at steps 445m and 445n so that the logic address of the optical file is changed. Then, an advance to a step 445p is done. At the step 445p, a check is made as to whether other processing is present. If it is no, an advance to a step 445r is done. If it is yes, the other processing is executed at a step 445q. At the step 445r, a check is made as to whether the number N reaches M, that is, whether the correction has been completed. At a step 445s, the correction is completed. The given file which has been corrected is outputted.

In this embodiment, the correcting program is previously recorded into the optical ROM portion, and the correcting data is recorded into the magnetic file upon the shipment of the recording medium (the optical disk). This design is advantageous in that the correction of bugs in the OS or others can be executed after the manufacture of the optical disk. The correcting program is recorded into the optical ROM portion while only the correcting data is recorded into the magnetic file 422. This design enables the recording of a relatively large amount of the correcting data.

DESCRIPTION OF THE TWENTY-FIRST PREFERRED EMBODIMENT

A twenty-first embodiment of this invention relates to a method of correcting data bugs in a CD ROM in real time during the readout of a file such as a dictionary. As shown in FIG. 158(b), an optical ROM data correcting table 446 is recorded in a magnetic file 422, and correction-resultant data corresponding to an optical address is recorded therein. As shown in FIG. 158(c), data of an optical file 421 is corrected in real time in response to a correcting program in the optical file 421 and the correcting data in the magnetic file 422. The correction-resultant data is outputted as data 448.

An operation sequence will now be described with reference to FIG. 158(a). With respect to the file data correcting program 447, a command of reading out given optical data is received at a step 447a. At a step 447b, a number N is set to a starting number of an optical address of data to be read out. At a step 447c, the number N is incremented by one. At a step 447d, data at the optical address N is read out. At a step 447e, a check is made as to whether the optical address is kl-kM of the correcting table 446. If it is no, an advance to a step 447g is done. If it is yes, the data at the optical address N is corrected in response to the correcting table 447f. Then, at the step 447g, a check is made as to all necessary optical data is read out. If it is no, a return to the step 447c is done. If it is yes, an advance to a step 447h is done to output the correction-resultant optical data. Since the data is corrected and outputted in unit of optical address, this design is advantageous in that the data can be outputted in real time. In the case of a dictionary, the magnetic recording layer 3 can be used for recording data having a high use frequency and marking important data.

DESCRIPTION OF THE TWENTY-SECOND PREFERRED EMBODIMENT

A twenty-second embodiment of this invention relates to a method of logically increasing the capacity of a magnetic file using a virtual memory in which a physical large-capacity file in a hard disk 425 is logically present in the magnetic file 422. The arrangement of this embodiment is similar to the arrangement of FIG. 153 except for design changes indicated hereinafter.

As shown in FIG. 159, a personal computer 408 corresponding to a machine ID=Ap, a CD ROM drive 1a, an HDD 425, corresponding to a disk ID=AH, a disk drive DD corresponding to a disk ID=BH, a replaceable optical disk 428 are physically connected via interfaces. A magnetic file 422 can be connected to a personal computer 408a corresponding to a machine ID=Bp via a LAN network such as TOPIP, a communication port 432, a network BIOS 436, a network OS 431, and an application program 412, and also can be connected to a hard disk 405a corresponding to a disk ID=CD which is directly coupled with the personal computer 408a. In this embodiment, virtual large-capacity disks in the magnetic file 422 can be set in the hard disk 425 of the personal computer 408, the replaceable disk 428, and a hard disk 425a, of another personal computer 403a respectively. The virtual disks are denoted by 450, 450a, and 450b respectively. The use of the virtual disk 450 virtually increases the capacity of the magnetic file 422 to, for example, 100 MB or 10 GB.

A specific data structure will be described with reference to FIG. 160. The CD ROM 1a has the physically-existing optical file 421, the physically-existing magnetic file 422, and the logically-defined virtual file 450. Actual data in the virtual file 450 is stored in the HDD 425, the replaceable disk 428, or the physical file 451 in the HDD 425a. The magnetic file portion 422 of the CD ROM 1a contains a virtual directory entry 452 holding directory information such as characters and names of respective virtual files, and link information of the physical file 451 and the virtual file 450. The virtual directory entry has characteristic data related to 11 items that is, 1) an address 438 in the magnetic file, 2) a connection program including a command of connection with another personal computer via the LAN, 3) a machine ID number 454 which contains a machine ID number of a drive or a personal computer provided with the disk storing a physical file 451 containing the actual data, 4) the disk ID number 455 of the disk containing the physical file 451, 5) the name 456 of the virtual file, 6) an expanding item 457, 7) a characteristic 458 indicating the type of the virtual file, 8) a reservation region 459, 9) the time and the date of change of the file, 10) a start cluster number 461 indicating the cluster number at which the file is started, and 11) a file size 462. The fifth item to the eleventh item are equal to those in directory used by an OS such as MSDOS, and are usually composed of 32 bytes. All the items occupy 48 to 64 bytes.

As shown in the magnetic file table 422a, the magnetic file 422 contains a number of virtual directory entries 452 which is equal to the number of virtual files. FIG. 160 shows only the items 1, 2, 3, 4, 5, and 10.

With respect to the first virtual directory entry 452a. "AN" is in the connection program number corresponding to the item 2). It is known from the sub machine ID number 454 corresponding to the item 3) that the ID number of the machine containing the physical address 451 is Ap. Since the CD ROM 1a is connected to the CD ROM drive of the personal computer corresponding to the machine ID=Ap, it is unnecessary that the connection program AN for connecting the LAN is started to access the disk of another personal computer In the case where the main machine ID number 454 corresponds to another personal computer, the connection program AN is started and the connection to the personal computer of the LAN address corresponding to the main machine ID number 454 is provided so that the disk 425a thereof is accessed. Since substantially all the directory information is in the link data 452, it is unnecessary to access the physical file 451 when the personal computer looks at the directory. It is sufficient to access the physical file only when data is read and written from and into the virtual file 450.

In this way, access to the physical file is executed. As shown in the directory range table 465, the directory 463 of the physical file contains sub virtual directory entry 467 of a normal format. This data stores items 5)–11) among the items 1)–11) in the main virtual directory entry 452. Data of the main disk ID number at the original CD ROM side having the virtual file 450, data of the user ID number 470 corresponding to the setting of the virtual file 450, data of a secret number 471 for each file, and data of the main machine ID number 472 corresponding to the final main personal computer making the virtual file are added to a sub reservation region 468 corresponding to the item 8) in comparison with that in the virtual directory entry 452. The added data is used for checking and confirming the relation between the virtual file 450 and the physical file 451 from the physical file side. If the relation is decided to be in a low degree as a result of the check, a permission of writing an OS is not issued. To inhibit normal writing which does not relate to the virtual file 450, reproduction exclusive code as "01H" is stored in the characteristic 458 corresponding to the item 7) in the case of MSDOS. Thus, in general, the recording can not be executed. In the case where data is recorded into the virtual file 450, information such as the change information 460 and the CD ROM ID number 469 associated with the virtual file 450 is fed to the input/output control system of the personal computer. A check is made as to whether this data agrees with the sub file link data 467. If the result of the check is good, the IOSYS in the Cornell portion permits the writing into the physical file 451 so that the recording is executed. In the case where data is added to "File A", the directory 463 of the physical file 451 is examined and the contents of FAT 466 are additionally written as FAT 466a so that the additional data in the "File A" is physically recorded into the new data region. In this case, the file size is expanded, and the data of the file size 462 of each of the virtual directory entry and the directory entry 467 in the virtual file and the physical file is written into, for example, "5600 KB".

In this way, the data of the physical file 451 corresponding to the virtual file 450 can be recorded and reproduced. Since all the work related to the virtual file 450 is performed by the OS, the input/output OS, and the network OS, the user can handle the apparatus as if the physical file having a capacity of, for example, 5600 KB, is present in the magnetic recording layer 3 of the CD ROM 1a.

Physical recording and reproduction of data is enabled by linking the physical file 451 and the virtual file 450 in response to the data from the virtual directory entry 452. Although the capacity of the magnetic file 422 is equal to a small value, that is, 32 KB, in connection with the CD ROM 1a, 500to 1000 virtual directories 452 can be provided and thus virtual recording and reproduction on 500 to 1000 virtual files 450 can be performed.

A description will now be given of a method of reproducing a virtual file with reference to FIG. 161. It is now assumed that a command for calling a file "X" is received at a step 481a. At a next step 481b, a check is made as to whether only the contents of the directory information suffice. If it is yes, the virtual directory entry in the magnetic file 422 is read out. At a step 481d, only the directory contents such as the file name, the directory name, the file size, and the making date and time are indicated on the display of the personal computer as shown by the, characters 496a on the screen 495 of FIG. 164(a).

Here, screen indication is described. In FIG. 164(a), the indicated characters 495b and 495c represent that a virtual file 450 is logically present in the drive A, that is, the CD ROM 1a with the RAM. A 10-MB still picture file and a 1-GB moving picture file can be recorded into the virtual file 450. A 540-MB CD ROM file is also denoted by indicated characters 496d. There are also indicated characters 496edenoting "four files". In this embodiment, the personal computer is provided with a 20 GB hard disk. As shown in FIG. 160, the virtual disk setting capacity VMAX of the virtual disk with respect to one CD ROM 1a is recorded in the sub disk ID column of the main machine ID number 474. One of the physical file capacity of the sub disk ID number or the virtual disk setting capacity corresponds to the maximum recording capacity of the virtual disk. The remaining recording capacity is equal to the maximum-recording capacity minus the currently-used capacity in the virtual file. In the case shown by FIG. 164(a), a virtual file having a total capacity of 10 GB is set, and a capacity of 1020 MB is used in the virtual file. It is shown on the screen that a capacity of 8980 MB remains in the virtual file 450. The virtual file is denoted as the indicated characters 496g. The addition of the character "V" means a virtual file. Thus, the virtual file can be discriminated from other files by referring to the character "V".

As shown in FIG. 165 and FIG. 151, when the driver of the CD ROM 1a with the RAM is separated into an A drive and a B drive, the ROM portion of the CD ROM is indicated as indicated characters 496h while the RAM portion of the CD ROM is indicated as indicated characters 496i and 496j. Since the ROM and the RAM are separately indicated in this way, this design is advantageous in that easy handle by the operator is enabled. In the case of multiple-task processing, simultaneous reading and writing on the ROM portion and the RAM portion can be executed so that a high processing speed can be attained.

Returning to FIG. 161, if it is no at the step 481b, an advance to a step 481e is done so that a check is made as to whether the ID number of the currently-used machine agrees with the main machine ID number 454 in the virtual directory entry 452. If it is no, that is, if no physical file is present in the personal computer, a jump to a step 482a is done. If it is yes, that is, if a physical file 451 is present in the personal computer, an advance to a step 451f is done so that the drive number of the physical file is read out from the sub disk ID number 455. Then, a check is made as to whether the drive is active. If it is no, an indication of commanding "turn on a drive corresponding to the drive ID number" on the display screen is performed at a step 481g. At a step 481h, a check is made as to whether the drive has been activated. If it is no, stopping is done at a step 481i. If it is yes, an advance to a step 481j is done. At the step 481j, a check is made as to whether a disk corresponding to the sub disk ID number 455 is present. If it is no, an advance to a step 481k is done so that a check is done as to whether the disk is a replaceable recording medium such as an optical disk and a floppy disk by referring to the replaceable disk identifier in the sub disk ID number. If it is no, an indication "error" is given on the display screen at a step 481n. Then, stopping is done. If it is yes, an indication "insert the disk" of the sub disk number ID 455 is given on the display screen at a step 481m. Then, a return to the step 481j is done. If it is yes at the step 481j, an advance to a step 481q is done so that the corresponding file name 456 is searched for by referring the directory region 465 of the disk corresponding the sub disk ID number. If it is decided to be absent at a step 481r, an error indication is made at a step 481p. If it is decided to be present at the step 481r, an advance to a step 481s is done and therefore collation of the information is executed to confirm that the physical file actually corresponds to the virtual file. Specifically, collation is made between the data in the virtual directory entry 452 and the directory entry 467. In addition, collation is made between the disk ID number of the CD ROM and the main disk ID number 469 of the CD ROM side in the directory entry 467. Furthermore, collation is made as to the change time and the file size. No check is given of the characteristic. At a step 481t, a check is made as to whether all the collated items are equal. If it is no, error indication is given at a step 481u. If it is yes, the readout of the physical data of the corresponding file "X" in the directory region 465 starts to be executed at a step 481v. A FAT start cluster number "YYY" is waited. At a step 481w, the cluster number continuous to the FAT "YYY" is read out. A step 481x reads out necessary data among the data of the cluster number of the data region. At a next step 481y, the readout of the file "X" is completed. Therefore, the virtual file 450 is provided with an arbitrary capacity within the capacity of the hard disk of the personal computer 408.

If the physical file corresponding to the virtual file is decided to be absent from the hard disk of the present personal computer at the step 481e, a jump to a step 482a is done so that the connection with the personal computer of the main ID number which contains the physical file is started. In this case, the connecting routine 482 is in the network OS. First, the LAN address of the main machine ID number is read out from the item of the main machine ID number in the virtual directory entry. At a step 482b, the number of the connecting program is read out. The given network connecting program is executed, and the previously-mentioned LAN address is inputted to try the connection. A step 482c checks the connection. If the connection fails, error indication is made at a step 482d. If the connection succeeds, a command of reading the file is transmitted to the sub personal computer 408a via the network such as the LAN.

From a step 482g, OS work by the sub personal computer 408a is started. Data is read out from the physical file in response to a command of reading the file "X" from the main personal computer. This work is same as the previously-mentioned subroutine 483 for reading out the physical file data. Accordingly, the subroutine 483a uses the, previously-mentioned subroutine. At a step 482h, a check is made as to whether the readout of the file has been completed. If it is yes, an advance to a step 482j is done so that the data of the file is transmitted to the main personal computer 408. Then, an advance to a step 482k is done. If it is no, an advance to a step 482i is done so that an error message is, transmitted to the main personal computer. Then, an advance to the step 482k is done.

The step 482k is in the connecting routine 482 by the network OS in the personal computer 480 which is executed via the LAN. The step 482k receives the data of the file or the error message from the sub personal computer 408a. At a step 482m, a check is made as to whether the error message is present. If it is yes, error indication is made at a step 482p. If it is no, an advance to a step 482y is done to complete the work of reading the file.

With reference to FIG. 162, a description will now be given of a routine 485a for rewriting the virtual file. If the user gives a command of rewriting the data in the given file "X" at a step 485a as shown by the indicated characters 496 of FIG. 166(a), the virtual directory entry 452 of the given file "X" is read out at a step 485b. At a step 485c, a check is made as to whether a secret number is present in the file. If it is yes, indication "password?" on the display screen is made as the indicated characters 496p of FIG. 166(a) at a step 486d. The user inputs "123456" via the keyboard as denoted by the characters 496q. A check is made as to whether this number agrees with the secret number. If it is no, error indication on the display screen is made at a step 485e. If it is yes, an advance to a step 485g is done so that a check is made as to whether the physical file 451 is present in the personal computer. A check is made as to whether the current machine ID number agrees with the main machine ID number. If it is yes, an advance to a step 485 is done. If it is no, an advance to a step 486a is done which is in a routine 488 for the connection with another personal computer via the network. The step 485h in a subroutine 487 for rewriting the physical file data extracts the drive name of the sub machine ID number from the virtual directory entry 452, and a check is made as to whether the drive having the drive name is present in the personal computer. If it is no, characters 496r representing "turn on the drive power supply" are indicated on the display screen at a step 485i as shown in FIG. 166(b). At the step 485i, a check is made as to whether the drive is present. If it is no, an advance to a step 485j is done so that characters 456s representing "an error" is indicated on the display screen. If it, is yes, an advance to the step 485j is done. The step 485k checks whether the disk having the ID number same as the sub disk ID number 455 in the driver is present. If it is no, a jump to a step 485m is done so that the replaceable recording medium characteristic is checked. If it is yes, indication "insert the replaceable medium disk xx" is made on the display screen at a step 485n as shown in FIG. 166(d). Then, a return to the step 485k is done. If it is no, a jump to the step 485j is done to execute the indication of "error".

If it is yes at the step 485k, the directory region 465 in the disk having the sub disk ID number is read out and then the corresponding file name 456 is searched for and checked. If it is no, a jump to the step 485j is done to execute the indication of "error". If it is yes, an advance to a step 485r is done so that a collation or check is made as to whether the physical file is the actual physical file in the virtual file. Specifically, a check is made as to whether the contents of the virtual directory entry 452 is equal to the data in the directory entry 467 except the characteristic data. In addition, a check is made as to whether the disk ID number of the client-side CD ROM is equal to the main disk ID number 469 of the CD ROM in the server side disk entry.

At a step 485s, a check is done. If it is no, a jump to the step 485j is done to execute the indication of "error". If it is yes, an advance to a step 485t is done so that the system such as the OS temporarily erases the write inhibiting flag such as the characteristic data "01H" or "02H" in the directory entry of the file "X". In this case, the recording is enabled. This file can not be seen from files other than the virtual file of the CD ROM because of the presence of "invisible code", and can not be corrected also.

In this way, the virtual file can be seen from and corrected by only the corresponding CD ROM so that the virtual file is protected. At a step 485u, a check is made as to whether the disk having the physical file has a free capacity. If it is no, the error indication is executed by the step 485j. If it is yes, an advance to a step 485v is done so that the data in the corresponding file of the directory is read out and the start cluster number is obtained. At a step 485w, the cluster number which follows the start cluster number is obtained from the FAT region 466. With respect to the data region 473, at a step 485x, the data in the data region of the cluster number is rewritten. In the case where the amount of the new data is greater than the amount of the old data, the data is also recorded in the new cluster. In this way, the data is actually recorded into the physical file 451. At a step 485y, a check is made as to whether the completion has been reached. If it is no, a return to the step 485x is done. If it is yes, an advance to a step 485z is done so that the FAT and the directory of the physical file 451 are rewritten. At this time, the data "02H" corresponding to "invisible" is recorded again into the characteristic of the directory entry 467. Thus, as shown in FIGS. 167(a) and 167(b), the substance of the physical file is made invisible to the user. Accordingly, it is generally difficult to execute rewriting other than rewriting of the virtual file 450 in the CD ROM 1a by the OS. This design is advantageous in that the data can be prevented from being improperly rewritten. In the case where the previously-mentioned secret number is set for each virtual file, the data is protected further.

An advance to a step 486n is done, so that the data in the directory entry 467 except the characteristic data is transferred to the virtual directory entry 452 of the magnetic file. As a result, the contents of the two are the same in the items including the date and the time. Thus, during a later period, writing into the physical file 451 is permitted by the collating work upon rewriting. The operation work ends at a step 486p.

If it is no at the step 485g, a jump to a step 486a is done so that the routine 488 for the connection with the LAN is started. First, the LAN address of the main machine ID number corresponding to the presence of the physical file is read out from the virtual directory entry 452. At a step 486b, a plurality of the numbers of programs are read out which are designed to provide the connection via the network such as the LAN from the LAN address "B" of the main personal computer 408 currently provided with the CD ROM 1a to the sub personal computer 408a of the LAN address "A" of the main machine ID number as shown in FIG. 168. In addition, the LAN addresses are inputted, and the connecting programs are 'successively executed. At a step 486c, a check is made as to the connection. If the connection has been realized by one of the programs, an advance to a step 486ecorresponding to "yes" is done. If it is no, an advance to a step 486d is done so that error indication is performed. At the step 486e, new data and a command of rewriting the physical file 451 are, transmitted to the sub personal computer 408a.

Then, an advance to a step 486fis done. Here, the OS of the main personal computer is replaced with the work by the input/output control OS and the network OS of the sub personal computer 408a. The file rewriting command and the new data are received. At a next step, the subroutine 487 for rewriting the data in the physical file is executed. At a step 486g, a check is made as to whether the file data rewriting has succeeded. If it is yes, an advance to a step 486h is done so that the information of the completion of the rewriting and the newest data in the directory entry 467 of the physical file are transmitted to the main personal computer 408 via the network. Then, a jump to a step 486j is done which correspond to the work by-the network OS of the main personal computer 408. If it is no at the step 486g, a jump to a step 486i is done so that the error message is transmitted to the main personal computer 408 via the network. Then, a jump to the step 486j is done which corresponds to the work by the network OS of the main personal computer 408.

At the step 486j which corresponds to the work by the network OS of the main personal computer 408, the error message or the data of the directory entry 467 of the physical file 451 is received from the sub personal computer 408a. If the error message is decided to be absent by a step 486k, a step 486n rewrites the virtual directory entry 452 of the virtual file 450 of the magnetic file of the CD ROM in response to the data of the directory entry 467 which represents the items such as the date. At a step 486p, the rewriting work ends. If the error message is decided to be present at the step 486k, an advance to a step 486m is done so that "error" is indicated on the display screen.

As shown in FIG. 168, the virtual file 450 having a capacity of, for example, 10 GB can be logically realized in connection with the CD ROM 2a having the RAM although the magnetic recording layer 3 of the disk has only a capacity of 32 KB. The physical file may be defined in the HDD of the main personal computer or in the HDD of the sub personal computer 408a.

FIG. 220 shows an example where computers A and B are defined as the main machine 408 and the sub machine 408a respectively, and the hybrid recording medium 2 of this invention is inserted into the main machine 408. When the optical ROM portion is defined as an F drive and the magnetic recording layer is defined as a G drive with respect to the CD ROM, all the data in the F drive is actually present in the medium and corresponds to an actual ROM file 468 or an actual ROM having a capacity of 540–600 MB. The magnetic recording layer being the G drive has a capacity of 32 KB, and an actual RAM file 469 has a capacity of 32 KB. As previously described, a virtual RAM file 470 is logically provided by the OS or the device driver. The data in the virtual RAM file 470 is stored in a C drive being an HDD or an actual RAM file 471 in the HDD of the other personal computer 408a which can be accessed via a network 472. Only when data A, data B, data C, data D, date E, and data F in the virtual RAM file 470 are open or accessed, the OS reads out the data from the sub actual RAM file via a connection cable 473 in the actual RAM file 469 or the magnetic recording layer. Thus, the operation occurs as if the actual data is stored in the virtual RAM file 470. The connection cable 473 stores a directory name secret number, the name of a drive containing the actual RAM file 471, a connection protocol, a network address, and a TCP/IP address on a network of the computer 408a having the HDD storing the actual RAM file 471. The actual RAM file 471 stores the actual data in the virtual RAM file 470. As long as the network 472 remains effective via the connection cable 473, the OS can read out the data from the sub actual RAM file 471 which stores the actual data in the virtual RAM file 470. P As long as the network remains connected and effective, it appears from the user that the magnetic file 422 stores the data A, B, C, D, E, and F of the files A, B, C, D, E, and F when the hybrid recording medium 2 of this invention is inserted into any computer. In fact, the magnetic recording layer stores only the file directory entry information such as the file characteristic data such as the data of the making date and time, the capacities and the names of the files A, B, C, D, E, and F, and the directory names. In the case of MS-DOS, the directory entry data has 32 byes, and the hybrid recording medium of this invention can store about 1000 files or directories since the magnetic recording layer therein has a capacity of 32 KB. In this invention, the default value of the data capacity, of each virtual file is set equal to that of a conventional floppy disk (1.44 MB), and good compatibility with the conventional floppy disk can be attained. As previously described, the default value may be set to 10 MB or 100 MB.

This design can be applied to an IC card or an optical disk having a ROM and a RAM. FIG. 220, FIG. 224, and FIG. 225 show an IC card having a ROM and a RAM and also being provided with a virtual RAM file. Generally, a ROM in an IC card is cheaper than a RAM therein. According to an example of this invention, the capacity of the ROM in the IC card is set much greater than the capacity of the RAM therein to attain a low cost of the IC card. As previously described, when an apparatus for driving the IC card is connected to a network, the RAM capacity of the IC card can be virtually increased.

A description will now be given of a method of making a new virtual file with reference to FIG. 163. It is assumed that, as shown in FIG. 169(a), at a step 491a, the user inputs the user ID number or a command of saving a new data file having a name "X". The OS checks whether the magnetic file 422 has a free capacity. If it is no, stopping is executed at a step 491c. If it is yes, the sub disk ID number and the main machine ID number 474 of the default of the user ID number are read out at a step 491d. At a step 491e, screen indication is executed as shown in FIG. 169(a) to check whether the default is good. If it is no, the user is forced to input a changed default value at a step 491f and then a check is executed again. If it is yes, an advance to a step 491g is done so that a check is made as to whether the ID number of the main machine of the default which links with the virtual file is equal to the ID number of the machine currently provided with the CD ROM. If it is no, an advance to a step 492a is done which lies in a network connecting subroutine. If it is yes, an advance to a step 491h is done which lies in a new file registering subroutine 493. At the step 491h, a check is made as to whether a disk having the ID number of the default is present. If it is no, a step 491i checks whether the disk is of the replaceable type by referring to the data. If it is yes, "insert disk xx" is indicated as shown in FIG. 169(a). At a step 491k, a check is made as to whether the disk has a physical capacity for providing a physical file. If it is no, "error" is indicated at a step 491u. If it is yes, an advance to a next step 491m is done so that the data is stored into a free part of the data region 473 of the physical file from the cluster start number xx. At a step 491n, a check is made as to whether the data storing has been completed. If it is no, the error indication is executed by the step 491u. If it is yes, the directory region 465 and the FAT region 466 of the physical file are rewritten in response to the record file. At a step 491q, the OS stores invisible characteristic data such as "02H" into the characteristic 458 of the directory entry 467 of the physical file (see FIG. 160). Write inhibiting data "01H" may be stored. The input control OS handles only the virtual file in a special way, and the recording and reproduction on the file are performed while the file links with the virtual file. According to other operation sequences, neither the recording nor the reproduction can be performed. At a step 491r, a secret number and the main machine ID number are stored into the directory entry 467. At a next step 491s, unique information such as the file name and the registration date and time which is equal in contents with the directory entry 467 of the physical file 451 is stored into the virtual directory entry 452 of the recording medium 2. Thereby, the collation with the physical file 451 can be reliably executed when the virtual file is rewritten during a later period. In addition, a physical file 451 in another personal computer on the network can be prevented from being erroneously rewritten. The new file making routine ends at a step 491t.

If it is no at the step 491g in the connecting subroutine 488, an advance to a step 492a is done so that the LAN address of the main machine is read out from the virtual directory entry 452, and the connection with the main personal computer is executed via thee network. In addition, the physical file 451 for the virtual file 450 in the disk of the sub personal computer 408 is registered by using the new file registering subroutine 493, and the result is transmitted to the main personal computer. The flow portion from the step 492a to a step 492j is equal to that in FIG. 162, and a description thereof will be omitted. At a step 492i, the new registration is checked. Then, an advance to a step 491s is done so that the data in the directory entry 467 of the physical file 451 is stored into the virtual directory entry 452 of the recording medium 2. At a step 491t, the new file registration is completed.

With reference to FIG. 271, a description will be given of display operation which occurs in the case of window display such as in a Mac OS or a Windows OS. The display operation is similar to that in a DOS OS of FIGS. 164(a), 164(b), 164(c), and 164(d), FIG. 165, FIG. 166, and FIG. 167 except for the following points.

Regarding FIG. 271, in the case where a CD-ROM 2 provided with a RAM according to this invention is inserted, a set of a CD-ROM icon 570 and a CD-ROM-RAM icon 571 is indicated. The composite icon differs in shape from an icon for a CD-ROM, and can be distinguished therefrom. Here, a window 567a for indicating directories 568a, 568b, and 568c in the CD ROM is opened, and the directories 568a, 568b, and 568c are indicated. When the CD-ROM-RAM icon 571 is subjected to double click, actually recorded data is read out from a magnetic recording portion of the CD-ROM 2 which is a RAM portion. Data of directories 568d, 568e, and 568f is transferred into in a window 567b from a master file for the RAM portion of the medium such as a magnetic recording layer before being indicated on the display screen. In this invention, as previously described, a small-capacity master file for a virtual file is recorded on the magnetic record portion while a large-capacity slave file is made invisible and is recorded on an HDD. At that time, the window 567b indicates a substantial capacity 576 being 32 KB in the above-mentioned RAM portion, and also a virtual capacity 577 being "7.6 GB" representative of an actual file capacity physically assigned as a slave file for the above-mentioned master file in the HDD 571.

In FIG. 271, the substantial data in the RAM portion is read out. Thus, only the data in the physical file which is described with reference to FIG. 160, that is, only the data recorded into the magnetic recording portion of the CD-ROM 2, is read out, while the data in the virtual file 450, that is, the physical file 451 in the HDD, is not read out at this stage. Accordingly, regarding the CD-ROM 2 of this invention which has a RAM portion of 32 KB, the RAM capacity looks as being expanded to 7.6 GB for the user. In this case, as shown in FIG. 271, the icon 570 for the ROM portion of the CD-ROM 2 and the icon 571 for the RAM portion can be separately subjected to click, and there is an advantage such that opening can be independently done in connection with either the icon 570 or the icon 571.

With reference to FIG. 272, when the icon 570 for the CD-ROM 2 is subjected to double click, composite windows 567a and 567b are simultaneously opened which correspond to windows for the ROM portion and the RAM portion being integral with each other. The window 567a for the ROM portion indicates the substantial capacity of the substantial file actually present in the medium 2 which is 640 KB of the ROM portion of the CD-ROM 2. On the other hand, the window 567b for the RAM portion indicates the virtual capacity 577a of the slave file of the virtual file not actually present in the medium 2 which is 7.6 GB, and also the substantial file 576a of the master file present in the medium 2 which is 32 KB. In FIG. 272, the two windows are made integral, and the files and the directories in the ROM and the RAM of the medium 2 are indicated on a set of windows when the icon 570 is subjected to double click once. Thus, there is an advantage such that the number of times of key inputting by the operator can be reduced. When a folder 568a is opened, a window 567c of the folder 568a is opened as shown by the arrow 51a so that files 569a recorded in the CD-ROM medium are indicated.

On the other hand, a folder 568c indicated in the window 567b of the RAM portion can be displayed by reading out the substantial master file in the medium 2. When the related icon is subjected to double click, a window 576d of the folder A is opened as shown by the arrow 51b so that icons for files 569b, 569c, and 569d are indicated. The file information and the directory information which appear up to this process are stored in the RAM portion of the small capacity such as the magnetic recording portion of the medium 2. Thus, it is unnecessary to read out a file 573 and a folder 574, that is, a slave file, which is an actual physical file stored in a hard disk 572a with respect to the virtual file. The operator handles the apparatus as if the capacity of the RAM portion of the CD-ROM 2 is 7.6 GB or 520 MB. In this case, the file 573 and the folder 574 of the substantial file for the virtual file are not indicated on the display as being an invisible file. Thus, in the case where a CD-ROM 2 is not inserted which is linked with a virtual file, the operator is prevented from doing a wrong process such as rewriting or erasing a substantial file. To this point, only the substantial master file in the medium 2 is opened.

With reference to FIG. 273, a description will be given of a process of opening a program in the file 569 being the virtual file shown in FIG. 272. When the user opens the file 569, it looks as if a large-capacity file "file x" of 520 MB is actually present in the file 569 and is open as shown by the dot line arrow 51c. In fact, the actual slave file is present in the HDD 571, and the invisible file 573b in the invisible folder 574c in the invisible folder 574a which is invisible on the display screen is opened by the previously-mentioned OS as shown by the arrow 51d. A large-capacity file for DTP is opened together with the program stored in the ROM portion. For example, as an indication 575, operation is done as if the capacity of the RAM portion is 520 MB.

In the case where "visualize the slave file" is selected from a pull down menu, an indication is given of a window 567f for visualizing the slave file. When a correct password is inputted into a password input portion 578a of the window 567f, an invisible file 573b is visualized which corresponds to the password as shown by the arrow 51g. In the case where "erase virtual file" is selected from the pull down menu, an indication is given of a file erasing window 567f. When the file name is inputted into a file name input portion 579 of the window 567f and a password corresponding to the file is inputted into the password input portion 578b, the physical file of the invisible file 573 is erased from the HDD 571. In this way, it is possible to erase an unnecessary file among the slave files of virtual master files in the HDD 571. Since the slave files in the linked HDD can be arranged, the HDD can be efficiently used. In addition, since a slave file is protected by a password, the slave file is prevented from being erased by other operators. In this way, slave files are protected which correspond to master files in the RAM portion of the CD-ROM.

Substantial slave files for virtual master files can be set in an HDD 571a of another computer B via a network shown in FIG. 273. Also in this case, indication and erasion can be inhibited by using passwords.

With reference to FIG. 274, a description will be given of a way of indicating a virtual file in a window according to a Mac OS or a Windows OS. When a CD-ROM is inserted at a step 566a, an icon for a CD-ROM/RAM 2 is indicated at a step 566b. In the case where a folder or a directory being first information is opened at a step 566c, a window 567a is opened which shows the directory of the first information in the ROM portion of the CD-ROM/RAM at a step 566d as shown in FIG. 271. In the case where the directory of second information is opened at a step 566e, the directory 568d of the RAM portion of the CD-ROM/RAM is opened at a step 566f. At a step 566g, an indication is given of a virtual capacity 576 of a virtual file "file x" recorded in a master file of the ROM portion, a substantial capacity 577, a home machine name of a personal computer containing a substantial slave file, a home address, a drive name, and a directory name in a file property indication window 567. At this time, it is good to open only the master file of the virtual file. It is unnecessary to open a slave file in HDD's 571 and 571a in FIG. 273. In the case where a slave file in a virtual file being second information is opened at a step 566k, advance to a step 566i is done. When a home machine ID number and an ID number of the currently-operated computer A are equal to each other, advance to a step 566j is done. In this case, since the home HDD is directly connected to the computer A, connection with a network is unnecessary. When the numbers are not equal at the step 566i, advance to a step 566p is done. Here, a home machine storing a slave file is a computer B other than the computer A connected with the CD-ROM as shown in FIG. 273. Thus, it is necessary to execute connection with the network. Accordingly, at the step 566p, a check is made as to whether or not connection with the network is present. If it is no, advance to a step 566m is done. At the step 566m, "network is not connected" is indicated as shown in a network condition indicating window 507h in the display portion 16 of FIG. 273. Then, return to the step 566p is done. If it is yes, advance to a step 566m is done and connection with the home machine via the network is executed. Then, advance to a step 566j is done. At the step 566j, since the CD-ROM medium 2 is linked with the substantial slave file of the virtual file, an invisible file 573 is opened which is of the physically-present slave file of the home directory of the HDD 571 being a home drive of the home machine corresponding to the virtual file of the CD-ROM. At a step 566k, as shown in FIG. 273, "file x" having a capacity of 520 MB is opened. As a result, a program such as a DTP program is started which is stored in the CD-ROM.

The OS of this invention executes the previously-indicated processes. Thus, in the case where a medium being a CD-ROM 2 is used which has a large-capacity ROM portion storing a software and a small-capacity RAM portion, the capacity of the RAM portion can be virtually expanded to a large capacity of several GB. In this case, a physical file being a slave file is stored in a memory actually present in the home HDD 571 of the home machine connected via the network or the machine provided with the CD-ROM/RAM.

It is good to record a small amount of information into the RAM portion of the medium. The small, amount of information corresponds to several tens of bytes, and contains information for connection via the network such as an address of the home machine with the home HDD and also information of the date, the capacity, and the directory of the actually-present substantial file. Thus, it is good that the physical capacity of the RAM portion of the CD-ROM/RAM is small. According to window indication as in FIGS. 271, 272, and 273, an actual file 573 for a virtual file is an invisible file which is not indicated in a window at all. Thus, the icon 571 for the RAM portion of the CD-ROM 2 can be seen by the operator. Accordingly, for the operator, the apparatus looks as if a file of several hundreds of MB or several GB is stored in the icon 571 for the RAM portion. There is an advantage such that the RAM of 32 KB can be handled as a large-capacity RAM of several GB. Since a physical file being a slave is protected by a password and is invisible, the physical file is prevented from being erased by other operators. In the case where a physical file corresponding to a virtual file is required to be indicated or erased without an original CD-ROM/RAM, the visualizing window 567f is used and a password is inputted so that the invisible file is made into a visible file.

According to this invention, when a virtual file is required to be newly set, a window 567 is indicated. A home machine name, a file name and a password are inputted into the window, and thereby the virtual file can be set. When a physical file is required to be erased, indication is done as in a window 567g. A file name and a password are inputted into the window, and thereby the physical file is erased without a CD-ROM/RAM 2 being a master. Even if a master CD-ROM/RAM 2 is lost, a physical file or a slave file for a virtual file can be erased. Accordingly, this invention can arrange slave files, that is, substantial files 573, of virtual files in the HDD 571.

As previously described, a CD-ROM/RAM is used in combination with an OS such as a Windows OS or a Mac OS which contains a CD-ROM driver software. In this case, by using a virtual file for a CD-ROM/RAM according to this invention, the capacity of the ROM portion of the CD-ROM can be virtually expanded. When both a low-cost CD-ROM/RAM medium 2 of this invention and a virtual file of this invention are used, there is provided an advantage comparable to or greater than the advantage of a prior art expensive optical disk of the partial ROM type.

It should be noted that a virtual file may be set in a RAM portion of a medium with a ROM such as an optical disk of the partial ROM type or an IC card with a ROM.

The recording medium 2 will now be described. In the case where the directory information is recorded into the magnetic recording layer, the virtual file is damaged if the information is damaged. Thus, in the case where this design is applied to a CD ROM, equal virtual directory entries are recorded into two or three physically separated places as shown in FIG. 171. To protect the directory information from a circumferential scratch on the disk, the recording into separate tracks 67x, 67y, and 67z is executed To protect the directory information from a radial scratch on the disk, the directory entries 452x, 452y, and 452z are located at different positions of angles θx, θy, and θz respectively.

According to this invention, the system provides a physical file and logically defines a large-capacity virtual file in the RAM portion of an optical disk 2 by using a capacity of an HDD as previously described. Thus, the optical disk having a small-capacity RAM can be handled as a ROM disk with a large-capacity RAM. Even in the case where the main personal computer 408 into which the optical disk 2 is inserted lacks the server side physical file 451 corresponding to the virtual file 450, the data is recorded and reproduced by automatically accessing the physical file 451a of the sub personal computer 408a via the network as shown in FIG. 168.

This design is advantageous in that the physical file corresponding to the virtual file can be accessed when the optical recording medium 2 of this invention is inserted into any personal computer. This design can be realized by an application program.

As previously described, the recording medium 2 has an optical recording surface. The back side of the recording medium 2 is provided with the magnetic recording layer 3. In the recording and reproducing apparatus which executes the RAM type recording, and reproduction such as the magneto-optical recording and reproduction, the magnetic head is used in common for the two purposes. Thus, without substantially increasing the number of parts and the cost, it is possible to magnetically record information of independent channels provided on the recording medium. In this case, the slider tracking mechanism for the magnetic head is originally provided so that an increase in the cost of the recording and reproducing apparatus hardly occurs. Thus, there is an advantage such that the magnetic recording and reproducing function which is independent of the optical recording can be added at essentially the same cost.

The recording medium containing the recorded information is applied to a music CD, an HD, a game CD ROM, and an MD ROM, and the back side thereof is provided with the magnetic recording track. This recording medium is subjected to the reproducing process by the ROM type recording and reproducing apparatus of FIG. 17. Thereby, there is provided an advantage such that the conditions which have been previously used can be retrieved upon the reproduction. As described with respect to the first embodiment, in the case where the recording is limited to only one track of the TOC area, information of several hundreds of bits can be recorded when the gap width is set to 200 μm. This capacity meets the requirements for use of a game IC ROM with a nonvolatile memory. In the case of limitation to the TOC, a device for accessing the magnetic track can be omitted so that the structure of the system can be simple.

In the recording and reproducing apparatus which is exclusive for the reproduction regarding the optical recorded information, it is necessary to provide the magnetic head and others at the opposite side of the optical head with respect to the recording medium The related parts can be common to the magnetic field modulating head for the magneto-optical recording, so that the cost of the apparatus can be lowered by mass production. The parts are originally very cheaper than optical recording parts and magnetic recording parts for a low density, and thus an increase in the cost is small. Since the optical head is mechanically linked with the magnetic head located at the opposite side thereof, it is unnecessary to add a related tracking mechanism. Thus, in this regard, an increase in the cost is small.

The time information or the address information is recorded on the optical recording layer at the surface of the recording medium of the RAM type or the ROM type. The tracking with respect to the optical head is executed in response to the time information or the address information. Thereby, the tracking control is done so that the magnetic head can move to an arbitrary position on the disk. Thus, there is an advantage such that it is unnecessary to use expensive parts such as a linear sensor and a linear actuator.

The protective layer on the back side of a conventional magneto-optic recording medium of the magnetic field modulation type is formed from binder and lubricant by spin coat. In this invention, it is sufficient that the magnetic material is added to the combination of the binder and the lubricant, and the spin coat is executed at the same step. Thus, the number of manufacture steps does not increase. A related increase in the cost is in a negligible order relative to the entire cost. Therefore, the new value being the magnetic recording function is added without significantly increasing the cost.

As previously described, in this invention, the magnetic channel can be added without significantly increasing the cost. In addition, the RAM function can be added to a conventional disk of the ROM type and a player exclusively for a ROM.

The high Hc magnetic sheet of this invention is attached to the label portion of a video tape cassette or an audio tape cassette. Upon the loading of the cassette, data is read out from the magnetic sheet by the magnetic head 8. The readout data is stored into the IC memory in the microcomputer. In the case where the data on the magnetic sheet is required to be updated only the contents of the IC memory are updated during the insertion of the cassette. When the cassette is ejected from the apparatus, only the updated data in the IC memory is recorded into the magnetic recording layer by the magnetic head fixed near the cassette insertion opening. Thereby, the index information such as the TOC and the address of the cassette tape can be recorded on the cassette separately from the tape. This design is advantageous in that the search for the information in the cassette tape can be quickly executed.

This invention can be applied to a video game machine connected to a display 44a and a key pad 450A as shown in FIG. 180. The reproduction can not be performed if an illegal copy identifying signal is not recorded on the magnetic recording layer 3. This design is advantageous in that a CD made by illegal copy can be excluded. Data such as environment setting data, the name of the user, the point, and the result at a mid part of the game is recorded into the magnetic recording layer 3. Thus, the game can be restarted from the conditions which occur at the end of the preceding play of the game. As shown in FIG. 180, the magnetic recording layer 3 is provided at the print surface side of the CD. As previously described, the magnetic recording layer 3 may be provided at the transparent substrate side. This design enables a small size of the cassette.

DESCRIPTION OF THE TWENTY-THIRD PREFERRED EMBODIMENT

FIG. 181 shows a recording and reproducing apparatus according to a twenty-third embodiment of this invention. As shown in FIGS. 182(a) and 182(b) and FIGS. 183(a)–183(e), a magnetic head is moved onto a CD only when an upper lid 389 is closed. In FIG. 182(a), the upper lid 389 is in an open state. When the upper lid assumes the open state, the magnetic head 8 is retracted to a position below a magnetic head protective portion 501 extending outside the CD 2. The retraction of the magnetic head permits the CD to be inserted into the apparatus.

The CD 2 is inserted into the apparatus, and the upper lid is moved to a closed state. During the movement of the upper lid to the closed state, the magnetic head 8 and its suspension move in a direction 51 to a place above the CD 2 according to the movement of the upper lid.

The operation sequence will now be described with reference to FIGS. 183(a), 183(b), 183(c), 183(d), and 183(e). In FIG. 183(a), when the upper lid 389 is closed in a direction 51a, lid rotation shafts 393 and 393a rotate so that a head retracting device 502 moves in a direction 51b and the magnetic head 8 connected thereto moves in a direction 51c. In this way, as shown in FIG. 183(b), the magnetic head 8, a slider 41, and a suspension 41a move to a place above the recording medium 2 such as the CD.

Upward and downward movement of the magnetic head 8 will now be described with reference to FIGS. 183(c), 183(d), and 183(e). As shown in FIG. 183(c), an optical head 6 executes the reproduction on an innermost track 65a of the TOC and others. As shown in FIGS. 184(a), 184(b), and 184(c), a medium identifier 504 is read out, and a check is made as to whether the medium has a magnetic track 67 by referring to the medium identifier 504. If the medium actually has a magnetic track 67, the optical head 6 is moved to a place inward of the innermost track as shown in FIG. 183(d). A head elevator 505 is forced by a head elevating link 503, bringing the magnetic head 8 into contact with an outermost magnetic track 67a and enabling the recording or reproduction of a magnetic record signal via the magnetic head 8.

As shown in FIG. 185(a), a servo signal region 505 is provided. During the manufacture of a recording medium, a high Hc portion is applied thereto as shown in FIG. 185(b). As shown in FIG. 185(c), the recording medium is formatted in a factory or others. A servo signal selector information, and a medium identification number are recorded on a sync signal region 507 medium by medium. This recording is executed by using a magnetic head capable of recording information into a magnetic region having an Hc of 2750–4000 Oe. Next, as shown in FIG. 185(d), a low Hc magnetic portion 402 is applied. The low Hc magnetic portion 402 is made of material having an Hc of 1600–1750 Oe. As shown in FIG. 185(e), a protective layer 50 is applied thereon.

The magnetic portion 402 and the protective layer 50 make it more difficult to rewrite the information in the high Hc magnetic portion. Thus, the medium identification number 506 recorded in the sync signal region 507 can be more reliably prevented from being rewritten. This design is advantageous in that the previously-mentioned illegal copy guard function is hardly removed.

The servo signal 505 and the address signal can not be erased by a conventional recording and reproducing apparatus. Thus, after the shipment of the medium from the factory, the data in the sync signal region can be maintained and protected so that stable data recording can be realized in response to the data in the sync signal region.

Rotation servo will be further described with reference to FIG. 183(d). In the presence of an optical recording portion at an innermost part of the CD 2, the rotational speed of a motor is made constant by CLV motor rotation control in response to the sync signal in the optical track. In this case, the magnetic recording and reproduction are enabled.

In the absence of an optical recording portion from an innermost part of the CD 2, the magnetic head 8 reproduces the servo signal 505 from the sync signal region 507 of FIG. 185(a). A rotation servo signal is thus reproduced by a rotation servo signal reproducing section 30c of FIG. 181. The rotation servo signal is transmitted to a motor drive circuit 26 so that the motor is controlled at a constant rotational speed. Therefore, data can be recorded and reproduced into and from desired sectors in data recording regions 508 and 508a of the magnetic track 67a of FIGS. 185(a), 185(b), 185(c), 185(d), and 185(e).

After the recording or reproduction has been completed, the optical head 6 moves toward a disk outer portion as shown in FIG. 183(e). Thereby, the head elevating link 503 returns to the original position, and the magnetic head 8 moves in a direction 51e and separates from the magnetic track 67a. The separation of the magnetic head 8 from the magnetic track 67a prevents a wear problem. In this way, the magnetic head 8 can be moved upward and downward by a traverse motor 23. This design is advantageous in that it is unnecessary to provide another head elevating actuator.

As shown in FIGS. 186(c), 186(d), 186(e), the optical head 6 is forced to an outermost portion of the disk by the traverse motor 23, and the head elevating link 503 is moved in the direction 51a. The magnetic head 8 is lowered along the direction 51b into contact with the magnetic track 67a so that the recording and reproduction of the magnetic signal are enabled. In the case where magnetic noise from the optical head 6 causes a problem, the operation of an optical head actuator 18 is suspended. When the operation is suspended or when the reproduction of a signal from the optical track can not be executed, a drive current to the optical head is cut off. In addition, the servo signal 505 in the magnetic track of FIG. 185(a) is reproduced via the rotation servo signal reproducing portion 30c of FIG. 181, and rotation servo control is executed in response to the reproduced servo signal. Thereby, it is possible to temporary separate the optical reproduction and the magnetic reproduction. Since the noise from the optical head is thus prevented from interfering with the magnetic reproduction, an error rate can be small in the magnetic reproduction.

The arrangement of this embodiment can be applied to the plural magnetic track type or the one magnetic track type. In the case of a one track system, access to the head is unnecessary so that the apparatus can be simple in structure. In the case of one track at a disk outermost part, the capacity is large. As shown in FIGS. 187(a), 187(b), 187(c), 187(d), and 187(e), the recording medium has sectors provided with the sync signal region 507, into which the magnetic servo signal 505 is stored in a factory or others. Upon the magnetic reproduction, the servo control responsive to the optical signal is replaced by the servo control responsive to the magnetic signal so that the drive current to the optical head 6 can be cut off. Thus, the noise from the optical head can be prevented from occurring.

A method of the rotation servo control responsive to the optical servo signal will now be described with reference to FIGS. 188(a)–188(f). FIG. 188(a) show conditions which occur at t=0. The optical head 6 is in a position corresponding to an outer track or a TOC track 65a. In FIG. 188(b), at t=t1, the optical head 6 reads out information from the TOC track 65a. A medium identifier 504 is found out from the subcode of the TOC, the subcode portion of an audio track, or the first track of a CD ROM as shown in FIG. 184(c), FIG. 184(b), and FIG. 184(a). At this time, since the head elevating link 503 moves from a position A to a position B according to the movement of the optical head 6, a switch 511 of a mechanical delay device 509 is moved to an on position. Until a delay time tD elapses, the head elevating link 503a remains inactive. In FIG. 184(c), at t=t2, the reproduction of the TOC data is completed. In the case where the delay time tD is set as tD>t2, the magnetic head 8 is not moved downward. In the absence of a medium identifier, that is, in an off state, tD>t3. In FIG. 188(d), at t=t3, the optical head 6 moves in the direction 51d, and the head elevating link 503 suspends pressing the switch 511 so that the head is not moved downward.

In the presence of a medium identifier, there is always a magnetic track 67a. In an on state, at t=t4 (t4>tD), the switch 511 remains pressed for the delay time tD or longer as shown in FIG. 188(e). Therefore, the output of the mechanical delay device 509 becomes effective, and the head elevating link 503a moves downward a support portion including the suspension of the magnetic head 8 in the direction 51e. As a result, the magnetic head 8 contacts the magnetic track 67a. At this time, since the optical head 6 executes the reproduction on the optical track 65a of the TOC or others, the optical servo signal is reproduced. The motor 17 is rotated at a constant rotational speed by the CLV control responsive to the optical servo signal. Accordingly, the magnetic signal is reproduced in synchronism with the sync signal of the optical reproduced signal. Since the rotation servo control can be executed simultaneously in response to the magnetic reproduction and the optical reproduced signal, it is unnecessary to provide another mechanism for rotation servo control. Thus, this design is advantageous in that the medium and the apparatus can be simple in structure. In this case, the rotation servo signal reproducing portion 30c may be omitted from the arrangement of FIG. 181.

When the reproduction or recording of the magnetic signal has been completed, the system controller 10 of FIG. 181 transmits a given signal to the traverse moving circuit 24a so that the optical head 6 is moved in a direction 51f and the switch 511 of the mechanical delay device 509 is released. At t=t5 after a delay time tDS shorter than the delay time tD elapses, the head elevating link 503a moves upward along a direction 51g as shown in FIG. 188(f) so that the magnetic head 8 is elevated out of contact with the magnetic track 67a. In this way, a simpler arrangement enables the upward and downward movement of the magnetic head, and the optical reproduction and the magnetic reproduction can be simultaneously executed.

As shown in FIGS. 185(a), 185(b), 185(c), 185(d), and 185(e), a plurality of magnetic tracks 67 may be used. In this case, as shown in FIG. 189(a), the track width TWH of the magnetic track 8 is set greater than the width TW of the magnetic track 67a by a quantity corresponding to an eccentricity amount (an off-center amount). This design is advantageous in that a single head can be used in common for recording and reproduction. When the widths are set as TWH>>TW, the recording into all the magnetic track 67a can be executed so that the previously-recorded portion will not be left at all. In the case where magnetic layers corresponding to a plurality of tracks are separately provided, a single head can be used as both a recording head and a reproducing head.

In the case of the multiple track system, setting of the track pitch Tp is important. The CD standards allow an error $\Delta r$ of ±0.2 mm between the position of an optical track 65 and the center of the CD circle in the radial direction. Under ideal conditions, as shown in FIG. 189(a), a magnetic track 67a is located at the back side of a given optical track 65a, and access to the magnetic track by referring to the optical address can be accurately executed. Under actual bad conditions, as shown in FIG. 189(b), the optical track 65a and the magnetic track 67a are offset by $+\Delta r$. Under opposite actual bad conditions, as shown in FIG. 189(c), the optical track 65a and the magnetic track 67a are offset by $-\Delta r$. To prevent the magnetic head 8 from accessing a magnetic track 67b neighboring the desired magnetic track, it is necessary to satisfy the following conditions.

$$r-\Delta r-TWH/2>r+\Delta r+TWH/2-Tp$$

Accordingly, the following relation is obtained.

$$Tp>2\Delta r+TWH$$

In the case of a CD, $\Delta r=0.2$ mm so that the track pitch Tp is determined by the following relation.

$$Tp>0.4\text{ mm}$$

Thus, it is necessary to set the track pitch Tp to 0.4 mm or greater.

As shown in FIG. 187(a) and FIG. 189(a), the separate magnetic recording layers are provided, and the magnetic servo signal is recorded thereinto by a single magnetic head. In this case, as shown in FIG. 190, the structure of the arrangement can be simple.

As shown in FIGS. 183(c), 183(d), and 183(e), the magnetic head 8 is moved upward and downward by using the traverse motor 23. This method of moving the magnetic head 8 can be applied to an arrangement where an optical head 6 and a magnetic head 8 are located on a common side of a recording medium as shown in FIGS. 191(a), 191(b), 191(c), 191(d), and 191(e). In the case where an identifier is detected under condition of a TOC track 67a in FIG. 191(c), the optical head 6 moves to a state of FIG. 191(d) along a direction 51a. Therefore, a head elevating link 503 moves in the same direction, raising the magnetic head along a direction 51b into contact with the magnetic track 67a provided on an outer area of the optical recording surface side of the medium. Then, the magnetic recording, or reproduction via the magnetic head 8 is performed. At this time, the optical head reproduces an optical servo signal from an optical track provided on an inner area of the medium, and rotation servo control for rotation at a constant speed is executed in response to the reproduced optical servo signal. The rotation servo control may be performed in response to the magnetic servo signal reproduced from the magnetic track 67a. After the magnetic recording or reproduction has been completed, the optical head 6 moves outward as shown in FIG. 191(e) and the magnetic head 8 moves downward out of contact with the medium.

FIGS. 192(c) and 192(d) show another design in which an optical head 6 moves along a direction 51a to a region outside an outer edge of a recording medium, and thereby a magnetic head 8 is raised along a direction 51b into contact with a magnetic track 67a. Operation according to this design is approximately similar to the operation of the design of FIGS. 186(a), 186(b), 186(c), 186(d), and 186(e).

As previously described, the magnetic recording track 67a is provided on an outer area of the optical recording surface side of the recording medium. Even in the case where the magnetic head 8 and the optical head 6 are located on the same side of the recording medium, the magnetic head 8 is moved upward and downward by the traverse motor 23 so that the number of parts can be reduced.

According to a CD player of FIG. 193(a), when an upper lid 389 is open but a CD is not inserted into the player, a magnetic head 8 and a suspension 41a are exposed. The magnetic head 8 and the suspension 41a tend to be damaged by a touch thereto.

To prevent such a problem, a magnetic head shutter 512 covers the magnetic head 8 when the upper lid 389 is open. As a CD 2 is inserted into the player and the upper lid 389 is closed, the magnetic head shutter 512 moves in a direction 51a to uncover the magnetic head 8. This process will be further described. With reference to FIG. 191(a), as the upper lid 389 is closed in a direction 51, a lid rotation shaft rotates in a direction 51d and the magnetic head shutter 512 moves in a direction 51e. Therefore, as shown in FIG. 191(b), a magnetic head window 513 is unblocked so that the magnetic head 8 is permitted to move upward and downward. In this regard, the arrangement of FIGS. 192(a) and 192(b) is similar. This design is advantageous in that the magnetic head 8 and the suspension 41a can be protected by the magnetic head shutter 512.

There is no problem in an arrangement where a magnetic head 8 and a traverse of an optical head 6 are adequately separate as shown in FIGS. 193(a) and 193(b). On the other hand, in the case where a magnetic head 8 is located in a range of movement of a traverse, the magnetic head 8 is provided with a spring 514 as shown in FIG. 194(e). In this case, only when an optical head 6 executes the reproduction on an outermost optical track 65a, the magnetic head 8 is forced in a direction 51a by the optical head 6 so that the magnetic head 8 is retracted outward. This design is advantageous in that an adequate access range of the optical head 6 can be maintained. This design is effective in the case of a recording medium such as a CD having a magnetic recording track 67a which is not provided on the optical recording surface side thereof FIGS. 222(a)–222(f) show arrangements in which a magnetic track 67 is provided on a ROM disk being an MD (mini disk) in a cartridge 42. As shown in FIG. 222(a), one side of the cartridge 42 for the MD ROM disk has a small radially-extending shutter window 302. Thus, a magnetic head 8 and an optical head 6 are located on a common straight line 514c. Therefore, A tracking range of the optical head 6 overlaps the position of the magnetic head 8. The presence of the magnetic head 8 makes it difficult for the optical head 6 to access an outermost optical track 65a.

According to this invention, as shown in FIG. 222(e), a magnetic head 8 is designed to be movable in a radial direction, and the magnetic head 8 is pressed against a stopper 514c by a spring 514 and is normally held in a given position. When an optical head 6 access an outermost optical track 65a as shown in FIG. 222(f), the magnetic head 8 (8a) is temporarily retracted or moved out of a range of movement of the optical head 6. In this way, the optical head 6 is permitted to access the outermost optical track 65a even if the magnetic head 8 is provided at a shutter window 302. As the optical head 6 moves back to an inner region, the magnetic head 8 is returned to the given position by the spring 514 and the stopper 514c. The magnetic track 67 has only one track provided on an outermost area of the optical reading side of the recording medium. The magnetic track 67 has a given thickness or height h. The thickness of the mangetic track 67 prevents contact with the optical recording portion which might adversely affect the optical recording portion. The position of the magnetic track 67 relative to the recording medium enables a large recording capacity, thereof. Positional interference between the magnetic head and the optical head can be removed by the previously-mentioned arrangement for retracting the magnetic head. This design is advantageous in that a ROM disk having a magnetic recording layer and a recording and reproducing apparatus therefor can be realized while the ROM disk can be compatible with a conventional MD disk.

As shown in FIG. 222(a), a ROM medium having a magnetic recording layer has an identification hole 313a for the magnetic recording layer. A cartridge of a recording medium without any magnetic recording layer does not have any identification hole 313a. When such a cartridge is inserted into an apparatus as shown in FIG. 222(c), a magnetic head motion inhibiting device 514b is pressed and activated to that a magnetic head 8 is forced into a state where upward and downward movement of the magnetic head 8 are inhibited. This design is advantageous in that the recording medium 2 can be prevented from being damaged by erroneous movement of the magnetic head 8 thereto. The magnetic head 8 remains movable in the direction of an optical head moving region, and an optical head 6 is permitted to access an outermost optical track 65a.

When the recording medium 2 with the magnetic recording layer is inserted into the apparatus as shown in FIG. 222(d), the identification hole 313a for the magnetic recording layer prevents downward movement of the magnetic head motion inhibiting device 514b so that upward and downward movement of the magnetic head 8 remain permitted. The magnetic head motion inhibiting device 514b can be formed by simple mechanical parts.

When the optical head 6 is in a position other than an innermost region, the magnetic head 8 is in an off state as shown in FIG. 222(c). With reference to FIG. 222(e), as the optical head 6 moves to the innermost region, a head elevation connecting device 514a moves in a direction 51b and the magnetic head 8 is raised in a direction 51c into contact with a magnetic track 67a. In this way, the magnetic recording or reproduction is enabled. With reference to FIG. 222(c), as the optical head 6 returns from the outermost region to a normal position, the magnetic head 8 is lowered out of contact with the magnetic track 67a. In the case of a CD or an MD, when the disk is inserted into the apparatus, TOC information is always read out for several seconds. In this invention, during this period, the magnetic head 8 contacts the magnetic track 67a and reproduces the magnetic data therefrom. Since the optical reproduction on the TOC area is simultaneously executed, the rotation servo control is enabled. In addition a write clock signal for the magnetic recording can be derived by frequency-dividing the optical sync clock signal. Since the upward and downward movement of the magnetic head are enabled by the traverse motor for the optical head, the structure of the apparatus is simple.

In the case where the data on the magnetic track 67a is required to be rewritten upon the end of the disk reproduction process, the optical head 6 is moved again to the innermost area so that the magnetic head 8 contacts the magnetic track 67a. Magnetic track data is written into the magnetic track 67a from a cache memory 34 of FIG. 1 via the magnetic head 8. After the writing process is completed, the optical head moves back to the original position so that the magnetic head 8 is moved out contact with the magnetic track 67a.

In some of cases where an optical head 6 and a magnetic head 8 are located on opposite sides of a recording medium respectively, a magnet generates a strong magnetic field depending on the designing of the optical head 6. FIG. 195 shows experimentally measured data of a magnetic filed on an optical recording portion of a CD which is caused by a CD ROM optical pickup made by "SANYO". The magnetic field is equal to 400 gauss in the absence of a magnetic head, and is equal to 800 gauss in the presence of a magnetic head 8 opposing the optical head. Thus, in this case, when the magnetic coercive force Hc of the magnetic recording portion of the recording medium is low, magnetically recorded data tends to be erased. According to this invention, such a problem is solved by setting the magnetic coercive force Hc to 1500 Oe or more. In addition, according to this invention, the magnetic head 8 is prevented from opposing the optical head when the optical head is used. Specifically, as shown in FIG. 196(c), a magnetic head retracting link 515 is moved while being linked with a traverse. When the optical head 6 accesses an outer optical track 65a, the magnetic head 8 is forced by the retracting link 515 to a outward of the recording medium 2. As a result, the concentration of magnetic fluxes by the magnetic head 8 is prevented so that the recorded magnetic data can be prevented from being damaged.

As shown in FIG. 116, the optical head 6 also causes ac magnetic noise in addition to the previously-mentioned dc magnetic field noise. As shown in FIG. 197, the magnetic head 8 is separated by a given distance LH or more from the optical head 6 containing an optical head actuator. This design is advantageous in that dc and ac noises from the optical head 6 are prevented from entering the magnetic head 8. It is understood from FIG. 116 that the noise level can be reduced by 15 dB when the given distance LH is equal to 10 mm. Thus, it is preferable that the two heads are separated by 10 mm or more.

According to an arrangement using a multiple track head 8 for providing a magnetic track 67a divided into three as shown in FIG. 198(a), an increased capacity of magnetic recording is attained. In the case where a magnetic head 8 corresponds to three azimuth heads 8a, 8b, and 8c of different azimuth angles, the track density can be increased by three times. In the case of a non-azimuth head, a required track pitch Tp is equal to 0.4 mm in track width. In the case of an azimuth head of this type, the required track pitch Tp is equal to 0.13 mm in track pitch. In the case of azimuth heads 8a and 8b of different azimuth angles as shown in FIGS. 198(c) and 198(d), a double recording capacity is attained.

A description will now be given of a method of recording a medium identifier into a TOC area. Optical tracks 65a, 65b, 65c and 65d are wove and wobbled as shown in FIG. 199(b), and thereby an additional signal (a wobbling signal) is recorded into the TOC area of FIG. 199(a). As shown in FIG. 200, an optical reproducing section is provided with a wobbling signal demodulator 38c which functions to reproduce the wobbling signal. According to this design, information of a medium identifier and others can be recorded into the TOC area. This design is advantageous in that the medium can be identified only by executing the reproduction on the TOC area, and that tune names and title names can be recorded into the TOC area.

In the case of a CD player of the tray type such as shown in FIGS. 201(a), 201(b), 201(c), and 201(d), upward and downward movement of a head are executed by a loading motor 516. In FIG. 201(a), the loading motor 516 rotates and a tray moving gear 518 moves in a direction 51a, so that loading of a tray 520 starts. In FIG. 201(b), as the tray 520 is placed in the player, a micro-switch 521 is actuated and therefore the motor is deactivated. Then, the reproduction of a CD starts. In the presence of a medium identifier the motor 516 further rotates in a direction 51g so that the tray moving gear 518 further advances in a direction 51b. Therefore, as shown in FIG. 201(c), a head moving link 503 is rotated, and a head elevator 519 is raised in a direction 51c. As a result, a magnetic head 8 is brought into contact with a magnetic track 67a so that the magnetic recording or reproduction is enabled. After the magnetic recording or reproduction has been completed, the motor 516 rotates in the opposite direction so that the tray moving gear 518 moves in a direction 51d. Therefore, the head elevator 519 is raised in a direction 51e, and the magnetic head 8 is moved out of contact with the magnetic track 67a. Then, the normal optical reproduction is started. As previously described, the reproduced magnetic data is stored into a memory 34 composed of an IC memory, and a data updating process is executed in response to the data in the memory 34. Immediately before the tray is ejected from the player, only the updated data (the new data) is subjected to magnetic recording or reproduction to update the magnetically recorded data.

With reference to FIG. 226, a recording and reproducing apparatus such as a CD player of the upper lid opening and closing type includes an optical head 6 and a magnetic head 8 which is provided at an opposite side of the optical head 6.

In the apparatus of FIG. 226, the optical head 6 and the magnetic head 8 can be moved by a traverse motor 23a in a direction denoted by the arrow 51. The direction 51 of movement of the optical head 6 and the magnetic head 8 is set parallel with a shaft 521 for opening and closing rotation of an upper lid 389. Thus, there is an advantage in that the positional relation among a suspension 41a, the magnetic head 8, and the optical head 6 can be accurately maintained when the upper lid 389 is opened and closed. Thus, it is possible to more accurately access a magnetic track at a back side of an optical track.

The upper lid 38a is provided with an optical sensor 386. When the upper lid is closed, the optical sensor 386 reads an optical mark on a label surface of a CD 2. Only in the case where the presence of a magnetic layer is detected by referring to the output signal of the optical sensor 386, an elevating motor 21 drives a head elevator 519 to lower the magnetic head 8 onto the magnetic layer. Thus, there is an advantage in that a conventional CD without any magnetic layer can be damaged by the magnetic head 8.

With reference to FIG. 227, a description will be given of a CD player of this invention which has a playback function for a video CD. The apparatus of FIG. 227 is basically similar to the apparatus of FIG. 181 except for the following points.

In the apparatus of FIG. 227, a moving-image reproducing section 33b of an output portion 33 has a MPEG video decoder 33e according to the MPEG1 standards. A reproduced image-compressed video signal is expanded and decoded into an original moving image signal by the decoder 33e. The resultant signal is changed by a D/A converter 33f and an NTSC/PAL encoder 33g into an NTSC or PAL analog TV signal, which is outputted to a monitor 449. Audio information is handled by using a level 2 of MPEG1, being outputted as an analog audio signal by an MPEG audio decoder 33i and a D/A converter 33k.

The apparatus of FIG. 227 features that a memory stores a menu-selection number table 522 in which selected numbers are stored for respective menu screen pictures in the playback function of the video CD. A magnetic track 67a of a magnetic recording layer 3 of a recording medium 2 is subjected to reproduction by a magnetic record and reproduction circuit, and thereby a part or the whole of the contents of the menu-selected number table 522 is obtained. Only in the case where a change is present in the contents of the menu-selected number table 522, change data is recorded on the magnetic recording layer at an end of this process.

FIG. 228 shows a related data structure. The format of a video CD of a CD-ROM, that is, optical recording is made on the basis of the ISO9660 standards in the CD-ROM-XA standards. In FIG. 228, a control signal, a menu, an index of a video CD, and others are recorded on a track 1, that is, a video CD data track 526. There is a list ID offset table 525 into which moving picture addresses 525a and still picture addresses 525b are stored. A playback control portion 523 stores a play list 523a for indicating a sequence of reproduction of moving pictures, a selection list 523b for indicating a sequence of reproduction of menu pictures, and contains information for controlling a sequence of playback.

In the case of a CD-HB of this invention, magnetic record data is present which contains the menu-selected number table 522 which can be updated. Accordingly, the previous menu selection number related to the operator can be reproduced again. For example, in the case of an education software, the display image can be advanced to the previously-learned final branch point. Thus, there is an advantage in that it is unnecessary for the operator to input a number again in the menu.

With reference to FIG. 229, operation of the video CD player of this invention will be described. At a step 524a, the reproduction of a video CD is started. At a step 524b, a check is made as to whether or not magnetic data is present. If it is no, normal reproduction is done at a step 524t so that images are reproduced in a sequence show at a step 524u. If it is yes, the name of the operator on the magnetic data is reproduced and a menu picture for magnetic data is indicated for selection of the operator name. If it is no during the use of magnetic data at a step 524d, normal reproduction is done. If it is yes, magnetic data is reproduced at a step 524e so that data of the menu-selected number table 522 is reproduced which corresponds to the operator. Next, at a step 524f, reproduction is done according to a branch sequence for a playback control region of the optical record layer. In this case, moving picture addresses are generated from the play list 523a while menu picture addresses are generated from the selection list 523b. At steps 524g and 524h, moving pictures are reproduced, and an N-th menu still picture is outputted. During that time, at a step 524j, N-th data 522n is read out from the menu-selected number table 522 such as shown in FIG. 230, and the number corresponding to the operator, for example, the selection number N−1, is read out. Then, at a step 524p, the menu number is automatically selected. At a step 524q, a next image is reproduced. If the selection number is not recorded at a step 524k, the operator is forced to execute selection at steps 524m and 524n. At steps 524r and 524s, checks are made as to completion and continuation. In the absence of continuation, advance to a step 524u is done, and a step 524w provides a question regarding whether or not the menu selection number is saved. If it is yes, a check is made at a step 524x as to whether or not change data is present in the table 522. If the change data is present, only change portions of the selection numbers for the respective menus are recorded on the magnetic recording layer and then ending is done at a step 524z. Accordingly, there is an advantage such that reproduction can be done depending on the operator for the video CD.

The step 524u indicates the reproduction sequence for the normal video CD. This invention is advantageous in that once the number is inputted, it is unnecessary for the operator to input the number again. FIG. 231(a) shows picture and audio data structures. FIG. 231(b) shows index numbers for MPEG data corresponding to one track.

A description will now be given of a way of accessing a magnetic track at a higher speed. In the case where a magnetic track is accessed by searching for a given address as shown in FIG. 232, it takes a certain time to find an optical address. In the case of a CD, to enable search for an optical address at a high speed. "1" is consecutively stored in P bits of the sub code of FIG. 233 which correspond to about one round. Thus, P=1 is always reproduced and detected when the optical head 6 moves along a track 65 as shown by the optical tracks 65a and 65b of FIG. 232. In this invention, optical tracks 65x and 65y are provided with magnetic track search information 527 independent of optical address search information 526, and the magnetic track search information 527 is formed by setting T bits of the sub code to "1" which correspond to about 1 round. This design provides an advantage such that a search for a magnetic track can be done at a remarkably higher speed. It is good that magnetic addresses are stored in U bits of the sub code.

What is claimed is:

[1. A reproducing apparatus for reproducing signals from a recording medium in which first physical features information indicative of a physical feature unique to said recording medium was recorded as ciphered information, said apparatus comprising:

deciphering means for deciphering said ciphered information to obtain said first physical feature information;

detecting means for detecting and obtaining second physical feature information from said first physical feature information;

checking means for checking whether or not said first and second physical feature information have a specific relationship; and means for stopping a specific operation when said checking means indicates that said first and second physical feature information do not have said specific relationship.]

[2. The reproducing apparatus as claimed in claim 1, wherein said specific operation comprises outputting information reproduced from said recording medium.]

[3. The reproducing apparatus as claimed in claim 1, wherein said specific operation comprises an operation under control of a program reproduced from said recording medium.]

[4. The reproducing apparatus as claimed in claim 1, wherein a public key cipher key is used, in said deciphering means, as a key for deciphering said ciphered information.]

[5. The reproducing apparatus as claimed in claim 4, wherein RSA cipher is used as said public key cipher key.]

[6. A reproducing method for reproducing signals from a recording medium in which first physical feature information indicative of a physical feature unique to said recording medium was recorded as ciphered information, said method comprising the steps of:

deciphering said ciphered information to obtain said first physical feature information;

detecting and obtaining second physical feature information from said first physical feature information;

checking whether or not said first and second physical feature information have a specific relationship; and stopping a specific operation when said checking means indicates that said first and second physical feature information do not have said specific relationship.]

[7. The reproducing method as claimed in claim 6, wherein said specific operation comprises outputting information reproduced from said recording medium.]

[8. The reproducing method as claimed in claim 6, wherein said specific operation comprises an operation under control of a program reproduced from said recording medium.]

[9. The reproducing method as claimed in claim 6, further comprising a step of performing a specific display when said checking step indicates that said first and second physical feature information do not have said specific relationship.]

[10. The reproducing method as claimed in claim 6, wherein a public key cipher key is used, in said deciphering means, as a key for deciphering said ciphered information.]

[11. The reproducing apparatus as claimed in claim 10, wherein RSA cipher is used as said public key cipher key.]

*12. A reproducing method for reproducing video signals recorded in a recording layer of an optical disk in such a manner that tracking variations are formed at an address position in a circular or spiral track comprising:*

*disk driving step of rotating an optical disk;*

*an optical head operating step for emitting a light beam and receiving light from said optical disk to read information recorded in said disk in the form of pits;*

*tracking controlling step of effecting tracking control so that a light spot on said recording layer of said optical disk resulted from said light beam follows a series of pits on a track of said optical disk;*

*a tracking amount detection step of detecting from a tracking amount sensor an amount of the tracking variation in the address position;*

*a disk checking step of properly judging whether the current disk is legal or illegal according to the distribution of tracking variations, comparing the amount of the tracking variation with a tolerance value, wherein said tolerance value is set so that the current disk is judged to be legal if the amount of the tracking variation is within the tolerance and to be illegal if the amount of the tracking variation is outside the tolerance;*

*reproducing step responsive to an output signal at said optical head operating step for reproducing a video signal; and*

*an output/operation stopping step of stopping outputting of video information reproduced at said reproducing step to be externally outputted or stopping said reproducing step in accordance with said disk checking step.*

* * * * *

UNITED STATES PATENT AND TRADEMARK OFFICE

CERTIFICATE OF CORRECTION

PATENT NO. : RE40,958 E
APPLICATION NO. : 11/304674
DATED : November 10, 2009
INVENTOR(S) : Oshima It is certified that error appears in the above-identified patent and that said Letters Patent is hereby corrected as shown below:

IN THE SPECIFICATIONS:
Column 1, lines 12-25 should read as follows:

"This application is a Division of application Ser. No. 11/272,484 filed November 14, 2005, which is a reissue application of application Ser. No. 10/611,926 filed July 3, 2003, now U.S. Pat. No. 6,859,427, which is a Continuation of application Ser. No. 09/796,534 filed Mar. 2, 2001, now U.S. Pat. No. 6,674,703 which is a Division of application Ser. No. 09/305,318 filed May 5, 1999, now U.S. Pat. No. 6,243,330, which is a Division of application Ser. No. 08/970,162 filed Nov. 13, 1997, now U.S. Pat. No. 5,959,948, which is a Continuation of application Ser. No. 08/534,771 filed on Sep. 27, 1995, now U.S. Pat. No. 5,699,331, which is a Division of application Ser. No. 08/281,337 filed Jul. 27, 1994, now U.S. Pat. No. 5,473,584, which is a Continuation-In-Part of application Ser. No. 08/184,117 filed Jan. 21, 1994, now U.S. Pat. No. 5,526,328, which is a Continuation-In-Part of application Ser. No. 08/009,709, filed on Jan. 27, 1993, now U.S. Pat. No. 5,682,360."

Signed and Sealed this
Twelfth Day of April, 2011

David J. Kappos

David J. Kappos
*Director of the United States Patent and Trademark Office*